US010672383B1

(12) United States Patent
Thomson et al.

(10) Patent No.: US 10,672,383 B1
(45) Date of Patent: *Jun. 2, 2020

(54) TRAINING SPEECH RECOGNITION SYSTEMS USING WORD SEQUENCES

(71) Applicant: Sorenson IP Holdings, LLC, Salt Lake City, UT (US)

(72) Inventors: David Thomson, North Salt Lake, UT (US); Jadie Adams, Salt Lake City, UT (US); Kenneth Boehme, South Jordan, UT (US)

(73) Assignee: Sorenson IP Holdings, LLC, Salt Lake City, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/544,711

(22) Filed: Aug. 19, 2019

Related U.S. Application Data

(63) Continuation of application No. 16/209,640, filed on Dec. 4, 2018, now Pat. No. 10,388,272.

(51) Int. Cl.
*G10L 15/26* (2006.01)
*G10L 15/06* (2013.01)
(Continued)

(52) U.S. Cl.
CPC ............ *G10L 15/063* (2013.01); *G10L 15/22* (2013.01); *G10L 15/265* (2013.01); *G10L 15/30* (2013.01)

(58) Field of Classification Search
None
See application file for complete search history.

(56) References Cited

U.S. PATENT DOCUMENTS 5,606,643 A 2/1997 Balasubramanian et al.
5,649,060 A 7/1997 Ellozy et al.
(Continued)

FOREIGN PATENT DOCUMENTS

EP 0555545 A1 8/1993
EP 0645757 A1 9/1995
(Continued)

OTHER PUBLICATIONS

Peter Hays, CEO, VTCSecure, LLC, Nov. 7, 2017, Notice of Ex Parte in CG Docket Nos. 03-123 and 10-51, 2 pgs.
(Continued)

*Primary Examiner* — Satwant K Singh
(74) *Attorney, Agent, or Firm* — Maschoff Brennan

(57) ABSTRACT

A method may include obtaining first audio data of a communication session between a first device and a second device, obtaining a text string that is a transcription of the first audio data, and selecting a contiguous sequence of words from the text string as a first word sequence. The method may further include comparing the first word sequence to multiple word sequences obtained before the communication session and in response to the first word sequence corresponding to one of the multiple word sequences, incrementing a counter of multiple counters associated with the one of the multiple word sequences. The method may also include deleting the text string and the first word sequence and training and after deleting the text string and the first word sequence, training a language model of an automatic transcription system using the multiple word sequences and the multiple counters.

20 Claims, 84 Drawing Sheets

(51) Int. Cl.
  *G10L 15/22* (2006.01)
  *G10L 15/30* (2013.01)

(56) References Cited

U.S. PATENT DOCUMENTS

| | | |
|---|---|---|
| 5,724,405 A | 3/1998 | Engelke et al. |
| 5,855,000 A | 12/1998 | Waibel et al. |
| 5,883,986 A | 3/1999 | Kopec et al. |
| 6,122,613 A | 9/2000 | Baker |
| 6,208,964 B1 | 3/2001 | Sabourin |
| 6,208,970 B1 | 3/2001 | Ramanan |
| 6,366,882 B1 | 4/2002 | Bijl et al. |
| 6,374,221 B1 | 4/2002 | Haimi-Cohen |
| 6,385,582 B1 | 5/2002 | Iwata |
| 6,457,031 B1 | 9/2002 | Hanson |
| 6,535,848 B1 | 3/2003 | Ortega et al. |
| 6,704,709 B1 | 3/2004 | Kahn et al. |
| 6,728,677 B1 | 4/2004 | Kannan et al. |
| 6,813,603 B1 | 11/2004 | Groner et al. |
| 6,816,468 B1 | 11/2004 | Cruickshank |
| 6,832,189 B1 | 12/2004 | Kanevsky et al. |
| 6,947,896 B2 | 9/2005 | Hanson |
| 7,003,463 B1 | 2/2006 | Maes et al. |
| 7,016,844 B2 | 3/2006 | Othmer et al. |
| 7,130,790 B1 | 10/2006 | Flanagan et al. |
| 7,174,299 B2 | 2/2007 | Fujii et al. |
| 7,191,130 B1 | 3/2007 | Leggetter et al. |
| 7,191,135 B2 | 3/2007 | O'Hagan |
| 7,228,275 B1 | 6/2007 | Endo et al. |
| 7,236,932 B1 | 6/2007 | Grajski |
| 7,519,536 B2 | 4/2009 | Maes et al. |
| 7,606,718 B2 | 10/2009 | Cloran |
| 7,613,610 B1 | 11/2009 | Zimmerman et al. |
| 7,660,715 B1 | 2/2010 | Thambiratnam |
| 7,836,412 B1 | 11/2010 | Zimmerman |
| 7,844,454 B2 | 11/2010 | Coles et al. |
| 7,907,705 B1 | 3/2011 | Huff et al. |
| 7,913,155 B2 * | 3/2011 | Basson ............... H04N 21/233 715/200 |
| 7,930,181 B1 | 4/2011 | Goffin et al. |
| 7,957,970 B1 | 6/2011 | Gorin et al. |
| 7,962,339 B2 | 6/2011 | Pieraccini et al. |
| 8,019,608 B2 | 9/2011 | Carraux et al. |
| 8,180,639 B2 | 5/2012 | Pieraccini et al. |
| 8,223,944 B2 | 7/2012 | Cloran et al. |
| 8,249,878 B2 | 8/2012 | Carraux et al. |
| 8,286,071 B1 | 10/2012 | Zimmerman et al. |
| 8,332,227 B2 | 12/2012 | Maes et al. |
| 8,332,231 B2 | 12/2012 | Cloran |
| 8,335,689 B2 | 12/2012 | Wittenstein et al. |
| 8,335,830 B2 * | 12/2012 | Jablokov ............... G06Q 30/02 709/206 |
| 8,379,801 B2 | 2/2013 | Romriell et al. |
| 8,407,052 B2 | 3/2013 | Hager |
| 8,484,042 B2 | 7/2013 | Cloran |
| 8,504,372 B2 | 8/2013 | Carraux et al. |
| 8,537,979 B1 | 9/2013 | Pollock |
| 8,605,682 B2 | 12/2013 | Efrati et al. |
| 8,626,520 B2 | 1/2014 | Cloran |
| 8,743,003 B2 | 6/2014 | De Lustrac et al. |
| 8,744,848 B2 | 6/2014 | Hoepfinger et al. |
| 8,781,510 B2 | 7/2014 | Gould et al. |
| 8,812,321 B2 | 8/2014 | Gilbert et al. |
| 8,868,425 B2 | 10/2014 | Maes et al. |
| 8,874,070 B2 | 10/2014 | Basore et al. |
| 8,892,447 B1 | 11/2014 | Srinivasan et al. |
| 8,898,065 B2 | 11/2014 | Newman et al. |
| 8,930,194 B2 | 1/2015 | Newman et al. |
| 9,002,713 B2 | 4/2015 | Ljolje et al. |
| 9,047,868 B1 | 6/2015 | O'Neill et al. |
| 9,076,450 B1 | 7/2015 | Sadek et al. |
| 9,117,450 B2 | 8/2015 | Cook et al. |
| 9,153,231 B1 | 10/2015 | Salvador et al. |
| 9,183,843 B2 | 11/2015 | Fanty et al. |
| 9,191,789 B2 | 11/2015 | Pan |
| 9,197,745 B1 | 11/2015 | Chevrier et al. |
| 9,215,409 B2 | 12/2015 | Montero et al. |
| 9,245,522 B2 | 1/2016 | Hager |
| 9,247,052 B1 | 1/2016 | Walton |
| 9,318,110 B2 | 4/2016 | Roe |
| 9,324,324 B2 | 4/2016 | Knighton |
| 9,336,689 B2 | 5/2016 | Romriell et al. |
| 9,344,562 B2 | 5/2016 | Moore et al. |
| 9,374,536 B1 | 6/2016 | Nola et al. |
| 9,380,150 B1 | 6/2016 | Bullough et al. |
| 9,386,152 B2 | 7/2016 | Riahi et al. |
| 9,444,934 B2 | 9/2016 | Nelson et al. |
| 9,460,719 B1 | 10/2016 | Antunes et al. |
| 9,502,033 B2 | 11/2016 | Carraux et al. |
| 9,514,747 B1 | 12/2016 | Bisani et al. |
| 9,525,830 B1 | 12/2016 | Roylance et al. |
| 9,535,891 B2 | 1/2017 | Raheja et al. |
| 9,548,048 B1 | 1/2017 | Solh et al. |
| 9,571,638 B1 | 2/2017 | Knighton et al. |
| 9,576,498 B1 | 2/2017 | Zimmerman et al. |
| 9,621,732 B2 | 4/2017 | Olligschlaeger |
| 9,628,620 B1 | 4/2017 | Rae et al. |
| 9,632,997 B1 | 4/2017 | Johnson et al. |
| 9,633,657 B2 | 4/2017 | Svendsen et al. |
| 9,641,681 B2 | 5/2017 | Nuta et al. |
| 9,653,076 B2 | 5/2017 | Kim |
| 9,654,628 B2 | 5/2017 | Warren et al. |
| 9,697,835 B1 | 7/2017 | Kuo et al. |
| 9,704,111 B1 | 7/2017 | Antunes et al. |
| 9,710,819 B2 | 7/2017 | Cloran et al. |
| 9,715,876 B2 | 7/2017 | Hager |
| 9,761,241 B2 | 9/2017 | Maes et al. |
| 9,842,587 B2 | 12/2017 | Hakkani-Tur et al. |
| 9,858,256 B2 | 1/2018 | Hager |
| 9,886,956 B1 | 2/2018 | Antunes et al. |
| 9,922,654 B2 | 3/2018 | Chang et al. |
| 9,947,322 B2 | 4/2018 | Kang et al. |
| 9,953,653 B2 | 4/2018 | Newman et al. |
| 9,990,925 B2 | 6/2018 | Weinstein et al. |
| 10,032,455 B2 | 7/2018 | Newman et al. |
| 10,044,854 B2 | 8/2018 | Rae et al. |
| 10,049,669 B2 | 8/2018 | Newman et al. |
| 10,091,545 B1 * | 10/2018 | Cwik ............... H04N 21/439 |
| 10,134,425 B1 * | 11/2018 | Johnson, Jr. ............ G10L 25/87 |
| 10,176,809 B1 * | 1/2019 | Pierard ............... G10L 15/30 |
| 10,186,265 B1 * | 1/2019 | Lockhart ............... G10L 15/22 |
| 10,388,272 B1 * | 8/2019 | Thomson ............... G10L 15/22 |
| 2002/0152071 A1 | 10/2002 | Chaiken et al. |
| 2003/0050777 A1 | 3/2003 | Walker, Jr. |
| 2004/0083105 A1 | 4/2004 | Jaroker |
| 2005/0049868 A1 | 3/2005 | Busayapongchai |
| 2005/0094777 A1 | 5/2005 | McClelland |
| 2005/0119897 A1 | 6/2005 | Bennett et al. |
| 2005/0226394 A1 | 10/2005 | Engelke et al. |
| 2005/0226398 A1 | 10/2005 | Bojeun |
| 2006/0072727 A1 | 4/2006 | Bantz et al. |
| 2006/0074623 A1 | 4/2006 | Tankhiwale |
| 2006/0089857 A1 | 4/2006 | Zimmerman et al. |
| 2007/0153989 A1 | 7/2007 | Howell et al. |
| 2007/0208570 A1 | 9/2007 | Bhardwaj et al. |
| 2007/0225970 A1 | 9/2007 | Kady et al. |
| 2008/0040111 A1 | 2/2008 | Miyamoto et al. |
| 2008/0049908 A1 | 2/2008 | Doulton |
| 2008/0133245 A1 | 6/2008 | Proulx et al. |
| 2009/0018833 A1 | 1/2009 | Kozat et al. |
| 2009/0037171 A1 | 2/2009 | McFarland et al. |
| 2009/0177461 A1 | 7/2009 | Ehsani et al. |
| 2009/0187410 A1 | 7/2009 | Wilpon et al. |
| 2009/0248416 A1 | 10/2009 | Gorin et al. |
| 2009/0299743 A1 | 12/2009 | Rogers |
| 2010/0027765 A1 | 2/2010 | Schultz et al. |
| 2010/0063815 A1 | 3/2010 | Cloran et al. |
| 2010/0076752 A1 | 3/2010 | Zweig et al. |
| 2010/0076843 A1 | 3/2010 | Ashton |
| 2010/0121637 A1 | 5/2010 | Roy et al. |
| 2010/0145729 A1 | 6/2010 | Katz |
| 2010/0312556 A1 | 12/2010 | Ljolje et al. |
| 2010/0318355 A1 | 12/2010 | Li et al. |
| 2010/0323728 A1 | 12/2010 | Gould et al. |

(56) References Cited

U.S. PATENT DOCUMENTS

| | | |
|---|---|---|
| 2011/0087491 A1 | 4/2011 | Wittenstein et al. |
| 2011/0112833 A1 | 5/2011 | Frankel et al. |
| 2011/0123003 A1 | 5/2011 | Romriell et al. |
| 2011/0128953 A1 | 6/2011 | Wozniak et al. |
| 2011/0295603 A1 | 12/2011 | Meisel |
| 2012/0016671 A1 | 1/2012 | Jaggi et al. |
| 2012/0178064 A1 | 7/2012 | Katz |
| 2012/0214447 A1 | 8/2012 | Russell et al. |
| 2012/0245934 A1 | 9/2012 | Talwar et al. |
| 2012/0316882 A1 | 12/2012 | Fiumi |
| 2013/0035937 A1 | 2/2013 | Webb et al. |
| 2013/0060572 A1 | 3/2013 | Garland et al. |
| 2013/0132084 A1 | 5/2013 | Stonehocker et al. |
| 2013/0132086 A1 | 5/2013 | Xu et al. |
| 2013/0151250 A1 | 6/2013 | Van Blon |
| 2013/0317818 A1 | 11/2013 | Bigham et al. |
| 2014/0018045 A1 | 1/2014 | Tucker |
| 2014/0067390 A1 | 3/2014 | Webb |
| 2014/0163981 A1 | 6/2014 | Cook et al. |
| 2014/0207451 A1 | 7/2014 | Topiwala et al. |
| 2014/0278402 A1 | 9/2014 | Charugundla |
| 2014/0314220 A1 | 10/2014 | Charugundla |
| 2015/0073790 A1 | 3/2015 | Steuble et al. |
| 2015/0058006 A1 | 4/2015 | Bisani et al. |
| 2015/0094105 A1 | 4/2015 | Pan |
| 2015/0095026 A1 | 4/2015 | Bisani et al. |
| 2015/0106091 A1 | 4/2015 | Wetjen et al. |
| 2015/0130887 A1 | 5/2015 | Thelin et al. |
| 2015/0287408 A1 | 10/2015 | Svendsen et al. |
| 2015/0288815 A1 | 10/2015 | Charugundla |
| 2015/0332670 A1 | 11/2015 | Akbacak et al. |
| 2015/0341486 A1 | 11/2015 | Knighton |
| 2016/0012751 A1 | 1/2016 | Hirozawa |
| 2016/0062970 A1 | 3/2016 | Sadkin et al. |
| 2016/0078860 A1 | 3/2016 | Paulik et al. |
| 2016/0259779 A1 | 9/2016 | Labsky et al. |
| 2016/0379626 A1 | 12/2016 | Deisher et al. |
| 2017/0085506 A1 | 3/2017 | Gordon |
| 2017/0116993 A1 | 4/2017 | Miglietta et al. |
| 2017/0148433 A1 | 5/2017 | Catanzaro et al. |
| 2017/0187876 A1 | 6/2017 | Hayes et al. |
| 2017/0201613 A1 | 7/2017 | Engelke et al. |
| 2017/0206808 A1 | 7/2017 | Engelke et al. |
| 2017/0206888 A1 | 7/2017 | Engelke et al. |
| 2017/0206890 A1 | 7/2017 | Tapuhi et al. |
| 2017/0206914 A1 | 7/2017 | Engelke et al. |
| 2017/0208172 A1 | 7/2017 | Engelke et al. |
| 2017/0236527 A1 | 8/2017 | Dimitriadis et al. |
| 2017/0270929 A1 | 9/2017 | Aleksic et al. |
| 2017/0294186 A1 | 10/2017 | Pinto et al. |
| 2018/0013886 A1 | 1/2018 | Rae et al. |
| 2018/0034961 A1 | 2/2018 | Engelke et al. |
| 2018/0052823 A1 | 2/2018 | Scally et al. |
| 2018/0081869 A1 | 3/2018 | Hager |
| 2018/0197545 A1 | 7/2018 | Willett et al. |
| 2018/0270350 A1 | 9/2018 | Engelke et al. |
| 2019/0037072 A1 | 1/2019 | Engelke et al. |

FOREIGN PATENT DOCUMENTS

| | | |
|---|---|---|
| EP | 2587478 A2 | 9/2011 |
| EP | 2372707 A1 | 10/2011 |
| JP | 2011002656 A | 1/2011 |
| JP | 2015018238 A | 1/2015 |
| KR | 20170134115 A | 12/2017 |
| WO | 1998034217 A1 | 8/1998 |
| WO | 0225910 A2 | 3/2002 |
| WO | 2014022559 A1 | 2/2014 |
| WO | 2014049944 A1 | 4/2014 |
| WO | 2014176489 A2 | 10/2014 |
| WO | 2012165529 A1 | 2/2015 |
| WO | 2015073260 A1 | 5/2015 |
| WO | 2015131028 A1 | 9/2015 |
| WO | 2015148037 A1 | 10/2015 |
| WO | 2017054122 A1 | 4/2017 |

OTHER PUBLICATIONS

Lambert Mathias, Statistical Machine Translation and Automatic Speech Recognition under Uncertainty, Dissertation submitted to Johns Hopkins University, Dec. 2007, 131 pages.

Mike Wald, Captioning for Deaf and Hard of Hearing People by Editing Automatic Speech Recognition in Real Time, ICCHP'06 Proceedings of the 10th International Conference on Computers Helping People with Special Needs, Jul. 2006, pp. 683-690, Linz, Austria.

Jeff Adams, Kenneth Basye, Alok Parlikar, Andrew Fletcher, & Jangwon Kim, Automated Speech Recognition for Captioned Telephone Conversations, Faculty Works, Nov. 3, 2017, pp. 1-12.

Lasecki et al., Real-Time Captioning by Groups of Non-Experts, Rochester Institute of Technology, Oct. 2012, USA.

Benjamin Lecouteux, Georges Linares, Stanislas Oger, Integrating imperfect transcripts into speech recognition systems for building high-quality corpora, ScienceDirect, Jun. 2011.

Maarten Van Gompel et al., Efficient n-gram, Skipgram and Flexgram Modelling with Colibri Core, Journal of Open Research Software, vol. 4, Aug. 2, 2016, p. 3.

International Search Report and Written Opinion received in International Application No. PCT/US2019/062872, dated Feb. 7, 2020.

\* cited by examiner

TRAINING SPEECH RECOGNITION SYSTEMS USING WORD SEQUENCES

CROSS-REFERENCE TO RELATED APPLICATION

This application is a continuation of U.S. patent application Ser. No. 16/209,640, filed on Dec. 4, 2018, the disclosure of which is incorporated herein by reference in its entirety.

FIELD

The embodiments discussed herein are related to transcriptions of communications.

BACKGROUND

Transcriptions of audio communications between people may assist people that are hard-of-hearing or deaf to participate in the audio communications. Transcription of audio communications may be generated with assistance of humans or may be generated without human assistance using automatic speech recognition ("ASR") systems. After generation, the transcriptions may be provided to a device for display.

The subject matter claimed herein is not limited to embodiments that solve any disadvantages or that operate only in environments such as those described above. Rather, this background is only provided to illustrate one example technology area where some embodiments described herein may be practiced.

SUMMARY

In some embodiments, a method may include obtaining first audio data of a communication session between a first device of a first user and a second device of a second user. In these and other embodiments, the communication session may be configured for verbal communication. The method may further include obtaining, during the communication session, a text string that is a transcription of the first audio data and selecting a contiguous sequence of words from the text string as a first word sequence. The method may further include comparing the first word sequence to multiple word sequences obtained before the communication session. In these and other embodiments, each of the multiple word sequences may be associated with a corresponding one of multiple counters. The method may further include in response to the first word sequence corresponding to one of the multiple word sequences based on the comparison, incrementing a counter of the multiple counters associated with the one of the multiple word sequences. The method may also include after incrementing the counter of the plurality of counters, deleting the text string and the first word sequence and training, after deleting the text string and the first word sequence, a language model of an automatic transcription system using the plurality of word sequences and the plurality of counters.

BRIEF DESCRIPTION OF THE DRAWINGS

Example embodiments will be described and explained with additional specificity and detail through the use of the accompanying drawings in which.

DESCRIPTION OF EMBODIMENTS

Figure 1:
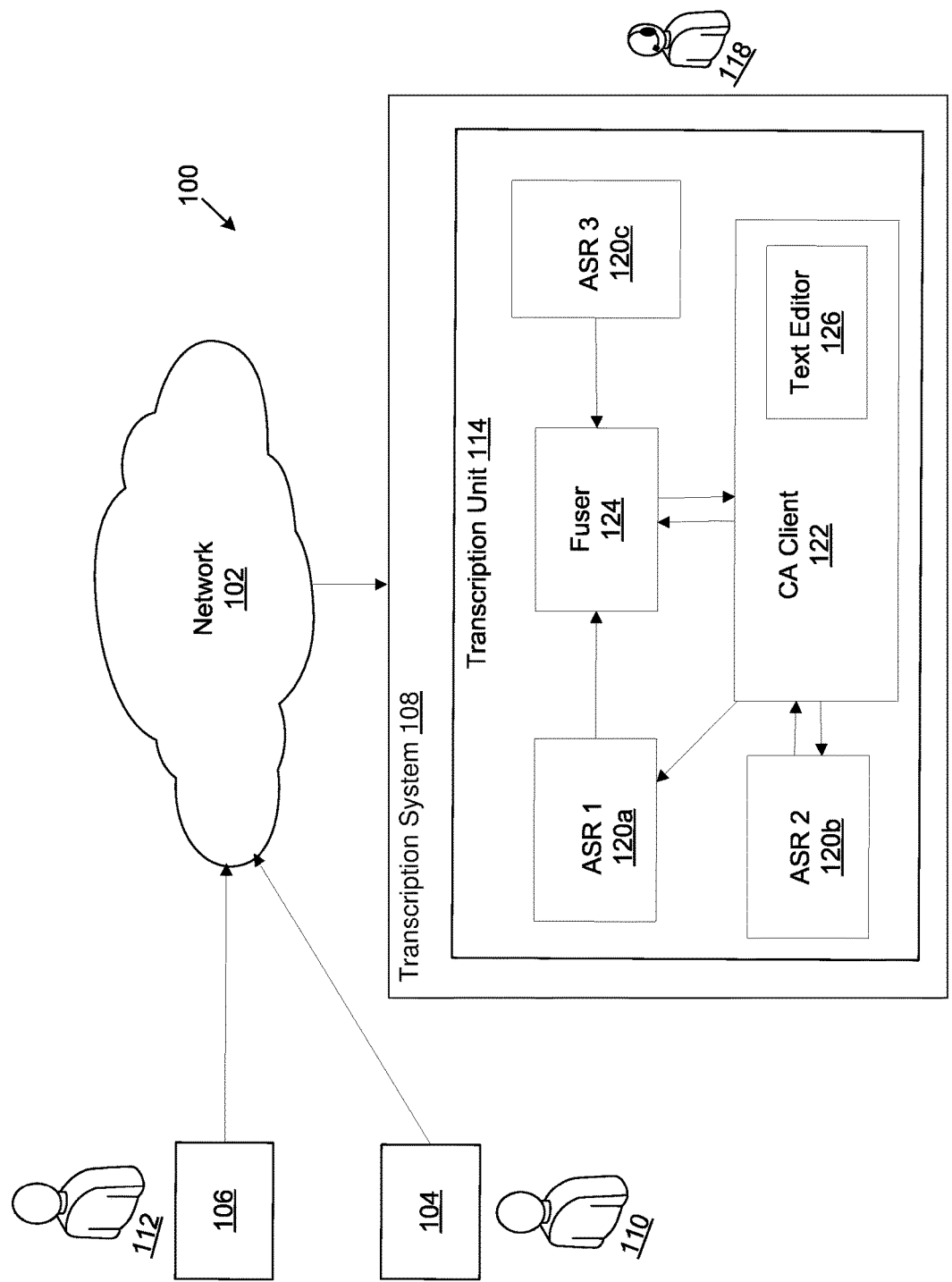
FIG. 1 illustrates an example environment for transcription of communications.

Some embodiments in this disclosure relate to systems and methods that may be configured to transcribe audio of a communication session. For example, in some embodiments, audio of a communication session may be provided to a transcription system to transcribe the audio from a device that receives and/or generates the audio. A transcription of the audio generated by the transcription system may be provided back to the device for display to a user of the device. The transcription may assist the user to better understand what is being said during the communication session.

For example, a user may be hard of hearing and participating in a phone call. Because the user is hard of hearing, the user may not understand everything being said during the phone call from the audio of the phone. However, the audio may be provided to a transcription system. The transcription system may generate a transcription of the audio in real-time during the phone call and provide the transcription to a device of the user. The device may present the transcription to the user. Having a transcription of the audio may assist the hard of hearing user to better understand the audio and thereby better participate in the phone call.

Presenting transcriptions that are inaccurate or that lag behind the audio of the communication session may reduce the benefit of the transcription. Thus, the systems and methods described in some embodiments may be directed to reducing the inaccuracy of transcriptions and a time required to generate transcriptions. Additionally, the systems and methods described in some embodiments may be directed to reducing costs to generate transcriptions. Reduction of costs may make transcriptions available to more people. In some embodiments, the systems and methods described in this disclosure may reduce inaccuracy, time, and/or costs by incorporating a fully automatic speech recognition (ASR) system into a transcription system.

Some current systems may use ASR systems in combination with human assistance to generate transcriptions. For example, some current systems may employ humans to revoice audio from a communication session. The revoiced audio may be provided to an ASR system that may generate a transcription based on the revoiced audio. Revoicing may cause delays in generation of the transcription and may increase expenses. Additionally, the transcription generated based on the revoiced audio may include errors.

In some embodiments, systems and methods in this disclosure may be configured to select between different transcription systems and/or methods. Alternatively or additionally, systems and methods in this disclosure may be configured to switch between different transcription systems and/or methods during a communication session. The selection of different systems and/or methods and switching between different systems and/or methods, may, in some embodiments, reduce costs, reduce transcription delays, or provide other benefits. For example, an automatic system that uses automatic speech recognition may begin transcription of audio of a communication session. During the communication session, a revoicing system, which uses human assistance as described above, may assume responsibility to generate transcriptions for a remainder of the communication session. Some embodiments of this disclosure discuss factors regarding how a particular system and/or method may be selected, why a switch between different systems and/or methods may occur, and how the selection and switching may occur.

In some embodiments, systems and methods in this disclosure may be configured to combine or fuse multiple transcriptions into a single transcription that is provided to a device for display to a user. Fusing multiple transcriptions may assist a transcription system to produce a more accurate transcription with fewer errors. In some embodiments, the multiple transcriptions may be generated by different systems and/or methods. For example, a transcription system may include an automatic ASR system and a revoicing system. Each of the automatic ASR system and the revoicing system may generate a transcription of audio of a communication session. The transcriptions from each of the automatic ASR system and the revoicing system may be fused together to generate a finalized transcription that may be provided to a device for display.

In some embodiments, systems and methods in this disclosure may be configured to improve the accuracy of ASR systems used to transcribe the audio of communication sessions. In these and other embodiments, improving the accuracy of an ASR system may include improving an ability of the ASR system to recognize words in speech.

In some embodiments, the accuracy of an ASR system may be improved by training ASR systems using live audio. For example, the audio of a live communication session may be used to train an ASR system. Alternatively or additionally, the accuracy of an ASR system may be improved by obtaining an indication of a frequency that a sequence of words, such as a sequence of two to four words, are used during speech. In these and other embodiments, sequences of words may be extracted from transcriptions of communication sessions. A count for each particular sequence of words may be incremented each time the particular sequence of words is extracted. The counts for each particular sequence of words may be used to improve the ASR systems.

Thus, the systems and methods described in this disclosure may result in the improved display of transcriptions at a user device. Furthermore, the systems and methods described in this disclosure may improve technology with respect to audio transcriptions and real-time generation and display of audio transcriptions. Additionally, the systems and methods described in this disclosure may improve technology with respect to automatic speech recognition.

Turning to the figures, FIG. 1 illustrates an example environment 100 for transcription of communications. The environment 100 may be arranged in accordance with at least one embodiment described in the present disclosure. The environment 100 may include a network 102, a first device 104, a second device 106, and a transcription system 108 that may include a transcription unit 114, each of which will be described in greater detail below.

The network 102 may be configured to communicatively couple the first device 104, the second device 106, and the transcription system 108. In some embodiments, the network 102 may be any network or configuration of networks configured to send and receive communications between systems and devices. In some embodiments, the network 102 may include a conventional type network, a wired network, an optical network, and/or a wireless network, and may have numerous different configurations. In some embodiments, the network 102 may also be coupled to or may include portions of a telecommunications network, including telephone lines, for sending data in a variety of different communication protocols, such as a plain old telephone system (POTS).

As an example, the network 102 may include a POTS network that may couple the first device 104 and the second device 106, and a wired/optical network and a wireless network that may couple the first device 104 and the transcription system 108. In these and other embodiments, the network 102 may not be a conjoined network. For example, the network 102 may represent separate networks and the elements in the environment 100 may route data between the separate networks. In short, the elements in the environment 100 may be coupled together such that data may be transferred there by the network 102 using any known method or system.

Each of the first and second devices 104 and 106 may be any electronic or digital computing device. For example, each of the first and second devices 104 and 106 may include a desktop computer, a laptop computer, a smartphone, a mobile phone, a video phone, a tablet computer, a telephone, a speakerphone, a VoIP phone, a smart speaker, a phone console, a caption device, a captioning telephone, a communication system in a vehicle, a wearable device such as a watch or pair of glasses configured for communication, or any other computing device that may be used for communication between users of the first and second devices 104 and 106.

In some embodiments, each of the first device 104 and the second device 106 may include memory and at least one processor, which are configured to perform operations as described in this disclosure, among other operations. In some embodiments, each of the first device 104 and the second device 106 may include computer-readable instructions that are configured to be executed by each of the first device 104 and the second device 106 to perform operations described in this disclosure.

In some embodiments, each of the first and second devices 104 and 106 may be configured to establish communication sessions with other devices. For example, each of the first and second devices 104 and 106 may be configured to establish an outgoing communication session, such as a telephone call, video call, or other communication session, with another device over a telephone line or network. For example, each of the first device 104 and the second device 106 may communicate over a WiFi network, wireless cellular network, a wired Ethernet network, an optical network, or a POTS line.

In some embodiments, each of the first and second devices 104 and 106 may be configured to obtain audio during a communication session. The audio may be part of a video communication or an audio communication, such as a telephone call. As used in this disclosure, the term audio may be used generically to refer to sounds that may include spoken words. Furthermore, the term "audio" may be used generically to include audio in any format, such as a digital format, an analog format, or a propagating wave format. Furthermore, in the digital format, the audio may be compressed using different types of compression schemes. Also, as used in this disclosure, the term video may be used generically to refer to a compilation of images that may be reproduced in a sequence to produce video.

As an example of obtaining audio, the first device 104 may be configured to obtain first audio from a first user 110. The first audio may include a first voice of the first user 110. The first voice of the first user 110 may be words spoken by the first user. For example, the first device 104 may obtain the first audio from a microphone of the first device 104 or from another device that is communicatively coupled to the first device 104.

The second device 106 may be configured to obtain second audio from a second user 112. The second audio may include a second voice of the second user 112. The second voice of the second user 112 may be words spoken by the second user. In some embodiments, second device 106 may obtain the second audio from a microphone of the second device 106 or from another device communicatively coupled to the second device 106. During a communication session, the first device 104 may provide the first audio to the second device 106. Alternatively or additionally, the second device 106 may provide the second audio to the first device 104. Thus, during a communication session, both the first device 104 and the second device 106 may obtain both the first audio from the first user 110 and the second audio from the second user 112.

In some embodiments, one or both of the first device 104 and the second device 106 may be configured to provide the first audio, the second audio, or both the first audio and the second audio to the transcription system 108. In these and other embodiments, in addition to providing the first audio, the second audio, or both the first audio and the second audio to the transcription system 108, one or both of the first device 104 and the second device 106 may be configured to extract speech recognition features from the first audio, the second audio, or both the first audio and the second audio. In some embodiments, after extracting the speech recognition features, the features may be quantized or otherwise compressed. The extracted features may be provided to the transcription system 108 via the network 102.

In some embodiments, the transcription system 108 may be configured to generate a transcription of the audio received from either one or both of the first device 104 and the second device 106. The transcription system 108 may also provide the generated transcription of the audio to either one or both of the first device 104 and the second device 106. Either one or both of the first device 104 and the second device 106 may be configured to present the transcription received from the transcription system 108. For example, audio of both the first user 110 and the second user 112 may be provided to the transcription system 108. In these and other embodiments, transcription of the first audio may be provided to the second device 106 for the second user 112 and transcription of the second audio may be provided to the first device 104 for the first user 110. In some embodiments, the disclosure may also indicate that a person is receiving the transcriptions from the transcription system 108. In these and other embodiments, a device associated with the person may receive the transcriptions from the transcription system 108 and the transcriptions may be presented to the person by the device. In this manner, a person may receive the transcription.

The transcription system 108 may include any configuration of hardware, such as processors, servers, and storage servers, such as database servers, that are networked together and configured to perform one or more task. For example, the transcription system 108 may include one or multiple computing systems, such as multiple servers that each include memory and at least one processor.

In general, the transcription system 108 may be configured to obtain audio from a device, generate or direct generation of a transcription of the audio, and provide the transcription of the audio to the device or another device for presentation of the transcription. This disclosure describes various configurations of the transcription system 108 and various methods performed by the transcription system 108 to generate or direct generation of transcriptions of audio.

In general, the transcription system 108 may be configured to generate or direct generation of the transcription of audio using one or more automatic speech recognition (ASR) systems. The term "ASR system" as used in this disclosure may include a compilation of hardware, software, and/or data, such as trained models, that are configured to recognize speech in audio and generate a transcription of the audio based on the recognized speech. For example, in some embodiments, an ASR system may be a compilation of software and data models. In these and other embodiments, multiple ASR systems may be included on a computer system, such as a server. Alternatively or additionally, an ASR system may be a compilation of hardware, software, and data models. In these and other embodiments, the ASR system may include the computer system. In some embodiments, the transcription of the audio generated by the ASR systems may include capitalization, punctuation, and non-speech sounds. The non-speech sounds may include, background noise, vocalizations such as laughter, filler words such as "um," and speaker identifiers such as "new speaker," among others.

The ASR systems used by the transcription system 108 may be configured to operate in one or more locations. The locations may include the transcription system 108, the first device 104, the second device 106, another electronic computing device, or at an ASR service that is coupled to the transcription system 108 by way of the network 102. The ASR service may include a service that provides transcriptions of audio. Example ASR services include services provided by Google®, Microsoft®, and IBM®, among others.

In some embodiments, the ASR systems described in this disclosure may be separated into one of two categories: speaker-dependent ASR systems and speaker-independent ASR systems. In some embodiments, a speaker-dependent ASR system may use a speaker-dependent speech model. A speaker-dependent speech model may be specific to a particular person or a group of people. For example, a speaker-dependent ASR system configured to transcribe a communication session between the first user 110 and the second user 112 may include a speaker-dependent speech model that may be specifically trained using speech patterns for either or both the first user 110 and the second user 112.

In some embodiments, a speaker-independent ASR system may be trained on a speaker-independent speech model. A speaker-independent speech model may be trained for general speech and not specifically trained using speech patterns of the people for which the speech model is employed. For example, a speaker-independent ASR system configured to transcribe a communication session between the first user 110 and the second user 112 may include a speaker-independent speech model that may not be specifically trained using speech patterns for the first user 110 or the second user 112. In these and other embodiments, the speaker-independent speech model may be trained using speech patterns of users of the transcription system 108 other than the first user 110 and the second user 112.

In some embodiments, the audio used by the ASR systems may be revoiced audio. Revoiced audio may include audio that has been received by the transcription system 108 and gone through a revoicing process. The revoicing process may include the transcription system 108 obtaining audio from either one or both of the first device 104 and the second device 106. The audio may be broadcast by a captioning agent (CA) client for a captioning agent (CA) 118 associated with the transcription system 108. The CA client may broadcast or direct broadcasting of the audio using a speaker. The CA 118 listens to the broadcast audio and speaks the words that are included in the broadcast audio. The CA client may be configured to capture or direct capturing of the speech of the CA 118. For example, the CA client may use or direct use of a microphone to capture the speech of the CA 118 to generate revoiced audio.

The term "revoiced audio" as used in this disclosure may refer to audio generated as discussed above. In this disclosure, the use of the term audio generally may refer to both audio that results from a communication session between devices without revoicing and revoiced audio. In embodiments where a distinction is being made between audio without revoicing and revoiced audio, the audio without revoicing may be referred to as regular audio.

In some embodiments, revoiced audio may be provided to a speaker-independent ASR system. In these and other embodiments, the speaker-independent ASR system may not be specifically trained using speech patterns of the CA revoicing the audio. Alternatively or additionally, revoiced audio may be provided to a speaker-dependent ASR system. In these and other embodiments, the speaker-dependent ASR system may be specifically trained using speech patterns of the CA revoicing the audio.

In some embodiments, the transcription system 108 may include one or more transcription units, such as the transcription unit 114. In some embodiments, a transcription unit as used in this disclosure may be configured to obtain audio and to generate a transcription of the audio. In some embodiments, a transcription unit may include one or more ASR systems. In these and other embodiments, the one or more ASR systems may be speaker-independent, speaker-dependent, or some combination of speaker-independent and speaker-dependent. Alternatively or additionally, a transcription unit may include other systems that may be used in generating a transcription of audio. For example, the other systems may include a fuser, a text editor, a model trainer, diarizer, denormalizer, comparer, counter, adder, accuracy estimator, among other systems. Each of these systems is described later with respect to some embodiments in the present disclosure.

In some embodiments, a transcription unit may obtain revoiced audio from regular audio to generate a transcription. In these and other embodiments, when the transcription unit uses revoiced audio, the transcription unit may be referred to in this disclosure as a revoiced transcription unit. Alternatively or additionally, when the transcription unit does not use revoiced audio, the transcription unit may be referred to in this disclosure as a non-revoiced transcription unit. In some embodiments, a transcription unit may use a combination of audio and revoicing of the audio to generate a transcription. For example, a transcription unit may use regular audio, first revoiced audio from the first CA, and second revoiced audio from a second CA.

An example transcription unit may include the transcription unit 114. The transcription unit 114 may include a first ASR system 120a, a second ASR system 120b, and a third ASR system 120c. In general, the first ASR system 120a, the second ASR system 120b, and the third ASR system 120c may be referred to as ASR systems 120. The transcription unit 114 may further include a fuser 124 and a CA client 122. Alternatively or additionally, the transcription system 108 may include the CA client 122 and the transcription unit 114 may interface with the CA client 122.

In some embodiments, the CA client 122 may be configured to obtain revoiced audio from a CA 118. In these and other embodiments, the CA client 122 may be associated with the CA 118. The CA client 122 being associated with the CA 118 may indicate that the CA client 122 presents text and audio to the CA 118 and obtains input from the CA 118 through a user interface. In some embodiments, the CA client 122 may operate on a device that includes input and output devices for interacting with the CA 118, such as a CA workstation. Alternatively or additionally, the CA client 122 may be hosted on a server on a network and a device that includes input and output devices for interacting with the CA 118 may be a thin client networked with server that may be controlled by the CA client 122.

In some embodiments, the device associated with the CA client 122 may include any electronic device, such as a personal computer, laptop, tablet, mobile computing device, mobile phone, and a desktop, among other types of devices. In some embodiments, the device may include the transcription unit 114. For example, the device may include the hardware and/or software of the ASR systems 120, the CA client 122, and/or the fuser 124. Alternatively or additionally, the device may be separate from the transcription unit 114. In these and other embodiments, the transcription unit 114 may be hosted by a server that may also be configured to host the CA client 122. Alternatively or additionally, the CA client 122 may be part of the device and the remainder of the transcription unit 114 may be hosted by one or more servers. Thus, various configurations of the transcription unit 114 are possible and are contemplated outside of the configurations discussed above. Furthermore, a discussion of a transcription unit in this disclosure does not imply a certain physical configuration of the transcription unit. Rather, a transcription unit as used in this disclosure provides a simplified way to describe interactions between different systems that are configured to generate a transcription of audio. In short, a transcription unit as described may include any configuration of the systems described in this disclosure to accomplish the transcription of audio. The systems used in a transcription unit may be located, hosted, or otherwise configured across multiple devices, such as servers and other devices, in a network. Furthermore, the systems from one transcription unit may not be completely separated from systems from another transcription unit. Rather, systems may be shared across multiple transcription units.

In some embodiments, the transcription system 108 may obtain audio from the communication session between the first device 104 and the second device 106. In these and other embodiments, the transcription system 108 may provide the audio to the transcription unit 114. The transcription unit 114 may be configured to provide the audio to the CA client 122

In some embodiments, the CA client 122 may be configured to receive the audio from the transcription unit 114 and/or the transcription system 108. The CA client 122 may broadcast the audio for the CA 118 through a speaker. The CA 118 may listen to the audio and revoice or re-speak the words in the broadcast audio. In response to broadcasting the audio, the CA client 122 may use a microphone to capture the speech of the CA 118. The CA client 122 may generate revoiced audio using the captured speech of the CA 118. In some embodiments, the CA client 122 may provide the revoiced audio to one or more of the ASR systems 120 in the transcription unit 114.

In some embodiments, the first ASR system 120*a* may be configured to obtain the revoiced audio from the CA client 122. In these and other embodiments, the first ASR system 120*a* may also be configured as speaker-dependent with respect to the speech patterns of the CA 118. The first ASR system 120*a* may be speaker-dependent with respect to the speech patterns of the CA 118 by using models trained using the speech patterns of the CA 118. The models trained using the speech patterns of the CA 118 may be obtained from a CA profile of the CA 118. The CA profile may be obtained from the CA client 122 and/or from a storage device associated with the transcription unit 114 and/or the transcription system 108.

In these and other embodiments, the CA profile may include one or more ASR modules that may be trained with respect to the speaker profile of the CA 118. The speaker profile may include models or links to models such as acoustic models and feature transformation models such as neural networks or MLLR or fMLLR transforms. The models in the speaker profile may be trained using speech patterns of the CA 118.

In some embodiments, being speaker-dependent with respect to the CA 118 does not indicate that the first ASR system 120*a* cannot transcribe audio from other speakers. Rather, the first ASR system 120*a* being speaker-dependent with respect to the CA 118 may indicate that the first ASR system 120*a* may include models that are specifically trained using speech patterns of the CA 118 such that the first ASR system 120*a* may generate transcriptions of audio from the CA 118 with accuracy that may be improved as compared to the accuracy of transcription of audio from other people.

The second ASR system 120*b* and the third ASR system 120*c* may be speaker-independent. In some embodiments, the second ASR system 120*b* and the third ASR system 120*c* may include analogous or the same modules that may be trained using similar or the same speech patterns and/or methods. Alternatively or additionally, the second ASR system 120*b* and the third ASR system 120*c* may include different modules that may be trained using some or all different speech patterns. Additionally or alternatively, two or more ASR systems 120 may use substantially the same software or may have software modules in common, but use different ASR models.

In some embodiments, the second ASR system 120*b* may be configured to receive the revoiced audio from the CA client 122. The third ASR system 120*c* may be configured to receive the regular audio from the transcription unit 114.

The ASR systems 120 may be configured to generate transcriptions of the audio that each of the ASR systems 120 obtain. For example, the first ASR system 120*a* may be configured to generate a first transcription from the revoiced audio using the speaker-dependent configuration based on the CA profile. The second ASR system 120*b* may be configured to generate a second transcription from the revoiced audio using a speaker-independent configuration. The third ASR system 120*c* may be configured to generate a third transcription from the regular audio using a speaker-independent configuration. A discussion of how the ASR systems 120 may generate the transcriptions from the audio is provided later.

The first ASR system 120*a* may be configured to provide the first transcription to the fuser 124. The second ASR system 120*b* may be configured to provide the second transcription to a text editor 126 of the CA client 122. The third ASR system 120*c* may be configured to provide the third transcription to the fuser 124. In some embodiments, the fuser 124 may also provide a transcription to the text editor 126 of the CA client 122.

The text editor 126 may be configured to obtain transcriptions from the ASR systems 120 and/or the fuser. For example, the text editor 126 may obtain the transcription from the second ASR system 120*b*. The text editor 126 may be configured to obtain edits to a transcription.

For example, the text editor 126 may be configured to direct a display of a device associated with the CA client 122 to present a transcription for viewing by a person, such as the CA 118 or another CA, among others. The person may review the transcription and provide input through an input device regarding edits to the transcription.

In some embodiments, the person may also listen to the audio. For example, the person may be the CA 118. In these and other embodiments, the person may listen to the audio as the person re-speaks the words from the audio. Alternatively or additionally, the person may listen to the audio without re-speaking the words. In these and other embodiments, the person may have context of the communication session by listening to the audio and thus may be able to make better informed decisions regarding edits to the transcription.

In some embodiments, the text editor 126 may be configured to edit a transcription based on the input obtained from the person and provide the edited transcription to the fuser 124. Alternatively or additionally, the text editor 126 may be configured to provide an edited transcriptions to the transcription system 108 for providing to one or both of the first device 104 and the second device 106. Alternatively or additionally, the text editor 126 may be configured to provide the edits to the transcription unit 114 and/or the transcription system 108. In these and other embodiments, the transcription unit 114 and/or the transcription system 108 may be configured to generate the edited transcription and provide the edited transcription to the fuser 124.

In some embodiments, the transcription may not have been provided to one or both of the first device 104 and the second device 106 before the text editor 126 made edits to the transcription. Alternatively or additionally, the transcription may be provided to one or both of the first device 104 and the second device 106 before the text editor 126 is configured to edit the transcription. In these and other embodiments, the transcription system 108 may provide the edits or portions of the transcription with edits to one or both of the first device 104 and the second device 106 for updating the transcription on one or both of the first device 104 and the second device 106.

The fuser 124 may be configured to obtain multiple transcriptions. For example, the fuser 124 may obtain the first transcription, the second transcription, and the third transcription. The second transcription may be obtained from the text editor 126 after edits have been made to the second transcription or from the second ASR system 120b.

In some embodiments, the fuser 124 may be configured to combine multiple transcriptions into a single fused transcription. Embodiments discussed with respect to FIGS. 13-17 may utilize various methods in which the fuser 124 may operate. In some embodiments, the fuser 124 may provide the fused transcription to the transcription system 108 for providing to one or both of the first device 104 and the second device 106. Alternatively or additionally, the fuser 124 may provide the fused transcription to the text editor 126. In these and other embodiments, the text editor 126 may direct presentation of the fused transcription, obtain input, and make edits to the fused transcription based on the input.

An example of the operation of the environment 100 is now provided. A communication session between the first device 104 and the second device 106 may be established. As part of the communication session, audio may be obtained by the first device 104 that originates at the second device 106 based on voiced speech of the second user 112. The first device 104 may provide the audio to the transcription system 108 over the network 102.

The transcription system 108 may provide the audio to the transcription unit 114. The transcription unit 114 may provide the audio to the third ASR system 120c and the CA client 122. The CA client 122 may direct broadcasting of the audio to the CA 118 for revoicing of the audio. The CA client 122 may obtain revoiced audio from a microphone that captures the words spoken by the CA 118 that are included in the audio. The revoiced audio may be provided to the first ASR system 120a and the second ASR system 120b.

The first ASR system 120a may generate a first transcription based on the revoiced audio. The second ASR system 120b may generate a second transcription based on the revoiced audio. The third ASR system 120c may generate a third transcription based on the regular audio. The first ASR system 120a and the third ASR system 120c may provide the first and third transcriptions to the fuser 124. The second ASR system 120b may provide the second transcription to the text editor 126. The text editor 126 may direct presentation of the second transcription and obtain input regarding edits of the second transcription. The text editor 126 may provide the edited second transcription to the fuser 124.

The fuser 124 may combine the multiple transcriptions into a single fused transcription. The fused transcription may be provided to the transcription system 108 for providing to the first device 104. The first device 104 may be configured to present the fused transcription to the first user 110 to assist the first user 110 in understanding the audio of the communication session.

In some embodiments, the fuser 124 may also be configured to provide the fused transcription to the text editor 126. The text editor 126 may direct presentation of the transcription of the fused transcription to the CA 118. The CA 118 may provide edits to the fused transcription that are provided to the text editor 126. The edits to the fused transcription may be provided to the first device 104 for presentation by the first device 104.

As described, the generation of the fused transcription may occur in real-time or substantially real-time continually or mostly continually during the communication sessions. In these and other embodiments, in substantially real-time may include the fused transcription being presented by the first device 104 within one, two, three, five, ten, twenty, or some number of seconds after presentation of the audio by the first device 104 that corresponds to the fused transcription.

In some embodiments, transcriptions may be presented on a display of the first device 104 after the corresponding audio may be received from the second device 106 and broadcast by the first device 104, due to time required for revoicing, speech recognition, and other processing and transmission delays. In these and other embodiments, the broadcasting of the audio to the first user 110 may be delayed such that the audio is more closely synchronized with the transcription from the transcription system 108 of the audio. In other words, the audio of the communication session of the second user 112 may be delayed by an amount of time so that the audio is broadcast by the first user 110 at about the same time as, or at some particular amount of time (e.g., 1-2 seconds) before or after, a transcription of the audio is obtained by the first device 104 from the transcription system 108.

In some embodiments, the transcription may also be delayed at selected times to account for variations in latency between the audio and the transcription. In these and other embodiments, the first user 110 may have an option to choose a setting to turn off delay or to adjust delay to obtain a desired degree of latency between the audio heard by the first user 110 and the display of the transcription. In some embodiments, the delay may be constant and may be based on a setting associated with the first user 110. Additionally or alternatively, the delay may be determined from a combination of a setting and the estimated latency between audio heard by the first user 110 and the display of an associated transcription.

In some embodiments, the transcription unit 114 may be configured to determine latency by generating a data structure containing endpoints. An "endpoint," as used herein, may refer to the times of occurrence in the audio stream for the start and/or end of a word or phrase. In some cases, endpoints may mark the start and/or end of each phoneme or other sub-word unit. A delay time, or latency, may be determined by the transcription unit 114 by subtracting endpoint times in the audio stream for one or more words, as determined by an ASR system, from the times that the corresponding one or more words appear at the output of the transcription unit 114 or on the display of the first device 104.

The transcription unit 114 may also be configured to measure latency within the environment 100 such as average latency of a transcription service, average ASR latency, average CA latency, or average latency of various forms of the transcription unit 114 and may be incorporated into accuracy measurement systems such as described below with reference to FIGS. 44-57. Latency may be measured, for example, by comparing the time when words are presented in a transcription to the time when the corresponding words are spoken and may be averaged over multiple words in a transcription, either automatically, manually, or a combination of automatically and manually. In some embodiments, audio may be delayed so that the average time difference from the start of a word in the audio stream to the point where the corresponding word in the transcription is presented on the display associated with a user corresponds to the user's chosen setting.

In some embodiments, audio delay and transcription delay may be constant. Additionally or alternatively, audio delay and transcription delay may be variable and responsive to the audio signal and the time that portions of the transcription become available. For example, delays may be set so that words of the transcription appear on the screen at time periods that approximately overlap the time periods when the words are broadcast by the audio so that the first user 110 hears them. Synchronization between audio and transcriptions may be based on words or word strings such as a series of a select number of words or linguistic phrases, with words or word strings being presented on a display approximately simultaneously. The various audio vs. transcription delay and latency options described above may be fixed, configurable by a representative of the transcription system 108 such as an installer or customer care agent, or the options may be user configurable.

In some embodiments, latency or delay may be set automatically based on knowledge of the first user 110. For example, when the first user 110 is or appears to be lightly hearing impaired, latency may be reduced so that there is a relatively close synchronization between the audio that is broadcast and the presentation of a corresponding transcription. When the first user 110 is or appears to be severely hearing impaired, latency may be increased. Increasing latency may give the transcription system 108 additional time to generate the transcription. Additional time to generate the transcription may result in higher accuracy of the transcription. Alternatively or additionally, additional time to generate the transcription may result in fewer corrections of the transcription being provided to the first device 104. A user's level and type of hearing impairment may be based on a user profile or preference settings, medical record, account record, evidence from a camera that sees the first user 110 is diligently reading the text transcription, or based on analysis of the first user's voice or on analysis of the first user's conversations.

In some embodiments, an ASR system within the transcription system 108 may be configured for reduced latency or increased latency. In some embodiments, increasing the latency of an ASR system may increase the accuracy of the ASR system. Alternatively or additionally, decreasing the latency of the ASR system may decrease the accuracy of the ASR system.

For example, one or more of the ASR systems 120 in the transcription unit 114 may include different latencies. As a result, the ASR systems 120 may have different accuracies. For example, the first ASR system 120a may be speaker-dependent based on using the CA profile. Furthermore, the first ASR system 120a may use revoiced audio from the CA client 122. As a result, the first ASR system 120a may be determined, based on analytics or selection by a user or operator of the transcription system 108, to generate transcriptions that are more accurate than transcriptions generated by the other ASR systems 120. Alternatively or additionally, the first ASR system 120a may include configuration settings that may increase accuracy at the expense of increasing latency.

In some embodiments, the third ASR system 120c may generate a transcription faster than the first ASR system 120a and the second ASR system 120b. For example, the third ASR system 120c may generate the transcription based on the audio from the transcription system 108 and not the revoiced audio. Without the delay caused by the revoicing of the audio, the third ASR system 120c may generate a transcription in less time than the first ASR system 120a and the second ASR system 120b. Alternatively or additionally, the third ASR system 120c may include configuration settings that may decrease latency.

In these and other embodiments, the third transcription from the third ASR system 120c may be provided to the fuser 124 and the transcription system 108 for sending to the first device 104 for presentation. The first ASR system 120a and the second ASR system 120b may also be configured to provide the first transcription and the second transcription to the fuser 124.

In some embodiments, the fuser 124 may compare the third transcription with the combination of the first transcription and the second transcription. The fuser 124 may compare the third transcription with the combination of the first transcription and the second transcription while the third transcription is being presented by the first device 104.

Alternatively or additionally, the fuser 124 may compare the third transcription with each of the first transcription and the second transcription. Alternatively or additionally, the fuser 124 may compare the third transcription with the combination of the first transcription, the second transcription, and the third transcription. Alternatively or additionally, the fuser 124 may compare the third transcription with one of the first transcription and the second transcription. Alternatively or additionally, in these and other embodiments, the text editor 126 may be used to edit the first transcription, the second transcription, the combination of the first transcription, the second transcription, and/or the third transcription based on input from the CA 118 before being provided to the fuser 124.

Differences determined by the fuser 124 may be determined to be errors in the third transcription. Corrections of the errors may be provided to the first device 104 for correcting the third transcription being presented by the first device 104. Corrections may be marked in the presentation by the first device 104 in any manner of suitable methods including, but not limited to, highlighting, changing the font, or changing the brightness of the text that is replaced.

By generating the third transcription faster than other transcriptions and providing the third transcription to the first device 104 before fusing or corrections are determined for the third transcription, a transcription may be provided to the first device 104 quicker than in other embodiments. By providing the transcription quicker, the delay between the broadcast audio and the presentation of the corresponding transcription may be reduced. The comparison between the third transcription and one or more of the other transcriptions as described provides for corrections to be made of the third transcription such that a more accurate transcription may be presented.

Modifications, additions, or omissions may be made to the environment 100 and/or the components operating in the environment 100 without departing from the scope of the present disclosure. For example, in some embodiments, providing the transcriptions by the transcription system 108 may be described as a transcription service. In these and other embodiments, a person that receives the transcriptions through a device associated with the user, such as the first user 110, may be denoted as "a subscriber" of the transcription system 108 or a transcription service provided by the transcription system 108. In these and other embodiments, a person whose speech is transcribed, such as the second user 112, may be described as the person being transcribed. In these and other embodiments, the person whose speech is transcribed may be referred to as the "transcription party."

In these and other embodiments, the transcription system 108 may maintain a configuration service for devices associated with the transcription service provided by the transcription system 108. The configuration services may include configuration values, subscriber preferences, and subscriber information for each device. The subscriber information for each device may include mailing and billing address, email, contact lists, font size, time zone, spoken language, authorized transcription users, default to captioning on or off, a subscriber preference for transcription using an automatic speech recognition system or revoicing system, and a subscriber preference for the type of transcription service to use. The type of transcription service may include transcription only on a specific phone, across multiple devices, using a specific automatic speech recognition system, using a revoicing systems, a free version of the service, and a paid version of the service, among others.

In some embodiments, the configuration service may be configured to allow the subscriber to create, examine, update, delete, or otherwise maintain a voiceprint. In some embodiments, the configuration service may include a business server, a user profile system, and a subscriber management system. The configuration service may store information on the individual devices or on a server in the transcription system 108.

In some embodiments, subscribers may access the information associated with the configuration services for their account with the transcription system 108. In these and other embodiments, a subscriber may access the information via a device, such as a transcription phone, a smartphone or tablet, by phone, through a web portal, etc. In these and other embodiments, accessing information associated with the configuration services for their account may allow a subscriber to modify configurations and settings for the device associated with their account from a remote location. In these and other embodiments, customer or technical support of the transcription service may have access to devices of the subscribers to provide technical or service assistance to customers when needed. Additionally or alternatively, an image management service (not shown) may provide storage for images that the subscriber wishes to display on their associated device. An image may, for example, be assigned to a specific contact, so that when that contact name is displayed or during a communication session with the contact, the image may be displayed. Images may be used to provide customization to the look and feel of a user interface of a device or to provide a slideshow functionality. The image management service may include an image management server and an image file server.

As another example, in some embodiments, the transcription system 108 may provide transcriptions for both sides of a communication session to one or both of the first device 104 and the second device 106. For example, the first device 104 may receive transcriptions of both the first audio and the second audio. In these and other embodiments, the first device 104 may present the transcriptions of the first audio in-line with the transcriptions from the second audio. In these and other embodiments, each transcription may be tagged, in separate screen fields, or on separate screens to distinguish between the transcriptions.

Throughout the disclosure, various embodiments may discuss one device receiving a transcription for clarity. However, unless noted otherwise, where the disclosure discusses a device receiving a transcription it is to be understood that multiple devices may receive the transcription. Alternatively or additionally, where the disclosure discusses a device receiving a transcription of audio from another device it is to be understood that the other device may receive a transcription of the audio from the device. In these and other embodiments, timing messages may be sent between the transcription system 108 and either the first device 104 or the second device 106 so that transcriptions may be presented substantially at the same time on both the first device 104 and the second device 106. Alternatively or additionally, the transcription system 108 may provide a summary of one or both sides of the conversation to one or both parties. In these and other embodiments, a device providing audio for transcription may include an interface that allows a user to modify the transcription. For example, the second device 106 may display transcriptions of audio from the second user 112 and may enable the second user 112 to provide input to the second device 106 to correct errors in the transcriptions of audio from the second user 112. The corrections in the transcriptions of audio from the second user 112 may be presented on the first device 104. Alternatively or additionally, the corrections in the transcriptions of audio from the second user 112 may be used for training an ASR system.

As other examples, the first device 104 and/or the second device 106 may include modifications, additions, or omissions. For example, in some embodiments, transcriptions may be transmitted to either one or both of the first device 104 and the second device 106 in any format suitable for either one or both of the first device 104 and the second device 106 or any other device to present the transcriptions. For example, formatting may include breaking transcriptions into groups of words to be presented substantially simultaneously, embedding XML tags, setting font types and sizes, indicating whether the transcriptions are generated via automatic speech recognition systems or revoicing systems, and marking initial transcriptions in a first style and corrections to the initial transcriptions in a second style, among others.

In some embodiments, the first device 104 may be configured to receive input from the first user 110 related to various options available to the first user 110. For example, the first device 104 may be configured to provide the options to the first user 110 including turning transcriptions on or off. Transcriptions may be turned on or off using selection methods such as: phone buttons, screen taps, soft keys (buttons next to and labeled by the screen), voice commands, sign language, smartphone apps, tablet apps, phone calls to a customer care agent to update a profile corresponding to the first user 110, and touch-tone commands to an IVR system, among others.

In some embodiments, the first device 104 may be configured to obtain and/or present an indication of whether the audio from the communication session is being revoiced by a CA. In these and other embodiments, information regarding the CA may be presented by the first device 104. The information may include an identifier and/or location of the CA. Alternatively or additionally, the first device 104 may also present details regarding the ASR system being used. These details may include, but are not limited to the ASR system's vendor, cost, historical accuracy, and estimated current accuracy, among others.

In some embodiments, either one or both of the first device 104 and the second device 106 may be configured with different capabilities for helping users with various disabilities and impairments. For example, the first device 104 may be provided with tactile feedback by haptic controls such as buttons that vibrate or generate force feedback. Screen prompts and transcription may be audibly provided by the first device 104 using text-to-speech or recorded prompts. The recorded prompts may be sufficiently slow and clear to allow some people to understand the prompts when the people may not understand fast, slurred, noisy, accented, distorted, or other types of less than ideal audio during a communication session. In some embodiments, transcriptions may be delivered on a braille display or terminal. The first device 104 may use sensors that detect when pins on a braille terminal are touched to indicate to the second device 106 the point in the transcription where the first user 110 is reading. As another example, the first device 104 may be controlled by voice commands. Voice commands may be useful for mobility impaired users among other users.

In some embodiments, either one or both of the first device 104 and the second device 106 may be configured to present information related to a communication session between the first device 104 and the second device 106. The information related to a communication session may include: presence of SIT (special information tones), communication session progress tones (e.g. call forwarding, call transfer, forward to voicemail, dial tone, call waiting, comfort noise, conference call add/drop and other status tones, network congestion (e.g. ATB), disconnect, three-way calling start/end, on-hold, reorder, busy, ringing, stutter dial tone (e.g. voicemail alert), record tone (e.g. recording alert beeps), etc.), flash hook, on-hold music, an indicator of when another party answers or disconnects, the number of calling devices connected to a conference call, an indicator of whether the other party is speaking or silent, and messages relating to the presence, nature of, and identity of non-speech sounds. Non-speech sounds may include noise, dog barks, crying, sneezing, sniffing, laughing, thumps, wind, microphone pops, car sounds, traffic, multiple people talking, clatter from dishes, sirens, doors opening and closing, music, background noise consistent with a specified communication network such as the telephone network in a specified region or country, a long-distance network, a type of wireless phone service, etc.

In some embodiments, either one or both of the first device 104 and the second device 106 may be configured to present an indication of a quality of a transcription being presented. The quality of the transcription may include an accuracy percentage. In these and other embodiments, either one or both of the first device 104 and the second device 106 may be configured to present an indication of the intelligibility of the speech being transcribed so that an associated user may determine if the speech is of a quality that can be accurately transcribed. Additionally or alternatively, either one or both of the first device 104 and the second device 106 may also present information related to the sound of the voice such as tone (shouting, whispering), gender (male/female), age (elderly, child), audio channel quality (muffled, echoes, static or other noise, distorted), emotion (excited, angry, sad, happy), pace (fast/slow, pause lengths, rushed), speaker clarity, impairments or dysfluencies (stuttering, slurring, partial or incomplete words), spoken language or accent, volume (loud, quiet, distant), and indicators such as two people speaking at once, singing, nonsense words, and vocalizations such as clicks, puffs of air, expressions such as "aargh," buzzing lips, etc.

In some embodiments, during or at the end of a communication session, either one or both of the first device 104 and the second device 106 may present an invitation for the associated user to provide reviews on topics such as the quality of service, accuracy, latency, settings desired for future communication sessions, willingness to pay, and usefulness. In these and other embodiments, with respect to the first device 104, the first device 104 may collect the user's feedback or direct the user to a website or phone number. The first device 104 may be configured to receive input from the first user 110 such that the first user 110 may mark words that were transcribed incorrectly, advise the system of terms such as names that are frequently misrecognized or misspelled, and input corrections to transcriptions, among other input from the first user 110. In these and other embodiments, user feedback may be used to improve accuracy, such as by correcting errors in data used to train or adapt models, correcting word pronunciation, and in correcting spelling for homonyms such as names that may have various spellings, among others.

In some embodiments, either one or both of the first device 104 and the second device 106 may be configured to display a selected message before, during, or after transcriptions are received from the transcription system 108. For example, the display showing transcriptions may start or end the display of transcriptions with a copyright notice that pertains to the transcription of the audio, such as "Copyright <year> <owner>," where "<year>" is set to the current year and <owner> is set to the name of the copyright owner.

In some embodiments, either one or both of the first device 104 and the second device 106 may be configured to send or receive text messages during a communication session with each other, such as instant message, real-time text (RTT), chatting, or texting over short message services or multimedia message services using voice, keyboard, links to a text-enabled phone, smartphone or tablet, or via other input modes. In these and other embodiments, either one or both of the first device 104 and the second device 106 may be configured to have the messages displayed on a screen or read using text-to-speech. Additionally or alternatively, either one or both of the first device 104 and the second device 106 may be configured to send or receive text messages to and/or from other communication devices and to and/or from parties outside of a current communication. Additionally or alternatively, either one or both of the first device 104 and the second device 106 may be configured to provide features such as voicemail, voicemail transcription, speed dial, name dialing, redial, incoming or outgoing communication session history, and callback, among other features that may be used for communication sessions.

In some embodiments, transcriptions may be presented on devices other than either one or both of the first device 104 and the second device 106. In these and other embodiments, a separate device may be configured to communicate with the first device 104 and receive the transcriptions from the first device 104 or directly from the transcription system 108. For example, if the first device 104 includes a cordless handset or a speakerphone feature, the first user 110 may carry the cordless handset to another location and still view transcriptions on a personal computer, tablet, smartphone, cell phone, projector, or any electronic device with a screen capable of obtaining and presenting the transcriptions. Additionally or alternatively, this separate display may incorporate voice functions so as to be configured to allow a user to control the transcriptions as described in this disclosure.

In some embodiments, the first device 104 may be configured to control the transcriptions displayed on a separate device. For example, the first device 104 may include control capabilities including, capability to select preferences, turn captioning on/off, and select between automatic speech recognition systems or revoicing systems for transcription generation, among other features.

As another example, the transcription unit 114 may include modifications, additions, or omissions. For example, in some embodiments, the transcription unit 114 may utilize additional ASR systems. For example, the transcription unit 114 may provide audio, either revoiced or otherwise, to a fourth ASR system outside of the transcription system 108 and/or to an ASR service. In these and other embodiments, the transcription unit 114 may obtain the transcriptions from the fourth ASR system and/or the ASR service. The transcription unit 114 may provide the transcriptions to the fuser 124.

In some embodiments, a fourth ASR system may be operating on a device coupled to the transcription system 108 through the network 102 and/or one of the other first device 104 and the second device 106. Alternatively or additionally, the fourth ASR system may be included in the first device 104 and/or the second device 106.

As another example, the transcription unit 114 may not include the one or more of the fuser 124, the text editor 126, the first ASR system 120a, the second ASR system 120b, and the third ASR system 120c. For example, in some embodiments, the transcription unit 114 may include the first ASR system 120a, the third ASR system 120c, and the fuser 124. Additional configurations of the transcription unit 114 are briefly enumerated here in Table 1, and described in greater detail below.

TABLE 1

1. A CA client. This arrangement may include an ASR system 120 transcribing audio that is revoiced by a CA. The ASR system 120 may be adapted to one or more voices. For example, the ASR system 120 may be adapted to the CA's voice, trained on multiple communication session voices, or trained on multiple CA voices. (see FIG. 9).
2. One or more CA clients. The CA clients may be arranged in series (e.g., FIG. 50) or in parallel (e.g., FIG. 52). A fuser 124 may create a consensus transcription.
3. A CA client associated with a CA with special skills, such as a particular spoken language, knowledge of one or more topics, or advanced experience in captioning (i.e., a CA manager or supervisor).
4. An ASR system 120 receiving communication session audio. The ASR system may run on a variety of devices at various locations. For example, the ASR system 120 may run in one or more of several configurations, including with various models and parameter settings and configurations supporting one or more of various spoken languages. In some embodiments, the ASR system 120 may be an ASR system provided by any of various vendors, each with a different cost, accuracy for different types of input, and overall accuracy. Additionally or alternatively, multiple ASR systems 120 may be fused together using a fuser.
5. One or more ASR systems 120 whose output is corrected through a text editor of a CA client (see FIG. 31).
6. One or more ASR systems 120 operating in parallel with one or more CA clients, the output being fused to generate a transcription (see FIGs. 32a and 32b). One or more of the ASR systems 120 may be configured to transcribe communication session audio, and one or more ASR systems 120 may transcribe revoiced audio.
7. Multiple clusters of one or more ASR systems 120, and a selector configured to select a cluster based on load capacity, cost, response time, spoken language, availability of the clusters, etc.
8. A revoiced ASR system 120 supervised by a non-revoiced ASR system 120 configured as an accuracy monitor. The accuracy monitor may report a potential error in real time so that a CA may correct the error. Additionally or alternatively, the accuracy monitor may correct the error (see FIG. 45).
9. A CA client generating a transcription via an input device (e.g., keyboard, mouse, touch screen, stenotype, etc.). A CA 118 through the CA client may use a stenotype in some embodiments requiring a higher-accuracy transcription.
10. Various combinations of items in this table at various times during the course of a communication session. For example, a first portion of the communication session may be transcribed by a first configuration such as an ASR system 120 with a CA client correcting errors, and a second portion of the communication session may be transcribed by a second configuration such as an ASR system 120 using revoiced audio and an ASR system 120 using regular audio working in parallel and with fused outputs.
11. A repeated communication session detector. The repeated communication session detector may include an ASR system 120 and a memory storage device and may be configured to detect an input sample, such as a recorded audio sample, that has been previously received by the captioning system. The detection process may include matching audio samples, video samples, spectrograms, phone numbers, and/or transcribed text between the current communication session and one or more previous communication sessions or portions of communication sessions. The detection process may further use a confidence score or accuracy estimate from an ASR system. The detection process may further use phone numbers or other device identifiers of one or more communication session parties to guide the process of matching and of searching for previous matching samples. For example, a phone number known to connect to an IVR system may prompt the detection process to look for familiar audio patterns belonging to the IVR system prompts. Once a matching previous communication session or portion of a previous communication session has been detected, a transcription or a portion of a transcription of the previous communication session may be used as a candidate transcription of the current communication session. In some embodiments, the candidate transcription may be used to caption at least part of the current communication session. The ASR system 120 may be used to confirm that the candidate transcription continues to match the audio of the current communication session. The ASR system 120 may use a grammar derived from the candidate transcription or previous communication session as a language model. If the match fails, a different configuration for the transcription unit 114 may be used to generate a transcription of the communication session. In another embodiment, the candidate transcription may be provided as an input hypothesis to a fuser such as the fuser 124 described in FIG. 1.
12. Offline transcription, where communication session audio is stored and transcribed after the communication session ends.

In some embodiments, the first device 104 and/or the transcription system 108 may determine which ASR system 120 in the transcription unit 114 may be used to generate a transcription to send to the first device 104. Alternatively or additionally, the first device 104 and/or the transcription system 108 may determine whether revoiced audio may be used to determine the transcriptions. In some embodiments, the first device 104 and/or the transcription system 108 may determine which ASR system 120 to use or whether to use revoiced audio based on input from the first user 110, preferences of the first user 110, an account type of the first user 110 with respect to the transcription system 108, input from the CA 118, or a type of the communication session, among other criteria. In some embodiments, the first user 110 preferences may be set prior to the communication session. In some embodiments, the first user may indicate a preference for which ASR system 120 to use and may change the preference during a communication session.

As another example, the transcription system 108 may include modifications, additions, or omissions. For example, the transcription system 108 may include multiple transcription units, such as the transcription unit 114. Each or some number of the multiple transcription units may include different configurations as discussed above. In some embodiments, the transcription units may share ASR systems and/or ASR resources. For example, the third ASR system 120*c* or ASR services may be shared among multiple different ASR systems. In these and other embodiments, the transcription system 108 may be configured to select among the transcription units 114 when audio of a communication session is received for transcription.

In some embodiments, the selection of a transcription unit may depend on availability of the transcription units. For example, in response to ASR resources for one or more transcription units being unavailable, the audio may be directed to a different transcription unit that is available. In some embodiments, ASR resources may be unavailable, for example, when the transcription unit relies on ASR services to obtain a transcription of the audio.

In response to multiple transcription units having varying available resources, audio may be directed to one or more of the transcription units using allocation rules such as (a) allocating audio to resources based on the capacity of each resource, (b) directing audio to one or more transcription unit resources in priority order, for example by directing to a first resource until the first resource is at capacity or unavailable, then to a second resource, and so on, (c) directing communication sessions to various transcription units based on performance criteria such as accuracy, latency, and reliability, (d) allocating communication sessions to various transcription units based on cost (see #12, #19-21, and #24-29 in Table 2), (e) allocating communication sessions based on contractual agreement, such as with service providers, (f) allocating communication sessions based on distance or latency (see #40 in Table 2), and (g) allocating communication sessions based on observed failures such as error messages, incomplete transcriptions, loss of network connection, API problems, and unexpected behavior. The above rules may also be applied to selecting between resources within a single transcription unit.

In some embodiments, an audio sample may be sent to multiple transcription units and the resulting transcriptions generated by the transcription units may be combined, such as via fusion. Alternatively or additionally, one of the resulting transcriptions from one of the transcription units may be selected to be provided to the first device 104. The transcriptions may be selected based on the speed of generating the transcription, cost, estimated accuracy, and an analysis of the transcriptions, among others.

Figure 2:
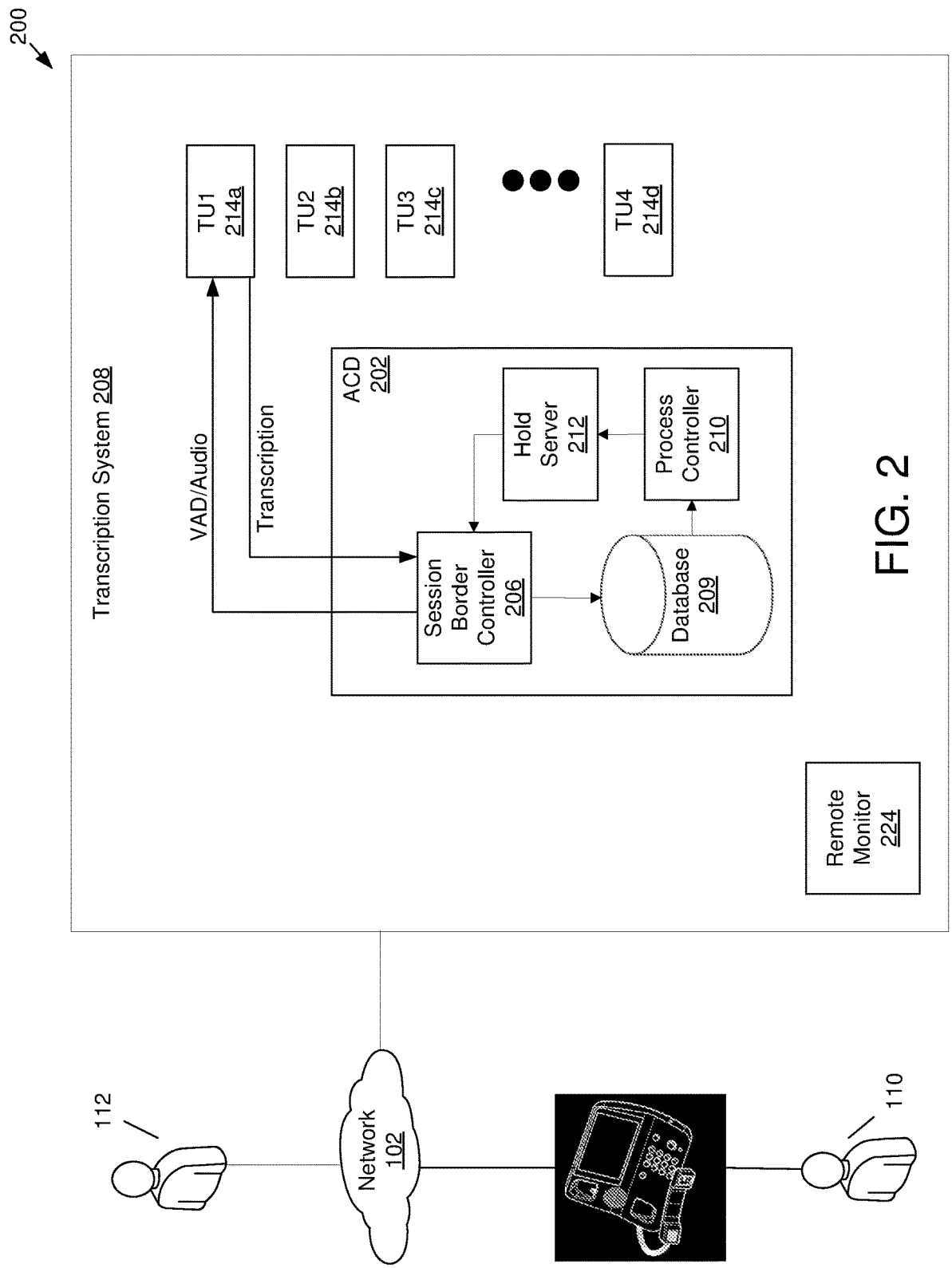
FIG. 2 illustrates another example environment for transcription of communications.

FIG. 2 illustrates another example environment 200 for transcription of communications. The environment 200 may include the network 102, the first device 104, and the second device 106 of FIG. 1. The environment 200 may also include a transcription system 208. The transcription system 208 may be configured in a similar manner as the transcription system 108 of FIG. 1. However, the transcription system 208 of FIG. 2 may include additional details regarding the transcription system 208 and connecting the first device 104 with an available transcription unit 214.

The transcription system 208 may include an automatic communication session distributor (ACD) 202. The ACD 202 may include a session border controller 206, a database 209, a process controller 210, and a hold server 212. The transcription system 208 may further include multiple transcription units 214, including a first transcription unit (TU1) 214*a*, a second transcription unit (TU2) 214*b*, a third transcription unit TU3 214*c*, and a fourth transcription unit TU4 214*d*. Each of the transcription units 214 may be configured in a manner as described with respect to the transcription unit 114 of FIG. 1. In some embodiments, the transcription units 214 may be located in the same or different locations. Alternatively or additionally, the CAs associated with CA clients of one or more of the transcription units 214 may be located in the same or different locations than the transcription units 214. Alternatively or additionally, the CAs associated with CA clients of one or more of the transcription units 214 may be in the same or different locations. In general, the ACD 202 may be configured to select one of the transcription units 214 for generating a transcription of audio provided by the first device 104.

In some embodiments, the first device 104 is configured to communicate with an ACD 202 over the network 102 and request a transcription of audio. After establishing communication with the ACD 202, the first device 104 is configured to register with the session border controller 206. The session border controller 206 may record the registration in a user queue in the database 209. Generally, the use of the term database may refer to any storage device and not a device with any particular structure or interface.

Transcription units 214 that are also available to generate transcriptions may be registered with the session border controller 206. For example, after a transcription unit 214 stops receiving audio at the termination of a communication session, the transcription unit 214 may provide an indication of availability to the session border controller 206. The session border controller 206 may record the available transcription units 214 in an idle unit queue in the database 209.

In some embodiments, the process controller 210 may be configured to select an available transcription unit 214 from the idle unit queue to generate transcriptions for audio from a device in the user queue. As described above, each transcription unit 214 may be configured to generate transcriptions using regular audio, revoiced audio, or some combination of regular audio and revoiced audio using speaker-dependent, speaker-independent, or a combination of speaker-dependent and independent ASR systems. In these and other embodiments, the transcription system 208 may include transcription units 214 with multiple different configurations. For example, each of the transcription units 214*a*-214*n* may have a different configuration. Alternatively or additionally, some of the transcription units 214 may have the same configuration. Alternatively or additionally, the transcription units 214 may be differentiated based on a CA associated with the transcription unit 214 that may assist in generating the revoiced audio for the transcription unit 214. Thus, a configuration of a transcription unit 214 may be determined based on the CA associated with the transcription unit 214.

The process controller 210 may be configured to select a transcription unit based on:
a) ability of CA associated with the transcription unit (e.g., the fastest and most accurate available CA may be assigned first);
b) idle time of CA associated with the transcription unit (e.g., CAs with the longest idle time may be used first);
c) availability of CA associated with the transcription unit (e.g., transcription requests may be prioritized to transcription units using revoiced audio over transcription units using regular audio as long as there are transcription units using revoiced audio available, leaving aside a small pool of transcription units using revoiced audio for emergency communication sessions, otherwise communication sessions may be directed over to transcription units using regular audio); and d) priority (e.g., high-priority and emergency communication sessions, see item 76 of Table 5, may go to a transcription unit using revoiced audio while low-priority voicemail messages may be directed to a transcription unit using regular audio).

A method implementing a selection process is described below in greater detail with reference to FIG. 3. After the process controller 210 selects transcription unit 214 for a transcription request, the registration may be removed from the user queue and the transcription unit 214 may be removed from the idle unit queue in the database 209. In some embodiments, a hold server 212 may be configured to redirect the transcription request to the selected transcription unit 214. In some embodiments, the redirect may include a session initiation protocol ("SIP") redirect signal. After the transcription unit 214 completes transcription of the audio or is directed to stop transcription of the audio, the transcription unit 214 may be registered by the session border controller 206 in the idle unit queue of the database 209.

As discussed, selection of a transcription unit 214 may be based on an ability of a CA associated with the transcription unit 214. In some embodiments, profiles of CAs may be maintained in the database 209 that track certain metrics related to the performance of a CA to revoice audio and/or make corrections to transcriptions generated by an ASR system. For example, each profile may include one or more of: levels of multiple skills such as speed, accuracy, an ability to revoice communication sessions in noise or in other adverse acoustic environments such as signal dropouts or distortion, proficiency with specific accents or languages, skill or experience revoicing speech from speakers with various types of speech impairments, skill in revoicing speech from children, an ability to keep up with fast talkers, proficiency in speech associated with specific terms such as medicine, insurance, banking, or law, the ability to understand a particular speaker or class of speakers such as a particular speaker demographic, and skill in revoicing conversations related to a detected or predicted topic or topics of the current communication session, among others. In some embodiments, each profile may include a rating with respect to each skill.

In some embodiments, the ACD 202 may be configured to automatically analyze a transcription request to determine whether a particular skill may be advantageous. If a communication session appears likely to benefit from a CA with a particular skill, the saved CA skill ratings in the CA profiles may be used in selecting a transcription unit to receive the communication session. Additionally or alternatively, when a CA is revoicing or is about to revoice a communication session, the CA's skill ratings, combined with other factors such as estimated difficulty in transcribing a user, transcribing a CA, predicted ASR system accuracy for the speaker which may be based on or include previous ASR system accuracy for the speaker, and the CA's estimated performance (including accuracy, latency, and other measures) on the current communication session, may be used to estimate the performance of the transcription unit on the remainder of the communication session. The estimated performance may be used by the ACD 202 to determine whether to change the transcription arrangement, such as to keep the transcription unit on the communication session or transfer to another transcription unit, which may or may not rely totally on revoiced audio.

In some embodiments, the process controller 210 may be configured to select an available transcription unit 214 from the idle unit queue to generate transcriptions for audio from a device in the user queue. A transcription unit may be selected based on projected performances of the transcription unit for the audio of the device. The projected performance of a transcription unit may be based on the configuration of the transcription unit and the abilities of a CA associated with the transcription unit.

In some embodiments, the transcription units in the idle unit queue may be revoiced transcription units or non-revoiced transcription units. The revoiced transcription units may each be associated with a different CA. In some embodiments, the CA may be selected to be associated with a particular revoiced transcription unit based on the abilities of the CA. Alternatively or additionally, a revoiced transcription unit may be created with a particular configuration based on the abilities of the CA. In these and other embodiments, when a revoiced transcription unit associated with a CA is not selected, the associated CA may be assigned or returned to a pool of available CAs and may subsequently be assigned to work on another communication session. The revoiced transcription units may include speaker-independent ASR systems and/or speaker-dependent ASR systems that are configured based on the speech patterns of the CAs associated with the revoiced transcription units.

For example, a CA that revoices audio that results in a transcription with a relatively high accuracy rating may revoice audio for a transcription unit 214 configuration without an additional ASR system. In contrast, revoiced audio from a CA with a relatively low accuracy rating may be used in a transcription unit with multiple ASR systems, the transcriptions of which may be fused together (see FIGS. 34-37) to help to increase accuracy. In these and other embodiments, the configuration of a transcription unit associated with a CA may be based on the CA's accuracy rating. For example, a CA with a higher accuracy rating may be associated with transcription units or a transcription unit configuration that has a lower number of ASR systems. A CA with a lower accuracy rating may be associated with transcription units or a transcription unit configuration that has a higher number of ASR systems. Thus, when a CA is available, a transcription unit may be used and associated with the CA based on the abilities of the CA.

As another example, transcription units with different configurations may be created based on the predicted type of subscribers that may be using the service. For example, transcription units with configurations that are determined to better handle business calls may be used during the day and transcription units with configurations that are determined to better handle personal calls may be used during the evening.

In some embodiments, the transcription units may be implemented by software configured on virtual machines, for example in a cloud framework. In these and other embodiments, the transcription units may provision or de-provision as needed. In some embodiments, revoicing transcription units may be provisioned when a CA is available and not associated with a transcription unit. For example, when a CA with a particular ability is available, a transcription unit with a configuration suited for the abilities of the CA may be provisioned. When the CA is no longer available, such as at the end of working-shift, the transcription unit may be de-provisioned. Non-revoicing transcription units may be provisioned based on demand or other needs of the transcription system 208.

In some embodiments, it may take time after a resource or instance is provisioned before it is available to transcribe communication sessions and to be placed in the idle unit queue. In these and other embodiments, transcription units may be provisioned in advance, based on projected need. In particular, the non-revoiced transcription units may be provisioned in advance based on projected need.

The ACD 202 or other device may manage the number of transcription units provisioned or de-provisioned. In these and other embodiments, the ACD 202 may provision or de-provision transcription units based on the available transcription units compared to the current or projected traffic load, the number of currently provisioned transcription units compared to the number of transcription units actively transcribing audio from a communication session, traffic load, or other operations metrics (see Table 2 for a non-exhaustive list of potential operations metrics or features).

TABLE 2

1. Current peak communication session traffic load.
2. Current average communication session traffic load.
3. Previous or projected peak traffic load or a statistic such as the peak load projected for a period of time such as the next m minutes (for example, 10 minutes).
4. Previous or projected average traffic load or a statistic such as the average load over a period of time such as the previous m minutes.
5. The number of revoiced transcription units projected to be available and an estimate for when they will be available. The projection may be based on information from a scheduling system that tracks anticipated sign-on and sign-off times for individual CAs. Additionally or alternatively, the projection may be based on current revoiced transcription unit availability.
6. Projected excess revoiced transcription unit capacity over a given period of time.
7. The current number or percentage of idle or available revoiced transcription units. The system may, for example be configured to (a) use the available revoiced transcription unit number as a feature in selecting between a non-revoiced transcription unit or a revoiced transcription unit or (b) send all communication sessions to revoiced transcription units when there are at least some (plus a few extra to handle higher-priority communication sessions) revoiced transcription units available.
8. The number of idle or available revoiced transcription units, averaged over a preceding period of time.
9. The minimum number of idle revoiced transcription units that should, according to operations policies, be available to handle contingencies such as traffic spikes.
10. The average or longest revoiced transcription unit idle time.
11. The number of available ASR systems or ASR ports. Where multiple clusters of ASR system, such as groups of ASR system from different vendors, are configured, the number of available ASR systems in each cluster may also be features. If a system failure such as loss of connectivity or other outage affects the number of ASR systems available in a given cluster, the failure may be considered in determining availability. These features may be used, for example, in determining which cluster to use for transcribing a given communication session.
12. The number of ASR systems or ASR ports, in addition to those currently provisioned, that could be provisioned, the cost of provisioning, and the amount of time required for provisioning.
13. The skill level of available CAs. This feature may be used to take CA skill levels into account when deciding whether to use a revoiced transcription unit for a given communication session. The skill level may be used, for example, to preferentially send communication sessions to revoiced transcription units associated with CAs with stronger or weaker specific skills, skills relevant to the current communication session such as spoken language, experience transcribing speakers with impaired speech, location, or topic familiarity, relatively higher or lower performance scores, more or less seniority, or more or less experience. A CA may be assigned to a group of one or more CAs based, for example, on a characteristic relevant to CA skill such as spoken language skill, nationality, location, the location of the CA's communication session center, measures of performance such as transcription accuracy, etc. The CA's skill and/or group may be used as a feature by, for example,
    a. Sending a communication session to a first group when a CA in the first group is available and to a second group when a CA from the first group is not available.
    b. Selecting a transcription unit configuration (such as a configuration from Table 1) based on the CA's skill or group. For example, a CA with lesser skills or a lower performance record may be used in a configuration where an ASR system provides a relatively greater degree of assistance, compared to a CA with a greater skill or performance history. In one scenario, a transcription resulting from a revoicing of a poor CA may be fused with transcriptions from one or more ASR systems whereas a transcription from a better CA may be used without fusion or fused with transcriptions from relatively fewer or inferior ASR systems.
14. The number of available revoiced transcription units skilled in each spoken language.
15. The average error rate of a revoiced transcription unit pool or group, such as the pool of available revoiced transcription units or a group of revoiced transcription units testing within a selected performance range.
16. The average latency and error rate across multiple revoiced transcription units.
17. Projected revoiced transcription unit error rate.
18. The estimated or projected accuracy of a revoiced transcription unit on the current communication session.
19. The cost of an ASR system, such as cost per second or per minute. Multiple ASR resources may be available, in which case, this feature may be the cost of each speech recognition resource.
20. The average accuracy, latency, and other performance characteristics of each ASR resource. A resource may include ASR on the captioned phone, an ASR server, and ASR cluster, or one or more ASR vendors.
21. In an arrangement including multiple clusters of ASR systems, the load capacity, response time, accuracy, cost, and availability of each cluster.
22. The average accuracy of the captioning service, which may take into account revoicing accuracy and ASR accuracy at its current automation rate.
23. The availability such as online status and capacity of various ASR resources. This feature may be used, for example, in routing traffic away from resources that are offline and toward resources that are operational and with adequate capacity. For example, if the captioning service is sending audio to a first ASR vendor or resource for transcription and the first vendor or resource becomes unavailable, the service may send audio to a second ASR vendor or resource for transcription.
24. The cost of a revoiced transcription unit, such as cost per second or per minute. If revoiced transcription units have various allocated costs, this cost may be a function or statistic of a revoiced transcription unit's cost structure such as the cost of the least expensive available revoiced transcription unit.

TABLE 2-continued

25. The cost of adding revoiced transcription units to the transcription unit pool. This cost may include a proxy, or allocated cost, for adding non-standard revoiced transcription units such as CA managers, trainers, and QA personnel.
26. The estimated cost of a revoiced transcription unit for the current communication session or the remainder of the current communication session. This cost may be responsive to the average revoiced transcription unit cost per unit time and the expected length of the current communication session.
27. The estimated cost of an ASR system for the current communication session or the remainder of the current communication session. This cost may be responsive to the average ASR cost per unit time and the expected length of the current communication session.
28. The estimated cost of the current communication session.
29. The cost of captioning communication sessions currently or averaged over a selected time period.
30. Estimated communication session length. This feature may be based, for example, on average communication session length of multiple previous communication sessions across multiple subscribers and captioned parties. The feature may be based on historical communication session lengths averaged across previous communication sessions with the current subscriber and/or the current transcription party.
31. The potential savings of removing revoiced transcription units from the revoiced transcription unit pool.
32. The time required to add a revoiced transcription unit.
33. The time required to provision an ASR resource.
34. The current automation rate, which may be determined as a fraction or percentage of communication sessions connected to ASR rather than CAs, compared to the total number of communication sessions. Additionally or alternatively, the automation rate may be the number of ASR sessions divided by the number of CA sessions.
35. A business parameter responsive to the effective or allocated cost of a transcription error.
36. A level of indicated urgency to reduce costs.
37. A level of indicated importance to improve service quality.
38. Business objectives, including global metrics, such as the business objectives in Table 11.
39. The state of a network connecting a captioned phone to a revoiced transcription unit or to an ASR system. The state may include indicators for network problems such as lost network connection, missing packets, connection stability, network bandwidth, latency, WiFi performance at the captioned phone site, and dropouts. This feature may, for example, be used by a captioned phone or captioning service to run ASR in the network when the connection is good and run ASR on the captioned phone or other local hardware when the phone or service detects network problems.
40. The estimated distance or latency of a revoiced transcription unit from the captioned phone or from the transcription system. One possible use of this feature is to select from among various ASR vendors, ASR sites, or CA sites based on the expected round-trip delay in obtaining a transcription from an audio file. For example, if there are multiple transcription unit sites, a transcription unit site may be selected based on its geographical distance, the distance a signal must travel to and from the site, or the expected time required for a signal to traverse a data network to and from the site. In some embodiments, the transcription unit site closest to the captioned phone may be selected.
41. The degree of dialect or accent similarity between the transcription party and the transcription unit site. For example, a transcription unit site may be selected based on how similar the local dialect or accent of the site is to that of the transcription party.
42. The account type (See Table 10).
43. The average speed of answer or statistics based on how quickly an available transcription unit is attached to a new communication session.
44. The number of missed communication sessions, abandoned communication sessions, test communication sessions, or communication sessions with no audio.
45. The number of transcription units and other resources out of service.
46. The number, type, and status of operational alarms.
47. Features from Table 5.

For example, if the available transcription unit pool shrinks to a selected level, as determined by the ACD 202, the ACD 202 may configure additional transcription unit instances so that the additional transcription units are ready for possible traffic spikes. Alternatively or additionally, the ACD 202 may provision a transcription unit and the transcription unit may provision ASR systems and other resources in the transcription unit.

In some embodiments, the ACD 202 may also be configured to log communication sessions and transcription records in the database 209. Examples of communication session and transcription records include, but are not limited to, phone numbers, date/time, communication session durations, whether communication sessions are transcribed, what portion of communication sessions are transcribed, and whether communication sessions are revenue-producing (billable), or non-revenue producing (non-billable). The ACD 202 may track whether communication sessions are transcribed with revoiced or without revoiced audio. Alternatively or additionally, the ACD 202 may track whether a communication session is transcribed without revoiced audio for a part of the communication session and with revoiced audio for another part of the communication session. In these and other embodiments, the ACD 202 may indicate what portion of the communication session was transcribed with revoiced audio and without revoiced audio.

In some embodiments, the ACD 202 may track the transcription for the purpose of billing a user that requested the transcription. In these and other embodiments, a time of a certain event may be used as the basis for billing. Examples of time events that may be used as a basis for billing may include:

1. The duration of the audio portion of the communication session, including the time at least one party is connected to the communication session.
2. The duration of the audio portion of the communication session, including the time at least a subscriber and a transcription party are on the communication session.
3. The duration of the audio portion of the communication session plus the time used to deliver transcriptions. For example, after the transcription party stops speaking at the end of the communication session, there may be an additional period of time until all transcriptions are delivered to the subscriber. This time used to deliver transcriptions may be included in the billed time. In some embodiments, the time used to deliver transcriptions may include time to present transcriptions to a display. Additionally or alternatively, the time used to deliver transcriptions may include time to deliver transcriptions to a storage location such as the subscriber's screen buffer or a record of one or more previous communication sessions.

In some embodiments, the transcription system 208 may include a remote monitor 224. In these and other embodiments, a remote monitor 224 may enable a supervisor (e.g., a computer program such as a CA activity monitor 3104 to be described with reference to FIG. 31, a CA manager, a CA trainer, or quality assurance person) to remotely observe a transcription process. In some embodiments, the remote monitor 224 may be configured to obtain the audio of the communication session being transcribed by the CA. In these and other embodiments, the remote monitor 224 may direct a device associated with the supervisor to broadcast the audio for the supervisor to hear. Alternatively or additionally, the remote monitor 224 may be configured to obtain a transcription based on revoiced audio and edits to a transcription based on inputs from a CA. Alternatively or additionally, the remote monitor 224 may direct a device associated with the supervisor to display part or all of the CA's screen, transcription window, and/or transcription being generated based on the CA's revoiced audio. In some embodiments, the remote monitor 224 may be configured to provide a communication interface between a CA's device and the device used by a supervisor. In these and other embodiments, the remote monitor may allow the CA's device and the supervisor's device to exchange messages, audio, and/or video.

In some embodiments, the remote monitor 224 may also be configured to provide to a device associated with a supervisor or other quality assurance person audio and a transcription of the audio generated by a transcription unit 214. For example, the remote monitor 224 may provide to a supervisor regular audio, revoiced audio associated with the regular audio, and transcriptions as generated based on the regular and/or revoiced audio.

In some embodiments, the remote monitor 224 may capture and provide, for presentation, additional information regarding the transcription system 208 and/or the transcription units 114. The information may include metrics used for selection of a CA, a transcription unit configuration, a CA identifier, CA activity with respect to a text editor, alerts from a CA activity monitor (as will be described below in greater detail with reference to FIG. 31), communication session statistics such as communication session duration, a measure of communication time such as the number of speech or session seconds, the number of communication sessions, transcriptions that are generated without using revoiced audio, the amount of time transcriptions are generated using revoiced audio, estimated accuracy of the transcriptions, estimated communication session transcription difficulty, and latency, among others.

In some embodiments, the remote monitor 224 may be, for example, manually activated, or automatically activated in response to an event such as an alert indicating that a CA may be distracted. In these and other embodiments, the remote monitor 224 may be configured to provide an interface to a device to allow the device to present and receive edits of a transcription in addition to the text editor associated with the transcription unit generating the transcription of the audio. Alternatively or additionally, the remote monitor 224 may be configured to transfer responsibility from a first device to a second device to broadcast and capture audio to generate revoiced audio.

Modifications, additions, or omissions may be made to the environment 200 and/or the components operating in the environment 200 without departing from the scope of the present disclosure. For example, in some embodiments, the transcription system 208 may be networked with more than just the first device 104. Alternatively or additionally, in some embodiments, the environment 200 may not include the remote monitor 224.

Figure 3:
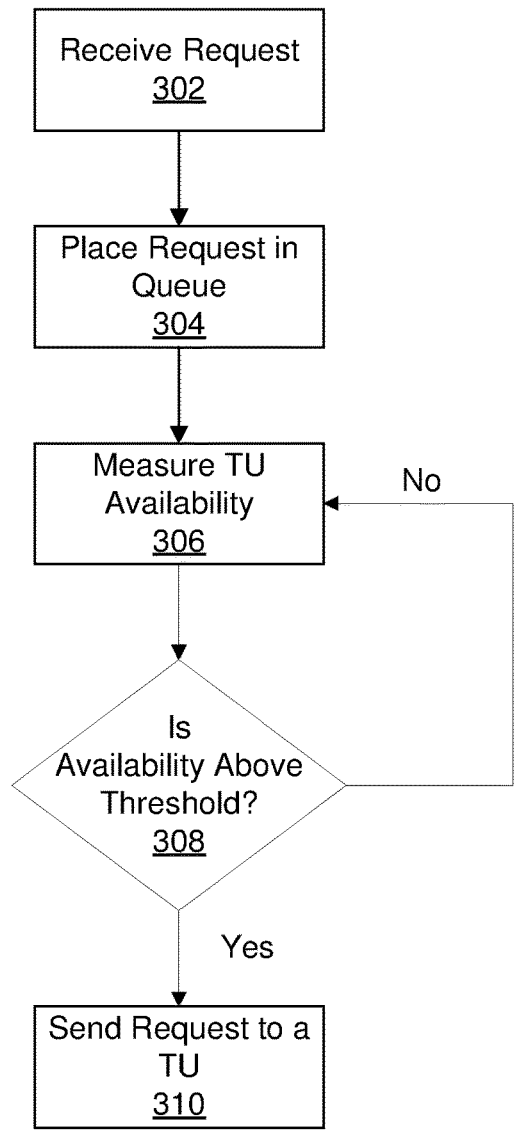
FIG. 3 is a flowchart of an example method to select a transcription unit.

FIG. 3 is a flowchart of an example method 300 to select a transcription unit in accordance with some embodiments of the present disclosure. The method 300 may be arranged in accordance with at least one embodiment described in the present disclosure. The method 300 may be performed, in some embodiments, by a device or system, such as the ACD 202 of FIG. 2, or another device. In these and other embodiments, the method 300 may be performed based on the execution of instructions stored on one or more non-transitory computer-readable media. Although illustrated as discrete blocks, various blocks may be divided into additional blocks, combined into fewer blocks, or eliminated, depending on the desired implementation.

The method 300 may begin at block 302, where a transcription request may be obtained. For example, an ACD, such as the ACD 202 of FIG. 2, may obtain the low-priority transcription request. The priority of the transcription request may be obtained. The transcription request may be of a lower-priority or higher-priority. Examples of lower-priority transcription requests may include, transcribing medical or legal records, voicemails, generating or labeling training data for training automatic speech recognition models, court reporting, closed captioning TV, movies, and videos, among others. Examples of higher-priority transcription requests may include on-going phone calls, video chats, and paid services, among others.

At block 304, the transcription request with its designated priority may be placed in the request queue.

At block 306, the transcription unit (TU) availability may be determined. The transcription unit availability may be determined by the ACD. In some embodiments, the ACD may consider various factors to determine transcription unit availability. The factors may include projected peak traffic load or a statistic such as the peak load projected for a period of time, projected average traffic load or a statistic such as the average load projected for a next period of time, the number of transcription units projected to be available and an estimate for when the transcription units will be available based on information from a scheduling system that tracks anticipated sign-on and sign-off times for transcription units, past or projected excess transcription unit capacity over a given period of time, the current number or percentage of idle or available transcription units, and the number of idle or available transcription units, averaged over a preceding period of time. In these and other embodiments, the transcription units determined to be available may be revoiced transcription units. Alternatively or additionally, the transcription units determined to be available may be non-revoiced transcription units or a combination of non-revoiced transcription units and revoiced transcription units.

At block 308, it is determined if the transcription unit availability is above a particular threshold. If yes, the method proceeds to block 310. If no, the request may remain in a queue until the determination is affirmative. The value of the particular threshold may be selected based on the request being a lower-priority request or a higher-priority request. If the request is a higher-priority request, the particular threshold may be close to zero such that the higher-priority request may be accepted with a limited delay.

If the request is a lower-priority request, the particular threshold may be higher than the particular threshold for higher-priority requests to reduce the likelihood that there are not transcription units available when a higher-priority request is obtained. At block 310, the request may be sent to an available transcription unit.

It is understood that, for this and other processes, operations, and methods disclosed herein, the functions and/or operations performed may be implemented in differing order. Furthermore, the outlined functions and operations are only provided as examples, and some of the functions and operations may be optional, combined into fewer functions and operations, or expanded into additional functions and operations without detracting from the essence of the disclosed embodiments. For example, in some embodiments, in block 306, the availability of revoiced transcription units may be measured and the availability may be compared to a threshold in block 308. When the availability is below the threshold, the method 300 may return to block 306 and the availability of non-revoiced transcription units may be measured and the method 300 may proceed to block 308. Thus, in these and other embodiments, the method 300 may select revoiced transcription units before selecting non-revoiced transcription units.

Figure 4:
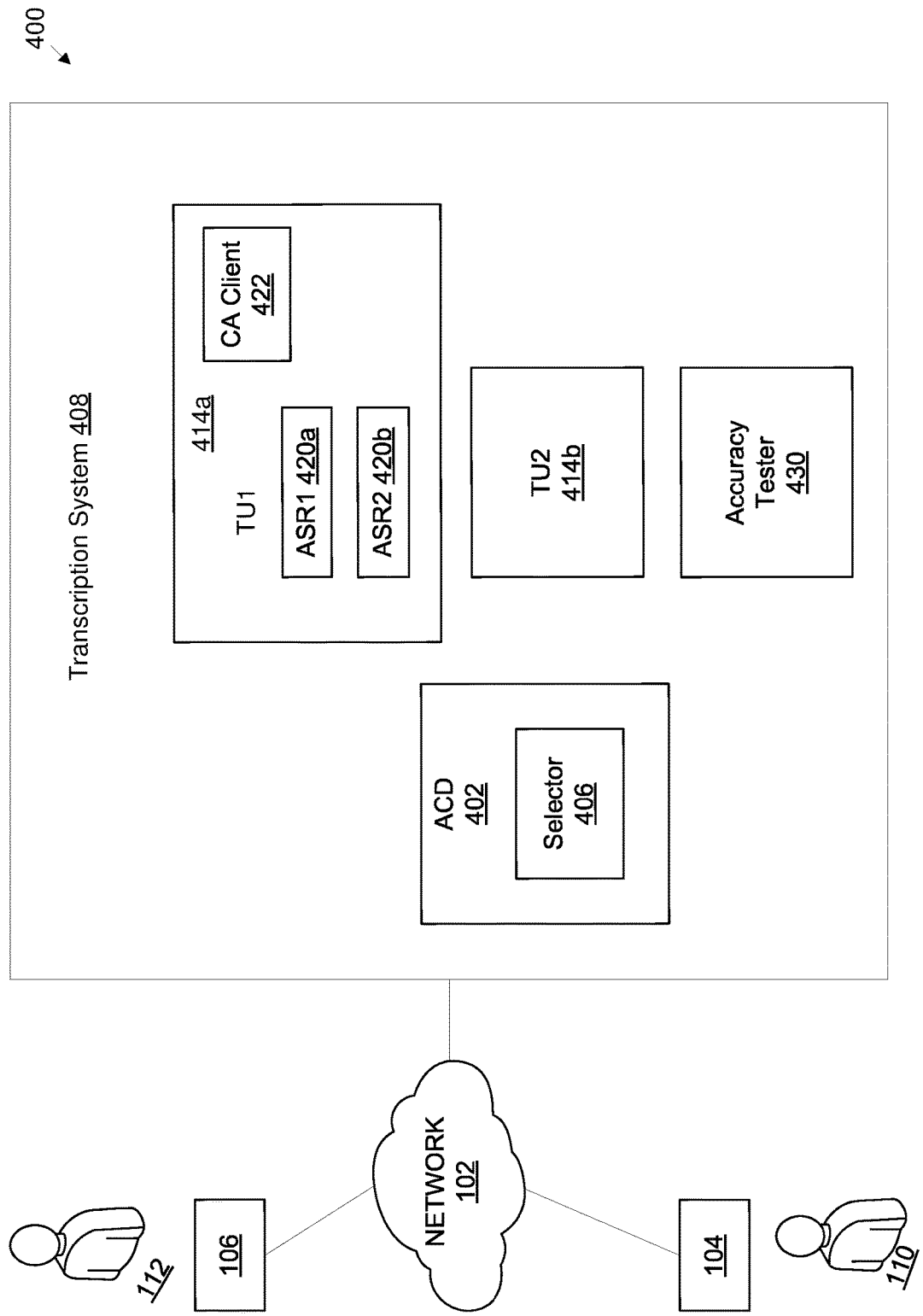
FIG. 4 illustrates another example environment for transcription of communications.

FIG. 4 illustrates another example environment 400 for transcription of communications in accordance with some embodiments of the present disclosure. The environment 400 may include the network 102, the first device 104, and the second device 106 of FIG. 1. The environment 400 may also include a transcription system 408. The transcription system 408 may be configured in a similar manner as the transcription system 108 of FIG. 1. However, the transcription system 408 of FIG. 4 may include additional details regarding transferring audio of a communication session between transcription units or between ASR systems in a transcription unit.

The transcription system 408 may include an ACD 402 that includes a selector 406. The transcription system 408 may also include a first transcription unit 414a and a second transcription unit 414b, referred to as the transcription units 414, and an accuracy tester 430. The first transcription unit 414a may include a first ASR system 420a, a second ASR system 420b, referred to as the ASR system(s) 420, and a CA client 422.

The ACD 402 may be configured to perform the functionality described with respect to the ACD 202 of FIG. 2 to select a transcription unit to generate a transcription of audio of a communication session between the first device 104 and the second device 106. After the initial assignment of the transcription unit 414, the selector 406 of the ACD 402 may be configured to change the transcription unit 414 generating the transcription or a configuration of the transcription unit 414 generating the transcription during the communication session. In some embodiments, the selector 406 may change the transcription unit 414 by directing the audio to a different transcription unit. Alternatively or additionally, the selector 406 may change the configuration of the transcription unit 414 by directing audio to a different ASR system 420 within the same transcription unit 414.

In some embodiments, the automated accuracy tester 430 may be configured to estimate an accuracy of transcriptions generated by the transcription units 414 and/or the ASR systems 420. In these and other embodiments, the accuracy tester 430 may be configured to estimate the quality of the transcriptions in real-time during the communication session. Thus, the accuracy tester 430 may generate the estimated accuracy as the transcriptions are generated and provided to the first device 104. The accuracy tester 430 may provide the estimated qualities to the selector 406.

In some embodiments, the term "accuracy" may be used generically to refer to one or more metrics of a transcription or of the process of generating a transcription. For example, the term accuracy may represent one or more metrics including values or estimates for: accuracy, quality, error counts, accuracy percentages, error rates, error rate percentages, confidence, likelihood, likelihood ratio, log likelihood ratio, word score, phrase score, probability of an error, word probability, quality, and various other metrics related to transcriptions or the generation of transcriptions. Additionally, any of the above terms may be used in this disclosure interchangeably unless noted otherwise or understood from the context of the description. For example, an embodiment that describes the metric of confidence is used to make a decision or may rely on other of the metrics described above to make the decision. Thus, the use of a specific term outside of the term accuracy should not be limiting, but rather as an example metric that may be used from multiple potential metrics.

For example, accuracy percentage of a transcription may equal accuracy of tokens in the transcription multiplied by 100% and divided by the number of tokens in the transcription. In these and other embodiments, the accuracy percentage may be 100% minus the percentage error rate. As another example, accuracy may equal one minus the error rate when error and accuracy are expressed in decimals. Thus, a description for estimating or utilizing one form of accuracy is to be understood to also be a description for estimating or utilizing another form of accuracy, since accuracy and error rates are merely different expressions of the same phenomenon. As another example, an agreement rate may be substantially equivalent to a disagreement rate, since they are complementary. For example, an agreement rate may be expressed as one (or 100%) minus the disagreement rate. In another example, where a method is described for using an agreement rate to form an estimate or selection, then a disagreement rate may be similarly used.

In some embodiments, the estimated or predicted accuracy may be based on past accuracy estimates. For example, past accuracy estimates may include the estimated and/or calculated accuracy for a previous period of time (e.g., for the past 1, 5, 10, 20, 30, or 60 seconds), since the beginning of the communication session, or during at least part of a previous communication session with the same transcription party. In these and other embodiments, the predicted accuracy may be based on the past accuracy estimates. Alternatively or additionally, the predicted accuracy may be the part accuracy estimates. For example, if the past accuracy estimates an accuracy of 95%, the predicted accuracy going forward may equal the past accuracy estimates and may be 95%. Generally, when discussing a predicted accuracy in this disclosure, the predicted accuracy may be the past accuracy or may be a determination that is based on the past accuracy. Thus, the use of the term "predict," "predicted," or "prediction" does not imply that additional calculations are performed with respect to previous estimates or determinations of accuracy. Additionally, as discussed, the term accuracy may represent one or more metrics and the use of the term "predict," "predicted," or "prediction" with respect to any metric should be interpreted as discussed above. Additionally, the use of the term "predict," "predicted," or "prediction" with respect to any quantity, method, variable, or other element in this disclosure should be interpreted as discussed above and does not imply that additional calculations are performed to determine the prediction. For example, where a prediction is described with reference to metrics such as availability of transcription units, conversation topic, characteristics and types of users or CAs, cost of service, traffic volumes, business or operations measures such as a global metric, spoken language, an estimate based on past or current values may be equivalently used.

In some embodiments, estimated accuracy of transcriptions of audio generated by a first transcription unit or ASR system may be based on transcriptions of the audio generated by a second transcription unit or ASR system. In these and other embodiments, the second transcription unit or ASR system may operate in one of various operating modes. The various operating modes may include a normal operating mode that executes a majority or all of the features described below with respect to FIG. 5. Another operating mode may include a reduced mode that consumes fewer resources as opposed to a normal operating mode. In the reduced mode, the second transcription unit or ASR system may run with smaller speech models or may execute a subset of the features described below with reference to FIG. 5. In a reduced mode, the second transcription unit or ASR system may not necessarily provide a full-quality transcription, but may be used, for example, to estimate accuracy of another transcription unit and/or ASR system. Other methods may be used to estimate the accuracy of transcriptions. Embodiments describing how the accuracy tester 430 may generate the estimated accuracy are described later in the disclosure with respect to FIGS. 18-29 and 45-59, among others.

In some embodiments, the selector 406 may obtain an estimated accuracy of the transcription units 414 and/or the ASR systems 120 from the accuracy tester 430. In these and other embodiments, the selector 406 may be configured to change the transcription unit 414 generating the transcription or a configuration of the transcription unit 414 generating the transcription during the communication session based on the estimated accuracy.

In these and other embodiments, the selector 406 may be configured to determine when the estimated accuracy associated with a first unit not performing transcriptions, such as the transcription unit 414 or ASR system 420, meets an accuracy requirement. When the estimated accuracy associated with a first unit meets the accuracy requirement, the first unit may begin performing transcriptions. In these and other embodiments, a second unit, such as the transcription unit 414 or ASR system 420, that previously performed transcriptions when the first unit meets the accuracy requirement may stop performing transcriptions.

In some embodiments, the accuracy requirement may be associated with a selection threshold value. In these and other embodiments, the selector 406 may compare the estimated accuracy of a first unit, such as one of the ASR systems 420 or one of the transcription unit 414, to the selection threshold value. When the estimated accuracy is above the selection threshold value, the accuracy requirement may be met and the selector 406 may select the first unit to generate transcriptions. When the estimated accuracy is below the selection threshold value, the accuracy requirement may not be met and the selector 406 may not select the first unit to generate transcriptions. In these and other embodiments, when the accuracy requirement is not met, the selector 406 may continue to have a second unit that previously generated transcriptions to continue to generate transcriptions. In these and other embodiments, the selection threshold value may be based on numerous factors and/or the selection threshold value may be a relative value that is based on the accuracy of the ASR system 420 and/or the transcription unit 414.

For example, in some embodiments, the selection threshold value may be based on an average accuracy of one or more of the transcription units 414 and/or the ASR systems 420. For example, when the selector 406 is selecting between the first transcription unit 414*a* and the second transcription unit 414*b*, an average accuracy of the first transcription unit 414*a* and an average accuracy of the second transcription unit 414*b* may be combined. For example, the average accuracies may be subtracted, added using a weighted sum, or averaged. The selection threshold value may be based on the average accuracies of the transcription units 414.

In some embodiments, an average accuracy of the transcription unit 414 and/or the ASR system 420 may be determined. The average accuracy may be based on a comparison of a reference transcription of audio to a transcription of the audio. For example, a reference transcription of audio may be generated from the audio. Additionally, the transcription unit 414 and/or the ASR system 420 may generate a transcription of the audio. The transcription generated by the transcription unit 414 and/or the ASR system 420 and the reference transcription may be compared to determine the accuracy of the transcription by the transcription unit 414 and/or the ASR system 420. The accuracy of the transcription may be referred to as an average accuracy of the transcription unit 414 and/or the ASR system 420.

In some embodiments, the reference transcription may be based on audio collected from a production service that is transcribed offline. One example of transcribing audio offline may include the steps of configuring a transcription management, transcription, and editing tool to (a) send an audio sample to a first transcriber for transcription, then to a second transcriber to check the results of the first transcriber, (b) send multiple audio samples to a first transcriber and at least some of the audio samples to a second transcriber to check quality, or (c) send an audio sample to two or more transcribers and to use a third transcriber to check results when the first two transcribers differ. Additionally or alternatively, the accuracy tester 410 may generate a reference transcription in real time and automatically compare the reference to the hypothesis to determine an error rate in real time.

In some embodiments, a reference transcription may be generated by sending the same audio segment to multiple different revoiced transcription units that each transcribe the audio. Alternatively or additionally, the same audio segment may be sent to multiple different non-revoiced transcription units that each transcribe the audio. The output of some or all of the non-revoiced and revoiced transcription units may be provided to a fuser that may combine the transcriptions into a reference transcription.

In some embodiments, the accuracy requirement may be associated with an accuracy margin. In these and other embodiments, the selector 406 may compare the estimated accuracy of a first unit, such as one of the ASR systems 420 or one of the transcription units 414, to the estimated accuracy of a second unit, such as one of the ASR systems 420 or one of the transcription units 414. When the difference between the estimated accuracies of the first and second units is less than the accuracy margin, the accuracy requirement may be met and the selector 406 may select the first unit to generate transcriptions. When the difference between the estimated accuracies of the first and second units is more than the accuracy margin and the estimated accuracy of the first unit is less than the estimated accuracy of the second unit, the accuracy requirement may not be met and the second unit may continue to generate transcriptions.

An example of the operation of the transcription system 408 follows. In some embodiments, the ACD 402 may initially assign the first transcription unit 414a to generate transcriptions for audio of a communication session. In these and other embodiments, the selector 406 may direct the audio to the first transcription unit 414a. The first transcription unit 414a may use the first ASR system 420a and the second ASR system 420b to generate transcriptions. In some embodiments, the first ASR system 420a may be a revoiced ASR system that uses revoiced audio based on the audio of the communication session. The revoiced audio may be generated by the CA client 422. Alternatively or additionally, the first ASR system 420a may be speaker-independent or speaker-dependent. The second ASR system 420b may use the audio from the communication session to generate transcriptions. The second transcription unit 414b may be configured in any manner described in this disclosure. For example, the second transcription unit 414b may include an ASR system that is speaker-independent. In some embodiments, the ASR system may be an ASR service that the second transcription unit 414b communicates with through an application programming interface (API) of the ASR service.

The accuracy tester 430 may estimate the accuracy of the first transcription unit 414a based on the transcriptions generated by the first ASR system 420a. The accuracy tester 430 may estimate the accuracy of the second transcription unit 414b based on the transcriptions generated by the second ASR system 420b. In some embodiments, the transcriptions generated by the second ASR system 420b may be fused with the transcriptions generated by the first ASR system 420a. The fused transcription may be provided to the first device 104.

When the difference between the estimated accuracies is less than an accuracy margin, the selector 406 may direct audio to the second transcription unit 414b. In these and other embodiments, the first transcription unit 414a may stop generating transcriptions and the second transcription unit 414b may generate the transcriptions for the communication session.

As an alternative, the second transcription unit 414b may generate transcriptions that may be used to estimate the accuracy of the first transcription unit 414a or the second transcription unit 414b. The transcriptions generated by the second transcription unit 414b may not be provided to the first device 104. In these and other embodiments, the transcriptions generated by the second transcription unit 414b may be generated by an ASR system operating in a reduced mode.

As another example, the first transcription unit 414a may use the first ASR system 420a with the CA client 422 to generate transcriptions to send to the first device 104. In these and other embodiments, the accuracy tester 430 may estimate the accuracy of the second ASR system 420b based on the transcriptions generated by the second ASR system 420b.

When the estimated accuracy of the second ASR system 420b is greater than a selection threshold value, the selector 406 may select the second ASR system 420b to generate transcriptions to send to the first device 104. In these and other embodiments, the first ASR system 420a may stop generating transcriptions.

Modifications, additions, or omissions may be made to the environment 400 and/or the components operating in the environment 400 without departing from the scope of the present disclosure. For example, in some embodiments, the transcription system 408 may include additional transcription units. In these and other embodiments, the selector 406 may be configured with multiple selection threshold values. Each of the multiple selection threshold values may correspond to one of the transcription units.

As another example, in some embodiments, the ASR systems 420 and the ASR systems in the second transcription unit 414b may operate as described with respect to FIGS. 5-12 and may be trained as described in FIGS. 56-83. In these and other embodiments, the selector 406 and/or the environment 400 may be configured in a manner described in FIGS. 18-30 which describe various systems and methods that may be used to select between different transcription units. As described with respect to FIG. 4 and FIGS. 18-30, selection among transcription units may be based on statistics with respect to transcriptions of audio generated by ASR systems. FIGS. 44-55, among others, describe various systems and methods that may be used to determine the statistics. In some embodiments, the statistics may be generated by comparing a reference transcription to a hypothesis transcription. In these and other embodiments, the reference transcriptions may be generated based on the generation of higher accuracy transcriptions as described in FIGS. 31-43. The higher accuracy transcriptions as described in FIGS. 31-43 may be generated using the fusion of transcriptions described in FIGS. 13-17. This example provides an illustration regarding how the embodiments described in this disclosure may operate together. However, each of the embodiments described in this disclosure may operate independently and are not limited to operations and configurations as described with respect to this example.

Figure 5:
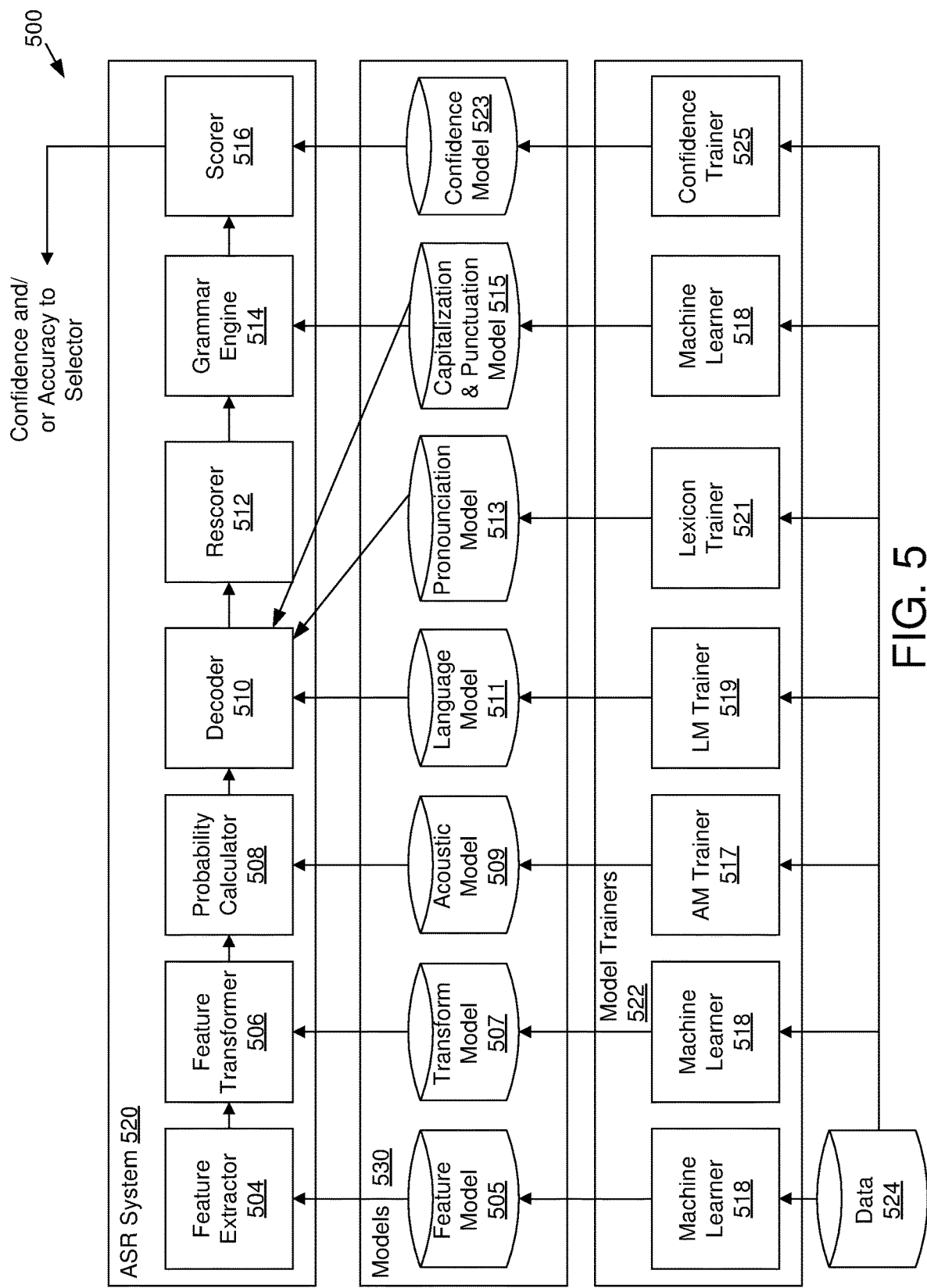
FIG. 5 is a schematic block diagram illustrating an environment for speech recognition.

Turning now to various embodiments of the present disclosure that discuss automatic speech recognition ("ASR"), FIGS. 5-12 depict embodiments of systems and methods for generating a transcription from audio. FIG. 5 is a schematic block diagram illustrating an embodiment of an environment 500 for speech recognition, arranged in accordance with some embodiments of the present disclosure.

In some embodiments, the environment 500 may include an ASR system 520, models 530, and model trainers 522. The ASR system 520 may be an example of the ASR systems 120 of FIG. 1. The ASR system 520 may include various blocks including a feature extractor 504, a feature transformer 506, a probability calculator 508, a decoder 510, a rescorer 512, a grammar engine 514 (to capitalize and punctuate), and a scorer 516. Each of the blocks may be associated with and use a different model from the models 530 when performing its particular function in the process of generating a transcription of audio. In general, the model trainers 522 may use data 524 to generate the models 530. The models 530 may be used by the blocks in the ASR system 520 to perform the process of generating a transcription of audio.

In some embodiments, the feature extractor 504 receives audio samples and generates one or more features based on a feature model 505. Types of features may include LSFs (line spectral frequencies), cepstral features, and MFCCs (Mel Scale Cepstral Coefficients). In some embodiments, audio samples (meaning the amplitudes of a speech waveform, measured at a selected sampling frequency) serve as features. Features may include features derived from a video signal, such as a video of the speaker's lips or face. For example, an ASR system may use features derived from the video signal that indicate lip position or motion together with features derived from the audio signal.

In one example, a camera may capture video of a CA's lips or face and forward the signal to the feature extractor 504. In another example, audio and video features may be extracted from a party on a video communication session and sent to the feature extractor 504. In another example, lip movement may be used to indicate whether a party is speaking so that the ASR system 520 may be activated during speech to transcribe the speech. Alternatively or additionally, the ASR system 520 may use lip movement in a video to determine when a party is speaking such that the ASR system 520 may more accurately distinguish speech from audio interference such as noise from sources other than the speaker.

In some embodiments, the feature transformer 506 may be configured to convert the extracted features, based on a transform model 507, into a transformed format that may provide better accuracy or less central processing unit (CPU) processing. The feature transformer 506 may compensate for variations in individual voices such as pitch, gender, accent, age, and other individual voice characteristics. The feature transformer 506 may also compensate for variations in noise, distortion, filtering, and other channel characteristics. The feature transformer 506 may convert a feature vector to a vector of a different length to improve accuracy or reduce computation.

In some embodiments, the feature transformer 506 may be speaker-independent, meaning that the transform is trained on and used for all speakers. Alternatively or additionally, the feature transformer 506 may be speaker-dependent, meaning that each speaker or small group of speakers has an associated transform which is trained on and used for that speaker or small group of speakers. For example, a machine learner 518 (a.k.a. modeling or model training) when creating a speaker-dependent model may create a different transform for each speaker or each device to improve accuracy. Alternatively or additionally, the feature transformer 506 may create multiple transforms. In these and other embodiments, each speaker or device may be assigned to a transform. The speaker or device may be assigned to a transform, for example, by trying multiple transforms and selecting the transform that yields or is estimated to yield the highest accuracy of transcriptions for audio from the speaker or audio.

One example of a transform may include a matrix which is configured to be multiplied by a feature vector created by the feature extractor 504. For example, if the feature extractor 504 generates a vector $\bar{a}$ of 60 features with elements $a_1$, $a_2$, $a_3$, ..., $a_{60}$ and the feature transformer 506 uses a 40×60 matrix T, then the transformed features $\bar{o}$, including elements $o_1$, $o_2$, $o_3$, ..., $o_{40}$ are computed as $\bar{o} = T \bar{a} + \bar{u}$, where $\bar{u}$ is a constant and may optionally be zero. In these and other embodiments, the matrix T and the constant $\bar{u}$ may be included in the transform model 507 and may be generated by the machine learner 518 using the data 524. Methods for computing a transformation matrix T, such as Maximum Likelihood Linear Regression (MLLR), Constrained MLLR (CMLLR), and Feature-space MLLR (fMLLR), and may be used to generate the transform model 507 used by the feature transformer 506. As an alternative to transforming features, model parameters such as acoustic model parameters may be adapted to individuals or groups using methods such as MAP (maximum a posteriori) adaptation.

In some embodiments, a single transform for all users may be determined by tuning to, or analyzing, an entire population of users. Additionally or alternatively, a transform may be created by the feature transformer 506 for each speaker or group of speakers, where a transcription party or all speakers associated with a specific subscriber/user device may include a group, so that the transform adjusts the ASR system for higher accuracy with the individual speaker or group of speakers. The different transforms may be determined using the machine learner 518 and different data of the data 524.

The probability calculator 508, in some embodiments, may be configured to receive a vector of features from the feature transformer 506, and, using an acoustic model 509 (generated by an AM trainer 517), determine a set of probabilities, such as phoneme probabilities. The phoneme probabilities may indicate the probability that the audio sample described in the vector of features is a particular phoneme of speech. Alternatively or additionally, the phoneme probabilities may include multiple phonemes of speech that may be described in the vector of features. Each of the multiple phonemes may be associated with a probability that the audio sample includes that particular phoneme. A phoneme of speech may include any perceptually distinct units of sound that may be used to distinguish one word from another. The probability calculator 508 may send the phonemes and the phoneme probabilities to the decoder 510.

In some embodiments, the decoder 510 receives a series of phonemes and their associated probabilities. In some embodiments, the phonemes and their associated probabilities may be determined at regular intervals such as every 5, 7, 10, 15, or 20 milliseconds. In these and other embodiments, the decoder 510 may also read a language model 511 (generated by an LM trainer 519) such as a statistical language model or finite state grammar and, in some configurations, a pronunciation model 513 (generated by a lexicon trainer 521) or lexicon. The decoder 510 may determine a sequence of words or other symbols and non-word markers representing events such as laughter or background noise. Additionally or alternatively, the decoder 510 determines a series of words, denoted as a hypothesis, for use in generating a transcription. In some embodiments, the decoder 510 may output a structure in a rich format, representing multiple hypotheses or alternative transcriptions, such as a word confusion network (WCN), lattice (a connected graph showing possible word combinations and, in some cases, their associated probabilities), or n-best list (a list of hypotheses in descending order of likelihood, where "n" is the number of hypotheses).

In some embodiments, the rescorer 512 analyzes the multiple hypotheses and reevaluates or reorders them and may consider additional information such as application information or a language model other than the language model used by the decoder 510, such as a rescoring language model. A rescoring language model may, for example, be a neural net-based or an n-gram based language model. In some embodiments, the application information may include intelligence gained from user preferences or behaviors, syntax checks, rules pertaining to the particular domain being discussed, etc.

In some embodiments, the ASR system 520 may have two language models, one for the decoder 510 and one for the rescorer 512. In these and other embodiments, the model for the decoder 510 may include an n-gram based language model. The model for the rescorer 512 may include an RNNLM (recurrent neural network language model).

In some embodiments, the decoder 510 may use a first language model that may be configured to run quickly or to use memory efficiently such as a trigram model. In these and other embodiments, decoder 510 may render results in a rich format and transmit the results to the rescorer 512. The rescorer 512 may use a second language model, such as an RNNLM, 6-gram model or other model that covers longer n-grams, to rescore the output of the decoder 510 and create a transcription. The first language model may be smaller and may run faster than the second language model.

In some embodiments, the rescorer 512 may be included as part of the ASR system 520. Alternatively or additionally, in some embodiments, the rescorer 512 may not be included in the ASR system 520 and may be separate from the ASR system 520, as in FIG. 71.

In some embodiments, part of the ASR system 520 may run on a first device, such as the first device 104 of FIG. 1, that obtains and provides audio for transcription to a transcription system that includes the ASR system 520. In these and other embodiments, the remaining portions of the ASR system 520 may run on a separate server in the transcription system. For example, the feature extractor 504 may run on the first device and the remaining speech recognition functions may run on the separate server. As another example, the first device may compute phoneme probabilities, such as done by the probability calculator 508 and may forward the phoneme probabilities to the decoder 510 running on the separate server. In yet another example, the feature extractor 504, feature transformer 506, the probability calculator 508, and the decoder 510 may run on the first device. In these and other embodiments, a language model used by the decoder 510 may be a relatively small language model, such as a trigram model. In these and other embodiments, the first device may transmit the output of the decoder 510, which may include a rich output such as a lattice, to the separate server. The separate server may rescore the results from the first device to generate a transcription. In these and other embodiments, the rescorer 512 may be configured to utilize, for example, a relatively larger language model such as an n-gram language model, where n may be greater than three, or a neural network language model. In some embodiments illustrated herein, the rescorer 512 is illustrated without a model or model training, however it is contemplated that the rescorer 512 may utilize a model such as any of the above described models.

In some embodiments, a first language model may include word probabilities such as entries reflecting the probability of a particular word given a set of nearby words. A second language model may include subword probabilities, where subwords may be phonemes, syllables, characters, or other subword units. The two language models may be used together. For example, the first language model may be used for word strings that are known, that are part of a first lexicon, and that have known probabilities. For a word that is out-of-vocabulary, such as when the word is not part of a first lexicon or does not have a known probability in the first language model, the second language model may be used to estimate probabilities based on subword units. A second lexicon may be used to identify a word corresponding to the recognized subword units.

In some embodiments, the decoder 510 and/or the rescorer 512 may be configured to determine capitalization and punctuation. In these and other embodiments, the decoder and/or the rescorer 512 may use the capitalization and punctuation model 515. Additionally or alternatively, the decoder 510 and/or rescorer 512 may output a string of words which may be analyzed by the grammar engine 514 to determine which words should be capitalized and how to add punctuation. The scorer 516 may be configured to, once the transcription has been determined, generate an accuracy estimate, score, or probability regarding whether the words in the transcription are correct. The accuracy estimate may be generated based on a confidence model 523 (generated by a confidence trainer 525). This score may evaluate each word individually or the score may quantify phrases, sentences, turns, or other segments of a conversation. Additionally or alternatively, the scorer 516 may assign a probability between zero and one for each word in the transcription and an estimated accuracy for the entire transcription.

In some embodiments, the scorer 516 may be configured to transmit the scoring results to a selector, such as the selector 406 of FIG. 4. The selector may use the scoring to select between transcription units and/or ASR systems for generating transcriptions of a communication session. The output of the scorer 516 may also be provided to a fuser that combines transcriptions from multiple sources. In these and other embodiments, the fuser may use the output of the scorer 516 in the process of combining. For example, the fuser may weigh each transcription provided as an input by the confidence score of the transcription. Additionally or alternatively, the scorer 516 may receive input from any or all preceding components in the ASR system 520.

In the depicted embodiment, each component in the ASR system 520 may use a model 530, which is created using model trainers 522. Training models may also be referred to as training an ASR system. Training models may occur online or on-the-fly (as speech is processed to generate transcriptions for communication sessions) or offline (processing is performed in batches on stored data). In some embodiments, models may be speaker-dependent, in which case there may be one model or set of models built for each speaker or group of speakers. Alternatively or additionally, the models may be speaker-independent, in which case there may be one model or set of models for all speakers.

ASR system behavior may be tuned by adjusting runtime parameters such as a scale factor that adjusts how much relative weight is given to a language model vs. an acoustic model, beam width and a maximum number of active arcs in a beam search, timers and thresholds related to silence and voice activity detection, amplitude normalization options, noise reduction settings, and various speed vs. accuracy adjustments. A set of one or more runtime parameters may be considered to be a type of model. In some embodiments, an ASR system may be tuned to one or more voices by adjusting runtime parameters to improve accuracy. This tuning may occur during a communication session, after one or more communication sessions with a given speaker, or after data from multiple communication sessions with multiple speakers is collected. Tuning may also be performed on a CA voice over time or at intervals to improve accuracy of a speaker-independent ASR system that uses revoiced audio from the CA.

The depiction of models 530 is illustrative only. Each model shown may be a model developed through machine learning, a set of rules (e.g., a dictionary), a combination of both, or by other methods. One or more components of the model trainer 522 may be omitted in cases where the corresponding ASR system 520 components do not use a model. Models 530 may be combined with other models to create a new model. The different trainers of the model trainer 522 may receive data 524 when creating models.

The depiction of separate components in the ASR system 520 is also illustrative. Components may be omitted, combined, replaced, or supplemented with additional components. For example, a neural net may determine the sequence of words directly from features or speech samples, without a decoder 510, or the neural net may act as a decoder 510. In another example, an end-to-end ASR system may include a neural network or combination of neural networks that receives audio samples as input and generates text as output. An end-to-end ASR system may incorporate the capabilities shown in FIG. 5.

One example of an additional component may be a profanity detector (not shown) that filters or alters profanity when detected. The profanity detector may operate from a list of terms (words or phrases) considered profane (including vulgar or otherwise offensive) and, on determining that a recognized word matches a term in the list, may (1) delete the term, (2) change the term to a new form such as retaining the first and last letter and replacing in-between characters with a symbol such as "-," (3) compare the confidence of the word or phrase to a selected threshold and delete recognized profane terms if the confidence is lower than the threshold, or (4) allow the user to add or delete the term to/from the list. An interface to the profanity detector may allow the user/subscriber to edit the list to add or remove terms and to enable, disable, or alter the behavior of profanity detection.

Alternatively or additionally, profane words may be assigned a lower probability or weight in the language model 511 or during ASR or fusion processing or may be otherwise treated differently from non-profane words so that the profane words may be less likely to be falsely recognized. For example, if the language model 511 includes conditional probabilities, such as a numeric entry giving the probability of a word word3 given the previous n−1 words (e.g., P(word3|word1,word2) where n=3), then the probability for profane words may be replaced with k*P(word3|word1,word2), where k is a weight used to adjust the probability of recognition for profanity.

Some terms may be considered offensive only in certain situations, so, in some embodiments, the profanity list may also specify a context, such as a phrase (which could be a word, series of words, or other construct such as a lattice, grammar, or regular expression) that must precede the term and/or a phrase that must follow the term before it is considered a match. Alternatively or additionally, the list or context rules may be replaced by a natural language processor, a set of rules, or a model trained on data where profane and innocent terms have been labeled. In these and other embodiments, a function may be constructed that generates an output denoting whether the term is likely to be offensive. For example, a profanity detector may learn, by analyzing examples or by reading a model trained on examples of text where profane usage is tagged, to distinguish a term used in a profane vs. non-profane context. To better distinguish profanity, the detector may use information such as the topic of conversation, one or more voice characteristics of the speaker, including the identity, demographic, pitch, accent, and emotional state, an evaluation of the speaker's face or facial expression on a video communication session, and the phone number (or other device identifier) of the speaker. The detector may take into account information about the speaker and/or the subscriber such as how often he/she uses profanity, which, if any, profane words he/she uses, his/her emotional state, the degree to which his/her contacts (as defined from calling history or a contact list) use profanity, etc. A profanity detector, or other components, may be provided for any user/party of the conversation.

Another optional component of the ASR system 520, for example, may be a domain-specific processor for application-specific needs such as address recognition, recognition of specific codes or account number formats, or recognition of sets of terms such as names from a contact list or product names. The processor may detect domain specific or application-specific terms or use knowledge of the domain to correct errors, format terms in a transcription, or configure a language model 511 for speech recognition. In these and other embodiments, the rescorer 512 may be configured to recognize domain-specific terms. Domain- or application-specific processing may alternatively be performed by incorporating a domain-specific grammar into the language model.

Additional components may also be added in addition to merely recognizing the words, including performing natural language processing to determine intent (i.e., a classification of what the person said or wants), providing a text summary of the communication session on a display, generating a report that tabulates key information from a communication session such as drug dosages and appointment time and location, running a dialog that formulates the content and wording of a verbal or text response, and text-to-speech synthesis or audio playback to play an audio prompt or other information to one or more of the parties on the communication session.

Communication session content may also be transmitted to a digital virtual assistant that may use communication session content to make calendar entries, set reminders, make purchases, request entertainment such as playing music, make reservations, submit customer support requests, retrieve information relevant to the communication session, answer questions, send notices or invites to third parties, initiate communication sessions, send email or other text messages, provide input to or display information from advertisement services, engage in social conversations, report on news, weather, and sports, answer questions, or to provide other services typical of a digital virtual assistant. In these and other embodiments, the captioning service may interconnect to one or more commercial digital virtual assistants, such as via an API, to provide methods for the user to use their device to communicate with the digital virtual assistant. The digital virtual assistant may provide results to the user via voice, a display, sending the information to another device such as a smartphone or to an information service such as email, etc. For example, the user device may display the date and time during and/or between communication sessions.

Figure 6:
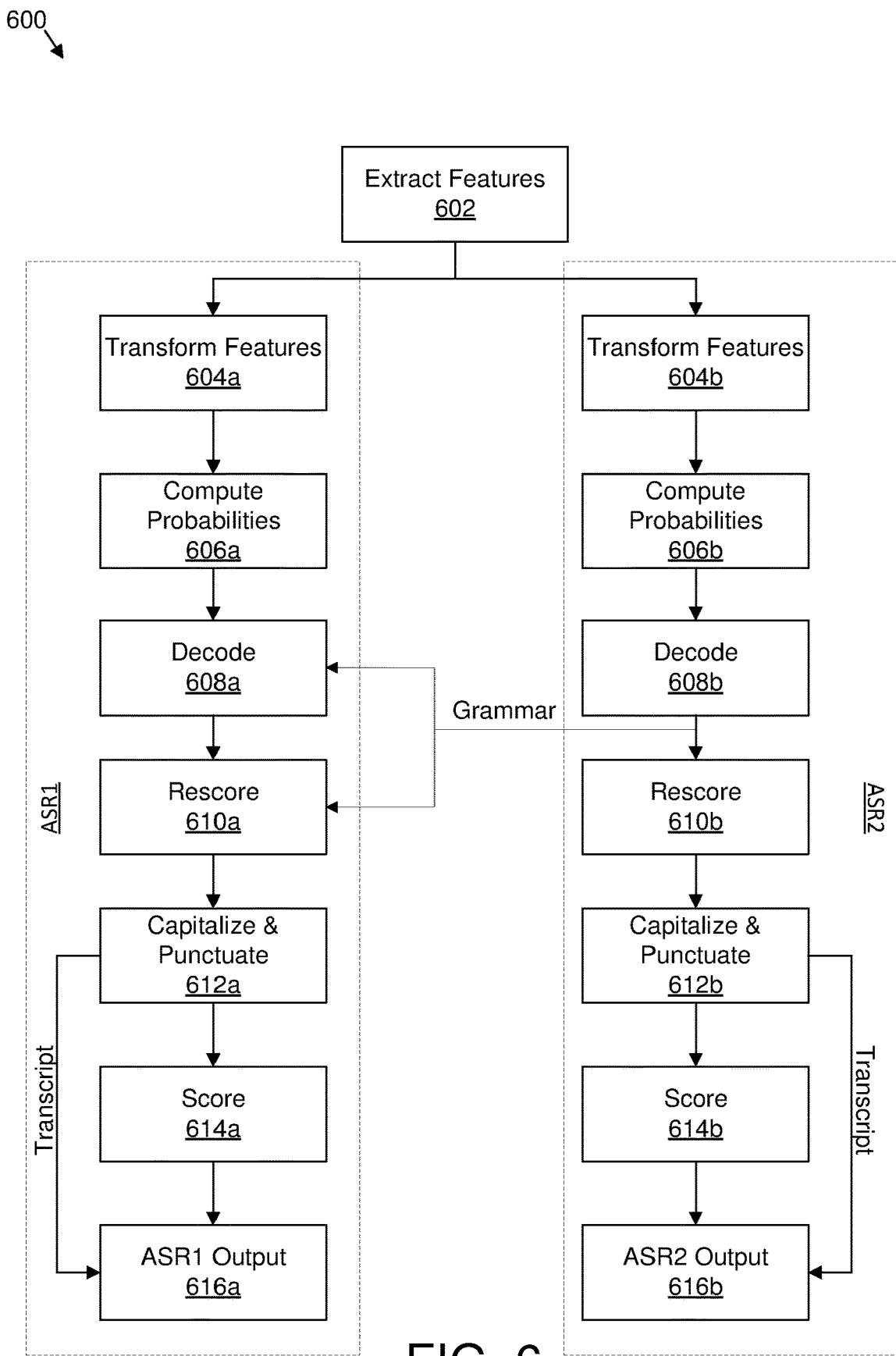
FIG. 6 is a flowchart of an example method to transcribe audio.
Figure 7:
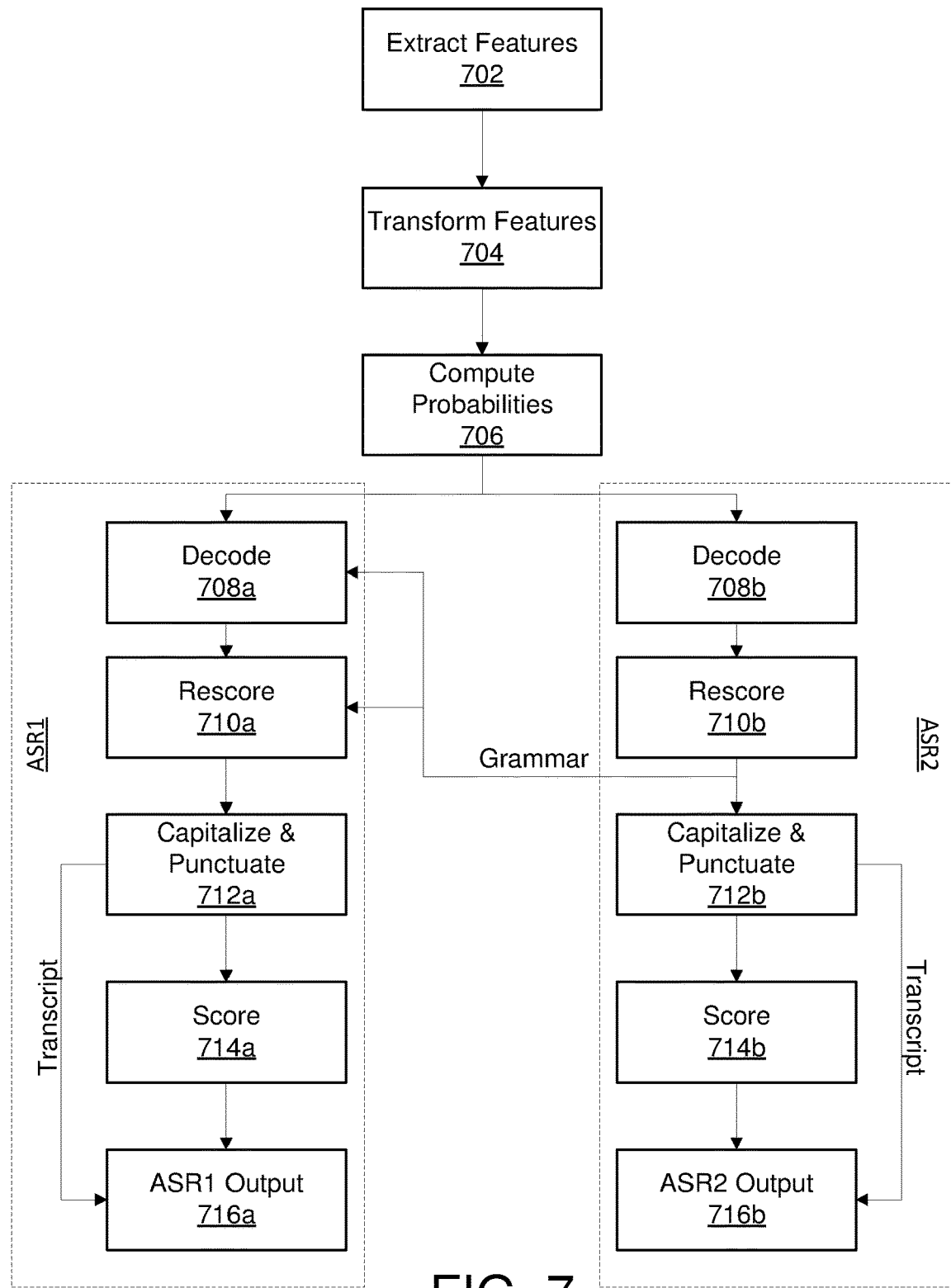
FIG. 7 is a flowchart of another example method to transcribe audio.
Figure 8:
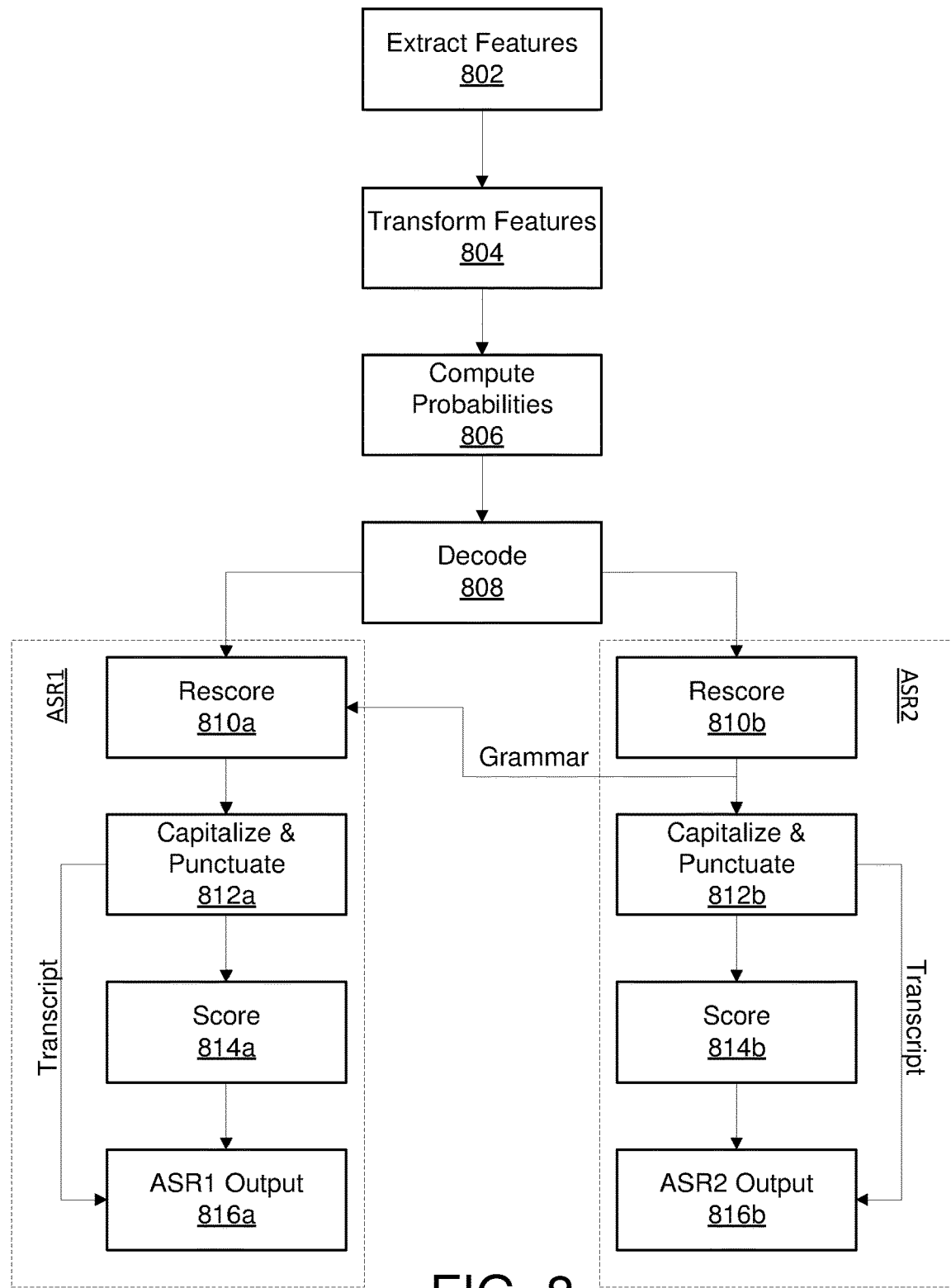
FIG. 8 is a flowchart of another example method to transcribe audio.

Referring now jointly to FIGS. 6-8, these figures depict methods 600, 700, and 800, each configured to transcribe audio, according to some embodiments in this disclosure. The methods illustrate how audio may be transcribed utilizing multiple ASR systems through sharing of resources between ASR systems. Alternatively or additionally, the methods illustrate how different steps in the transcription process may be performed by multiple ASR systems. While utilizing multiple ASR systems to generate a transcription of audio may provide advantages of increased accuracy, estimation, etc., multiple ASR systems may also increase hardware and power resource utilization. An alternative that may reduce hardware and power requirements is to share certain resources across multiple ASR systems.

Examples in FIGS. 6-8 illustrate sharing resources across two ASR systems, though concepts described in methods 600, 700, 800 may also be used for three or more ASR systems. In the below described embodiments, which refer to processing audio when a single device shares the output with multiple ASR systems, the single device may be implemented in an ASR system, a server, on a device participating in the communication session, or one of the multiple ASR systems, among others. A more detailed explanation of the steps illustrated in FIGS. 6-8 may be described with respect to FIG. 5.

The method 600 depicts an embodiment of shared feature extraction across multiple ASR systems. The method 600 may be arranged in accordance with at least one embodiment described in the present disclosure. The method 600 may be performed, in some embodiments, by a device or system, such as a transcription unit or multiple ASR systems, or another device. In these and other embodiments, the method 600 may be performed based on the execution of instructions stored on one or more non-transitory computer-readable media. Although illustrated as discrete blocks, various blocks may be divided into additional blocks, combined into fewer blocks, or eliminated, depending on the desired implementation.

The method may begin at block 602, wherein features of audio are extracted. The features may be extracted by a single device or ASR system. The features may be shared with multiple ASR systems, including ASR systems ASR1 and ASR2. Each of the ASR systems ASR1 and ASR2 may obtain the extracted features and perform blocks to transcribe audio. In some embodiments, ASR system ASR1 may perform blocks 604a, 606a, 608a, 610a, 612a, 614a, and 616a. In some embodiments, ASR system ASR2 may perform blocks 604b, 606b, 608b, 610b, 612b, 614b, and 616b.

At blocks 604a and 604b, the extracted features may be transformed into new vectors of features. At blocks 606a and 606b, probabilities such as phoneme probabilities may be computed. At blocks 608a and 608b, the probabilities may be decoded into one or more hypothesis sequences of words or other symbols for generating a transcription.

At blocks 610a and 610b, the decoded hypothesis sequence of words or other symbols may be rescored. At blocks 612a and 612b, capitalization and punctuation may be determined for the rescored hypothesis sequence of words or multiple rescored hypothesis sequence of words. At blocks 614a and 614b, the rescored hypothesis sequence of words or multiple rescored hypothesis sequences of words may be scored. The score may include an indication of a confidence that the rescored hypothesis sequence of words or multiple rescored hypothesis sequences of words are the correct transcription of the audio.

At blocks 616a and 616b, the rescored hypothesis sequence of words or multiple rescored hypothesis sequences of words may be output. Although blocks 604a, 606a, 608a, 610a, 612a, 614a, and 616a and blocks 604b, 606b, 608b, 610b, 612b, 614b, and 616b are described together, the blocks may each be performed separately by the ASR systems ASR1 and ASR2.

The method 700 depicts an embodiment of shared feature extraction, feature transform, and phoneme calculations across multiple ASR systems. The method 700 may be arranged in accordance with at least one embodiment described in the present disclosure. The method 700 may be performed, in some embodiments, by a device or system, such as a transcription unit or multiple ASR systems, or another device. In these and other embodiments, the method 700 may be performed based on the execution of instructions stored on one or more non-transitory computer-readable media. Although illustrated as discrete blocks, various blocks may be divided into additional blocks, combined into fewer blocks, or eliminated, depending on the desired implementation.

The method may begin at block 702, wherein features of audio are extracted. The features may be extracted by a single device or ASR system. At block 704, the extracted features may be transformed into new vectors of features. At block 706, probabilities such as phoneme probabilities may be computed. Blocks 702, 704, and 706 may be performed by a single device or ASR system. The probabilities may be shared with multiple ASR systems, including ASR systems ASR1 and ASR2. Each of the ASR systems ASR1 and ASR2 may obtain the probabilities. In some embodiments, ASR system ASR1 may perform blocks 704a, 706a 708a, 710a, 712a, 714a, and 716a. In some embodiments, ASR system ASR2 may perform blocks 708b, 710b, 712b, 714b, and 716b.

At blocks 708a and 708b, the probabilities may be decoded into one or more hypothesis sequences of words or other symbols for generating a transcription.

At blocks 710a and 710b, the decoded hypothesis sequence of words or other symbols may be rescored. At blocks 712a and 712b, capitalization and punctuation may be determined for the rescored hypothesis sequence of words or multiple rescored hypothesis sequences of words. At blocks 714a and 714b, the rescored hypothesis sequence of words or multiple rescored hypothesis sequences of words may be scored. The score may include an indication of a confidence that the rescored hypothesis sequence of words or multiple rescored hypothesis sequences of words are the correct transcription of the audio.

At blocks 716a and 716b, the rescored hypothesis sequence of words or multiple rescored hypothesis sequences of words may be output. Although blocks 708a, 710a, 712a, 714a, and 716a and blocks 708b, 710b, 712b, 714b, and 716b are described together, the blocks may each be performed separately by the ASR systems ASR1 and ASR2.

The method 800 depicts an embodiment of shared feature extraction, feature transform, phoneme calculations, and decoding, across multiple ASR systems. The method 800 may be arranged in accordance with at least one embodiment described in the present disclosure. The method 800 may be performed, in some embodiments, by a device or system, such as a transcription unit or multiple ASR systems, or another device. In these and other embodiments, the method 800 may be performed based on the execution of instructions stored on one or more non-transitory computer-readable media. Although illustrated as discrete blocks, various blocks may be divided into additional blocks, combined into fewer blocks, or eliminated, depending on the desired implementation.

The method may begin at block 802, wherein features of audio are extracted. At block 804, the extracted features may be transformed into new vectors of features. At block 806, probabilities may be computed. At block 808, the probabilities may be decoded into one or more hypothesis sequences of words or other symbols for generating a transcription.

The blocks 802, 804, 806, and 808 may be extracted by a single device or ASR system. The one or more hypothesis sequences of words or other symbols may be shared with multiple ASR systems, including ASR systems ASR1 and ASR2. Each of the ASR systems ASR1 and ASR2 may obtain the one or more hypothesis sequences of words or other symbols and perform blocks to transcribe audio. In these and other embodiments, one or more hypothesis sequences of words may include a single hypothesis, a WCN, a lattice, or an n-best list. In these and other embodiments, the n-best list may include a list where each item in the list is a string of words and may be rescored by an RNNLM or other language model. Additionally or alternatively, the one or more hypothesis sequences of words may be in a WCN or lattice, which may be rescored by an RNNLM or other language model.

In some embodiments, ASR system ASR1 may perform blocks 810*a*, 812*a*, 814*a*, and 816*a*. In some embodiments, ASR system ASR2 may perform blocks 810*b*, 812*b*, 814*b*, and 816*b*.

At blocks 810*a* and 810*b*, the decoded hypothesis sequence of words or other symbols may be rescored. At blocks 812*a* and 812*b*, capitalization and punctuation may be determined for the rescored hypothesis sequence of words or multiple rescored hypothesis sequences of words. At blocks 814*a* and 814*b*, the rescored hypothesis sequence of words or multiple rescored hypothesis sequences of words may be scored. The score may include an indication of a confidence that the rescored hypothesis sequence of words or multiple rescored hypothesis sequences of words are the correct transcription of the audio.

At blocks 816*a* and 816*b*, the rescored hypothesis sequence of words or multiple rescored hypothesis sequences of words may be output. Although blocks 804*a*, 806*a*, 808*a*, 810*a*, 812*a*, 814*a*, and 816*a* and blocks 804*b*, 806*b*, 808*b*, 810*b*, 812*b*, 814*b*, and 816*b* are described together, the blocks may each be performed separately by the ASR systems ASR1 and ASR2.

In some embodiments of methods 600, 700, and 800, the ASR system ASR2 may assist the ASR system ASR1 by providing a grammar to the ASR system ASR1. In some embodiments, a grammar may be shared whether or not the ASR systems share resources and whether or not they have a common audio source. For example, in some embodiments, both ASR systems may share a common audio source and share grammar. In some embodiments, each ASR system may have its own audio source and feature extraction, and grammars may still be shared. For example (see FIG. 42), a first ASR system may process communication session audio and send a grammar or language model to a second ASR system that may process a revoicing of the communication session audio. Alternatively or additionally, a first ASR system may process a revoicing of the communication session audio and send a grammar or language model to a second ASR system that may process communication session audio.

In some embodiments, as depicted in methods 600, 700, and 800, ASR system ASR1 may use the grammar from ASR system ASR2. ASR system ASR1 may use the grammar to guide a speech recognition search or in rescoring. In these and other embodiments, the decoding performed by the ASR system ASR2 may use a relatively large statistical language model and the ASR system ASR1 may use the grammar received from ASR system ASR2 120 as a language model. In these and other embodiments, the grammar may include a structure generated by ASR system ASR2 in the process of transcribing audio.

Figure 40:
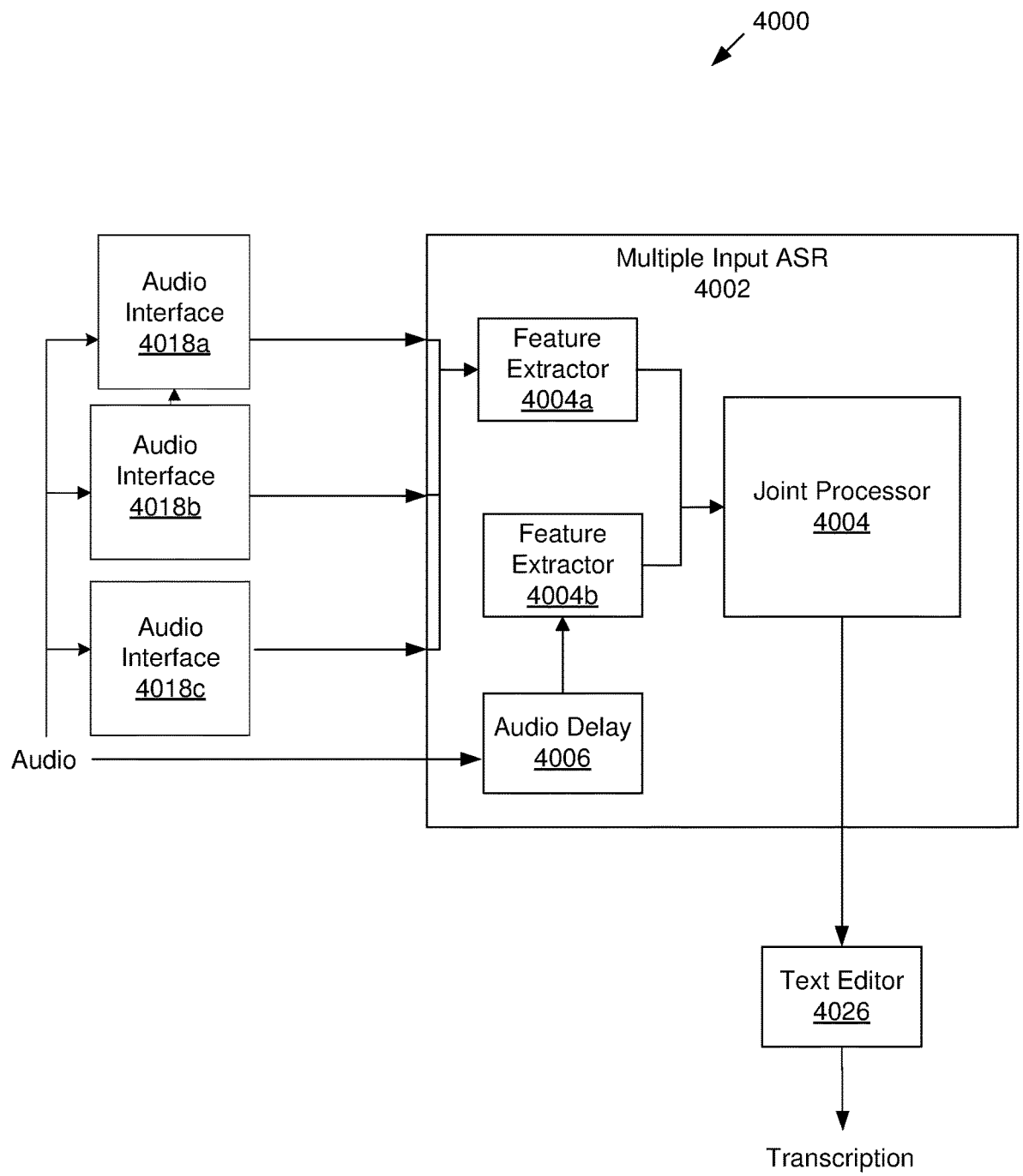
FIG. 40 illustrates an example environment that includes a multiple input ASR system.

In some embodiments, the grammar may be derived from a structure such as a text transcription or a rich output format such as an n-best list, a WCN, or a lattice. The grammar may be generated using output from the decoding performed by ASR system ASR2, as illustrated in method 600 or from the rescoring performed by ASR system ASR2 as illustrated in method 700 or method 800. The grammar may be provided, for example, to the blocks performing decoding or rescoring. The methods 600, 700, and 800 are illustrative of some combinations of sharing resources. Other combinations of resources may be similarly shared between ASR systems. For example, FIG. 40 illustrates another example of resource sharing between ASR systems where feature extraction is separate, and the remaining steps/components are shared among the ASR systems.

Figure 9:
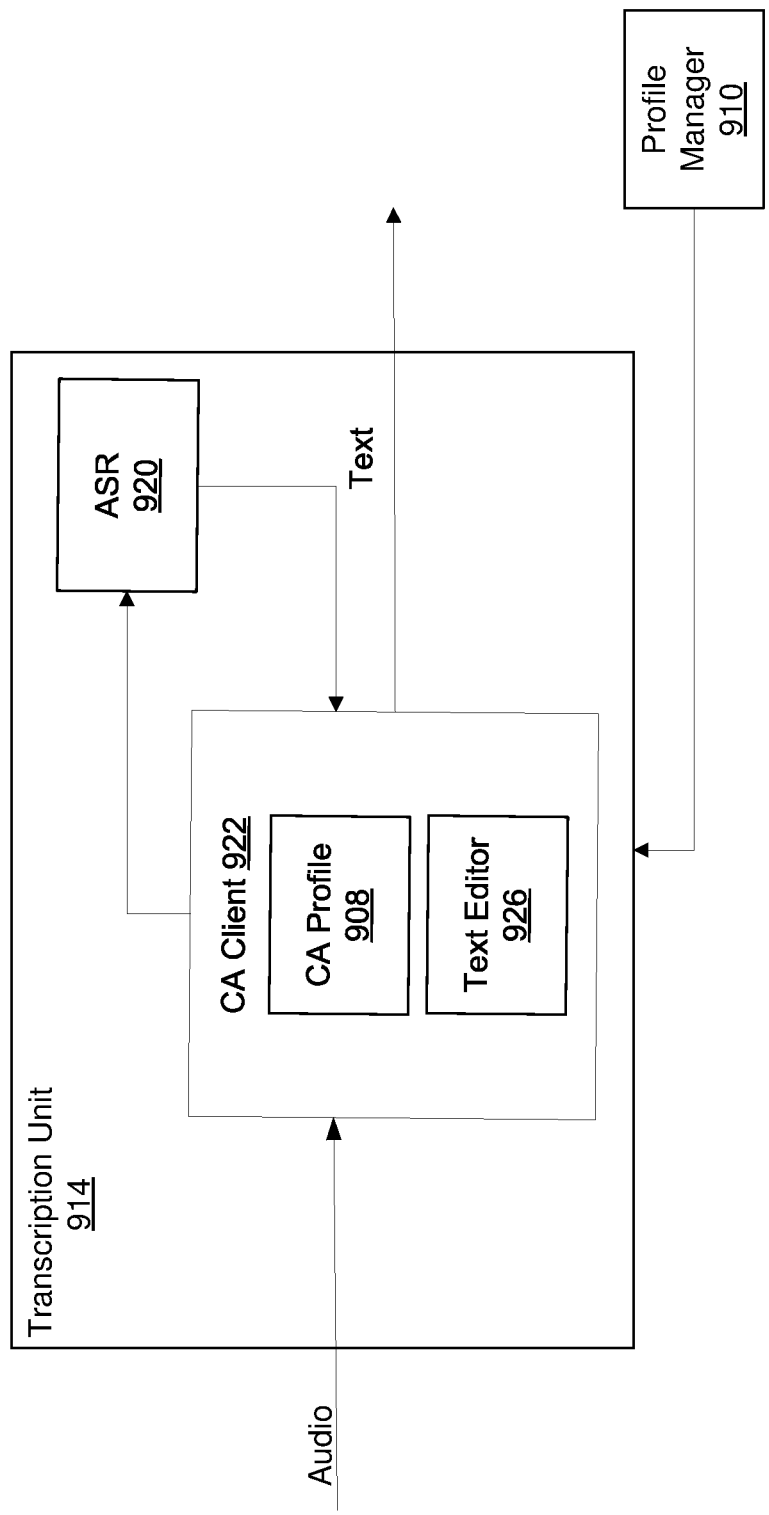
FIG. 9 is a schematic block diagram illustrating an example transcription unit.

FIG. 9 is a schematic block diagram illustrating an example transcription unit 914, in accordance with some embodiments of the present disclosure. The transcription unit 914 may be a revoiced transcription unit and may include a CA client 922 and an ASR system 920. The CA client 922 may include a CA profile 908 and a text editor 926.

The transcription unit 914 may be configured to receive audio from a communication session. The transcription unit 914 may also receive other accompanying information such as a VAD (voice activity detection) signal, one or more phone numbers or device identifiers, a video signal, information about the speakers (such as an indicator of whether each party in the communication session is speaking), speaker-dependent ASR models associated with the parties of the communication session generating the audio received, or other meta-information. Generally, where audio is provided to an ASR system or transcription unit additional information may also be included. The additional information may be included when not explicitly illustrated or described. Alternatively or additionally, communication session audio may include speech from one or more speakers participating in the communication session from other locations or using other communication devices such as on a conference communication session or an agent-assisted communication session.

In some embodiments, the audio may be received by the CA client 922. The CA client 922 may broadcast the audio to a CA and capture speech of the CA as the CA revoices the words of the audio to generate revoiced audio. The revoiced audio may be provided to the ASR system 920. As described previously, the CA may also use an editing interface to the text editor 926 to make corrections to the transcription generated by the ASR system 920 (see, for example, FIG. 1). In some embodiments, the ASR system 920 may be speaker-independent such that it includes models that are trained on multiple communication session audio and/or CA voices. Alternatively or additionally, the ASR system 920 may be a speaker-dependent ASR system that is trained on the CA's voice. The models trained on the CA's voice may be stored in the CA profile 908 that is specific for the CA. The CA profile 908 may be saved to and distributed from a profile manager 910 so that the CA may use any of multiple CA workstations that include a display, speaker, microphone, and input/output devices to allow the CA to interact with the CA client 922. In some embodiments, when the CA logs into a workstation, the CA client 922 on that workstation may be configured to download the CA profile 908 and provide the CA profile to the ASR system 920 to assist the ASR system 920 to transcribe the revoiced audio generated by the CA client 922 with assistance by the CA.

In some embodiments, the CA profile 908 may change the behavior of the ASR system for a given CA and may include information specific to the CA. For example, the CA profile 908 may include models such as an acoustic model and language models specific to the CA. Alternatively or additionally, the CA profile 908 may include a lexicon including words that the CA has edited. The CA profile 908 may further include key words defined by the CA to execute macros, to insert quick words (described below with reference to FIG. 57), and as aliases to represent specific words.

In some embodiments, the ASR system models included in the CA profile 908 may be trained on communication session data, such as communication session audio and transcriptions from the transcription unit 914 and stored in a secure location. The training of the models on the communication session data may be performed by the CA client 922 or by a separate server or device. In some embodiments, the training of the models may occur on a particular schedule, when system resources are available, such as at night or when traffic is otherwise light, or periodically, among other schedules. Additionally or alternatively, communication session data as it is captured may be transformed into an anonymous, nonreversible form such as n-grams or speech features, which may be further described with respect to FIG. 66. The converted form may be used to train the ASR system models of the CA profile 908 with respect to the CA's voice.

In some embodiments, the ASR system models in the CA profile 908 may be trained on-the-fly. Training on-the-fly may indicate that the ASR system models are trained on a data sample (e.g., audio and/or text) as it is captured. In some embodiments, the data sample may deleted after it is used for training. In some embodiments, the data sample may be deleted before a processor performing training using a first batch of samples including the data sample begins training using a second batch of samples including other data samples not in the first batch. In some embodiments, the data sample may be deleted at or near the end of the communication session in which the data sample is captured. These and other embodiments may be discussed in greater detail below with reference to FIG. 78. The on-fly-training may be performed by the CA client 922 or on a separate server. Where training happens on the CA client 922, the training process may run on one or more processors or compute cores separate from the one or more processors or compute cores running the ASR system 920 or may run when CA client 922 is not engaged in providing revoiced audio to the ASR system 920 for transcription generation.

Modifications, additions, or omissions may be made to the transcription unit 914 and/or the components operating in transcription unit 914 without departing from the scope of the present disclosure. For example, in some embodiments, the transcription unit 914 may include additional elements, such as another ASR system and fusers among other elements. Alternatively or additionally, in some embodiments, the ASR system 920 may pause processing when no voice is detected in the audio, such as when the audio includes silence.

Figure 10:
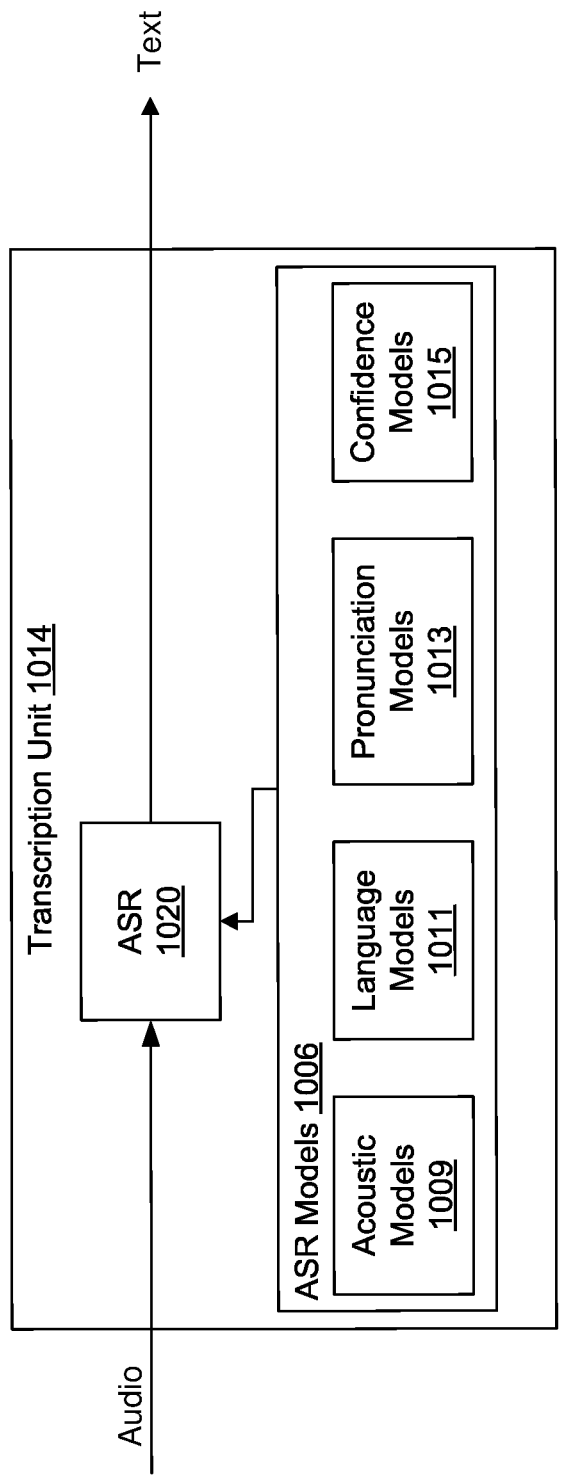
FIG. 10 is a schematic block diagram illustrating another example transcription unit.

FIG. 10 is a schematic block diagram illustrating another example transcription unit 1014, arranged accordingly to some embodiments of the present disclosure. The transcription unit 1014 includes an ASR system 1020 and various ASR models 1006 that may be used by the ASR system 1020 to generate transcriptions. The transcription unit 1014 may be configured to convert communication session audio, such as voice samples from a conversation participant, into a text transcription for use in captioning a communication session. Modifications, additions, or omissions may be made to the transcription unit 1014 and/or the components operating in transcription unit 1014 without departing from the scope of the present disclosure. For example, in some embodiments, the transcription unit 1014 may include additional elements, such as other ASR systems and fusers among other elements.

Figure 11:
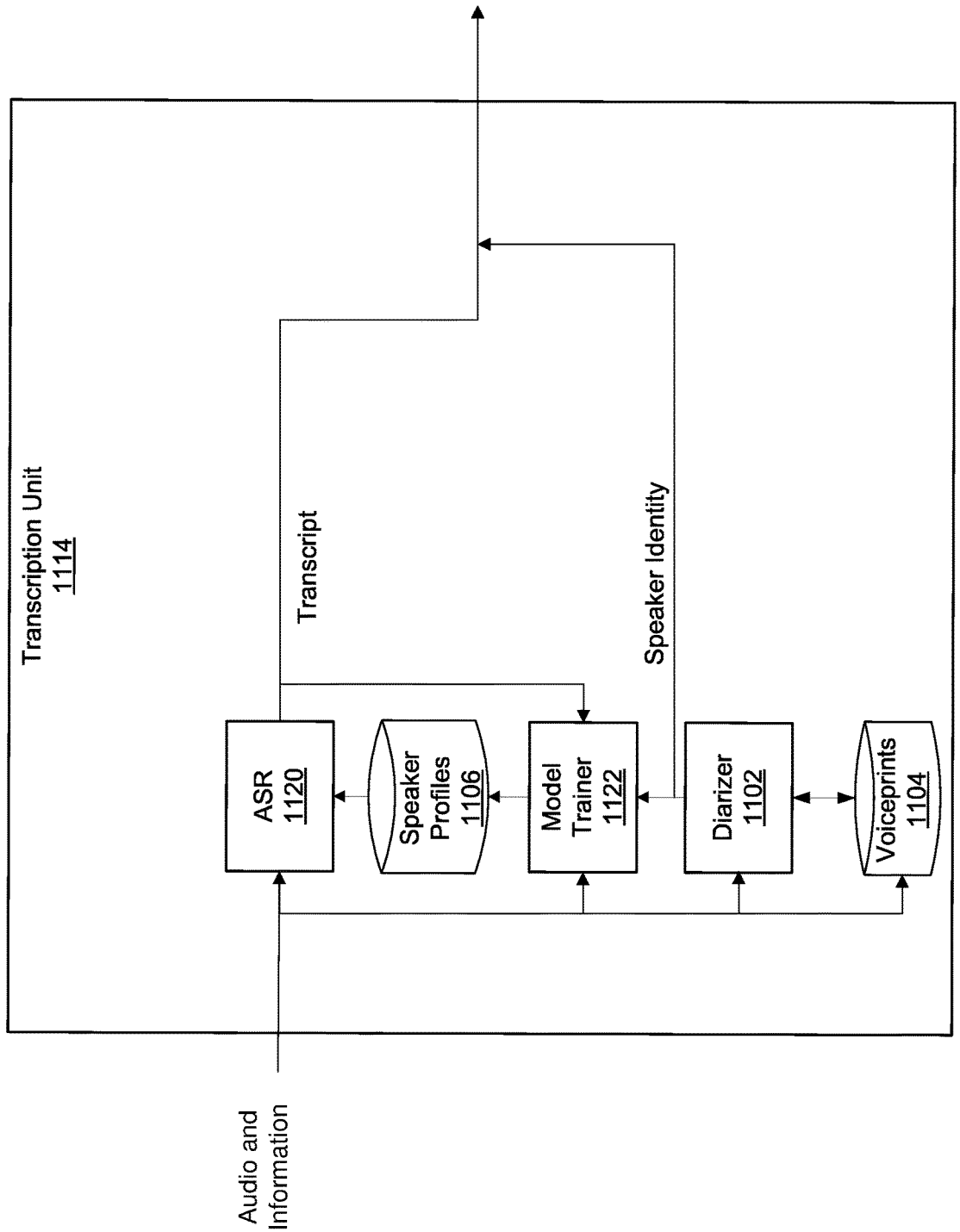
FIG. 11 is a schematic block diagram illustrating another example transcription unit.

FIG. 11 is a schematic block diagram illustrating another example transcription unit 1114, in accordance with some embodiments of the present disclosure. In some embodiments, the transcription unit 1114 may be configured to identity a person from which speech is included in audio received by the transcription unit 1114. The transcription unit 1114 may also be configured to train at least one ASR system, for example, by training or updating models, using samples of the person's voice. In these and other embodiments, the ASR system may be speaker-dependent or speaker-independent. Examples of models that may be trained may include acoustic models, language models, lexicons, and runtime parameters or settings, among other models, including models described with respect to FIG. 5.

The transcription unit 1114 may include an ASR system 1120, a diarizer 1102, a voiceprints database 1104, an ASR model trainer 1122, and a speaker profile database 1106. In some embodiments, the diarizer 1102 may be configured to identify a device that generates audio for which a transcription is to be generated by the transcription unit 1114. In some embodiments, the device may be a communication device connected to the communication session.

In some embodiments, the diarizer 1102 may be configured to identify a device using a phone number or other device identifier. In these and other embodiments, the diarizer 1102 may distinguish audio that originates from the device from other audio in a communication session based on from which line the audio is received. For example, in a stereo communication path, the audio of the device may appear on a first line and the audio of another device may appear on a second line. As another example, on a conference communication session, the diarizer 1102 may use a message generated by the bridge of the conference communication session that may indicate which line carries audio from the separate devices participating in the conference communication session.

In some embodiments, the diarizer 1102 may be configured to determine if first audio from a first device and at least a portion of second audio from a second device appear on a first line from the first device. In these and other embodiments, the diarizer 1102 may be configured to use an adaptive filter to convert the second audio signal from the second device to a filtered form that matches the portion of the second audio signal appearing on the first line so that the filtered form may be subtracted from the first line to thereby remove the second audio signal from the first line. Alternatively or additionally, the diarizer 1102 may utilize other methods to separate first and second audio signals on a single line or eliminate signal leak or crosstalk between audio signals. The other methods may include echo cancellers and echo suppressors, among others.

In some embodiments, people using an identified device may be considered to be a single speaker group and may be treated by the diarizer 1102 as a single person. Alternatively or additionally, the diarizer 1102 may use speaker identification to identify the voices of various people that may use a device for communication sessions or that may use devices to establish communication sessions from a communication service, such as a POTS number, voice-over-internet protocol (VOIP) number, mobile phone number, or other communication service. In these and other embodiments, the speaker identification employed by the diarizer 1102 may include using voiceprints to distinguish between voices. In these and other embodiments, the diarizer 1102 may be configured to create a set of voiceprints for speakers using a device. The creation of voiceprint models will be described in greater detail below with reference to FIG. 62.

In some embodiments, to select between people using the voiceprints, the diarizer 1102 may collect a voice sample from audio originating at a device. The diarizer 1102 may compare collected voice samples to existing voiceprints associated with the device. In response to the voice sample matching a voiceprint, the diarizer 1102 may designate the audio as originating from a person that is associated with the matching voiceprint. In these and other embodiments, the diarizer 1102 may also be configured to use the voice sample of the speaker to update the voiceprint so that the voice match will be more accurate in subsequent matches. In response to the voice sample not matching a voiceprint, the diarizer 1102 may create a new voiceprint for the newly identified person.

In some embodiments, the diarizer 1102 may maintain speaker profiles in a speaker profile database 1106. In these and other embodiments, each speaker profile may correspond to a voiceprint in the voiceprint database 1104. In these and other embodiments, in response to the voice sample matching a voiceprint the diarizer 1102 may be configured to access a speaker profile corresponding to the matching voiceprint.

In some embodiments, the speaker profile may include ASR models or links to ASR models such as acoustic models, feature transformation models such as MLLR or fMLLR transforms, language models, vocabularies, lexicons, and confidence models, among others. The ASR models associated with the speaker profile may be models that are trained based on the voice profile of the person associated with the speaker profile. In these and other embodiments, the diarizer 1102 may make the ASR models available to the ASR system 1120 which may use the ASR models to perform speech recognition for speech in audio from the person. When using the ASR models associated with a speaker profile, the ASR system 1120 may be configured as a speaker-dependent system with respect to the person associated with the speaker profile.

In response to the voice sample not matching a voiceprint, the diarizer 1102 may be configured to instruct the model trainer 522 to train ASR models for the identified voice using the voice sample. The diarizer 1102 may also be configured to save/update profiles, including adapted ASR models, to the profile associated with the matching voiceprint. In some embodiments, the diarizer 1102 may be configured to transmit speaker information to the device upon matching a voiceprint in the voiceprint database 1104.

An example of the operation of the transcription unit 1114 is now provided. Audio of a communication session between two devices may be received by the transcription unit 1114. The communication session may be between a first device of a first user (e.g., the subscriber to the transcription service) and a second device of a second user, the speech of which may be transcribed. The diarizer 1102 may transmit an indicator such as "(new caller)" or "(speaker 1)" to the first device for presentation by the first device. In response to the diarizer 1102 detecting a voice change in the audio being received from the second device (i.e., the voice switches from a previous voice to a new voice), the diarizer 1102 may transmit an indicator such as "(new caller)" or "(speaker 2)" to the first device for presentation. The diarizer 1102 may compare the new voice to voiceprints from the voiceprint database 1104 associated with the second device when the second device is known or not new.

In response to the diarizer 1102 identifying or matching the new voice to an existing voiceprint (including voiceprints from previous communication sessions), an indicator identifying the matched speaker may be transmitted to the first device and ASR models trained for the new voice may be provided to an ASR system generating transcriptions of audio that includes the new voice. In response to the diarizer 1102 not matching the new voice, the diarizer 1102 may send an indication to the first device that the person is new or unidentified, and the diarizer 1102 may train a new speaker profile, model, and voiceprint for the new person.

Modifications, additions, or omissions may be made to the transcription unit 1114 and/or the components operating in transcription unit 1114 without departing from the scope of the present disclosure. For example, in some embodiments, the transcription unit 1114 may include additional elements, such as other ASR systems, a CA client, and fusers among other elements.

As another example, the speaker profile database 1106, the voiceprint database 1104, the ASR model trainer 1122, and the diarizer 1102 are illustrated in FIG. 11 as part of the transcription unit 1114, but the components may be implemented on other systems located locally or at remote locations and on other devices.

Figure 12:
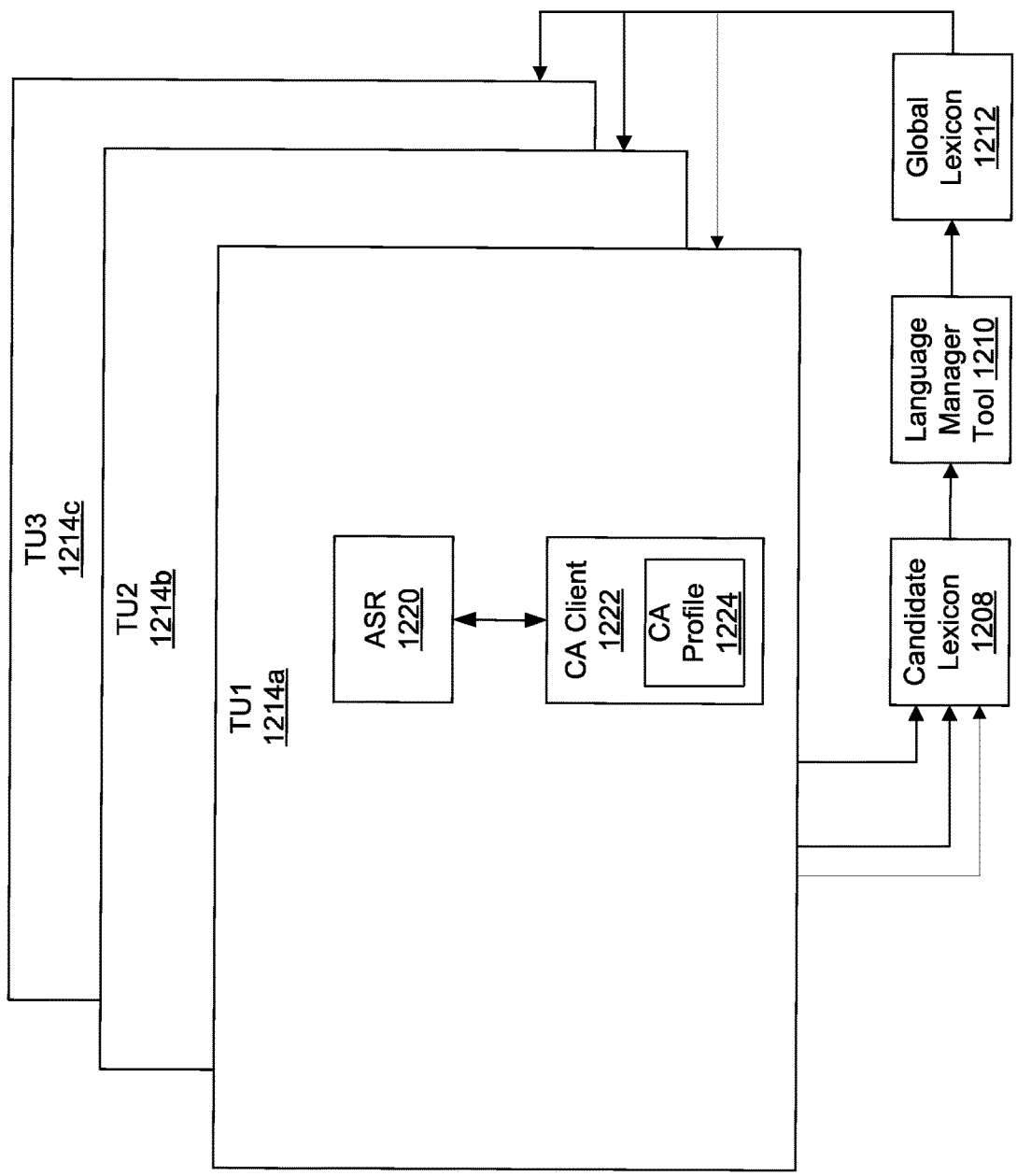
FIG. 12 is a schematic block diagram illustrating multiple transcription units.

FIG. 12 is a schematic block diagram illustrating multiple transcription units in accordance with some embodiments of the present disclosure. The multiple transcription units may include a first transcription unit 1214a, a second transcription unit 1214b, and a third transcription unit 1214c. The transcription units 1214a, 1214b, and 1214c may be referred to collectively as the transcription units 1214.

In some embodiments, the first transcription unit 114a may include an ASR system 1220 and a CA client 1222. The ASR system 1220 may be a revoiced ASR system that includes speaker-dependent models provided by the CA client 1222. The ASR system 1220 may operate in a manner analogous to other ASR systems described in this disclosure. The CA client 1222 may include a CA profile 1224 and may be configured to operate in a manner analogous to other CA clients described in this disclosure.

In some embodiments, the CA profile 1224 may include models such as a lexicon (a.k.a. vocabulary or dictionary), an acoustic model (AM), a language model (LM), a capitalization model, and a pronunciation model. The lexicon may contain a list of terms that the ASR system 1220 may recognize and may be constructed from the combination of several elements including an initial lexicon and terms added to the lexicon by the CA client 1222 as directed by a CA associated with the CA client 1222. In these and other embodiments, a term may be letters, numbers, initials, abbreviations, a word, or a series of words.

In some embodiments, the CA client 1222 may add terms to a lexicon associated with the CA client 1222 in several ways. The ways in which a term may be added may include: adding an entry to the lexicon based on input from a CA, adding a term to a list of problem terms or difficult-to-recognize terms for training by a module used by the ASR system 1220, and obtaining a term from the text editor based on the term being applied as an edit or correction of a transcription. In some embodiments, in addition to the term being added to the lexicon, an indication of how the term is to be pronounced may also be added to the lexicon.

In some embodiments, terms added to the lexicon of the CA profile 1224 may be used for recognition by the ASR system 1220. Additionally or alternatively, terms added to the lexicon of the CA profile 1224 may also be added to a candidate lexicon database 1208. A candidate lexicon database 1208 may include a database of terms that may be considered for distribution to other CA clients in a transcription system that includes the transcription units 1214 or other transcription systems.

In some embodiments, a language manager tool 1210 may be configured to manage the candidate lexicon database 1208. For example, in some embodiments, the language manager tool 1210 may manage the candidate lexicon database 1208 automatically or based on user input. Management of the candidate lexicon database 1208 may include reviewing the terms in the candidate lexicon database 1208. Once a candidate term has been reviewed, the candidate lexicon database 1208 may be updated to either remove the term or mark the term as accepted or rejected. A term marked as accepted may be provided to a global lexicon database 1212. The global lexicon database 1212 may provide lexicons to CA clients of multiple transcription units 1214 among other CA clients in a transcription system. The global lexicon database 1212 may be distributed to CA clients so that the terms recently added to the global lexicon database 1212 may be provided to the ASR systems associated with the CA clients such that the ASR systems may be more likely to recognize and generate a transcription with the terms.

In some embodiments, the language manager tool 1210 may determine to accept or reject terms in the candidate lexicon database 1208 based on counts associated with the terms. Alternatively or additionally, the language manager tool 1210 may evaluate whether a term should be reviewed based on a count associated with a term.

In some embodiments, for a particular term, counts of the term may include: (1) the number of different CA clients that have submitted the term to the candidate lexicon database 1208; (2) the number of times the term has been submitted to the candidate lexicon database 1208, by a CA client, by a group of CA clients, or across all CA clients; (3) the number of times the term appears at the output of an ASR system; (4) the number of times the term is provided to be displayed by a CA client for correction by a CA; (5) the number of times a text editor receives the term as a correction or edit; (6) the number of times a term has been counted in a particular period of time, such as the past m days, where m is, for example 3, 7, 14, or 30; and (7) the number of days since the term first appeared or since the particular count of the term, such as the 100; 500; 1,000; among other amounts. In some embodiments, more than one type of count as described above may be considered. For example, a combination of two, three, or four of the different types of counts may be considered. In these and other embodiments, for combinations of counts, the different counts in a combination may be normalized and combined to allow for comparison. In these and other embodiments, the one or more of the different type of counts may be weighted.

In some embodiments, the language manager tool 1210 may evaluate whether a term should be reviewed and/or added/rejected based on a count associated with the term and other information. The other information may include: Internet searches, including news broadcasts, lists of names, word corpora, and queries into dictionaries; and evidence that the term is likely to appear in conversations in the future based on the term appearing in titles of new movies, slang dictionaries, or the term being a proper noun, such as a name of city, place, person, company, or product.

An example of handling a term is now provided. In this example, the term may be "skizze," which may be a previously unknown word. One hundred CA clients may add the term "skizze," to their CA profile or to the candidate lexicon database 1208. Additionally, the term may appear in transcriptions seven-hundred times over thirty days. The language manager tool 1210, based on these counts meeting selected criteria, may automatically add the term to the global lexicon database 1212. Additionally or alternatively, the language manager tool 1210 may present the term, along with its counts and other usage statistics, to a language manager (a human administrator) via a user interface where candidate terms are presented in a list. The list may be sorted by counts. In these and other embodiments, the language manager tool 1210 may accept inputs from the language manager regarding how to handle a presented term.

In some embodiments, the global lexicon database 1212, after being provided to the CA client 1222, may be used by the CA client 1222 in various ways. For example, the CA client 1222 may use the terms in the global lexicon database 1212 in the following ways: (1) if the CA client 1222 obtains a term from a CA through a text editor that is not part of the base lexicon, the lexicon of the CA client 1222 particular to the CA, the global lexicon database 1212, or other lexicons used by the transcription system such as commercial dictionaries, the CA client 1222 may present a warning, such as a pop-up message, that the term may be invalid. In these and other embodiments, when a warning is presented, the term may not be able to be entered. Alternatively or additionally, when a warning is presented, the term may be entered based on input obtained from a CA. Alternatively or additionally, when a warning is presented, the CA client 1222 may provide an alternative term from a lexicon; (2) terms in the global lexicon database 1212 may be included in the ASR system vocabulary so that the term can be recognized or more easily recognized; and (3) terms that are missing from the global lexicon database 1212 or, alternatively, terms that have been rejected by the language manager or language manager tool 1210, may be removed from the CA client 1222.

In some embodiments, the CA client 1222 may use multiple lexicons. For example, the ASR system 1220 may use a first lexicon or combination of lexicons for speech recognition and a text editor of the CA client 1222 may use a second lexicon or set of lexicons as part of or in conjunction with a spell checker.

Modifications, additions, or omissions may be made to the transcription units 1214 and/or the components operating in transcription units 1214 without departing from the scope of the present disclosure. For example, in some embodiments, there may be more or less than three transcription units 1214 that may use the global lexicon database 1212. The three transcription units 1214 are merely illustrative. Alternatively or additionally, the first transcription unit 1214a may include additional elements, such as other ASR systems and fusers among other elements.

FIGS. 13-17, among others, describe various systems and methods that may be used to merge two or more transcriptions generated by separate ASR systems to create a fused transcription. In some embodiments, the fused transcription may include an accuracy that is improved with respect to the accuracy of the individual transcriptions combined to generate the fused transcription.

Figure 13:
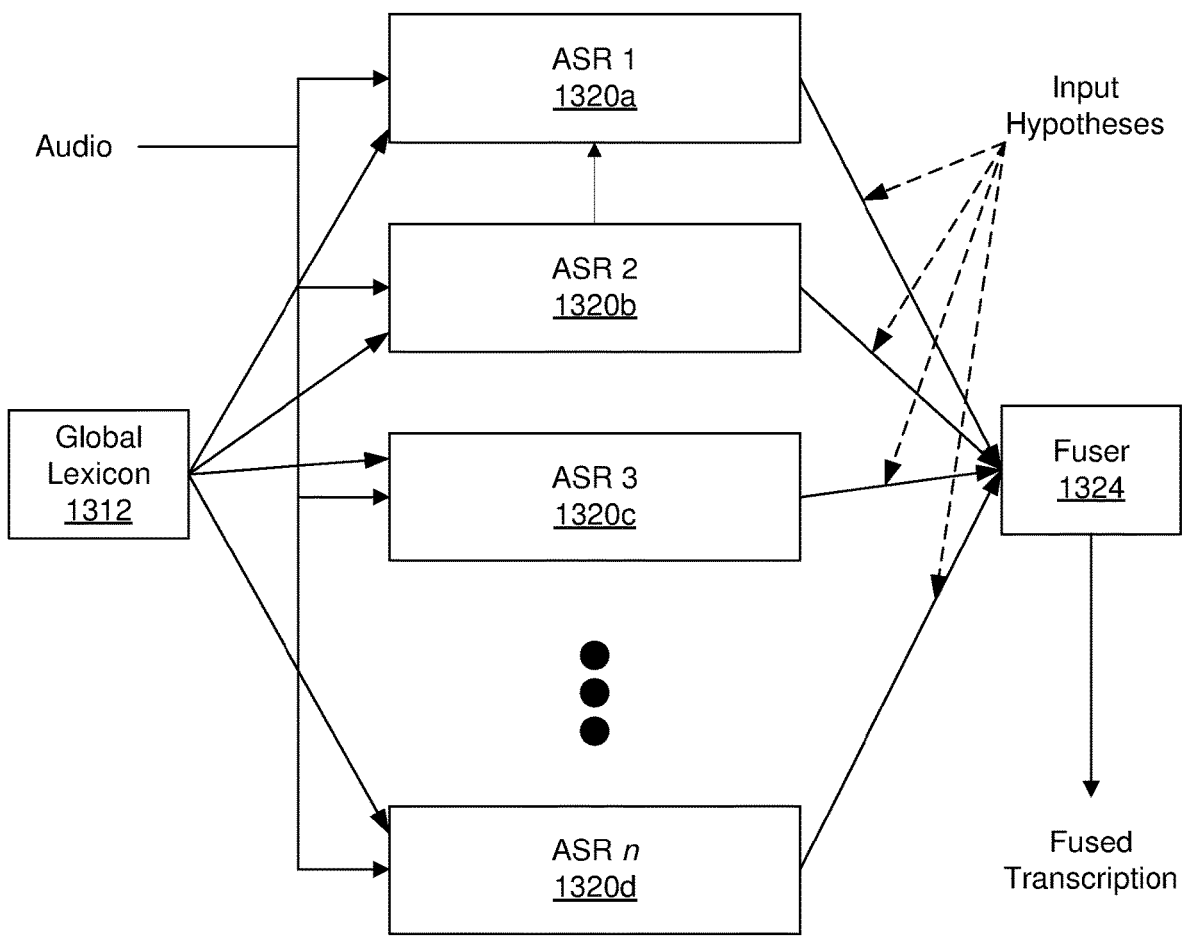
FIG. 13 is a schematic block diagram illustrating combining the output of multiple automatic speech recognition (ASR) systems.

FIG. 13 is a schematic block diagram illustrating combining the output of multiple ASR systems in accordance with some embodiments of the present disclosure. FIG. 13 may include a first ASR system 1320a, a second ASR system 1320b, a third ASR system 1320c, and a fourth ASR system 1320d, collectively or individually referred to as the ASR systems 1320.

In some embodiments, the ASR systems 1320 may be speaker-independent, speaker-dependent, or some combination thereof. Alternatively or additionally, each of ASR systems 1320 may include a different configuration, the same configuration, or some of the ASR systems 1320 may have a different configuration than other of the ASR systems 1320. The configurations of the ASR systems 1320 may be based on ASR modules that may be used by the ASR systems 1320 to generate transcriptions. For example, in FIG. 13, the ASR system 1320 may include a lexicon module from a global lexicon database 1312. Alternatively or additionally, the ASR systems 1320 may each include different lexicon modules.

In some embodiments, the audio provided to the ASR systems 1320 may be revoiced, regular, or a combination of revoiced and regular. Alternatively or additionally, the ASR systems 1320 may be included in a single transcription unit or spread across multiple transcription units. Additionally or alternatively, the ASR systems 1320 may be part of different API services, such as services provided by different vendors.

In some embodiments, each of the ASR systems 1320 may be configured to generate a transcription based on the audio received by the ASR systems 1320. The transcriptions, referred to sometimes in this and other embodiments as "hypotheses," may have varying degrees of accuracy depending on the particular configuration of the ASR systems 1320. In some embodiments, the hypotheses may be represented as a string of tokens. The string of tokens may include one or more of sentences, phrases, or words. A token may include a word, subword, character, or symbol.

FIG. 13 also illustrates a fuser 1324. In some embodiments, the fuser 1324 may be configured to merge the transcriptions generated by the ASR systems 1320 to create a fused transcription. In some embodiments, the fused transcription may include an accuracy that is improved with respect to the accuracy of the individual transcriptions combined to generate the fused transcription. Additionally or alternatively, the fuser 1324 may generate multiple transcriptions.

Examples of different configurations of the ASR systems 1320 (using two ASR systems, ASR1 and ASR2 as examples), the respective output transcriptions of which may be combined through fusion, are described below in Table 3.

TABLE 3

1. ASR1 and ASR2 may be built or trained by different vendors for different applications.
2. ASR1 and ASR2 may be configured or trained differently or use different models.
3. ASR2 may run in a reduced mode or may be "crippled" or deliberately configured to deliver results with reduced accuracy, compared to ASR1. Because ASR2 may tend to perform reasonably well with speech that is easy to understand, and therefore closely match the results of ASR1, the agreement rate between ASR1 and ASR2 may be used as a measure of how difficult it is to recognize the speech. The rate may therefore be used to predict the accuracy of ASR1, ASR2, and/or other ASR systems. Examples of crippled ASR system configurations may include:
   a. ASR2 may use a different or smaller language model, such as a language model containing fewer n-gram probabilities or a neural net with fewer nodes or connections. If the ASR1 LM is based on n-grams, the ASR2 LM may be based on unigrams or n-grams where n for ASR2 is smaller than n for ASR1.
   b. ASR2 may add noise to or otherwise distort the input audio signal.
   c. ASR2 may use a copy of the input signal that is shifted in time, may have speech analysis frame boundaries starting at different times from those of ASR1, or may operate at a frame rate different from ASR1. As a result, speech samples may be divided into frames differently, compared to ASR1, and frame-based signal analysis may result in a set of extracted features different from those of ASR1.
   d. ASR2 may use an inferior acoustic model, such as one using a smaller DNN.
   e. ASR2 may use a recognizer trained on less data or on training data that is mismatched to the production data.
   f. ASR2 may be an old version of ASR1. For example, it may be trained on older data or it may lack certain improvements.
   g. ASR2 may perform a beam search using a narrower beam, relative to the beam width of ASR1.
   h. ASR1 and/or ASR2 may combine the results from an acoustic model and a language model to obtain one or more hypotheses, where the acoustic and language models are assigned relatively different weights. ASR2 may use a different weighting for the acoustic model vs. the language model, relative to the weighting used by ASR1.
   i. Except for the differences deliberately imposed to make ASR2 inferior, ASR2 may be substantially identical to ASR1, in that it may use substantially identical software modules, hardware, training processes, configuration parameters, and training data.
4. ASR1 and ASR2 may use models that are trained on different sets of acoustic and/or text data (see Table 4).

Alternatively or additionally, examples of different configurations of the ASR systems 1320 may include the ASR systems 1320 being built using different software, trained on different data sets, configured with different runtime parameters, and provided audio that has been altered in different ways, or otherwise configured to provide different results. In these and other embodiments, the data sets may include the data that may be used to train modules that are used by the ASR systems 1320. In these and other embodiments, the different data sets may be divided into multiple training sets using one or more of several methods as listed below in Table 4. Additional details regarding dividing training sets are provided with respect to FIG. 77 among others.

TABLE 4

1. Divide the data based on calling patterns such as long communication sessions vs. short communication sessions, communication sessions to numbers frequently called (such as friends) vs. communication sessions to numbers infrequently called (such as strangers), or inbound communication sessions vs. outbound communication sessions.
2. Cluster the data into groups, for example by training several recognizers, associating each data point with the recognizer that gives the data point the highest ASR confidence score, retraining each recognizer using the data points associated with the recognizer, and iterating to form clusters.
3. Divide the data by conversational topic.
4. Divide the data by the service used to collect the data. Examples of services include a transcribed communication session, communication session transcription and analytics, voice mail transcription, personal voice assistants, IVR services, reservation services, etc.
5. Divide the data by time, such as a range of dates or time of day.
6. Divide the data by account type (see Table 10).
7. Divide the data by speaker category or demographic such as accent or dialect, geographical region, gender, age (child, elderly, etc.), speech impaired, hearing impaired, etc.
8. Separate audio spoken by a set of first user(s) from audio spoken by a set of second user(s).
9. Separate revoiced audio from regular audio.
10. Separate data from phones configured to present transcriptions from data from other phones.

Combining of transcriptions to generate a fused transcription may have multiple beneficial applications in a transcription system including: (1) helping to provide more accurate transcriptions, for example when a speaker who is particularly difficult to understand or when accuracy is more critical, such as with high-priority communication sessions—see item 76 of Table 5); (2) helping to provide more accurate transcriptions for training models, notably acoustic models and language models; (3) helping to provide more accurate transcriptions for evaluating CAs and measuring ASR performance; (4) combining results from an ASR system using revoiced audio and an ASR system using regular audio to help generate a more accurate transcription; and (5) tuning a transcription unit/transcription system for better performance by adjusting thresholds such as confidence thresholds and revoiced/regular ASR selection thresholds, by measuring revoiced ASR or regular ASR accuracy, and for selecting estimation, prediction, and transcription methods.

In some embodiments, the fuser 1324 may be configured to combine the transcriptions by denormalizing the input hypotheses into tokens. In these and other embodiments, the tokens may be aligned, and a voting procedure may be used to select a token for use in the output transcription of the fuser 1324. Additional information regarding the processing performed by the fuser 1324 may be provided with respect to FIG. 14.

In some embodiments, the fuser 1324 may be configured to utilize one or more neural networks, where the neural networks process multiple hypotheses and output the fused hypothesis. In some embodiments, the fuser 1324 may be implemented as ROVER (Recognizer Output Voting Error Reduction), a method developed by NIST (National Institute of Science and Technology). Modifications, additions, or omissions may be made to FIG. 13 and/or the components operating in FIG. 13 without departing from the scope of the present disclosure. For example, in some embodiments, a transcription from a human, such as from a stenography machine, may be provided as an input hypothesis to the fuser 1324.

Figure 14:
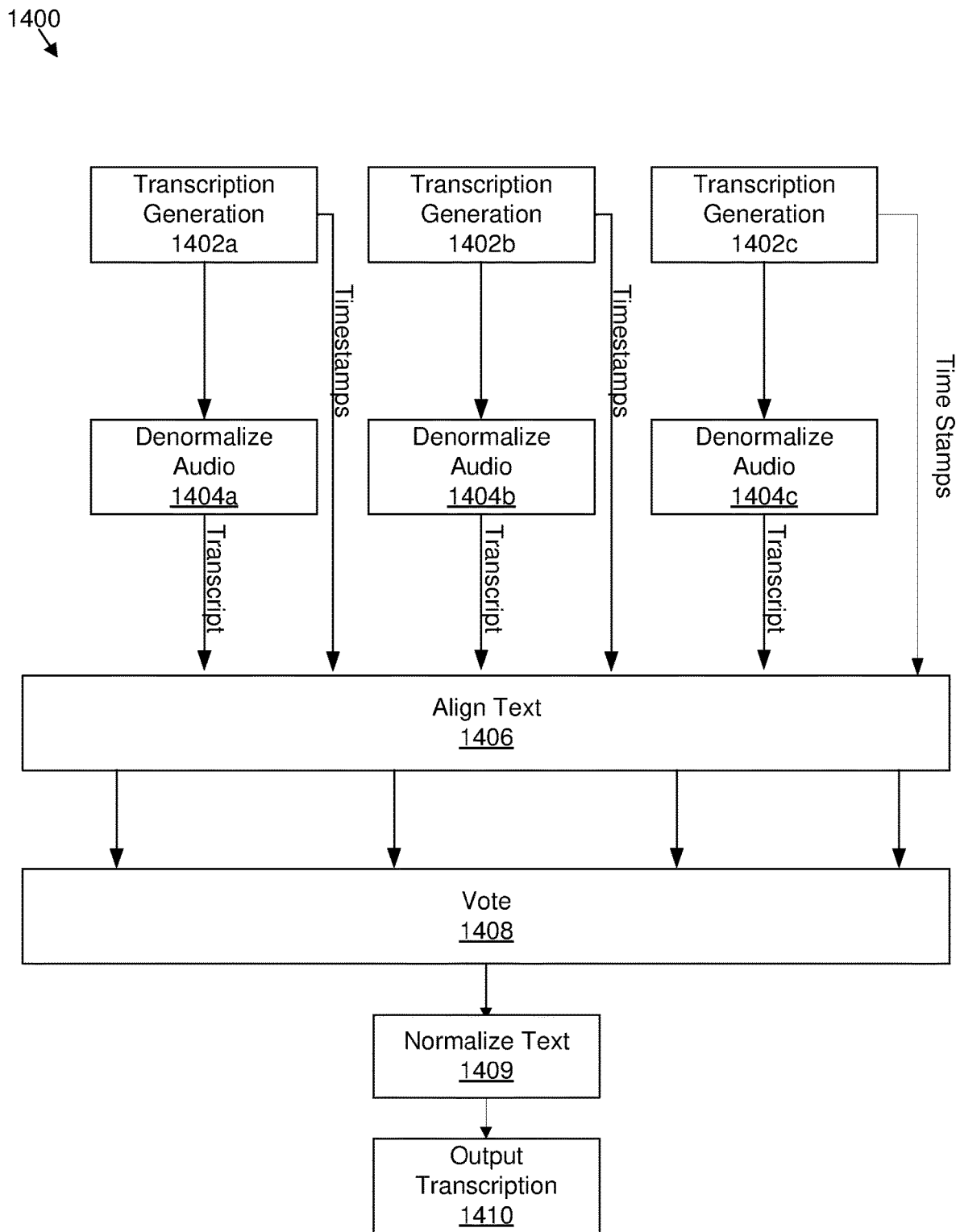
FIG. 14 illustrates a data flow to fuse multiple transcriptions.

FIG. 14 illustrates a process 1400 to fuse multiple transcriptions. The process 1400 may be arranged in accordance with at least one embodiment described in the present disclosure. The process 1400, generally, may include generating transcriptions of audio and fusing the transcriptions of the audio. For example, the process 1400 may include a transcription generation process 1402, denormalize text process 1404, align text process 1406, voting process 1408, normalize text process 1409, and output transcription process 1410. The transcription generation process 1402 may include a first transcription generation process 1402a, a second transcription generation process 1402b, and a third transcription generation process 1402c. The denormalize text process 1404 may include a first denormalize text process 1404a, a second denormalize text process 1404b, and a third denormalize text process 1404c.

The transcription generation process 1402 may include generating transcriptions from audio. The transcription generation process 1402 may be performed by ASR systems. For example, the first transcription generation process 1402a, the second transcription generation process 1402b, and the third transcription generation process 1402c may be performed by the first ASR system 1320a, the second ASR system 1320b, and the third ASR system 1320c, respectively, of FIG. 13. The transcriptions may be generated in the manner described with respect to the ASR systems 1320 of FIG. 13 and is not repeated here. In these and other embodiments, the transcriptions generated by the transcription generation process 1402 may each include a set of hypotheses. Each hypothesis may include one or more tokens such as words, subwords, letters, or numbers, among other characters.

In some embodiments, the denormalize text process 1404, the align text process 1406, the voting process 1408, the normalize text process 1409, and the output transcription process 1410 may be performed by a fuser, such as the fuser 1324 of FIG. 13 or the fuser 124 of FIG. 1.

The first denormalize text process 1404a, the second denormalize text process 1404b, and the third denormalize text process 1404c may be configured to receive the tokens from the first transcription generation process 1402a, the second transcription generation process 1402*b*, and the third transcription generation process 1402*c*, respectively. The denormalize text process 1404 may be configured to cast the received tokens into a consistent format. In short, the term "denormalize" as used in this disclosure may include a process of converting tokens, e.g., text, into a less ambiguous format that may reduce the likelihood of multiple interpretations of the tokens. For example, a denormalize process may convert an address from "123 Lake Shore Dr.," where "Dr." may refer to drive or doctor, into "one twenty three lake shore drive.

Generally, generated transcriptions, whether from an ASR system or a human, may be in a form that is easily read by humans. For example, if a speaker in a phone communication session says, "One twenty three Lake Shore Drive, Chicago Ill.," the transcription may read as "123 Lake Shore Dr. Chicago Ill." This formatting process is called normalization. While the normalization formatting process may make transcriptions easier to read by humans, the normalization formatting process may cause an automatic transcription alignment and/or voting tool to count false errors that arise from formatting, rather than content, even when the transcription is performed correctly. Similarly, differences in formatting may cause alignment or voting errors. Alternatively or additionally, the normalization formatting process may not be consistent between different ASR systems and people. As a result, a transcription based on the same audio from multiple ASR systems and a reference transcription may be formatted differently. For these reasons, denormalizing may be useful in reducing false errors based on formatting because the denormalizing converts the tokens into a uniform format. Additionally or alternatively, the fuser may incorporate rules of equivalency, such as "gonna"="going to" or "she's"="she is," into the alignment and/or voting processes.

In these and other embodiments, the normalization formatting process may also result in inaccurate scoring of transcriptions when a reference transcriptions in compared to a hypothesis transcription. The scoring of the transcriptions may relate to the determining an accuracy or error rate of a hypothesis transcriptions as discussed later in this disclosure. In these and other embodiments, the reference transcriptions and hypothesis transcriptions may be denormalized to reduce false errors that may result in less accurate score for hypothesis transcriptions.

During the denormalize text process 1404, the tokens may be "denormalized" such that most or all variations of a phrase may be converted into a single, consistent format. For example, all spellings of the name "Cathy," including "Kathy," "Kathie," etc., may be converted to a single representative form such as "Kathy" or into a tag that represents the class such as "<kathy>." Additionally or alternatively, the denormalize text process 1404 may save the normalized form of a word or phrase before denormalization, then recall the normalized form after denormalization. This may be beneficial because if a CA edits a word to be "Cathy" and an ASR system transcribes the word as "Kathie" and both are denormalized to "Kathy" both input spellings may be lost which may reduce potential data for future training of models. In some embodiments, the denormalize text process 1404 may be configured to save and recall the original form of the candidate word, such as by denormalizing the token to a list form that allows multiple options such as "{Cathy, Kathy, Kathie}" and "Kathy" may be denormalized as "{Kathy, Cathy, Kathie}," where the first element in the list is the original form. In these and other embodiments, the list form may be used for alignment and voting and the first element of the list (or the saved original form) may be used for display. The denormalize text process 1404 may provide the denormalized text/tokens to the align text process 1406.

The align text process 1406 may be configured to align tokens in each denormalized hypothesis so that similar tokens are associated with each other in a token group. By way of explanation and not implementation, each hypothesis may be inserted into a row of a spreadsheet or database, with matching words from each hypothesis arranged in the same column. Additionally or alternatively, the align text process 1406 may add variable or constant delay to synchronize similar tokens. The adding variable or constant delay may be performed to compensate for transcription processes being performed with varied amounts of latency.

For example, if a revoiced ASR system has greater latency than a non-revoiced ASR system, the align text process 1406 may shift the output of the non-revoiced ASR system in time so that the non-revoiced output is more closely synchronized with output from the revoiced ASR system. The align text process 1406 may provide the aligned tokens to the voting process 1408.

The voting process 1408 may be configured to determine an ensemble consensus from each token group. Returning to the previous spreadsheet example, each column of the spreadsheet may include the candidate tokens from the different hypothesis transcriptions. The voting process 1408 may analyze all of the candidate tokens and, for example, voting may be used to select a token that appears most often in the column.

In some embodiments, such as for training models, the output of the voting process 1408 may be used in its denormalized form. For example, if a transcription is denormalized at denormalize text process 1404 (e.g., a "21" may be converted to "twenty one"), the text may remain in its denormalized form and the voting process 1408 may provide denormalized text (e.g., "twenty one") to a model trainer.

In some embodiments, the voting process 1408 may provide an output to the normalize text process 1409. The normalize text process 1409 may be configured to cast the fused output text from the voting process 1408 into a more human-readable form. The normalize text process 1409 may utilize one or more of several methods, including, but not limited to:

1. The normalized form from an input hypothesis may be saved during the denormalize text process 1404 and the normalize text process 1409 may recall the normalized form, as described above for the name "Kathy," and may reapply the normalization formatting to the voting output. The normalized form of a given token or set of tokens may be taken, for example, from the input that provides the winning token or set of tokens in the voting process.
2. The normalize text process 1409 may use a normalization model that may be constructed from normalized and denormalized text using, for example, the method described below with reference to FIG. 58, but where the model trainer inputs are reversed (compared to the description of FIG. 58) so that it learns to convert a denormalized string to a normalized string.
3. The normalize text process 1409 may use a normalization model that may be constructed from a corpus of normalized and denormalized text using the method described below with reference to FIG. 15 for training a punctuation model 1506 or capitalization model 1518.

4. The normalize text process 1409 may use the method described below with reference to FIG. 16 for removing and reinserting punctuation and capitalization for text.

An example of the process 1400 is now provided. In this example, a speaker may say "OK, let's meet at four." During the transcription generation process 1402, three different ASR systems (e.g., ASR systems 1320 of FIG. 13) may each generate one of the below hypotheses:
1. OK, let's meet more.
2. OK, says meet at 4:00.
3. OK, ha let's meet at far.

During the denormalize text process 1404, these hypotheses may be denormalized to yield the following denormalized hypotheses:
1. o k let us meet more
2. o k says meet at four o'clock
3. o k ha let us meet at far The align text process 1406 may align the tokens, e.g. the words in the above hypotheses, so that as many identical tokens as possible lie in each token group. In some embodiments, the alignment may reduce the edit distance (the minimum number of insertions, deletions, and substitutions to convert one string to the other) or Levenshtein distance between denormalized hypotheses provided to the align text process 1406 after the denormalized hypotheses have been aligned. Additionally or alternatively, the alignment may reduce the edit or Levenshtein distance between each aligned denormalized hypothesis and the fused transcription. Where a hypothesis does not have a token for a given token group, a tag such as a series of "-" characters may be inserted into the token group for the missing token. An example of the insertion of a tag into token groups is provided below with respect to the hypotheses from above. The token groups are represented by columns that are separated by tabs in the below example.

| 1. | o k | -- | let | us | meet | -- | more | ------- |
| 2. | o k | -- | says | -- | meet | at | four | o'clock |
| 3. | o k | ha | let | us | meet | at | far | ------- |

The voting process 1408 may be configured to examine each token group and determine the most likely token for each given group. The mostly likely token for each given group may be the token with the most occurrences in the given group. For example, the most frequent token in the fourth token group, which includes tokens "let," "says," and "let," is "let." When multiple tokens appear the same number of times, such as when each hypothesis contains a different token in a given token group, any of several methods may be used to break the tie, including but not limited to, selecting a token at random or selecting the token from the ASR system determined to be most reliable. In these and other embodiments, selecting a token from a token group may be referred to as voting. In these and other embodiments, the token with the most votes may be selected from its respective token group.

In some embodiments, other methods for aligning and/or voting may be used than those described above, including ROVER, alternate methods for multiple sequence alignment, BAYCOM (Bayesian Combination), CNC (confusion network combination), frame-based system combination or minimum fWER (time frame word error), and hidden Markov models used for multiple sequence alignment. Additionally or alternatively, a neural network may be used for aligning and/or voting. For example, hypotheses may be input into a neural network, using an encoding method such as one-hot or word embedding, and the neural network may be trained to generate a fused output. This training process may utilize reference transcriptions as targets for the neural network output.

Additionally or alternatively, other criteria that may be used with or in addition to voting, or other methods for fusion and voting as described above, may be used to select the most suitable or correct token from a token group. Alternatively or additionally, these additional criteria may also be used to break ties in a voting scheme. In some embodiments, the additional criteria may include probability, confidence, likelihood, or other statistics from models that describe word or error patterns, and other factors that weigh or modify a score derived from word counts. For example, a token from an ASR system with relatively higher historical accuracy may be given a higher weight. Historical accuracy may be obtained by running ASR system accuracy tests or by administering performance tests to the ASR systems. Historical accuracy may also be obtained by tracking estimated accuracy on production traffic and extracting statistics from the results.

Additional criteria may also include an ASR system including a relatively higher estimated accuracy for a segment (e.g., phrase, sentence, turn, series, or session) of words containing the token. Yet another additional criterion might be analyzing a confidence score given to a token from the ASR system that generated the token.

Another additional criterion may be to consider tokens from an alternate hypothesis generated by an ASR system. For example, an ASR system may generate multiple ranked hypotheses for a segment of audio. The tokens may be assigned weights according to each token's appearance in a particular one of the multiple ranked hypotheses. For example, the second-best hypothesis from an n-best list or word position in a word confusion network ("WCN") may receive a lower weight than the best hypothesis. Thus, tokens from the lower second-best hypothesis may be weighted less than tokens from the best hypothesis. In another example, a token in an alternate hypothesis may receive a weight derived from a function of the relative likelihood of the token as compared to the likelihood of a token in the same word order position of the best hypothesis. Likelihood may be determined by a likelihood score from an ASR system that may be based on how well the hypothesized word matches the acoustic and language models of the ASR system.

In some embodiments, another criteria that may be considered by the voting process 1408 when selecting a token may include the error type. In these and other embodiments, the voting process 1408 may give precedence to one type of error over another when selecting between tokens. For example, when the error type is a missing token from a token group, the voting process 1408 may select insertion of tokens over deletion of tokens. A missing token from a token group may refer to the circumstance for a particular token group when a first hypothesis does not include a token in the particular token group and a second hypothesis does include a token in the particular token group. In these and other embodiments, insertion of a token may refer to using the token in the particular token group in an output. Deletion of a token may refer to not using the token in the particular token group in the output. For example, if two hypotheses include tokens and token groups as follows:

| | | | |
|---|---|---|---|
| 1. | I | like | cats |
| 2. | I | — | cats | then the voting process 1408 may be configured to select insertion of tokens rather than deletion of tokens. In these and other embodiments, the voting process 1408 may select the first hypothesis as the correct one. Alternatively or additionally, the voting process 1408 may select deletion of tokens in place of insertion of tokens.

Additionally or alternatively, the voting process 1408 may select insertion or deletion based on the type of ASR systems that results in the missing tokens. For example, the voting process 1408 may consider insertions from a revoiced ASR system differently from insertions from a non-revoiced ASR system. For example, if the non-revoiced ASR system omits a token that the revoiced ASR system included, the voting process 1408 may select insertion of the token and output the result from the revoiced ASR system. In contrast, if the revoiced ASR system omits a token that the non-revoiced ASR system included, the voting process 1408 may output the non-revoiced ASR system token only if one or more additional criteria are met, such as if the language model confidence in the non-revoiced ASR system word exceeds a particular threshold. As another example, the voting process 1408 may consider insertions from a first ASR system running more and/or better models than a second ASR system differently than insertions from the second ASR system.

In some embodiments, another criteria that may be considered by the voting process 1408 when selecting a token may include an energy or power level of the audio files from which the transcriptions are generated. For example, if a first hypothesis does not include a token relative to a second hypothesis, then the voting process 1408 may take into account the level of energy in the audio file corresponding to the deleted token. Various examples of selecting between tokens based on energy levels are now provided.

In a first example, the voting process 1408 may include a bias towards insertion (e.g., the voting process 1408 may select the phrase "I like cats" in the above example) if an energy level in one or more of the input audio files during the period of time corresponding to the inserted token (e.g., "like") is higher than a high threshold. In these and other embodiments, the voting process 1408 may include a bias towards deletion (e.g., selecting "I cats") if the energy level in one or more of the input audio files during the period of time corresponding to the inserted word is lower than a low threshold. The high and low thresholds may be based on energy levels of human speech. Additionally or alternatively, the high and low thresholds may be set to values that increase accuracy of the fused output. Additionally or alternatively, the high and low thresholds may both be set to a value midway between average speech energy and the average energy of background noise. Additionally or alternatively, the low threshold may be set just above the energy of background noise and the high threshold may be set just below the average energy of speech.

In a second example, the voting process 1408 may include a bias towards insertions if the energy level is lower than the low threshold. In a third example, the voting process 1408 may include a bias towards non-revoiced ASR system insertions when the energy level from the revoiced ASR system is low. In these and other embodiments, the non-revoiced ASR system output may be used when the energy level in the revoiced ASR system is relatively low. A relatively low energy level of the audio used by the revoiced ASR system may be caused by a CA not speaking even when there are words in the regular audio to be revoiced. In these and other embodiments, the energy level in the non-revoiced ASR system may be compared to the energy level in the revoiced ASR system. When there is a difference between the energy levels that is greater than a difference threshold, the non-revoiced ASR system output may be used. In these and other embodiments, the difference threshold may be based on the energy levels that occur when a CA is not speaking, when there are words in the audio or the CA is speaking only a portion of the words in the audio. As a result, the revoiced audio may not include words that the regular audio includes thereby resulting in a difference in the energy levels of the audio processed by the revoiced ASR system and the non-revoiced ASR system.

In some embodiments, another criteria that may be considered by the voting process 1408 when selecting a token may include outputs of one or more language models. The other criteria discussed above are examples of criteria that may be used. In these and other embodiments, the additional criteria may be used to determine alignment of tokens and improve the voting process 1408, as well as being used for other purposes. Alternatively or additionally, one or more of the additional criteria may be used together.

In some embodiments, other criteria may include one or more of the features described below in Table 5. These features may be used alone, in combination with each other, or in combination with other features.

TABLE 5

1. Account type (e.g., residential, IVR, etc., see Table 10) determined for the speaker, or second user, being transcribed. The account type may be based on a phone number or device identifier. The account type may be used as a feature or to determine a decision, for example, by automating all of certain account types such as business, IVR, and voicemail communication sessions.
2. The subscriber, or first user, account type.
3. The transcription party's device type (e.g., mobile, landline, videophone, smartphone app, etc.). It may include the specific device make and model. The specific device make and model may be determined by querying databases such as user account or profile records, transcription party customer registration records, from a lookup table, by examining out-of-band signals, or based on signal analysis.
4. The subscriber's device type. This may include the captioned phone brand, manufacture date, model, firmware update number, headset make and model, Bluetooth device type and model, mode of operation (handset mode, speakerphone mode, cordless phone handset, wired headset, wireless headset, paired with a vehicle, connected to an appliance such as a smart TV, etc.), and version numbers of models such as ASR models.
5. Historical non-revoiced ASR system or revoiced ASR system performance estimated from past communication session involving one or more of the calling parties on the current communication session. In a first example, the average estimated accuracy, across all transcribed parties, when transcribing communication sessions for the first user may be used as a feature. In a second example, the average estimated accuracy when transcribing TABLE 5-continued a particular second user during one or more previous communication sessions may be used as a feature. An implementation of a selector that uses the second example of this feature may include:
  a. Transcribe a first communication session with a particular transcription party and estimate one or more first performance metrics such as ASR accuracy.
  b. At the end of the communication session, store at least some of the first performance metrics.
  c. A second communication session with the same transcription party is initiated.
  d. The selector retrieves at least some of the first performance metrics.
  e. The selector uses the retrieved first performance metrics to determine whether to start captioning the second captioned communication session with a non-revoiced ASR system, a revoiced ASR system, or combination thereof (see Table 1).
  f. A transcription unit generates a transcription of a first portion of the second communication session.
  g. During the second communication session, the selector uses the retrieved performance metrics and information from the second communication session to select a different option of the non-revoiced ASR system, a revoiced ASR system, or combination thereof for captioning a second portion of the second communication session. Examples of information from the second communication session may include an estimated ASR accuracy, an agreement rate between the non-revoiced ASR system and a revoiced ASR system and other features from Table 2, Table 5, and Table 11.
6. Historical non-revoiced ASR system or revoiced ASR system accuracy for the current transcription party speaker, who may be identified by the transcription party's device identifier and/or by a voiceprint match.
7. Average error rate of the revoiced ASR system generating the transcription of the current communication session or the revoiced ASR system likely to generate the transcriptions for the current communication session if it is sent to a revoiced ASR system. The error rate may be assessed from previous communication sessions transcribed by the revoiced ASR system or from training or QA testing exercises. These exercises may be automated or may be supervised by a manager.
8. Average ASR error rate, estimated from past accuracy testing.
9. A measure of the processing resources used to transcribe audio for the current communication session. Resources may be measured, for example, by CPU load, memory usage, the number of active arcs in a decoder search, processing time, instruction cycles per second or per speech analysis frame, processing resources used by a specified ASR sub-process, etc.
10. Average error rate of a group of revoiced ASR system or across all revoiced ASR systems.
11. Estimated ASR accuracy, confidence, or other performance statistic for the current session. This performance statistic may be derived from a figure reported by the ASR system or from an estimator using one or more input features, such as from Table 2 and Table 5. ASR performance may include word confidence averaged over a series of words such as a sentence, phrase, or turn.
  a. The performance statistic may be determined for an ASR system.
  b. The performance statistic may be determined from a fused transcription, where the fusion inputs include hypotheses from one or more revoiced ASR system and/or one or more non-revoiced ASR system.
  c. The performance statistic may include a set of performance statistics for each of multiple ASR systems or a statistic, such as an average, of the set of performance statistics.
12. A log-likelihood ratio or another statistic derived from likelihood scores. An example may be the likelihood or log likelihood of the best hypothesis minus the likelihood or log likelihood of the next-best hypothesis, as reported by an ASR system. In the case of a hypothesis containing multiple words, this feature may be computed as the best minus next-best likelihood or log likelihood for each word, averaged over a string of words. Other confidence or accuracy scores reported by the ASR system may be substituted for likelihood.
13. The following features may be used directly or to estimate a feature including an estimated transcription quality metric:
  a. Features derived from the sequence alignment of multiple transcriptions. For example, features may be derived from a transcription from a non-revoiced ASR system aligned with a transcription from a revoiced ASR system. Example features include:
    i. The number or percentage of correctly aligned words from each combination of aligned transcriptions from non-revoiced ASR systems and revoiced ASR systems. The percentage may refer to the number correctly aligned divided by the number of tokens. "Correctly aligned" may be defined as indicating that tokens in a token group match when two or more hypotheses are aligned.
    ii. The number or percentage of incorrectly aligned tokens (e.g., substitutions, insertions, deletions) from each combination of aligned transcriptions from non-revoiced ASR systems and revoiced ASR systems.
  b. The following features may be derived using a combination of n-gram models and/or neural network language models such as RNNLMs. The features may be derived either from a single ASR system hypothesis transcription or from a combination of transcriptions from non-revoiced ASR systems and/or revoiced ASR systems. For example, the features may be derived from multiple n-gram language models and multiple RNNLM models, each with at least one generic language model and one domain-specific language model.
    i. Perplexity, such as the average word perplexity.
    ii. The sum of word probabilities or log word probabilities.
    iii. The mean of word probabilities or log word probabilities, where the mean may be determined as the sum of word or log word probabilities divided by the number of words.
  c. The following part of speech (POS) features derived from transcriptions from non-revoiced ASR systems and/or revoiced ASR systems as determined using a POS tagger:
    i. The percentage of content words. Content words may be defined as words representing parts of speech defined as content words (such as nouns, verbs, adjectives, numbers, and adverbs, but not articles or conjunctions). Alternatively, content words may be classified based on smaller word subcategories such as NN, VB, JJ, NNS, VBS, etc., which are symbols denoted by one or more existing POS taggers.
    ii. Conditional probability or average conditional probability of each word's POS given the POS determined for one or more previous and/or next words. For example, if a word's POS is POS2, the previous word's POS is POS1, and the next word's POS is POS3, the conditional probability for the word's POS is P(POS2 | POS1, POS3). The average TABLE 5-continued conditional probability may be the conditional word POS probability averaged over the words in a series of words such as a sentence.
   iii. Per-word or per-phrase confidence scores from the POS tagger.
  d. Lexical features derived from transcriptions from non-revoiced ASR systems and/or revoiced ASR systems, such as:
   i. Lexical diversity, which may be the number of unique words divided by the total number of words.
   ii. Percentages of fricatives, liquids, nasals, stops, and vowels.
   iii. Percentage of homophones or near-homophones (words sounding nearly alike).
  e. Time and frequency domain representations of the audio signal. For example, these representations may be provided as input to a neural net or used as input to an estimator or classifier for purposes of, for example, estimating confidence, accuracy, speaker intelligibility, and non-revoiced ASR system/revoiced ASR system selection. Representations may include:
   i. Audio samples.
   ii. Complex DFT of a sequence of audio samples.
   iii. Magnitude and/or phase spectrum of a sequence of audio samples obtained, for example, using a DFT.
   iv. MFCCs and derivatives such as delta-MFCCs and delta-delta-MFCCs.
   v. Energy, log energy, and derivatives such as delta log energy and delta-delta log energy.
   vi. Probability that speech is voiced, based on an analysis of the speech waveform. The analysis may include a measure of periodicity.
14. An agreement rate between a non-revoiced ASR systems and a revoiced ASR system.
15. An agreement rate between two or more revoiced ASR systems. Example 1: measure the agreement rate between two revoiced ASR systems. Example 2: fuse transcriptions from two or more revoiced ASR systems to create a higher-accuracy transcription, then measure an agreement rate between the higher-accuracy transcription and one or more other revoiced ASR systems. For an example, see FIG. 47.
16. An agreement rate between two or more ASR systems. See FIG. 21.
17. Estimated likelihood or log likelihood of the transcription, given a language model. For example, a language model may be used to estimate the log conditional probability of each word based on previous words. The log conditional probability, averaged over all words in the transcription, may be used as an average estimated log likelihood.
18. An estimate of the difficulty in transcribing the current communication session.
19. Estimated complexity of the conversational topic based on a topic classifier and/or topic difficulty estimator.
20. A text complexity measure such as information theory entropy of the transcription, when evaluated with a language model.
21. A measure of semantic complexity, such as lexical density, of the transcription.
22. A Flesch-Kincaid reading ease score, applied to the transcription.
23. The number or percentage of transcribed words with confidence, as reported by a recognizer, greater than a given threshold. For example, this metric may count the percentage of recognized words with a confidence score greater than 50%.
24. Spectral tilt, or average slope of the magnitude spectrum that may give an indication of size or distortion, such as voices sounding muffled, for a channel carrying audio of the communication session.
25. A detected change in the speaker, such as when one speaker hands a device to a new speaker and the new speaker begins to talk.
26. The level of background noise as measured by a signal-to-noise ratio or noise loudness.
27. A function related to signal quality. The function may be responsive to noise level, interference from other signals, signal distortion such as clipping, spectral shaping or filtering, echoes, reverberation, and dropouts.
28. An indicator of whether the audio signal contains silence, speech, or non-speech energy. This may be used, for example, in a decision to use non-revoiced ASR systems to generate a transcription of communication session segments that appear to include predominantly silence or non-speech so that a CA of a revoiced ASR system is less likely to waste time listening to audio that does not need transcribing. This indicator may include statistics such as the percentage of the audio signal determined to be silence and average signal energy level of a segment of audio.
29. Average, variance, or other statistics derived from the probability that a frame of audio is voiced. For example, the percentages of the audio signal that is voiced, unvoiced, or silent may be features. The probability that a frame of audio is voiced may be derived, at least in part, from the height of a peak in an autocorrelation function of the audio signal divided by the energy of the audio signal.
30. Estimated channel or voice quality (e.g., muffled, echoes, static or other noise, distorted). Some elements of this estimate or classification may use an objective estimator such as ITU P.862.
31. Estimated speaking rate, such as rate in syllables per second.
32. Estimated speaking clarity of the voice.
33. Average, variance, range, or other statistics of the voice pitch or fundamental frequency.
34. Estimated accent type and accent strength of the speaker.
35. One or more parameters reflecting an automated assessment of the emotional state (angry, excited, etc.), personality (energetic, tense), or demeanor of the speaker.
36. Speaker characteristics and demographics such as age, age category (e.g., elderly, children, a child under the age of 13, legal minor), location, ethnicity, speech impairment, hearing impairment, and gender. This information may be, for example, obtained via customer records, audio analysis, or image analysis of the speaker's picture or video.
37. A level and type of the speaker's disability or speech impairments such as stuttering or slurring. The disability and speech impairment may be detected automatically by examination of the speaker's voice or it may be determined via lookup in a registry or patient record.
38. Level and type of hearing impairment of the user of the transcription service.
39. An indicator, such as from a silence detector or by observing that a non-revoiced ASR system is generating text while the revoiced ASR system is not, that suggests a CA of the-revoiced ASR system has stopped speaking.
40. A second user, such as the second user 112 of FIG. 1, geographic location as determined by, for example, IP address, GPS location, cell tower location, ANI, DNIS, customer record, street address, or billing address.
41. The second user's accent or dialect based on location or signal analysis of communication session audio.
42. Geographic/accent metrics as in #40 and #41 above, but for the first user, such as the first user 110 of FIG. 1.

TABLE 5-continued

43. Settings, such as amplification levels, font size, and time zone, the first user has configured for the captioned phone.
44. Network statistics such as packet loss or noise levels that may affect speech quality.
45. The compression rate, audio bandwidth, and CODEC type (e.g., Speex, AMR, MP3, G.719, Opus, GSM, G.711) that may affect speech quality.
46. The transcription from the non-revoiced ASR system and/or revoiced ASR system. Text of the transcription may be a feature. The text may, for example, be represented as words or word embeddings.
47. First user account status and history, such as number of times he/she called to complain, number of communication sessions to customer care or technical support, number of months as a user, payment history and status, and credit rating. For example, a first user may receive a different class of service depending on the account status. For example, the first user may receive service from a non-revoiced ASR system instead of a revoiced ASR system if a payment is overdue.
48. A random number or pseudo-random number such as a hash of the first user's and/or the second user's phone number or device identifier. This may be used, for example, in selecting samples for quality testing, data collection, or in providing a given class of service to a random subset of users. A random number may also be used as input to a generative model such as a generative adversarial network used, for example, as an estimator or classifier.
49. Flags indicating a special communication session type such as whether the communication session is a test communication session, a production communication session, a revenue-producing or billable communication session, a non-revenue producing or non-billable communication session, a communication session to be used for measuring performance, a customer support, technical support, or other customer care communication session, a communication session designated to test a non-revoiced ASR system, a communication session designated to test a revoiced ASR system, a communication session designated to be directed to a specific revoiced ASR system, a communication session designated to be directed to a specific non-revoiced ASR system, or an automated communication session where one or both calling parties are machines.
50. Flags indicating recording status, including whether the communication session content (e.g., audio, text, n-grams) is being or may be recorded and what is being recorded.
51. An indication of whether a prompt has been or will be played advising a caller that communication session content may be used or recorded.
52. An indicator of whether the system has consent to use communication session content, for which caller, and which type of consent has been granted.
53. An indicator of whether the system has legal clearance to use content from the communication session, what content may be used, and in what manner it may be used.
54. An indicator of which of the first and second users initiated the communication session.
55. An indicator of whether the first user has called the second user before, how many times, and how long ago.
56. An indicator of whether the second user has called the first user before, how many times, and how long ago.
57. A feature corresponding to the second user's name, such as may be extracted from the profile or account record. For example, the feature may be a flag indicating that the first or last name on the profile or account is likely to be foreign or that the first name is likely female.
58. The pause-to-talk ratio or percentage of time a speaker talks. In one scenario, this feature includes time when another speaker is talking. In another scenario, this feature excludes time when another speaker is talking.
59. The percentage of time the first user talks compared to the second user.
60. Features from Table 2 or Table 5 that are transformed using nonlinear functions such as sigmoid, hyperbolic tangent, or ReLU functions.
61. Features from Table 2 or Table 5 as estimated over one or more previous communication sessions with the same first user and/or second user. Once a given communication session ends, features such as topic type, ASR accuracy, etc., that pertain to characteristics of the communication session may be stored in a database for use with future communication sessions. Access to this previous communication session information may be limited to specific individuals such as the first user or other parties to the communication session.
62. Historical or projected communication session length for the first user, based, for example, on one or more previous communication sessions. Communication session length may be measured, for example, in units of time (such as in seconds) or in words.
63. Historical or projected communication session length for the second party, based, for example, on one or more previous communication sessions.
64. A current communication session length. In a first use case example, current communication session length may be used to predict accuracy if accuracy tends to change over the length of a communication session. In a second use case example, a first period of time, such as 20 seconds, may be particularly important, so the system may increase the likelihood of sending, for example, the first period of time to a revoiced ASR system. Conversely, if the likelihood is high that the start of a communication session includes silence, such as with voicemail communication sessions, a first period of time, such as the first 10 seconds, may be captioned using a non-revoiced ASR system. In a third use case, an estimator or selector may predict that a CA of a revoiced ASR system may experience fatigue as the communication session progresses and increase the likelihood of transferring the communication session to a non-revoiced ASR system for longer communication sessions.
65. Time of day, day of week, or indicators for holidays.
66. Detection of signals and messages such as answering machine beeps, a special information tone (SIT), communication session progress tones, signals, or messages (ringing, busy, answer, hang-up), and SIP (Session Initiation Protocol) messages.
67. An indicator of the language used by the first and/or second user. This indicator may be derived from records associated with the user's profile or account, an estimate of the user's language based on the user's name as derived from the user's profile or account or a reverse directory look up based on the user's telephone number. The indicator may be derived from language detection software that determines a spoken language based on analysis of the user's audio.
68. A statistic derived from the number of corrections a CA client obtains from a text editor. For example, the number or average number of corrections made during a specified time period such as a minute, a day, or a communication session may be a feature.
69. An estimate of which set of models will provide the best transcription for the current communication session. The estimate may be based on account type, signal analysis, knowledge of user history, trying multiple ASR models, and other factors such as those in Table 2 and Table 5.

TABLE 5-continued

70. A prediction of the cost of various transcription methods (see Table 1) and a prediction of transcription accuracy for various transcription methods. In one variation, this feature set may include a prediction of which transcription method will cost least and still meet established accuracy standards.
71. Severity of an ASR error. See FIG. 57.
72. The type of plan the first user is subscribed to. For example, if the first user has a premium service plan, the selector may favor sending communication sessions for the first user to an ASR system, such as a revoiced ASR system, that delivers relatively higher accuracy, or the selector may send all communication sessions for the first user to systems with relatively higher accuracy. The following may also be used as features, if the current first user does not have an account, is not a subscriber, or is not certified eligible to receive transcriptions, or if the user is unknown or has not logged in.
73. The medical history or other status assigned to the first user. For example, the first user may have special needs that require transcriptions from a revoiced ASR system or from a revoiced ASR system that obtains revoiced audio from a CA with special skills. As another example, the first user may be a test number, voicemail user, or hearing subscriber, with low priority that may be transcribed by a non-revoiced ASR system.
74. The first user's degree or type of hearing loss or need for transcriptions. An example of how this feature may be used is to select a non-revoiced ASR system if the need is low.
75. The number of communication sessions the first user has placed or the number of minutes the first user has used over a period of time, such as during the current or previous month. As a use case example for this feature, the first user may receive service for a particular period of time, such as 60 minutes, at a first quality level, one that may use more revoiced or more expensive ASR system resources, and thereafter at a second quality level such as service provided by non-revoiced ASR system.
76. The importance or priority of the communication session. For example, high-priority numbers may include emergency numbers such as 911 communication sessions, police, fire, ambulance, poison control, etc., communication sessions to medical or legal providers, and parties identified as high-priority by a first user (or authorized representative). High priority communication sessions may also include communication sessions for which transcription generation may be difficult (for example, because the speech or signal characteristics render the audio less intelligible) or correspond to a device identifier that has been identified by a user as high priority. In some embodiments, high-priority numbers may be sent to a revoiced ASR system or may be more likely to be sent to a revoiced ASR system.
77. An indication that a communication session has been selected to be processed using high-accuracy transcription methods for purposes such as data collection or model training. For example, in ASR model training, a data collection scheduler may identify a percentage of all communication sessions at random or based on communication session characteristics to be sent to revoiced ASR systems so that the audio and transcription for the communication session may be used for a step in model training that requires enhanced accuracy (see FIG. 64).
78. The total number of communication devices connected to the communication session.
79. A constant value. This feature may be used, for example, in an estimator including a weighted sum, as an offset or constant correction factor.
80. Information extracted from the first user's account, user record, or profile such as name, phone number, age or birthdate, user preferences, an indication of the account type (business, residential, government, etc.), an identifier for the first user's company or enterprise (e.g., for corporate accounts), identity of the user or users authorized to receive the captioning service, username and password, voiceprint, date of start of subscription, contact list or address book contents, speed dialing list, pictures of contacts, and calling history including phone numbers, times and dates, communication session duration, and which user initiated each communication session.
81. An indicator of whether the first user is an authorized subscriber. The indicator may be based on the user entering credentials such as a login name, PIN, or password. The indicator may be based on facial recognition, a fingerprint match, the user's voice matching a voiceprint, the user's language usage (e.g. vocabulary or pattern of words), or other biometrics. In some embodiments, the indicator may be used to provide a first level of service such as transcription by a revoiced ASR system if the user is authorized and a second level of service such as transcription by a non-revoiced ASR system otherwise. In another embodiment, the indicator may be used to allow transcription generation for authorized users. In another embodiment, the indicator may be used to report unauthorized usage.
82. Signal analysis of the communication session audio to detect features such as tone (shouting, whispering), volume (loud, quiet, distant), an indication of multiple people speaking at once, and noise types (music, singing, wind, traffic, radio or TV, people talking, etc.).
83. The length of time since the beginning of the work shift for a CA revoicing audio. This metric may be used as an estimator of fatigue.
84. The service type or class of service being provided. Examples of service types include transcribing communication sessions, conducting surveys, labeling data, transcribing videos, etc. Further, each type of service may have multiple classes, which may also be features. For example, a communication session transcription service may offer multiple classes such as various levels of accuracy, various languages, various latency requirements, various degrees of security, and various specialized skills such as competence in medical, legal, or other industry- or topic-specific terminology.
85. An indicator of urgency or when a task needs to be completed, such as whether a task is needed in real time or may be performed offline. For example, if a group of one or more transcription units provides a first service transcribing communication sessions in real time for phones where a short response time is required (e.g., a few seconds) and a second service transcribing recorded communication sessions where a longer turnaround time (e.g., a few hours) is allowed, then an indicator of whether a task belongs to the first or second service may be used to make a non-revoiced ASR system/revoiced ASR system selection and/or to defer non time-critical work to a time when more of the desired transcription resources are available. In another example, if non-revoiced ASR systems are in short supply, then the decision to send the task to a revoiced ASR system or wait for an available non-revoiced ASR system may depend on the urgency. For example, if the indicator signals that a task is needed quickly and no revoiced ASR systems are available, the task may be directed to a non-revoiced ASR system. If multiple tasks require non-revoiced ASR systems and/or revoiced ASR system resources, the process of scheduling resources may be responsive to the relative urgency of the tasks.
86. An indicator of the type and nature of various tasks that are waiting to be completed. For example, if non-revoiced ASR system or revoiced ASR system resource is available, in addition to those resources currently used to transcribe ongoing communication sessions, and there is a queue of offline transcription tasks to be completed, then a task from the queue may be directed to the available resource.

TABLE 5-continued

87. An alignment score between two or more transcriptions. For example, a disagreement rate, agreement rate, edit distance or Levenshtein distance between two transcriptions may be a feature. In one scenario, one transcription may be from a non-revoiced ASR system and another from a revoiced ASR system. In another scenario, the two or more transcriptions may be from non-revoiced ASR systems.
88. The output of an estimator, classifier, or selector.
89. The identity of the transcription party and/or the subscriber. An identity may include, for example, an account number, a name and phone number, a device identifier, or a voiceprint and a device identifier. In embodiments where devices are shared among multiple users, a single device identifier may correspond to multiple transcription party identities.
90. A function derived from the transcription party's identity, phone number, or device identifier; the subscriber's identity, phone number, or device identifier; or a combination thereof. For example, communication sessions where the transcription party's phone number matches a first regular expression and/or where the subscriber's phone number matches a second regular expression may be transcribed using a non-revoiced ASR system. In a counterexample, matching communication sessions may use a revoiced ASR system. In another example, communication sessions where the transcription party's identity or device identifier match entries in a selected list such as a list of names and/or phone numbers, may be transcribed using a non-revoiced ASR system. In a counterexample, communication sessions matching entries in the list may use a revoiced ASR system.
91. The average confidence of transcriptions for one or more speech segments, where a speech segment includes one or more words. A transcription of a speech segment may, for example, be a section of text delivered as a group by an ASR system. For example, a confidence score averaged over each of the k (where k may be 1, 2, 3, among other numbers) most recent segments determined by an ASR system may be used as a feature. In an example application of this feature, if the average confidence of the past k segments drops below a selected threshold, a revoiced ASR system may be subsequently used to generate transcriptions for the communication session.
92. An analysis of communication session content to determine, for example, the degree of difficulty the first user is having understanding the transcription party. The analysis may produce, for example, the frequency of phrases such as "What?" "I'm sorry." or "Huh?" from the first user and phrases such as "Did you hear that?" or "I said..." or repeated or rephrased utterances from the transcription party. The degree of difficulty may be used, for example, as a feature indicating captioning errors or delays, to influence the non-revoiced ASR system /revoiced ASR system decision, in estimating average non-revoiced ASR system and/or revoiced ASR system accuracy, to provide feedback to a CA providing revoiced audio to a revoiced ASR system such as advising the CA on his/her performance, creating CA performance reports, and to generate alerts.
93. An analysis of communication session audio and/or transcriptions to determine how much of the conversation a first user is understanding. The communication session audio and/or transcription may, for example, be input to a machine learning system trained to estimate a first user's level of comprehension.
94. The number of words in a hypothesis transcription.
95. The number of words in a reference transcription.
96. An alignment length, which may be the total number of token columns created by an alignment between two or more transcriptions. For example, if the hypothesis "the quick brown" is aligned with "quick brown fox" so that the tokens "quick" are matched and the tokens "brown" are matched, the alignment length may be the number of words in the string "the quick brown fox," which is four.
97. The subscriber's technical configuration. This may include, for example, the method used to connect the subscriber to the transcription system (e.g. wired Internet, hotspot, smartphone), the nature and identity of the subscriber's communication (e.g. telephone) provider and Internet service provider, location of the ASR systems (e.g., ASR system on the device of the subscriber, ASR system at a specified captioning center, etc.), whether transcriptions are on or off by default, etc.
98. An indicator by a user that the user wants a service other than or in addition to transcriptions. For example, the user may press a button or click an icon to request action from a virtual assistant or may ask for a service such as the time, a reminder or wakeup call, customer service, playing music or videos, checking voicemail, initiating a communication session, asking for information, or other services that may be provided by a virtual assistant.
99. Features derived from a fusion process. For example, the number or percentage of times a word from a first ASR system is selected by a voting process 1408 instead of a word from a second ASR system may be used as a feature to estimate accuracy of the first ASR system.
100. A position detected for a handset or microphone providing audio to be transcribed. For example, the position and angle of a handset, the location of a microphone relative to the speaker's mouth, and a determination of whether a speaker is holding a handset in his/her left or right hand may be used as features.
101. An indication that a word may be preferred for a particular ASR system or that a first ASR system is more likely to correctly recognize the word than a second ASR system. This feature may be used, for example, in voting. For example, a list of words may be created that are believed to be more reliably recognized by the first ASR system. If the first ASR system recognizes a first word on the list and a second ASR system recognizes a second word, the voting process 1408 may select the first word in response to its presence on the list. In another example, each word in the list may be associated with a weight. The voting process 1408 may use the weight as a feature in determining whether to use a word from the first or second ASR systems. In another example, a first ASR system may be configured to detect a list of words including, for example, filler words, spoken punctuation, quickwords, and profanity more reliably than a second ASR system. In this example, the voting process 1408 may select a listed word from the first ASR system over an alternative hypothesis from the second ASR system.
102. A confidence score of one or more words transcribed by first ASR system that has received a grammar from a second ASR system.
103. All the features listed in Table 2.

As discussed above, in some embodiments, another criteria the voting process 1408 may consider when selecting tokens from token groups is outputs of ASR models. For example, the output of models, such as error type models and language models, may be considered as the other criteria. In these and other embodiments, a prior probability specified by the language model for the tokens may be used to select a token from a token column in addition to the number of times ("counts") a token appears in a token group.

In these and other embodiments, the tokens may each be weighted based on the language model probabilities associated with the tokens. In these and other embodiments, weighting the tokens may increase the likelihood that a result rated by the language model as more probable may be chosen during the voting process 1408. Weighting the tokens may include multiplying a token count for each token in a token column by the probabilities from the language model or adding the probabilities from the language model to the token counts for each token in the token column to determine a score used in the voting process 1408. The token counts may be further weighted by other factors such as word probabilities and confidences estimated by ASR systems.

For example, suppose that, in the "ok let's meet at 4" example provided above with the token columns reproduced below:

| 1. | o k | -- | let  | us | meet | -- | more | ------- |
| 2. | o k | -- | says | -- | meet | at | four | o'clock |
| 3. | o k | ha | let  | us | meet | at | far  | ------- | the three hypotheses, up until the second-to-last column, are fused to form "o k let us meet at." The language model may output the probability for each of the tokens in the second-to-last token column as follows.

P(four)=0.05
P(more)=0.01
P(far)=0.02

In these and other embodiments, the voting process 1408 may multiply the count of each token by the probability. Thus, the token count for "four" may be 0.05, the token count for "more" may be 0.01, and the token count for "far" may be 0.02. The token "four" may have the highest probability and may be selected so that the fused hypotheses forms "o k let us meet at four."

In some embodiments, the language model may indicate a probability of a sequence of N tokens. In these and other embodiments, the probability of a sequence of N tokens may be used to indicate the probability of a token given a context that is based on one or more tokens directly preceding the token. For example, a trigram language model may indicate the probability (or a form thereof, such as log probability) of three tokens in a sequence and thus the probability of a token given two tokens directly preceding the token. For example, the language model may determine the probability of the token "bread" followed by the tokens of "loaf of" as P(bread|loaf of)=0.84, where P(<token>|<(N−1) tokens>) is the probability of a token given the preceding N−1 tokens, where N is the number of words in the sequence. N may be any positive integer, for example, 1, 2, 3, 4, 5, 8, 10, or 15. In the example above with respect to phrase "ok let's meet at 4", N may equal four and a language model may specify the following probabilities:

P(four|us, meet, at)=0.05
P(more|us, meet, at)=0.01
P(far|us, meet, at)=0.02

In some embodiments, back-off probabilities may be used in cases where probabilities for N words are not available, but where statistics for N−1 words are available. For example, if there are N words in a sequence, the language model may not include a probability for a sequence with N words for each of the tokens in a token column. In these and other embodiments, the language model may include a probability for a token based on a sequence that is N−1 tokens long.

Additionally or alternatively, the language model may indicate the probability of a token given one or more preceding tokens and one or more subsequent tokens for at least one input hypothesis. For example, suppose a first input hypothesis ends with the sequence "meet you at the train station at four" and a second input hypothesis ends with the sequence "meet you at the trade." A language model may be used to help decide between the tokens "train" and "trade." In the trigram example provided above, a trigram probability may depend only on the previous two tokens, "at" and "the." In contrast, in these and other embodiments, a probability may further depend on the subsequent token "station." In these and other embodiments, the probabilities for each hypothesis may be determined based on one of the hypotheses using the subsequent token and the other hypothesis not using the subsequent token. Alternatively or additionally, the probabilities for each hypothesis may be determined based on a hypothesis without the subsequent token being added to the hypothesis. For example, the hypothesis of "meet you at the trade" may be changed to "meet you at the trade station." For example, the probabilities may then be written as P("train"|prior="at the", future="station") and P("trade"|prior="at the", future="station"). The resulting probabilities may be used to help decide between selecting the token "trade" or "train."

In some embodiments, the voting process 1408 may use a probability based on preceding and/or subsequent tokens to reduce latency for cases where various transcription units provide transcriptions with different degrees of latency. Using probabilities based on preceding and subsequent tokens may be advantageous because knowledge of subsequent tokens provided by faster transcription units may be combined with knowledge of previous tokens provided by slower transcription units. Transcription units with different degrees of latency may include a transcription unit with a non-revoiced ASR system with relatively lower latency and a transcription unit with a revoiced ASR system with relatively higher latency.

Continuing the example of using subsequent tokens, the voting process 1408 may encounter multiple ties in a row. For example, the following two hypotheses, shown here in an aligned form, have five ties in a row:

| 1. | I | like  | to | walk | my | favorite | dog |
| 2. | I | often | -- | talk | to | --       | dog |

In this example, suppose the align text process 1406 and voting process 1408 is at a decision point (a.k.a. the current node) to decide between the token 'like' and 'often.' In some embodiments, the align text process 1406 and voting process 1408 may do a full search of all of possible combinations from the point of the tie (e.g., "like" or "often") until there is consensus again (at "dog"). In the example above, the voting process 1408 may determine the likelihood, given the context of prior and various combinations of subsequent words, of each possible sequence of tokens such as "I like to talk to dog" and "I often walk my favorite dog." A language model scoring technique such as backoff or Kneser-Ney smoothing may be used to select the most probable sequence for inclusion in the fused transcription.

The align text process 1406 and voting process 1408, in searching all possible combinations, may require a significant amount of processing to complete the search. To reduce the processing load, the align text process 1406 and voting process 1408 may utilize an alignment method to limit the length of the search space. For example, if there are ten tied tokens in a row, the align text process 1406 and voting process 1408 may explore combinations of the first five tied tokens to select a more or the most likely sequence and then repeat the process for the next five tokens. Additionally or alternatively, the align text process 1406 and voting process 1408 may reduce the processing load by using a Viterbi search or other dynamic programming method to find a more or most probable sequence.

A language model probability used for fusion may also be conditioned on contexts from multiple input hypotheses. For example, with two inputs, a word probability may be expressed as P (word|context 1, context 2), where context 1 is one or more previous tokens from a first input hypothesis and context 2 is one or more previous tokens in a second input hypothesis. Context 1 may further include one or more future tokens from a first input hypothesis. Context 2 may further include one or more future tokens from a second input hypothesis. Similarly, for a multiple input ASR system such as the embodiments illustrated in FIGS. 40 and 41, an ASR system may use a language model with probabilities such as P(word|context 1, context 2, context 3, . . . ) conditioned on contexts from multiple input hypotheses.

Additionally or alternatively, the voting process 1408 may output tokens based on the best available information at a point in time. In these and other embodiments, the voting process 1408 may provide corrections if future inputs or input changes trigger a change in tokens already output. For example, using the example inputs above, the voting process 1408 may initially output "meet you at the trade." After providing the output of "meet you at the trade", the voting process 1408 may determine that the token "trade" was incorrect after the voting process 1408 determines the subsequent token of "station." In these and other embodiments, the incorrect output may have been provided to a device of a user for presentation. In these and other embodiments, the correct token may be provided to the device to replace the incorrect token. In some embodiments, the voting process 1408 may also change a previous output in response to an ASR system making a change to a previous hypothesis.

In some embodiments, an error type model may also be used by the voting process 1408 to increase alignment and/or voting accuracy. In these and other embodiments, a type of error from multiple different error types may be assigned to each token column based on the differences between the tokens in the token column. An error type model may be built that may use patterns of error types to assist in selecting tokens from the token columns.

As an example of an error type model, consider an example reference transcription (e.g., what was actually spoken) "Hermits have no peer pressure" and a hypothesis transcription (e.g., what the ASR system output) "Hermits no year is pressure." An alignment may be arranged with an error type line to create an error map such as:

| Reference: | hermits | have | no | peer | -- | pressure |
|---|---|---|---|---|---|---|
| Hypothesis: | hermits | -- | no | year | is | pressure |
| Error Type | C | D | C | S | I | C |

The error type codes may be "D" for deletions, "S" for substitutions, "I" for insertions, and "C" for correct. An error type model for a speech transcriber may be constructed by presenting a corpus of audio into an ASR system. The ASR system may output an output transcription. The output transcription may be compared to a reference transcription of the corpus of audio by aligning the two transcriptions and comparing the aligned transcriptions to determine the error type for each word group in the corpus of audio. Based on the comparison, a pattern of error types may be used to construct an error type model.

In these and other embodiments, the error type model may include a set of conditional probabilities of given error types given the context of previous and/or future error types. For example, the error type model may include the probabilities of patterns of error types such as "D"s, "S"s, "I"s, and "C"s that may characterize output of the ASR system. Errors of a transcription by the ASR system may then be provided to the error type model for estimating or predicting the reliability of the transcription for purposes of alignment and/or voting. A similar error type model may be determined for a pair of ASR systems, using the method described above for an ASR system and a reference transcription. In these and other embodiments, the error type model may be built for a given ASR system using a language modeling method based on, for example, n-grams, or using other machine learning methods such as neural networks.

As discussed above, the align text process 1406 and voting process 1408 may be configured to receive a sequence of tokens from each of multiple ASR systems. In these and other embodiments, the sequence of tokens may include phrases, words, subword units, or a combination of words and subword units. Subwords, as used in this disclosure, may refer to parts of words that have been divided into roots, stems, prefixes, and suffixes (e.g., "reuniting" may be broken into subword units as "re-unit-ing"). Subword units may also include words that are parts of compound words (e.g., downtown=down+town). Subword units may also include syllables, such as may be shown as subdivisions of a word in a standard dictionary (eg. "re-u-nit-ing"). Subword units may also include phonemes or characters.

In some embodiments, the align text process 1406 may be configured to align the tokens, such that subwords may be aligned as well as words. For example, the phrase "I don't want anything" may be transcribed by three ASR systems as:

| I | don't | want | anything |
|---|---|---|---|
| I | don't | want | everything |
| I | don't | want | any seen |

In this example, there is a three-way tie for the last token because each hypothesis includes a different word for the last token. However, if words are broken into subwords, each hypothesis includes an additional token and the token alignment becomes:

| I | don't | want | any | thing |
|---|---|---|---|---|
| I | don't | want | every | thing |
| I | don't | want | any | seen |

The voting process 1408 may then produce the output "I don't want anything." Thus, in some embodiments, by using subwords as tokens as illustrated above, a simple majority vote may render the correct set of tokens for output.

In some embodiments, the tokens that represent subwords may be combined into whole words during the voting process 1408. For example, during the voting process 1408 the input hypotheses may be examined and one of the hypotheses that includes the selected token by voting may be used as a template for combining the subwords. For example, the first hypothesis in the above example, may be used as the template such that the output is "I don't want anything" instead of "I don't want any thing" with the word "anything" broken into the subwords "any" and "thing."

In some embodiments, the align text process 1406 and voting process 1408 may not divide words into sub-words where there is significant agreement between hypotheses. For segments of hypotheses that lack significant agreement, words may be split into subwords that may be aligned and subjected to voting and recombination of the subwords. Alternatively or additionally, the transcriptions generated by the transcription generation processes 1402 may include words that are divided into subwords. The transcriptions with the subwords may be provided to the align text process 1406 and voting process 1408. Alternatively or additionally, some of the transcriptions generated by the transcription generation processes 1402 may include words that are divided into subwords. Other transcriptions that do not include words divided into subwords may be sent to a division process that may divide one or more words in the other transcriptions into subwords.

In some embodiments, alignment of hypotheses may be used to determine an accuracy score for the output of the voting process 1408. For example, a hypothesis and reference may be aligned. A number of differences in the aligned transcriptions may be determined. When alignment is performed with the hypotheses including subword units, several options for measuring accuracy may be used. The options may include:

1. Accuracy may be measured on a word basis, using word error rate, not subword error rate. For example the word strings "I don't want anything" and "I don't want everything" differ by one word out of four, so the accuracy may be determined as 3 correct out of 4 words=75%.
2. Accuracy may be measured on a subword basis, where differences between the aligned hypothesis and reference subword strings are counted as errors. For example the strings "I don't want any-thing" and "I don't want every-thing" differ by one syllable out of six, so the accuracy may be determined as 4 correct out of 5 subwords=80%.
3. Accuracy may be based on a combined word and subword score. For example, the accuracy may be determined as the average of the word accuracy and subword accuracy.
4. Accuracy may be measured on a word basis, using word error rate, but when the error map is displayed, it may use subword and/or word alignment. For example, if a reference "I'm leaving now" is transcribed as "I'm leaning," the error map based on words may appear as:

| Reference: | I'm | leaving | now |
|---|---|---|---|
| Hypothesis: | I'm | ******* | leaning |

But if a subword alignment based on, for example, syllables or characters, is used to align the displayed result, the matching subword units (in this case, "ing") in both transcriptions may cause words with similar subword units to be aligned so that the error map may appear in a format where alignment is responsive to word similarity such as:

| Reference: | I'm | leaving | now |
|---|---|---|---|
| Hypothesis: | I'm | leaning | *** |

Note that both error maps may be correct and represent the same minimum word edit distance, but that the second may be easier for a human to read and understand. This improved alignment format may be used when the error map is displayed to a human reviewer such as a TLS (see FIG. 56) or judge (see FIGS. 50 and 52).

In some embodiments, the transcription generation processes 1402 may each generate a single hypothesis that may include a sequence of tokens that may be ultimately provided to the align text process 1406 and voting process 1408. Additionally or alternatively, the transcription generation processes 1402 may be configured to generate rich structures, such as word confusion networks ("WCNs"), n-best lists, or lattices, which contain information about alternative hypotheses and may include the relative probabilities or likelihoods of each. These rich structures may be combined to create a consensus hypothesis. In one example, alternative hypotheses embedded in the rich structures may be used to break voting ties, evaluate confidence for words, word strings, or subwords, and result in more accurate hypotheses that may not have been generated had only a single hypothesis from each transcription generation process 1402 been used.

In some embodiments, one or more alternate hypotheses from transcription generation processes 1402 may be used as additional inputs to the align text process 1406. For example, the first transcription generation process 1402*a* may generate a first hypothesis and a second hypothesis. Both the first and second hypotheses may be provided to the align text process 1406 along with the hypotheses from the other transcription generation processes 1402.

In some embodiments, the align text process 1406 and/or voting process 1408 may be configured to utilize a Viterbi search or variation of the Viterbi search adapted to measuring edit distance between tokens to align token sequences. In these and other embodiments, an example of the Viterbi search method may include such as the Wagner-Fischer dynamic programming method. Additionally or alternatively, other search methods such as code implementing Dijkstra's algorithm or an A* (spoken as "A star") search method may be used for alignment of tokens.

An example of the alignment process using a Viterbi search method is now provided. Assume the align text process 1406 obtains a first hypothesis with a first sequence of tokens and a second hypothesis that includes a second sequence of tokens from different ones of the transcription generation processes 1402. In these and other embodiments, the align text process 1406 may find a path that best meets a selected set of performance criteria by constructing a two-dimensional grid representing the first sequence in a first dimension and the second sequence in a second dimension. The performance criteria may include the lowest cost or the highest score. For example, the cost may be a function of the number of deletions "D," substitutions "S," and insertions "I." If all errors receive the same weight, the cost may be represented by D+S+I. The Viterbi path may then chose the alignment between the first and second sequence that results in the lowest cost as represented by D+S+I. The highest score may represent the Viterbi path that aligns the first and second sequences such that a score such as the number of matching words, the total path probability, or N−(D+S+I), where N is the number of words in the reference, is increased.

In some embodiments, the processing time of the Viterbi search may be approximately proportional to L^R (L raised to the power of R), where L is the average number of tokens per sequence and R is the number of sequences. For example, if there are five transcription generation processes 1402 and each transcription generation process 1402 generates a sequence of ten words, the processing time may be proportional to L^R=10,000. In some embodiments, a processing load for the Viterbi search may be reduced by using a sequential alignment method where the voting process 1408 aligns two input sequences to create a first new sequence, then aligns a third input sequence to the first new sequence to create a second new sequence, then aligns a fourth input sequence to the second new sequence to create a third new sequence, and so on. In these and other embodiments, the align text process 1406 may be configured to align first the sequences estimated to be highest in accuracy. The accuracy determination may be based on historical accuracy measured for each transcription generation process 1402, an estimate of accuracy for the current transcriptions, or other accuracy metrics, among others. The subsequent sequences may be aligned in order of decreasing estimated accuracy. As such, the align text process 1406 may sort sequences in order of decreasing estimated accuracy prior to sequential alignment.

In some embodiments, the align text process 1406 may be configured to find an alignment between multiple sequences by searching for an alignment that reduces a sum of pairs edit distance function. The sum of pairs edit distance function may include the sum of the edit distance between each pair of sequences. For example, if there are three sequences, seq1, seq2, seq3 and an edit distance function d(a,b) which determines the edit distance between sequences a and b, the sum of pairs distance function may be expressed as d(seq1, seq2)+d(seq1,seq3)+d(seq2,seq3). An example of an edit distance is the minimum number of changes (insertions, deletions, or substitutions) needed to convert a first string to a second string.

In some embodiments, the align text process 1406 may utilize other methods for finding an alignment between multiple sequences while limiting processing of a device performing the align text process 1406. These methods may include any one or combination of the above or below described methods:

TABLE 6

1. Use a beam search to eliminate alignment paths or nodes where a performance criterion falls below a selected threshold.
2. Use bounded relaxation in an A* search to reduce the sum of pairs edit distance. An A* search uses the function f = g + w * h, where g is the sum of pairs edit distance of the sequences up to the current node, h is an approximation of the distance to the final endpoint, which may be determined as the sum of pairs edit distance of the tokens of the sequences following the current node, and w is a weight variable used to prioritize the search direction. The function f may be computed, for example, for each node in the neighborhood of the last node in the best path determined. The node with the lowest f score may be searched next. When w is relatively small, A* may be more accurate and slower than for relatively larger values of w. If an initial value of w causes the search to take longer than a determined threshold, w may be increased and the search may be restarted. An A* search may be used in conjunction with a beam search.
3. Use a progressive alignment method (also known as sequential alignment or the hierarchical or tree method), a heuristic for multiple sequence alignment comprising a succession of pairwise alignments, starting with the most similar pairs..
4. Use a sequential alignment to generate a second sequence from the input sequences. Reorder the input sequences and repeat to generate a third sequence. Repeat to generate a fourth, fifth, etc., sequence. In a first embodiment, use sequential alignment to align the new sequences. In a second embodiment, measure the average edit distance between each new sequence and the input sequences. Select the new sequence with the shortest edit distance. In a third embodiment sequentially fuse the new sequences in order of the shortest edit distance first.
5. Align multiple sequences, using words as tokens, for alignment and voting to create a first fused transcription. Align the multiple sequences again by first splitting words into subwords, then use subwords as tokens for alignment and voting to create a subword transcription. Convert the subword transcription to a second word transcription. A subword transcription may be converted to a word transcription using methods such as:
    a. Preserve word boundaries when splitting words into subwords and through the fusion process. Use a dictionary or other lookup table to convert each sequence of subwords, which may be delimited by word boundaries, back into words.
    b. Use a Viterbi or other dynamic programming search and a language model to find the most likely sequence of words matching the subword sequence.
   Using words as tokens, fuse the first fused transcription with the second fused transcription to create a third fused transcription. In various embodiments, subwords may include parts of words such as phonemes, syllables, characters, or word parts such as roots, bases, stems, prefixes, suffixes, etc.
6. Use word endpoints from ASR systems as an initial estimate of the alignment by aligning transcriptions in time according to the endpoints. For example, as an initial estimate of the alignment, align word endpoints from each speech transcriber. Then refine the alignment using a method such as sequential alignment, a beam search, or a constrained search that limits the search space to regions in the neighborhood of the endpoints. If endpoints are not available from an ASR system, such as from a revoiced ASR system, use an approximation method such as one or more of:
    a. Assign endpoints based on audio length multiplied by the word position in the transcription, divided by the overall sequence length in words.
    b. Assign endpoints based on the time text is received from the revoiced ASR system, minus a correction factor to account for average processing time.
    c. Use endpoints from a second ASR system that provides endpoints and adds a correction factor corresponding to the average time offset between the revoiced ASR system that does not provide endpoints and the second ASR system.
    d. Use an alignment ASR system to generate endpoints in the event the ASR system does not produce useful endpoints. For example, the transcription output from a revoiced ASR system may define a grammar for the alignment ASR system. With the CA voice as input, the alignment ASR system may recognize the text defined by the grammar and generate endpoints. The grammar may constrain the alignment ASR system to recognizing substantially the same text as what the revoiced ASR system generates, so the alignment ASR system runs quickly and with fewer hardware resources. This operation by the alignment ASR system may be described as a "forced decision" mode, since the text output is predetermined by the grammar. In one scenario, the denormalized transcription from the ASR system may also be used as an input to the fusion steps of alignment and voting.

In some embodiments, fusion results generated by the align text process 1406 and voting process 1408 may be recomputed frequently, such as while the transcribed party is talking. The fused transcription, for example, may be recomputed each time a new token is received from one of the transcription generation processes 1402, periodically at short intervals, or once a certain amount of audio has been received. In some embodiments, the align text process 1406 and voting process 1408 may run even though the transcribed party has not necessarily stopped talking or even finished a sentence. In these and other embodiments, performing the align text process 1406 and voting process 1408 while the transcribed party is not finished talking may be referred to as providing partial results. In these and other embodiments, the partial results may be determined by fusing the transcriptions that have been received.

In some embodiments, partial results may be obtained by evaluating substantially all input, including text input, confidence estimates, endpoints, etc., received from the start of a communication session, or start of the transcription session, from the point where a transcribed party begins speaking to the current point in time, or from the point where a transcribed party begins speaking and has continuously spoke to the current point in time.

In some embodiments, a point in time $t_f$ is established to denote the point in time before which fusion results are unlikely to change, even with further audio input into or transcription output from the transcription generation processes 1402. Fusion output before $t_f$ may be referred to as "locked." When fusion results are evaluated, only results after $t_f$ may be determined because results before $t_f$ may not be expected to change. As such, alignment results before $t_f$ may have already been fused and sent to the vote process 1408 and to the first device 104. The evaluation after $t_f$ may also be simplified because, as with a beam search, only alignment paths that include locked results may be considered. All other paths, in some embodiments, may be eliminated from the search.

An example of locking results in an alignment search may be illustrated by Matrix 0 below where two sequences, "I like apples and bananas" and "I might apples bananas sauce" are aligned. In this example, a word from a column is considered aligned with a word in a row if there is an "x" in the corresponding column and row. The alignment search is the process of finding the alignment, or pattern of "x"s, that best matches words between sequences. The "path" may be considered to be the sequence of cells marked with an "x." In an embodiment of a Viterbi search, links may be formed between cells by analyzing one column at a time, moving from left to right (the forward pass) Links may indicate the best option for the previous match) and point backwards from a given cell to the best previous match. For example, there may be a link from row 2, column 2 back to row 1, column 1, since row 1, column 1 is the final cell of the best alignment path to this point in fusing process. After the links are in place to a particular column, a backtracking step (the backwards pass) may follow the links from right to left, starting at the particular column, to determine the path, which may be used to define the alignment between sequences.

|  |  | Sequence 1 | | | | |
|---|---|---|---|---|---|---|
|  |  | I | like | apples | and | bananas | Row: |
| Sequence 2 | I | x | — | — | — | — | 1 |
|  | might | — | x | — | — | — | 2 |

|  | Sequence 1 | | | | |
|---|---|---|---|---|---|
|  | I | like | apples | and | bananas | Row: |
| apples | — | — | x | — | — | 3 |
| bananas | — | — | — | — | x | 4 |
| sauce | — | — | — | — | — | 5 |
| Column: | 1 | 2 | 3 | 4 | 5 | |

Suppose, in the example above, that the alignment of a portion, "I like apples," of sequence 1 and a portion, "I might apples," of sequence 2 is determined by align text process 1406 to be unlikely to change. The align text process 1406 may therefore set the block of cells bounded by row 1, column 1 and row 3, column 3 to be immutable by locking the links. Additionally or alternatively, the locked cells may correspond to those representing time prior to $t_f$. Suppose further that the align text process 1406 determines that the presence of "x"s or absence (indicated with a "-") in the locked block are in the correct locations and locks them so the locked blocks do not subsequently change. The alignment decisions for the locked section may be sent to the vote process 1408 and (contingent on approval by the vote process 1408) sent to a first device as transcriptions. In some embodiments, a forward or backward pass in locked cells may not be run because the results are not expected to change. Further, supposing the cells in the path are correctly marked (e.g. with the "x" in cell row 3, column 3), then the search may be restricted to paths that include locked cells marked as part of the path, simplifying the search beyond the locked cells. For example, if the "x" in the cell in row 3, column 3 is locked and the "-" is locked in row 2, column 3, then paths potentially stemming from row 2, column 3 may be ignored and potential paths stemming from row 3, column 3 may be evaluated. Thus, the number of potential paths to search may be reduced. Reduction of the number of paths to search may simply the search. As the search progresses from left to right, additional cells, "x"s, and "-"s may be locked, simplifying the search through cells subsequent to (e.g., below and to the right of) the locked cells. A similar embodiment is described below with reference to Matrix 1 and Matrix 2.

Additionally or alternatively, the align text process 1406 and voting process 1408 may be configured to fuse transcriptions in real time or near real time by accumulating transcriptions from each transcription generation process 1402. The accumulated transcriptions, input to align text process 1406 and voting process 1408 as blocks of text, may then be fused together to create an output hypothesis. Each time a new token or sequence of tokens is received from one of the transcription generation processes 1402, the new token or sequence of tokens may be appended to the previously created input hypothesis to create an updated input hypothesis. The updated input hypothesis may then be fused with other hypotheses from other transcription generation processes 1402, and the fused output becomes the fused output hypothesis.

In some embodiments, to limit processing load or for other reasons, the align text process 1406 and voting process 1408 may use a method of "windowing." Windowing refers to creating a hypothesis by accumulating the output from speech transcribers, and when a hypothesis length is greater than a selected window length (L), one or more tokens, starting from the beginning of the hypothesis, may be deleted until the hypothesis length is L tokens. This is similar to having a 'window' that allows the align text process 1406 and voting process 1408 to see L tokens of the hypothesis at a time. By deleting tokens in this manner, the hypothesis provided to the align text process 1406 and voting process 1408 may be kept at manageable lengths.

In some embodiments, one or more of the transcription generation processes 1402 may lag behind other of the transcription generation processes 1402. For example, a transcription generation process 1402 with a relatively higher latency than other transcription generation processes 1402 may output a transcription that lags behind, in time, the transcriptions of the other transcription generation processes 1402. As a result, the window for each transcription generation process 1402 may cover a different segment of time. In these and other embodiments, the align text process 1406 and voting process 1408 may be configured to output only words that are estimated to be within the window of all or some number of the transcription generation processes 1402. For example, the align text process 1406 and voting process 1408 may be configured to only output tokens that come after the pth token from the beginning of a window and before the qth token from the end of the window. For example, if the window is fifty tokens (L=50), p=9, and q=5, the align text process 1406 and voting process 1408 may output tokens ten through fourty-five.

In these and other embodiments, hypotheses, such as token sequences, provided to the align text process 1406 may be realigned each time new or corrected tokens or token sequences are received from the transcription generation processes 1402. The realignment of the token sequences may be performed for tokens within the windows.

Additionally or alternatively, the align text process 1406 may remember context from a previous alignment using a sliding window. In some embodiments, to remember context from a previous alignment using a sliding window, the align text process 1406 may be configured to align token sequences from the transcription generation processes 1402 by creating a dynamic programming matrix. In these and other embodiments, the align text process 1406 may retain context with alignment by not creating a new matrix each time new tokens or a sequence of tokens is received from the transcription generation processes 1402, but by retaining information in the matrix regarding the previous tokens or sequence of tokens received from the transcription generation processes 1402. The example matrix below (Matrix 1) shows alignment between two sequences, seq1 and seq2, using an example where seq1="A B C D" and seq2="A C C D." The values in the matrix show the cumulative Levenshtein edit distance as computed using, for example, the Viterbi or the Wagner-Fischer method. The edit distance used in this example may count one point for an insertion, deletion, or substitution. Once matrix values are determined, the alignment may be determined from the path that reduces the edit distance.

| Matrix 1 | | | | | |
|---|---|---|---|---|---|
| | | seq1 | | | |
| | | word1 = A | word2 = B | word3 = C | word4 = D |
| seq2 | word1 = A | 0 | 1 | 2 | 3 |
| | word2 = C | 1 | 1 | 1 | 2 |
| | word3 = C | 2 | 2 | 1 | 2 |
| | word4 = D | 3 | 3 | 2 | 1 |

The example matrix below (Matrix 2) shows an example where two more tokens are provided for each sequence and the first two tokens in each of the sequences are set to 'locked.' In these and other embodiments, the locked tokens may then be appended to the fused transcription output by the align text process 1406 and voting process 1408. Instead of re-computing the entire dynamic programming table represented in matrices, the cells corresponding to the locked token, such as (the two rows containing "word1=A" and "word2=C" and the two columns containing "word1=A" and "word2=B") may be removed from the matrix 2. Calculations for the new elements of the matrix may be performed and the remaining portions of the table may then be used to align new words in the sequence. As a result, only 12 of 16 elements (the 4×4 grid of cells at the bottom-right of Matrix 2, minus the four that were previously computed) may be newly determined instead of calculating all 16 elements.

| Matrix 2 | | | | | | | |
|---|---|---|---|---|---|---|---|
| | | seq 1 | | | | | |
| | | word 1 = A | word2 = B | word3 = C | word4 = D | word5 | word6 |
| seq2 | word1 = A | 0 | 1 | 2 | 3 | | |
| | word2 = C | 1 | 1 | 1 | 2 | | |
| | word3 = C | 2 | 2 | 1 | 2 | | |
| | word4 = D | 3 | 3 | 2 | 1 | | |
| | word5 | | | | | | |
| | word6 | | | | | | |

The sliding window method is illustrated in Matrix 2 above in two dimensions for the case of two input sequences, but a multi-dimensional version may be used with more than two input sequences.

In some embodiments, the align text process 1406 and voting process 1408 may be configured to operate with a variable delay. In these and other embodiments, the variable delay may be responsive to how many tokens in input token sequences match. In these and other embodiments, the align text process 1406 and voting process 1408 may use shorter delays for input sequences with more tokens that match.

For example, if input sequences from a transcription generation process 1402 process each contain a series of one or more tokens that match across one or more other input sequences, the align text process 1406 and voting process 1408 may output the series of tokens immediately. If one or more words are different across input sequence, the align text process 1406 and voting process 1408 may wait for more tokens before determining and outputting a result. As another example, suppose, at a certain point in time, a first input sequence includes "meet you at the train station at four" and the second input sequence includes "meet you at the train." The token sequence of "meet you at the train" matches. As a result, the align text process 1406 and voting process 1408 may output the sequence of "meet you at the train" immediately or after some minor delay without waiting for another token. Suppose, however, the second input sequence ends with "meet you at the trade." In this case, the align text process 1406 and voting process 1408 may wait for subsequent tokens for the second input sequence after the token "trade" before deciding whether to output "train" or "trade." Additionally or alternatively, the align text process 1406 and voting process 1408 may output the sequence immediately or after some minor delay without waiting for another token. After receiving a subsequent token, the align text process 1406 and voting process 1408 may determine if the sequence included an error. If the sequence included an error, a correction of the error may be provided to the first device 104.

For purposes other than providing transcriptions during communication sessions, such as generating transcriptions for training models and measuring accuracy, real-time or near real-time operations may not be necessary. In these and other embodiments, the align text process 1406 and voting process 1408 may be configured to operate on larger blocks of input or even to wait for the end of a session (such as a communication session) or a speaker saying words in a conversation before fusing transcriptions. In these and other embodiments, matching of input sequences, evaluating matching of input sequences, and other processes discussed herein with respect to the process 1400 may be run less frequently than when providing transcriptions during a communication session in or at real-time.

Modifications, additions, or omissions may be made to FIG. 14 and/or the components operating in FIG. 14 without departing from the scope of the present disclosure.

Figure 15:
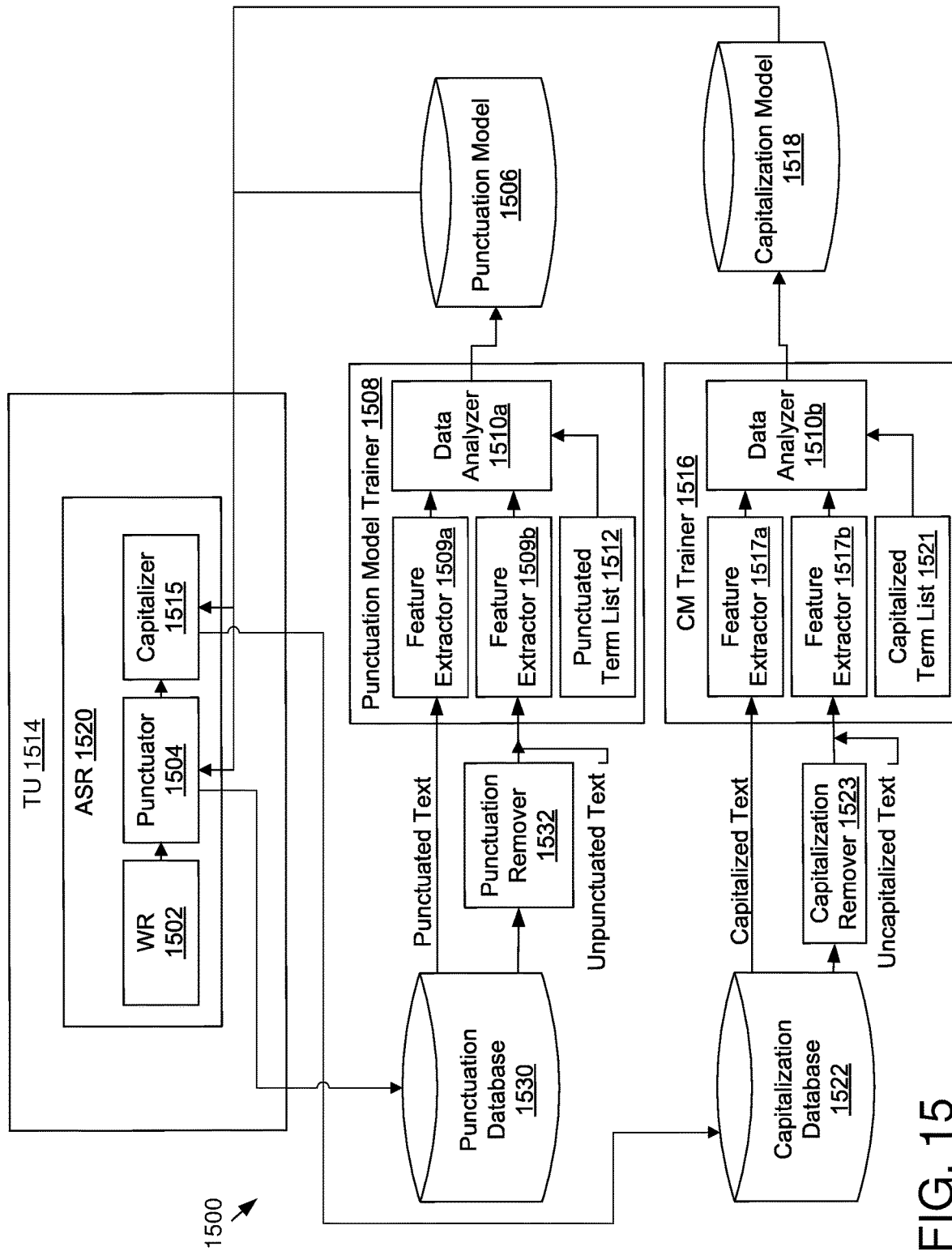
FIG. 15 illustrates an example environment for adding capitalization and punctuation to a transcription.

FIG. 15 illustrates an example environment 1500 for adding capitalization and punctuation to a transcription, arranged according to some embodiments of the present disclosure. In some embodiments, the environment 1500 may include a transcription unit 1514 that includes an ASR system 1520. The ASR system may include a word recognizer 1502, a punctuator 1504, and a capitalizer 1515.

In some embodiments, the ASR system 1520 may be a revoiced ASR. In these and other embodiments, the ASR system 1520 may obtain the revoicing of audio from a CA. In some embodiments, the CA may recite punctuation in the revoicing of the audio. For example, the CA may say keywords such as "comma," "period," and "question mark," in addition to the words of the audio where the punctuation should be added in the audio. The word recognizer 1502 may be configured to recognize such punctuation keywords and place the corresponding punctuation marks in the transcription generated by the ASR system 1520. In these and other embodiments, the ASR system 1520 may be configured to ignore punctuation keywords such that the punctuation keywords voiced by the CA are not included in the transcription as words, such as "comma."

In some embodiments, the CA may recite capitalization in the revoicing of the audio. For example, the CA may say a keyword such as "capitalize," "capital," or "all caps," in addition to the words of the audio to indicate the words or letters that should be capitalized. The word recognizer 1502 may be configured to recognize such capitalization keywords and cause the corresponding words to be capitalized in the transcription generated by the ASR system 1520. In these and other embodiments, the ASR system 1520 may be configured to ignore capitalization keywords such that the capitalization keywords voiced by the CA are not included in the transcription as words, such as "capitalize."

Additionally or alternatively, capitalization and punctuation may be automatically generated by the ASR system 1520 using the punctuator 1504 and the capitalizer 1515, as will be explained hereafter.

Capitalization and punctuation may be provided in transcriptions that are provided to a user device for presentation. In some embodiments, a transcription may be sent with the incorrect capitalization and punctuation or that lacks capitalization and punctuation. In these and other embodiments, corrected capitalization and punctuation for a transcription may be provided to the user device for presentation. In some embodiments, the transcription unit 1514 may obtain the corrections of capitalization and punctuation based on input from a CA or from other processes performed by the ASR system 1520.

In some embodiments, the punctuator 1504 may be configured to use a punctuation model 1506 to punctuate a transcription generated by the ASR system 1520. In these and other embodiments, the ASR system 1520 may generate the transcription without punctuation as described previously. The punctuator 1504 may use the punctuation model 1506 to add the punctuation to the transcription.

The punctuation model 1506 may be generated by a punctuation model trainer 1508. The punctuation model trainer 1508 may obtain text that includes the punctuation and text that does not include punctuation. The text may be stored by a punctuation database 1530 as a corpus of punctuated text. The text from the corpus may be provided by the punctuation database 1530 to the punctuation model trainer 1508 and to a punctuation remover 1532. The punctuation remover 1532 may remove the punctuation from the text and provide the text without the punctuation to the punctuation model trainer 1508.

The punctuation model trainer 1508 may include a first feature extractor 1509a and a second feature extractor 1509b, referred to as the feature extractors 1509. The punctuated text may be provided to the first feature extractor 1509a. The unpunctuated text may be provided to the second feature extractor 1509b. The feature extractors 1509 may be configured to extract features from the text, such as n-grams. The feature extractors 1509 may provide the extracted features to a data analyzer 1510a. In some embodiments, the data analyzer 1510a may use machine learning that does not use separate feature extraction, in which case, one or more feature extractors 1509 may be omitted.

A data analyzer 1510a may use the extracted features and information from a punctuated term list 1512, which may include a list of abbreviations, acronyms, regular expressions, and other words or phrases to be punctuated, to train a punctuation model 1506. The punctuation model 1506 may include rules to allow the ASR system 1520 to punctuate transcriptions. The punctuation model 1506 may be provided to the punctuator 1504. The punctuator 1504 may use the punctuation model 1506 to punctuate transcriptions generated by the ASR system 1520.

Additionally or alternatively, the punctuator 1504 may use the punctuation model 1506 to insert punctuation into a second corpus of text, such as text generated from transcriptions generated by a transcription system that includes the transcription unit 1514. The second corpus of text may be provided to the punctuation database 1530. In some embodiments, the first corpus and/or the second corpus may be used by the punctuation model trainer 1508 to generate a second punctuation model that may be used by the punctuator 1504. In this manner, the punctuation model may be updated as the transcription unit 1514 generates additional transcriptions.

In some embodiments, the punctuation model 1506 may also be trained using punctuation spoken by a CA or edits obtained from a CA. For example, if a CA revoices an audio sample and says "don't leave period if you go comma i'll hang up period" then the punctuator may be trained on the punctuated text "don't leave. if you go, i'll hang up." This training may occur on-the-fly or on recorded text.

Additionally or alternatively, the ASR system 1520 may add punctuation to a transcription using other methods. For example, one or more methods may be used as described below in Table 7.

TABLE 7

1. The audio stream is analyzed to identify silence segments and to determine a pitch contour over time. A set of rules assigns punctuation based on the duration of silence segments, time between silence gaps, and shape of the pitch contour. For example, a period may be assigned when a silence segment greater than a particular period of time (e.g. 0.5 seconds) is found, the time since the previous silence segment is at least a specified period of time (e.g., three seconds), and the voice pitch frequency since the previous silence segment has dropped by at least a minimum percentage (e.g., 10%).
2. The punctuator 1504 uses a punctuation model 1506 to punctuate text as previously described.
3. A set of rules responsive to text input may be constructed for adding punctuation to text. For example, the set of rules may include a list of punctuated phrases, including regular expressions, where punctuation from the phrases is applied to text when the words from the text match words from the list of punctuated phrases.
4. Punctuation may be added using a combination of the above methods. For example
   a. A punctuation mark may be added when the set of rules described in method #1 above and the punctuator 1504 listed in method #2 above both agree on a mark and its location.
   b. A model such as a recurrent or convolutional neural network may be trained on acoustic and text features to generate punctuation.

In some embodiments, the capitalizer 1515 may be configured to use a capitalization model 1518 to punctuate a transcription generated by the ASR system 1520. In these and other embodiments, the ASR system 1520 may generate the transcription without punctuation as described previously. The capitalizer 1515 may use the capitalization model 1518 to add the punctuation to the transcription.

The capitalization model 1518 may be generated by a capitalization model trainer 1516. The capitalization model trainer 1516 may obtain text that includes capitalization and text that does not include capitalization. The text may be stored by a capitalization database 1522 as a corpus of capitalized text. The text from the corpus may be provided by the capitalization database 1522 to the capitalization model trainer 1516 and to a capitalization remover 1523. The capitalization remover 1523 may remove the capitalization from the text and provide the text without the capitalization, such that the text is all lower case, to the capitalization model trainer 1516.

The capitalization model trainer 1516 may include a first feature extractor 1517a and a second feature extractor 1517b, referred to as the features extractors 1517. The capitalized text may be provided to the first feature extractor 1517a. The un-capitalized text may be provided to the second feature extractor 1517b. The feature extractors 1517 may be configured to extract features from the text, such as n-grams. The feature extractors 1517 may provide the extracted features to a data analyzer 1510b. In some embodiments, types of machine learning may be employed such that feature extraction may not be used.

The data analyzer 1510b may use the extracted features and information from a capitalized term list 1521, which may include a list of proper names, abbreviations, acronyms, regular expressions, and other terms to be capitalized, to train the capitalization model 1518. The capitalization model 1518 may include rules to allow the ASR system 1520 to capitalize transcriptions. The capitalization model 1518 may be provided to the capitalizer 1515. The capitalizer 1515 may use the capitalization model 1518 to capitalize transcriptions generated by the ASR system 1520.

Additionally or alternatively, the capitalizer 1515 may use the capitalization model 1518 to insert capitalization into a second corpus of text, such as text generated from transcriptions generated by a transcription system that includes the transcription unit 1514. The second corpus of text may be provided to the capitalization database 1522. In some embodiments, the first corpus and/or the second corpus may be used by the capitalization model trainer 1516 to generate a second capitalization model that may be used by the capitalizer 1515. In this manner, the capitalization model may be updated as the transcription unit 1514 generates additional transcriptions.

In some embodiments, the capitalization model 1518 may also be trained using capitalization spoken by a CA or edits of capitalization obtained from a CA using, for example, a text editor.

In some embodiments, the ASR system 1520 may add capitalization to a transcription using other methods than the method described above with respect to the capitalizer 1515. For example, one or more methods may be used as described below in Table 8.

TABLE 8

1. The audio stream is analyzed to identify silence segments and to determine a pitch contour over time. A set of rules assigns capitalization based on the duration of silence segments, time between silence gaps, and shape of the pitch contour. For example, when a first silence segment greater than a first time period (e.g., 0.5 seconds) is found, the time since the previous silence segment is at least a second time period (e.g., three seconds), and the voice pitch frequency since the previous silence segment has dropped at least a specified percentage (e.g., 10%), the first letter following the first silence segment may be capitalized.
2. A capitalizer 1515 uses a capitalization model to capitalize text and may be responsive to punctuation inserted by the punctuator 1504.
3. A set of rules responsive to text input may be constructed for adding capitals to text. For example, the first letter following a period and the first letter of words that match entries in a capitalized term list may be capitalized.
4. Capitalization may be added using a combination of the above methods. For example,
   a. A letter may be capitalized when either the set of rules described in method #1 above or the capitalizer described in method #2 above determine that the letter should be capitalized.
   b. A model such as a recurrent convolutional neural network may be trained on acoustic and text features to generate capitalization.

capitalizing and punctuating a transcription may incur some latency. In these and other embodiments, the latency may be due to the capitalizer 1515 and punctuator 1504 using input ahead (i.e., in the future) of the point where capitalization and punctuation are inserted. In some embodiments, overall latency may be reduced by converting audio to text using a first method that provides a lower accuracy transcription with lower latency and a second method that provides a higher accuracy transcription with higher latency. Capitalization and punctuation determined using the first method may be applied to a transcription determined using the second method to reduce the latency. Alternatively or additionally, the capitalizer 1515 and the punctuator 1504 may further determine capitalization and punctuation based on the second transcription. A comparison may be made between the first transcription and the second transcription to determine errors. Some or all of the errors may be corrected and may be sent to the first device as corrections.

In some embodiments, training the punctuation model 1506 and the capitalization model 1518 may be performed using transcription generated by the transcription unit 1514. In these and other embodiments, the transcriptions may include personal information and non-personal information. The non-personal information may be stored and the personal information deleted using methods disclosed herein for storing data to train language and acoustic models. For example, n-grams may be extracted from the transcriptions, filtered for privacy, and saved, together with capitalization and punctuation marks. In another example, transcriptions are filtered for privacy and stored (see FIG. 60). In these and other embodiments, the capitalization model 1518 and the punctuation model 1506 may be built from the saved data and features. Methods for extracting n-grams and applying privacy filters are described below in greater detail.

Modifications, additions, or omissions may be made to the environment 1500 without departing from the scope of the present disclosure. For example, the punctuation model trainer 1508 and the capitalization model trainer 1516 may not include the punctuation model trainer 1508 and the capitalization model trainer 1516 as described. Rather, the punctuation model trainer 1508 and the capitalization model trainer 1516 may include neural networks that may be built or adapted on-the-fly, using for example, gradient descent training and machine learning to generate the punctuation model 1506 and the capitalization model 1518. Additional details regarding training models on-the-fly are disclosed in the context of training acoustic and language models with reference to FIGS. 74 and 84.

Figure 16:
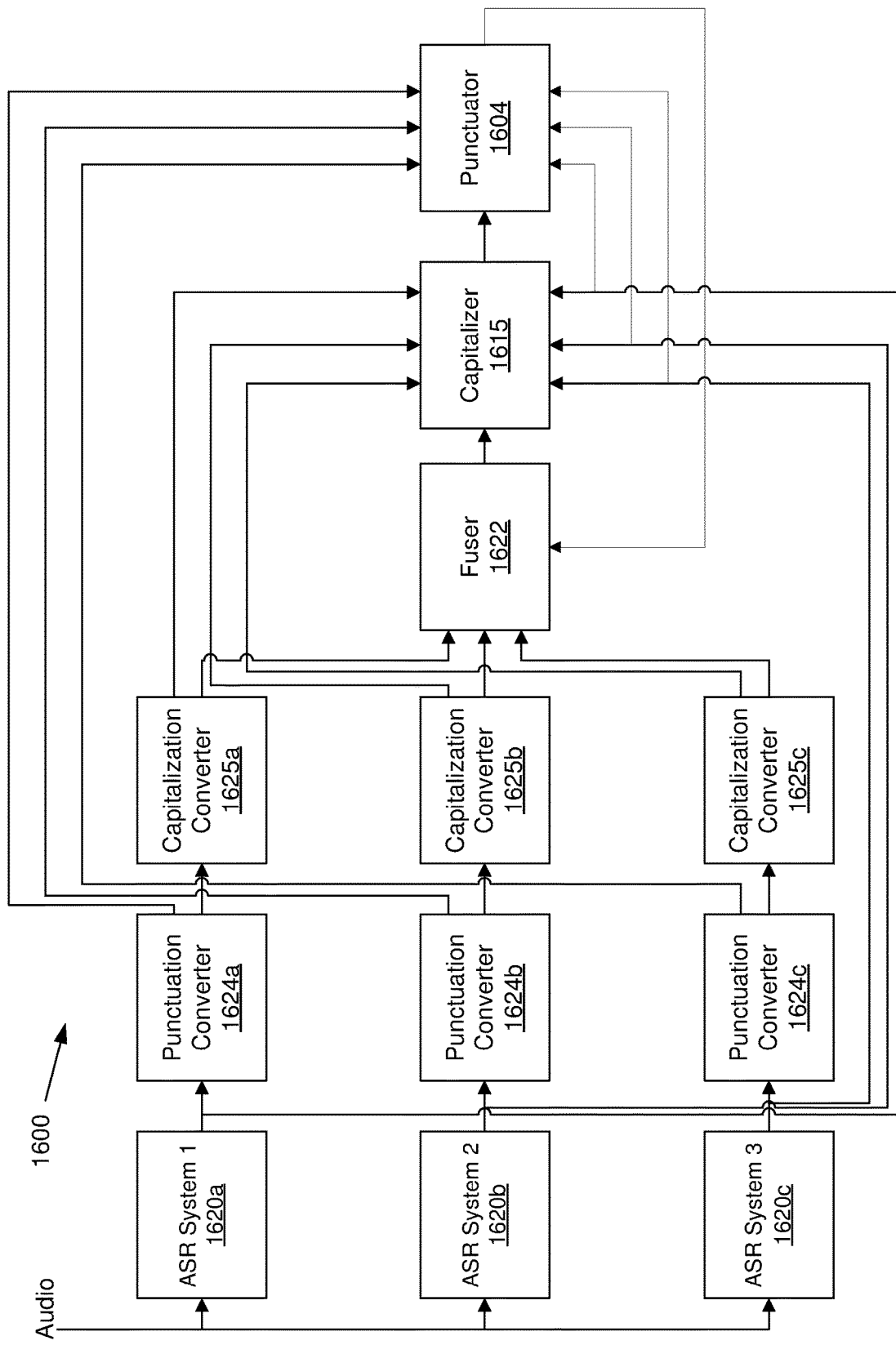
FIG. 16 illustrates an example environment for providing capitalization and punctuation to fused transcriptions.

FIG. 16 illustrates an example environment 1600 for providing capitalization and punctuation to fused transcriptions, arranged in accordance with some embodiments of the present disclosure. The environment 1600 may include a first ASR system 1620*a*, a second ASR system 1620*b*, and a third ASR system 1620*c*, collectively referred to as the ASR system(s) 1620. The environment 1600 may also include a first punctuation converter 1624*a*, a second punctuation converter 1624*b*, and a third punctuation converter 1624*c*, collectively referred to as the punctuation converter(s) 1624. The ASR systems 1620 may obtain audio and generate transcriptions of the audio. The ASR systems 1620 may provide the transcriptions to the punctuation converters 1624. The punctuation converters 1624 may be configured to remove punctuation or convert punctuation from the transcriptions to a format suitable for fusion.

The environment 1600 may also include a first capitalization converter 1625*a*, a second capitalization converter 1625*b*, and a third capitalization converter 1625*c*, collectively referred to as the capitalization converter(s) 1625. The capitalization converters 1625 may be configured to remove capitalization or convert capitalization of the transcriptions from the ASR systems 1620 to a format suitable for fusion. The environment 1600 may also include a fuser 1622, a capitalizer 1615, and a punctuator 1604. In some embodiments, the punctuator 1604 may be configured to replace punctuation after fusion of transcriptions by the fuser 1622. Alternatively or additionally, the capitalizer 1615 may be configured to replace capitalization after fusion.

The environment 1600 may operate in one or more different modes. The different modes are discussed in turn.

In a first mode, the punctuation and capitalization of the transcriptions generated by the ASR systems 1620 may be converted into tags by the punctuation converters 1624 and capitalization converters 1625. The tags may be inserted into the transcriptions. The transcriptions may be provided to the fuser 1622. The fuser 1622 may fuse the transcriptions with the tags. For example, the phrase "Jacob is sick." may be converted to "Jacob is sick_period_" by the punctuation converter 1624. The capitalization converter 1625 may convert "Jacob is sick_period_" to "_capital_ jacob is sick_period_". In some embodiments, the punctuation converters 1624 may separate punctuation marks from each word by at least one space or using whitespace so that the fuser 1622 processes words and punctuation marks as separate tokens.

After fusion of the transcriptions with the inserted tags by the fuser 1622, the tags of the fused transcription may be converted back to punctuation and capitalization. In some embodiments, the fuser 1622 may be configured to treat tags as regular tokens for purposes of alignment and voting. Additionally or alternatively, the fuser 1622 may be configured to ignore tags or may assign weights for tags that are different from weights for other tokens for purposes of alignment and/or voting. In these and other embodiments, the capitalizer 1615 and the punctuator 1604 may not be utilized.

In a second mode, a first transcription, which contains marks such as punctuation and capitalization, is generated by the first ASR system 1620*a*. The first transcription is provided to the fuser 1622 without having the punctuation and capitalization removed. The first transcription may be selected to not have the punctuation and capitalization removed based on the first transcription having the highest word and/or capitalization and/or punctuation accuracy.

In these and other embodiments, the second and third punctuation converters 1624*b* and 1624*c* may be configured to remove the punctuation from the transcriptions from the second and third ASR systems 1620*b* and 1620*c*. The second and third capitalization converters 1625*b* and 1625*c* may be configured to remove the capitalization from the transcriptions from the second and third ASR systems 1620*b* and 1620*c*. Thus, the transcriptions from the second and third ASR systems 1620*b* and 1620*c* may not include punctuation and capitalization and may be provided to the fuser 1622.

The fuser 1622 may be configured to pass through all punctuation and capitalization and to keep punctuation aligned in the transcriptions. In these and other embodiments, the fuser 1622 may combine the transcriptions from the ASR systems 1620 into a fused transcription. The fuser 1622 may also be configured to align the fused transcription with the first transcription to insert the capitalization and the punctuation from the first transcription into the fused transcription. In these and other embodiments, multiple transcriptions may be fused with punctuation and capitalization. Alternatively or additionally, multiple transcriptions may be fused without punctuation and capitalization. The two groups of fused transcriptions may be fused to add punctuation and capitalization.

In a third mode, punctuation and capitalization are removed from the transcriptions before fusion by the fuser 1622. In these and other embodiments, the punctuation converters 1624 and the capitalization converters 1625 may be configured to remove the punctuation and capitalization. A record of the locations of the punctuation and capitalization may be retained and provided to the capitalizer 1615 and the punctuator 1604. In these and other embodiments, the capitalizer 1615 and the punctuator 1604 may receive the record of the locations of the punctuation and capitalization and may be configured to reinsert the punctuation and capitalization into the transcriptions fused by the fuser 1622.

In a fourth mode, punctuation and capitalization may be attached as attributes to tokens in the transcriptions by the punctuation converters 1624 and the capitalization converters 1625, respectively. The attributes and the tokens in the transcriptions may be provided to the fuser 1622. The fuser 1622 may align the tokens and may select tokens and attributes of punctuation and capitalization based on a voting process as described previously. For example, if three hypotheses include:

"Go, please."
"No. Please."
"So please."

and "go please" is selected by voting, then the attributes of "go" (an initial capital and a coma) may be retained since "go" was selected through voting. Alternatively or additionally, the word "please" may be rendered with a lower-case "p," because the lower-case version of the word has a two-to-one majority, and the period after "please" may be retained since it is unanimously attached to "please." The fused result may then be "Go, please." in this example. The same method may be used to attach other attributes such as hyphens, words in all capitals, mixed capitals such as camelCase, contractions, apostrophes, accents, diacritics, etc., to tokens. Based on a token being selected, the attributes attached to words may be selected or a further process to vote on the attribute may be performed.

As described, various embodiments disclose methods for providing both punctuation and capitalization. However, the providing of punctuation and capitalization may be separated. In these and other embodiments, the steps for providing punctuation may be implemented without providing capitalization and the steps for providing capitalization may be implemented without providing punctuation.

Modifications, additions, or omissions may be made to the environment 1600 without departing from the scope of the present disclosure. For example, in some embodiments, the punctuator 1604, capitalizer 1615, the punctuation converters 1624, and capitalization converters 1625 may not be part of the environment 1600.

As another example, the environment 1600 may not include one or more of the punctuation converters 1624 and capitalization converters 1625 and one or more of the punctuator 1604 and the capitalizer 1615.

As another example, the environment 1600 may not include the punctuation converters 1624, and capitalization converters 1625. In these and other embodiments, the ASR systems 1620 may generate transcriptions without punctuation or capitalization and send the transcriptions to the fuser 1622. The fuser 1622 may fuse the transcriptions to generate a fused transcription. The fused transcription may be provided to the capitalizer 1615 and punctuator 1604 to add capitalization and punctuation, respectively, to the fused transcription.

Figure 17:
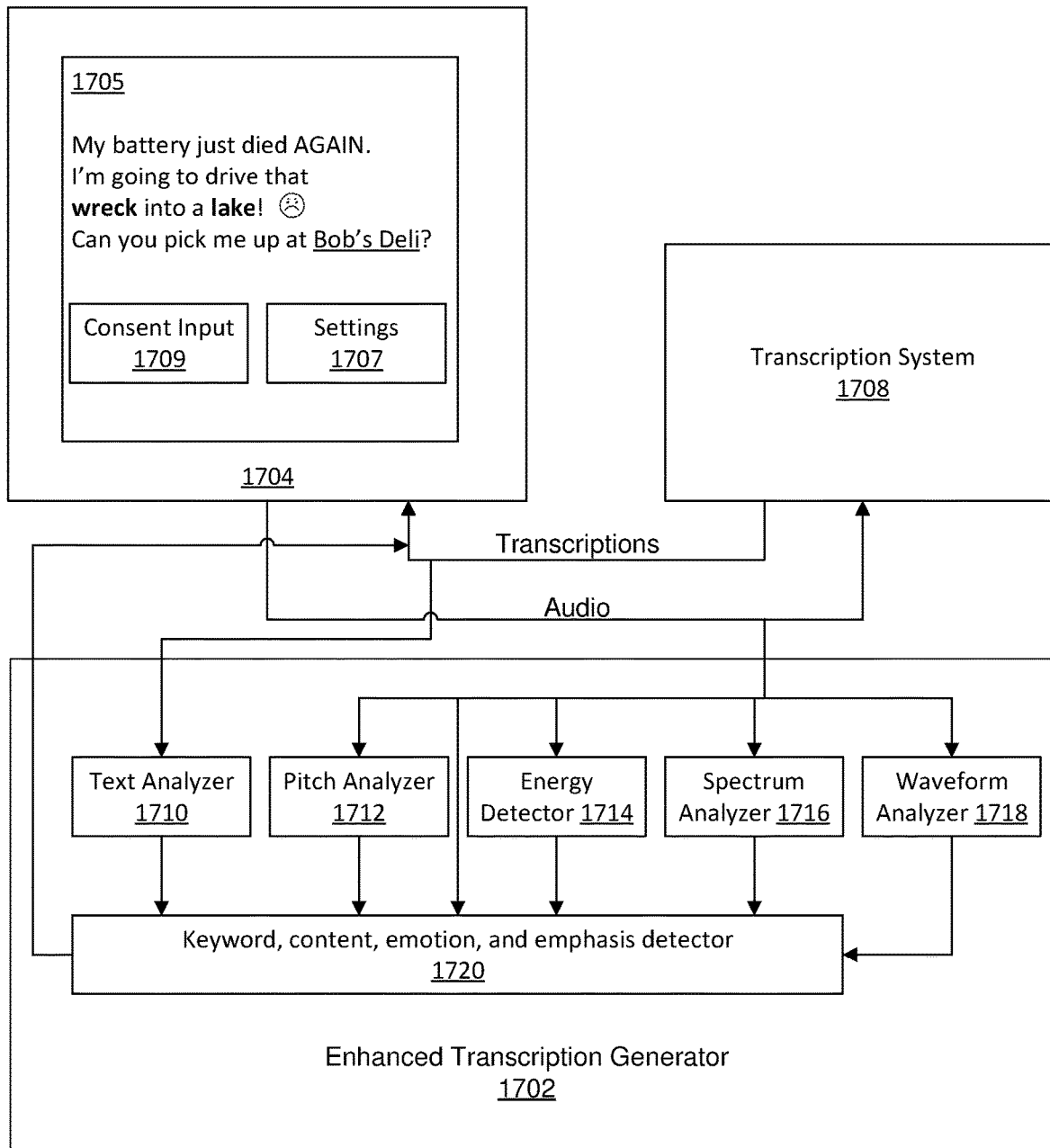
FIG. 17 illustrates an example environment for transcription of communications.

FIG. 17 illustrates an example environment 1700 for transcription of communications, in accordance with some embodiments of the present disclosure. The environment 1700 may include a device 1704, a transcription system 1708, and an enhanced transcription generator 1702. The device 1704 may be associated with a user and may be configured to obtain and provide audio to the transcription system 1708 and the enhanced transcription generator 1702. The transcription system 1708 may be configured to generate transcriptions of the audio and provide the transcriptions to the device 1704 and the enhanced transcription generator 1702. The device 1704 may include a display 1705, upon which the transcription of the audio may be presented.

In some embodiments, a user that is presented the transcription by the device 1704 may struggle to decipher emotion and word emphasis from the plain text of the transcription. In particular, the user may struggle to decipher emotion and word emphasis from plain text if the user's hearing loss is significant and the user relies more on transcriptions than audio to carry on the conversation. In these and other embodiments, if the user is unable to detect attributes such as subtle changes in a speaker's tone of voice, he or she may miss important cues which can lead to misunderstandings. In these and other embodiments, the enhanced transcription generator 1702 may be configured to obtain the audio and provide instructions to the device 1704 regarding adjusting the presentation of the transcription such that the presented transcription provides context regarding emotion and word emphasis from the audio. The presentation of the transcription may be adjusted by adjusting the presentation of certain words in the transcription or adding symbols to the transcription.

In some embodiments, a user who may rely on the presented transcriptions to understand the conversation may also struggle to detect key information in a presented transcription. In these and other embodiments, the enhanced transcription generator 1702 may also be configured to obtain the audio and provide instructions to the device 1704 regarding adjusting the presentation of the transcription such that the presentation of key words/phrases (for example: names, appointment times, phone numbers, and locations) in the transcription are adjusted to distinguish the key words/phrases from other portions of the transcription.

In some embodiments, the enhanced transcription generator 1702 may be configured to analyze the audio of the speaker and/or the transcriptions generated by the transcription system 1708 to identify emotion, word emphasis, key words, and/or phrases, among other aspects of a conversation. In some embodiments, to identify emotion, word emphasis, key words, and/or phrases, the enhanced transcription generator 1702 may include one or more of: a text analyzer 1710, a pitch analyzer 1712, an energy detector 1714, a spectrum analyzer 1716, or a waveform analyzer 1718. In these and other embodiments, one or more of the text analyzer 1710, pitch analyzer 1712, energy detector 1714, spectrum analyzer 1716, and waveform analyzer 1718 may be configured to obtain and analyze the audio. One or more of the text analyzer 1710, pitch analyzer 1712, energy detector 1714, spectrum analyzer 1716, and waveform analyzer 1718 may provide an analysis of the audio to a detector 1720. The analysis of the audio may determine values of or changes in pitch, volume, speaking rate, features derived from spectral characteristics, and other factors. The detector 1720 may be configured to compare the values or changes to property characteristics of the aforementioned attributes to determine emotion, word emphasis, key words, and/or phrases. The detector 1720 may also be configured to associate the determined emotion and word emphasis with associated words in the transcription. The detector 1720 may provide an indication of the words in the transcription that may be adjusted, the type of adjustment, and/or symbols, such as words, characters, or other symbols that may be added to the transcription to attempt to convey the determined emotion and word emphasis.

In some embodiments, the detector 1720 may also be configured to apply natural language processing or other techniques to the transcription to assist in identifying key words, and/or phrases. The detector 1720 may provide an indication of the identified key words and/or phrases in the transcription that may be adjusted and the type of adjustment.

In some embodiments, the detector 1720 may be configured to mark the words or phrases in the transcription that may be adjusted. In these and other embodiments, the words or phrases in the transcription may be marked with tags such as XML tags (similar to the <c> and </c> tags that may be used to denote corrections). Marking the words may adjust a presentation of the words. The adjustments to the words may include one or more of the following, among others:
 1. Changing the font (e.g., Helvetica vs. Courier)
 2. Changing the font color
 3. Bolding
 4. Italicizing
 5. Underlining
 6. Highlighting
 7. Graphics or images near the text such as an arrow or pointing finger
 8. Graphics surrounding the text such as a box or other enclosure
 9. An effect that changes over time such as sparkles, pulsing text, text that vibrates or is otherwise in motion, a video, or a strobe effect
 10. Capitalization (such as all-caps)
 11. Inserting an emoji or emoticon
 12. Inserting text descriptions such as "(angry)" or "[laughing]"
 13. Delimiting, for example, emphasized text with characters such as braces or other markings
 14. A combination of the above.

In some embodiments, the detector 1720 may provide the transcription with the marked words and/or additional symbols to the device 1704. The device 1704 may present the transcription on the display 1705. The device 1704 may present the adjustments to the transcription based on the tags in the transcription. As illustrated in FIG. 17, various words may be adjusted to denote emotion. For example, the words, "wreck" and "lake" are bolded. Additionally, an emoticon is added to convey the emotion of the speaker.

Additionally or alternatively, when words are presented on the display 1705 that may be associated with data for which other aspects of the device 1704 may use to perform functions, such as telephone numbers, email addresses, references to additional information, URLs or other Internet addresses, etc., links to allow usage of the data may be created. For example, the display 1705 may be a touch screen that allows a user to click a link or an icon such as the consent input element 1709 or the settings 1707 to activate. The words associated with the data, for which links may be created, may be displayed in a manner that indicates the word is associated with the link. For example, a word may be displayed with a color change or with underlining to indicate that the word is associated with a link. For example, the words "Bob's Deli" are underlined in FIG. 17. The user may interact with the device 1704 to activate the link. Activating the link may include dialing a phone number, sending email, displaying additional information, or visiting a web page.

In some embodiments, the device 1704 may be configured to present a user interface that may obtain input from the user regarding settings 1707 that may be used to adjust the transcriptions. For example, the settings 1707 may allow for control of turning on or off each type of adjustment, such as emotion, word emphasis, and key words/phrases, individually or together as a group. Additionally or alternatively, when the transcription system 1708 sends a transcription, and later an update to the transcription, such as a correction to the transcription, the update may show as a strikethrough through the incorrect word with an emphasis on the corrected word. Alternatively or additionally, an update from the transcription system 1708 may cause the device 1704 to highlight the correction. In some embodiments, as will be discussed below in greater detail with reference to FIG. 53, the device 1704 may also be configured to obtain user input with respect to consent from the user to record a conversation through a consent input element 1709.

Modifications, additions, or omissions may be made to the environment 1700 without departing from the scope of the present disclosure. For example, in some embodiments, the enhanced transcription generator 1702 is illustrated as being separate from the device 1704 and the transcription system 1708. In some embodiments, the enhanced transcription generator 1702 may be part of the device 1704 or the transcription system 1708. As another example, the display 1705 may be part of another device, such as a television that communicates with the device 1704.

FIGS. 18-30, among others, describe various systems and methods that may be used to select between different transcription units for providing transcriptions for obtained audio. Alternatively or additionally, FIGS. 18-30, among others, describe various systems and methods that may switch between the different transcription units providing transcriptions for audio of a communication session during the communication session. In these and other embodiments, a criteria for selecting between transcription units may include the estimated accuracy of each transcription unit. For example, when a non-revoicing transcription unit provides an estimated accuracy that satisfies a threshold, the non-revoicing transcription unit may be selected over a revoicing transcription unit.

Figure 18:
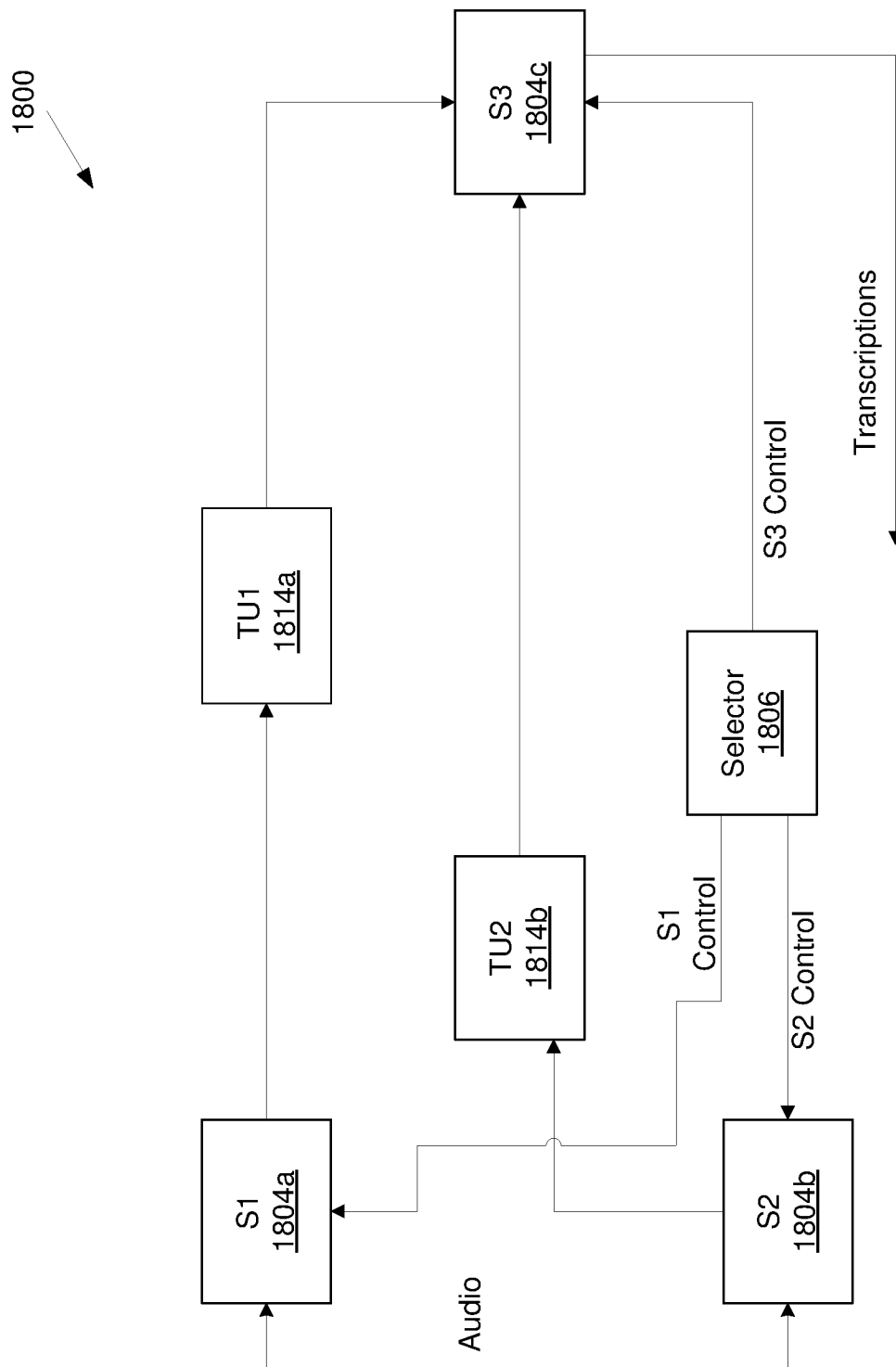
FIG. 18 illustrates another example environment for transcription of communications.

FIG. 18 illustrates another example environment 1800 for transcription of communications, in accordance with some embodiments of the present disclosure. The environment may include a first switch 1804a, a second switch 1804b, a third switch 1804c, referred to collectively as the switches 1804, a selector 1806, a first transcription unit 1814a, and a second transcription unit 1814b.

The first transcription unit 1814a may be a revoiced transcription unit as previously described. The second transcription unit 1814b may be a non-revoiced transcription unit as previously described. The switches 1804 may be configured to direct or pass data, such as audio and transcriptions based on their configuration. The configuration of the switches may be controlled by the selector 1806.

In some embodiments, the first switch 1804a and the second switch 1804b may be configured to obtain audio. The audio may be from a communication session or from some other source. The first switch 1804a may be configured to block the audio or pass the audio to the first transcription unit 1814*a* based on the configuration of the first switch 1804*a*. The first transcription unit 1814*a* may generate a transcription of the audio and provide the transcription to the third switch 1804*c*. The second switch 1804*b* may be configured to block the audio or pass the audio to the second transcription unit 1814*b*. The second transcription unit 1814*b* may be configured to generate a transcription of the audio and provide the transcription to the third switch 1804*c*.

In some embodiments, the third switch 1804*c* may select between a transcription from the first transcription unit 1814*a* or the second transcription unit 1814*b*. The selector 1806 may control the switches 1804. Thus, the selector 1806 may be configured to determine when audio is sent to the first transcription unit 1814*a* and the second transcription unit 1814*b* and which transcription is output by the third switch 1804*c*. The selector 1806 may be configured to control the switches 1804 independently. For example, the selector 1806 may direct the first switch 1804*a* to direct audio to the first transcription unit 1814*a* and also direct the second switch 1804*b* to direct audio to the second transcription unit 1814*b*, in overlapping time periods. In these and other embodiments, both the first transcription unit 1814*a* and the second transcription unit 1814*b* receive the same audio at approximately the same or at the same time. In these and other embodiments, both the first transcription unit 1814*a* and the second transcription unit 1814*b* may generate transcriptions and/or other data.

As another example of independent control of the switches 1804 by the selector 1806, when switching audio away from the first transcription unit 1814*a*, the second switch 1804*b* may direct audio to the second transcription unit 1814*b* before the first switch 1804*a* stops providing the audio to the first transcription unit 1814*a* so that the second transcription unit 1814*b* may begin generating transcriptions before the first transcription unit 1814*a* stops generating transcriptions. Likewise, when switching from the second transcription unit 1814*b* to the first transcription unit 1814*a*, the first switch 1804*a* may send audio to the first transcription unit 1814*a* for a period of time before the second transcription unit 1814*b* stops generating transcriptions, allowing the first transcription unit 1814*a* to begin generating transcriptions.

As another example of independent control of the switches 1804 by the selector 1806, when the third switch 1804*c* switches between transcriptions from the first transcription unit 1814*a* and the second transcription unit 1814*b*, the third switch 1804*c* may be timed to account for relative latency of each of the first transcription unit 1814*a* and second transcription unit 1814*b*. For example, if the latency through the first transcription unit 1814*a* is x (four, for example) seconds and the latency through the second transcription unit 1814*b* is y (one second, for example), when switching between the transcription from the first transcription unit 1814*a* to the transcription from the second transcription unit 1814*b*, the third switch 1804*c* may wait (as directed by the selector 1806) for a time period x-y (e.g., three seconds) after the first switch 1804*a* has directed audio to the second transcription unit 1814*b* before selecting the transcriptions from the second transcription unit 1814*b*. To avoid missing text, the selector 1806 may direct the second switch 1804*b* to send audio to the second transcription unit 1814*b* before directing the third switch 1804*c* to select text from the second transcription unit 1814*b*. Providing audio to the second transcription unit 1814*b* in advance may also increase accuracy of the second transcription unit 1814*b* by providing prior context to the language model. Similarly, the selector 1806 may direct the first switch 1804*a* to send audio to the first transcription unit 1814*a* before directing the third switch 1804*c* to select text from the first transcription unit 1814*a*.

In some embodiments, the selector 1806, as discussed above, is configured to transmit control commands to the switches 1804 that determine a destination of the audio and to select between transcriptions. In these and other embodiments, the selector 1806 may be configured to control the switches 1804 based on one or more features such as accuracy of the second transcription unit 1814*b*, availability of the first transcription unit 1814*a*, and other features from Table 2 and Table 5. Alternatively, both the selector 1806 and switches 1804 may be implemented as software executed by a processor and configured to direct audio to different locations/destinations. The selector 1806 may use one or more of the following methods to control the switches 1804:

1. Start or continue a communication session with the second transcription unit 1814*b*. Add or switch to the first transcription unit 1814*a* if the estimated error rate of the second transcription unit 1814*b* exceeds a selected threshold.
2. Start or continue a communication session with the first transcription unit 1814*a* and run the second transcription unit 1814*b* in parallel. When agreement between the transcriptions of the first transcription unit 1814*a* and the second transcription unit 1814*b* exceeds a selected threshold, switch to the second transcription unit 1814*b*.
3. Start or continue a communication session with the second transcription unit 1814*b* generating transcriptions and a CA using a text editor to listen to communication session audio and correct errors of the second transcription unit 1814*b*. If a CA correction rate falls below a selected threshold or if an estimated error rate of the second transcription unit 1814*b* falls below a selected threshold, drop the CA.
4. Switch to the first transcription unit 1814*a* if a new speaker is detected.
5. Before transcription begins, use information on a communication session characteristics (see Table 2) and information on previous communication sessions with one or more of the parties to make a decision to start the communication session with the second transcription unit 1814*b*, the first transcription unit 1814*a*, or a combination thereof (see Table 1).
6. Fuse the transcriptions from the second transcription unit 1814*b* and the first transcription unit 1814*a* to increase accuracy Modifications, additions, or omissions may be made to the environment 1800 without departing from the scope of the present disclosure. For example, in some embodiments, the second transcription unit 1814*b* may be part of a transcription unit. Alternatively or additionally, the first switch 1804*a* and the second switch 1804*b* may be combined in a single switch. Thus, while the switches 1804 are represented as different devices, the switches 1804 may be included in any combination of devices. Alternatively or additionally, the switches 1804 as described may be implemented by hardware, software, or some combination thereof that is configured to perform the functionality of the switches 1804 as described in this disclosure.

Alternatively or additionally, the configurations and actions of the switches 1804 as illustrated in FIG. 18 and with respect to other Figures are illustrative and meant to convey actions of routing signals and starting and stopping processes. Comparable actions may be implemented by systems and/or methods. For example, instead of the first and second switches 1804a and 1804b, the functionality of the first transcription unit 1814a and the second transcription unit 1814b may be controlled. For example, the second transcription unit 1814b may receive a signal to start or stop transcription of audio which may result in the same result as controlling the outputs of the second switch 1804b. In another example, the action of a switch (a) directing audio to or (b) blocking audio from a transcription unit may be replaced by sending audio to the transcription unit in either case and (a) selecting audio or (b) ignoring audio from the transcription unit.

The locations of switches 1804, the selector 1806, and the second transcription unit 1814b are also illustrative. One or more of those components may alternatively be implemented by a processor executing instructions on a device participating in a communication session from which the audio discussed in this embodiment is obtained. For example, if the second transcription unit 1814b executes on a device, the selector 1806 may send a signal to the device indicating whether audio should be provided to the ASR system 1821 or to the first transcription unit 1814a and from where transcriptions should be received, such as from the ASR system 1821 or the first transcription unit 1814a. In another example, if the ASR system 1821 and the selector 1806 are implemented on a device, the selector 1806 may determine that audio may be processed to create transcriptions internally on the device by the ASR system 1821, sent to an external location for processing with an outside ASR system, or sent to the first transcription unit 1814a for generating transcriptions.

Figure 19:
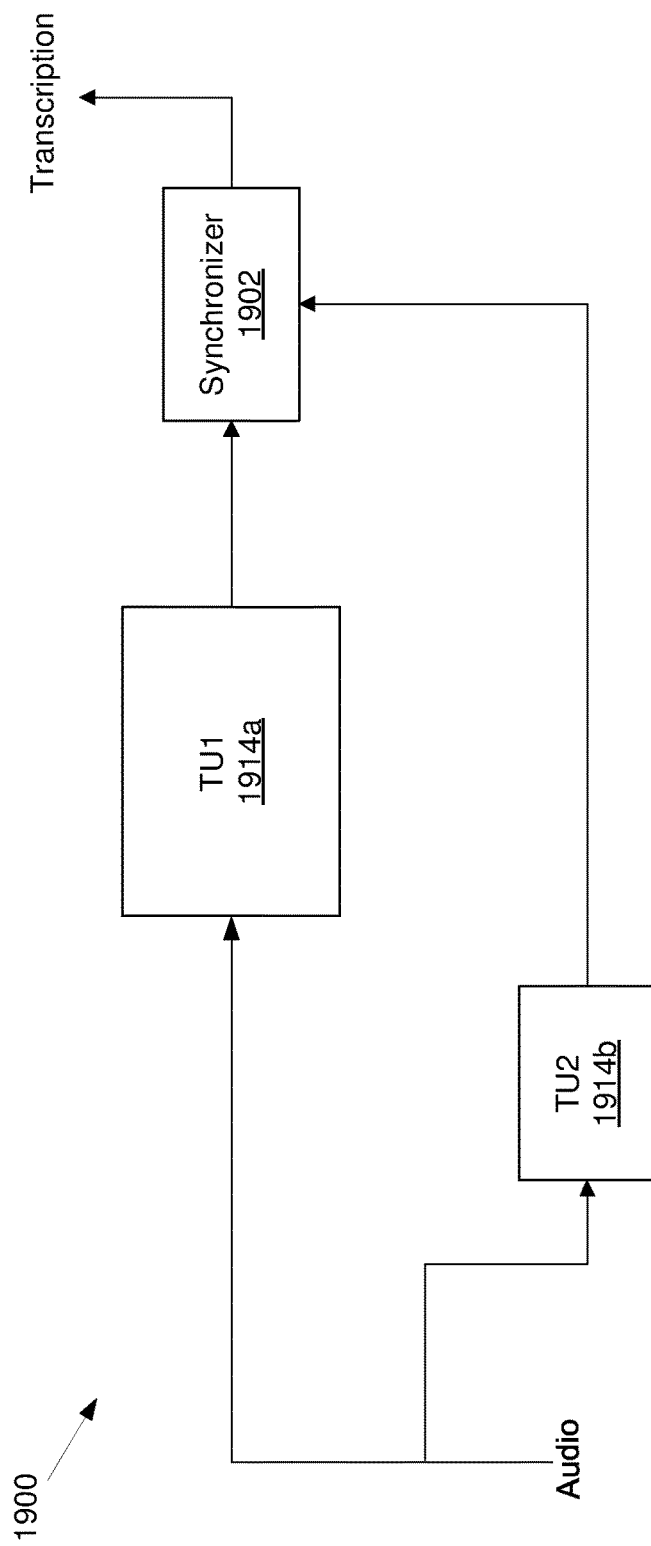
FIG. 19 illustrates another example environment for transcription of communications.

FIG. 19 illustrates another example environment 1900 for transcription of communications, in accordance with some embodiments of the present disclosure. The environment 1900 may include a synchronizer 1902, a first transcription unit 1914a, and a second transcription unit 1914b, collectively the transcription units 1914. The first transcription unit 1914a may be a revoiced transcription unit. The second transcription unit 1914b may be a non-revoiced transcription unit. Each of the transcription units 1914 may be configured to generate transcriptions from audio and provide the transcriptions to the synchronizer 1902. The first transcription unit 1914a may generate a first transcription and the second transcription unit 1914b may generate a second transcription.

The synchronizer 1902 may be configured to obtain the transcriptions from the transcription units 1914. The synchronizer 1902 may be configured to output one of the transcriptions. For example, the synchronizer 1902 may output one of the transcriptions to a device for presentation to a user.

The synchronizer 1902 may also be configured to change which one of the transcriptions is being output. In these and other embodiments, the synchronizer 1902 may be configured to transition between transcriptions being output in a manner such that the output transcription does not include duplicate words from the first and second transcriptions, does not miss words that are included in the first and second transcriptions, and does not present words in an improper order. In short, the synchronizer 1902 may be configured to switch between the first and second transcriptions used to provide the output transcription without the output transcription including an indication of the switch between the first and second transcriptions.

In some embodiments, to transition between the first and second transcriptions, the synchronizer 1902 may be configured to align the first and second transcriptions and check to ensure that the transcriptions are in sync before making the switch. In some embodiments, the synchronizer 1902, may align the first and second transcriptions to compensate for differences in latency (i.e., the time difference between audio input and text output) for the transcription units 1914. In these and other embodiments, to align the first and second transcriptions, the synchronizer 1902 may add a constant delay to the first and second transcriptions. Alternatively or additionally, the synchronizer 1902 may wait for a silent segment or period of time with no speech such that neither of the first and second transcriptions include text to switch between the first and second transcriptions.

A more specific example to transition between the transcriptions is now provided. The synchronizer 1902 may receive a first transcription T1 from the revoiced first transcription unit 1914a. The synchronizer 1902 may receive a second transcription T2 from the non-revoiced second transcription unit 1914b. The synchronizer 1902 may search for a first segment or sequence of words in the first transcription that aligns with a second segment in the second transcription. For example, suppose the first transcription and the second transcription at a given moment (e.g., within a sliding time window of a particular duration) end with the following:

T2" . . . going to stop worry about what you think. I hope that doesn't upset you or cause"

T1" . . . finally decided I'm going to stop worrying what you think. I hope that"

Note that the speaker in this example is still speaking, so the sentences may not be complete. Note also that latencies of the transcription unit 1914 may be different, so one of the transcriptions (in this example the second transcription T2) may contain more recent text at a given point than the other. These transcriptions each contain a segment that partly matches with the other (showing an aligned format):

| ASR: | going | to | stop | worry | about | what | you | think. | I | hope | that |
| CA: | going | to | stop | worrying | ---- | what | you | think. | I | hope | that |

The synchronizer 1902 may be configured to find segments in the first and second transcriptions that match to within a selected set of criteria. The criteria may include, for example, a first rule that a minimum number of words match and a second rule regarding a maximum number of differences, for example that there are at least nine matching words and no more than two differences. Alternatively or additionally, the set of criteria may include a first rule that at least x (e.g., five) words must be matched, a second rule that the number of match errors cannot exceed y % (e.g., 25%) of the words in the segment, and a third rule that the last word in both segments must be the same.

When the alignment between the first transcription and the second transcription satisfies the alignment criteria, the synchronizer 1902 may output the aligned text and then switch between the first transcription and the second transcription. For example, the synchronizer 1902 may output the first transcription up through the end of the aligned segment of the first transcription. After outputting the end of the aligned segment of the first transcription, the synchronizer 1902 may output the second transcription beginning with the portion that immediately follows the aligned segment of the second transcription.

In some embodiments, the synchronizer 1902 may use other methods to align or match the transcriptions. For example, the synchronizer 1902 may use a Viterbi search or other dynamic programming method to align and identify segment matches in the first and second transcriptions. In some embodiments, the synchronizer 1902 may use information from the transcription units 1914 to align the first and second transcriptions. For example, the synchronizer 1902 may use word endpoints from ASR systems in the transcription units 1914 to align the first and second transcriptions. Alternatively or additionally, methods discussed with respect to aligning text with respect to fusing of transcriptions may also be used to switch between the first transcription and the second transcription.

In some embodiments, in response to switching between transcriptions, the synchronizer 1902 may be configured to send a message to the transcription units 1914 indicating the switch. As a result, the unselected transcription unit 1914 may be available to generate transcriptions for other audio.

In some embodiments, the synchronizer 1902 may be configured, when or prior to switching from the non-revoiced second transcription unit 1914*b* to the revoiced first transcription unit 1914*a*, to direct a CA client of the revoiced first transcription unit 1914*a* to display the second transcription or a summary of the second transcription over a preceding period of time. Displaying the second transcription may provide the CA performing the revoicing for the revoiced first transcription unit 1914*a* context for the communication session. In these and other embodiments, when displaying the second transcription to the CA before and/or after the switch to the first transcription, the second transcription text may be provided from a buffer. For example, the non-revoiced second transcription unit 1914*b* may generate a lattice in response to audio and, when a switch between transcriptions occur, the lattice may be decoded into text for display to the CA. Additionally or alternatively, audio may be saved, then, when the switch between transcriptions occur, the audio may be converted to text for display to the CA.

Additionally or alternatively, the CA client may direct the presentation of the second transcription over a longer period of time, during which the CA may provide edits to the second transcription. In these and other embodiments, the CA client may receive an indication from a CA to direct the synchronizer 1902 to switch between the first and second transcription. Additionally or alternatively, audio may be broadcast to a CA so that the CA may listen to the previous portion of the communication session before the synchronizer 1902 switches to the first transcription from the second transcription.

Modifications, additions, or omissions may be made to FIG. 19 and/or the components operating in FIG. 19 without departing from the scope of the present disclosure. For example, the environment 1900 may include one or more switches or selectors as described with respect to FIG. 18.

Figure 20:
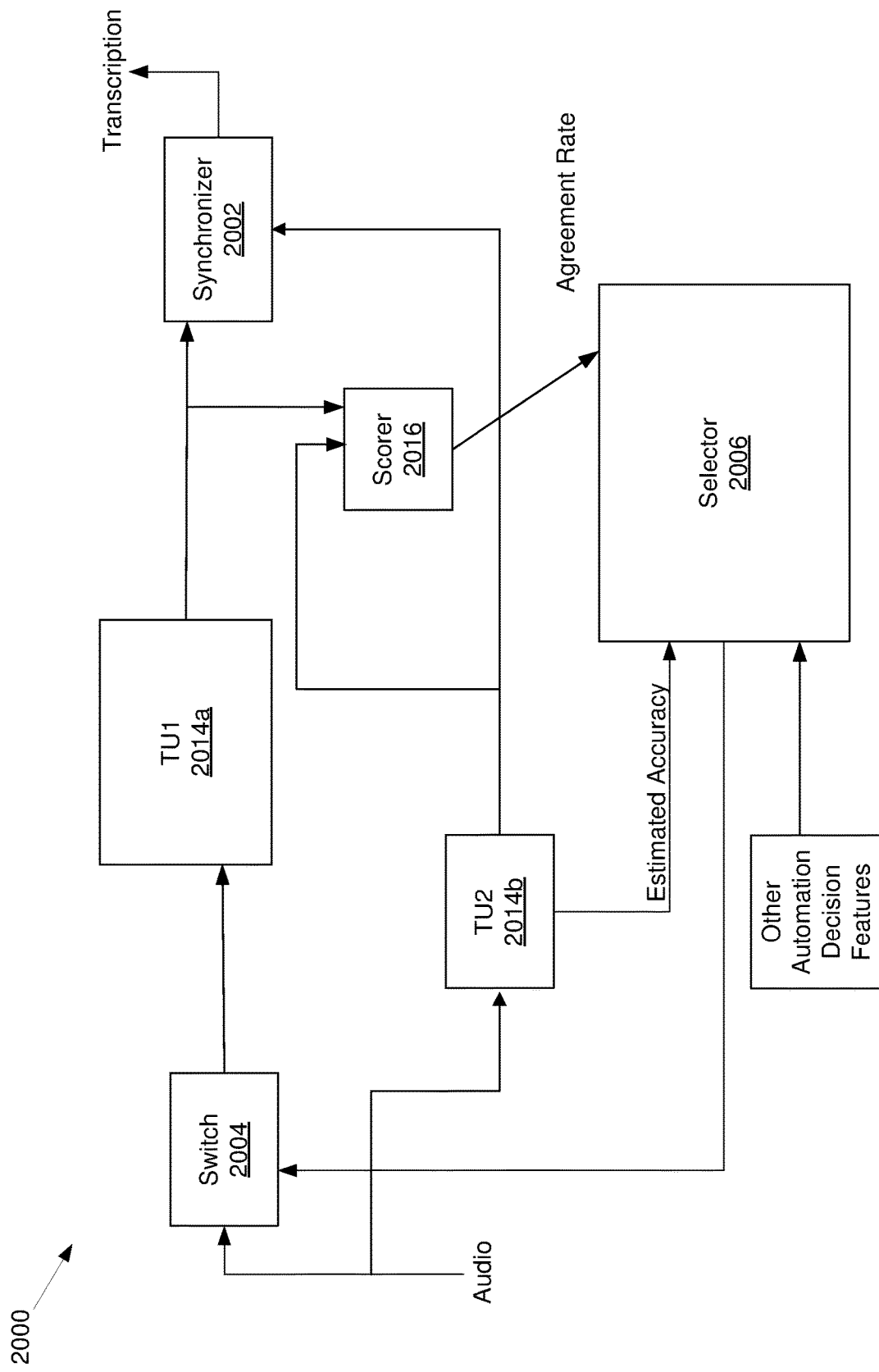
FIG. 20 illustrates another example environment for transcription of communications.

FIG. 20 illustrates another example environment 2000 for transcription of communications, in accordance with some embodiments of the present disclosure. The environment 2000 may include a synchronizer 2002, a first transcription unit 2014*a*, and a second transcription unit 2014*b*, collectively the transcription units 2014. The first transcription unit 2014*a* may be a revoiced transcription unit. The second transcription unit 2014*b* may be a non-revoiced transcription unit. Each of the transcription units 2014 may be configured to generate transcriptions from audio and provide the transcriptions to the synchronizer 2002. The first transcription unit 2014*a* may generate a first transcription and the second transcription unit 2014*b* may generate a second transcription. The synchronizer 2002 may select one of the first and second transcriptions to output based on commands from the selector 2006.

The environment 2000 may also include a switch 2004, a selector 2006, and a scorer 2016. The switch 2004 may be configured to be controlled by a selector 2006 to direct audio to the first transcription unit 2014*a* or not direct audio to the first transcription unit 2014*a*. In some embodiments, the selector 2006 may receive input from the second transcription unit 2014*b*, the scorer 2016, and/or other automation decision features to determine how to control the switch 2004 and the synchronizer 2002. In these and other embodiments, the scorer 2016 may provide an indication of an agreement rate between the first transcription and the second transcription. Various examples of a scorer 2016 are discussed in FIGS. 22 and 23.

In some embodiments, the selector 2006 may be configured to use the agreement rate from the scorer 2016, when the agreement rate is available, to determine how to control the switch 2004 and the synchronizer 2002. In these and other embodiments, when the agreement rate is not available, such as when the first transcription unit 2014*a* is not generating transcriptions, the selector 2006 may rely on other features to determine control decisions. In these and other embodiments, reference to making control decisions may relate to determining how to control the switch 2004 and the synchronizer 2002, including whether the switch 2004 may send audio to the first transcription unit 2014*a*, which of the first and second transcriptions the synchronizer 2002 may output, and whether the second transcription unit 2014*b* may generate transcriptions, among other control decisions regarding selecting between transcription units to generate transcriptions and selecting between transcriptions to output as discussed in this disclosure.

In some embodiments, the selector 2006 may also use as input to determine control decisions the agreement rate, an estimated accuracy of the second transcription from the second transcription unit 2014*b*, and other automation decision features. Alternatively or additionally, the selector 2006 may use only the estimated accuracy of the second transcription to determine control decisions. Alternatively or additionally, the selector 2006 may use other performance measures from the second transcription unit 2014*b*, such as average word confidence, sentence or phrase confidence, and likelihood ratio with respect to the second transcription, or other statistics or features from Table 2 or Table 5 to determine control decisions. In these and other embodiments, a likelihood ratio may be determined by subtracting the log likelihood scores for the top two hypotheses in an n-best list from one or more ASR systems of the second transcription unit 2014*b*.

As another example, a combination of features may be derived from internal ASR parameters from one or more ASR systems of the second transcription unit 2014*b* and used to estimate accuracy or another ASR performance measure. Examples of internal ASR parameters include, but are not limited to, the number of active arcs in a decoder search or the entropy or another statistic derived from the output probabilities from a neural network used as an acoustic model. In these and other embodiments, an ASR performance measure may pertain to each word, an average over a phrase or speaking turn in a conversation, or an entire session or conversation. In some embodiments, when using an ASR performance metric to determine control decisions, the selector 2006 may be configured to compare an ASR performance metric to a threshold. In response to the ASR performance metric satisfying the threshold, the selector 2006 may determine control decisions.

Alternatively or additionally, the selector 2006 may further rely on features unrelated to an ASR performance metric or an agreement rate to determine control decisions. In these and other embodiments, the features may include signal-to-noise ratio of the audio, speaker characteristics of the participants in the communication session generating the audio, such as accent, and transcription complexity, among other features.

In some embodiments, the selector 2006 may determine control decisions on other data including a communication session history from previous communication sessions of the transcription party or other features from Table 2 and Table 5. In these and other embodiments, based on a communication session history, an initial control decision, such as selecting between the transcription units 2014 may be determined before transcriptions are generated. For example, the communication session history may include information including performance criteria, such as ASR performance metrics from the second transcription unit 2014b, that may be used to determine control decisions before transcriptions are generated.

In some embodiments, the selector 2006 may further rely on features such as an account type (see Table 10 for examples), availability of the first transcription unit 2014a, communication session priority, and other features from Table 2 to determine control decisions before transcriptions are generated.

An example operation of the environment 2000 is now provided. The example operation may pertain to the selector 2006 selecting one of the transcription units 2014 based on previous communication session information. To begin, a connection between two or more users (a "first user" or "first party" and a "second user" or "transcription party") on a first communication session may occur. Transcription may be generated from the audio from the transcription party and provided to the first party. Information may be collected during the first communication session such as, ASR performance metrics, agreement rate, or other features from Table 2 or Table 5.

The collected information may be saved in a communication session history database. Two or more parties may be connected on a second communication session. It may be determined if one or more of the parties has previously participated in a communication session. In response to one or more of the parties having previously participated, information from the previous communication session may be analyzed. Based on collected information from the communication session history database and the analysis of the collected information, the selector 2006 may determine to use either one or both of the transcription units 2014 (see Table 1) to provide transcriptions for the communication session. In some embodiments, the selection may be further based on information known about the second communication session before the second communication session begins. In some embodiments, the selection may be further based on features from Table 2. In some embodiments, the selection may be further based on features from Table 5. Additionally or alternatively, after making the initial decision, the selector 2006 may determine to change the one of transcription units 2014 providing the transcriptions.

In some embodiments, the selector 2006 may use any of a number of estimation and classification methods such as machine learning methods to determine control decisions. Examples of estimation and classification methods include those listed below in Table 9, among others.

TABLE 9

| | |
|---|---|
| 1. | LDA (linear discriminant analysis) |
| 2. | Linear regression |
| 3. | Maximum entropy estimation |
| 4. | Maximum entropy modeling |
| 5. | Logistic regression |
| 6. | Neural networks (including variations such as DNNs, CNNs, LSTMs, etc.) |
| 7. | Finite state transducers |
| 8. | Kernel methods such as support vector machines ("SVMs") |
| 9. | Gaussian mixture models ("GMMs") |
| 10. | Table lookups |
| 11. | Set of rules |
| 12. | Decision trees |
| 13. | Random forests |
| 14. | Weighted sum of features |
| 15. | Transformed features (see FIGS. 27a and 27b) |
| 16. | Deep belief networks, Boltzmann machines, and other deep learning methods |

In some embodiments, the selector 2006 may use estimation and classification methods for which training may be performed. An example operation of the environment 2000 describing training the selector 2006 using machine learning is now provided. The operation is defined with respect to processes 1-7 provided below. Modifications, additions, or omissions may be made to the processes 1-7 without departing from the scope of the present disclosure. For example, the processes may be implemented in differing order. Additionally or alternatively, two or more processes may be performed at the same time. Furthermore, the outlined processes and actions are only provided as examples, and some of the processes and actions may be optional, combined into fewer processes and actions, or expanded into additional processes and actions without detracting from the essence of the disclosed example. Processes 1-7 may include:

1. Define an output for the selector 2006. The output may be, for example, a transcription accuracy estimate, a decision of whether to use a revoicing for transcription or to not use revoicing, a transcription unit configuration (see Table 1) or selection, a voting decision in a fuser, a determination to alert a CA of a possible error or to correct the error, a measure of or a refinement to an agreement or disagreement rate, a weight or severity assigned to a transcription error, or a determination that a piece of data contains sensitive information.

2. Select a set of training data samples. Data samples may be, for example, audio samples, data extracted from log files such as log files from a transcription service, transcriptions from revoiced and non-revoiced transcription units, etc.

3. Determine one or more target values associated with each training data sample. A target value may be the desired output from the selector 2006 for each training data sample. Target values may be labeled automatically, under human supervision, or a combination thereof. For example, in estimating accuracy, the target or desired accuracy output by selector 2006 corresponding to each data sample may be determined using labels assigned by humans.

4. Select a set of one or more features, such as features from Table 2 and Table 5, to be extracted from data samples and applied to the input of the selector 2006.

5. Associate a set of feature values for the set of features with each training data sample. For example, if audio samples are used as data samples, a feature may be a confidence estimate from an ASR system. Values for the feature may be determined by processing each training audio sample with the ASR system and reading a confidence estimate from the ASR output. For each set of feature values, the selector, classifier, or estimator may generate an output.
6. Select a cost function such as mean squared error, mean absolute error, or cross entropy. The cost function may be derived from the output and the target. For example, if a target is ASR accuracy and the output is estimated ASR accuracy, the cost may be the squared difference between estimated ASR accuracy and true ASR accuracy.
7. Use a machine learning method, such as one in Table 9, to train a selector, classifier, or estimator to use the set of features to determine an output that is close to the target, as measured by the cost function.

Modifications, additions, or omissions may be made to the environment 2000 without departing from the scope of the present disclosure.

Figure 21:
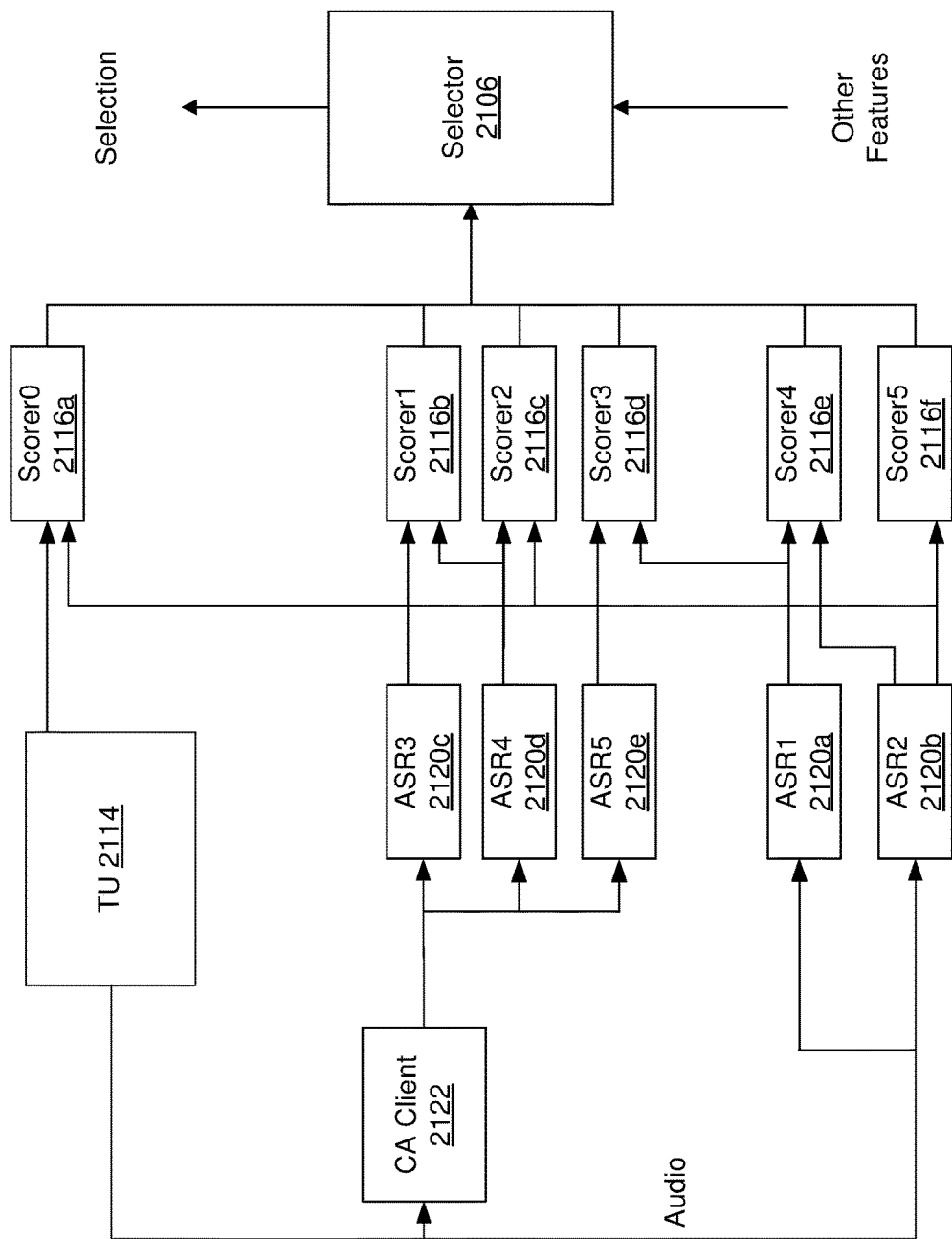
FIG. 21 illustrates another example environment for selecting between transcriptions.

FIG. 21 illustrates another example environment 2100 for selecting between transcriptions, in accordance with some embodiments of the present disclosure. The environment 2100 includes scorers 2116 including a first scorer 2116a, a second scorer 2116b, a third scorer 2116c, a fourth scorer 2116d, a fifth scorer 2116e, and a sixth scorer 2116f. The environment 2100 also includes ASR systems 2120, including a first ASR system 2120a, a second ASR system 2120b, a third ASR system 2120c, a fourth ASR system 2120d, and a fifth ASR system 2120e. The environment 2100 also includes a transcription unit 2114, a CA client 2122, and a selector 2106.

In some embodiments, audio, for example from a communication session, may be provided to the CA client 2122, the transcription unit 2114, the first ASR system 2120a, and the second ASR system 2120b. The transcription unit 2114, the first ASR system 2120a, and the second ASR system 2120b may be configured to generate transcriptions using the audio and provide the transcriptions to various scorers 2116 as illustrated.

In some embodiments, the CA client 2122 may generate revoiced audio and provide the revoiced audio to the third ASR system 2120c, the fourth ASR system 2120d, and the fifth ASR system 2120e. The third ASR system 2120c, the fourth ASR system 2120d, and the fifth ASR system 2120e may be configured to generate transcriptions using the revoiced audio and provide the transcriptions to various scorers 2116 as illustrated.

In some embodiments, the transcription unit 2114 may be a revoiced transcription unit. In some embodiments, the fifth ASR system 2120e may be speaker-dependent based on the speaker revoicing the audio and interfacing with the CA client 2122. The other of the ASR systems 2120 may be speaker-independent. In these and other embodiments, each of the other ASR systems 2120 may include the same or different configurations of ASR models.

In some embodiments, each of the scorers 2116 may determine agreement rates between the respective transcriptions obtained and may provide the agreements to the selector 2106. The agreement rates between various transcriptions as determined by the scorers 2116 may be used as input features to the selector 2106. The selector 2106 may be analogous to the selector 2006 of FIG. 20 and may use the input features to determine control decisions.

Although depicted as the selector 2106 obtaining the agreement rates from all of the scorers 2116, in some embodiments, one or more of the ASR systems 2120 may not be used to generate transcriptions that may be selected for presentation to a party participating in a communication session generating the audio illustrated in the environment 2100. In these and other embodiments, the transcriptions and other output of the ASR systems 2120 may be used as input features for the selector 2106 and used by the selector 2106 to determine control decisions. In these and other embodiments, when a transcription or output of an ASR system output is used for selection and not for presentation, the ASR system may be run in a reduced mode (i.e., "crippled mode") that consumes fewer compute resources and may deliver relatively lower accuracy.

In some embodiments, one or more of the ASR systems 2120 may generate additional information such as:
1. Alternate transcriptions in the form of an n-best list, WCN, lattice, etc.;
2. Confidence scores or accuracy metrics; and
3. Meta-information on acoustic or ASR parameters such as beam width, CPU usage, signal characteristics, or perplexity scores.

The additional information may be provided to the selector 2106 for use in determining control decisions. Additionally or alternatively, the selector 2106 may use other features, such as one or more items described in Table 2 and Table 5, as input in determining control decisions.

The environment 2100 illustrates various configurations of ASR systems and how the transcriptions of the ASR systems may be compared to determine agreement rates. The agreement rates of various ASR systems may also be used for other purposes besides being provided to the selector 2106. For example, the comparison between transcriptions may be used for accuracy estimation purposes of ASR systems, for determining difficulty of transcribing the audio, for determining which transcription to select when fusing outputs from multiple transcription units, or for classification, among other purposes. Classification may refer to determining that a transcription or a system that may generate the transcription may be used for a particular purpose, such as any of the uses for systems and/or transcriptions described in this disclosure. For example, classification may include classifying transcription units into different classes such that a transcription unit from an appropriate class may be selected for a particular situation.

For example, the fourth ASR system 2120d may be a speaker-independent ASR system trained on a population of callers. The third ASR system 2120c may be a speaker-independent ASR system trained on multiple CA voice samples. The second scorer 2116b then may provide a feature that reflects the agreement between the fourth ASR system 2120d and the third ASR system 2120c. As another example, in some embodiments, the second ASR system 2120b may be "crippled," or configured for lower accuracy than the first ASR system 2120a (see FIG. 13). The first ASR system 2120a vs. the second ASR system 2120b agreement rate may be used as a measure of the difficulty of transcribing particular audio. It may also be used to predict the accuracy of the non-revoiced ASR systems, the revoiced ASR systems, and other transcription units.

As another example, the outputs of the second scorer 2116b and the third scorer 2116c may be used to estimate accuracy of the revoicing provided by the CA client 2122. Alternatively or additionally, the outputs of multiple scorers 2116 such as fourth, fifth, and sixth scorers may be used to estimate revoiced or non-revoiced ASR system accuracy such as the accuracy of the first ASR system 2120*a*. Alternatively or additionally, the output of the fourth scorer 2116*d* may be used to estimate non-revoiced ASR system accuracy. (see FIG. 19).

As another example, the outputs of the fourth scorer 2116*d* and the fifth scorer 2116*e* may be used to estimate ASR accuracy of the non-revoiced ASR systems. Alternatively or additionally, the second ASR system 2120*b* may use the transcription of the first ASR system 2120*a* or the fifth ASR system 2120*e* as a grammar. The audio input to the second ASR system 2120*b* may be delayed so that the grammar is in place before corresponding audio is received by the second ASR system 2120*b*. Running the second ASR system 2120*b* with such a grammar may increase the likelihood that the second ASR system 2120*b* generates the same transcription as the first ASR system 2120*a* or the fifth ASR system 2120*e*, respectively. The fifth scorer 2116*e* and the sixth scorer 2116*f* may then be used to estimate revoiced or non-revoiced ASR system accuracy. Alternatively or additionally, the output of first scorer 2116*a* and other agreement rates between one or more revoiced ASR systems may be used to measure the revoicing accuracy and/or the accuracy of the fifth ASR system 2120*e* and to estimate the difficulty of transcribing particular audio or audio from a particular participant in a communication session.

In some embodiments, the depicted environment 2100 may use ASR systems that generate results (i.e., transcriptions) with error patterns that are uncorrelated, that differ in accuracy, or that provide differences used in improving or predicting accuracy. Examples of how two ASR systems may be configured or trained differently for this purpose are listed in Table 3. By providing transcriptions to the selector 2106 that differ and thus a greater diversity of information, the selector 2106 may be configured to improve the process of determining control decisions. As described above, resources may be shared across ASR systems (see FIG. 6).

Modifications, additions, or omissions may be made to the environment 2100 without departing from the scope of the present disclosure. For example, in some embodiments, transcriptions generated by one or more of the ASR systems 2120 may be combined, e.g., fused, to generate the transcriptions that are provided to the scorers 2116. For example, the transcriptions of the first ASR system 2120*a* and the second ASR system 2120*b* may be fused. Alternatively or additionally, the transcriptions of the third ASR system 2120*c*, the fourth ASR system 2120*d*, and the fifth ASR system 2120*e* may be fused. Alternatively or additionally, the transcriptions of the third ASR system 2120*c* and the fourth ASR system 2120*d* may be fused. Alternatively or additionally, the transcriptions of one or more revoiced and speaker-independent ASR systems may be fused with transcriptions from one or more non-revoiced speaker-dependent ASR systems.

As another example, the environment 2100 may not include one or more of the scorers 2116 and/or one or more of the ASR systems 2120. As another example, the transcription of each of the ASR systems 2120 and the transcription unit 2114 may be compared together by a scorer to generate a complete set of agreement rates that may be provided to the selector 2106.

Figure 22:
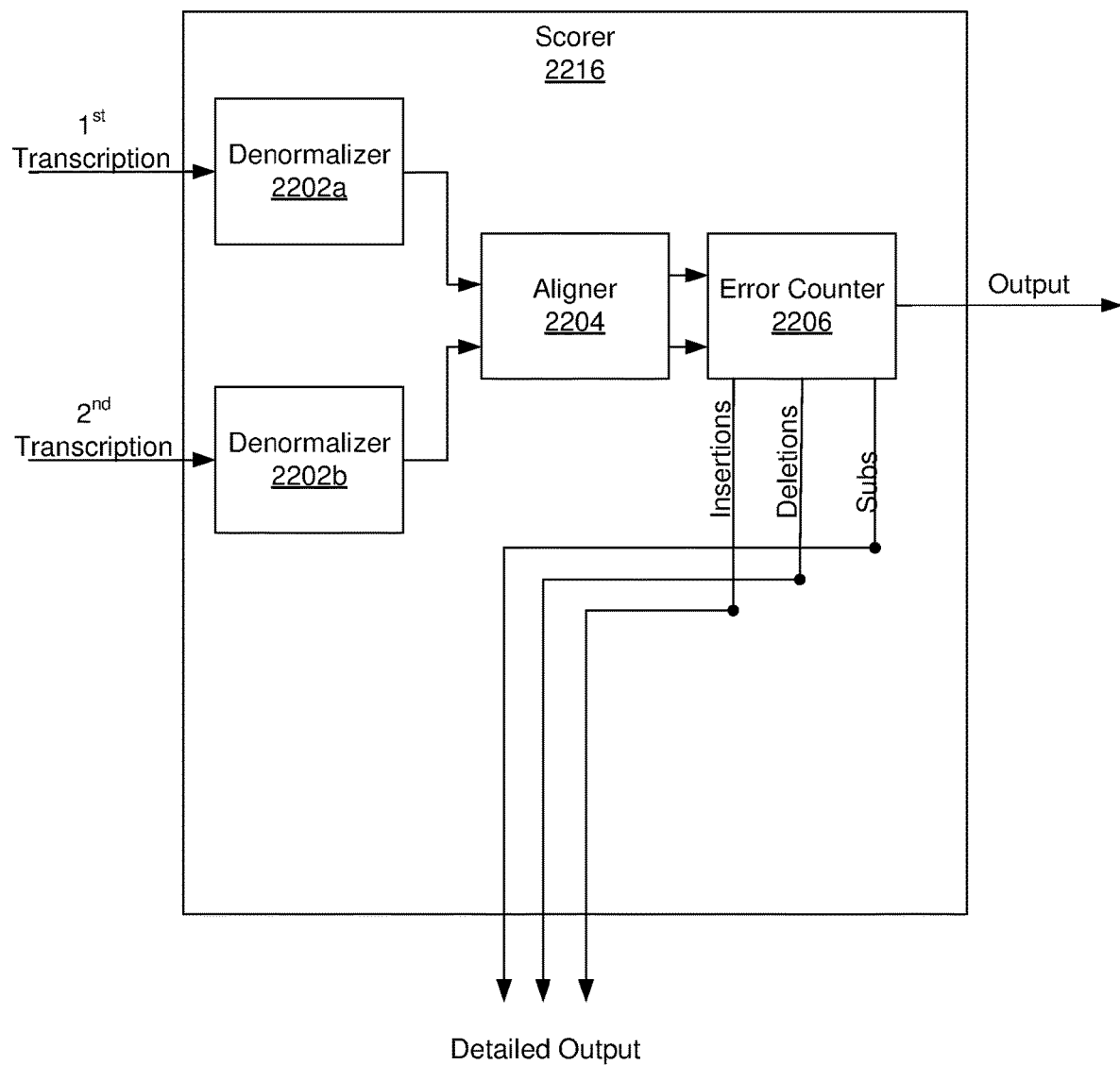
FIG. 22 is a schematic block diagram depicting an example embodiment of a scorer.

FIG. 22 is a schematic block diagram depicting an example embodiment of a scorer 2216, in accordance with some embodiments of the present disclosure. In some embodiments, the scorer 2216 may be an example implementation of the scorers 2116 of FIG. 21 or the scorer 2016 of FIG. 20. The scorer 2216 may be configured to evaluate similarity between two token strings, such as two transcriptions. In some embodiments, the scorer 2216 may compare hypotheses transcriptions, from transcription units or ASR systems, as illustrated in FIGS. 20 and 21. In these and other embodiments, the output of the scorer 2216 may be referred to as an agreement rate. In some embodiments, the scorer 2216 may compare a reference transcription (i.e., a transcription assumed to be correct) and a hypothesis transcription. In these and other embodiments, the output of the scorer 2216 may be referred to as an accuracy score with respect to the accuracy of the hypothesis transcription with respect to the reference transcription.

In some embodiments, the scorer 2216 may include first and second denormalizers 2202*a* and 2202*b*. The first and second denormalizers 2202*a* and 2202*b* may be configured to convert one or both token strings to a common format, as disclosed in the description of FIG. 14. The common format may include an unambiguous format that can only be read/interpreted one way. For example, denormalizing an address rendered as "123 Lake Shore Dr.," where "Dr." may refer to "drive" or "doctor," may yield "one twenty three lake shore drive." In some embodiments, one or both of the first and second denormalizers 2202*a* and 2202*b* may not be included. For example, when the token strings have not been normalized, the first and second denormalizers 2202*a* and 2202*b* may not be included as no denormalization may be performed. In another example, the first denormalizer 2202*a* may be configured to convert a reference transcription to a structure that represents multiple formats and a hypothesis transcription may be presented to an aligner 2204 without denormalization. In this and other embodiments, the first denormalizer 2202*a* may convert a text segment to a structure listing multiple formats and the aligner 2204 and error counter 2206 may be configured to consider a hypothesis transcription as matching any of the multiple formats. For example, the first denormalizer 2202*a* may incorporate a rule such as "{Cathy, Kathy, Kathie}"=>"{Cathy, Kathy, Kathie}," indicating that the words "Cathy," "Kathy," or "Kathie" are each converted to the structure "{Cathy, Kathy, Kathie}." The aligner 2204 and error counter 2206 may then consider any of the words "Cathy," "Kathy," or "Kathie" in the hypothesis transcription as equivalent to the "{Cathy, Kathy, Kathie}" structure appearing in the reference transcription.

In some embodiments, the scorer 2216 may include an aligner 2204 configured to align two or more transcriptions in a manner that reduces the number of differences between similar tokens in the transcriptions. The aligner 2204 may obtain the output of the first and second denormalizers 2202*a* and 2202*b* and align the outputs. The aligner 2204 may align the outputs of the first and second denormalizers 2202*a* and 2202*b* in a manner analogous to the alignment performed when fusing token strings as described in this disclosure.

In some embodiments, the aligned token strings may be provided to an error counter 2206. The error counter 2206 may count the number of differences between the aligned token strings and a number of tokens that are the same. The differences may be referred to as errors. The tokens that are the same, may be referred to as agreements. The differences may include where one token string includes a token the other does not have and where each token string includes the same number of tokens, but some of the tokens are different. When some of the tokens are different, this may be referred to as substitution. When one token string includes a token another token string does not have, this may be referred to as a deletion or insertion based on which token string is considered the reference token string. When the reference token string does not include the token and the other token string does, this may be referred to as insertion. When the reference token string includes the token and the other token string does not, this may be referred to as deletion. In these and other embodiments where error types such as insertions, deletions, and substitutions are counted, a reversal error type may be added. A reversal error may be determined from the number of words in text strings that are swapped. In some embodiments, the swapped text strings may be adjacent. For example, "I don't really like peas" transcribed as "I really don't like peas" may contain one reversal error, since "really" and "like" are swapped. In another example, "I'm late because late last night my car died" transcribed as "I'm late because my car died late last night" may be counted as three reversal errors because two strings of three words each are swapped. In these and other embodiments, the total error rate may be determined by adding the number of insertion, deletion, substitution, and reversal errors.

In some embodiments, the error counter 2206 may count all of the errors and all agreements. A comparison of the errors to the agreements may be reported as an agreement rate, accuracy, or error rate. Additionally or alternatively, the different types of errors such as deletions, substitutions, and insertions, may be counted and reported separately to generate a detailed output. Modifications, additions, or omissions may be made to FIG. 22 and/or the components operating in FIG. 22 without departing from the scope of the present disclosure. For example, the scorer 2216 may not include the first and second denormalizers 2202a and 2202b.

Figure 23:
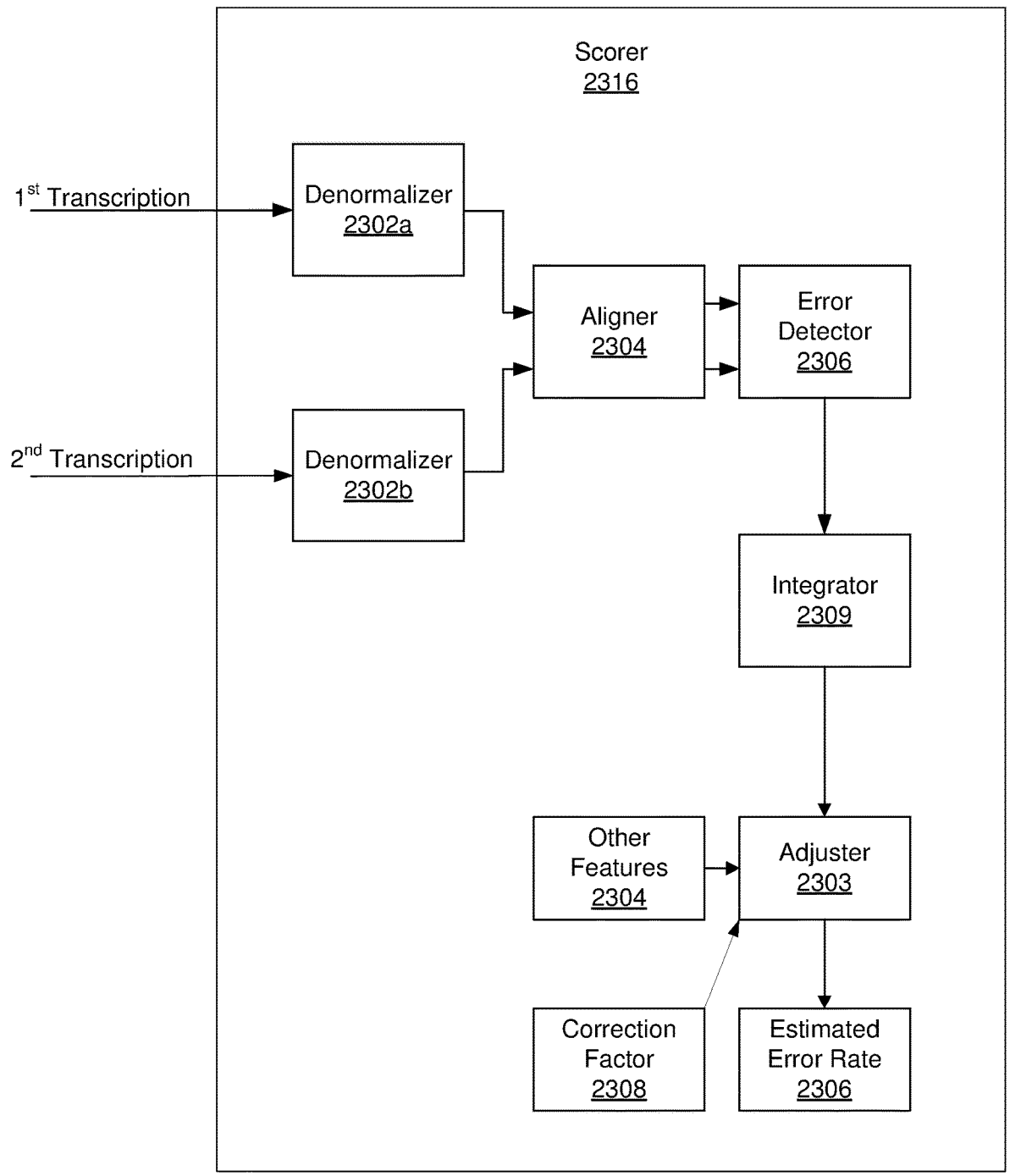
FIG. 23 is a schematic block diagram depicting another example embodiment of a scorer.

FIG. 23 is a schematic block diagram depicting another example embodiment of a scorer 2316, in accordance with some embodiments of the present disclosure. In some embodiments, the scorer 2316 may be an example implementation of the scorers 2116 of FIG. 21 or the scorer 2016 of FIG. 20. In some embodiments, the scorer 2316 may compare hypotheses transcriptions, from transcription units or ASR systems, as illustrated in FIGS. 20 and 21.

In some embodiments, the scorer 2316 may include first and second denormalizers 2302a and 2302b and an aligner 2304, which may be analogous to elements in the scorer 2216 previously described in FIG. 22. The output of the aligner 2304 may be provided to the error detector 2306. The error detector 2306 may provide an indication of an error between the token strings. The error detector 2306 may identify the errors in a similar manner as an error counter 2206 of FIG. 22. The error detector 2306 may provide to an integrator 2302 an indication when an error is identified. The integrator may be configured to count or average the number of errors to generate an error rate. The error rate determined by the integrator 2302 may be a cumulative count, a count or average over a fixed interval of time, or a decaying average. The integrator 2302 may communicate the error rate to an adjuster 2303.

In some embodiments, the error rate may represent the errors of the second transcription received by the second denormalizer 2302b with respect to the first transcription received by the first denormalizers 2302a. In these and other embodiments, however, the first transcription may not be a reference transcription. For example, the second transcription may be from a regular ASR system and the first transcription may be from a revoiced ASR system. As a result, the first transcription may include errors. Thus, the differences between the second transcription and the first transcription does not necessarily mean that the second transcription includes a true error as the second transcription may be correct and the first transcription may be incorrect, but because of the difference in the transcriptions, the error detector 2306 may indicate an error in the second transcription. In these and other embodiments, the adjuster 2303 may adjust the error rate to compensate for the errors in the first transcription. For example, in some embodiments, the adjuster 2303 may add a correction factor 2308 to the error rate. The correction factor 2308 may be based on the negative value of the average error rate of the first transcription. Alternatively or additionally, the adjuster 2303 may also adjust the error rate based on other features 2310. The other features 2310 may include one or more items from Table 2 and Table 5. The output of the adjuster 2303 may be an estimated error rate 2312, which may be the error rate output by the scorer 2316.

Modifications, additions, or omissions may be made to the scorer 2316 without departing from the scope of the present disclosure. For example, the adjuster 2303 may be replaced by an estimator such as the estimator described below with reference to FIGS. 24, 27a, and 27b, and may use other estimation methods such as those listed in Table 9.

Figure 24:
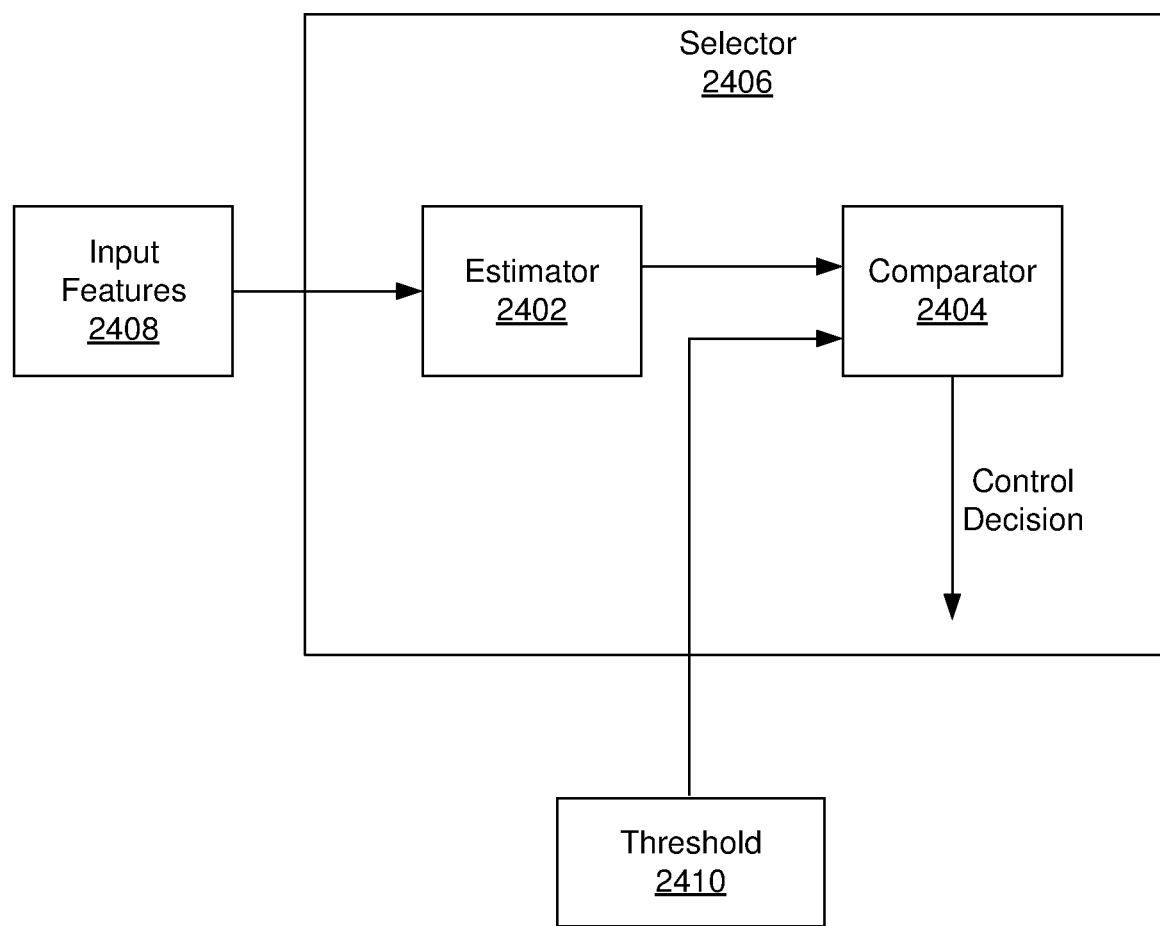
FIG. 24 is a schematic block diagram illustrating an example embodiment of a selector.

FIG. 24 is a schematic block diagram illustrating an example embodiment of a selector 2406, in accordance with some embodiments of the present disclosure. In some embodiments, the selector 2406 may include an estimator 2402, a comparator 2404, and a threshold 2410. In general, the selector 2406 may be configured to determine control decisions as discussed with respect to the selectors 2006 and 2106 of FIGS. 20 and 21.

The estimator 2402, in some embodiments, may be configured to receive values for one or more input features 2408. Based on the values of the one or more input features 2408, the estimator 2402 may determine an estimate for a parameter upon which the selector 2406 may determine a control decision. The parameter may include a confidence score regarding a transcription, an accuracy of a transcription, latency between transcriptions, other metrics related to a transcription, and any metric that may be used to select between a revoiced or non-revoiced transcription unit/ASR system, among others. Examples of input features 2408 include an agreement rate from a scorer, such as a scorer 2016 of FIG. 20, the features discussed with respect to the selector 2006 of FIG. 20, and the features described above with reference to Table 2 and Table 5, among others.

In some embodiments, the estimated parameter may be transmitted to the comparator 2404. The comparator 2404 may be configured to compare the estimate with a threshold 2410. Based on the comparison, the selector 2406 may determine a control decision. For example, in response to the estimated parameter satisfying the threshold 2410, the selector 2406 may determine to direct a revoiced ASR system to generate transcriptions. In response to the estimated parameter not satisfying the threshold 2410, the selector 2406 may determine to direct a non-revoiced ASR system to generate transcriptions. In some embodiments, the threshold 2410, in combination with other factors, may contribute to an automation rate of a transcription system or portion of a transcription system. In these and other embodiments, the automation rate may include a percentage of the total transcriptions that are generated by a non-revoiced ASR system as compared to a revoiced ASR system.

Figure 25:
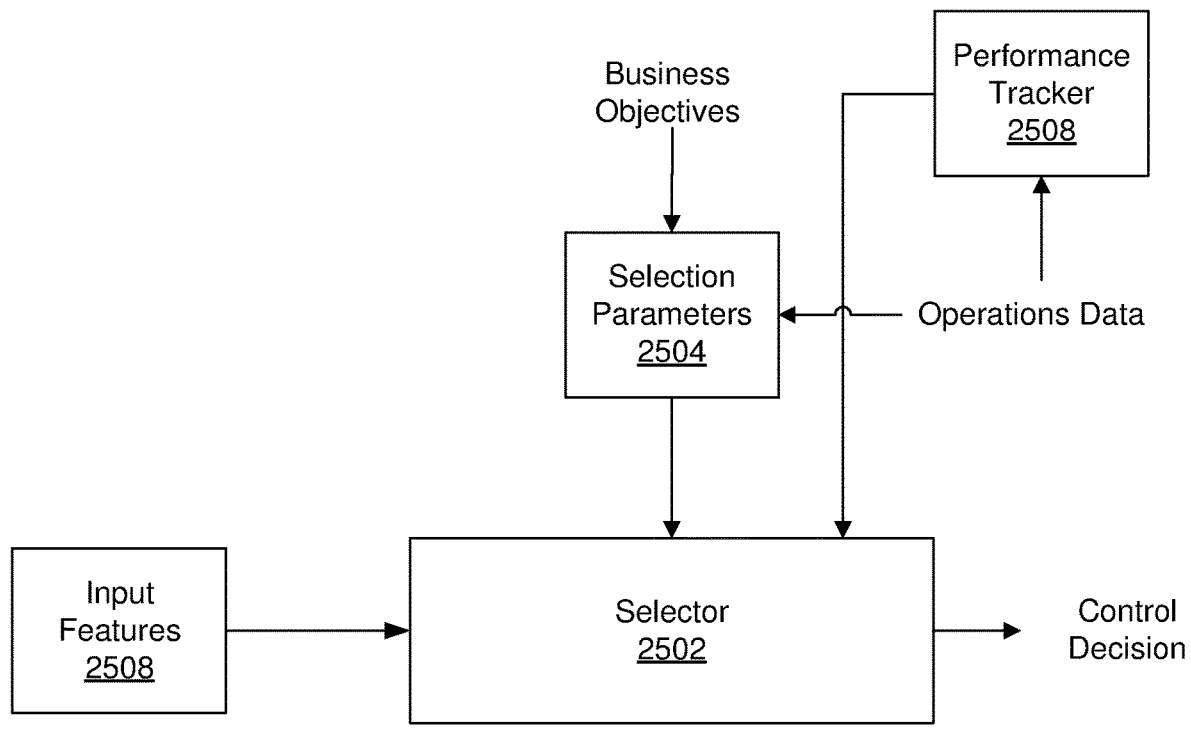
FIG. 25 is a schematic block diagram illustrating an example embodiment of a selector.

FIG. 25 is a schematic block diagram illustrating an example embodiment of a selector 2502, in accordance with some embodiments of the present disclosure. In some embodiments, the selector 2502 may be configured to determine control decisions as discussed with respect to the selectors 2006 and 2106 of FIGS. 20 and 21. For example, the control decisions may be to select between different transcription units to generate transcriptions for audio.

In some embodiments, the transcription units may include any number of different configurations. For example, the transcription units may be configured as revoiced transcription units, non-revoiced transcription units, combination of revoiced and non-revoiced transcription units, transcription units with fusers, among other combinations such as described in Table 1. Alternatively or additionally, the transcription units, as discussed previously, may be software based such that they may be instantiated and torn down as directed. In these and other embodiments, the selector 2502 may be configured to select among transcription units that are instantiated. Alternatively or additionally, the selector 2502 may be configured to select among transcription unit templates that may be created and direct instantiation of a selected transcription unit.

In some embodiments, the selector 2502 may be configured to obtain input features 2508. The input features 2508 may be analogous to the input features 2408 of FIG. 24 and may include features such as ASR accuracy, agreement rates, and other items in Table 2 and Table 5. Using the input features 2508, the selector 2502 may select a type of transcription unit based on the selection parameters 2504 in the selector 2502. In these and other embodiments, the selection parameters 2504 may inform the decision making process of the selector 2502. For example, for a particular input feature and first values for the selection parameters 2504, the selector 2502 may select a first transcription unit type. However, for the particular input feature and second values for the selection parameters 2504, the selector 2502 may select a second transcription unit type. Thus, the selection parameters 2504 and the values of the selection parameters 2504 may determine a type of transcription unit selected based on input features. In some embodiments, the input features 2508 may be viewed as information derived from the current communication session and its participants (e.g. estimated error rate, historical accuracy, etc.), the output of the performance tracker 2510 may be viewed as representing the operational state (i.e. operations metrics) of the system providing service (including transcription units, servers, network connections, etc.), and selection parameters may be viewed as rules (derived from business decisions and the operational state) to be used in the selection process. This method of viewing the elements of FIG. 25 is not intended to recite strict definitions, but may be useful in understanding the general operation of selector 2502.

In some embodiments, the selection parameters 2504 may include: (1) a performance threshold (see FIG. 24); (2) a maximum period of time a communication session may be transcribed using a revoiced ASR system (e.g., the first 10 minutes of a communication session may be eligible for transcription by a revoiced ASR system, thereafter, the communication session may be transcribed using a non-revoiced ASR system); (3) a list of account types (see Table 10 below for a list of examples of account types) to be transcribed using a non-revoiced ASR system; (4) a list of account types (see Table 10 below) to be transcribed using a revoiced ASR system; and (5) the minimum number of each type of transcription units (e.g. revoiced transcription units) to be held in reserve for handling spikes in request for transcriptions. The account type may be determined, for example, using a phone number or other identifier obtained, for example, using ANI or DNIS or from the number dialed by the subscriber or another party.

TABLE 10

1. Business communication sessions
2. Residential communication sessions
3. Calls to/from voicemail mailboxes (for listening to voicemail)

TABLE 10-continued

4. Calls forwarded to voicemail (for leaving voicemail)
5. Calls forwarded to another number
6. 900 or other premium-rate communication session
7. Emergency communication session (e.g., 911 communication sessions, poison control)
8. Close family member communication session as determined, for example, by matching last names on the account
9. Frequently called numbers
10. Government numbers
11. Toll-free or 800 numbers
12. Calls to/from a customer care site
13. Calls to/from technical support
14. Calls to/from the caption provider's customer care or technical support
15. IVR systems
16. Medical (e.g., hospital, doctor's office) numbers
17. Cell/mobile phones
18. Landline phones
19. VoIP communication sessions
20. Video communication sessions
21. Communicator watch, glasses, or other wearable devices
22. International numbers
23. Numbers designated as important by the subscriber
24. Account type is unknown (phone number is available)
25. Phone number is not available
26. Calls answered by music
27. Calls answered by a recording
28. Calls to/from invalid numbers or numbers that cannot be dialed
29. Calls to/from numbers that are substantially never answered
30. International communication sessions
31. Calls to/from a specific country
32. Conference communication sessions
33. Test communication sessions
34. Calls to/from numbers that ring busy
35. Calls that result in a reorder, SIT, fast busy, all trunks busy, out of service tone, or other communication session progress indicators
36. Calls translated from a first language into a second language
37. Calls where one or more parties hang up, but the communication session is not disconnected
38. Calls with no audio or with substantially silent audio
39. Calls to/from a fax machine, modem, or other non-voice service
40. Calls with a history of being shorter, on average, than a selected threshold
41. Calls with a history of being longer, on average, than a selected threshold
42. Calls exhibiting erroneous or anomalous behavior such as an immediate hang-up
43. Calls identified by the subscriber as belonging to a defined category such as friends, family, send to voicemail, do not answer, entities the subscriber does not wish to talk to, medical providers, numbers related to work, numbers related to a home business, etc.
44. Calls received on an alternate line. For example, if the subscriber has a first number such as a home number and second number such as a work number, communication sessions received from callers dialing the first number may be assigned a first account type and communication sessions received from callers dialing the second number may be assigned a second account type.
45. Calls where caller ID is blocked or unknown
46. Calls on the subscriber's speed dial list
47. Calls where callers are advised that communication sessions may be recorded or where callers are asked for consent to record.
48. Calls to/from prisons or prison inmates.
49. Calls to/from hospital patients or rest home residents.
50. Calls to/from numbers associated with social media accounts.
51. Calls to/from software phones such as softphones or smartphone apps.
52. Calls to/from a specified business or company. A use case for this feature may include using a language model for communication sessions to/from a given company that includes product names or acronyms related to the company's business.
53. Calls to/from a service provided by a specified service provider such as a specified telephone carrier or other communications service. A use case for this feature may include using a language model trained on data from a given service provider. For example, a communication service designed for sales representatives may be transcribed using models adjusted for topics that include sales terminology.
54. Other In some embodiments, the values of the selection parameters 2504 may be determined based on one or more business objectives. Example business objectives are provided in Table 11 below.

TABLE 11

1. Increase overall average accuracy or achieve a minimum target.
2. Increase automation rate or achieve a minimum target.
3. Reduce latency or achieve a maximum target.
4. Achieve target values for metrics derived from features in Table 2. Objectives derived from Table 2 features include, for example, projected CA capacity (#6), average or maximum revoiced ASR system idle time (#10), maximum error rate of revoiced ASR systems (#15-18), cost of providing service (#28-29), and time required to add ASR resources (#33).
5. Use all available CAs at a given time. The number of available CAs may be defined to take into account the number of CAs logged in, staff breaks, idle time requirements, the number of CAs who could become available within a specified period of time, a CA pool held aside for contingencies such as traffic spikes, and other operations or personnel-related factors.
6. Ensure that traffic volumes sent to revoiced ASR systems remain within the capacity of the available revoiced ASR systems.
7. Deliver accuracy at a selected level, such as a level derived from an estimate of revoiced ASR system accuracy. For example, a selection criteria may be adjusted to obtain accuracy, at a minimum cost, that meets or exceeds accuracy provided by revoiced ASR systems. The selected level may be determined using estimated average revoiced ASR system accuracy and estimated average non-revoiced ASR accuracy.
8. Deliver a performance level set using one or more performance requirements. For example, if a law or regulation includes a requirement to deliver a specified accuracy, averaged over a specified period of time and cites a penalty for falling below an accuracy minimum, the performance level may be responsive to the requirement and penalty.
9. Define one or more business objectives based on a combination, such as a weighted sum, of other business objectives.
10. Generate one or more functions or data points and present the information in the form of charts, tables, dials, or other visual indicators. Provide a means, such as via a GUI, for an operator to view the indicators and select a business objective. For example, a GUI may display a chart, such as a table or an ROC curve, showing overall accuracy vs. automation rate and allow the operator to select an automation rate. The selected automation rate then may become a business objective.
11. Adjust a threshold and/or set of parameters that vary over time within a measurement time window to meet a set of one or more criteria across a time window. Example criteria may include cost, staffing requirements, latency, speed of answer, hardware utilization, language coverage, word accuracy, punctuation and capitalization accuracy, and consistency of performance across a variety of users. Example implementations include the following:
    a. The threshold or parameters may be set to reduce the cost of providing transcriptions while maintaining a minimum allowable accuracy, where accuracy is averaged over a selected measurement window.
    b. The threshold or parameters may vary in response to communication session traffic, revoiced ASR system availability, and other factors, in order to achieve or adjust selected statistics over time. For example, during a first period of time when the revoiced ASR system availability is relatively high and communication session traffic is relatively low, a threshold may be automatically adjusted in one direction to send more traffic to revoiced ASR systems, potentially increasing accuracy and cost over a first period of time. During a second period of time, when the revoiced ASR system availability is relatively low and communication session traffic is relatively high, a threshold may be automatically adjusted in the opposite direction to send more traffic to revoiced ASR systems, potentially decreasing accuracy and cost over a second period of time. One or more selected statistics may be determined across a time span that includes both periods of time. In one scenario, threshold settings may be adjusted over time to reduce the average cost and ensure that the average accuracy meets a selected minimum, where cost and accuracy are averaged over both time periods. In an alternate scenario, threshold settings may be adjusted to increase the average accuracy under a constraint of remaining below a selected maximum cost, where cost and accuracy are averaged over both time periods.
    c. A blended metric may be defined that includes components related to one or more cost metrics and one or more performance metrics. For example, the blended metric may include a weighted sum of the error rate, latency, total revoiced ASR system cost, and total non-revoiced ASR system cost. The threshold and parameters may be set to values, which may vary over time, that are projected to reduce or increase the blended metric.
12. Allow speech recognition to take over if the CA stops providing revoicing or if the error rate of a revoiced ASR system rises above a selected threshold.

In some embodiments, the values of the selection parameters 2504 may be further determined in response to operations data. Operations data, in some embodiments, may include communication session records, statistics, and measurements or projections for: revoiced ASR system availability, availability and distribution of non-revoiced ASR system or revoiced ASR system skills such as spoken languages, missed communication sessions, abandoned communication sessions, test communication sessions, speed of answer for incoming communication sessions, automation rate, transcription latency, the number of communication sessions with no audio, communication sessions with no audio sent to revoiced ASR systems, numbers and status for sales leads, server load (e.g., CPU load, memory usage), billing status, the number and type of provisioned systems such as non-revoiced ASR systems and revoiced ASR system, traffic load, networks or equipment out of service, action taken by operation administrators, alarms, and operation metrics listed in Table2.

In some embodiments, the selector 2502 may be configured to select parameters and values for parameters. An example of the selector 2502 selecting parameters and values for parameters is now provided. The selection may be defined with respect to processes 1-8 provided below. Modifications, additions, or omissions may be made to the processes 1-8 without departing from the scope of the present disclosure. For example, the processes may be implemented in differing order. Additionally or alternatively, two or more processes may be performed at the same time. Furthermore, the outlined processes and actions are only provided as examples, and some of the processes and actions may be optional, combined into fewer processes and actions, or expanded into additional processes and actions without detracting from the essence of the disclosed example:

1. Define one or more global metrics that are responsive to one or more criteria. The criteria may be one or more of the business objectives listed above. An example of a global metric may be a cost function (function1), which may be, for example, a weighted sum of (a) an average percentage error rate for the service and (b) a cost in monetary units such as dollars to provide the service over a selected period of time. (The term "global" denotes that the metric may encompass multiple objectives.)
2. Identify or define one or more adjustable parameters that may affect service performance against the global metric. Global metrics and adjustable parameters may include constraints such as the maximum number of available revoiced ASR system or the minimum allowable transcription accuracy. A parameter may also be defined to be a function of other parameters. For example, a composite parameter (parameter1) may be defined as the weighted sum of an ASR beam width (which may trade off the cost and accuracy of an ASR system) and an accuracy threshold below which communication sessions are sent to the revoiced ASR system and above which communication sessions are sent to a non-revoiced ASR system (which may trade off the cost for the revoiced ASR system against overall accuracy in a system that transcribes communication sessions using revoiced ASR systems and non-revoiced ASR systems).
3. The selector 2502 uses a prediction function with an input including features such as features from Table 2 and Table 5 to predict the value of the global metric over a range of parameter settings. For example, the prediction function may be a curve showing the performance of the global metric function1 as parameter1 varies. In another example, the prediction function may plot the average transcription accuracy vs. the average automation rate for a transcription service.
4. The selector 2502 may determine a set of parameter values that increases or reduces (whichever is favorable) the global metric. For example, the STT selector may determine a value for a parameter including an accuracy threshold for selecting a non-revoiced ASR system or a revoiced ASR system to caption communication sessions that reduces a global metric, where the global metric includes the projected cost of providing service under the constraint that the average transcription accuracy not fall below a selected percentage.
5. The selector 2502 may set operating parameters to the values determined in step #4.
6. A performance tracker 2510 may determine a measured value of the global metric, such as by tracking performance of the captioning service over a select period of time, using the operating parameters from #4, and may compare the measured value to the predicted value.
7. Using the comparison between the predicted and measured value, the selector 2502 may adjust the method, such as by adjusting parameters or values of parameters defined within the method or by using a different set of features. The adjustment may be performed with the objective to bring the compared values closer.
8. In some embodiments, on a selected schedule or based on selected events, repeat steps 4-5. Additionally or alternatively, repeat one or more of steps 1-8.

An example of the above steps (by number) is as follows. (1) A transcription service provider establishes a global metric of minimizing cost while providing overall accuracy at or above a specified level and (2) defines an ASR accuracy threshold, below which communication sessions are sent to a revoiced ASR system. (3) The selector 2502 estimates the relationship between the threshold and the global metric and (4) determines a value for the threshold predicted to satisfy the global metric. (5) The selector 2502 uses the threshold value to decide whether to transcribe each communication session utilizing revoiced ASR systems or non-revoiced ASR systems. (6) The performance tracker 2510 tracks and reports cost and accuracy. (7) The selector 2502 uses the reported cost and accuracy to adjust the threshold value. (8) The selector 2502 and performance tracker 2510 repeat steps 3-8.

In some embodiments, the steps above may be implemented by automated systems (e.g., by the selector 2502 and performance tracker 2510). Additionally or alternatively, the steps above may be implemented by a combination of automated systems and human operators. For example, a set of tools may be configured to enable human operators to control, guide, override, or execute the above steps. Examples of methods implemented by tools may include:

1. Log operations data, including communication sessions or seconds transcribed by the non-revoiced ASR system, communication sessions or seconds transcribed by the revoiced ASR system, revoiced ASR system and non-revoiced ASR system availability, non-revoiced ASR system accuracy, revoiced ASR system accuracy, overall system accuracy, and other metrics listed in Table 2. Other operations data may include records for each communication session, including logging information for the communication session.
2. Display and analyze operations data, including determining statistics, displaying summary information in tables and charts, and making recommendations.
3. Receive business objectives and global metrics automatically or from an operator.
4. Provision resources, including revoiced ASR system and non-revoiced ASR system resources, automatically or guided by an operator.
5. Receive updated (e.g., added, deleted, or modified) global metrics and other adjustable parameters automatically or from an operator
6. Receive an updated prediction function automatically or from an operator.

Figure 26:
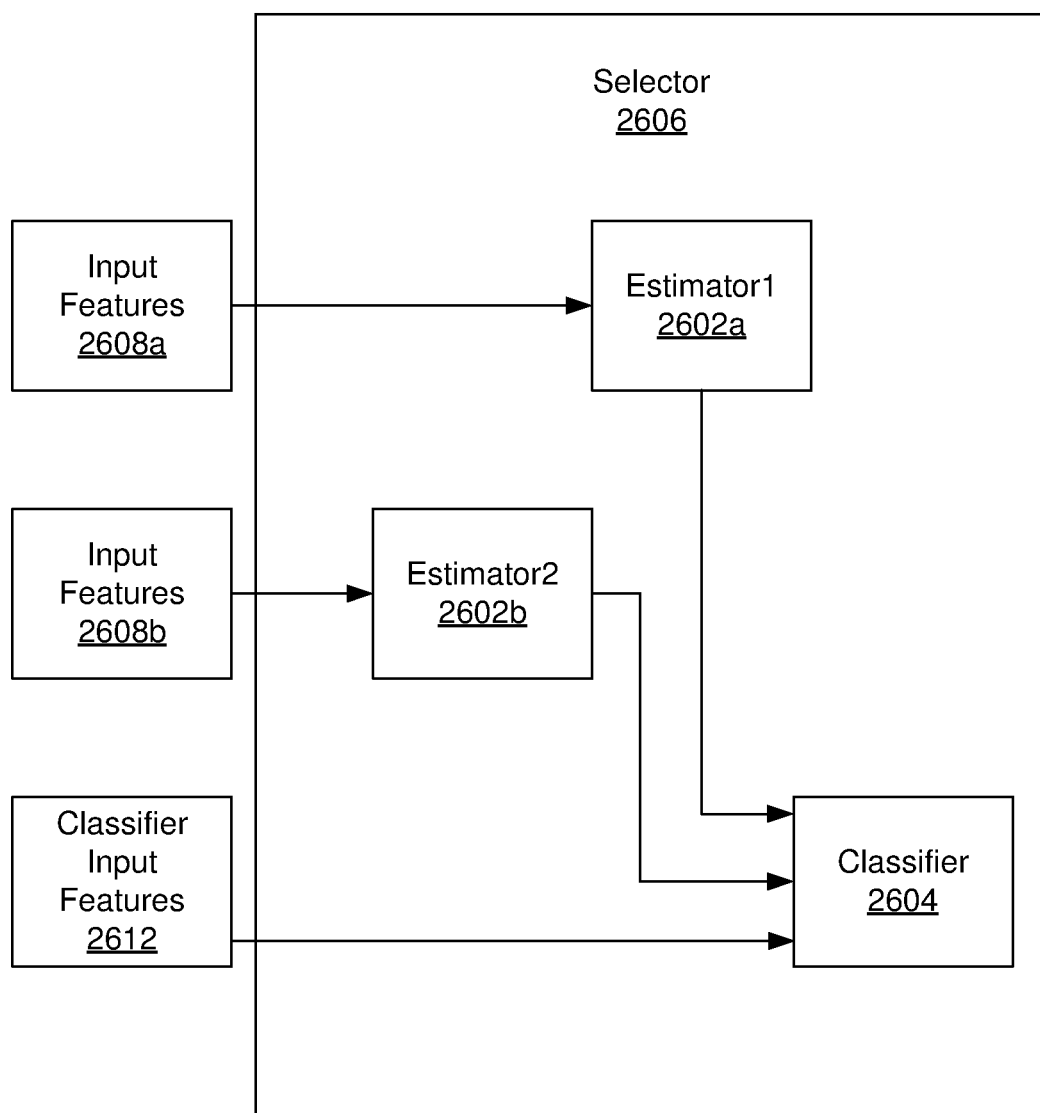
FIG. 26 is a schematic block diagram illustrating another example embodiment of a selector.

FIG. 26 is a schematic block diagram illustrating another example embodiment of a selector 2606, in accordance with some embodiments of the present disclosure. In some embodiments, the selector 2606 may include a first estimator 2602a, a second estimator 2602b, and a classifier 2604. In general, the selector 2606 may be configured to determine control decisions as discussed with respect to the selectors 2006 and 2106 of FIGS. 20 and 21.

In some embodiments, the first estimator 2602a, the second estimator 2602b, and the classifier 2604 may be machine learning models that have been trained to make decisions based on input features 2608. In these and other embodiments, the first estimator 2602a, the second estimator 2602b, referred to collectively as the estimators 2602, and the classifier 2604 may be an example of the implementation of the selector 2502 discussed in FIG. 25. For example, the first estimator 2602*a*, the second estimator 2602*b*, and the classifier 2604 may be trained based on sets of input features, such as the input features 2508 discussed in FIG. 25 and according to training rules defined by selection parameters 2504.

In some embodiments, the first estimator 2602*a* may be trained with respect to a first type of transcription unit. Thus, the first estimator 2602*a* may be configured to estimate a value of a particular feature of the first type of transcription unit in response to receiving the first input features 2608*a*. For example, the first estimator 2602*a* may estimate the measured or predicted error rate of a non-revoiced ASR system based on the first input features 2608*a*.

In some embodiments, the second estimator 2602*b* may be trained with respect to a second type of transcription unit. Thus, the second estimator 2602*b* may be configured to estimate a value of a particular feature of the second type of transcription unit in response to receiving the second input features 2608*b*. For example, the second estimator 2602*b* may estimate the measured or predicted error rate of a revoiced ASR system based on the second input features 2608*b*. In some embodiments, the particular feature estimated by the first estimator 2602*a* may be different than the particular feature estimated by the second estimator 2602*b* or the particular features may be the same. Classifier input features 2612 may include features such as items listed in Table 2 or Table 5.

In some embodiments, the classifier 2604 may be trained based on the outputs of the estimators 2602 and classifier input features 2612. The classifier 2604 may be configured to output a control decision based on the received input. Alternatively or additionally, the classifier 2604 may be configured to output a particular value. The particular value may be compared to a threshold. In response to the particular value satisfying the threshold, a control decision may be implemented.

In some embodiments, each of the first input features 2608*a*, the second input features 2608*b*, and the classifier input features 2612 may include one or more agreement rates from a scorer, such as a scorer 2016 of FIG. 20, the features discussed with respect to the selector 2006 of FIG. 20, and the features described above with reference to Table 2 and Table 5, among others. In some embodiments, the first input features 2608*a*, the second input features 2608*b*, and the classifier input features 2612 may each include different features, the same features, or features may be shared between the first input features 2608*a*, the second input features 2608*b*, and the classifier input features 2612.

An example of the operation of the selector 2606 is now provided. The first estimator 2602*a* may estimate the measured or predicted error rate of a non-revoiced ASR system based on the first input features 2608*a*. The second estimator 2602*b* may estimate the measured or predicted error rate of a revoiced ASR system based on the second input features 2608*b*. The classifier 2604 may use the estimated error rates and the classifier input features 2612 to generate a revoicing cost. The revoicing cost may reflect the relative cost of using a revoiced ASR system versus a non-revoiced ASR system and may be expressed in monetary units such as dollars, as a unitless number such as a ratio, in terms of a contribution to a global metric, or using other units. The revoicing cost may be presented to a comparator which compares the revoicing cost to a threshold. When the revoicing cost is less than the threshold, then the revoiced ASR system may be used to generate transcriptions. When the revoicing cost is more than the threshold, then the non-revoiced ASR system may be used.

Alternatively or additionally, the classifier 2604 may be configured to subtract one error rate from another. If, for example, the threshold is zero, the estimated non revoiced ASR system error rate is 15%, and estimated revoiced ASR system error rate is 3%, then the classifier 2604 may output a positive value, such as 12%, that exceeds the threshold and thus indicates that a revoiced ASR system is selected to provide transcriptions. Additionally or alternatively, the first estimator 2602*a* may estimate non-revoiced ASR system accuracy and the second estimator 2602*b* may estimate the difference in cost of selecting a non-revoiced ASR system instead of a revoiced ASR system. In these and other embodiments, the classifier 2604 may select between the non-revoiced ASR system or revoiced ASR system or output a value that is compared to a threshold to make a selection.

Additionally or alternatively, the estimators 2602 may provide other information to the classifier 2604. In these and other embodiments, the classifier 2604 may be configured to select among different options, such as types of transcription units for generating transcriptions. Additionally or alternatively, the estimators 2602 may be omitted and the input features 2608 and classifier input features 2612 may be presented to the classifier 2604 which generates an output upon which a control decision may be based.

Figure 27A:
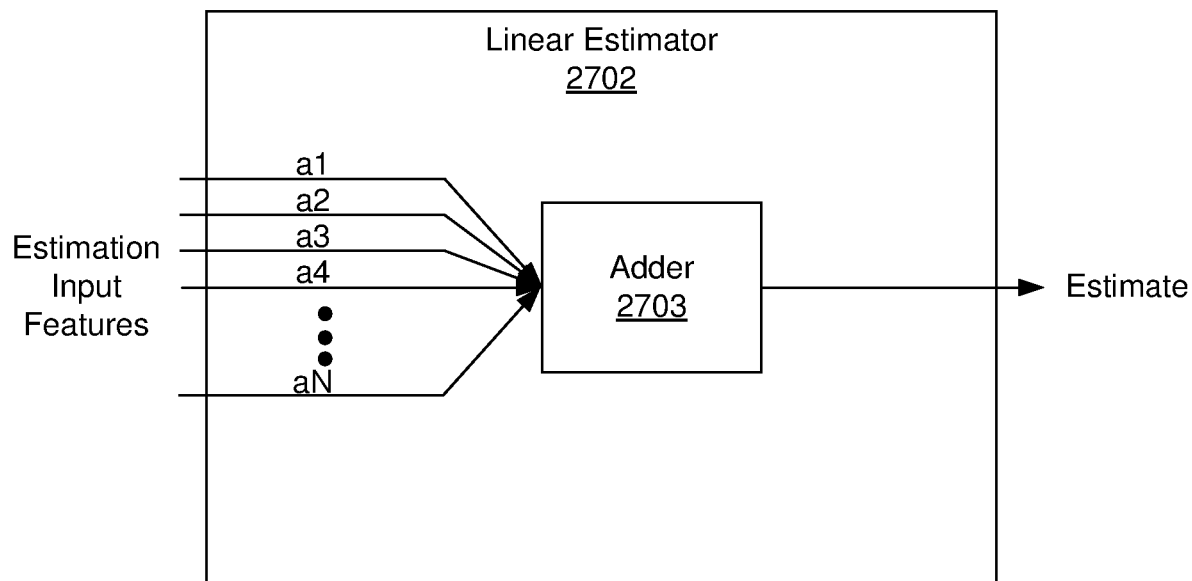
FIGS. 27a and 27b illustrate embodiments of a linear estimator and a non-linear estimator respectively.
Figure 27B:
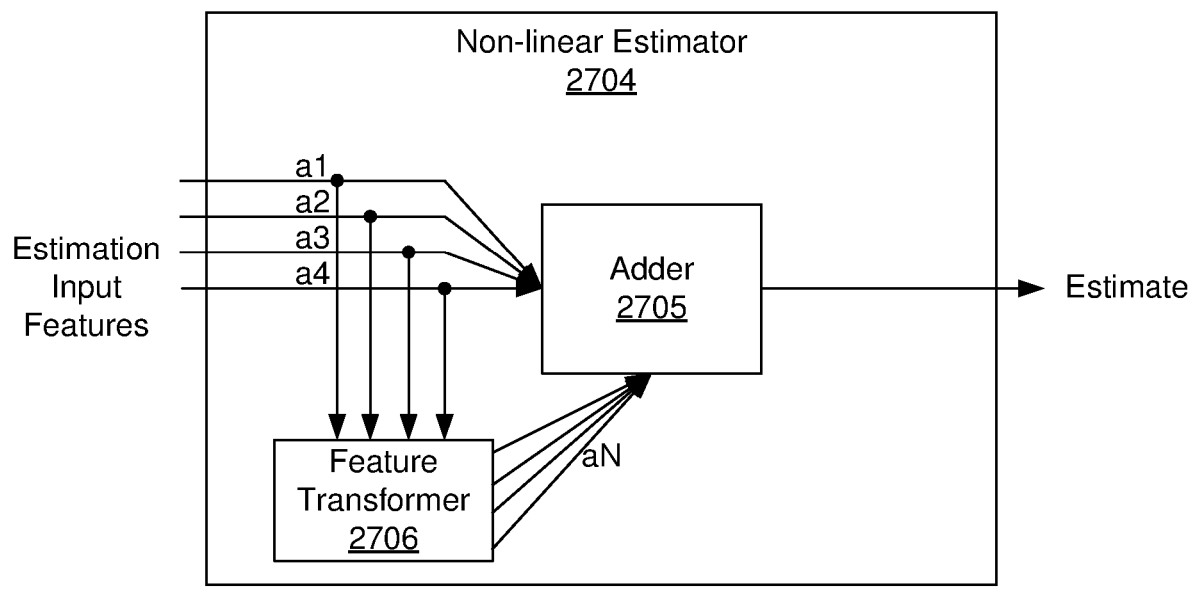

FIGS. 27*a* and 27*b* illustrate embodiments of a linear estimator 2702 and a non-linear estimator 2704 respectively, in accordance with some embodiments of the present disclosure. The linear estimator 2702 and a non-linear estimator 2704 may be examples of the estimators 2602 of FIG. 26.

In some embodiments, the linear estimator 2702 may include weights associated with inputs and an adder 2703. The linear estimator 2702 may be configured to receive a set of inputs, multiply each of the inputs by a weight $\alpha 1$, $\alpha 2$, $\alpha 3$, ..., $\alpha N$ (depicted as "a1," etc.), sum the weighted inputs using the adder 2703, and output the weighted sum of the inputs. Weights may be determined using optimization methods such as Linear Discriminant Analysis (LDA), linear regression, logistic regression, stochastic gradient descent, or gradient boosting. As with other estimators described herein, input features may include one or more agreement rates from scorers, such as a scorer 2016 of FIG. 20, the features discussed with respect to the selector 2006 of FIG. 20, and the features described above with reference to Table 2 and Table 5, among others.

In some embodiments, the non-linear estimator 2704 may be configured to transform the estimation input features, by for example, using a nonlinear function. For example, if x and y are inputs and n is a real number, then examples of transformations include functions such as $x^n$, $\log(x)$, $x*y$, $x^n+y^n$, $x^y$, neural networks, and activation functions typically used with neural networks such as sigmoid functions, logistic functions, $\tan h(x)$, ReLU, step functions, etc. Alternatively or additionally, the non-linear estimator 2704 may operate on one input at a time such as with $x^2$ or on multiple inputs simultaneously such as with $x^2+y^2$, and with neural networks. The transformed features, by the feature transformer 2706, may be applied to the adder 2705 in addition to or instead of the original estimation input features. The input features may be weighed before being summed using the adder 2705. In these and other embodiments, the weights $\alpha 1$, $\alpha 2$, $\alpha 3$, ..., $\alpha N$ may then be determined using methods similar to those of a linear estimator.

A neural network may be used in various embodiments described herein as an estimator, selector, and classifier. In some embodiments, the neural network may include a set of one or more inputs, nodes, connections, and outputs. Each node may receive an input from the set of inputs or from another node. Connections between nodes may be multiplied by a weight, so that the input to a first node equals the output of a previous node multiplied by the weight associated with the connection between the two nodes. Nodes may accumulate the inputs in a summation where the summation is the total of the outputs of all previous nodes, each multiplied by the respective weight of the connection. Nodes may be linear or nonlinear. For linear nodes, the node output may equal the sum of the inputs for that node. For nonlinear nodes, the inputs may be totaled in a summation step, then processed with a nonlinearity or activation function. Examples of activation functions include linear, tank, sigmoid, step, ReLU, leaky ReLU, and Gaussian functions.

Additionally or alternatively, nodes in the neural network may be organized in layers. The neural network may have as few as one layer or it may have multiple layers as in deep neural networks (DNNs). The neural network may be feedforward so that all connections send signals towards the output. The neural network may include feedback or recurrent connections that send signals to previous layers or backwards towards the input as in recurrent neural networks (RNNs). Other topologies are possible, including gated recurrent units (GRUs), convolutional neural networks (CNNs), temporal convolutional networks (TCNs), pooled layers, long short-term memory (LSTM) networks, bottleneck DNNs, autoencoders, time delay networks (TDNN), ResNet, WaveNet, attention networks such as hierarchical neural attention encoders, neural networks with transfer learning, densely connected neural nets, generative adversarial networks (GANs), or combinations of the above.

Figure 28:
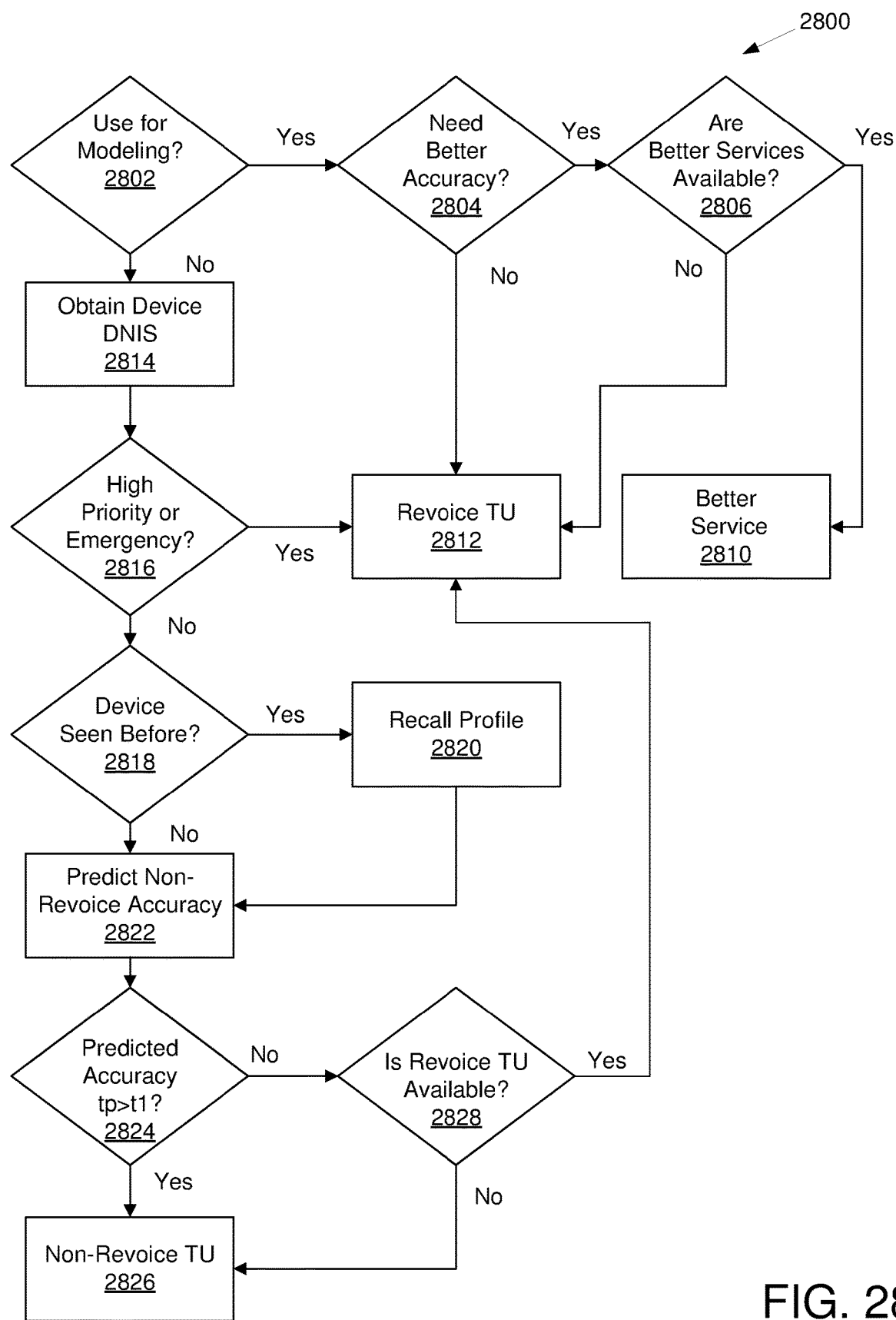
FIG. 28 is a flowchart of an example method of selecting between transcription units.

FIG. 28 is a flowchart of an example method 2800 of selecting between transcription units for a communication session, in accordance with some embodiments of the present disclosure. The method 2800 may be arranged in accordance with at least one embodiment described in the present disclosure. The method 2800 may be performed, in some embodiments, by processing logic that may include hardware (circuitry, dedicated logic, etc.), software (such as is run on a general-purpose computer system or a dedicated machine), or a combination of both. In some embodiments, the method may be performed by the selector 406 of FIG. 4 or other selectors discussed in this disclosure. In these and other embodiments, the method 2800 may be performed based on the execution of instructions stored on one or more non-transitory computer-readable media. Although illustrated as discrete blocks, various blocks may be divided into additional blocks, combined into fewer blocks, or eliminated, depending on the desired implementation.

The method 2800 may begin with a signal indicating that a communication session has initiated or is about to be initiated. At block 2802, it may be determined whether to use data from the communication session for modeling, such as for training ASR models or to otherwise improve accuracy for future communication sessions through obtained data, such as to attain higher accuracy transcriptions. In some embodiments, a communication session may be selected for modeling randomly, using an active learning model that selects communication sessions where a more accurate transcription is expected to contribute more to improve ASR accuracy through modeling, or for other reasons. For example, a more accurate transcription may be expected to contribute more to improve ASR accuracy through modeling if the communication sessions are within a specified range such as near (e.g., +/−10%) the middle of the estimated accuracy distribution. When the communication session is not to be used for modeling, the method 2800 may proceed to block 2814. When the communication session may be used for modeling, the method 2800 may proceed to block 2804.

At block 2804, it may be determined whether better accuracy is appropriate for the modeling. In some embodiments, the decision regarding better accuracy for modeling may be based on a number of factors including, 1) random selection of the communication session for better accuracy than a single revoicing transcription unit; 2) a more accurate transcription of the communication session is expected to contribute more to improve ASR accuracy through modeling, among other factors.

When better accuracy is not selected for the modeling, the method 2800 may proceed to block 2812. In block 2812, a revoicing transcription unit may be selected to generate transcriptions for the communication. When better accuracy is selected for the modeling, the method 2800 may proceed to block 2806.

At block 2806, it may be determined if better services are available. Better services may include providing the audio of the communication session to additional transcription units. Additional transcription units may be available if the additional transcription units are currently available and are projected to be available throughout the communication session with a number of extra transcription units for other priorities. In some embodiments, the transcription unit availability may be estimated from one or more of: current and projected size of the transcription unit pool, current and projected traffic, or average transcription unit idle time, among others. In these and other embodiments, the additional transcription units may be revoicing or non-revoicing transcription units. In some embodiments, the additional transcription units may include better ASR systems, such as ASR systems that are or may be configured to run in a more expensive, but more accurate mode. In these and other embodiments, the outputs of the transcription units may be fused. Alternatively or additionally, a better service may include sending a communication session to a CA using a stenotype to provide transcriptions.

When better services are available, the method 2800 may proceed to block 2810. When better services are not available, the method 2800 may proceed to block 2812. At block 2812, the better services may be used to generate a transcription of the communication session.

At block 2814, when the communication session is not going to be used for modeling, a device identifier for a device of a party being transcribed (the "transcription party") may be obtained. The device identifier may be obtained, through a service such as automatic number identification (ANI) service or a digital automatic number identification (DNIS) service, or other methods for incoming communication sessions. For outgoing communication sessions, the device identifier may be a number or information used by a device to establish the communication session with the device of the transcription party.

At block 2816, it may be determined if the device identifier or other information indicates that the communication session includes a device associated with a high-priority number. High-priority numbers may be described with respect to item 76 of Table 5. In response to it being determined that the communication session includes a device associated with a high-priority number, the method 2800 may proceed to block 2812 where a revoicing transcription unit may be used for the communication session. In response to it being determined that the communication session does not include a device associated with a high-priority number, the method 2800 may proceed to block 2818.

At block 2818, it may be determined if the device of the transcription party has provided audio for which transcriptions have been previously generated. In response to the device providing audio for which transcriptions have been previously generated, the method 2800 may proceed to block 2820. In response to the device not providing audio for which transcriptions have been previously generated, the method 2800 may proceed to block 2822.

At block 2820, prior communication session statistics, models, or other profile information related to the device may be retrieved.

At block 2822, a prediction or estimate of non-revoicing ASR system accuracy may be determined. The prediction or estimate may be based on available information, including estimates from estimators, the device profile (e.g., historical accuracy for the transcription party), other device information, items from Table 2 and Table 5, etc.

At block 2824, it may be determined if the predicted accuracy $t_p$ is greater than a threshold $t_1$. In response to the predicted accuracy $t_p$ being greater than the threshold, the method 2800 may proceed to block 2826. In response to the predicted accuracy tp not being greater than the threshold, the method 2800 may proceed to block 2828.

At block 2828, it may be determined if a revoicing transcription unit is available. If a revoicing transcription is available, the method 2800 may proceed to block 2812. Otherwise, the method 2800 may proceed to block 2826. At block 2826, a non-revoicing transcription unit may be selected to generate transcriptions for the communication session.

Modifications, additions, or omissions may be made to the method 2800 without departing from the scope of the present disclosure. For example, the operations of method 2800 may be implemented in differing order. Additionally or alternatively, two or more operations may be performed at the same time. Furthermore, the outlined operations and actions are only provided as examples, and some of the operations and actions may be optional, combined into fewer operations and actions, or expanded into additional operations and actions without detracting from the essence of the disclosed embodiments. As another example, the revoicing ASR system may be replaced with a non-revoicing ASR system, such as one with superior performance or higher cost.

Figure 29:
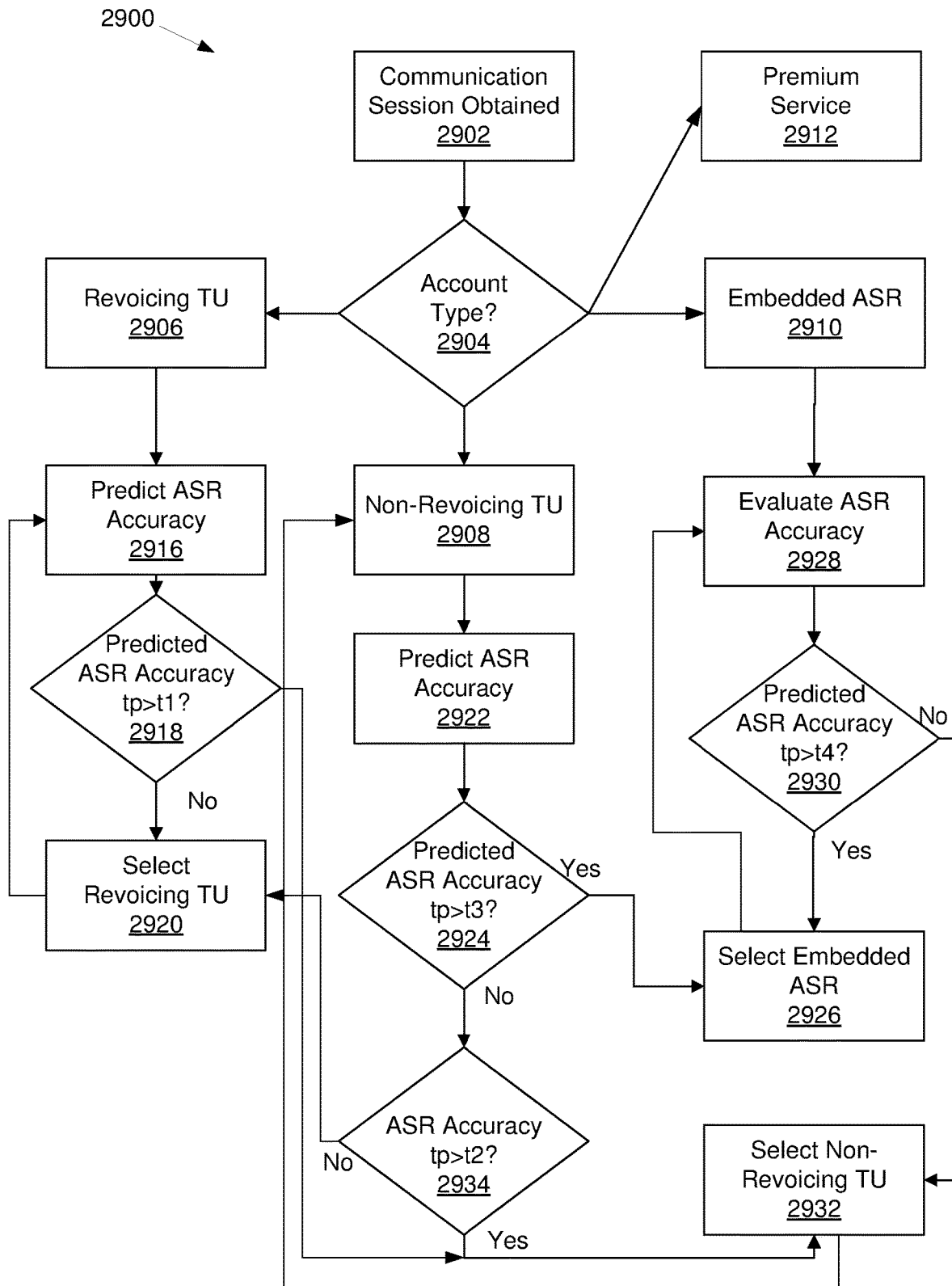
FIG. 29 is a flowchart of another example method of selecting between transcription units.

FIG. 29 is a flowchart of an example method 2900 of selecting between transcription units for a communication session, in accordance with some embodiments of the present disclosure. The method 2900 may be arranged in accordance with at least one embodiment described in the present disclosure. The method 2900 may be performed, in some embodiments, by processing logic that may include hardware (circuitry, dedicated logic, etc.), software (such as is run on a general-purpose computer system or a dedicated machine), or a combination of both. In some embodiments, the method is performed by the selector 406 of FIG. 4 or other selectors described in this disclosure. In these and other embodiments, the method 2900 may be performed based on the execution of instructions stored on one or more non-transitory computer-readable media. Although illustrated as discrete blocks, various blocks may be divided into additional blocks, combined into fewer blocks, or eliminated, depending on the desired implementation.

At block 2902, a signal may be received indicating that a communication session has been or is about to be initiated between a device of a subscriber and a device of a party whose speech is to be transcribed (the "transcription party").

At block 2904, an account type for the device of the transcription party in the communication session may be determined. A phone number or other identifying information may be considered when determining the account type. Other sources of identifying information may include, but are not limited to, public records or a subscription service containing identification records. Many different account types may be identified, including but not limited to those enumerated in Table 10.

At block 2904, a type of the account may be analyzed to determine one of multiple account groups to which the account type may belong. In these and other embodiments, in response to determining that the account type matches a first list of account types (e.g., residential or unknown communication sessions), the method 2900 may proceed to block 2906. In response to determining that the account type matches a second list of account types, the method 2900 may proceed to block 2908. The second list may include, but is not limited to, business communication sessions, toll-free or 800 numbers, medical (hospital, doctor), IVR systems, and communication sessions where estimated accuracy was above a selected threshold on a previous communication session. Additionally or alternatively, the second list may include communication sessions to customer support, technical support, other customer care centers, or services where an announcement is played to advise callers that communication sessions may be recorded.

In response to determining that the account type matches a third list of account types that require premium service, the method 2900 may proceed to block 2912. The third list may include, for example emergency numbers and numbers designated by the subscribing party as high-priority (see item 76 of Table 5).

In response to determining that the account type matches a fourth list of account types, such as low priority communication sessions or tasks that may be transcribed at a later time, the method 2900 may proceed to block 2910.

At block 2906, a revoicing transcription unit may be selected to generate transcriptions for the communication session. At block 2908, a non-revoicing transcription unit may be selected to generate transcriptions for the communication session.

At block 2910, an embedded ASR system may be selected to generate transcriptions for the communication session. Alternatively or additionally, the audio may be recorded and provided to a queue to be transcribed in non-real time during the communication session. In these and other embodiments, the embedded ASR system may be implemented on the device of the subscribing party, or on a device associated with or connected to the device participating in the communication session.

At block 2912, a premium transcription unit may be selected to generate transcriptions for the communication session. A premium transcription unit may be a transcription unit that includes multiple ASR systems, multiple CA clients, ASR systems with additional models or configurations to generate better transcriptions, network ASR systems, among other types of ASR systems.

In general, after selecting a transcription unit, the method 2900 may include predicting future accuracy of the transcriptions based on the same or different types of transcription units. Based on the predictions, the type of transcription unit that may be used to generate transcriptions may change during the communication session.

At block 2916, accuracy $t_p$ of a transcription of the communication session generated by a non-revoicing transcription unit may be predicted. In some embodiments, the accuracy may be predicted continuously, periodically, at other intervals, or in response to one or more factors, such as a length of the communication session, a change in speakers, a change in audio quality, among other factors. In some embodiments, methods such as those listed in Table 9 and one or more of the features in Table 2 and Table 5 may be used to estimate or predict accuracy. In some embodiments, the predicted accuracy may be the current calculated accuracy.

An example is now provided with respect to predicting or estimating accuracy of a transcription. In these and other embodiments, one or more companion ASR systems may process substantially the same speech as a first transcription unit. In some embodiments, the first transcription unit may be a revoicing ASR system and the companion ASR system may be non-revoiced ASR systems. In some embodiments, the first transcription unit system may be a non-revoicing ASR system and the companion ASR systems may be non-revoiced ASR systems. In these and other embodiments, the accuracy may be estimated using one or more features such as (a) ASR confidence (from one or more of the companion ASR systems), (b) the disagreement rate between the companion ASR systems, (c) the disagreement rate between each companion ASR system and the first transcription unit, (d) the number of words from one or more of the companion ASR systems where the confidence is above a selected percentage. In some embodiments, one or more features from Table 2 and Table 5 may also be used.

In some embodiments, any combination of the first transcription unit and the companion ASR systems may be substantially identical except for one aspect. For example, the first transcription unit and one of the companion ASR systems may be substantially identical except for one aspect and the other companion ASR system may be different. Alternatively or additionally, the first transcription unit and the companion ASR system may be substantially identical except for one aspect when there is one companion ASR system. Alternatively or additionally, the companion ASR systems may be substantially identical except for one aspect. The one aspect may be, for example, selected from the n-gram length in the language model, the size or topology of a neural network implementing an acoustic model, the source or size of training data in the language model or acoustic model, and distorting or otherwise processing the input speech for one of the ASR systems. The one aspect may alternatively be a method of crippling one of the ASR systems.

In some embodiments, any combination of the first transcription unit and the companion ASR systems may include software that is substantially identical or is derived from a common source, a first ASR system using at least one model (e.g., an acoustic model and/or language model) that is different from the corresponding model (i.e., the model is used in a similar fashion) used by a second ASR system.

In another example regarding predicting or estimating accuracy of a transcription, an accuracy estimator may be trained, using a machine learning method, such as one in Table 9 and using at least two features, trained on a set of audio samples where the accuracy of each sample is labeled and used as a target for the machine learning method.

At block 2918, the accuracy $t_p$ may be compared to a threshold $t_1$. In some embodiments, the threshold $t_1$ may be based on one or more factors. The factors may be similar to the factors used to determine between selecting a revoicing transcription unit or a non-revoicing transcription unit as discussed in this disclosure. For example, a threshold may be determined, for example, by using a measure of communication session transcription difficulty, estimated revoicing ASR system accuracy, particular accuracy requirements, and other features.

In response to the accuracy $t_p$ satisfying the threshold $t_1$, the method 2900 may proceed to block 2932. Otherwise, the method 2900 may proceed to block 2920, where the original revoicing transcription unit may continue to generate the transcription. After block 2920, the method 2900 may proceed to block 2916 for continued prediction of the accuracy of the transcription of the communication session generated by a non-revoicing transcription unit.

At block 2922, accuracy $t_p$ of a transcription of the communication session generated by an embedded transcription unit may be predicted. In some embodiments, the accuracy may be predicted continuously, periodically, at other intervals, or in response to one or more factors, such as a length of the communication session, a change in speakers, a change in audio quality, among other factors. In some embodiments, the predicted accuracy may be the current calculated accuracy.

At block 2924, the accuracy $t_p$ may be compared to a threshold $t_3$. In response to the accuracy $t_p$ satisfying the threshold $t_3$ the method 2900 may proceed to block 2926. Otherwise, the method 2900 may proceed to block 2934.

At block 2934, accuracy $t_p$ of the transcription of the communication session generated by the non-revoicing transcription unit may be compared to a threshold $t_2$. In response to the accuracy $t_p$ satisfying the threshold $t_2$ the method 2900 may proceed to block 2932 where the original non-revoicing transcription unit may continue to generate the transcription. After block 2932, the method 2900 may proceed to block 2922 for continued prediction of the accuracy of the transcription of the communication session generated by an embedded and non-revoicing transcription unit. Otherwise, the method 2900 may proceed to block 2920 where a revoicing transcription unit may begin to generate transcriptions for the communication session.

At block 2928, accuracy $t_p$ of a transcription of the communication session generated by an embedded transcription unit may be evaluated. In some embodiments, the accuracy may be evaluated continuously, periodically, at other intervals, or in response to one or more factors, such as a length of the communication session, a change in speakers, a change in audio quality, among other factors. In some embodiments, the predicted accuracy may be the current calculated accuracy.

At block 2930, the accuracy $t_p$ may be compared to a threshold $t_4$. In some embodiments, the threshold $t_4$ may be based on one or more factors. The factors may be similar to the factors used to determine between selecting a revoicing transcription unit or a non-revoicing transcription unit as discussed in this disclosure.

In response to the accuracy $t_p$ not satisfying the threshold $t_4$, the method 2900 may proceed to block 2932 where a non-revoicing transcription unit may begin to generate transcriptions for the communication session. Otherwise, the method 2900 may proceed to block 2926, where the original embedded transcription unit may continue to generate the transcription. After block 2926, the method 2900 may proceed to block 2928 for continued evaluation of the accuracy of the transcription of the communication session generated by the embedded transcription unit.

In some embodiments, the accuracy thresholds ($t_1$, $t_2$, etc.) may be the same or different. To avoid frequent switching between different transcription units, $t_2$ may be set lower than $t_1$ and $t_4$ may be set lower than $t_3$. Although the method 2900 is described as calculating accuracy estimates and predictions, in this and other embodiments disclosed herein, current or past estimates may be used in place of predicted or calculated estimates and vice versa, because past performance may be used to predict future performance.

In some embodiments, the predicted accuracy thresholds ($t_1$, $t_2$, etc.) may change depending on how long the communication session has been running and a duration of measurement window for predicting or evaluating the accuracy. For example, one or more of the thresholds may have a first set of values for intervals starting after a first time period (e.g., the first minute of the communication session) and a second set of values for intervals starting at the beginning of the communication session. Examples of how accuracy thresholds may be constructed and used include: (1) a threshold may be set to 100% for any 20 seconds after the first minute of a communication session or 97% for the first 20 seconds of the communication session; (2) a threshold may be set to 90% for any 1 minute after the first minute of a communication session or 88% for the first 30 seconds of the communication session; or (3) a threshold may be set to 80% plus an estimated measurement error. In some embodiments, the estimated measurement error may include an estimate of the precision of the accuracy estimation. In example (3), above, if the accuracy is estimated at 85% and the estimated measurement error is +/−7%, then the threshold may be 80%+7%=87%.

An accuracy threshold may also change based on the account type associated with the device identifier. For example, a business communication session may use a first threshold (e.g., $t_1$=87%) and a residential communication session may use a second threshold (e.g., $t_1$=78%). The account type may be one or more of the items in Table 10.

Modifications, additions, or omissions may be made to the method 2800 without departing from the scope of the present disclosure. For example, the operations of method 2800 may be implemented in differing order. Additionally or alternatively, two or more operations may be performed at the same time. Furthermore, the outlined operations and actions are only provided as examples, and some of the operations and actions may be optional, combined into fewer operations and actions, or expanded into additional operations and actions without detracting from the essence of the disclosed embodiments.

For example, in some embodiments, one or more other groups of account types may be included. In these and other embodiments, the transcriptions may be generated by one of the above described options or another type of service. As another example, the revoicing transcription unit may be replaced with a non-revoicing transcription unit, such as one with superior performance or higher cost.

Figure 30:
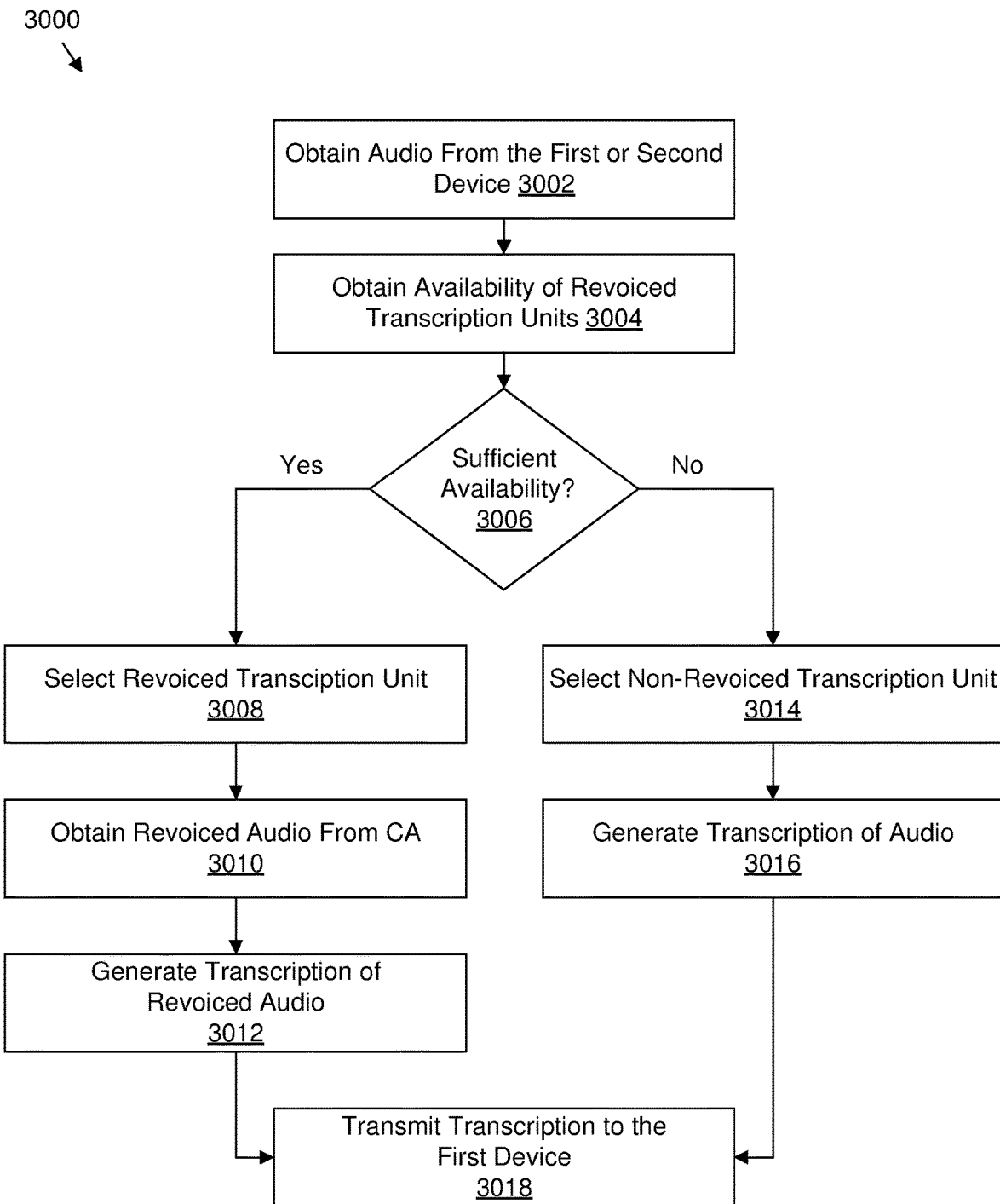
FIG. 30 is a flowchart of another example method of selecting between transcription units.

FIG. 30 is a flowchart of another example method 3000 of selecting an ASR or a CA for transcription of a communication session, in accordance with embodiments of the present disclosure. The method 3000 may be arranged in accordance with at least one embodiment described in the present disclosure. The method 3000 may be performed, in some embodiments, by processing logic that may include hardware (circuitry, dedicated logic, etc.), software (such as is run on a general-purpose computer system or a dedicated machine), or a combination of both. In some embodiments, the method is performed by the selector 406 of FIG. 4 or other selector described in this disclosure. In these and other embodiments, the method 3000 may be performed based on the execution of instructions stored on one or more non-transitory computer-readable media. Although illustrated as discrete blocks, various blocks may be divided into additional blocks, combined into fewer blocks, or eliminated, depending on the desired implementation.

The method 3000 may begin at block 3002, where first audio data originating at a first device during a communication session between the first device and a second device may be obtained. In these and other embodiments, the communication session may be configured for verbal communication.

At block 3004, an availability of revoiced transcription units in a transcription system may be obtained. In some embodiments, the availability of revoiced transcription units may be based on one or more of: a current peak number of transcriptions being generated, a current average number of transcriptions being generated, a projected peak number of transcriptions to be generated, a projected average number of transcriptions to be generated, a projected number of revoiced transcription units, and a number of available revoiced transcription units. Alternatively or additionally, the availability of revoiced transcription units may be based on three or more of: a current peak number of transcriptions being generated, a current average number of transcriptions being generated, a projected peak number of transcriptions to be generated, a projected average number of transcriptions to be generated, a projected number of revoiced transcription units, and a number of available revoiced transcription units.

At block 3006, in response to revoiced transcription units being available, the method 3000 may proceed to block 3008. In response to revoiced transcription units not being available, the method 3000 may proceed to block 3014.

At block 3008, in response to establishment of the communication session, a revoiced transcription unit may be selected, based on the availability of revoiced transcription units, instead of a non-revoiced transcription unit to generate a transcription of the first audio data to direct to the second device.

At block 3010, revoiced audio generated by a revoicing of the first audio data by a captioning assistant may be obtained by a revoiced transcription unit.

At block 3012, a transcription of the revoiced audio may be generated using an ASR engine of the revoiced transcription unit. The ASR engine may be part of an ASR system. In some embodiments, the automatic speech recognition engine may be trained specifically for speech of the captioning assistant. Block 3012 may be followed by block 3018.

At block 3014, a non-revoiced transcription unit may be selected. At block 3016, a transcription of the audio may be generated by the non-revoiced transcription unit. Block 3016 may be followed by block 3018.

At block 3018, the transcription of the revoiced audio may be directed to the second device as the transcription of the first audio data. In some embodiments, the directing may occur in response to selecting the revoiced transcription unit.

Modifications, additions, or omissions may be made to the method 3000 without departing from the scope of the present disclosure. For example, the operations of method 3000 may be implemented in differing order. Additionally or alternatively, two or more operations may be performed at the same time. Furthermore, the outlined operations and actions are only provided as examples, and some of the operations and actions may be optional, combined into fewer operations and actions, or expanded into additional operations and actions without detracting from the essence of the disclosed embodiments.

For example, in some embodiments, the method 3000 may include after directing the transcription of the revoiced audio to the second device and during the communication session, obtaining second audio data originating at the first device during the communication session and obtaining, from the non-revoiced transcription unit using a second automatic speech recognition engine, a second transcription of the second audio data. In some embodiments, the method 3000 may further include generating, by the revoiced transcription unit, a third transcription of a revoicing of the second audio data using the automatic speech recognition engine, generating a fourth transcription using one or more words of the second transcription and one or more words of the third transcription, and directing the fourth transcription to the second device as a transcription of the second audio data.

As another example, the method 3000 may further include during a period when the revoiced transcription unit is generating the transcription of the revoiced audio, obtaining, from the non-revoiced transcription unit using a second automatic speech recognition engine, a second transcription of the first audio data.

In these and other embodiments, the automatic speech recognition engine may be trained specifically for speech of the captioning assistant and the second automatic speech recognition engine may be trained for a plurality of speakers.

Alternatively or additionally, while directing the transcription of the revoiced audio to the second device and during the communication session, the method 3000 may further include determining a difference between a first number of words in the revoiced audio and a second number of words in the first audio data is below a comparison threshold and in response to the difference being below the comparison threshold, directing the second transcription to the second device as the transcription of the first audio data instead of the transcription of the revoiced audio.

Alternatively or additionally, while directing the transcription of the revoiced audio to the second device and during the communication session, the method 3000 may further include determining an error rate of the transcription of the revoiced audio is below an error threshold and in response to the error rate being below the error threshold, directing the second transcription to the second device as the transcription of the first audio data instead of the transcription of the revoiced audio.

FIGS. 31-43, among others, describe various systems and methods that may be used to generate transcriptions with accuracy that may be higher than transcriptions generated by a revoiced transcription unit without additional ASR systems or corrections by another CA or a non-revoiced transcription unit with a single ASR system. In some embodiments, higher accuracy transcriptions may be generated in real-time where recording of audio is not allowed. Higher accuracy transcriptions generated in these and other embodiments may be used in various situations, including those described in Table 12 below.

TABLE 12

1. Training ASR systems or ASR models. This may include training language models, which may be trained on text transcriptions, and training acoustic models, which may be trained on audio samples and text transcriptions. High-accuracy transcriptions may also be used for counting and creating n-grams, which may be used to train language models.
2. Computing average ASR accuracy and using the results for benchmarking TABLE 12-continued 3. Computing transcription accuracy of a pool of revoicing transcription units.
4. Computing accuracy of revoicing transcription units or for one or more individual CAs and using the results for training, managing, monitoring, assisting, providing feedback, providing performance-based incentives, screening applicants, hiring, and terminating.
5. Computing accuracy for an individual revoicing transcription unit associated with a CA and reporting results to the supervisor of a CA associated with the revoicing transcription unit.
6. Measuring revoicing transcription units associated with CAs in terms of accuracy, latency, and areas of strengths and weaknesses such as topics, accents, languages, and speaker types. These measures may be used in selecting a revoicing transcription unit to transcribe a given communication session and in making a selection decision regarding transcription units.
7. Providing transcriptions to subscribers for difficult or high-priority communication sessions.
8. Training estimators and selectors for making a selection decisions regarding transcription units.

FIGS. 31-43, among others, describe various systems and methods that may be used to generate higher accuracy transcriptions. In some embodiments, the higher accuracy transcriptions may be generated using the fusion concepts discussed in FIGS. 13-17. Alternatively or additionally, the higher accuracy transcriptions may be generated based on selecting transcriptions from transcription units with higher accuracy. The higher accuracy transcriptions may be used for training of ASR systems, for providing to user devices, or monitoring CA activity, among other uses.

Figure 31:
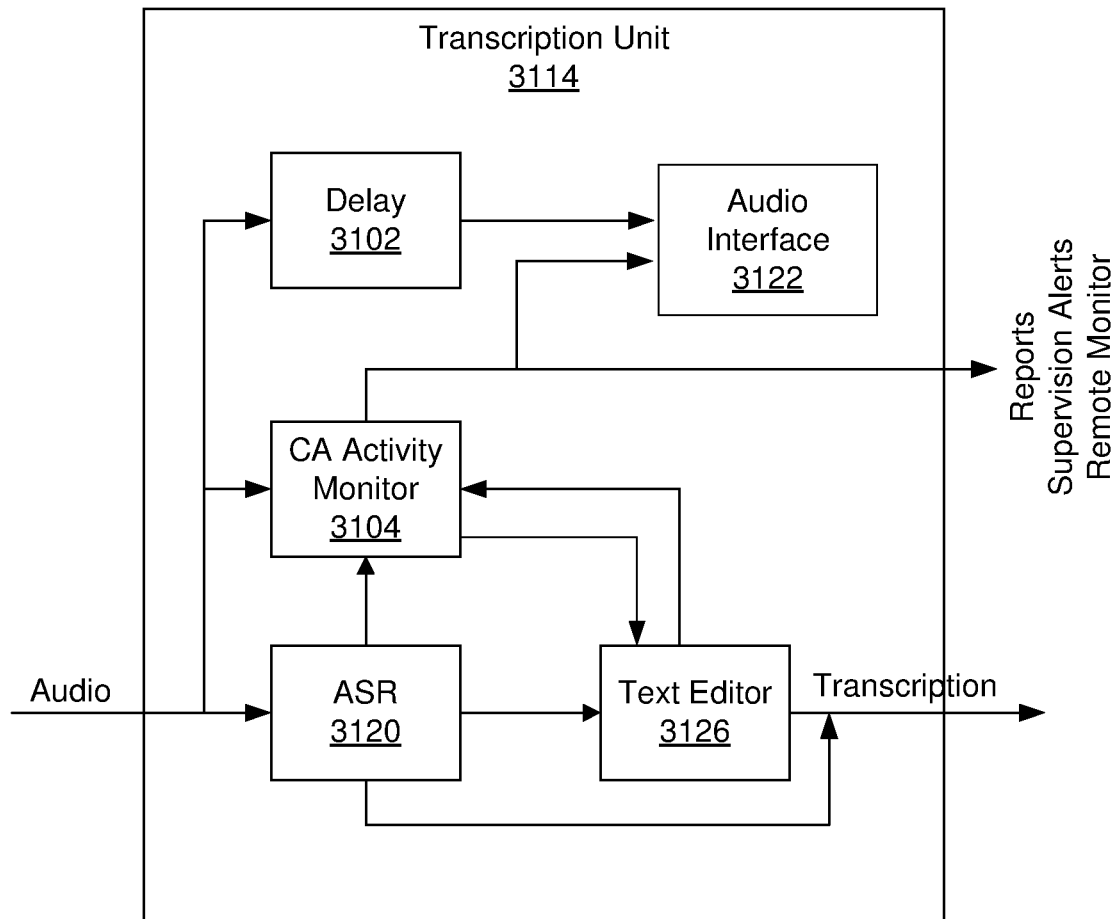
FIG. 31 illustrates another example environment for transcription of communications.

FIG. 31 illustrates another example environment 3100 for transcription of communications, in accordance with some embodiments of the present disclosure. The environment 3100 may be configured to generate transcriptions of audio by first transcribing the audio with an ASR system 3120. The audio may also be broadcast to a CA by way of an audio interface 3122. For example, the audio interface 3122 may be configured to broadcast audio to a CA or provide the audio to a device associated with the CA that may broadcast the audio.

In some embodiments, the audio may be delayed before being provided to the audio interface 3122 by a delay mechanism 3102. In some embodiments, a text editor 3126 may be configured to obtain the transcriptions from the ASR system 3120. The text editor 3126 may also be configured to present the transcriptions to a CA or to provide the transcription to a device for presentation to a CA. The text editor 3126 may obtain inputs from the CA regarding edits to the transcription. The text editor 3126 may be configured to change the transcription to correct the errors. In some embodiments, the audio interface 3122 and the text editor 3126 may be part of a CA client discussed with respect to FIGS. 1 and 4, among others.

In some embodiments, the delay mechanism 3102 may add a delay to the audio to make editing of the transcription easier for the CA. The delay may be provided so that transcriptions appear at a desired point, such as during, slightly before, or slightly after the corresponding audio. The delay value and whether delay is activated may depend on settings determined by the CA, a CA supervisor, or an administrator. The delay mechanism 3102 may be configured to maintain a constant delay, or alternatively to vary a delay period. The delay period may be set in response to output from the ASR system 3120. For example, in conjunction with output text, the ASR system 3120 may provide endpoints that mark the time of the beginning and/or ending of each word. As recognized words are displayed to the CA, the delayed audio may be synchronized to the display of the recognized words using the endpoints.

In some embodiments, the display of the text editor 3126 or audio signals provided by the audio interface 3122 may be configured to draw the CA's attention to areas most likely to need correction. For example, the display may indicate ASR system confidence via color coding, highlighting, changes in font, brightness changes, or by other variations in the visual presentation.

To save typing or reduce errors, the ASR system 3120 may provide a recognized output such as an n-best list, WCN, or lattice to the text editor 3126 so the text editor 3126 may present alternative words or phrases for the CA to select to be used in the output transcription instead of words in the first hypothesis initially selected by the ASR system 3120. A portion of text may be displayed with a variation in the visual presentation as described above, indicating that the text editor has one or more alternate hypotheses available. Examples of how a text editor may provide CA editing options may include:

1. The alternates may appear preemptively, showing up spontaneously on the screen of the text editor in a pop-up or drop-down menu. The CA may accept the first hypothesis, select one of the alternates, or ignore the alternates and accept the first hypothesis by default.
2. Alternates may appear when a CA hovers over a word or clicks on a word.
3. Alternates may appear when a CA starts to edit, such as by making changes to the text.
4. As the CA is making corrections or entering text, a predictor using a rich ASR output, a lexicon or dictionary, a language model, comparison of the transcription to previous transcriptions, predictive typing, and other methods may predict what the CA is about to enter and display it on the screen. The CA may accept the prediction if it is correct.
5. As the CA makes corrections to a word or phrase, a first hypothesis for words not being edited may change in response to the CA entry. Because the text editor 3126 may have received multiple hypotheses from the recognizer in the form of an n-best list, WCN, lattice, or other rich output, the change may include words before and/or after the point where the CA is making corrections. For example, suppose the speaker says, "I'll meet you at Monster Burger tonight," but the ASR system 3120 may transcribe the phrase as "I'll meet you at Mothers Diner tonight." The incorrect transcription may appear on the screen of the text editor 3126, but as soon as the CA types three letters "Mon" in correcting "Mothers," the text editor 3126 may recognize that the correct word must begin with "Mon," search for the next best hypothesis under that constraint and find "Monster Burger." Thus, two corrected words ("Monster Burger") may appear on the screen before the CA has even completed typing one word. The predictor may use additional methods, such as those listed in #4 above, to predict and correct text and to provide suggestions to the CA.
6. When a CA clicks, taps, or otherwise selects a portion of text (i.e. a first hypothesis) such as a word, the text editor may replace the portion of text with an alternative such as the second or next-best hypothesis from a transcription unit. If the CA selects the text a second time, the text may be replaced with a third hypothesis, and so on. Additionally or alternatively, each left-click may replace a portion of text with the next hypothesis and a right-click may enable other editing options.

In some embodiments, the environment 3100 may also be configured with a CA activity monitor 3104. In this and other embodiments disclosed herein where an ASR system may provide transcriptions automatically and where a CA may be aware that the ASR system is running, there is a risk that the CA may stop working or work at a reduced performance level.

In some embodiments, the CA activity monitor 3104 may be configured to monitor the CA for unproductive behavior and advise the CA, the CA's supervisor, or otherwise provide feedback, reports or alarms so that the behavior may be verified and/or corrected. In some embodiments, where text is produced by the ASR system 3120 without corresponding text from the CA, the text from the ASR system 3120 may appear in a different color or font, highlighted, or otherwise marked so that the CA may more easily determine text to which the CA did not contribute. Additionally or alternatively, the CA's supervisor, once alerted, may use remote access software to further monitor the CA.

In some embodiments, the CA activity monitor 3104 may be configured to periodically place pre-recorded test communication sessions to the CA where the transcription is known and where errors are inserted into the transcription. If the CA fails to correct an acceptable number or percentage of the errors, the CA activity monitor 3104 may signal poor CA performance.

Alternatively or additionally, the CA activity monitor 3104 may be configured to cause the text editor 3126 to present deliberate errors to the CA that are not errors in the transcription output by the ASR system 3120 during a communication session. For example, the transcription from the ASR system 3120 may be provided to a device for display to a subscriber and to the CA activity monitor 3104. The CA activity monitor 3104 may select a word at random from the transcription output and delete the word, replace the word with another word, or insert a word. The CA activity monitor 3104 may provide the transcription to the text editor 3126 for presenting to the CA.

In some embodiments, the other word may be selected at random. Additionally or alternatively, a second ASR system or language model may be used to construct errors that are believable, or relatively likely according to an ASR system or language model, so that the CA does not discern that the errors are being input to a transcription. In some embodiments, the second ASR system may be configurable for variable accuracy to adjust the number of constructed errors. If the CA fails to correct an error, or if the CA's error correction performance over time falls below a selected threshold, the CA activity monitor 3104 may signal poor CA performance.

In some embodiments, the CA activity monitor 3104 may be configured to analyze a second reference transcription created by a second ASR system. If the transcription generated by the ASR system 3120 is not significantly closer to the second reference transcription after being edited by the CA, then the CA activity monitor 3104 may signal poor CA performance. Additionally or alternatively, if the CA corrects less than a selected number of errors over one or more periods of time, the CA activity monitor 3104 may signal poor CA performance. The selected number of errors may be constant, or it may vary from communication session to communication session. The selected number of errors may be responsive to estimated ASR system accuracy of the ASR system 3120. Estimated ASR system accuracy may include estimated accuracy during a current communication session or averaged across multiple communication sessions. The CA activity monitor 3104 may also use the estimated accuracy of the ASR system 3120 alone or of the ASR system 3120 with CA edits in determining whether to signal poor CA performance. The CA activity monitor 3104 may take into account use of the text editor 3126 and/or the audio interface 3122 by the CA in evaluating CA behavior. For example, if a CA stops speaking or exhibits signs that might otherwise be construed as distracted, but is actively editing text, the CA activity monitor 3104 may use the editing activity to suppress a distracted CA signal.

In some embodiments, the CA activity monitor 3104 may use a video image obtained, for example, from a camera configured to record the CA to detect suspect behavior. The camera may or may not be visible to the CA. The image may, for example, be analyzed automatically by image processing software, by a remote supervisor, or a combination thereof, to detect conditions and events such as:

1. The CA's eyes closed.
2. The direction of the CA's gaze or an indication of whether the CA appears to be paying attention to the task. For example, if the CA does not appear to be looking at the CA screen, the CA activity monitor may signal suspect CA behavior.
3. The CA's posture.
4. The CA's body position or orientation. For example, if the CA's face is located or oriented so that it appears the CA is not looking at or cannot see the display, the CA activity monitor may signal possible lack of attention.
5. An indication of the CA's hand position. For example, if the CA's hands do not appear to be at the keyboard or mouse or if the CA's body position suggests that the CA's hands are likely not at the keyboard/mouse, the CA activity monitor may signal that the CA is not prepared to correct errors.
6. Lip motion. For example, if the CA's lips are moving but audio is not detected or vice versa, the CA activity monitor may signal a possible equipment failure. In another example, if audio is detected and the CA's lips are not moving, the CA activity monitor may signal a possible distraction.

In some embodiments, the video may be monitored continuously. In another example, the video may be monitored intermittently. In another embodiment, the video camera may be non-functional or unused, but visible to the CA. The camera may include a light to suggest video is being captured. Other events used by the CA activity monitor 3104 may include:

7. The CA may have an option to indicate that he/she is unable to listen to or revoice at least a segment of a communication session by, for example, entering "inaudible," "garbled," "I missed that part," or "I need to take a break." Frequency of such indications exceeding a selected threshold may indicate poor CA performance. Additionally or alternatively, this feature may be used to indicate a poor network connection or other system failure.
8. In some embodiments, the CA activity monitor may, in detecting distracted CA behavior, compare a metric such as deliberate errors corrected, missed errors, edit distance between ASR transcriptions, number of errors corrected, estimated accuracy of the ASR system 3120, presence of voices or music, events detected in a video signal, and the frequency of phrases labeled as unable to caption to a threshold. In an alternative scenario, the metrics may be features, of which one or more may be combined, such as using a machine learning system, to detect poor CA performance.

When the CA activity monitor 3104 signals suspect CA behavior, a remote monitoring system may provide a supervisor means to observe the CA. This observation may be live or from one or more recordings and may include listening to caller audio, listening to CA audio, observing part or all of the CA's screen, observing transcriptions, watching video from a camera, and examining time records, computer login records, and door access logs. Additionally or alternatively, a recording/playback system may allow the supervisor to observe recorded activities of the suspect CA, such as at or before the CA activity monitor detected a suspect event. For example, the supervisor may be able to watch recorded video of the CA during the communication session containing the suspect event or during other communication sessions. In one implementation the CA's lips may be at least partly obscured, for example either continuously or when the lips are in motion, in the video to protect privacy of the communication session. Additionally or alternatively, the text of the conversation may be obscured and the audio may be rendered unintelligible to protect privacy.

Modifications, additions, or omissions may be made to the environment 3100 without departing from the scope of the present disclosure. For example, in some embodiments, the audio interface 3122 may be configured to obtain revoiced audio from the CA. The revoiced audio may be provided to another ASR system. The output of the ASR system 3120 and the other ASR system may be fused. In these and other embodiments, the CA activity monitor 3104 may listen to audio to detect distractions or other suspect behavior. For example, if the CA activity monitor 3104 hears music, the CA speaking, or other audio while the audio does not include speech, or if the CA mutes his/her microphone, the CA activity monitor 3104 may signal that the CA is distracted. If the CA activity monitor 3104 hears multiple voices or a voice that does not correspond to the CA's voice, it may signal that the CA may be distracted. In another example, the ASR system 3120 may include multiple ASR systems and a fuser that combines outputs of the multiple ASR systems.

Figure 32A:
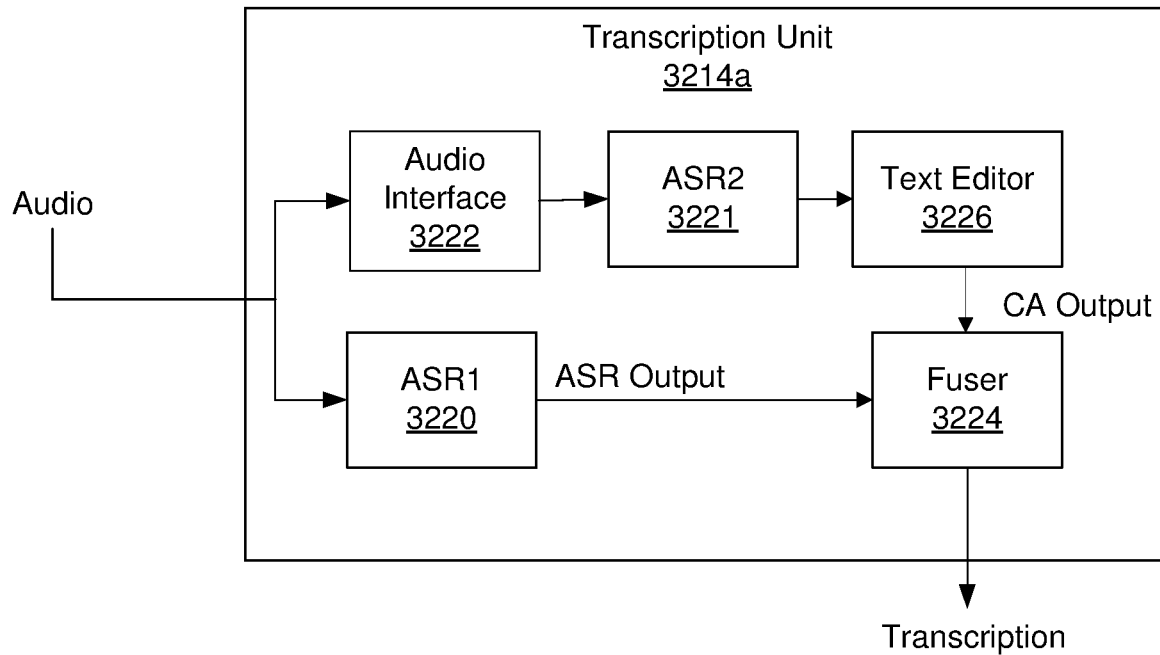
FIGS. 32a and 32b illustrate example embodiments of transcription units.
Figure 32B:
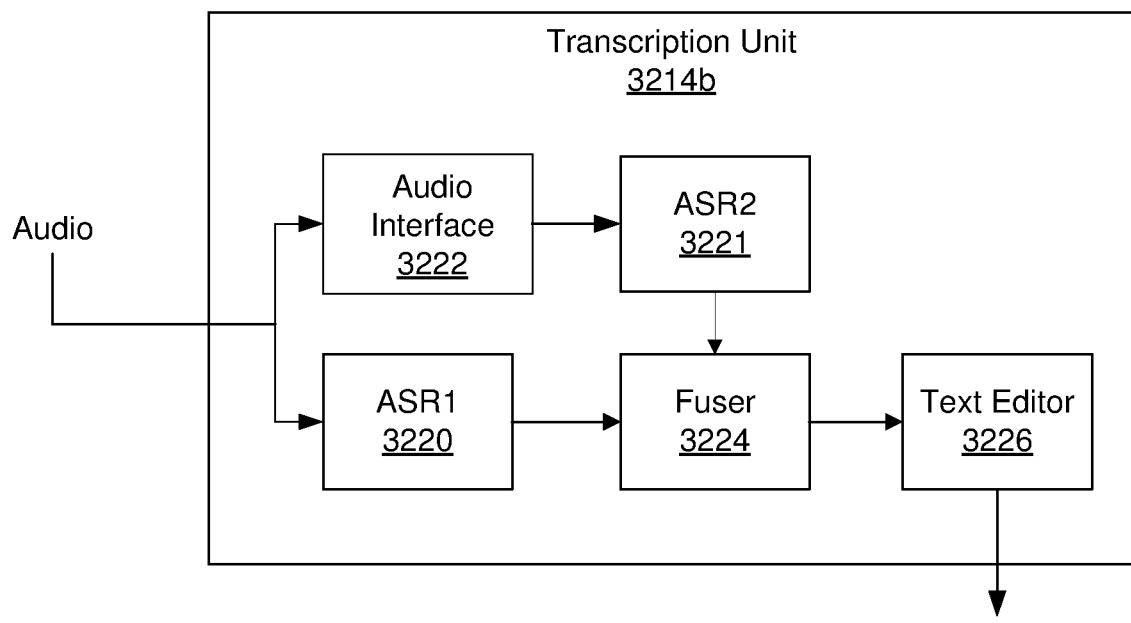

FIGS. 32*a* and 32*b* illustrate example embodiments of transcription units, in accordance with some embodiments of the present disclosure. In some embodiments, the transcription units 3214 may be configured to generate transcriptions using a combination of a speaker-dependent ASR system 3221 and a speaker-independent ASR system 3220. The transcription units 3214 may include an audio interface 3222 analogous to the audio interface 3122 of FIG. 31. The audio interface 3222 may be configured to obtain audio and revoiced audio based on a CA speaking the words in the audio. The audio interface 3222 may provide the revoiced audio to the ASR system 3221. The ASR system 3220 may obtain the regular audio. Each of the ASR system 3220 and the ASR system 3221 may generate a transcription.

Each of the transcription units 3214 may include a fuser 3224 that may be configured to fuse the outputs of the ASR system 3221 and ASR system 3220. In some embodiments, the fuser 3224 may make a decision to use text from the ASR system 3221 and ASR system 3220 for each word, for each subword unit, for each phrase, for a speaker turn, for a remaining portion of a session, or for an entire session. The decision may take into account voting, endpoints, word accuracy probabilities, alignment, silence detection, and information from a language model in making the decision. When switching between transcriptions from the ASR system 3221 and ASR system 3220, the fuser 3224 may be configured to synchronize text so that words of the transcription remains in sequential order (see FIG. 19).

Each of the transcription units 3214 may also include a text editor 3226. In the first transcription unit 3214*a* of FIG. 32*a*, the text editor 3226 may obtain the output transcription of the ASR system 3221. In these and other embodiments, the text editor 3226 may make corrections to the transcription from the ASR system 3221 before the transcription is fused with the transcription from the ASR system 3220. In the second transcription unit 3214*b* of FIG. 32*b*, the text editor 3226 may be configured to make corrections to the transcription output by the fuser 3224. The embodiment of FIG. 32*a* illustrates an arrangement where the first transcription unit 3214*a* may be configured to hide the corrections from the ASR system 3220 from the CA interfacing with the text editor 3226. In these and other embodiments, hiding the corrections may give the CA more incentive to provide complete, correct transcriptions.

The embodiment of FIG. 32*b* illustrates an arrangement where the second transcription unit 3214*b* may be configured to give the CA final authority over the edits and may reduce the number of edits made by the CA.

Turning now to FIG. 32*b*, in some embodiments, the CA may stop revoicing the audio. In these and other embodiments, the ASR system 3221 may stop generating a transcription. However, the ASR system 3220 may continue to generate a transcription and the fuser 3224 may be configured to output the transcription from the ASR system 3220. In these and other embodiments, the CA may go back and fix previous errors in the transcription through the text editor 3226. For example, the text editor 3226 may display a current and previous transcriptions where previous transcriptions have already been provided to a user device for presentation. Thus, the text editor 3226 may display more than just the current transcription being generated.

In some embodiments, the transcriptions from the ASR system 3220 may be presented to a CA. In these and other embodiments, the transcriptions from the ASR system 3220 may be presented to the CA in a marked format, such as a different color, so that the CA can easily observe the action of the ASR system 3220. While the CA is not revoicing, the fuser 3224 may forward the transcription from the ASR system 3220 as-is, without combining the transcriptions from the ASR system 3221 as there are no transcriptions from the ASR system 3221 without revoicing. Once the CA resumes revoicing, transcriptions from the ASR system 3221 may be synchronized with transcription from the ASR system 3220 and the fuser 3224 may resume fusing the transcriptions.

In some embodiments, various inputs, each corresponding to the same word, segment of the conversation, or point in time in the communication session audio stream, may arrive at the fuser 3224 input at different times, due to variations in latency for the various transcription paths. For example, in some embodiments, the ASR system 3220 may be faster than the ASR system 3221 such that the transcription from the ASR system 3220 may arrive at the fuser 3224 input ahead of the transcription from the ASR system 3221. In these and other embodiments, the fuser 3224 may create and transmit a fused transcription for a given segment of the conversation after the fuser 3224 has received all inputs corresponding to the segment. Alternatively or additionally, the fuser 3224 may transmit a fused transcription to a user device for presentation after the fuser 3224 has received one or more input transcriptions. After receiving the other transcription, the fuser 3224 may determine a correction to the previous transcription based on the other transcription and provide the changes to a user device. Additionally or alternatively, the fuser 3224 may also change the fused transcription and transmit changes to the user device in response to changes in input transcriptions, such as if one of the ASR systems 3220 and 3221 revises a previous hypothesis. In some embodiments, the fuser 3224's style or configuration may change in response to one or more factors such as a change in speech recognition accuracy of one of the ASR systems 3220 and 3221, a change in CA behavior, or a change in values of one or more features in Table 2 and Table 5. For example, in response to accuracy of transcriptions from the ASR system 3220 being above a particular threshold, the fuser 3224 may operate to provide the first transcription received and making corrections. In these and other embodiments, in response to the accuracy of transcriptions from the ASR system 3220 being below a particular threshold, the fuser 3224 may wait for both transcriptions before providing a transcription. Modifications, additions, or omissions may be made to the transcription units 3214 without departing from the scope of the present disclosure.

Figure 33A:
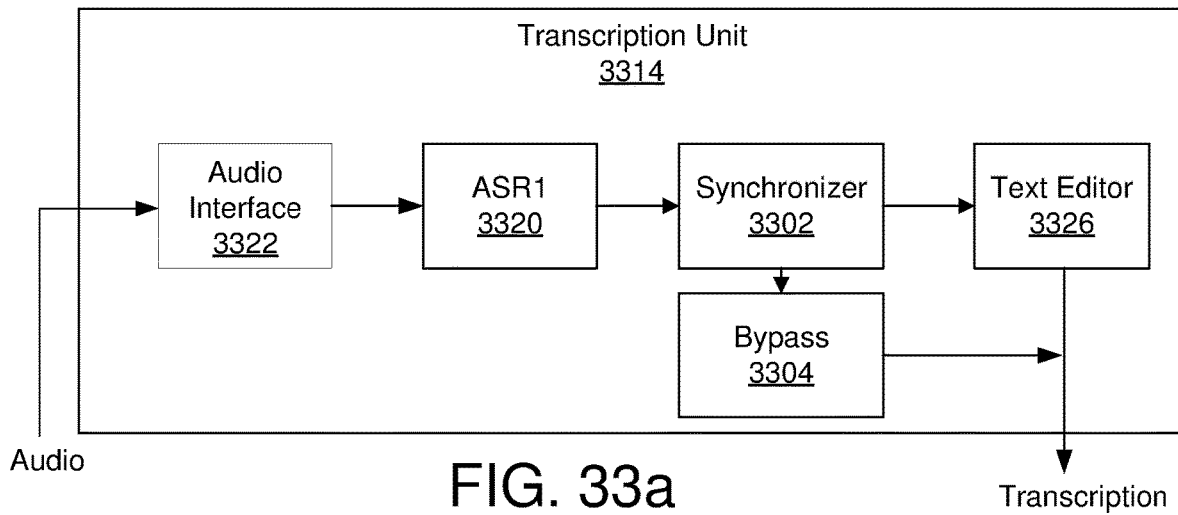
FIGS. 33a, 33b, and 33c are schematic block diagrams illustrating example embodiments of transcription units.
Figure 33B:
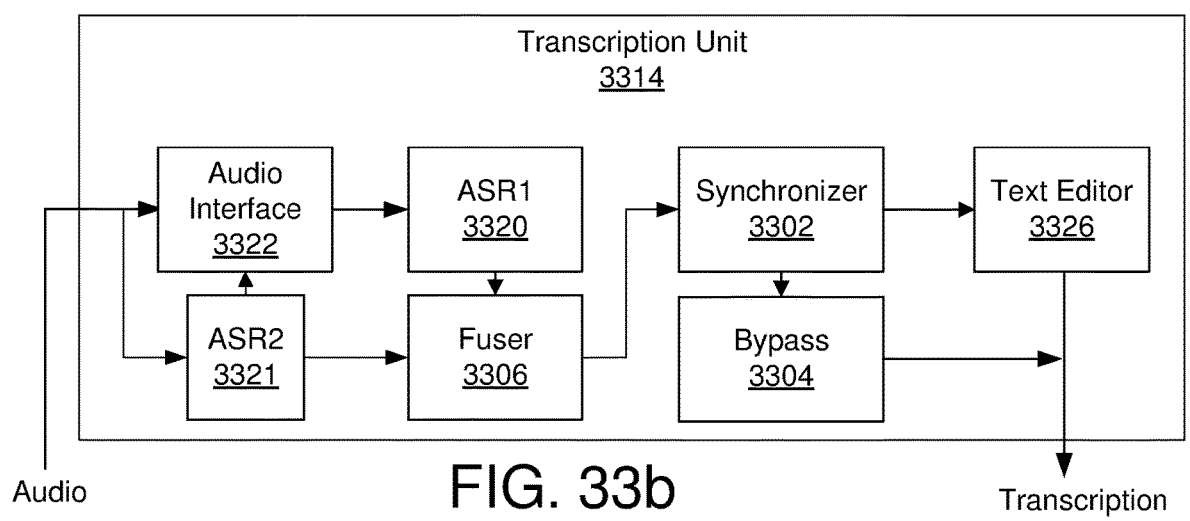
Figure 33C:
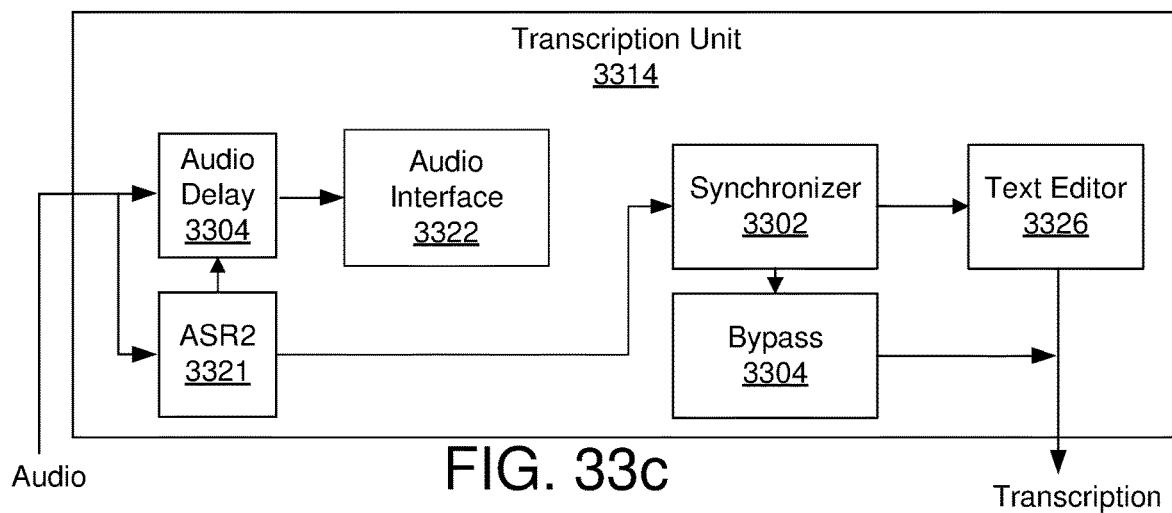

FIGS. 33*a*, 33*b*, and 33*c* are schematic block diagrams illustrating example embodiments of transcription units, in accordance with some embodiments of the present disclosure. The FIGS. 33*a*, 33*b*, and 33*c* illustrate a transcription unit 3314. The transcription unit 3314 may be configured to operate in multiple different modes. FIG. 33*a* illustrates the transcription unit 3314 operating in mode 1, FIG. 33*b* illustrates the transcription unit 3314 operating in mode 2, and FIG. 33*c* illustrates the transcription unit 3314 operating in mode 3.

In FIG. 33*a*, illustrating operating mode 1, the transcription unit 3314 may be configured to receive communication session audio at an audio interface 3322 that may obtain revoiced audio based on the audio from a CA. The revoiced audio may be provided to a first ASR system 3320 which may be speaker-dependent. The first ASR system 3320 may generate a revoiced transcription. A text editor 3326 may be configured to receive input from the CA to correct errors in the revoiced transcription.

In FIG. 33*b*, illustrating operating mode 2, the transcription unit 3314 may be configured to receive communication session audio at a second ASR system 3321, which may be speaker-independent, and the audio interface 3322 simultaneously. The audio interface 3322 may obtain revoiced audio based on the audio from a CA. The first ASR system 3320 may generate a first transcription. The second ASR system 3321 may generate a second transcription. The two transcriptions may be fused by a fuser 3306 and the fused transcription may be sent to the text editor 3226. The text editor 3326 may output the fused transcription for presentation to the CA and may be configured to receive input from the CA to correct errors in the fused transcription.

In FIG. 33*c*, illustrating operating mode 3, the transcription unit 3314 may be configured to receive communication session audio at the second ASR system 3321 and the audio interface 3322 simultaneously or the audio interface 3322 may receive delayed audio from an audio delay 3330 that may delay the communication session audio. The audio interface 322 may broadcast the audio to the CA. The second ASR system 3321 may generate a non-revoiced transcription. The non-revoiced transcription may be sent to the text editor 3226. The text editor 3326 may output the non-revoiced transcription for presentation to the CA and may be configured to receive input from the CA to correct errors in the non-revoiced transcription.

In some embodiments, the third operating mode may be configured to relieve the CA from revoicing the audio such that the CA may attend to correcting errors in the transcriptions using the text editor 3326.

In some embodiments, the delay of the audio performed by the audio delay 3330 may be constant or variable. In a first example, audio delay may be constant and may be responsive to estimated latency of a transcription process of the audio as illustrated in FIG. 33c. For example, the latency from when the audio is received by the second ASR system 3321 and when the audio is provided on the text editor 3326. In a second example, the delay performed by the audio delay 3330 may be responsive to the time of appearance for words in the text editor 3326, compared to the time of appearance for words in the communication session audio, which may be estimated using endpoints from the second ASR system 3321. The delay performed by the audio delay 3330 may then be adjusted so that audio is presented by the audio interface 3322 substantially synchronous with the appearance of the corresponding text in the text editor 3326. Additionally or alternatively, a further delay adjustment may be applied so that text appears in the text editor 3326 a selected amount of time before or after the corresponding audio is broadcast by the audio interface 3322.

In some embodiments, the transcription unit 3314 may be reconfigured, for example between modes 1, 2, and 3, using one of several methods, including:

1. If the CA stops speaking, the transcription unit may switch to mode 3. When the CA begins speaking again, the transcription unit may switch to mode 1 or 2.
2. The CA may take action, such as speaking a voice command, pressing a key or foot switch, touching a region on a touchscreen, or clicking a mouse, to switch between modes.
3. The switch between modes may be accomplished within the implementation illustrated in FIG. 33b by action from the fuser 3306 to reduce errors. For example, if the fuser 3306 detects that the CA is silent (such as when the CA is correcting errors) or that the error rate of the first ASR system 3320 is above a threshold, the fuser 3306 may select text from the second ASR system to use for transcriptions, in which case the behavior of the configuration of FIG. 33b may match that of mode 3. Where the fuser 3306 detects that the first ASR system 3320 is providing transcriptions, the fuser 3306 may select words from the revoiced transcription, in which case the behavior of the configuration of FIG. 33b may match that of mode 1.
4. A selector may direct transcription unit 3314 to switch between modes in response to features such as items in Table 2 and Table 5. For example, a selector may determine that a revoiced transcription unit is performing sufficiently well without ASR2 and switch to mode 1. Additionally or alternatively, a selector may determine that audio characteristics and the CA skillset suggest that mode 3 will provide the best transcription and switch to mode 3.

The latency, in some embodiments, for the various modes may be different, so a synchronizer 3302 may buffer text as necessary and ensure that there are no gaps or overlaps in the output transcription when the transcription unit 3314 switches between modes. The synchronizer 3302 is illustrated coming before the text editor 3326, though the synchronizer 3302 may alternatively come after (see FIG. 19).

As described above, the transcription unit 3314 may be configured to continue to provide transcriptions in real-time or near real-time to a user device regardless of actions by the CA. Thus, the CA stopping revoicing, editing, or other actions may not stop the transcription unit 3314 from providing transcriptions to the user device.

In some embodiments, the transcription unit 3314 may include a bypass 3304 for sending a transcription to a user device and bypassing providing the text to the text editor 3326 for editing. In these and other embodiments, the bypass 3304 may be configured to forward text directly to a user device, before the text is presented to the CA for editing and/or before receiving input from the CA regarding edits to the text by the text editor 3326. In these and other embodiments, after the text editor 3326 receives a correction (e.g., edit, insertion, or deletion), the corrected text may be forwarded to the user. The user device may then display the corrections. The corrections may be presented in an altered form such as in highlighted text so that the reader can see which text has been corrected. In some embodiments, the bypass 3304 may be configured to operate in response to a CA activity monitor determining that the CA has stopped editing the text.

Modifications, additions, or omissions may be made to the transcription units 3314 without departing from the scope of the present disclosure. For example, in some embodiments, the transcription units 3314 may not include the bypass 3304. In these and other embodiments, the text editor 3326 may be configured to forward text directly to a user device, before the text is presented to the CA for editing and/or before receiving input from the CA regarding edits to the text. In these and other embodiments, after the text editors 3326 receives a correction (e.g., edit, insertion, or deletion), the corrected text may be forwarded to the user. The user device may then display the corrections. The corrections may be presented in a form such as highlighted text so that the reader can see which text has been corrected.

Figure 34:
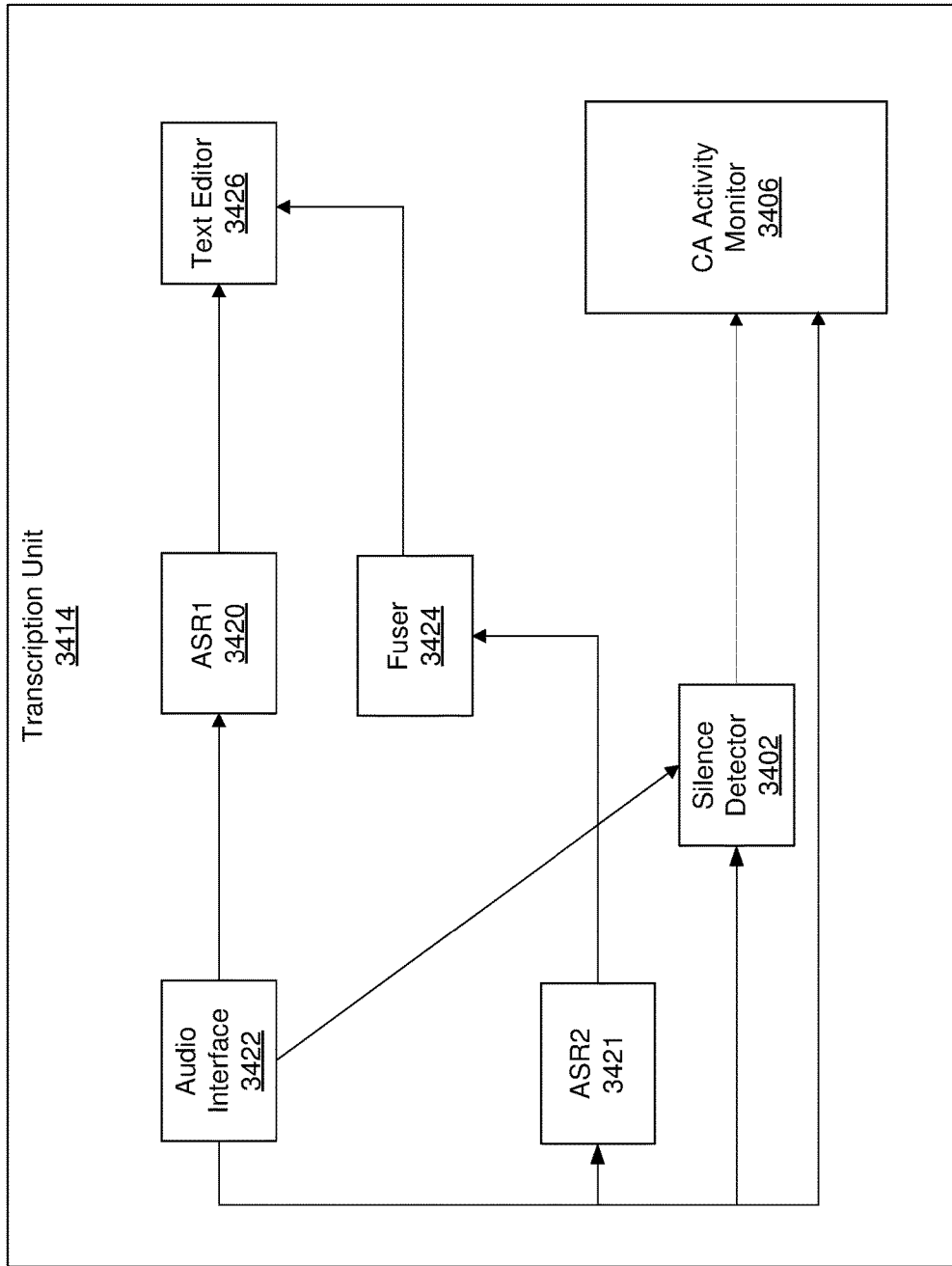
FIG. 34 is another example embodiment of a transcription unit.

FIG. 34 is another example embodiment of a transcription unit 3414, in accordance with some embodiments of the present disclosure. In some embodiments, the transcription unit 3414 may be configured to receive communication session audio at a second ASR system 3421, which may be speaker-independent, and an audio interface 3422. The audio interface 3422 may obtain revoiced audio based on the communication session audio from a CA. A first ASR system 3420 may generate a first transcription based on the communication session audio. The second ASR system 3421 may obtain the revoiced audio and generate a second transcription based on the revoiced audio. The two transcriptions may be fused by a fuser 3424 and the fused transcription may be sent to the text editor 3426. The text editor 3426 may output the fused transcription for presentation to the CA and may be configured to receive input from the CA to correct errors in the fused transcription.

In some embodiments, the transcription unit 3414 may further include a CA activity monitor 3406 and silence detector 3402. The CA activity monitor 3406 may be an example of an alternative embodiment of the CA activity monitor 3104 of FIG. 31.

In some embodiments, the silence detector 3402 may be configured to monitor one or more of: the communication session audio and the revoiced audio. In some embodiments, the silence detector 3402 may be configured to detect silence of the communication session audio or the revoiced audio and assign a silence certainty rating based on an average energy of the communication session audio or the revoiced audio falling below a selected threshold. The silence detector 3402 may provide an indication regarding silence in communication session audio and the revoiced audio to the CA activity monitor 3406.

The CA activity monitor 3406 may be configured to compare silence detector indications regarding the communication session audio and the revoiced audio, taking into account a delay, to determine if the CA should be speaking when the CA is not speaking/revoicing. For example, if speech is detected from the communication session audio, but not the CA, taking into account a time lag between the communication session audio and the revoiced audio, at a high confidence and for a significant period of time, the CA may be determined to have stopped speaking and the CA activity monitor 3406 may signal poor CA performance.

In some embodiments, the CA activity monitor 3406 may also receive input from one or more of: the first transcription, the second transcription, the fused transcription, the edited transcription, and log activity of the text editor 3426. Additionally or alternatively, the CA activity monitor 3406 may make a determination of whether the CA is performing as expected based on the input. For example, the CA activity monitor 3406 may compare text output from the fuser 3424 with text output from the text editor 3426 and determine that the CA is not appropriately making corrections. As another example, the CA activity monitor 3406 may use silence information and a log of activity from the text editor 3426 to determine that the CA has stopped revoicing. However, the CA activity monitor 3406 may also take into account an indication of activity from the text editor 3426 suggesting that the CA has legitimately stopped speaking in order to edit text.

In some embodiments, the CA activity monitor 3406 may be configured to detect CA silence by finding sequences of words in the first transcription from revoiced audio that are missing in the second transcription of the communication session audio. The silence detector 3402 may assign a higher silence certainty when the sequence of words missing in the first transcription from revoiced audio is followed by a sequence of words that match a similar sequence in the second transcription of the communication session audio.

In some embodiments, the CA activity monitor 3406 may be configured to detect CA silence by comparing the first transcription from revoiced audio with the second transcription of the communication session audio. For example, if the second transcription includes an amount of text that is more than what the second transcription includes for a threshold amount of time or over a threshold number of words or characters, the CA may be determined to have slowed or stopped working and the CA activity monitor 3406 may signal distracted CA performance. In these and other embodiments, the CA activity monitor 3406 may take into account a time lag between the communication session audio and the revoiced audio.

In some embodiments, the CA activity monitor 3406 may be configured to detect CA silence by comparing the number of words or subword units such as syllables in the revoiced audio over a particular period of time to the number of words or subword units in the communication session audio over the particular period of time. The number of words may, for example, be counted in the first and second transcriptions. Alternatively or additionally, the number of subword units may be counted by analyzing audio to determine the number of changes in features such as volume and/or the frequency spectrum over a selected period of time. For example, when a metric measuring a change in the magnitude spectrum exceeds a specified threshold, a new subword unit may be considered to have begun.

In some embodiments, the transcription unit 3414 may also be configured to assist the CA. For example, the second transcription may be provided to a user device after the second ASR system 3421 generates the second transcription. However, the text editor 3426 may not present the second transcription for a fixed or variable length of time or until after the CA revoices the corresponding audio. Delaying the presentation of the second transcription may encourage the CA to continue speaking and may help avoid confusing the CA when seeing transcriptions before the CA revoices the corresponding audio.

In some embodiments, an accuracy estimator may measure the overall error rate of the transcription unit 3414 and may use the error rate to measure performance of the CA. The error rate may also be used to provide feedback or other incentives to the CA to raise the combined system accuracy. The CA activity monitor 3406 may provide the error rate to the text editor 3426 or other system that may present the error rate or another performance metric during or at the end of a communication session. For example, the another performance metric may include a function of the estimated CA accuracy in revoicing the audio and a function responsive to the estimated difficulty in revoicing the communication session audio. In another example, the performance metric may include a function of the estimated accuracy of an ASR system receiving the revoiced audio and the estimated accuracy of an ASR system receiving the communication session audio.

Modifications, additions, or omissions may be made to the transcription units 3414 without departing from the scope of the present disclosure. For example, in some embodiments, the transcription units 3414 may include a synchronizer and/or audio delay. In some embodiments, an audio delay may delay audio so that the CA hears it at approximately the same time as the corresponding text appears in the text editor 3426. In a first example, the audio delay time may be set to zero. In a second example, the audio delay time may respond to word endpoints for one or more words from the second transcription compared to the point in time where the one or more words appear in the text editor 3426. In a third example, the audio delay may respond to communication session audio, presentation of text from the text editor 3426, and an arrival time of the text at the text editor 3426.

Figure 35:
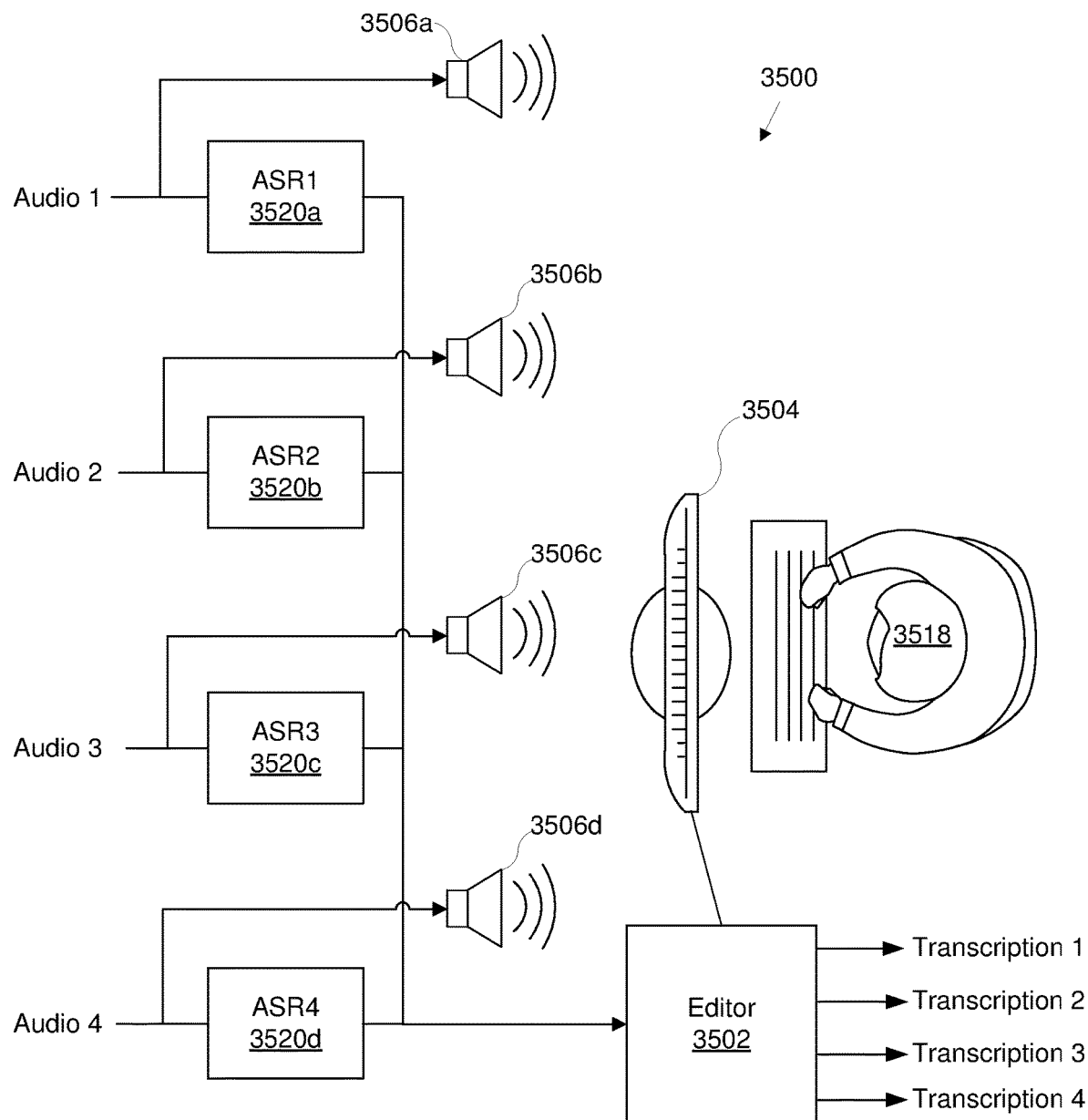
FIG. 35 is a schematic block diagram illustrating an example environment for editing by a captioning assistant (CA)

FIG. 35 is a schematic block diagram illustrating an example environment 3500 for editing by a CA 3518, in accordance with some embodiments of the present disclosure. In some embodiments, the CA 3518 may monitor multiple audio signals, such as multiple communication sessions, simultaneously and make corrections to transcriptions of the audio signals as needed. FIG. 35 illustrates audio signals 1-4. Each of the audio signals 1-4 are provided to one of four ASR systems, 3520*a*-3520*d*, collectively the ASR systems 3520. The ASR systems 3520 may generate transcriptions of the audio signals 1-4 and provide the transcriptions to an editor 3502. The editor 3502 may buffer the text, segment words into phrases, and deliver transcriptions to the respective user devices to be displayed.

In some embodiments, the CA 3518 may listen to the communication sessions and view the transcriptions on one or more displays 3504. The editor 3502 may be configured to receive input form the CA 3518 to make corrections to the transcriptions. If the CA 3518 makes corrections after the transcriptions have been sent to a user device, the editor 3502 may be configured to send the corrections to the user device.

In some embodiments, a set of loudspeakers 3506*a-d* are configured to broadcast the audio signals 1-4. Additionally or alternatively, one or more loudspeakers 3506 may be configured to broadcast audio from multiple audio signals with per-audio stream signal variations so that the apparent position of each audio signal, from the CA's 3518 perspective, appears at various locations in space. The location in space may be set, for example, by adjusting loudness, phase, delay, and other characteristics of the audio signals. For example, two loudspeakers 3506*a* and 3506*b* may play audio from all the audio signals. In these and other embodiments, each audio signal may be positioned in space within the stereo image by adjusting the relative loudness of each audio signal sent to each loudspeaker. Additionally or alternatively, the audio signals may be broadcast to the CA 3518 via stereo headphones and the audio signal to the headphones may be adjusted so that each audio signal appears to come from a different location in space. In some embodiments, the CA 3518 may rewind and replay portions of one or more conversations. The replay may use a speech rate changer to play speech at a rate faster or slower than real-time and/or remove or shorten silent segments. Modifications, additions, or omissions may be made to the environment 3500 without departing from the scope of the present disclosure. For example, the number of audio signals and ASR systems may be more or less than four.

Figure 36:
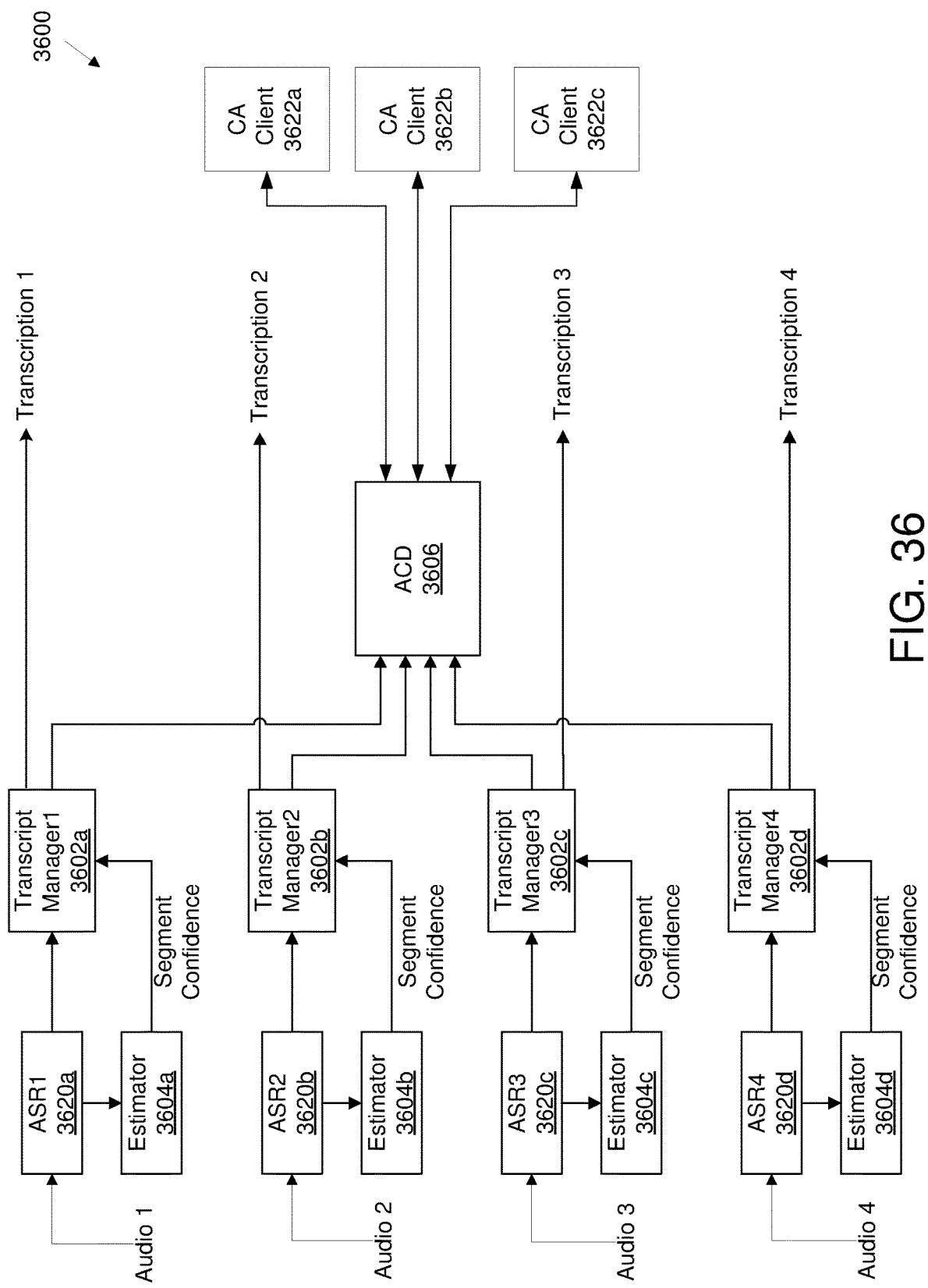
FIG. 36 is a schematic block diagram illustrating an example environment for sharing audio among CA clients.

FIG. 36 is a schematic block diagram illustrating an example environment 3600 for sharing audio among CA clients 3622, in accordance with some embodiments of the present disclosure. In the environment 3600, four audio signals 1-4 are received. The audio signals may be from different or the same communication sessions or from other sources. A transcription for each of the audio signals 1-4 is generated by a separate one of four ASR systems 3602*a-d*, collectively ASR systems 3620, and sent to a separate one of four transcription managers 3602*a-d*, collectively transcription managers 3602.

In some embodiments, the environment 3600 may also include four estimators 3604*a-d*, collectively the estimators 3604, associated with each of the ASR systems 3620. The ASR systems 3620 may provide the transcriptions to the estimators 3604. The estimators 3604 may be configured to determine a characteristic of at least a segment of the transcriptions received. A segment may be a word, a few words, or a speaker turn delimited by silence or by the other party speaking. In some embodiments, the characteristic may be an accuracy of the transcription or other characteristic of a transcription that may be measured as described in this disclosure.

In some embodiments, the estimators 3604 may provide the characteristic of the transcriptions to the transcription managers 3602. The transcription managers 3602 may be configured to compare the characteristic to a threshold. The threshold may be based on the source of the audio. For example, the threshold may be based on the type of the communication session as described in this disclosure. In response to the characteristic satisfying a threshold, the transcription may be provided to a user device associated with the audio signal corresponding to the transcription. In response to the characteristic not satisfying the threshold, the segment and the audio corresponding to the segment may be provided to the automatic communication session distributor ("ACD") 3606. Alternatively or additionally, in response to the characteristic not satisfying the threshold, the segment and the audio corresponding to the segment may be provided to the user device as well.

The ACD 3606 may receive a segment and audio from the transcription managers 3602 and route it to an available CA client 3622. The CA client 3622 may be configured to present the audio and the segment to a CA associated with the CA client 3622 and obtain input from the CA regarding edits to the segment. In some embodiments, the CA may not edit the segment. The ACD 3606 may provide the edits back to the transcription manager 3602. The transcription manager 3602 may provide the edited segment to a user device for presentation. Alternatively or additionally, the transcription manager 3602 may provide the edits as corrections to a user device that previously obtained the segment.

In some embodiments, although not depicted here, the CA clients 3622 may be part of transcription units associated with the ASR systems 3620. In these and other embodiments, the transcription units may be utilized to accurately and efficiently generate corrections to the segment by including a speaker-dependent ASR, a companion ASR system and fuser, or other forms of ASR systems.

In some embodiments, the CA clients 3622 may present text that the ASR systems 3620 transcribed before, during, and, if it is available, after the segment. In some embodiments, the CA client 3622 may obtain inputs from a keyboard, mouse, voice commands, revoicing, or other forms of computer input.

In some embodiments, to help CAs associated with the CA clients 3622 understand the context or topic of conversation, the ACD 3606 may be configured to use the same CA client 3622 or group of CA clients 3622 for a given communication session. In these and other embodiments, the ACD 3606 may provide one of the CA clients 3622 with a transcription or summary of prior portions of the conversation.

In some embodiments, the ACD 3606 may be configured to favor selecting a CA client 3622 for a communication session based on the CA client 3622 previously handling audio associated with one or more devices participating in the communication session. In some embodiments, the ACD 3606 may select CA clients 3622 based on information regarding the CAs associated with the CA clients 3622, such as a skill level of a CA, idle time for CA, status of a CA such as seniority or performance, experience with a given language or accent, ability to handle particular characteristics such as high noise levels, or knowledge such as medical or legal expertise related to the current conversation topic.

In some embodiments, the characteristic determined by the estimator 3604 may be a predicted accuracy of a segment. The predicted accuracy may be the accuracy of the segment before the segment has been partly or fully transcribed. In these and other embodiments, the predicted accuracy may be based on an estimated accuracy of past speech transcriptions or segments thereof. In response to the predicted accuracy/quality not satisfying the threshold, the segment may be sent to a CA client 3622. In these and other embodiments, a transcription unit that includes the CA client 3622 may be configured to transcribe the segment at overlapping time periods as the segment is transcribed using the ASR systems 3620. By streaming segments to CA clients 3622 based on predicted accuracy, round-trip latency to and from the CA clients 3622 may be reduced. In these and other embodiments, segments may continue to stream to the CA clients 3622 until the predicted accuracy rises above the threshold. Modifications, additions, or omissions may be made to the environment 3600 without departing from the scope of the present disclosure. For example, the number of audio signals and associated elements (e.g. ASR systems and transcription managers) and the number of CA clients may be more or less than the numbers illustrated.

Figure 37:
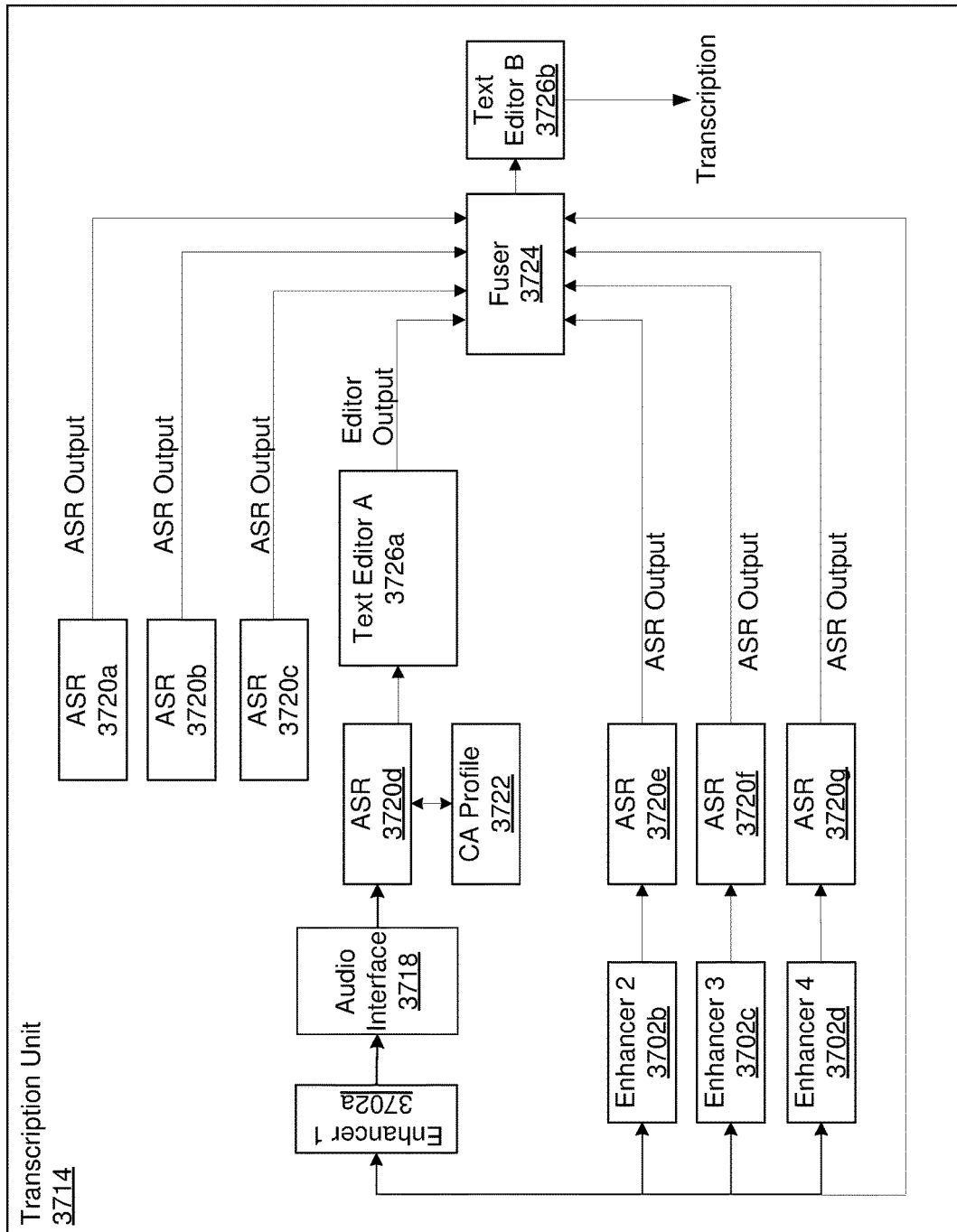
FIG. 37 is a schematic block diagram illustrating an example transcription unit.

FIG. 37 is a schematic block diagram illustrating an example transcription unit 3714, in accordance with some embodiments of the present disclosure. In some embodiments, the transcription unit 3714 may be configured with seven ASR systems 3720*a-g*, collectively, ASR systems 3720. An audio interface 3718 may be configured to provide audio received by the transcription unit 3714 to a CA and generate revoiced audio based on speech from the CA. The audio interface 3718 may provide the revoiced audio to ASR systems 3720 *a-d*. The ASR system 3720*d* may be a speaker-dependent ASR system that has been trained on the voice of the CA. In these and other embodiments, the ASR system 3720*d* may use a CA profile 3722 associated with the CA that may include an ASR model and other models. The ASR systems 3720*e-g* may be configured to receive the audio without revoicing. Each of the ASR systems 3720*a-g* may generate a transcription that may be provided to a fuser 3724. Although depicted here with seven total ASR systems, it is contemplated that any reasonable number of ASRs may be used here or in any of the described embodiments of the present disclosure. Similarly, any reasonable number of audio interfaces, speaker-dependent ASR systems, and text editors may be utilized.

In some embodiments, the fuser 3724 may be configured to receive the transcriptions from the ASR systems 3720. The fuser 3724 may combine the transcriptions to generate fused transcription. In some embodiments, the ASR systems 3720*a-c* and 3720*e-g* may be any combination of speaker-independent or speaker-dependent ASR systems. Alternatively or additionally, the ASR systems 3720*a-c* and 370*e-g* may each be configured in any number of ways as described in this disclosure. The number of ASR systems and the number of transcriptions provided to the fuser 3724 may be more or less than the numbers illustrated. For example, in some embodiments, the transcription unit 3714 may include two, three, four, or five ASR systems besides the ASR system 3720*d*. In these and other embodiments, one or more of the ASR systems may use the revoiced or non-revoiced audio to generate the transcriptions. Alternatively or additionally, one or more of the ASR systems may run in a reduced or crippled state. Alternatively or additionally, one or more of the ASR systems may be configured as indicated in the below list.

1. An ASR system where the acoustic model is trained on speech collected from multiple callers.
2. An ASR system where the acoustic model is trained on speech collected from multiple CAs.
   a. In some embodiments, multiple CAs are predominantly male. Alternatively, the model may be built using multiple male and female voice samples, then adapted to multiple predominantly male voices. This model may be used when it is determined that a CA providing revoiced audio is male.
   b. Additionally or alternatively, the multiple CAs are predominantly female. Alternatively, the model may be built using multiple male and female voice samples, then adapted to multiple predominantly female voices. This model may be used when it is determined that a CA providing revoiced audio is female.
3. An ASR system where the acoustic model is trained on speech collected from multiple callers and multiple CAs.
4. An ASR system trained on speech collected from female CAs and an ASR system trained on speech collected from male CAs.
5. An ASR system trained on speech collected from CAs with demographics similar to that of a CA providing revoiced audio. Demographics may include one or more of gender, spoken language, accent, geographic region, area code of cell phone, age, and membership in a cluster where CAs are divided into groups using a clustering method such as k-means.
6. An ASR system using one or more models selected to increase performance for a CA providing revoiced audio. For example, if the highest ASR accuracy is obtained with an acoustic model trained on CAs from a particular geographic location, then an acoustic model trained on speech from that location may be used.
7. An ASR system using one or more models selected to increase performance on the current communication session. For example, if the communication session topic pertains to setting up an appointment, then a language model trained on communication sessions where people make appointments may be used by one or more of the ASR systems. Additionally or alternatively, the ASR systems may be configured or selected in response to audio or speaker characteristics such as communication session volume, noise level, speaker clarity, speaker demographic (e.g. age, gender, status as a child or minor, accent, speech or hearing impairment, etc.), or information from previous communication sessions including the speaker.
8. A first ASR system trained on communication session data from the captioning service and a second ASR system trained on data outside the captioning service.

Additionally or alternatively, an ASR system running on a device providing the audio to the transcription unit 3714 or another device may be used to create a transcription. In these and other embodiments, the transcription may be used alone, it may be fused with transcriptions from one or more ASR systems 3720, or it may be used in multiple configurations at different times in response to estimated accuracy, difficulty of transcribing a given audio stream, network connectivity, availability of transcription units, and other factors such as the features listed in Table 2 and Table 5.

In some embodiments, the transcription unit 3714 may include a first text editor 3726*a* and a second text editor 3726*b*. The first text editor 3726*a* may be configured to display the transcription from the ASR system 3720*d* and obtain edits from a CA for the transcription from the ASR system 3720*d*. The second text editor 3726*b* may be configured to display the fused transcription and obtain edits from a CA for the fused transcription. The CA that may use the first and second text editors 3726*a* and 3726*b* may be the same or different.

In some embodiments, the bandwidth and sample resolution of the input signals to the ASR systems 3720 may be different and may vary, depending on the communication session. For example, when the audio passes through a telephone network, the audio may be sampled at 8 kHz with a resolution of eight bits with μ-Law encoding. In response to this encoding, one or more of the ASR systems 3720, for example the ASR systems 3720*e-g*, may run models trained using input audio sampled at 8 kHz with μ-Law encoding. In these and other embodiments, the ASR systems 3720*a-d* that may obtain the revoiced audio may use models trained on speech sampled at a higher sampling rate, such as at 16 kHz, and at a higher sampling resolution, such as 16-bit linear. In some embodiments, audio from a communication network may use other sampling and encoding methods such as a 16 kHz sampling rate, a 16-bit sample encoding, wideband audio, wideband voice, ITU standard G.722, HD Voice, MP3, AMR-WB, codecs used for VoIP and videoconferencing, etc. In these and other embodiments, a determination may be made regarding the audio quality and one or more ASR systems 3720 may be configured in response to the determined audio quality. Additionally or alternatively, a first one of the ASR systems 3720 may be configured for audio sampled and encoded in a first format and a second one of the ASR systems 3720 may be configured for audio sampled and encoded in a second format. Additionally or alternatively, audio in a first format may be converted to a second format and presented to an ASR system 3720 configured for the second format. For example, wideband audio may be downsampled to 8 kHz and processed by an ASR system 3720 configured to recognize 8 kHz speech.

In some embodiments, audio may be transmitted to the audio interface 3718 and the ASR systems 3720e-g substantially at the same quality level in which it is received. Additionally or alternatively, audio may be processed by speech enhancer 3702a-d, collectively speech enhancers 3702, that may be configured to improve performance of the ASR systems 3720. The speech enhancers 3702 may be configured to perform one or more of the following:

1. Noise reduction.
2. Bandwidth extension. For example, a 4 kHz bandwidth telephone signal may be converted to a wideband (e.g., 8 kHz) signal so it is easier for the ASR systems 3720 to understand.
3. Spectral filtering.
4. Loudness compression or automatic gain control (i.e., increasing loudness of quiet segments relative to that of loud segments). Additionally or alternatively, the speech enhancers 3702 may increase the gain for quiet speakers relative to loud speakers.
5. Non-uniform or varying amplification such as amplifying consonants more than vowels.
6. Processing speech to make it more intelligible.
7. Speech normalization, which is transforming a speaker's voice quality to a voice quality more similar to a selected group of speakers. Transformation may include accent reduction, gender normalization, or removal or alteration of other speaker characteristics.
8. Altering the audio characteristics of one party's voice, such as the subscriber's voice, compared to another party's voice such as the transcription party's voice, or vice-versa, so that the CA has an audible indication of which party is speaking. For example, a tone or other audio marker may be added to one communication session audio signal (such as the subscriber's audio signal) or at the point where the subscriber stops speaking and the transcription party starts speaking and vice versa. In some embodiments, the audio indication may appear in only one ear of a CA headset. Additionally or alternatively, one party's audio signal may appear with echo, reverberation, distortion, altered pitch, or spectral shaping.
9. Altering speech rate. This may include (a) slowing down speech, (b) speeding up speech or reducing the duration of silence portions, (c) slowing down speech segments where the speaker is talking quickly and speeding up segments where the speaker is talking slowly, and (d) varying speech rate dynamically so that it is easier to understand or easier to transcribe. In some embodiments, speech may be slowed down when a CA begins to fall behind so that the audio is more closely aligned with the point in time where the CA is revoicing and then speeding up the signal (including cutting silence) at a later point in time to catch up to real-time. Alternatively or additionally, altering the speech rate may include skipping part of the audio played to a CA when the speech enhancer 3702 detects that a CA is behind and inserting text into the transcription that is generated by an ASR system processing the skipped audio.
10. Separating a signal with multiple voices into a multichannel signal where various voices are placed at different points in a sound field (see FIG. 35) or directed to different ASR systems 3720. This way, a CA may more easily discern who is speaking by their apparent location. The multiple voices may be from multiple speakers using the same calling device such as a group of people using the transcription party device, or it may be speakers on separate lines such as the different parties of a communication session.
11. Noise cancelling for ambient audio interference presented to a first CA based on a signal collected by audio interface 3718 for the first CA and/or for at least a second CA. In some embodiments, one or more signals may be captured by a microphone used by the first CA and/or by microphones used by one or more CAs in physical proximity to the first CA. Additionally or alternatively, signals may be collected by additional microphones, such as microphones attached to a CA headset. The signal or signals may be processed by one or more adaptive filters, combined, inverted, and broadcast to the first CA to cancel ambient interference arriving at the first CA's ears via an acoustic path (e.g. through the air). Additionally or alternatively, the audio interface 3718 may include noise cancelling headphones.

In some embodiments, when the audio is part of a communication session, the speech enhancers 3702 may use a number of different methods to automatically determine which party of the communication session (e.g., the subscriber who may be hearing-impaired, and the transcription party, who may also be hearing-impaired) is speaking, including comparing the relative energy levels of the subscriber's audio signal and the transcription party's audio signal, and using voiceprints to distinguish between voices on the same channel. For example, on a two-way communication session or conference communication session, the audio of the speaking party may be identified for the CA using visual and/or audio indicators. Additionally or alternatively, the transcription unit 3714 may also send indicators to a user device so that the user device can display speaker information such as "New speaker:" or "Female Speaker:" or "Party 3:" to the subscriber. Such indicators may also be sent to the CA by, for example, providing a panel light, a lit region on the CA screen, or a displayed text advisement to notify the CA which speaker is talking and when the speaker changes. The visual indicator may be a signal for the CA to resume revoicing. For example, a region of the screen may dim or change color when the subscriber is speaking, and it is unnecessary for the CA to revoice the audio, then brighten when the user speaks for which a transcription may be generated. While a party is speaking that the CA may not revoice, one or more of the ASR systems 3720 may caption the party and display a transcription or summary to the CA so that the CA is updated on the conversation context.

In some embodiments, during the time when a CA is not revoicing or providing input to correct a transcription, the CA client software may give the CA alternate tasks to perform. For example, a group of one or more transcription units may provide multiple services such as:

1. transcribing communication sessions for communication devices;
2. transcribing recorded audio such as lectures, phone communication sessions, and medical or legal records;
3. transcribing audio from a video;
4. transcribing conference communication sessions;
5. labeling data such as training data for training ASR and other models;
6. labeling or analyzing data for contact center or call center analytics;

7. initiating telemarketing communication sessions;
8. receiving customer support communication sessions where the CA talks to the caller;
9. performing data entry;
10. language translation;
11. phone surveys;
12. generating data;
13. selling or providing customer support for a captioning service;
14. recording audio data, for example, by reading a script aloud and recording the voice sample; or
15. A CA revoices audio data as the CA's voice sample is recorded.

One implementation of the last item (recording revoiced audio) may include the steps of:
1. A set of one or more audio samples may be created. The audio may be obtained from recruited subjects speaking according to a set of instructions, audio generated by a text-to-speech synthesizer, recordings from callers using a transcription service, or voice samples collected from users of another type of service.
2. In one scenario, an audio sample may be transcribed to create a corresponding transcription after it is recorded. In another scenario, a human reader or a text-to-speech synthesizer may read a transcription to create a corresponding audio sample.
3. A check may be made to determine if a CA is available. When a CA is available, a first audio sample may be played to the CA for revoicing.
4. The CA may revoice the first audio sample to create a second audio sample.
5. The second audio sample may be recorded.
6. The second audio sample may optionally be used to test CA performance or to provide a transcription service such as a transcription service.
7. The second audio sample and a corresponding transcription, optionally in combination with other audio samples and transcriptions similarly obtained from other CAs, may be used to train one or more models such as an acoustic model or punctuation model.
8. A model built from the second audio sample may be used by an ASR system to recognize speech from one or more CAs, including a CA other than the one who provided the second audio sample.

The method of using revoiced audio from a CA to train models may be combined with CA accuracy testing or another quality assurance process, including methods for testing CAs described herein so that the same activity (e.g., the CA speaking) may serve multiple purposes. For example, the results (creating a voice sample and a transcription) from playing an audio sample to a CA may be used both for training models and for testing accuracy. When a CA is working on alternate tasks, a visual display related to the alternate task may obscure at least part of the captioning screen when active, then it may disappear when it is time for the CA to resume captioning.

Modifications, additions, or omissions may be made to the transcription unit 3714 without departing from the scope of the present disclosure. For example, the transcription unit 3714 may include a single speech enhancer 3702 that may provide audio to the audio interface 3718 and the ASR systems 3720e-g. Additionally or alternatively, the speech enhancers 3702 may be provided for the non-revoicing ASR systems but not for the revoicing ASR systems.

Figure 38:
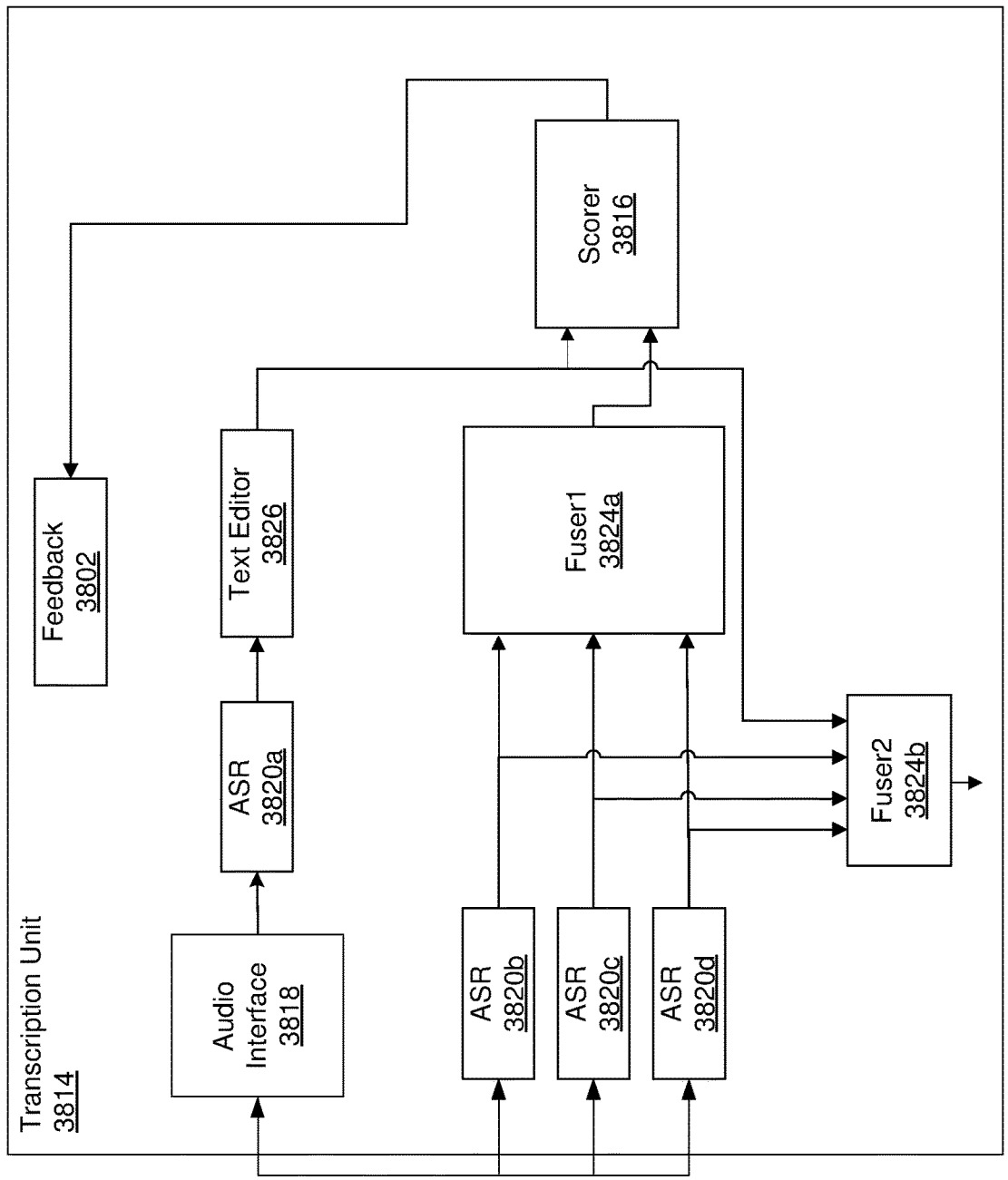
FIG. 38 illustrates another example transcription unit.

FIG. 38 illustrates another example transcription unit 3814, in accordance with some embodiments of the present disclosure. In some embodiments, an audio interface 3818 may obtain audio, provide the audio to a CA, and obtain revoiced audio. The revoiced audio may be provided to the ASR system 3820a. The ASR system 3820a may be a speaker-dependent ASR system with respect to the CA and configured to generate a revoiced transcription. The revoiced transcription may be provided to a text editor 3826. The text editor 3826 may obtain edits from the CA and apply the edits to the revoiced transcription. The output of the text editor 3826 may be provided to a scorer 3816. Alternatively or additionally, the output of the ASR system 3820a may be provided to the scorer 3816 and a second fuser 3824b and not provided to the text editor 3826.

The audio may also be provided to ASR systems 3820b-d, which each may be configured to generate a transcription. The transcriptions may be provided to a first fuser 3824a and the second fuser 3824b, referred to collectively as the fusers 3824. The fusers 3824 may be configured to generate fused transcriptions based on the received transcriptions. In some embodiments, the output of the first fuser 3824a may be provided to the scorer 3816. In these and other embodiments, the output of the second fuser 3824b may be provided as the output transcription of the transcription unit 3814. Alternatively or additionally, the output of the text editor 3826 may be provided as the output transcription of the transcription unit 3814 and the transcription unit 3814 may not include the second fuser 3824b.

The transcription generated by the ASR system 3820a and the output of the first fuser 3824a may be compared by the scorer 3816. Since the fused transcription may contain errors, the scorer 3816 may use other features or provide a constant correction factor as discussed with respect to FIG. 23. The scorer 3816 may determine an estimated accuracy, error rate, or other performance metric for the ASR system 3820a.

In some embodiments, the output of the scorer 3816 may be provided as feedback 3802 to the CA. Additionally or alternatively, outputs of the scorer 3816 may be incorporated into reports, messages to CA management, and processes to improve transcription unit selection methods or methods to select between using revoiced or non-revoiced audio. Multiple types of reports and alerts may be generated. For example, a first report may be created to provide feedback to a CA for information and learning purposes and a second report may be created that may affect the CA's employment, compensation, or status. In these and other embodiments, the output of the scorer 3816 may be used for one or more of the examples listed in Table 13.

TABLE 13

| | |
|---|---|
| 1. | Provide feedback to the CA. This may be immediate, such as with a warning that the transcription may be incorrect, or it may be compiled into a periodic report. |
| 2. | If the reference disagrees with the CA, it may warn the CA about a suspect word or phrase. |
| 3. | The feedback step may create a pop-up to alert the CA of a potential error, provide alternatives derived from an ASR n-best list, WCN, or lattice, and allow the CA to ignore the alert, select one of the alternatives, or enter new text. |
| 4. | The feedback step may highlight or otherwise mark suspect words or phrases and allow the CA to make a correction. If the CA clicks or hovers over a marked word, alternative suggestions may appear. |
| 5. | Feedback may appear as annotations in the text editor 3826. |

Modifications, additions, or omissions may be made to the transcription unit 3814 without departing from the scope of the present disclosure. For example, the transcription unit 3814 may not include the ASR systems 3820c and 3820d. In these and other embodiments, the first fuser 3824a may be omitted. The scorer 3816 may be configured, in this example, to compensate for errors committed by the ASR system 3820*b* in determining CA performance.

Figure 39:
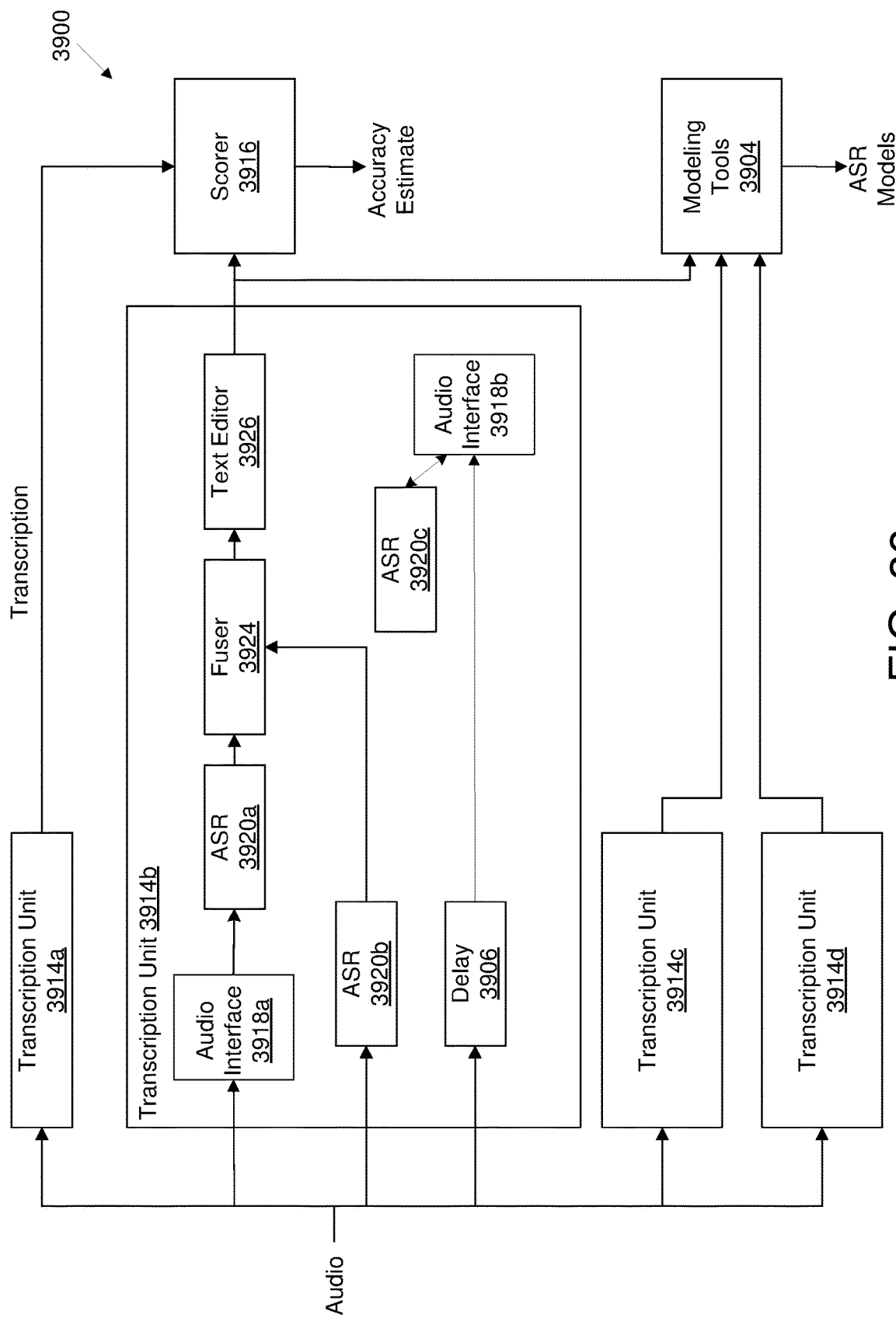
FIG. 39 illustrates an example environment for transcription generation.

FIG. 39 illustrates an example environment 3900 for transcription generation, in accordance with some embodiments of the present disclosure. In some embodiments, the environment 3900 may include four transcription units 3914*a-d*, collectively the transcription units 3914. The transcription units 3914*b-d* may be configured in a manner to provide higher accuracy transcriptions than the transcription unit 3914*a*. In these and other embodiments, the components of the transcription unit 3914*b* are illustrated. Transcription units 3914*c* and 3914*d* may be configured in a similar manner or a different manner that provides higher accuracy than the transcription unit 3914*a*. In general, the output of a higher-accuracy transcription unit, such as the transcription units 3914*b-d*, may be used, as will be described below, for accuracy estimates, providing transcriptions to a user's device, and for training ASR models.

In some embodiments, the transcription generated by the transcription unit 3914*b* may be compared to the transcription generated by the transcription unit 3914*a* by the scorer 3916 to estimate accuracy of the transcription unit 3914*a*. Additionally or alternatively, the transcription generated by the transcription unit 3914*b* may be used to provide transcriptions to user devices in certain situations including:
1. High-priority communication sessions or for subscribers receiving premium service;
2. Difficult communication sessions, as determined by an estimated error rate, detected accent, speaker demographics (e.g., elderly, child, legal minor, speech or hearing impairments), assessment of the speaker's voice clarity, automatic detection of the spoken language, estimated topic difficulty such as a conversation on a specialized topic, measurement of signal quality such as noise level or distortion, or other factors automatically detected; and
3. Communication sessions where extra CAs are available to provide revoiced audio.

In some embodiments, the transcriptions of the transcription units 3914*b-d* may be provided to modeling tools 3904. The modeling tools 3904 may be configured to train ASR models. In some embodiments, ASR models may be built or adapted in real-time (i.e., "on-the-fly"), meaning that ASR system models are trained on non-stored production data (e.g., communication session audio and/or generated transcriptions). Additionally or alternatively, ASR models may be built from pre-recorded data such as recorded transcriptions from transcription units 3914*b-d*.

As illustrated, the transcription unit 3914*b* may include a first audio interface 3918*a*, a first speaker-dependent ASR system 3920*a*, a second speaker-independent ASR system 3920*b*, a fuser 3024, a second audio interface 3918*b*, and a text editor 3926, which may receive input from a second CA different from the CA that provides the revoiced audio to the first audio interface 3918*a*. Alternatively or additionally, the transcription unit 3914*b* may include a third speaker-dependent ASR system 3920*c* that may include models based on the second CA. The first audio interface 3918*a* may obtain the audio, broadcast the audio to the first CA, and obtain revoiced audio. The first audio interface 3918*a* may provide the revoiced audio the first speaker-dependent ASR system 3920*a* that may generate a revoiced transcription of the revoiced audio and provide the revoiced transcription to the fuser 3924. The second speaker-independent ASR system 3920*b* may also provide a transcription to the fuser 3924 based on the audio. The transcription and the revoiced transcription may be fused by the fuser 3924 to create a first fused transcription.

In some embodiments, the second audio interface 3918*b* may be configured to provide the audio to the second CA. The text editor 3926 may be configured to present the fused transcription to the second CA and obtain edits to the fused transcription from the second CA. The second CA may use a keyboard, mouse, and other computer interface devices, including the third speaker-dependent ASR system 3920*c* configured to understand voice commands and/or transcribe revoiced audio. Fused transcriptions with corrections from the text editor 3926 may be denoted as higher-accuracy transcriptions.

In some embodiments, the audio provided by the second audio interface 3918*b* to the second CA may be delayed by a delay 3906 so that portions of the fused transcription are visible via the text editor 3926 approximately at the time the second audio interface 3918*b* broadcasts the corresponding audio.

In some embodiments, the delay 3906 may be configured to speed up or slow down speech that is sent to the second audio interface 3918*b*, depending on where edits are being performed on the fused transcription in the text editor 3926. For example, when a word or phrase is selected for editing and/or when editing starts generally, the delay 3906 may be adjusted such that the second audio interface 3918*b* plays audio corresponding to the word or phrase. In some embodiments, the second audio interface 3918*b* may rewind audio. In these and other embodiments, audio may subsequently be sped up by the delay 3906 to compensate for the lost time. In some embodiments, the second audio interface 3918*b* may rewind audio based on inputs from the second CA using a voice command, click or key press, knob, or foot pedal, among other inputs.

In some embodiments, the delay 3906 may be configured to change a speech rate in the audio by changing the duration of silence segments between speech segments. In some embodiments, silence segments may be located using energy-based voice activity detection. Additionally or alternatively, silence segments may be located using an ASR system that identifies and reports word endpoints (the time of onset and offset) as the ASR system reports the words recognized.

The transcription unit 3914*a* may be configured to provide a hypothesis transcription to the scorer 3916. In some embodiments, the scorer 3916 may compare the hypothesis transcription to the output of the transcription unit 3914*b* to generate an accuracy estimate. The estimate may be used, for example to give the CA feedback or to benchmark average performance of the transcription unit 3914*a*.

In some embodiments, the transcription units 3914*b-d* may be used to provide transcriptions to modeling tools 3904. The modeling tools 3904 may generate language models, acoustic models, pronunciation models, and other types of ASR and machine learning models used in captioning.

The transcription unit 3914*b* may also be used to provide transcriptions to user devices for presentation to subscribers. For example, suppose an accuracy estimator determines that a revoicing transcription unit associated with a first CA is struggling to transcribe speech that is, for example, fast, difficult, or accented. One solution is to transfer the communication session to a different transcription unit that is associated with a second CA with more appropriate skills. Another option is to use the transcription unit 3914*b* configuration. The transcription unit 3914*b* configuration may use the first CA and a second CA to correct the text. Another option is to transfer the communication session to a transcription unit configured as the transcription unit 3914b that is associated with new CAs that interface with the transcription unit as illustrated.

Modifications, additions, or omissions may be made to the environment 3900 without departing from the scope of the present disclosure. For example, the environment 3900 may include more transcription units or fewer transcription units than illustrated.

FIG. 40 illustrates an example environment 4000 that includes a multiple input ASR system 4002, in accordance with some embodiments of the present disclosure. The multiple input ASR system 4002 may be configured to process multiple audio inputs. The multiple audio inputs may include received audio and revoiced audio. The received audio may be non-revoiced audio. As illustrated, the multiple audio inputs include audio and revoiced audio from each of three audio interfaces 4018a-c, collectively audio interfaces 4108. The multiple input ASR system 4002 may combine information from the multiple audio streams to create a transcription. The transcription may be used to provide transcriptions to a user device and for use with other methods such as those in Tables 12 and 14.

In some embodiments, the multiple input ASR system 4002 may compare acoustic evidence from the revoiced audio with the received audio and in generating a transcription, may consider factors such as estimated non-revoiced ASR performance with respect to the audio, estimated revoiced ASR performance with respect to the audio, and indicators that the revoiced audio is silent when the audio includes words and/or a CA generating the revoiced audio may be distracted as the CA is making corrections to the transcription.

Although FIG. 40 is illustrated with three audio interfaces 4018 that each interface with a different CA, it is contemplated that there may be more or less than three audio interfaces 4018. Alternatively or additionally, the audio from the audio interfaces 4018 and not the regular audio may be input to the multiple input ASR system 4002. In some embodiments, inputs to the multiple input ASR system 4002 may include multiple versions of revoiced and regular audio, where each version may differ from other versions in terms of audio quality, delay, or in other respects. For example, the regular audio may be sampled at 8 kHz with 8-bits of resolution and compressed (e.g., using mu-Law encoding) and the revoiced audio may be sampled at 16 kHz with 16 bits of resolution and no compression. As a result, in some embodiments, sampling rates, resolution, and compression for the audio obtained by the multiple input ASR system 4002 and provided to a joint processor 4010 may be different.

In some embodiments, the multiple input ASR system 4002 may be configured to receive input from the audio interfaces 4018 and from the regular audio. The multiple input ASR system 4002 may include feature extractors 4004a and 4004b, collectively the feature extractors 4004, for extracting features from the revoiced audio and regular audio, respectively.

The outputs of the feature extractors 4004 may be communicated to the joint processor 4010. The joint processor 4010 may include components of an ASR system as described above with reference to FIG. 5, including to a feature transformer, probability calculator, rescorer, capitalizer, punctuator, and scorer, among others.

In some embodiments, the multiple input ASR system 4002 may be provided with an audio delay 4006. The audio delay may be configured to compensate for the revoiced audio and the regular audio arriving at the multiple input ASR system 4002 at different times. The audio delay 4006 may add a delay into one or both of the processing paths of the revoiced and regular audio to better synchronize the revoiced and regular audio. In some embodiments, the audio delay 4006 may be variable, responding to the relative latency between the two paths of the revoiced and regular audio. Alternatively or additionally, the audio delay 4006 may be fixed, such as based on the average relative latency.

Modifications, additions, or omissions may be made to the environment 4000 without departing from the scope of the present disclosure. For example, the audio delay 4006 is illustrated placed in the regular audio path before the feature extractors 4004, however, the audio delay 4006 may alternatively be placed after the feature extractors 4004. Alternatively or additionally, each audio input may include an audio delay in the audio or feature extraction path/output. In another example, the feature extractors 4004 are illustrated as separate from each other, one per audio input, but they may be combined into a single feature extractor with multiple audio inputs.

Figure 41:
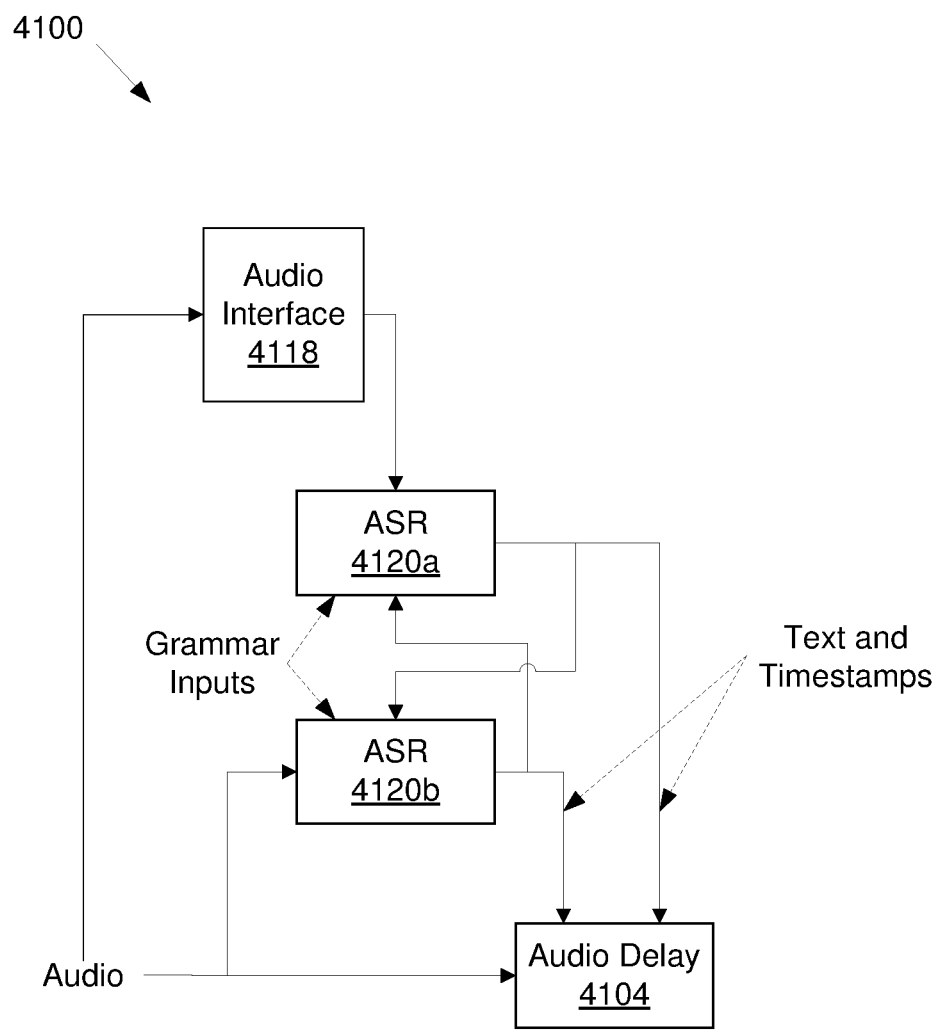
FIG. 41 illustrates an example environment for determining an audio delay.

FIG. 41 illustrates an example environment 4100 for determining an audio delay, in accordance with some embodiments of the present disclosure. The environment 4100 may include an ASR system 4120a and 4120b, collectively the ASR systems 4120. In some embodiments, audio is provided to an ASR system 4120b and an audio interface 4118. The audio interface 4118 may generate revoiced audio based on the audio in connection with a CA. The revoiced audio may be provided to an ASR system 4120a. The ASR systems 4120 may generate transcriptions based on the received audio and revoiced audio. The ASR system 4120 may mark endpoints for the beginning or ending of words in the transcriptions. The endpoints and the transcription may be provided to an audio delay 4104. The audio delay 4104 may align the two transcriptions and may use the relative positions of endpoints between the two transcriptions to determine a delay value between the revoiced audio and the regular audio. For example, if the ends of words transcribed by the ASR system 4120a are, on average, two seconds later than the corresponding ends of words transcribed by ASR system 4120b, then the delay may be set to two seconds.

The delay between the received audio and the revoiced audio may be compensated for by delaying the audio. Alternatively or additionally, the revoiced audio and the regular audio may be provided to another ASR system(s). In these and other embodiments, after features are extracted from the revoiced audio and the regular audio, the features may be delayed to align the transcriptions. Alternatively or additionally, the delay may be compensated for in other portions of the flow of an ASR system. In these and other embodiments, the ASR systems 4120 may be configured to operate in a reduced mode or less effectively than a subsequent ASR system as the ASR systems 4120 may be used to determine the delay between the regular audio and the revoiced audio. In these and other embodiments, the ASR system 4120 may provide other information, such as grammars, accuracy information, or other information to another ASR system that may generate a transcription that may be sent to a user device.

In some embodiments, the transcription generated by the ASR system 4120b may be used to provide a grammar input including, for example, a single phrase, to the ASR system 4120a so that the ASR system 4120a creates substantially the same transcription as the ASR system 4120b but with different endpoints. Additionally or alternatively, the grammar input to the ASR system 4120a from the ASR system 4120b may include an n-best list, WCN, lattice, word graph, or other format that allows the ASR system 4120a to select from among multiple options. In some embodiments and for reduced latency, the transcription output of the ASR system 4120b may be used to provide a grammar input to the ASR system 4120a.

Additionally or alternatively, the output of the ASR systems 4120 may be used to generate features for selectors, estimators, and classifiers. The text output of ASR systems 4120 may be compared to each other and/or to other ASR systems to determine agreement rates, which may serve as features, as described with reference to FIG. 21 and items #14-16 of Table 5. One or more confidence outputs of ASR systems 4120 may also be used as features. For example, a first ASR system may transcribe a first audio signal to create a first hypothesis. A second ASR system may transcribe a second audio signal using a grammar derived from the first hypothesis. The second ASR system may generate a phrase confidence score and/or confidence scores for individual words. The confidence scores may be used as features (see item #102, Table 5).

Modifications, additions, or omissions may be made to the environment 4100 without departing from the scope of the present disclosure. For example, the regular audio and the revoiced audio may be provided to a multiple input ASR system, such as the multiple input ASR system 4002 of FIG. 40.

Figure 42:
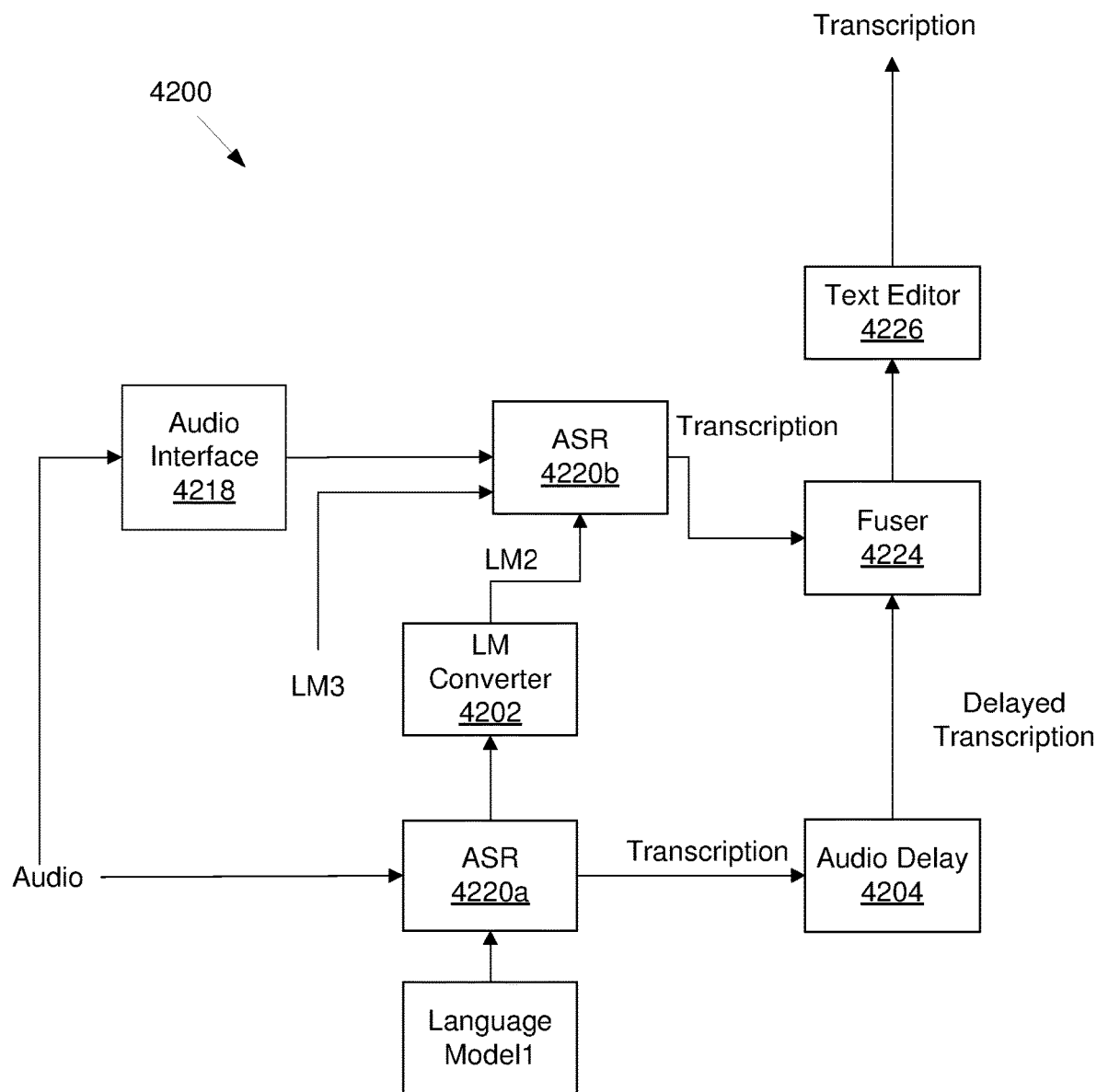
FIG. 42 illustrates an example environment where a first ASR system guides the results of a second ASR system.

FIG. 42 illustrates an example environment 4200 where a first ASR system 4220a guides the results of a second ASR system 4220b, in accordance with some embodiments of the present disclosure. In some embodiments, the first ASR system 4220a may transcribe audio to generate a first transcription. The first ASR system 4220a may also generate an output representing multiple hypotheses such as an n-best list, WCN, lattice, or word graph. The output may be converted by a Language Model (LM) converter 4202 to a grammar or second language model LM2.

The audio interface 4218 may provide revoiced audio based on the audio to the second ASR system 4220b. The second ASR system 4220b may use the second language model LM2 to transcribe the revoiced audio to generate a second transcription. The second ASR system 4220b may further use a third generic language model LM3 to create the second transcription.

In some embodiments, the second LM2 and third LM3 language models may be used by the second ASR system 4220b, for example, to: (a) interpolate both the second LM2 and third LM3 language models into an interpolated language model, (b) interpolate the second LM2 and third LM3 language models at runtime, or (c) to combine the second LM2 and third LM3 language models in a hierarchal language model configuration. Additionally or alternatively, the second transcription may be edited by a text editor 4226 and then sent to a user device.

In some embodiments, the first and second transcriptions may be aligned and fused by a fuser 4224 to create a fused transcription, edited by the text editor 4226, and sent to a user device. The first transcription may be delayed by an audio delay 4204 to account for latency incurred by the audio interface 4218 and the second ASR system 4220b so that the first and second transcriptions arrive at the fuser 4224 more closely aligned.

In some embodiments, the first ASR system 4220a may add new elements to the multiple hypotheses output over time as the first ASR system 4220a receives and decodes new audio. For example, as the first ASR system 4220a decodes new audio, the first ASR system 4220a may add new arcs to the lattice or word graph representation of the multiple hypotheses. In some embodiments, the first ASR system 4220a may add new elements to the multiple hypotheses in time periods that overlap with the second ASR system 4220b decoding the revoiced audio using the previous hypotheses. In some embodiments, new elements that the first ASR system 4220a adds to the multiple hypotheses may be added or appended to the second language model in real time. In these and other embodiments, the second ASR system 4220b may consider the new elements as possibilities in constructing the second transcription. Sufficient delay may be inserted in the path from audio through generating the transcription by the second ASR system 4220b to give the second ASR system 4220b time to receive and incorporate the updated second language model by the time the corresponding revoiced audio arrives.

An example implementation of the environment 4200 is now provided. The first ASR system 4220a may use a first language model to transcribe communication session audio into a first transcription and a multiple hypotheses output, such as in the form of a lattice. The LM converter 4202 may convert the multiple hypotheses output to a second language model. In some embodiments, if there is a preexisting second language model, elements of the multiple hypotheses may be combined with the second language model to modify the second language model. Additionally or alternatively, if there is a pre-existing second language model, it may be replaced with an updated language model.

In these and other embodiments, an audio interface 4218 may provide revoiced audio based on the audio to the second ASR system 4220b. The second ASR system 4220b may use the second language model to transcribe the revoiced audio to generate the second transcription. In some embodiments, the second ASR system 4220b may further use a third language model to generate the second transcription. The second transcription may be sent to a user device for display. In a variation on this step, the first and second transcriptions may be fused, then sent to the user device for display. Modifications, additions, or omissions may be made to the environment 4200 without departing from the scope of the present disclosure.

Figure 43:
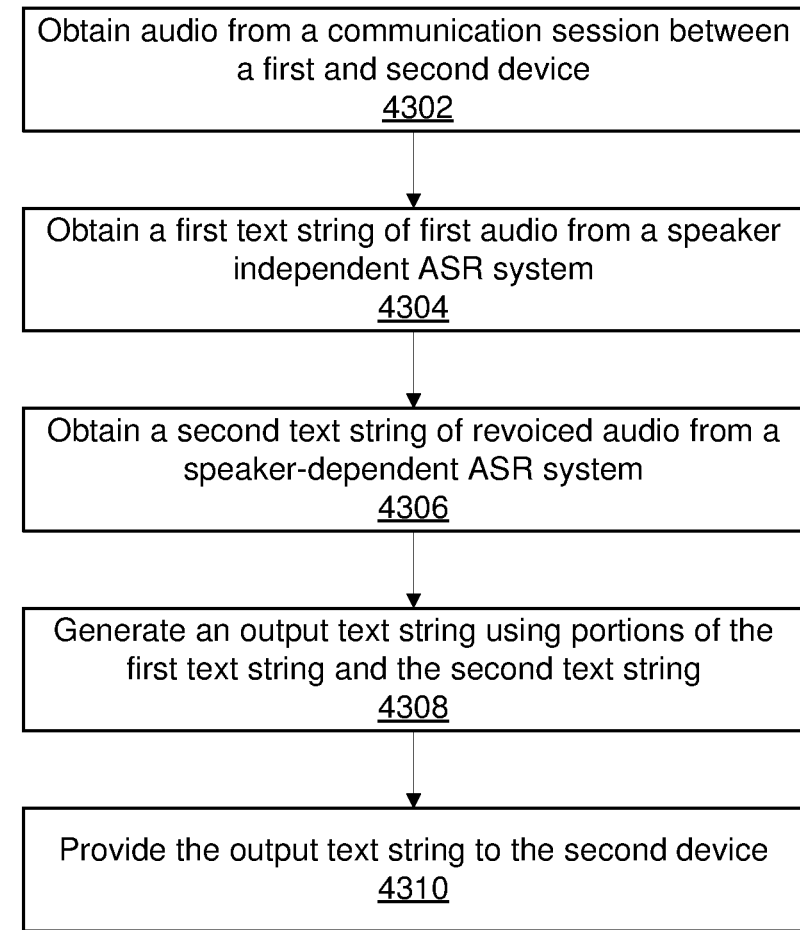
FIG. 43 is a flowchart of another example method of fusing transcriptions.

FIG. 43 is a flowchart of another example method 4300 of fusing transcriptions in accordance with embodiments of the present disclosure. The method 4300 may be arranged in accordance with at least one embodiment described in the present disclosure. The method 4300 may be performed, in some embodiments, by processing logic that may include hardware (circuitry, dedicated logic, etc.), software (such as is run on a general-purpose computer system or a dedicated machine), or a combination of both. In some embodiments, the method may be performed by the fuser 124 of FIG. 1 among other fusers described in this disclosure. In these and other embodiments, the method 4300 may be performed based on the execution of instructions stored on one or more non-transitory computer-readable media. Although illustrated as discrete blocks, various blocks may be divided into additional blocks, combined into fewer blocks, or eliminated, depending on the desired implementation.

The method 4300 may begin at block 4302, where first audio data originating at a first device during a communication session between the first device and a second device may be obtained. In some embodiments, the communication session may be configured for verbal communication such that the first audio data includes speech.

At block 4304, a first text string that is a transcription of the first audio data may be obtained. In some embodiments, the first text string may be generated by a first automatic speech recognition engine using the first audio data and using a first model trained for multiple individuals. In these and other embodiments, the first model may include one or more of the following: a feature model, a transform model, an acoustic model, a language model, and a pronunciation model.

At block 4306, a second text string that is a transcription of second audio data may be obtained. In some embodiments, the second audio data may include a revoicing of the first audio data by a captioning assistant. In these and other embodiments, the second text string may be generated by a second automatic speech recognition engine using the second audio data and using a second model trained for the captioning assistant.

At block 4308, an output text string from the first text string and the second text string may be generated. In some embodiments, the output text string may include one or more first words from the first text string and one or more second words from the second text string. In some embodiments, generating the output text string may further include denormalizing the first text string and the second text string, aligning the first text string and the second text string, and comparing the aligned and denormalized first and second text strings.

In some embodiments, generating the output text string may further include selecting the one or more second words based on the first text string and the second text string both including the one or more second words and selecting the one or more first words from the first text string based on the second text string not including the one or more first words.

At block 4310 the output text string may be provided as a transcription of the speech to the second device for presentation during the communication session concurrently with the presentation of the first audio data by the second device.

Modifications, additions, or omissions may be made to the method 4300 without departing from the scope of the present disclosure. For example, the operations of method 4300 may be implemented in differing order. Additionally or alternatively, two or more operations may be performed at the same time. Furthermore, the outlined operations and actions are only provided as examples, and some of the operations and actions may be optional, combined into fewer operations and actions, or expanded into additional operations and actions without detracting from the essence of the disclosed embodiments.

For example, in some embodiments, the method 4300 may include correcting at least one word in one or more of: the output text string, the first text string, and the second text string based on input obtained from a device associated with the captioning assistant. In these and other embodiments, the input obtained from the device may be based on a third text string generated by the first automatic speech recognition engine using the first audio data. In some embodiments, the first text string and the third text string may both be hypothesis generated by the first automatic speech recognition engine for the same portion of the first audio data.

In some embodiments, the method 4300 may further include obtaining a third text string that is a transcription of the first audio data or the second audio data. In these and other embodiments, the third text string may be generated by a third automatic speech recognition engine using a third model. In these and other embodiments, the output text string may be generated from the first text string, the second text string, and the third text string.

In some embodiments, the third text string may be a transcription of the first audio data. In these and other embodiments, the method 4300 may further include obtaining a fourth text string that is a transcription of the second audio data. In these and other embodiments, the fourth text string may be generated by a fourth automatic speech recognition engine using the second audio data and using a fourth model. In these and other embodiments, the output text string may be generated from the first text string, the second text string, the third text string, and the fourth text string.

In some embodiments, the method 4300 may further include obtaining third audio data that includes speech and that originates at the first device during the communication session and obtaining a third text string that is a transcription of the third audio data. In these and other embodiments, the third text string may be generated by the first automatic speech recognition engine using the third audio data and using the first model. The method 4300 may further include in response to either no revoicing of the third audio data or a fourth transcription generated using the second automatic speech recognition engine having a quality measure below a quality threshold, generating an output text string using only the third text string.

In some embodiments, the accuracy of transcriptions generated by transcription units may be measured. For example, the accuracy of transcriptions generated by a single revoiced transcription unit, a non-revoiced transcription unit, or a group of transcription units may be measured. Alternatively or additionally, the accuracy may be measured for benchmarking accuracy of one or more transcription units. In these and other embodiments, the accuracy of transcriptions may be measured in real-time production of the transcriptions without relying on recording, saving or offline transcription of audio. FIGS. 44-59 illustrate various embodiments that discuss systems and methods that may be used to measure the accuracy of transcriptions.

FIGS. 44-55, among others, describe various systems and methods that may be used to determine statistics with respect to transcriptions of audio generated by ASR systems. In some embodiments, the statistics may include errors, including error types; accuracy, error rate; confidence scores; among other types of statistics. In some embodiments, the statistics may be generated by comparing a reference transcription to a hypothesis transcription. In these and other embodiments, the reference transcriptions may be generated based on the generation of higher accuracy transcriptions as described in FIGS. 31-43. Alternatively or additionally, the statistics of the transcriptions may be generated in real-time without long-term recording of the audio.

Figure 44:
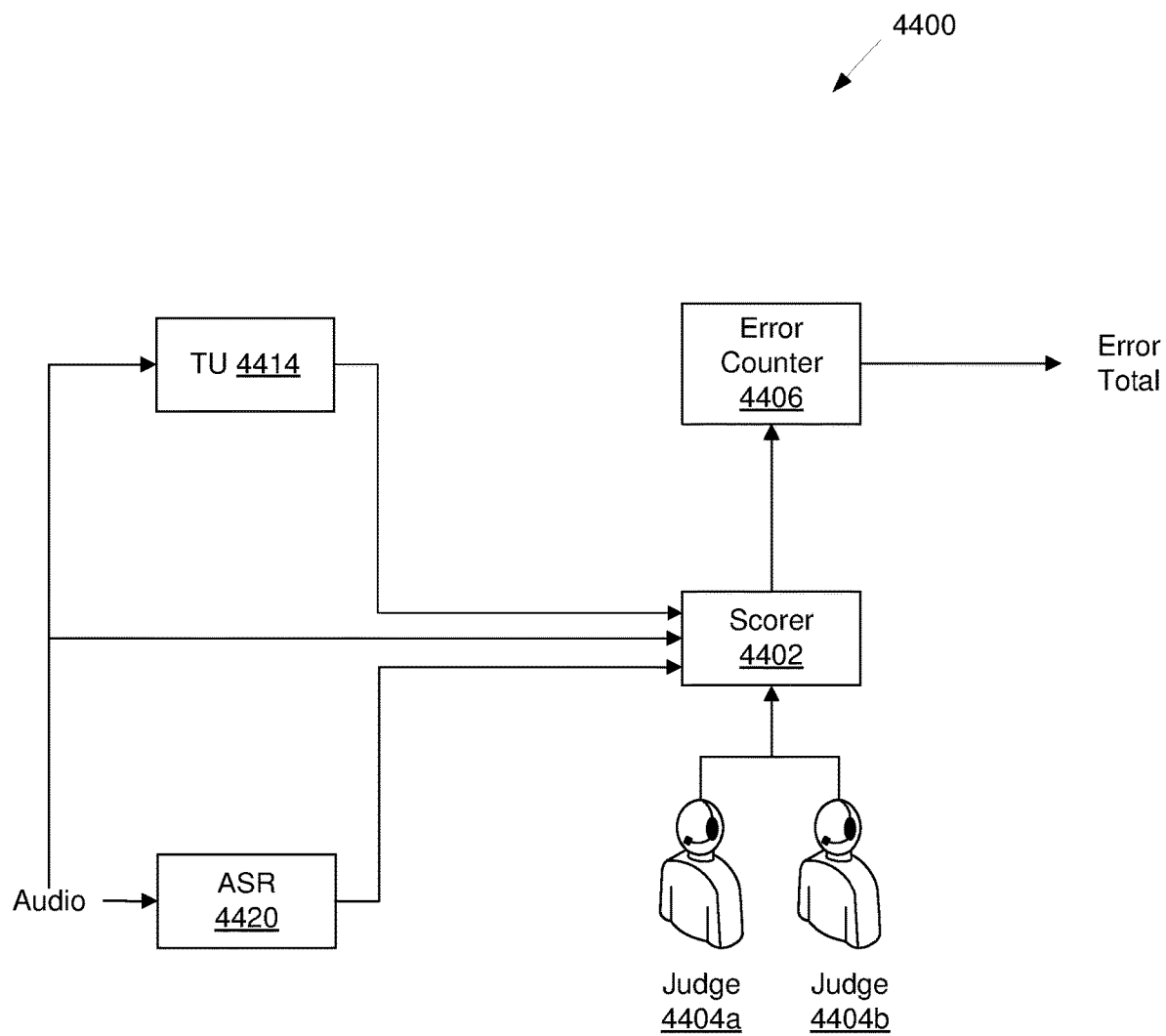
FIG. 44 illustrates an example environment for scoring a transcription unit.

FIG. 44 illustrates an example environment 4400 for scoring a transcription unit, in accordance with some embodiments of the present disclosure. In some embodiments, the environment 4400 may be configured to measure the accuracy of transcriptions of audio of a communication session generated by a transcription unit 4414 without capturing the audio of the communication session. In some embodiments, the transcription unit 4414 may be a revoiced transcription unit that obtains a revoicing of audio through a CA and generates a transcription based on the revoiced audio. Alternatively or additionally, the environment 4400 may also be used to measure accuracy of transcription for other transcription unit configurations.

In some embodiments, the output of the environment 4400 may include a total number of errors for a transcription, percentage of words that are errors, a count of each error type, a total number of words in a reference transcription, a total number of words in a non-reference transcription, a total number of words in a reference and non-reference transcription, an error rate, an accuracy percentage, a performance metric including one or more measurements such as ASR system accuracy, estimated transcription difficulty of the audio sample, or another performance metric such as capitalization accuracy and/or punctuation accuracy. The accuracy estimate, error output, or other performance metrics may be used to provide feedback to a CA, generate reports, and/or to benchmark average ASR system performance. Additionally or alternatively, the output of the environment may also be used, alone or in combination with one or more selectors, estimators, and classifiers, to generate a decision regarding selecting between transcription units, such as selecting between a revoiced or non-revoiced transcription unit. In these and other embodiments, a revoiced transcription unit may include one or more ASR systems that may use revoiced audio to generate a transcription. In these and other embodiments, the revoiced transcription unit may also include one or more ASR systems that may use regular audio to generate a transcription. In contrast, a non-revoiced transcription unit may not include any ASR systems that use revoiced audio to generate a transcription.

An ASR system 4420 may generate a transcription based on audio and provide the transcription to a scorer 4402. The transcription unit 4414 may generate a transcription based on revoicing of the audio and provide the transcription to scorer 4402. The scorer 4402 may also obtain the audio.

In some embodiments, the scorer 4402 may be configured to determine the accuracy of the transcriptions. The scorer 4402 may be configured to present the transcriptions to a first judge 4404*a* and a second judge 4404*b*, collectively, the judges 4404. The judges 4404 may be humans. The scorer 4402 may provide a graphical user interface configured to receive input from one or more of the judges 4404. Based on the input from the judges 4404, the scorer 4402 may determine a number of errors detected for each transcription.

In some embodiments, the judges 4404 may listen to the audio and review the transcriptions to identify errors. The judges may provide the identified errors to the scorer 4402. In these and other embodiments, each of the judges 4404 may review and score at least a portion of the various transcriptions.

In some embodiments, the scorer 4402 may be configured to provide an interface for the judges 4404 to transcribe at least part of the audio sample to create a reference transcription. In these and other embodiments, the scorer 4402 may be configured to allow the judge 4404 to rewind, skip, skip silence portions, jump to determined points in the audio, such as a point corresponding to a selected point in a draft transcription or a point in a displayed waveform indicated by a judge, slow down, speed up, fast forward, or replay portions of the audio in the transcription process.

In some embodiments, in response to a reference transcription being created, an automated scoring process, such as one or more of the systems described below with reference to FIGS. 55 and 56, may be used to compare the transcriptions from the transcription unit 4414 and/or the ASR system 4420 with the reference transcription to determine accuracy of the transcriptions from the transcription unit 4414 and/or the ASR system 4420. In some embodiments, the automated scoring process may create an error map to be used by the judges 4404. The scorer 4402 may enable the judges 4404 to examine and correct errors in the automated scoring process.

In some embodiments, the judges 4404 may listen to at least part of the audio and provide input with respect to errors in at least part of the transcriptions from the transcription unit 4414 and/or the ASR system 4420. For example, the judges 4404 may score substantially all of the transcriptions from the transcription unit 4414 and/or the ASR system 4420. Alternatively or additionally, the judges 4404 may score part of the transcriptions and leave another part of the transcriptions unscored.

In some embodiments, the scorer 4402 may provide an indication of the errors to an error counter 4406. The error counter 4406 may use the errors to determine an output of the environment 4400, such as one of the performance metrics discussed above.

In some embodiments, a selected time after the end of a communication session that is providing the audio, the audio and transcriptions of the audio may be deleted and scoring may be discontinued. In these and other embodiments, accuracy results of the transcription may be stored. In some embodiments, accuracy results may include the results of scoring one or more portions of the audio of the communication session and may exclude other portions of the audio.

In some embodiments, the scorer 4402 may not determine an accuracy of the transcription from the ASR system 4420. In these and other embodiments, the scorer 4402 may be configured to align the transcriptions from the ASR system 4420 and the transcription unit 4414. The scorer 4402 may use the transcription from the ASR system 4420 as a reference transcription that is compared to the transcription from the transcription unit 4414. The differences may be considered potential errors of the transcription from the transcription unit 4414 and may be flagged and presented to the judges 4404.

In these and other embodiments, the judges 4404 may mark or confirm errors by clicking on flagged errors. The judges 4404 may also select other errors, such as incorrect, inserted, or deleted words in the transcription. In these and other embodiments, the judges 4404 may rewind audio as needed to review the audio to confirm errors. Alternatively, judges 4404 may use voice commands, keyboards, or other forms of computer input to interact with the audio and/or transcriptions.

In some embodiments, the error counter 4406 may be configured to count errors marked or confirmed by the judges 4404. In these and other embodiments, the error counter 4406 may count all errors together or it may count errors separately. For example, the error counter 4406 may separately count deletion, insertion, and substitution errors. In some embodiments, following the termination of a communication session providing the audio or after a selected amount of time (a few seconds to a few minutes) after termination of the communication session, the scorer 4402 may delete all audio and/or text to protect the privacy of the participants in the communication session.

In some embodiments, the scorer 4402 and the judges 4404 may access a CA interface through a CA client of the transcription unit 4414 to obtain information for scoring. For example, a scoring GUI may use a remote desktop to connect to a CA client and allow a judge to listen to audio and/or the revoiced audio, view the screen being viewed by a CA, read the transcriptions generated by the speaker-dependent ASR system of the transcription unit 4414, and view edits provided by the CA. In these and other embodiments, the scoring GUI may also provide an interface for the judges 4404 to score the transcription.

Modifications, additions, or omissions may be made to the environment 4400 without departing from the scope of the present disclosure. For example, the environment 4400 may include denormalizers that may be configured to denormalize the transcriptions before the transcriptions are provided to the scorer 4402. Alternatively or additionally, the environment 4400 may not include the ASR system 4420. Alternatively or additionally, the environment 4400 may include one judge or more than two judges.

Figure 45:
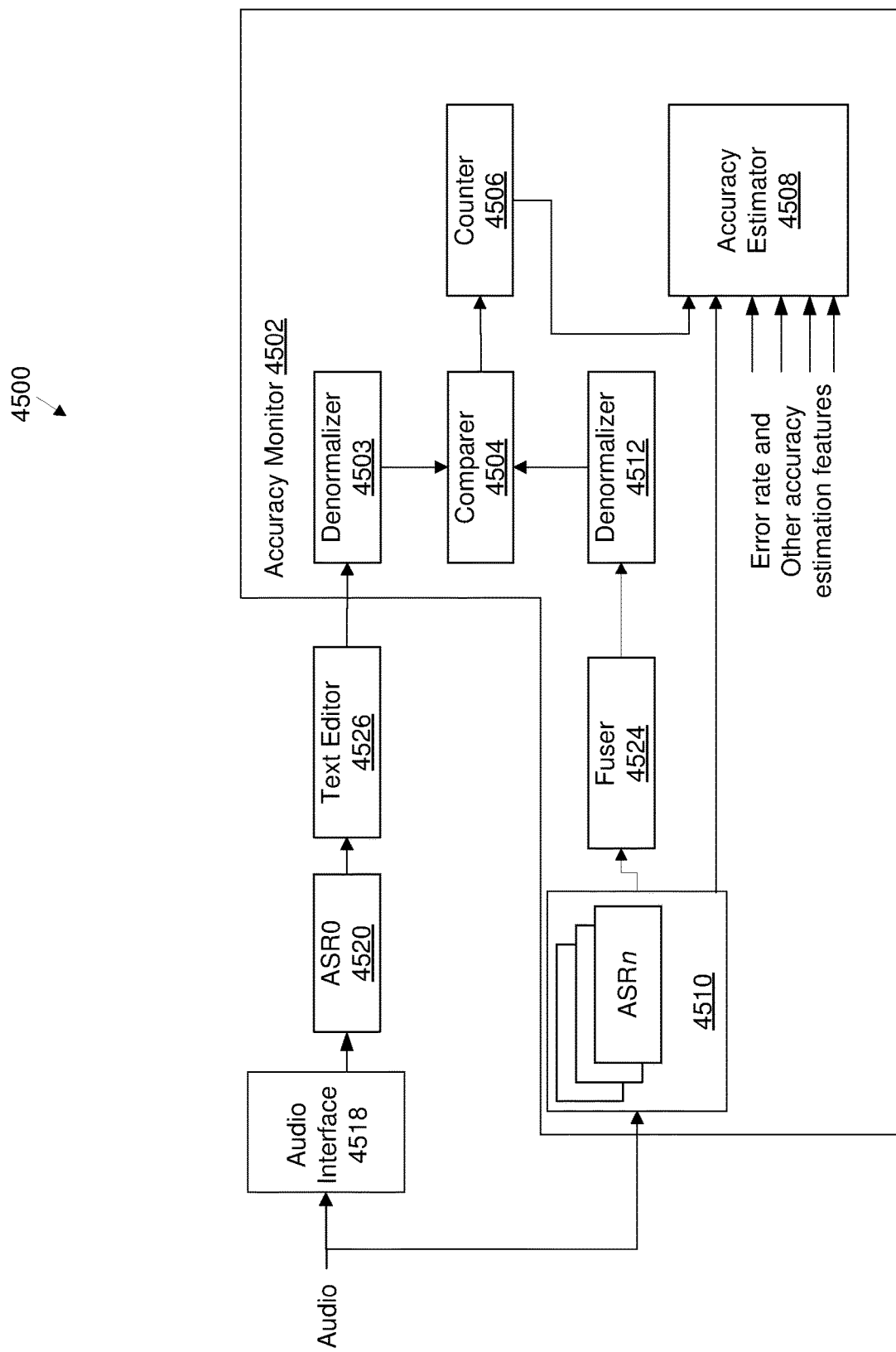
FIG. 45 illustrates another example environment for scoring a transcription unit.

FIG. 45 illustrates another example environment 4500 for scoring a transcription unit, in accordance with some embodiments of the present disclosure. In some embodiments, the depicted embodiment illustrates another embodiment for monitoring and measuring accuracy of a transcription.

In some embodiments, an audio interface 4518 may obtain audio and a revoicing of the audio from a CA. The audio interface 4518 may provide the revoiced audio to a speaker-dependent ASR system 4520 that may generate a transcription of the revoiced audio. In these and other embodiments, a text editor 4526 may obtain input from the CA and apply edits to the transcription. The edited transcription may be denormalized by a denormalizer 4503 and provided to a comparer 4504. The transcription may be referred to as a monitored transcription.

In some embodiments, an accuracy monitor 4502 may be provided and may include the denormalizer 4503, the comparer 4504, a counter 4506, a fuser 4524, an accuracy estimator 4508, a set 4510 of ASR systems, and a denormalizer 4512. Audio may also be received at the accuracy monitor 4502. Each of the ASR systems of the set 4510 may generate a transcription. Each of the transcriptions may be provided to the fuser 4524 for combination of the transcriptions to generate a fused transcription. The fused transcription may be denormalized by the denormalizer 4512 and the denormalized fused transcription, referred to as the reference transcription, may be provided to the comparer 4504.

In some embodiments, the comparer 4504 may be configured to compare the monitored transcription with the reference transcription. In these and other embodiments, the comparer 4504 may compare the monitored transcription with the reference transcription by determining an edit distance or Levenshtein distance there between. In some embodiments, the comparison process by the comparer 4504 may be implemented as follows: (1) the comparer 4504 may align the monitored transcription and the reference transcription; (2) the comparer 4504 may compare each aligned pair of tokens from the monitored transcription and the reference transcription. The pair of tokens may include a first token from the monitored transcription and a second token from the reference transcription; (3) the comparer 4504 may provide an indication, such as a match or no match with respect to each aligned pair of tokens, to the counter 4506. For example, the comparer 4504 may output a zero when a pair of tokens match and a one if there is no match between a pair of tokens; and (4) the number of differences are counted or averaged by the counter 4506 to determine an average disagreement rate, edit distance, and/or Levenshtein distance.

In some embodiments, the disagreement rate as determined by the counter 4506 may be used to estimate accuracy of the ASR system 4520 or, as illustrated, it may be combined with other features (see Table 2 and Table 5) by an accuracy estimator 4508 to estimate accuracy of the ASR system 4520. In these and other embodiments, the accuracy monitor 4502 may be configured to apply the same features to measuring agreement rates when the monitored transcription is generated using revoiced or non-revoiced audio. In some embodiments, a report may be generated that includes the output of the accuracy estimator 4508. For example, the report may be generated after each communication session, daily, weekly, etc.

The report, including the estimated accuracy of the revoiced ASR system 4520 generated by the accuracy monitor 4502, may be used for one or more of multiple purposes, including:

1. Advise a CA interfacing with the audio interface 4518 and the text editor 4526 on specific errors.
2. Alert the CA in real-time of a potential error so that the CA may correct the error. In these and other embodiments, the accuracy monitor 4502 may estimate a confidence value of certainty that the CA has made an error. If a confidence value exceeds a first threshold, the accuracy monitor 4502 may cause the text editor 4526 to highlight the potential error and may propose alternative words or phrases for the CA to select. If the confidence value exceeds a second threshold, the accuracy monitor 4502 may automatically correct the potential error, cause the text editor 4526 to display the correction, and provide a method for the CA to override the correction.
3. Advise the CA on quality measures such as accuracy or error rates for one or more communication sessions. The quality measure may be absolute (e.g., 89%), relative to the past performance of the transcriptions generated by the revoiced ASR system 4520 (e.g., "3% better than yesterday" or "2% below the best"), relative to other transcriptions generated by the revoiced ASR systems (e.g., "5% above the team average" or "3% below last week's top revoiced ASR system"), or it may include other statistics, such as statistics derived from the performance of the systems.
4. Present a visual and or audio instruction or assessment to the CA regarding performance. This instruction may be a motivational message such as "Good job!" "You can do better" or "The transcription scored 93% on that last communication session. That's your best today." The text, including non-numeric text, of the message may be responsive to the CA history and current performance.
5. Display a dial, thermometer, chart, or other graphics illustrating performance.

Modifications, additions, or omissions may be made to the environment 4500 without departing from the scope of the present disclosure. For example, the environment 4500 may not include the denormalizer 4512 when the fuser 4524 includes denormalizing capability. Alternatively or additionally, the set 4510 of ASR systems may be a single ASR system. In these and other embodiments, the set 4510 of ASR systems may not include the fuser 4524.

In some embodiments, the accuracy monitor 4502 may be configured with an adder on the output of the counter 4506 or that is part of the counter 4506. In these and other embodiments, the accuracy estimator 4508 may be configured to determine a correction factor to be added by the adder to the disagreement rate provided by the counter 4506. The correction factor may be used, for example, to refine the ASR accuracy estimate or to compensate for ASR and other errors in the accuracy monitor 4502.

As with other estimators described herein, the accuracy estimator 4508 may use input features such as a quality, accuracy, or a confidence measure reported by the ASR systems, historical revoicing and non-revoicing transcription accuracy, agreement rates between ASR systems, and other features described in Table 2 and Table 5. The accuracy estimator 4508 may also use methods such as DNNs, weighted sums, and other methods from Table 9. Additionally or alternatively, the accuracy estimator 4508 may also be very simple and just apply a constant correction factor to the disagreement rate.

Figure 46:
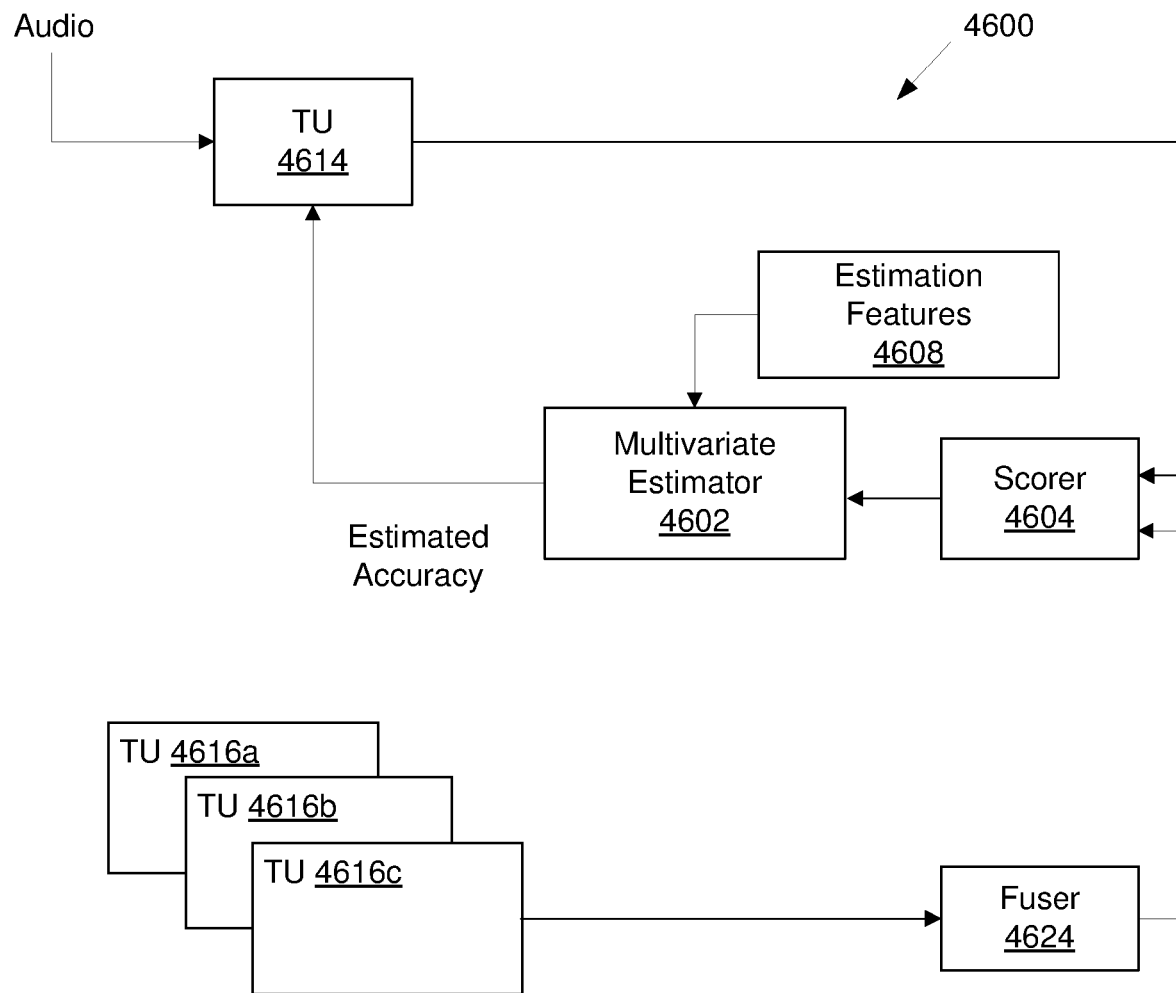
FIG. 46 illustrates an example environment for generating an estimated accuracy of a transcription.

FIG. 46 illustrates an example environment 4600 for generating an estimated accuracy of a transcription, in accordance with some embodiments of the present disclosure. The environment includes a group of transcription units 4616, including a first transcription unit 4616a, a second transcription unit 4616b, and a third transcription unit 4616c. The transcription units 4616 may be revoiced, non-revoiced, or a combination of revoiced and non-revoiced transcription units. Alternatively or additionally, each of the transcription units 4616 may be configured in a unique or a similar manner with respect to any configurations described in this disclosure. The transcription units 4616 may obtain audio and generate transcriptions that are provided to a fuser 4624. The fuser 4624 may combine the transcriptions to generate a fused transcription. The fused transcription may be a higher accuracy transcription than the output of one of the transcription units 4616.

The higher-accuracy transcription may be used in multiple ways including those enumerated in Table 12 and 13 and below in Table 14.

TABLE 14

| | |
|---|---|
| 1. | The higher-accuracy transcription may be stored, when legally allowed, together with audio and other data associated with the communication session. Stored data may then be used for purposes such as evaluation and training of CAs, quality assurance, accuracy benchmarking, and ASR modeling. |
| 2. | The higher-accuracy transcription may be used to train speech recognition models, including language models, acoustic models, capitalization models, punctuation models, and speaker adapted models. This arrangement and other fusion implementations described herein may be used to generate transcriptions for training models on-the-fly in cases where recording of production communication sessions is prohibited. |
| 3. | The higher-accuracy transcription may be sent as a transcription to a user device. The higher-accuracy transcription may be used for communication sessions that are otherwise challenging because of noise, accents, speech from a child, etc., or when the communication session has a higher-priority. |
| 4. | Transcriptions from other transcription units may be compared to the higher-accuracy transcription using one or more scorers. The resulting score may be used to evaluate the transcription units. |

A transcription unit 4614 may also be configured obtain the audio and to generate a transcription. The transcription unit 4614 may be a revoiced or non-revoiced transcription unit. Alternatively or additionally, the transcription unit 4614 may be configured in any manner described in this disclosure.

In some embodiments, the fused transcription from the fuser 4624 and the transcription from the transcription unit 4614 may be provided to a scorer 4604. The scorer 4604 may align and determine an estimated accuracy of the transcription from the transcription unit 4614. In some embodiments, the scorer determines an estimated accuracy based on an agreement rate between the two input transcriptions. The scorer 4604 may output the estimated accuracy to a multivariate estimator 4602. The multivariate estimator 4602 may include a neural network, linear estimator, or another form of estimator configured to use multiple inputs. The multivariate estimator 4602 may be configured to use estimation features 4608, such as those in Table 2 and Table 5, to refine the estimation accuracy from the scorer 4604. For example, the multivariate estimator 4602 may adjust the estimation accuracy based on estimation features associated with the transcription unit 4614, the transcription units 4616, and fuser 4624. For example, based on an accuracy of the fused transcription in the estimation features, the estimation accuracy of the transcription may be adjusted.

In some embodiments, the multivariate estimator 4602 may use an estimation model. The estimation model may be trained using, for example, one or more of the methods in Table 9. In some embodiments, an estimation model may be trained. For example, audio samples and values for features from Table 2 and Table 5 associated with the audio samples may be obtained. An error rate of a transcription unit, such as the transcription unit 4614, for each audio sample may be obtained. For each audio sample, values for features from Table 2 and Table 5 may be provided to a machine learning algorithm with the error rate associated with the sample, such that a model may be generated that is designed to estimate the error rate from the features. In these and other embodiments, the features of the transcription unit 4614 may be provided to the multivariate estimator 4602. The multivariate estimator 4602 may use the model to determine an estimated error rate based on an error rate of one or more transcription units, such as transcription units 4614a-c, features from fuser 4624, features of the transcription unit 4614, the estimated accuracy from the scorer 4604, and one or more other features such as features from Table 2 and Table 5.

Modifications, additions, or omissions may be made to the environment 4600 without departing from the scope of the present disclosure. For example, although three transcription units are illustrated in the transcription units 4616, in some embodiments more or less than three transcription units may be used in the group of transcription units 4616. In some embodiments, one transcription unit may be used. In these and other embodiments, the fuser 4624 may not be used. Alternatively or additionally, the transcription provided to the scorer 4604 from the transcription unit 4614 may be a fused transcription based on transcriptions from multiple transcription units. In these and other embodiments, the multiple transcription units may be the same, different, or some combination of the same and different transcription units in any configuration of transcription units as discussed in this disclosure.

Figure 47:
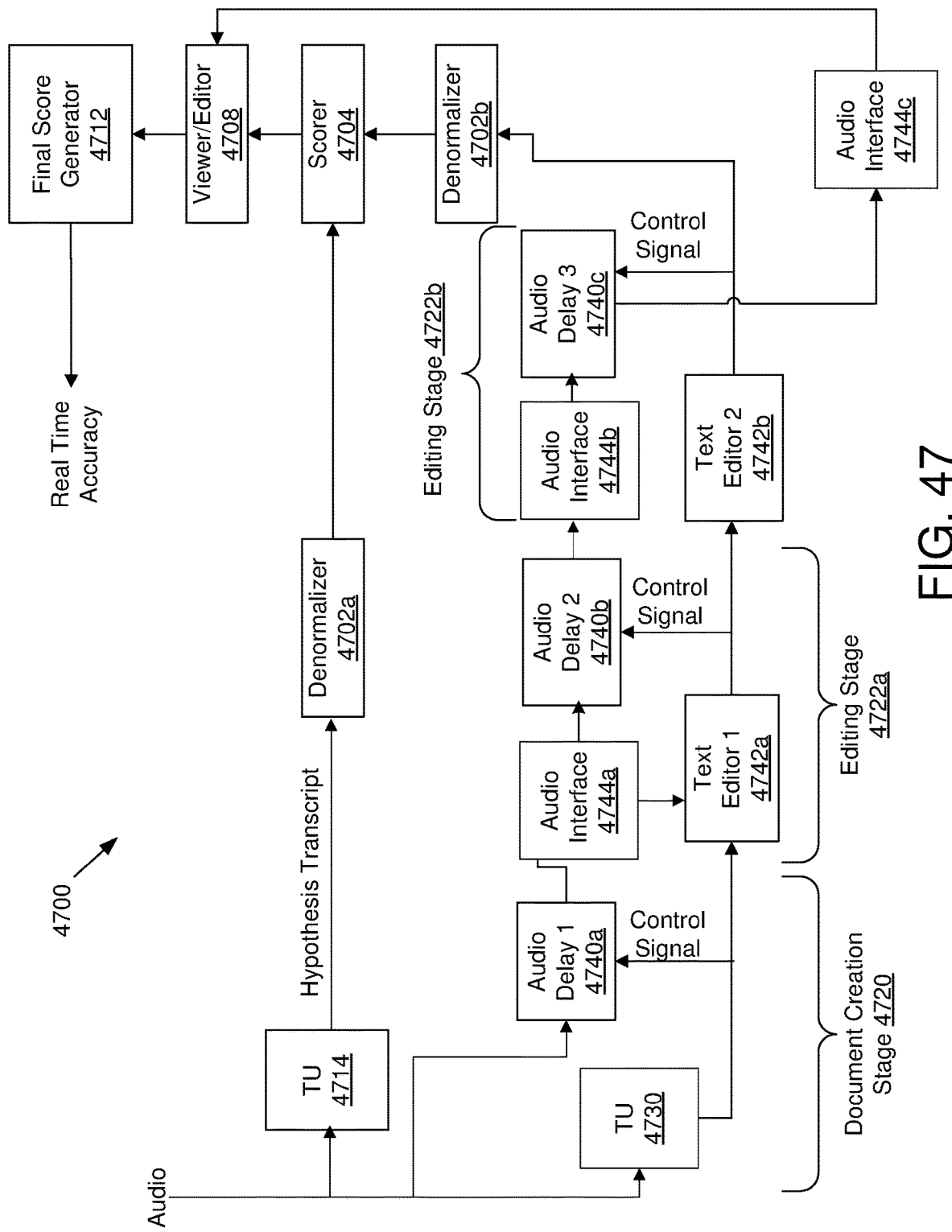
FIG. 47 illustrates another example environment for generating an estimated accuracy of a transcription.

FIG. 47 illustrates another example environment 4700 for generating an estimated accuracy of a transcription, in accordance with some embodiments of the present disclosure. In some embodiments, the environment 4700 may be configured to measure an accuracy of a transcription of audio generated by a transcription unit 4714 without recording the audio. The transcription unit 4714 may transcribe at least part of the audio to create a hypothesis transcription for which the accuracy may be determined.

A reference transcription may be also be generated. A transcription unit 4730 may obtain the audio and generate a reference transcription during a document creation stage 4720. The transcription unit 4730 may be a revoiced or non-revoiced transcription unit or include any other configuration of transcription units as described in this disclosure. The reference transcription may also be edited during two editing stages 4722a and 4722b, collectively the editing stages 4722. Each editing stage 4722 may include a text editor 4742 that may be used by a CA to correct errors in the reference transcription. Although two editing stages 4722 are shown; however, there may be more or less, depending on a desired accuracy of the reference transcription. Each editing stage 4722 in this configuration may be considered to be working in series, as each editing stage 4722 may use the output of a previous editing stage 4722. Thus, each editing stage 4722 may obtain the reference document as edited by a previous editing stage and may make further corrections.

In some embodiments, each of the editing stages 4722 may include an audio interface 4744 and a text editor 4742. In these and other embodiments, the audio may be provided by the audio interface 4744 to a CA. The CA may also view the reference transcription on the text editor 4742 and provide input to the text editor 4742 to edit the reference transcription.

In some embodiments, audio delays 4740 may be provided as part of each stage of generating the reference transcription to delay the audio provided to each subsequent stage. The audio may be delayed between subsequent stages of editing the transcription so that the audio presented by the audio interface 4744 may be more closely synchronized to the portion of text being displayed for and/or edited by a CA through the text editor 4742. The delay time may be constant or variable and may be responsive to endpoints and text from a previous stage.

Figure 48:
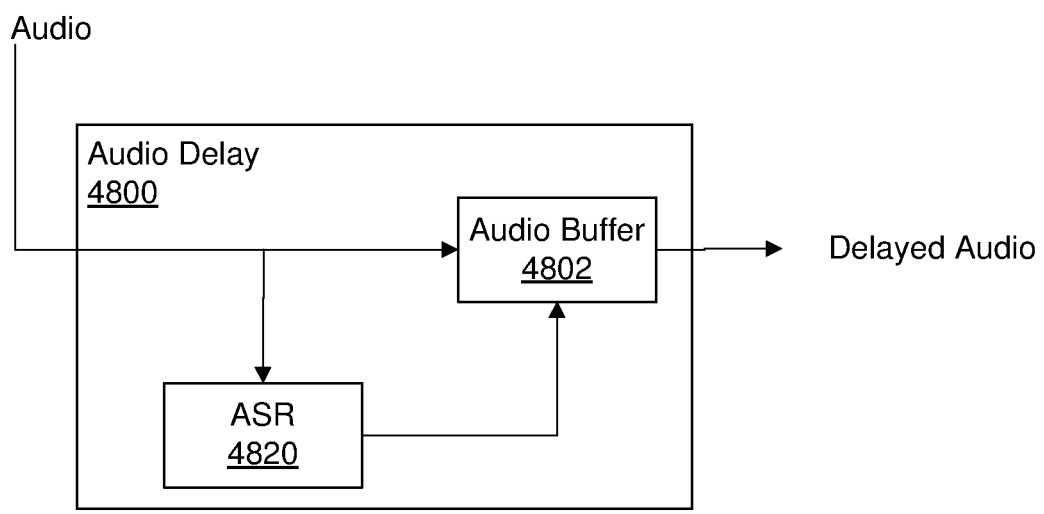
FIG. 48 illustrates an example audio delay.

Methods for determining delay time are described above at least with reference to FIGS. 1, 33*a*, 33*b*, 33*c*, and 48. In some embodiments, a control signal for each audio delay 4740 may include ASR endpoints and/or text. For example, the audio delay 1 4740*a* may receive endpoints and text from the transcription unit 4730 and audio delay 2 4740*b* and audio delay 3 4740*c* may receive text from text editor 1 4742*a* and text editor 2 4742*b*, respectively. When an audio delay 4740 receives text, the audio delay 4740 may use an ASR system to generate endpoints, as illustrated in FIG. 48, to determine how much to delay the audio.

In some embodiments, the reference and hypothesis transcriptions may be denormalized using denormalizers 4702*a* and 4702*b*, respectively. The denormalized reference and hypothesis transcriptions may be provided to a scorer 4704. The scorer 4704 may generate results by comparing the denormalized reference and hypothesis transcriptions. The results of the scorer 4704 may include the error rate of the transcription unit 4714 and details regarding how the score was calculated. For example, the details may include the aligned transcriptions in the form of an error map. A viewer/editor 4708 may enable a quality assurance agent to listen to the audio as provided by an audio interface 4744*c* and verify the score. The quality assurance agent may review, edit, approve, or discard the results of the scorer 4704. A final score generator 4712 may format or analyze results from the viewer/editor 4708 to determine real time accuracy of the transcription unit 4714.

In some embodiments, the reference transcription in any one of the document creation stage 4720 and the editing stages 4722, may be provided to a user device or in a method to determine corrections of a transcription provided to a user device where the corrections are provided to the user device.

After audio has been scored, the audio may be deleted. In some embodiments, if the audio terminates before scoring is completed, the audio may be deleted and further work on scoring may end. An accuracy figure representing scored portions of the audio may be reported. Additionally or alternatively, audio may be preserved until scoring is complete or until transcriptions are delivered to a user device.

The accuracy and validity of an accuracy estimate based on the environment 4700 may be verified using a corpus of recorded audio with verified transcriptions. Audio from the corpus may be presented to the environment 4700 and scored as if the corpus were being received in real time to generate real time accuracy of the hypothesis transcription of the audio. The reference transcriptions may also be compared to the verified transcriptions of the corpus to generate a first comparison.

In these and other embodiments, a second comparison may also be generated. To generate the second comparison the recorded audio of the corpus may be transcribed using the transcription unit 4714 to create corpus hypothesis transcriptions. The corpus hypothesis transcriptions may then be compared with verified transcriptions to determine a verified accuracy of the transcription unit 4714. The verified accuracy may then be compared to the real time accuracy determined using the environment 4700 to generate a second comparison. The first and second comparisons may be used to verify the integrity of the environment 4700. Thereafter, the specific configuration of the transcription unit 4714 may be confidently used to score live communication session audio in real-time.

In some embodiments, the final score generator 4712 may be configured to correct the accuracy estimates using estimators, such as the accuracy estimator and multivariate estimator in FIGS. 45 and 46 respectively. The estimators may be trained with recorded audio using the validation and calibration method described above with reference to the environment 4700. An example of an estimator used for this purpose may include a correction factor, determined by subtracting the verified accuracy from the real-time accuracy. When operating in real-time (e.g., not from recorded data), the correction factor may be added to the output of the viewer/editor to determine real-time accuracy.

Modifications, additions, or omissions may be made to the environment 4700 without departing from the scope of the present disclosure. For example, in some embodiments, the environment 4700 may not include the transcription unit 4730. In these and other embodiments, the CA associated with the audio interface 4744*a* may type the transcription from the audio, rather than starting from the reference transcription from the transcription unit 4730.

As another example, the environment 4700 may be configured to allow for parallel editing of a reference transcription, as opposed to the serial editing process. In these and other embodiments, the audio interfaces 4744 and the text editors 4742 may present the audio and reference transcription to multiple CAs in parallel, such as in overlapping time periods. In these and other embodiments, the text editors 4742 may allow for multiple CAs to simultaneously edit or edit in overlapping time periods the reference transcription to correct errors in the reference transcription.

In some embodiments, the audio interfaces 4744 may provide mechanisms for CA to rewind, forward, speed up, or slow down audio. The segments of audio may be played to the CA automatically based on signals from the text editors 4742. For example, the selection of a segment of audio to be played to a CA may be responsive to the segment of text for which the text editors 4742 may be receiving edits from the CA.

In some embodiments, each CA may be assigned a section of audio and the corresponding portion of the reference transcription to correct. Additionally or alternatively, the CAs may take turns editing the same segment of the reference transcription.

As another example, the environment 4700 may not include the transcription unit 4730. In these and other embodiments, the text editors 4742 may serve as an error labeling tool to enable the CAs to read the hypothesis transcription, listen to the corresponding audio, and mark and/or count errors. In these and other embodiments, the text editors 4742 may count errors using input from the CAs. Alternatively or additionally, the text editors 4742 may be configured to present one or more of: (1) the reference transcription, (2) the hypothesis transcription, (3) marks and scores from other CAs, and (4) automatically marked errors displayed as, for example, an aligned error map, each in a normalized and/or denormalized form.

Environments for determining accuracy and/or scoring of transcription units as described with reference to FIGS. 44-47 may also be used to measure one or more of: word accuracy, capitalization accuracy, punctuation accuracy, and other forms of accuracy. Alternatively or additionally, the reference transcription generated in the environments of FIGS. 44-47 may be sent as a transcription or correction to a user device when the audio is part of a communication session in which the user device is participating or associated therewith or the audio is provided by the user device. The user device may display the transcription or correction on the display and/or it may store it in a storage location such as a display buffer or audio record.

In some embodiments, the environment 4700 may be configured to delete audio when the audio is complete, such as when the audio is from a communication session and the communication session ends or when transcriptions are completed and delivered, in response to laws, regulations, and other policies which may prohibit the archival of such audio.

FIG. 48 illustrates an implementation of an audio delay 4800, in accordance with some embodiments of the present disclosure. The audio delay 4800 may be configured to delay audio based on a determined delay time using an audio buffer 4802 and output the delayed audio.

In some embodiments, the delay time may be determined by the audio delay 4800 from endpoints obtained from an ASR system. In some embodiments, the audio delay 4800 may obtain endpoints. Alternatively or additionally, the audio delay 4800 may generate endpoints from audio and text. As described above, at least with reference to FIGS. 1, 31, 32, 33a, 33c, 39, 40, 41, and 42, that illustrate audio delay, endpoints may be used to determine a delay time. If endpoints are not available, the audio delay 4800 may be configured to generate the endpoints.

In some embodiments, the audio delay 4800 may include an ASR system 4820. In these and other embodiments, the ASR system 4820 may obtain audio and a transcription of the audio. Using the audio and the transcription of the audio, the ASR system 4820 may be configured to determine a set of endpoints that correspond to the best alignment between the text and the audio. In these and other embodiments, the ASR system 4820 may obtain both the transcription and the audio. The ASR system 4820 may recognize both the audio and the transcription as an ASR constraint. For example, the text may be used to create a grammar or language model for the ASR system 4820. Using both the audio and the transcription, the ASR system 4820 may determine the locations in the audio that correspond with words in the transcription and thus may determine a set of endpoints that correspond to the best alignment between the transcription and the audio. The endpoints may be transmitted to the audio buffer 4802. The audio buffer 4802, in some embodiments, may be configured to determine a delay time setting based on the endpoints, for example by subtracting the average time that words in a transcription are generated from the average time the words appear in the input audio. Modifications, additions, or omissions may be made to the audio delay 4800 without departing from the scope of the present disclosure.

Figure 49:
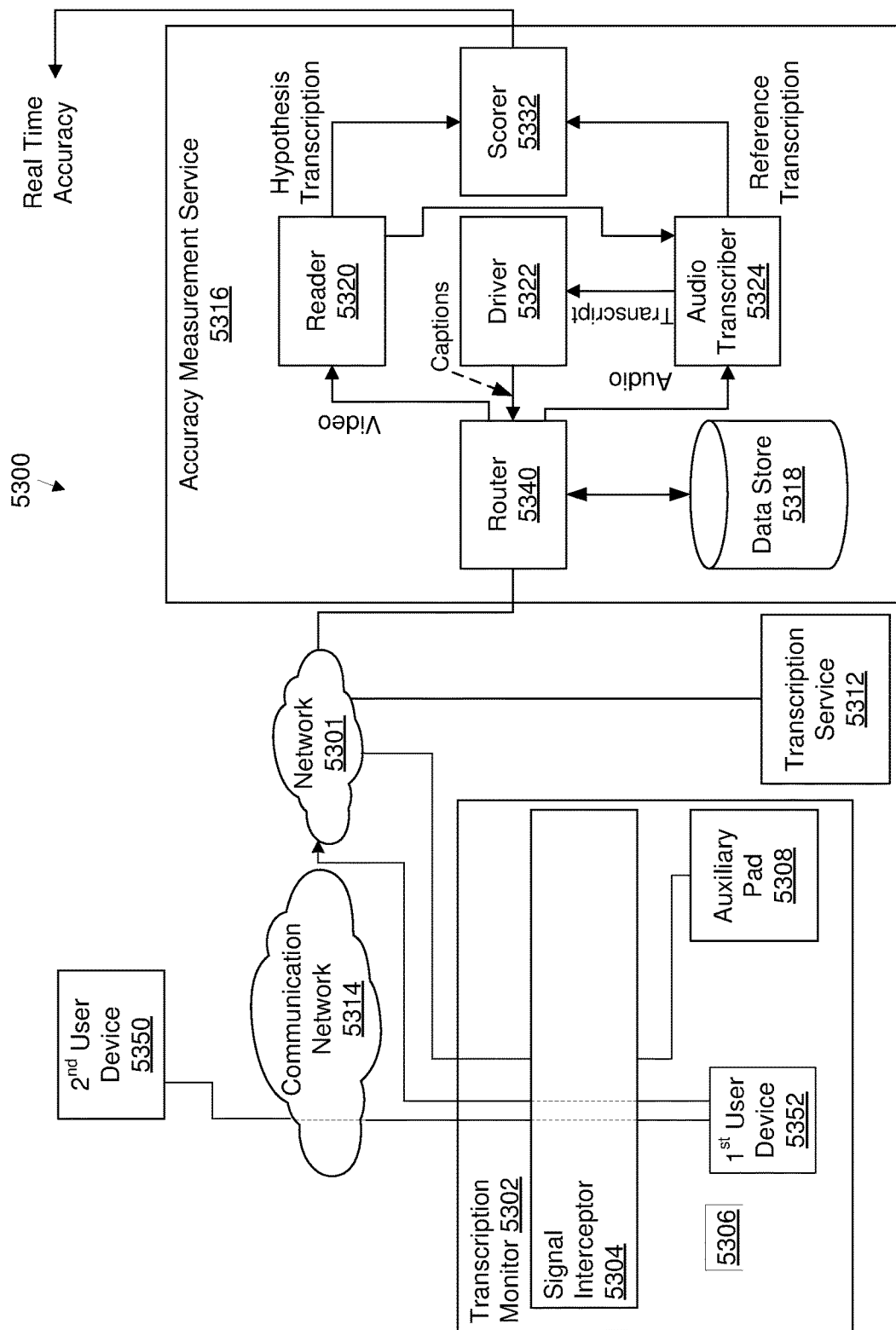
FIG. 49 illustrates an example environment for measuring accuracy of a transcription service.

FIG. 49 illustrates an example environment 5300 for measuring accuracy of a transcription service, in accordance with some embodiments of the present disclosure. In some embodiments, the environment 5300 includes a transcription monitor 5302 that includes a signal interceptor 5304, a camera 5306, and an auxiliary pad 5308.

In some embodiments, a first user device 5352 may establish a communication session with a second user device 5350. The first user device 5352 may obtain communication session audio and may transmit the communication session audio to a transcription service 5312 which may use any of the transcribing configurations described herein to generate a transcription of the communication session audio. The transcription service 5312 may provide the transcription to the first user device 5352 for display. In some embodiments, the transcription may be displayed on the first user device 5352 or the auxiliary pad 5308. In some embodiments, the auxiliary pad 5308 and signal interceptor 5304 may be computers such as smartphones, desktop, notebook, laptop, embedded, or tablet computers, or computers incorporated into other household appliances including, but not limited to, a TV, a voice-controlled speaker or smart home speaker, a refrigerator, a car dashboard display, a network router, a wall display or another display in another location.

Signals in the transcription monitor 5302, including communication session audio, transcriptions and other information provided on the user device, signals from input of a user, communication session status information, information on selections and other action taken by the user, such as turning captioning on or off, and Internet or network traffic to and from the first user device 5352 may be captured by the signal interceptor 5304 and transmitted to an accuracy measurement service 5316.

For example, in some embodiments, the signal interceptor 5304 may be configured to capture communication session audio from one or both devices in the communication session. For example, the first user device 5352 and the communication network 5314 may connect to the signal interceptor 5304, which may provide a path between the first user device 5352 and the communication network 5314. In these and other embodiments, the signal interceptor 5304 may capture audio passing therethrough and may transmit captured audio to an accuracy measurement service 5316. Additionally or alternatively, the signal interceptor 5304 may include XLR input and output jacks connected together through the signal interceptor 5304 with a tap in the communication line so that the signal interceptor 5304 may extract a copy of one or more audio signals on the communication line. Alternatively or additionally, the signal interceptor 5304 may use an echo canceler or other source separation method to eliminate any crosstalk and separate audio from the second user device 5350 so that audio originating at the first user device 5352 appears on a first channel and audio originating at the second user device 5350 appears on a second channel. The signal interceptor 5304 may transmit the audio on the second channel to the accuracy measurement service 5316.

The arrangement of the signal interceptor 5304 shown here, where communication session audio passes through the signal interceptor 5304, is illustrative only, and other configurations are contemplated. In one example, the first user device 5352 may transmit communication session audio to the signal interceptor 5304 using a separate connection such as via a LAN (local area network), WiFi, Bluetooth, or a separate wired connector. Alternately or additionally, the signal interceptor 5304 may tap into the communication line using a "T" connection or inline audio interface such as a telephone audio tap so that the communication signal may be copied to, but not pass through, the signal interceptor 5304. In another example, the signal interceptor 5304 instead of sitting in-line through the communication line as illustrated, may sit in-line through a handset cord of the first user device 5352, passing audio signals in both directions and capturing audio from one or both parties. An example of a telephone audio tap may include a device that is inserted in-line in a handset cord or a phone line cord using two telephone connectors that completes the circuit between the two connectors so that telephone operation is unaffected by the insertion. The telephone audio tap may send a copy of audio from one or both ends of the conversation to another device such as the signal interceptor 5304.

In some embodiments, the signal interceptor 5304 may capture Internet or network traffic passing to or from the first user device 5352. The captured network traffic may include messages, audio, and transcriptions to and from the transcription service 5312. Network traffic may be captured, as shown, by passing through the signal interceptor 5304; however other arrangements are contemplated. For example, the signal interceptor 5304 and the first user device 5352 may connect to a network 5301, such as by connecting into the same router. In these and other embodiments, the router may transmit a copy of network traffic passing between the first user device 5352 and the transcription service 5312 to the accuracy measurement service 5316. Alternately or additionally, the first user device 5352 may transmit information, such as at least some of the information contained in the network traffic, to the signal interceptor 5304. Alternately or additionally, signals used by the accuracy measurement service 5316 to measure accuracy may be obtained by other mechanisms. For example, accuracy measurement service 5316 may obtain audio from a connection to the first user device 5352 via a microphone and obtain transcriptions from the camera 5306.

In some embodiments, the signal interceptor 5304 may capture video from the camera 5306 and transmit the video to the accuracy measurement service 5316. In these and other embodiments, the camera 5306 may be configured to view the first user device 5352 display so that video of transcriptions appearing on the display is transmitted to the accuracy measurement service 5316. The camera 5306 may capture other displayed information such as the identity or ID number of the CA that may be assisting with the transcription being displayed, whether the transcription is being performed by a revoicing or non-revoicing transcription unit, communication session status, identifications of the second user device 5350, and other information that may appear on a display of the first user device 5352. Additionally or alternatively, the signal interceptor 5304 may be configured with OCR (optical character recognition) to convert video transcriptions and other displayed information to text and may transmit displayed information as text or other messages to the accuracy measurement service 5316. Alternatively or additionally, the camera 5306 may be further configured to view one or more of: controls of the first user device 5352 such as buttons, switches, and dials; other devices connected to the first user device 5352, and a user of the first user device 5352. For example, in some embodiments, the transcription monitor 5302 may use a signal from the camera 5306 watching the user's eyes to determine, for example, where the user is looking, the identity and other visual characteristics of the user, when the user is watching transcriptions on the first user device 5352, and when the user is watching transcriptions on a display of an auxiliary pad 5308 or other display.

In some embodiments, the camera 5306 may include mounting hardware to hold the camera 5306 in a position capable of viewing the display of the first user device 5352. In these and other embodiments, the mounting hardware may connect the camera 5306 to the first user device 5352. For example, the camera 5306 may be mounted on the edge or side of the first user device 5352 and may view the screen from the top, side, or bottom. If the camera 5306 view is at an angle such that the screen image is distorted, an image correction filter may be used to compensate for the angle and convert the screen image into a rectangular shape or another format more easily read by or compatible with OCR mechanisms. An image correction filter may also be used to remove glare or reflections from the screen. The camera 5306 may include an indicator light to indicate when the camera is active.

In some embodiments, the camera 5306 may, for example, be built into the signal interceptor 5304, first user device 5352, or auxiliary pad 5308 or it may connect to the signal interceptor 5304 via a wired connection, a connection through the first user device 5352, a connection through the auxiliary pad 5308, a wireless connection such as Wi-Fi, Bluetooth or cellular, or a network connection such as a LAN connection through a router.

In some embodiments, the transcription monitor 5302 may also be configured to provide transcriptions, which may be generated by the accuracy measurement service 5316, based on the communication session audio. The transcriptions may be displayed on the auxiliary pad 5308. Additionally or alternatively, the transcriptions may be displayed on the first user device 5352. These transcriptions may be in addition to transcriptions provided by the transcription service 5312.

Additionally or alternatively, the transcription monitor 5302 may be configured to record communication session data including communication session audio, transcriptions such as transcriptions from the transcription service 5312 of the communication session audio, and record other communication session data such as IM or text messages sent between the first user device 5352 and the second user device 5350.

Alternatively or additionally, the communication session data captured by the transcription monitor 5302 may include: audio, text, transcriptions, punctuation, capitalization, communication session log information such as phone numbers, a model built using content (e.g., "on-the-fly" in case consent is declined), and statistics such as n-grams derived from communication session data. In some embodiments, the communication session data may be used to train models, such as ASR models, confidence models, capitalization models, and punctuation models, and to determine values of one or more parameters. Additionally or alternatively, models may be used, for example by an ASR system, to provide transcriptions (a) for the current communication session, (b) to caption future communication sessions, and (c) to transcribe audio from callers other than the caller from which communication session data was collected. Additionally or alternatively, the transcription monitor 5302 may extract statistics from communication session data. The statistics may include n-grams, n-gram counts, usage such as minutes of use, and analysis of topics of conversation.

In some embodiments, the transcription monitor 5302 may be configured to obtain consent from one or more parties of the communication session prior to intercepting communication session data. If consent is needed to perform one or more of the above actions, one or more methods described in this disclosure may be used to collect and store the consent. The transcription monitor 5302 may be configured to receive input from a user, such as the subscriber, indicating consent to have the communication session recorded. Examples of mechanisms for requesting and recording consent include, but are not limited to providing consent by signing a form, going to a website, talking to an IVR or representative of the captioning service, clicking a screen icon, or by pressing a button. The user may be asked to provide consent for one or more of the actions listed above, such as via an audio prompt, a request on a phone or other display, an IVR system, a transcription service representative on the communication session, or verbally by another calling party. Consent provided by a user may apply to the user and to one or more other parties in the communication session. For example, the user may be prompted to affirm that he/she provides consent for himself/herself or for all parties on the communication session. When providing consent for another calling party, the user may be prompted to ask the other party for consent. The user may also indicate that consent is denied.

In some embodiments, the consent may be obtained through a physical button, a virtual button or soft key on a display, a touch tone detector or an ASR system that accepts a DTMF or voice command, an option on a website, or another form of input such as typing a phrase such as a signature or an affirmative phrase such as "yes."

Upon receiving or being denied consent, a record of the user and consent decision may be stored in a consent database, which may be part of a data store 5318. A consent detector may determine whether a given action may be performed with data from a given calling party.

Communication data obtained from the signal interceptor 5304 may be, contingent on consent, stored in the data store 5318 and/or processed by the accuracy measurement service 5316. In some embodiments, transcriptions may be provided from the accuracy measurement service 5316 on a display such as a display of the auxiliary pad 5308, regardless of consent. Additionally or alternatively, generating the transcriptions by the accuracy measurement service 5316 may be contingent on consent and transcriptions may appear on the display of the auxiliary pad 5308 after consent has been granted. In some embodiments, the auxiliary pad 5308 may display text for a consent request and a virtual button or soft key to be pressed, clicked, or selected, indicating that the user grants consent. In some embodiments, the transcription monitor 5302 may provide the communication session data to the accuracy measurement service 5316. The accuracy measurement service 5316, in some embodiments, may include a router 5340, the data store 5318, a reader 5320, a driver 5322, an audio transcriber 5324, and a scorer 5332. The communication session data may be received from the network 5301 by the router 5340. In some embodiments, the communication session data may be stored in the data store 5318.

In some embodiments, the accuracy measurement service 5316 may be configured to compute accuracy of the transcriptions generated by the transcription service 5312 in real time, such as during the communication session for which the transcriptions are generated. Accuracy may be measured by comparing a reference transcription to a hypothesis transcription. The hypothesis transcriptions may substantially correspond to transcriptions displayed on the first user device 5352. The hypothesis transcriptions may be obtained using one or more methods, including:

1. The reader 5320 analyzes video from the camera 5306 to extract a hypothesis transcription using optical character recognition ("OCR"). OCR may be performed by the transcription monitor 5302, the accuracy measurement service 5316, or by an OCR service reachable via an API.
2. One or more displays showing the camera video and one or more text editors that allow text creation and editing may provide mechanisms for data entry people to enter a text transcription of the transcriptions visible in the video signal. The data entry people may enter and edit text using keyboard, voice, or other computer input methods. To perform the data entry accurately and in real-time, the reader 5320 may use an arrangement such as those illustrated in FIG. 46, except that data entry people may view images as input instead of listening to audio. The text editor may display a video and may allow data entry people to forward and rewind the video.
3. The first user device 5352 may transmit a message to the reader 5320 that includes transcriptions that may be used as the hypothesis transcriptions.
4. The transcription service 5312 may transmit a message to the reader 5320 that includes transcriptions.
5. Transcriptions may be extracted from network traffic passing to or from the first user device 5352. Network traffic or transcriptions may be read and transmitted to the reader 5320 by the signal interceptor 5304.

In some embodiments, the audio transcriber 5324 may be configured to convert the communication session audio obtained by the accuracy measurement service 5316 to a reference transcription. The audio transcriber 5324 may use any of the systems and/or methods discussed in this disclosure to generate the reference transcription. The reference transcription may serve as the "truth" in measuring accuracy of the hypothesis transcription generated by the reader 5320 based on the transcription generated by the transcription service 5312.

Alternatively or additionally, in some embodiments, the audio transcriber 5324 may use the transcriptions from the transcription service 5312 in creating the reference transcription. For example, the reference transcription may be used as a starting point to be edited by human editors using text editors. Additionally or alternatively, the transcriptions from the transcription service 5312 may be fused with other transcriptions, such as those generated by the audio transcriber 5324 based on the communication session audio to create a reference transcription.

In some embodiments, the audio transcriber 5324 may provide the reference transcription to the driver 5322. The driver 5322 may be configured to format the reference transcription for display to the user and transmit the formatted reference transcription to the transcription monitor 5302. The transcription monitor 5302 may present the formatted reference transcription on a display such as on the display of the auxiliary pad 5308. The driver 5322 may be configured to format the reference transcriptions by breaking the reference transcriptions into groups of words which may be presented substantially simultaneously on the display. In some embodiments, the transcriptions provided by the accuracy measurement service 5316 may not include the reference transcription but may be a transcription used to create the reference transcription.

In some embodiments, the reference and hypothesis transcriptions may be compared by the scorer 5332 to generate a real-time score. After the real-time score is determined, communication session data such as reference and hypothesis transcriptions, audio, and video, may be deleted. The real-time score may be stored and analyzed. For example, the real-time score may be averaged over multiple communication sessions to determine an average accuracy for the transcription service 5312. As with other real-time accuracy estimation systems disclosed in this disclosure, the accuracy of the accuracy measurement service 5316 may be verified and tuned by sending recorded and transcribed audio through the accuracy measurement service 5316 and comparing the estimated transcriptions and accuracy figures determined in real time to accuracy figures determined offline. Additionally or alternatively, a corrected real-time accuracy may be obtained by comparing the offline accuracy with accuracy determined using recorded and transcribed audio to determine a correction factor or method to adjust the accuracy output by the scorer 5332.

In some embodiments, the accuracy measurement service 5316 may be configured to determine accuracy estimates using offline or recorded audio. For example, the accuracy measurement service 5316 may be configured to use recorded data in the data store 5318 as input to the reader 5320 and audio transcriber 5324. If recorded audio is already transcribed, the audio transcriber 5324 may be omitted/bypassed and the transcribed recorded audio may be used as the reference transcription.

Modifications, additions, or omissions may be made to the environment 5300 without departing from the scope of the present disclosure. For example, in some embodiments, the transcription monitor 5302 may be one unit. Alternatively or additionally, the signal interceptor 5304 may be a collection of separate units such as a first unit for processing and routing signals and a second unit for capturing audio. Additionally or alternatively, components including the signal interceptor 5304 may share hardware with one or more other components of the transcription monitor 5302, including the auxiliary pad 5308 and the camera 5306. The arrangement of the transcription monitor 5302, with elements distributed between the signal interceptor 5304, camera 5306, and auxiliary pad 5308 is provided as an example. Other arrangements are contemplated, including an arrangement where components of the transcription monitor 5302 are integral with the first user device 5352. The division of components between the transcription monitor 5302 and the accuracy measurement service 5316 is also an example embodiment. In some embodiments, components of the transcription monitor 5302 and the accuracy measurement service 5316 may each reside in any of multiple locations. For example, components of the accuracy measurement service 5316 may reside in the transcription monitor 5302 and vice versa.

In some embodiments, the auxiliary pad 5308 may include a display and a camera. Alternatively or additionally, the auxiliary pad 5308 may be configured to interface with a display and a camera. For example, the auxiliary pad 5308 may provide input to a display and/or may be communicatively coupled to a camera. In some embodiments, the auxiliary pad 5308 may be configured to obtain consent from a user. Additionally or alternatively, the auxiliary pad 5308 may interface with an audio tap and a camera and may incorporate at least some of the functions described above for the transcription monitor 5302.

Figure 50:
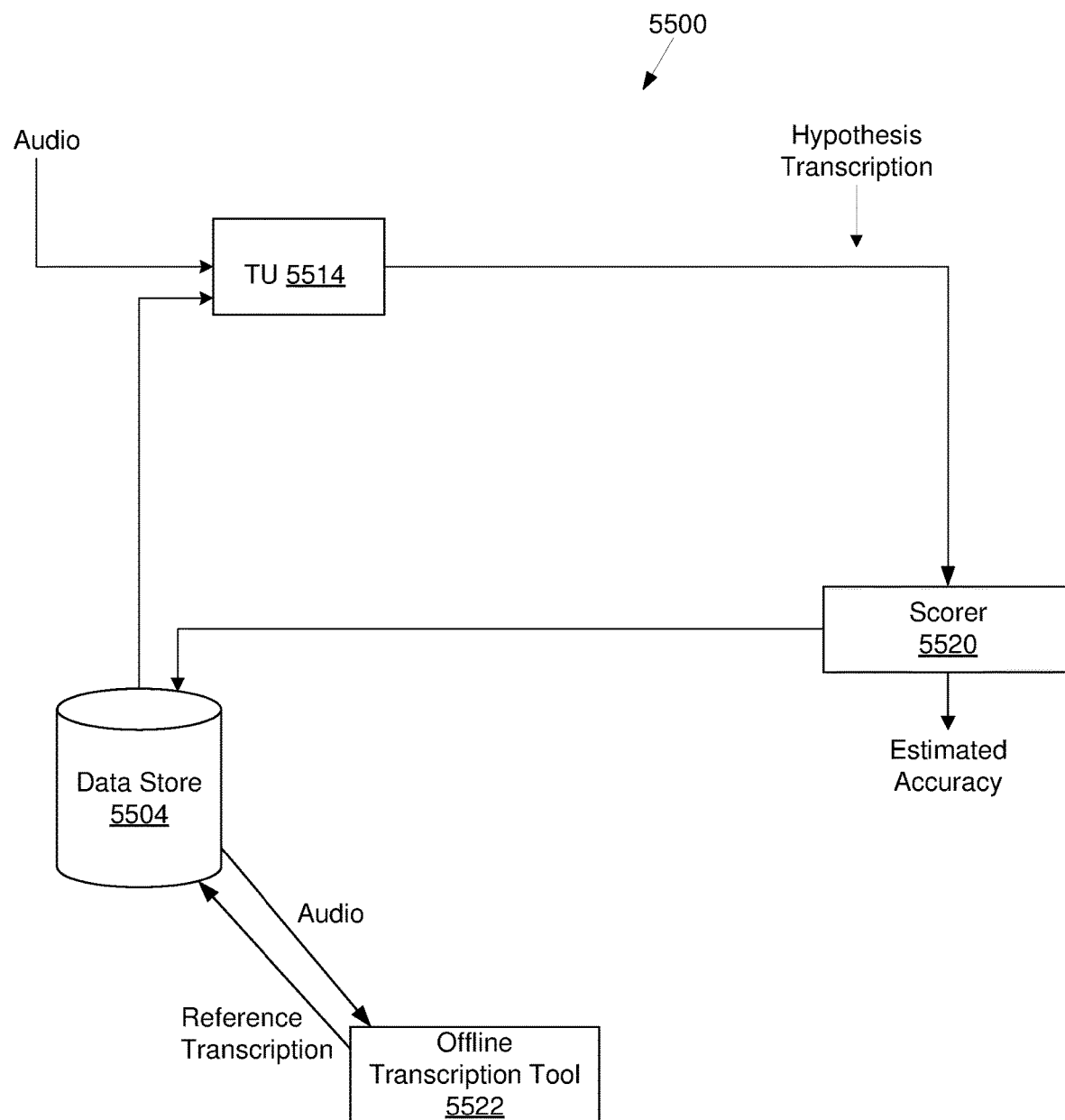
FIG. 50 illustrates an example environment for measuring accuracy.

FIG. 50 illustrates an example environment 5500 for measuring accuracy, in accordance with some embodiments of the present disclosure. In some embodiments, communication session audio received at a transcription unit 5514 in real time from a real-time communication session may only be available for a brief period, such as for the duration of the communication session, before being deleted. In some circumstances, laws and/or regulations may prohibit recording or storage of the communication session audio longer than the duration of the communication session. Accordingly, measuring accuracy of a transcription generated from the communication session audio may also occur before the communication session audio is deleted. In the example environment 5500, the transcription unit 5514 may generate a hypothesis transcription in real time or substantially real-time. In some embodiments, the transcription unit 5514 may be configured in any manner disclosed in this disclosure. The hypothesis transcription may also be scored in real-time or substantially real-time by a scorer 5520 configured to determine an estimated accuracy of transcriptions generated by the transcription unit 5514.

In some embodiments, the communication session audio and/or the hypothesis transcriptions may be recorded by a data store 5504. In these and other embodiments, the communication session audio may be transcribed offline by an offline transcription tool 5522 and stored in the data store 5504.

In some embodiments, the scorer 5520 may be used to determine an estimated accuracy of the hypothesis transcription generated by the transcription unit 5514. Additionally or alternatively, the scorer 5520 may be used to determine accuracy of components included within the transcription unit 5514. For example, in some embodiments, the transcription unit 5514 may include a revoicing ASR system to transcribe revoiced audio from a CA, other ASR systems, one or more fusers, and one or more text editors, among other components. The scorer 5520 may be used to determine accuracy of a particular revoicing ASR system associated with the CA, one or more of the components included with the transcription unit 5514, or both. In these and other embodiments, the accuracy of the revoicing ASR system associated with the CA may be used as a proxy that reflects the accuracy of the CA. Alternatively or additionally, a transcription generated by the particular ASR system and as corrected by a text editor associated with the CA may be a proxy that reflects the accuracy of the CA. In these and other embodiments, a CA may be compared to another CA based on the accuracies generated by transcription units associated with each of the CAs. In these and other embodiments, the transcription units may be configured in an analogous manner except the CA profiles used by the transcription units may be different as the CA profiles used may be selected based on the CAs being compared.

To determine an estimated accuracy, the scorer 5520 may operate in a supervised mode or an unsupervised mode. In a supervised mode, the scorer 5520 may compare a hypothesis transcription to a supervised reference transcription, such as a reference transcription from the data store 5504, count the number of disagreements, and determine an estimated accuracy. The supervised mode may use, for example, the method described for the scorer in FIG. 22, among other figures. In an unsupervised mode, the scorer 5520 may use an alternate method, one that may not use a supervised reference transcription in the manner used by the supervised mode, to determine an estimated accuracy. The unsupervised mode may use a selector or accuracy estimator such as described with reference to FIGS. 18-21, 23, 24-27b, 45, and 46.

In some embodiments, the scorer 5520 may be used in a process to determine an estimated accuracy of the hypothesis transcription that uses both the supervised mode and the unsupervised mode. In these and other embodiments, the process may include the scorer 5520 determining an estimated accuracy and determining a calibration factor that may be used to adjust the estimated accuracy. An example of the process may include the following:

1. A calibration audio set of multiple audio samples for which consent to record and process has been obtained, is stored in the data store 5504.
2. The calibration set may be transcribed using an offline transcription tool 5522, which enables a human transcriber to listen to the audio and create reference transcriptions. If transcriptions exist for the audio sample, the offline transcription tool 5522 may be used by the human transcriber to correct errors in the transcriptions. In addition to using audio, the offline transcription tool 5522 may use text and rich text forms such as a word confusion network (WCN), n-best list, and lattice output from an ASR system to generate the reference transcriptions. For example, the offline transcription tool 5522 may use rich text forms to provide multiple hypotheses that a human transcriber may select to correct the transcriptions.
3. The reference transcription may be denormalized.
4. The data store 5504 may send the audio samples to the transcription unit 5514.
5. The transcription unit 5514 may generate a hypothesis transcription for each of the audio samples.
6. The hypothesis transcriptions from the transcription unit 5514 may be denormalized.
7. Using the supervised mode, the scorer 5520 may compare the hypothesis transcriptions from the transcription unit 5514 to the reference transcriptions to determine a target accuracy for each audio sample in the calibration audio set.
8. Using the unsupervised mode, the scorer 5520 may evaluate the hypothesis transcription from the transcription unit 5514 to determine an estimated accuracy for each audio sample in the calibration audio set.
9. The unsupervised mode of the scorer 5520 may be trained, tested, or calibrated using, for example, one or more of the following methods:
   a. (Train) A machine learning method such as one from Table 9 is used to train an accuracy estimator, accuracy correction estimator, or selector used by the scorer 5520. A cost function used for training may be chosen and model parameters may be selected to reduce the difference between the estimated accuracy and the target accuracy.
   b. (Test) The target accuracy for the scorer 5520 may be compared to the estimated accuracy. The comparison may be used to determine whether the estimate is sufficiently close to the target to meet specified requirements.
   c. (Calibrate) The estimated accuracy for the scorer 5520 may be subtracted from the target accuracy to determine how different the estimate and target are, and in which direction. The difference may be used to set parameters in the scorer 5520 or to calculate a correction factor (see FIG. 23) to be applied to the estimated accuracy generated by the scorer 5520.

Modifications, additions, or omissions may be made to the operations described above without departing from the scope of the present disclosure. For example, the operations may be implemented in differing order. Additionally or alternatively, two or more operations may be performed at the same time. Furthermore, the outlined operations are only provided as examples, and some of the operations may be optional, combined into fewer operations, or expanded into additional operations without detracting from the essence of the disclosed embodiments.

An example of operation of the scorer 5520 is now provided. The scorer 5520 may use the process described above to train an accuracy estimator. A transcription may be obtained by the scorer 5520 from the transcription unit 5514. The transcription may be applied to the accuracy estimator to determine an initial estimated accuracy of the transcription. A correction factor generated previously by the scorer 5520 may be applied to the initial estimated accuracy to generate estimated accuracy of the transcription.

In some embodiments, the scorer 5520 may also be used to calibrate, train, or validate itself or other scorers or selectors. Alternatively or additionally, the scorer 5520 may be configured to score and benchmark the transcription unit 5514. In these and other embodiments, the environment 5500 may be configured to monitor overall accuracy of the transcription unit 5514 or other transcription units. In some embodiments, accuracy monitoring may be used to (see also Table 14):

1. Provide data to dashboards for viewing operations status such as accuracy, automation rates, traffic volumes, and system resources.
2. Raise alerts for identifying development bugs and problems in the field such as outages or equipment failures.
3. Confirm that software, hardware, and model updates have been deployed correctly.
4. Analyze changes in user behavior that affect accuracy or automation rates.
5. Track individual or average CA performance and identify training or personnel issues.

Modifications, additions, or omissions may be made to the environment 5500 without departing from the scope of the present disclosure. For example, in some embodiments, the steps to calibrate, train, or validate the scorer 5520 may also be used to calibrate, train, or validate a selector by using estimated and target transcription unit selection in place of estimated and target accuracy, a selector in place of the scorer 5520, and a threshold (see FIG. 19) in place of the correction factor.

Figure 51:
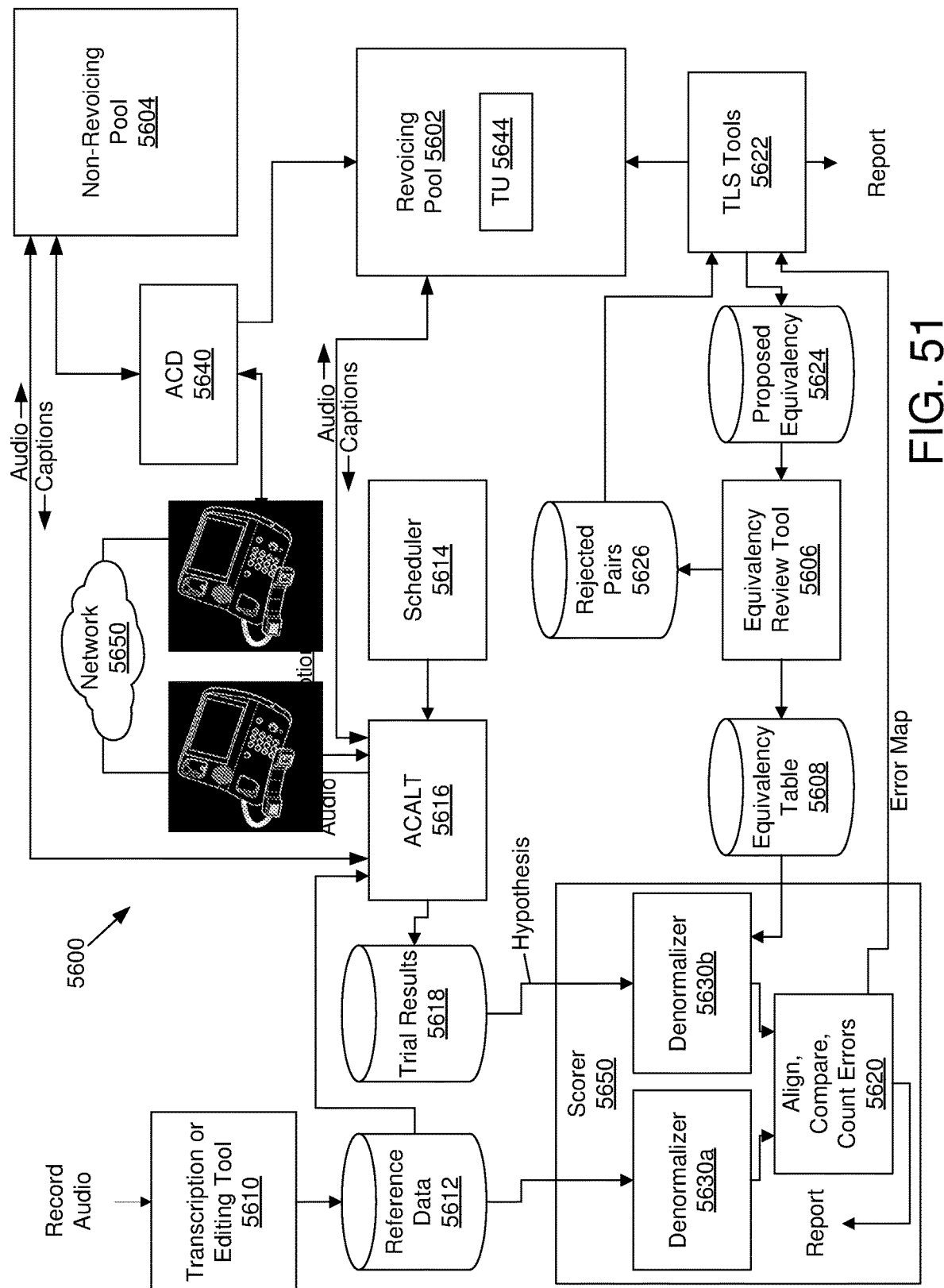
FIG. 51 illustrates an example environment for testing accuracy of transcription units.

FIG. 51 illustrates an example environment 5600 for testing accuracy of transcription units, in accordance with some embodiments of the present disclosure. In some embodiments, the environment 5600 may be configured to test accuracy and create and/or update a denormalization equivalency table. For example, when no equivalency table exists, the environment 5600 may create an initial equivalency table. Where an equivalency table does exist, the environment 5600 may use the equivalency table for scoring, reviews, and audits. The environment 5600 may update the equivalency table to correct errors and add new equivalencies.

In some embodiments, the environment 5600 may include a revoicing pool 5602 that includes one or more revoicing transcription units 5644. The environment 5600 may also include a non-revoicing pool 5604 that may include one or more non-revoicing transcription units.

The environment 5600, in some embodiments, may include an equivalency review tool 5606 that may be configured to create, maintain, and update an equivalency table 5608. An equivalency table 5608 may include token equivalencies that may be used by denormalizers 5630 when denormalizing a transcription. For example, the equivalency table 5608 may specify that "1" is the same as "one," but that "they're" is not the same as "their." The environment 5600 may include a different equivalency table 5730 for different ASR systems in the different pools 5602 and 5604 or a single equivalency table 5730 for the environment 5600.

In some embodiments, the environment 5600 may be configured to test accuracy of transcription units and create the equivalency table 5608. The data for the testing may be based on: prerecorded audio captured from people/actors in a studio; people connected to a data collection system by, for example, calling or receiving communication sessions from a specified phone number or running a PC-based or smartphone-based application; production traffic (i.e., real phone communication sessions) processed by a transcription service; and traffic from a communication service where audio is created.

In some embodiments, a transcription or editing tool 5610 with audio playback enables a transcriptionist to create a reference transcription. In these and other embodiments, the tool may use an ASR system to create an initial transcription for editing by the transcriptionist. The transcriptionist may edit the transcription using a computer keyboard, touch screen, voice input, or other computer interface device. If recording of audio is allowed (i.e., local law and regulations allow recording), audio and transcriptions may be saved in a reference data database 5612. Where recording of audio is not allowed, audio and transcriptions may be processed by the environment 5600 illustrated here and then deleted when a communication session is completed.

In some embodiments, the environment 5600 also includes a scheduler 5614 configured to receive input test requests from an operator (a person). Requests may include how many tests to run, when tests should be complete, types of tests to be run, which transcription units 5644 should be tested, which CAs should be tested using associated transcription units, and under what conditions to run tests. The scheduler 5614 may be responsive to test requests to generate a set of test parameters, which may include when to run tests, which audio files to use for testing, a schedule for which transcription units 5644 to test, and how many tests to run simultaneously. The scheduler 5614 may query or receive input from a transcription unit scheduling system or other operations and administration systems to determine operations status such as transcription unit load, traffic load, transcription unit availability, and may alter test parameters to avoid interfering with the transcription of audio from live communication sessions when the transcription units may be part of a transcription service. Additionally or alternatively, the scheduler 5614 may run tests on demand from an operator or team lead supervisor ("TLS," a.k.a. CA manager) based on received requests.

In some embodiments, the environment 5600 may also include an automated transcription accuracy and latency testing ("ACALT") tool 5616 configured to retrieve an audio sample from the reference data database 5612 and send it to one or more transcription units in either or both the revoicing pool 5602 or the non-revoicing pool 5604. The ACALT 5616 may send an audio file to multiple transcription units to obtain multiple transcriptions for use in (a) testing multiple transcription units or (b) fusing the results into a reference transcription or higher-accuracy transcription. The multiple transcriptions from the transcription units may be provided to the ACALT 5616. The ACALT 5616 may designate the transcriptions as hypothesis transcriptions. The hypothesis transcriptions may be stored in a trial results database 5618.

In some embodiments, the ACALT 5616 may send the audio to a transcription unit and receive the transcription through any of several mechanisms, including:

1. The ACALT 5616 sends a transcription request directly to a transcription unit.
2. The ACALT 5616 sends a transcription request to an automatic communication session distributor ("ACD") 5640. The ACD 5640 may find and create a connection to an available transcription unit or, if instructed by the ACALT 5616 or the scheduler 5614, connect to a specified transcription unit or to a transcription unit associated with a specified CA.
3. The ACALT 5616 sends the transcription request to the pools 5602 and 5604.
4. The ACALT 5616 sends a request to a first phone to place a communication session, for example via a network, to a second phone, which may be a transcription phone. The ACALT 5616 then plays audio to the first phone. Audio travels over the telephone network to the transcription phone which sends audio to a transcription unit for transcription. The transcription returns to the transcription phone. The ACALT 5616 reads transcriptions from the transcription phone, for example via a digital connection or by reading the screen with a camera.

In some embodiments, a scorer 5650 may read a reference transcription from the reference data database 5612 and a hypothesis transcription from the trial results database 5618. The scorer 5650 may use denormalizers 5630 to denormalize the reference and hypothesis transcriptions. The denormalizers 5630 may make use of the equivalency table 5730 or other denormalization methods such as a set of rules for determining when two forms of the same token represent the same token. Additionally or alternatively, a reference transcription may be marked with allowable equivalencies or alternative forms. For example, if a reference reads "I {want/wanted} to give you a call," a hypothesis transcription may be considered correct if it contains either "want" or "wanted."

The denormalizers 5630 may be used in cases where the format of multiple transcriptions, such as the reference and hypothesis transcriptions, may be different. Throughout this disclosure, it is to be understood that the denormalizers 5630 may be omitted if a transcription is already in a format suitable to its use. For example, if a transcription from a transcription unit has not been normalized or if the transcription has already been denormalized, denormalization may be unnecessary. Denormalization may also be unnecessary when comparing or fusing transcriptions that are in a similar format, or when the transcription was already denormalized by a previous step such as by a fuser that includes a denormalizer.

Additionally or alternatively, when a transcription has been processed by a component including internal or implicit denormalization logic (e.g., components that perform aligning, fusing, voting, privacy filtering, matching, scoring, etc.), the denormalizers 5630 may be disabled or omitted. For example, the comparer in FIG. 45, and the components performing the functions of alignment, voting, and counting errors in component 5620 may include access to an equivalency table or other methods configured to handle equivalencies so that the components may detect when different forms of the same word or phrase are equivalent. Additionally or alternatively, the depicted embodiment may use the equivalency table 5608 for denormalization by the denormalizer 5630. However, other configurations may be used for other forms of denormalization, such as those based on sets of rules, data-driven methods using machine learning, etc.

In some embodiments, the scorer 5650 may be configured to align and compare the reference transcription and the hypothesis transcription. The depicted embodiment, for the sake of clarity, has combined the functions of multiple previously described (see FIGS. 22, 44, and 45, for example) components into the component 5620. The align, compare, and count errors component 5620 aligns and compares the transcriptions and counts the number of differences and determine one or more accuracy metrics, which are then used for reports sent to a CA's team lead supervisor (TLS), feedback, benchmarking, etc. Additionally or alternatively, the scorer 5650 may be configured, via the align/compare/count errors component 5620, to create an error map, or representation of differences found between the reference and hypothesis transcriptions, and transmit the error map to a TLS tool 5622.

The TLS tool 5622, in some embodiments, may be configured to display scores and error maps to a TLS. The TLS tool 5622 may indicate when a test is ready to be scored, test score statistics, what pending tests needs to complete, and results from tests. The TLS tool 5622 may give the TLS several options, including:

1. Approve the automated score to be used for feedback and other reports.
2. Review the automated score and make corrections before it is used for feedback and other reports.
3. When automated scoring counts a word or phrase in a hypothesis transcription as an error, the TLS may determine the automatically detected difference is not an error. For example, suppose the speaker says, "I wanted to remind you" and the transcription unit transcribes the phrase as "I want to remind you." The TLS may determine the meaning of the phrase is not changed or the audio was unclear and decide that the difference is not to be counted as an error.
4. Propose that certain equivalencies be included in or removed from the equivalency table, equivalency rules, or other denormalization methods. The proposal may include a recitation of a context (e.g., neighboring words) in which the proposed equivalency applies. Using the example above, the TLS may submit a request that "I wanted to" transcribed as "I want to" not be counted as an error during automatic scoring, but that "wanted" may not necessarily be considered equivalent to "want" in all contexts.

Proposed equivalencies, along with optional context, that the TLS deems are equivalent may be entered in a proposed equivalency database 5624, by the TLS tool 5622. The entry may include other information, including a reference to a communication session where the equivalency may apply. The equivalency database 5624 may also track request statistics such as how many TLSs proposed a given equivalency change, how many times the given equivalency change was proposed, how often the term occurs in production transcriptions, how many times TLSs indicated a difference as an equivalency, and whether the equivalency has been previously considered and accepted or rejected.

The equivalency review tool 5606 may be configured, in some embodiments, to allow a scoring manager to review proposed equivalencies and accept or reject them. The equivalency review tool 5606 may be configured to remove duplicate requests and may display request statistics. Additionally or alternatively, the equivalency review tool 5606 may help a scoring manager prioritize which proposed equivalencies to review first by displaying request statistics or using request statistics to sort requests. For example, the equivalency review tool 5606 may allow a scoring manager to find and review proposed equivalencies that have never been reviewed before and have been submitted by at least a minimum number of TLSs.

In some embodiments, in response to a scoring manager accepting an equivalency, the equivalency may be incorporated into the equivalency table 5608. If the scoring manager rejects an equivalency, it may record the rejection in a database of rejected pairs 5626. When a TLS takes an initial step (such as clicking on one of the terms in an equivalency pair) to determine a difference is an equivalency that automated scoring did not recognize or when the TLS takes an initial step in submitting a proposed equivalency request, the TLS may be advised, such as with a pop-up or alert message embedded in a credit or submission window (a window that allows the TLS to give a CA credit for an incorrectly assigned error, submit a proposed equivalency, etc.), when an equivalency has been previously rejected. Depending on the review history of a proposed equivalency and on policies implemented in the equivalency review tool 5606 and the TLS tools 5622, the TLS tools 5622 may bar the TLS from giving credit and/or from submitting a request. Modifications, additions, or omissions may be made to the environment 5600 without departing from the scope of the present disclosure. For example, a single equivalency table 5608 is illustrated for use by both denormalizers 5630*a* and 5630*b*, but in some embodiments, multiple equivalency tables may be used. In these and other embodiments, each denormalizer 5630*a* and 5630*b* may use a different equivalency table.

Figure 52:
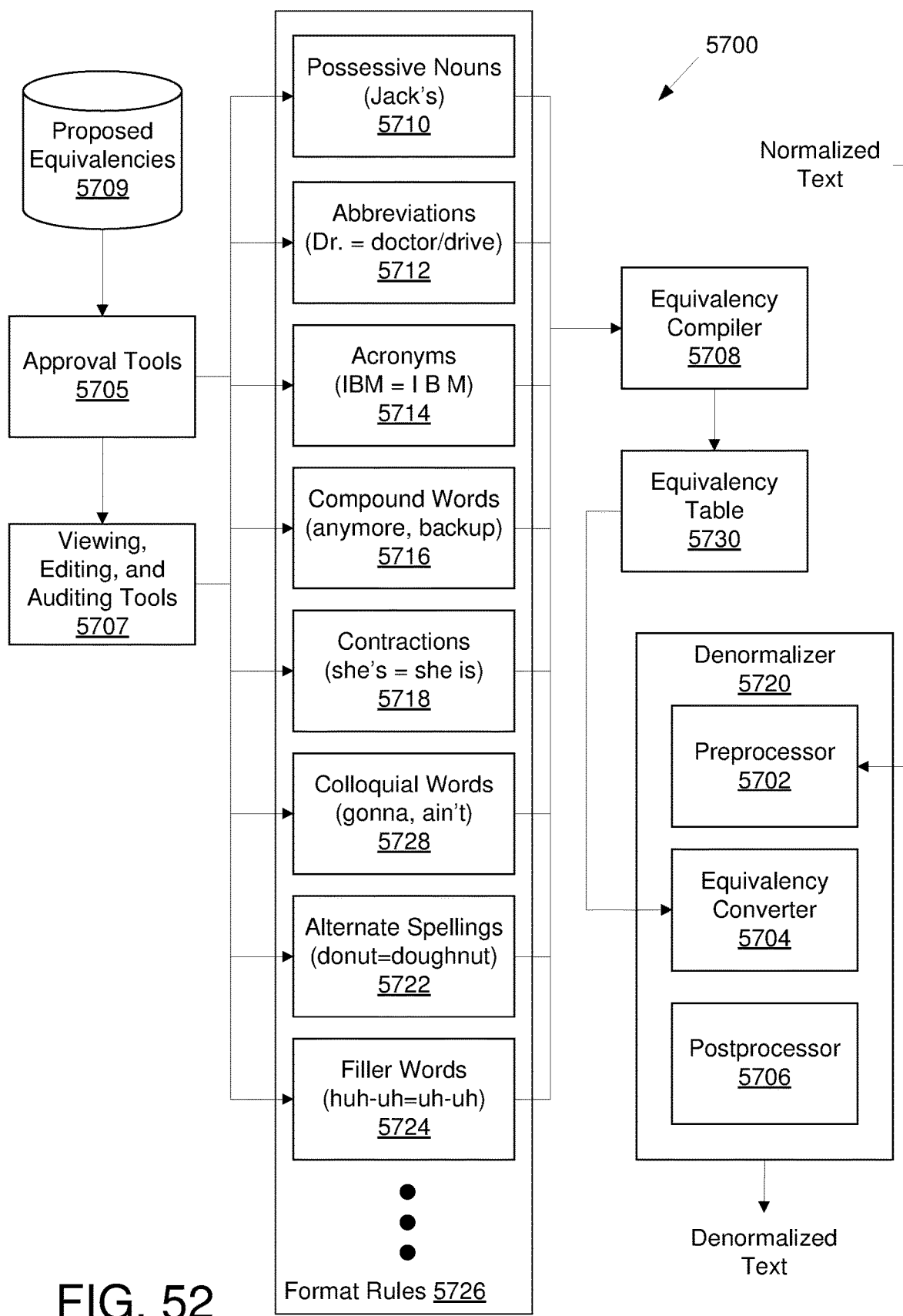
FIG. 52 illustrates an example environment for equivalency maintenance.

FIG. 52 illustrates an example environment 5700 for equivalency maintenance, in accordance with some embodiments of the present disclosure. The environment 5700 may be configured for generating, approving, editing, and compiling equivalencies. In the depicted embodiment, a denormalizer 5720 may utilize an equivalency table; however, other denormalization systems may be used.

In some embodiments, the denormalizer 5720 may include a preprocessor 5702, an equivalency converter 5704, and a postprocessor 5706. Normalized text may be received by the preprocessor 5702, which may make changes that apply broadly or that are not well mapped in an equivalency table 5730, such as mappings not tied to specific words. The preprocessor 5702 may, for example, be configured to map non-standard characters to a usable form, eliminate HTML tags, correct spelling, strip out headers, remove or convert capitalization and punctuation, etc. The preprocessor 5702 may also be configured to convert names followed by an apostrophe and "ll" or "s." For example, the preprocessor 5702 may map "Gary'll" to "Gary will" and "Gary's" to "Gary is" or "Gary has." The preprocessor 5702 may equate multiple forms of spelling for words like "Cathy" that have multiple spelling options.

In some embodiments, the preprocessor 5702 may send converted text to the equivalency converter 5704, which may be configured to convert terms to a uniform form using an equivalency table 5730. In some embodiments, a word or phrase matching a first term or regular expression in the equivalency table 5730 may be converted to a second term defined on the same line of the table. One example of an equivalency table 5730 is a "GLM" file. The equivalency table 5730 may map terms to one or more options in a format that the denormalizer 5720 recognizes and allows. For example, if the equivalency table 5730 includes the entry Dr.=>{Doctor/Drive} then "Dr." may be converted to {Doctor/Drive}. During accuracy scoring of transcriptions, a scorer may allow either "Doctor" or "Drive" as a correct match to "Dr." The reference transcription may also be marked with multiple options. For example, when creating a reference transcription, if it is uncertain whether the audio included "hey," "say," or "hi," then the reference transcription may include "{hey/say/hi}" and the hypothesis transcription may be considered correct in response to the hypothesis transcription matching any of the three words. The postprocessor 5706 may apply formatting or other desired conversions before sending the transcription to be aligned, compared, counted, etc. For example, the postprocessor 5706 may convert to lower case from upper case.

In some embodiments, the equivalency table 5730 may be created or updated by an equivalency review tool, such as an equivalency review tool 5606 of FIG. 51. Additionally or alternatively, the equivalency table 5730 may be created from format rules 5726 by an equivalency compiler 5708. In some embodiments, the equivalency review tool may include approval tools 5705, viewing/editing and auditing tools 5707, and the equivalency compiler 5708. The format rules may include any number of specific rule groups including, but not limited to, possessive nouns 5710, abbreviations 5712, acronyms 5714, compound words 5716, contractions group 5718, colloquial words 5728, alternate spellings 5722, filler words 5724, etc. A proposed equivalency 5709, such as from a TLS, may be reviewed using an equivalency review tool, which may allow the proposed equivalency 5709 to be accepted or rejected. If the proposed equivalency 5709 is accepted, the proposed equivalency 5709 may be added to a group of format rules. For example, if the proposed equivalency 5709 "there's"="there is" is accepted, it may be added to the contractions group 5718. A second set of tools allows a scoring manager to view (including search, inspect, sort, detect potentially incorrect equivalencies), edit (including adding, modifying, or deleting equivalencies), and audit (review equivalencies for compliance with policies, check syntax) equivalencies.

In some embodiments, a scorer may treat filler words such as "um," "ah," "hmm," "hum," and "mm" as regular words and count filler word errors as having substantially equal weight as other words. Additionally or alternatively, the scorer may ignore filler word errors and may not count them against the total score. In other embodiments, the scorer may count filler words as errors, but may allow the filler words to be substituted with each other. For example, "uh" replaced by "ah" may not be an error, but "him" replace by "hmm" may be an error. An ASR system may be trained to recognize filler words by, for example, including samples (such as audio and/or the corresponding text) in a training database used to train ASR models used by the ASR system. In some embodiments, in a revoicing transcription unit, when revoicing filler words, the CA may speak the filler words, speaking a voice alias in place of the filler word such as "udge" for "um," typing the filler, using keyboard shortcuts, using a mouse or a gesture to select from a list of menu items, etc.

In some embodiments, the reference and/or hypothesis transcriptions may include "quickwords" (i.e., audible events that may not appear as words in a dictionary and that may lack an established spelling). Examples include "(beeping)," "(busy line)," "(coughing)," "(communication session is on hold)," "(crying)," "(dial tone)," "(fax tone)," "(gasp)," "(speaker is inaudible)," "(loud background noises interfering with captioning)," "(laughs)," "(music playing)," "(audio is cutting in and out)," "(speech in a language other than English or Spanish)," "(silence)," "(Spanish)," "(sigh)," "(sneezing)," "(static)," "(yawn)," etc. An ASR system may detect quickwords by modeling the sounds in similar fashion to how phonemes are modeled, such as by mapping words or phoneme strings to quickwords, or by employing a separate classifier designed to detect quickwords, based on, for example text input and/or audio analysis. In some embodiments, in a revoicing transcription unit, when revoicing audible events, the CA may enter quickwords into a transcription by typing them, using keyboard shortcuts, selecting from a menu, speaking the quickword or a voice alias such as "laughter" or "quickword yawn." In some embodiments, quickwords may be counted or ignored as described above for filler words.

In various accuracy scoring arrangements, such as those described above with reference to FIGS. 44-52, word accuracy may be measured by, for example, deleting or ignoring punctuation and capitalization. Punctuation may be ignored, for example, by removing it in the preprocessor 5702 so that it is not counted when computing the error rate. Similarly, capitalization may be ignored by setting all text to upper (or lower) case in the preprocessor 5702 and/or postprocessor 5706. Additionally or alternatively, punctuation and/or capitalization may be scored separately. For example, a scorer may determine a word accuracy score, a punctuation accuracy score, and a capitalization accuracy score. Additionally or alternatively, punctuation and capitalization errors may be included in an overall accuracy score by inserting punctuation and capitalization tags into transcriptions before scoring. For example, punctuation marks may be mapped to tokens in the transcriptions. In these and other embodiments, the punctuation marks may be mapped to characters or strings that are not expected to occur otherwise in the text. For example, "."→"_period_"
","→"_comma_"
"!"→"_exclamation_"

Continuing this example, the sentence, "Jacob's not sick, but Jane is." may, for example, be rendered, for comparison and error rate calculation purposes, as "Jacob is not sick_comma_ but Jane is_period_." Both the reference and the hypothesis transcriptions may be similarly converted so that the reference and the hypothesis transcriptions may match when the hypothesis is correct. In this scenario, missing, adding, or substituting a punctuation mark, for example, may be scored as a word error. Similarly, capitals are, in some embodiments, tagged with a symbol not expected to occur in normal text such as "_cap_" before converting all text to lower case. Alternatively, all text may be converted to upper case. The above example may then be further processed to read "_cap_ jacob is not sick _comma_ but _cap_ jane is _period_" so that capitalization and punctuation errors are counted.

In some embodiments, all errors may receive equal weight, regardless of importance. When counting errors, then, a scorer may give each error a weight of one, and the error rate percentage may be the total number of errors divided by the number of words. Additionally or alternatively, the scorer may use a perceptual accuracy metric that, for example, estimates the change in meaning or document similarity. For example, the scorer may assign different weights to various words or errors so that the total accuracy is a weighted sum of errors. Weights may be assigned depending on factors such as severity, type, confusability, etc. For example, articles (e.g., "the") may receive a medium weight (e.g., 0.5), capitalization and punctuation errors may receive a relatively small weight (e.g., 0.1) and other words may receive a nominal weight (e.g., 1.0). Weights may be assigned based on any of a number of criteria or categories including:

1. Weights may be assigned for each word based on a table entry. For example, a table may specify that the word "not" has a weight of 1.2, "ibuprofen" has a weight of 1.5, "so" has a weight of 0.4, etc. A default value for words not in the table may be set, for example, at 1.0.
2. Weights may depend on the word type. For example, conjunctions ("and") may have a relatively low weight (0.1), proper nouns ("David") may have a high weight (1.5), capitalization may have a medium weight (0.5), punctuation may have a medium-low weight (0.25), and, where otherwise not specified, words may have a nominal weight (1.0).
3. Weights may be computed using a formula derived from data.
    a. For example, weights may be selected so that frequent words receive a lower weight than rare words. For example, weights may be based on the word entropy, which may be proportional to $-p(word)*\log(p(word))$, where p(word) is an estimated probability of the word appearing in a transcription.
    b. In some embodiments, weights may be based on the conditional probability of a word in context (e.g., neighboring words), which may be determined using a language model. For example, weights may be proportional to $-p(word|context)*\log(p(word|context))$, where context may be one or more neighboring words and p(word|context) is determined using a language model.
4. Weight may be responsive to the length of the word.
5. Weight may be responsive to the importance of the word in context. For example, in "administer a 2.5 mg dose of methotrexate once per week," the words "2.5," "mg," "methotrexate," and "week" are more important than "of" and "per." The "2.5" may also be more important in this context than in "I thought about it for 2.5 seconds." The weight in context may be computed by labeling each word in a training set with an importance score. A machine learning method such as logistic regression, neural network training, or another method in Table 9 may be used to learn, for example, from a labeled training set, how important a given word may be in a given context.
6. Weight may be a measure of the impact a word error has on meaning for a phrase, sentence, or other string of words. For example, the phrase "I'm now ready" misrecognized as "I'm not ready" may have a greater impact than "I'm now ready" misrecognized as "I'm all ready."
7. Weight may be related to the similarity in meaning of a word to the misrecognized word. Synonyms may have low weights, unrelated words may have high weights. For example, "the" misrecognized as "that" may have a low weight, whereas "dancer" misrecognized as "dagger" may have a high weight. Similarity may be measured, for example, using an ontology or by measuring distance between vector forms of the words, such as word embeddings. Methods for measuring word similarity include latent semantic analysis and comparing word embeddings, which may be determined using Word2vec.
8. Weight may be responsive to a position in the communication session. For example, errors during the first 10 seconds of the communication session may receive a relatively higher weight.
9. Weight may be responsive to the distance between a word's position in the hypotheses and its correct location. For example, suppose a hypothesis contains the correct words, but one word is in the wrong place. In some embodiments, the hypothesis may be given partial credit for recognizing the word, even though the word is incorrectly positioned. The weight of the error may, for example, be proportional to the number of words between the hypothesized location of the misplaced word and its correction position.

In some embodiments, the equivalency table 5730 may be enhanced by including context, such as neighboring words or other symbols. For example, in some embodiments, if the audio includes "I see Dr. Krish tomorrow," the equivalency table may equate "Dr." to "{doctor/drive}," so that if the recognizer hears "I see drive Krish tomorrow," it may be counted as correct. In some embodiments, this type of error may be detected by using an equivalency table containing entries that specify the context in which each alternative (e.g., "doctor" or "drive") is allowed. For example, if "Dr." is preceded by a capitalized word or a word likely to be a proper noun (e.g., "Smith Dr."), then only "drive" may be allowed, but if "Dr." is followed by a capitalized word or a word likely to be a proper noun (e.g., "Dr. Adams), then only "doctor" may be allowed.

In some embodiments, other perceptual accuracy metrics such as those used to measure language translation quality may be used. Examples include the Bleu score, which measures the correspondence between a machine's output and that of a human, and METEOR (Metric for Evaluation of Translation with Explicit Ordering). Modifications, additions, or omissions may be made to the environment 5700 without departing from the scope of the present disclosure.

Figure 53:
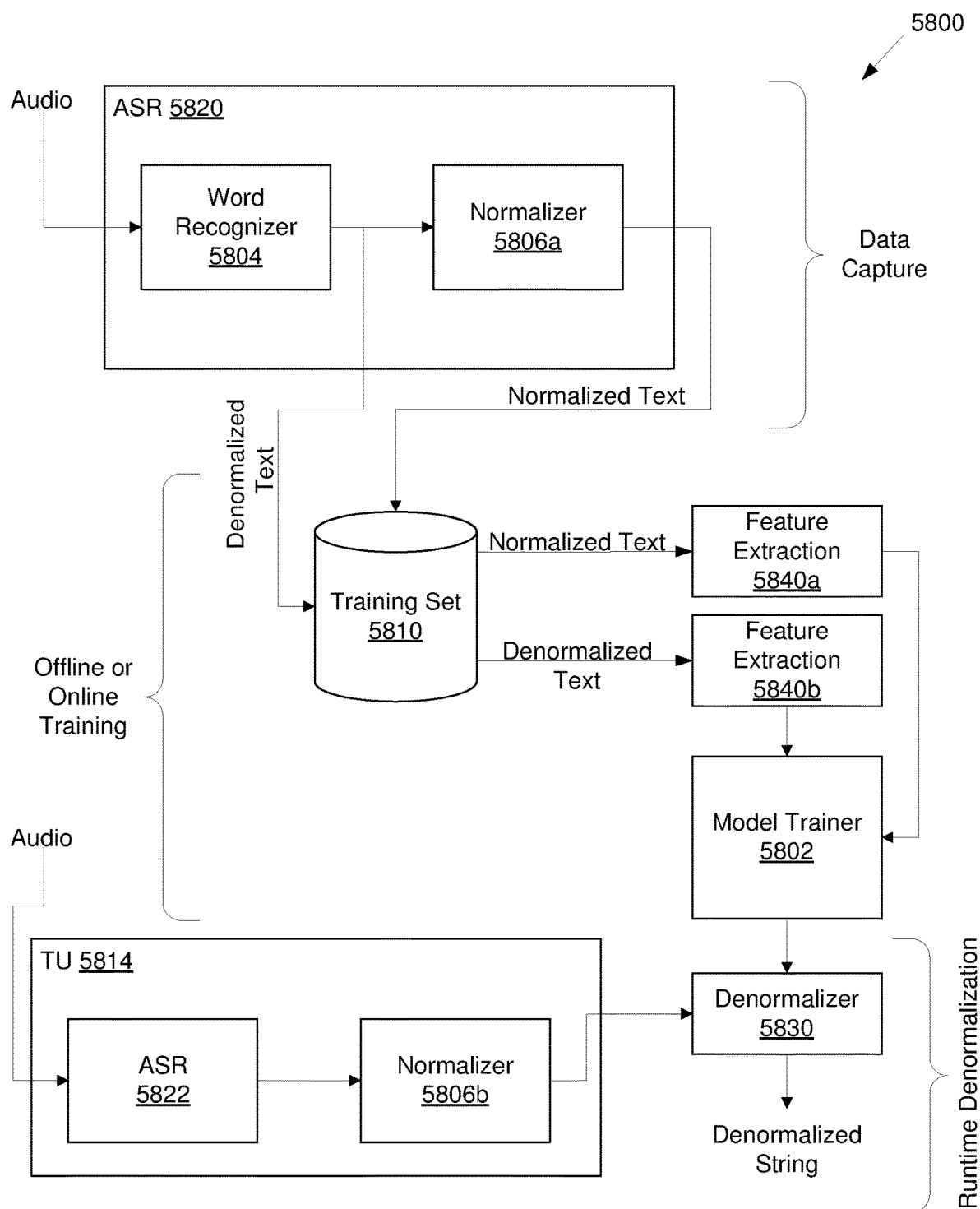
FIG. 53 illustrates an example environment for denormalization machine learning.

FIG. 53 illustrates an example environment 5800 for denormalization machine learning, in accordance with some embodiments of the present disclosure. In some embodiments, machine learning, such as natural language processing (NLP) training, may be taught a method to perform denormalization of a transcription as illustrated in environment 5800. In these and other embodiments, a model trainer 5802 may be configured to learn from a set of feature values (the features input) and target values (target input) and train a translation model for converting a normalized string to a denormalized string. The model trainer 5802 may use normalized and denormalized text during the training from a training set 5810 of text.

In some embodiments, the normalized text and the denormalized text may be obtained from an ASR system 5820 that includes a word recognizer 5804 and a normalizer 5806a. The ASR system 5820 may be provided audio. The word recognizer 5804 may generate denormalized text and provide the denormalized text to the training set 5810 and to the normalizer 5806a. The normalizer 5806a may be configured to normalize the text and provide the normalized text to the training set 5810. In some embodiments, the training set 5810 may be stored. In some embodiments, the audio may be recorded audio or live audio of a communication session, among other types of audio. Alternatively or additionally, the ASR system 5820 may not provide the denormalized text. In these and other embodiments, a separate system, such as one that receives input from humans, may generate the denormalized text from the normalized text output from the ASR system 5820. Additionally or alternatively, other sources of the normalized and denormalized text may be used, including text created by a human translator or a rule-driven machine translator. For example, a machine translator may be given denormalization rules such as to split compound words, to spell out abbreviations, expand contractions, and convert digit strings to spelled digits, and to use a pre-defined spell checker that allows only one spelling of each word. Text created by the machine translator may be used as a denormalized text in the training set 5810.

The training set 5810 may be provided to feature extractors 5840. The feature extractors 5840 may be configured to determine features such as n-grams or word embeddings of the training set 5810 that may be provided to the model trainer 5802. Alternatively or additionally, the feature extractors 5840 may be omitted in embodiments where raw data may be used as an input to the model trainer 5802. The model trainer 5802 may generate a denormalization model which may be structured and trained using methods designed for language translation or methods to denormalize text for text-to-speech synthesis. The denormalization model may be provided to the denormalizer 5830. Other machine learning mechanisms that may be used to train models for the denormalizer 5830 include methods listed in Table 9.

An example of the operation of the denormalizer 5830 is now provided. Audio may be transcribed by a transcription unit 5814 that may include a normalizer 5806*b*. The normalized transcription may be denormalized by the denormalizer 5830 using the model built by the model trainer 5802 from the training set 5810. The denormalizer 5830 may convert normalized text strings into denormalized strings. For example, a caller may recite an address by saying "One twenty three Lake Shore Drive, Gary, Ind." The transcription unit 5814 may transcribe the audio as, "123 Lake Shore Dr., Gary, IN." The denormalizer 5830 may output "one twenty three lake shore drive gary indiana" (in this example ignoring capitalization and punctuation) as the denormalized string.

Modifications, additions, or omissions may be made to the environment 5800 without departing from the scope of the present disclosure. For example, the denormalizer 5830, in some embodiments, may include a finite state transducer. Other methods for language translation, preprocessing text for text-to-speech synthesis, or implementing language processing functions may also be used by the denormalizer 5830. Alternatively or additionally, the environment 5800 may be used to train other models. For example, using features as a first input to the model trainer 5802 and target values as a second input, the environment 5800 may be used to train models for capitalization, punctuation, accuracy estimation, or transcription unit selection.

Figure 54:
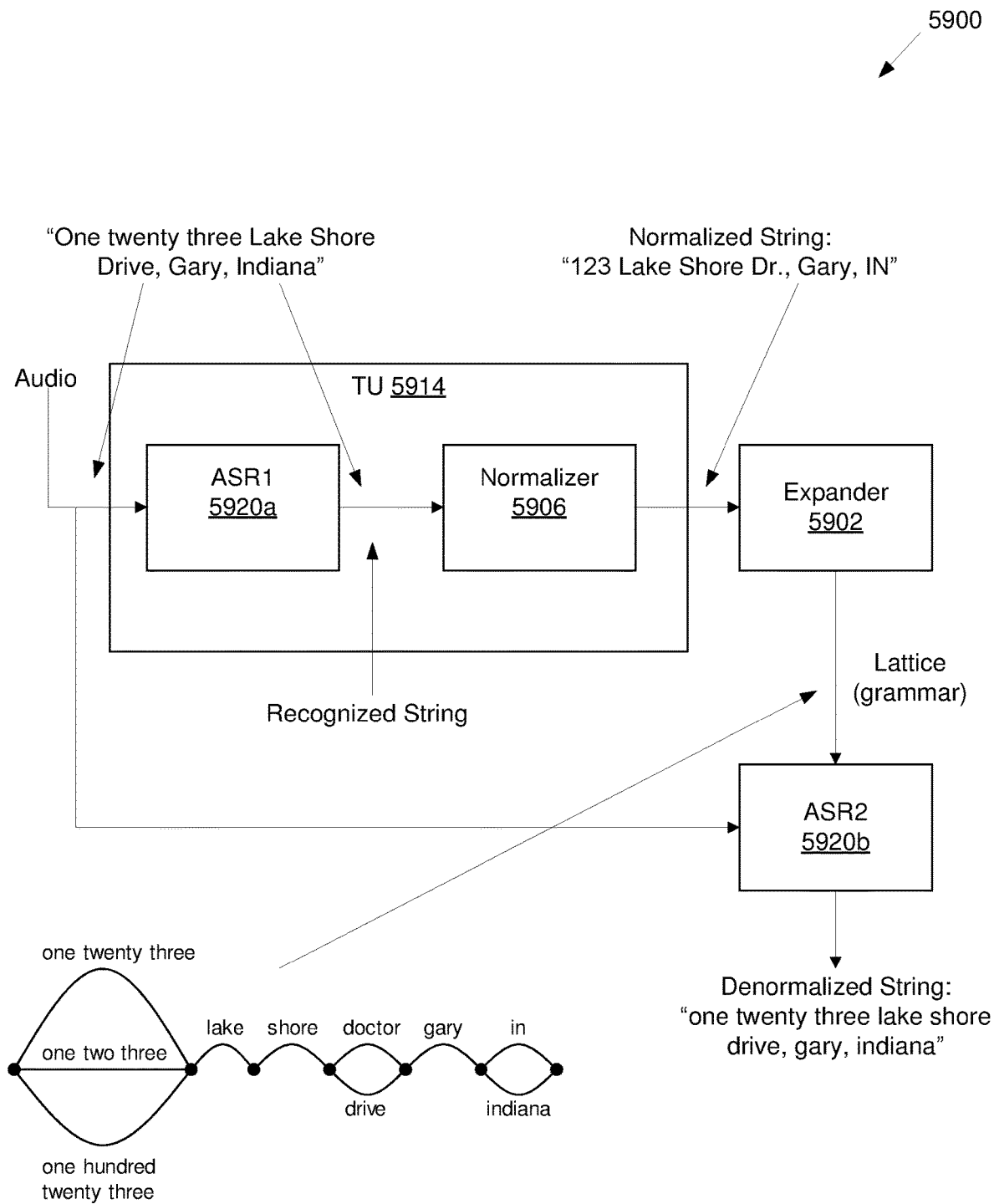
FIG. 54 illustrates an example environment for denormalizing text.

FIG. 54 illustrates an environment 5900 for denormalizing text, in accordance with some embodiments of the present disclosure. As illustrated, a transcription unit 5914 may transcribe audio into a normalized string using a first ASR system 5920*a* and a normalizer 5906. The same audio that the transcription unit 5914 transcribes may also be sent to a second ASR system 5920*b*. In some embodiments, an expander 5902 may obtain the normalized string from the transcription unit 5914 and may be configured to create a structure, such as a lattice, grammar, word graph, or n-best list that describes various ways in which the text may be pronounced. For example, "123" may be uttered as "one twenty three," "one two three," or "one hundred twenty three." If a lattice is used, each possible path through the structure may trace a variation in how the normalized string may be denormalized. If an n-best list is used, each candidate on the list may represent a denormalization option for a phrase. The expander 5902 may be rule-based or it may use a data-driven transducer or translation-based method. A rule-based expander may use, for example, a series of regular expressions or an extended version of regular expressions to map input strings to multiple ways in which they might be spoken.

In some embodiments, the structure created by the expander 5902 may be converted to a grammar and provided to the second ASR system 5920*b*. The second ASR system 5920*b* may attempt to transcribe the audio into one of the alternatives defined by the structure. The string recognized by the second ASR system 5920*b*, such as the most likely path through the lattice or the most likely candidate from the n-best list, based on acoustic evidence from the communication session audio, may be used as the denormalized string. The environment 5900 may also be used to generate normalized and denormalized text data for training a machine learning denormalizer such as the embodiment described above with reference to FIG. 53. Modifications, additions, or omissions may be made to the environment 5900 without departing from the scope of the present disclosure.

Figure 55:
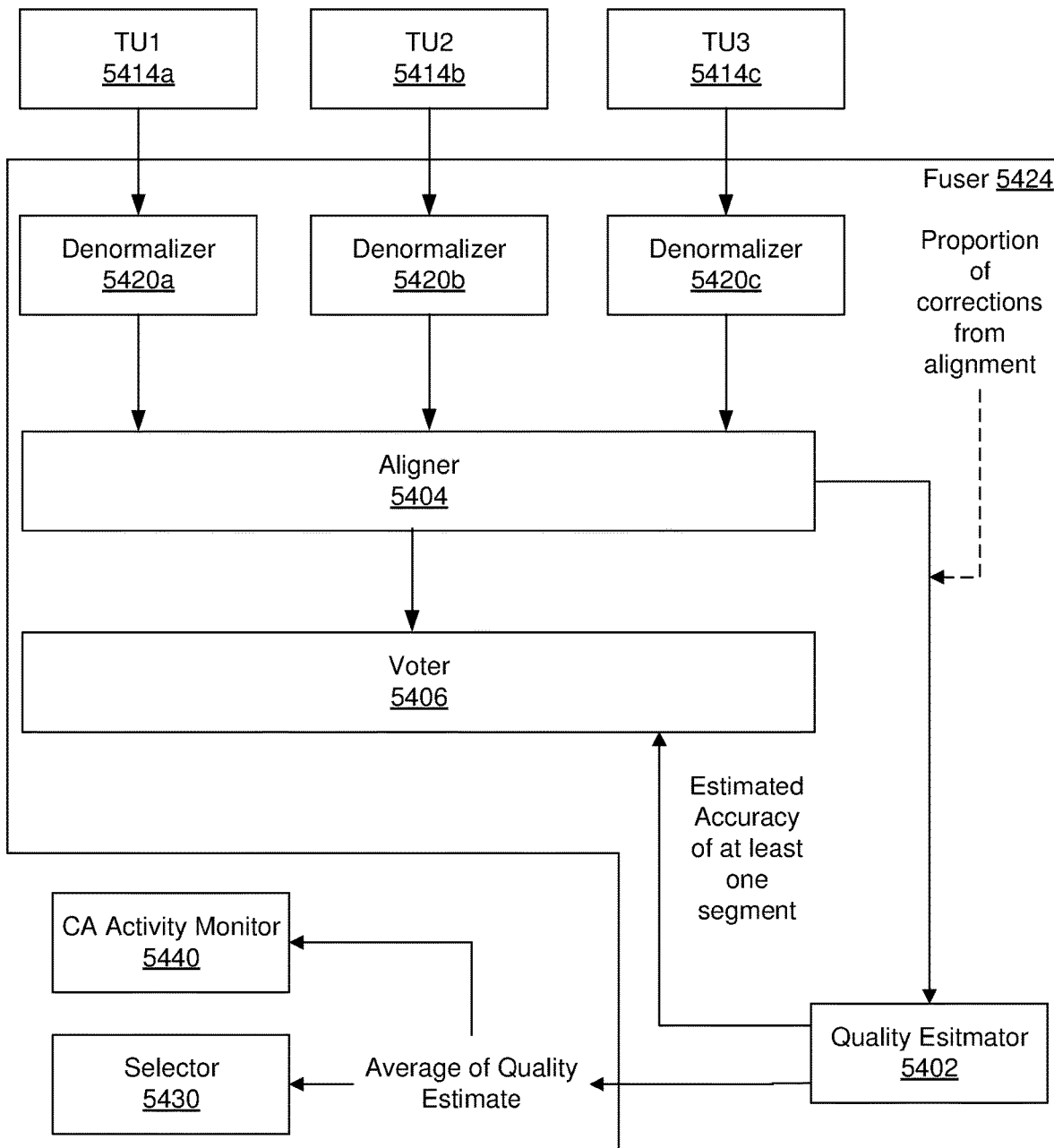
FIG. 55 illustrates an example fuser.

FIG. 55 illustrates an example fuser 5424, in accordance with some embodiments of the present disclosure. In some embodiments, the fuser 5424 may obtain transcriptions from each of multiple transcription units 5414*a*, 5414*b*, and 5414*c*, collectively the transcription units 5414. In some embodiments, the transcription units 5414 may include revoicing and non-revoicing transcription units. Alternatively or additionally, one or more of the transcription units 5414 may include ASR systems that are crippled.

In some embodiments, the audio inputs to the transcription units 5414 may be substantially identical, being derived from a common source such as audio from a communication session. Alternatively, audio inputs may be derived from multiple sources. For example, a first audio input may be derived from a voice sample spoken by a caller such as a transcription party and a second audio input may be revoicing of the first audio input. Additionally or alternatively, a first audio input may be derived from a voice sample spoken by a first caller and a second audio input may be derived from a voice sample spoken by a second caller. The transcriptions may be provided to the fuser 5424.

The fuser 5424 may obtain the transcriptions, for multiple purposes, including:
1. Generating a fused transcription.
2. Using transcription unit 5414 output, including confidence scores from each transcription unit 5414 and agreement between the transcriptions, to create a quality estimate of the fused transcription.
3. Aligning, at an aligner 5404, the multiple transcriptions and using the alignment for fusion and for estimating quality by the quality estimator 5402.
4. Using a quality estimate for at least a segment of one of the transcriptions to affect the outcome of fusion voting at a voter 5406.
5. Estimating the quality, by the quality estimator 5402, of one or more of the transcription units 5414 for at least a portion of the communication session or across multiple communication sessions.
6. Making a selection among transcription units.

The transcriptions from the transcription unit 5414 may be provided to denormalizers 5420 that may denormalize the transcriptions and provide the denormalized transcriptions to an aligner 5404. The denormalized transcription may be aligned by the aligner 5404. The aligned transcriptions may be provided to the voter 5406. The voter 5406 may compare the aligned transcriptions to determine one or more agreement (or disagreement) rates between the aligned transcriptions.

In some embodiments, the transcription units 5414 may also provide information regarding the transcription, including a confidence score of the transcription. In these and other embodiments, as a new segment of each transcription is generated by each transcription unit 5414, the transcription units 5414 may create additional information such as a confidence score for a segment of the transcription which may include at least part of the new segment.

In some embodiments, the quality estimator 5402 may use information from the transcription units 5414, the aligner 5404, and/or the denormalizers 5420 to estimate a quality of at least one segment of one of more of the transcriptions. In some embodiments, the information may include confidence scores, transcription agreement rates, and other features (see Table 2 and Table 5). The quality estimate may be used to guide the fuser 5424, which may include guiding the aligner 5404 and/or the voter 5406. An example operation of the fuser 5424 may include the following:

1. One or more transcription units 5414 receive an audio sample and begin transcribing to create transcriptions.
2. Segments of the transcriptions from multiple transcription units 5414 may be aligned by the aligner 5404 in real time.
3. The transcription segments may be compared, by the voter 5406, pairwise to determine agreement or disagreement rates. Words may be scored as correct, substitution, insertion, and deletion. Alternatively, words may be scored as correct or incorrect.
4. The quality estimator 5402 may be used to estimate accuracy or another quality estimate of one or more transcription segments. The quality estimator 5402 may be configured to utilize a method, such as a method from Table 9, trained on transcriptions from the transcription units 5414 on communication sessions for which the true accuracy is known and is used as a training target for the quality estimator 5402. The quality estimator 5402 may use features, such as agreement or disagreement rates, extracted by the aligner 5404 to process ASR confidence measures, and other features such as those in Table 2 and Table 5 to estimate the quality of one or more transcription segments.
5. The aligned transcription segments may be used as inputs to the voter 5406.
6. The transcription quality estimates may be used by the fuser 5424 for voting. For example, the quality estimates may be used to bias the voting or break ties in favor of transcription segments with higher-quality estimates.
7. The quality estimator 5402 may determine an estimated average quality estimate for the communication session. The average quality estimate may be based at least partly on the segment-based quality estimates. The estimates or average estimate may be used, for example, for CA feedback, input to a CA activity monitor, advisements to CA supervision, alerts, and reports.
8. The segment-based and/or average quality estimates may be used as input for selection of transcription units.

Modifications, additions, or omissions may be made to the environment 5500 without departing from the scope of the present disclosure.

FIGS. 56-83, among others, describe various systems and methods that may be used to generate models, such as a language model or an acoustic model, that may be used in ASR systems. Generating models may include training the models. In these and other embodiments, the models may be trained using transcriptions and audio of communication sessions without storing the transcriptions and the audio past or substantially past the termination of the communication session. The selection of the transcriptions to use for training of the models may be based on statistics of the transcriptions that may be generated as described with respect to FIGS. 44-55.

Figure 56:
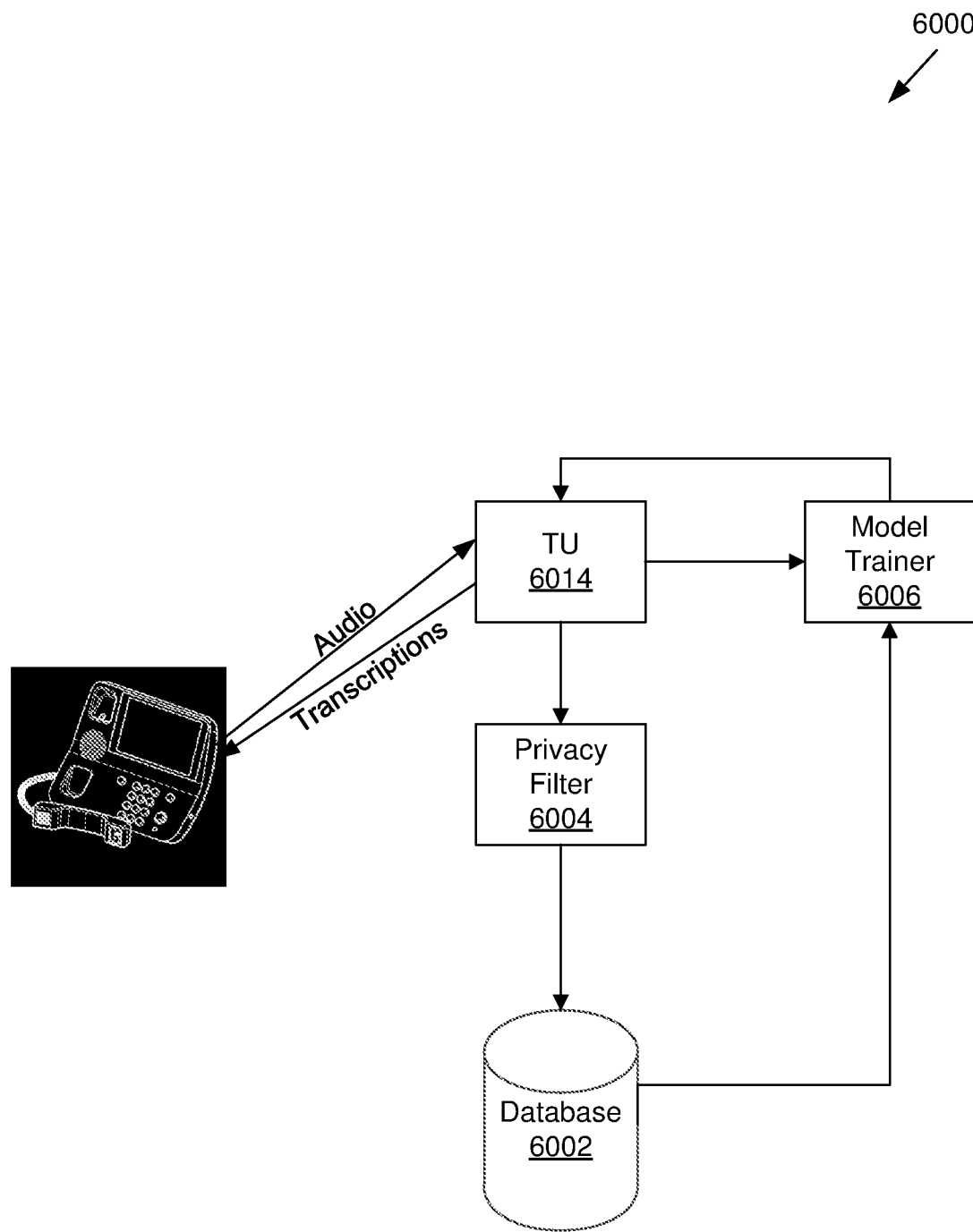
FIG. 56 illustrates an example environment for training an ASR system.

FIG. 56 illustrates an example environment 6000 for training an ASR system, in accordance with some embodiments of the present disclosure. The environment 6000, in some embodiments, may be configured to train an ASR system by training or adapting models that may be used by the ASR system. In some embodiments, a user device 6010 extracts and sends communication session audio to a transcription unit 6014. The transcription unit 6014 may generate transcriptions based on the communication session audio using an ASR system and return the transcriptions to the user device 6010. Alternatively or additionally, the audio may be any type of audio that may be received by the transcription unit 6014.

In some embodiments, the transcription unit 6014 may capture communication session data during the process of generating the transcriptions and providing the transcriptions to the user device 6010. In these and other embodiments, the transcription unit 6014 may be configured to store the communication session data in a database 6002. Examples of communication session data may include those listed below in Table 15.

TABLE 15

1. Audio from one or more calling parties.
2. Text such as communication session transcriptions and the transcription source (e.g., CA employee number).
3. Log data.
4. Time.
5. Phone numbers or device identifiers.
6. Phone types.
7. Vocabulary words.
8. Account types.
9. Word embeddings.
10. Features derived from audio.
11. Action taken by a captioning service such as an ASR/CA selection.
12. Disassociated and/or de-sequenced segments of text or audio.
13. Models.
14. Model parameter weights.
15. A voiceprint.
16. Data that may be used to create a voiceprint.
17. Results of analysis of communication session data.
18. Statistics derived from communication session data such as n-grams or n-gram counts.
19. Demographic and other information about the calling parties.

In some embodiments, a privacy filter 6004 may remove sensitive information from the communication session data before the communication session data is stored in the database 6002. In these and other embodiments, a model trainer 6006 may access the stored communication session data and use the stored communication session data to train new models for ASR systems. For example, the new models may be used by one or more ASR systems in the transcription unit 6014.

Additionally or alternatively, the transcription unit 6014 may send the communication session data to the model trainer 6006. The model trainer 6006 may use the communication session data to train one or more models on-the-fly. In these and other embodiments, training on-the-fly may include not storing the communication session data, other than during a brief interval, such as during the communication session. For example, in some embodiments, training on-the-fly may include the communication session data being deleted at the end or within 1, 5, 10, 15, 20, 30, or 60 seconds of the end of a communication session from which the communication session data is obtained. Alternatively or additionally, training on-the-fly may include only storing the communication session data in volatile memory and not in a static, non-volatile, or long-term memory storage such as a long term database. In these and other embodiments, the updates to the models, including weight adjustments, counts such as n-gram counts, and other model parameter changes, may be retained, but the communication session data may be deleted.

In some embodiments, the model trainer 6006 may be configured to train various models from varying types of communication session data. Thus, based on the type of communication session data obtained, the model trainer 6006 may generate particular types of models. Examples of the models that may be built by the model trainer 6006 and data types that may be used to train the models may include:

1. Acoustic Models (AMs) may be trained from audio, which may include recordings from subjects recruited for recording, CAs, actors, and callers (such as various speakers on the first and second devices). AM training may alternatively use features in place of audio, where the features are extracted from audio, to train models. AM training may also use text from transcriptions that correspond to content of the audio. Text may be obtained from transcriptions generated for use in the production service or from transcriptions created by transcribers. Transcribers may be machines and/or humans.
2. Language Models (LMs) may be trained from text such as transcriptions. LMs may alternatively be trained from n-grams or synthesized n-grams such as n-grams generated from an RNNLM.
3. Confidence models may be used to estimate transcription unit confidence, accuracy, quality, or probability. Confidence models may be trained from reference transcriptions, hypothesis transcriptions, audio, features, log data, and other information generated as communication sessions are processed in a production or test system. Confidence models may also be built using information regarding the extent to which the audio was transcribed correctly, transcription accuracy, or transcription confidence. Confidence models may be built using reference transcriptions (such as transcriptions generated by offline transcriptionists, transcriptions generated from a production service, transcriptions created from audio using ASR) and hypothesis transcriptions (such as transcription unit transcriptions). Confidence models may use input from features listed in Table 5.
4. Classification models (a.k.a. selection models or transcription unit selection models) may be trained using inputs such as those that may be used to train confidence models, plus features from Table 2. Classification models may be used to select a transcription method from among one or more methods described in this disclosure. (see Table 1).
5. Punctuation models may be trained on data where punctuation has been added. CAs, for example, may revoice keywords to add punctuation and thus generate training data for an automatic punctuator.
6. Capitalization models may be trained on data where letters are correctly capitalized. CAs, for example, may revoice keywords to add capitalization or type transcriptions and thus generate training data for an automatic capitalizer.
7. Summarization models may be trained on communication session transcriptions.

Modifications, additions, or omissions may be made to the environment 6000 without departing from the scope of the present disclosure. For example, in some embodiments, part or all of the model trainer 6006 may be run in one or more locations, including those described above with reference to FIG. 1 or other figures in this disclosure.

Figure 57:
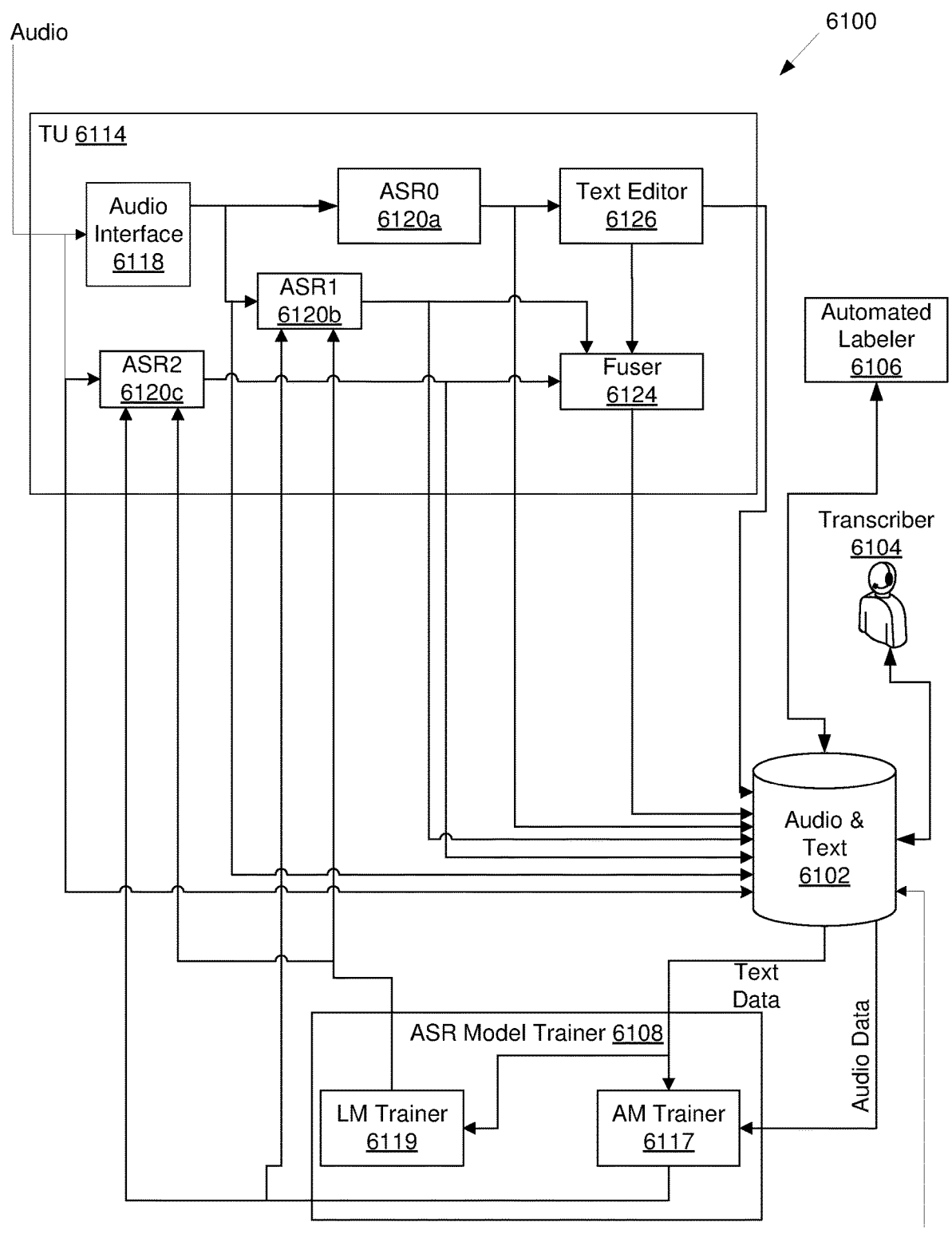
FIG. 57 illustrates an example environment for using data to train models.

FIG. 57 illustrates an example environment 6100 that uses data to train models, in accordance with some embodiments of the present disclosure. In some embodiments, the environment 6100 may be configured to train models such as acoustic models and language models. The environment 6100 may include a transcription unit 6114 that is configured to transcribe audio to generate one or more transcriptions. The transcription unit 6114 may include ASR systems 6120*a-c*, collectively the ASR systems 6120, an audio interface 6118 to obtain revoiced audio and provide the revoiced audio to the ASR systems 6120*a* and 6120*b*, a text editor 6126 for editing a transcription output by the ASR system 6120*a*, and a fuser 6124 for fusing the transcriptions output by the ASR systems 6120.

In some embodiments, the environment 6100 may include a database 6102. The database 6102 may be configured to store data such as transcriptions from the transcription unit 6114 including other data as described with respect to Table 15. Examples of the data that may be stored by the database 6102 may include:

1. Audio, which may include audio samples from one or more speakers, including the subscriber, the transcription party speakers, and other speakers on a communication session.
2. Revoiced audio, which may be audio sampled from one or more CA voices. Revoiced audio may be captured from CAs during revoicing of communication sessions.
3. Transcriptions and confidence or accuracy scores from one or more ASR systems such as ASR0 6120*a* (which may be speaker-dependent), ASR1 6120*b*, and ASR2 6120*c*, the text editor 6126, and the fuser 6124. In some embodiments, the ASR1 6120*b*, and ASR2 6120*c* may each include multiple ASR systems.
4. Data (such as n-grams, speech features, and new or adapted models) extracted from audio, transcriptions, or other communication session data.
5. Data from external sources, including other voice services, data collections, purchased and publicly available data, and data scraped from websites.

The database 6102 may provide long-term storage where the data is saved and processed. Alternatively or additionally, the database 6102 may be a short-term buffer where a portion of the data may be deleted after a specified event has occurred, such as the end of a communication session, a particular amount of time, such as before the end of the communication session, a particular amount of time after the end of a communication session, at a time where transcription has been completed or delivered to a user device, or as soon as the data has been used for training.

In some embodiments, a subset of the data may be processed by an online or off-line transcriber 6104 to transcribe audio into text, correct errors in existing transcriptions, or annotate additional information such as gender, demographic, age (child, elderly, etc.), speech or hearing impairment, accent, parts of speech, named entities, new speaker, punctuation, capitalization, sentence and phrase boundaries, speaker intent, content summaries, speaker sentiment or emotional state, audio quality, and topic, among others. Additionally or alternatively, audio and/or transcriptions may be annotated to tag the transcription with information such as the additional information listed above using an automated labeler 6106. Such annotations may include speech recognition, gender detection, punctuation and capitalization, natural language processing, summarization, topic analysis, and sentiment analysis, among others. In some embodiments, the automated labeler 6106 may be implemented as part of an ASR system that returns a transcription or other form of text result that includes the annotations, such as XML files, JSON files, WCN, lattice, or an n-best list. For example, one or more of the ASR systems 6120 may include the automated labeler 6106.

In some embodiments, the automated labeler 6106 may be configured to generate transcriptions of recorded audio. Additionally or alternatively, the automated labeler 6106 may be configured to generate transcriptions of audio as the audio is received and processed as part of providing a service and training models. After training the models, the audio and/or transcriptions may be deleted. In these and other embodiments, the automated labeler 6106 may generate the transcriptions using one or more human transcribers, one or more ASR systems, or a combination thereof, including the various configurations described with respect to transcription units disclosed in this disclosure.

In some embodiments, the environment 6100 may include an ASR model trainer 6108, which uses the data from the database 6102 to train new models such as language models by an LM trainer 6119. In some embodiments, to train language models, the data may include a transcription. The ASR model trainer 6108 may also include an AM trainer 6117 that may be configured to generate acoustic models using the data from the database 6102. In some embodiments, to train the acoustic models, the data may include audio and transcriptions.

In some embodiments, the ASR model trainer 6108 may incorporate confidence scores provided by the ASR systems 6120 in training the language and acoustic models. For example, the ASR model trainer 6108 may weigh training data samples from sample transcriptions according to the estimated accuracy or the confidence of accuracy of the sample transcriptions. Additionally or alternatively, the ASR model trainer 6108 may factor in CA performance such as CA accuracy during testing into the model training process. For example, the ASR model trainer 6108 may give greater weight to transcriptions from CAs with higher historical performance or may train models using data from CAs scoring above a selected threshold. After training the new models, the ASR model trainer 6108 may provide the new models to the ASR systems 6120. The ASR systems 6120 may use the new models to transcribe the current or future communication session audio. Modifications, additions, or omissions may be made to the environment 6100 without departing from the scope of the present disclosure.

Figure 58:
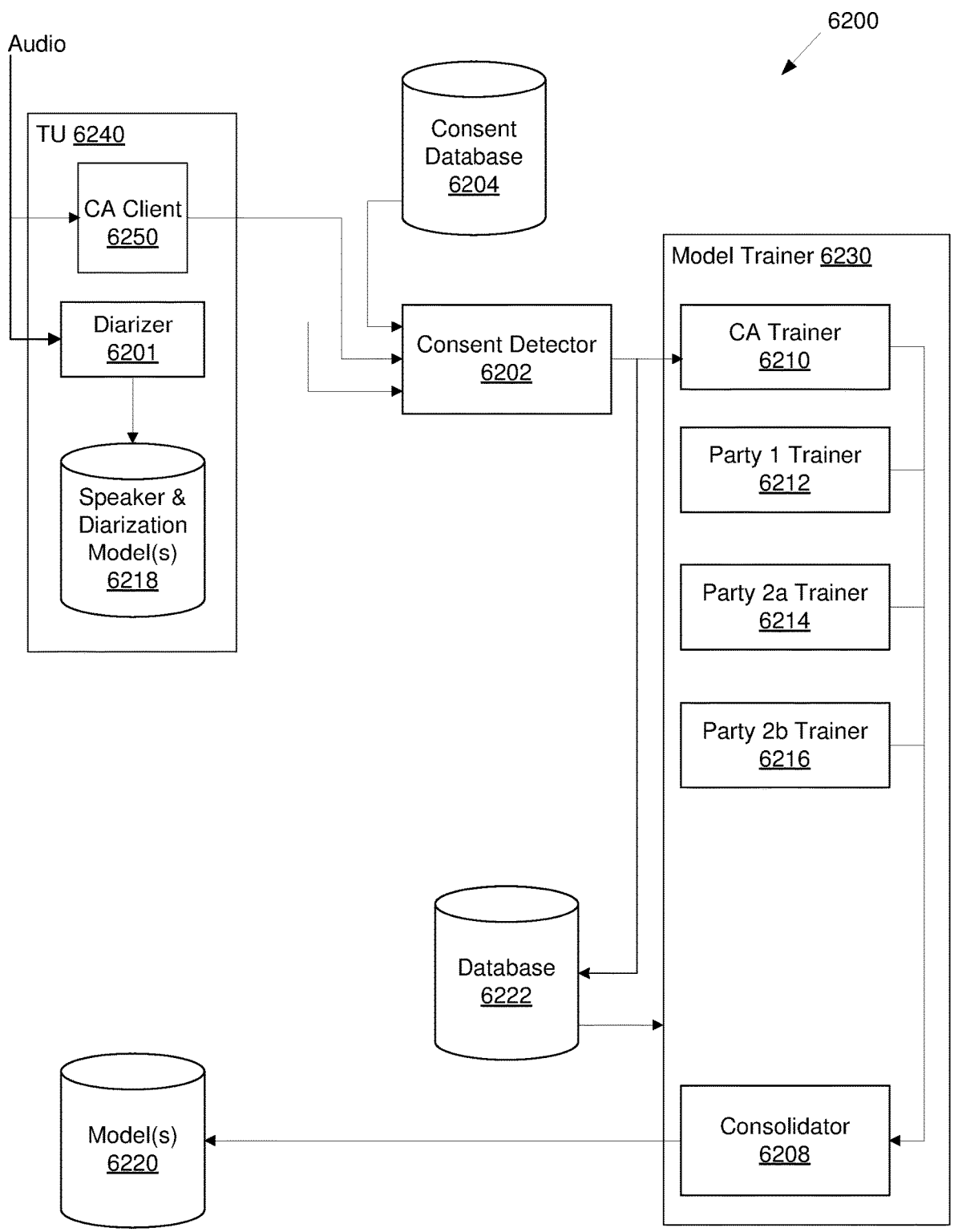
FIG. 58 illustrates an example environment for training models.

FIG. 58 illustrates an example environment 6200 for training models, in accordance with some embodiments of the present disclosure. In some embodiments, the environment 6200 may be configured for training models contingent on consent from participants of a communication session. The environment 6200 may include a transcription unit 6240 that may be configured with a diarizer 6201, a CA client 6250 associated with a CA that may revoice audio of the communication session. The diarizer 6201, in some embodiments, may be configured to identify various voices in the audio of the communication session. In some embodiments, the audio may be directed to the diarizer 6201 and the CA client 6250. The diarizer 6201 may identify the different voices and send the audio associated with the different voices to a consent detector 6202. The CA client 6250 may provide revoiced audio from the CA to the consent detector 6202.

The consent detector 6202 may determine whether the CA and the people associated with the voices in the audio of the communication session have provided consent to record, transcribe, extract statistics such as n-grams, use for ASR or model training, provide captions, or otherwise use the voices of the people and the CA.

In some embodiments, a consent database 6204 contains consent policies. Consent policies may define rules and methods and may be changed based on shifts in company guidelines, procedures, court rulings, requirements from regulatory agencies, customer/vendor contracts, and legal statutes. The policies may differ based on what data is being captured from the communication session. Examples of the data that may be captured is provided in Table 15.

In some embodiments, each party, such as each voice in the communication session and the CA, and with respect to a communication session, may have an associated set of consent records and rules. The consent detector 6202 may be configured to determine, for each piece of data, whether the environment 6200 has adequate consent to use the data for purposes such as to (1) provide a transcription service, (2) train or adapt models for ASR, confidence, capitalization, punctuation, etc., (3) extract statistics such as n-grams, (4) record communication session audio, (5) record communication session transcriptions, (6) record other communication session data. The consent detector 6202 may also determine whether only non-private data may be used or whether private data may also be used.

In some embodiments, the consent database 6204 may include a record of the type of consent obtained from each party. Types of consent may vary depending on what is being recorded. Consent records may include or may be derived from signed agreements, activity on a website, interaction with a user device, etc. Consent records may include information on the type of data that may be captured, how the data may be used, whether the consent applies to a minor and/or is provided by a parent or guardian, the identity of the entity providing consent (e.g. the party, a guardian, an authorized representative, a court issuing a warrant or subpoena, a federal law, a state law, a local ordinance, a notice or regulation from a regulatory agency, a court ruling, a legal opinion such as from a law firm, or a government agency providing a waiver or other legal authorization) and the relationship of the party to the entity providing consent, and notations on revoked consent. In some embodiments, consent may be requested in exchange for providing a transcription service, a promise to use the training to improve accuracy, for a discount (including free) on a transcription or other service, or for monetary compensation.

In some embodiments, the environment 6200 or person collecting consent may advise the consenting party on procedures for revoking consent or deleting stored data. A prompt, such as text on a display or an audio recording, may advise one or more parties as to the process for revoking consent. A party may revoke consent using mechanisms similar to those for providing consent such as via a website, soft key, voice command, or Dual Tone—Multi Frequency (DTMF) input. If a party revokes consent, communication session data may be deleted and further recording and gathering of data may be discontinued. A confirmation prompt may be played to one of more of the parties such as "This communication session will not be recorded." For example, a DTMF detector may be configured to detect a DTMF sequence such as "##" during a communication session and, if detected, may delete the communication session data and discontinue further storing of data.

If consent is granted or refused, the party's response may be saved in the consent database 6204 and retrieved during future conversations. In some embodiments, during future conversations, the prior consent record may be retrieved from the consent database 6204 by the consent detector 6202, and, if deemed to remain in force, the consent detector 6202 may indicate that consent is granted. In these and other embodiments, the consent detector 6202 may be configured to present a recorded announcement regarding the previously-obtained consent to indicate communication session data may be captured during the current communication session, such as recording of audio, before capturing of the communication session data. Alternatively or additionally, the consent detector 6202 may be configured to require a response from the consenting party before capturing communication session data for every communication session. Consent may be collected through one or more of several mechanisms:

1. Consent may be collected as part of a CA's employment agreement.
2. A human representative or automated system may bridge onto a communication session such as a captioned communication session, place a communication session, or receive a communication session and ask one or more parties for consent. The human representative or automated system may use, for example, text or audio to make the request and DTMF or speech recognition to collect the response. The communication session may be audio or video.
3. An automated recording may be played for one or more parties on a communication session advising them that the communication session may be recorded or otherwise used.
4. A service may send an SMS, MMS, IM, chat, email, or other text message to a party asking for consent. Consent may be collected by a return text message, by selecting an option presented by the text message, or following a link, such as a link provided in the text message.
5. A user device may advise the user of the data collection and/or ask for consent, such as by playing a recording or displaying text on the screen. The user device may collect consent via a screen tap, button press, vocal authorization, touch tones, a mouse click, or by following a link.
6. An application running on a PC, smartphone, computer, tablet or other user device may advise a party that the communication session may be intercepted and may request consent via a recorded or synthesized audio prompt, displayed text, or other mechanisms. The party being asked for consent may grant or refuse consent verbally (to be understood by a person or ASR system), by gestures such as screen swipes or clicks, via sign language, using keyboard and/or mouse input, by use of other input devices, by following a link to a site providing details and collecting consent, or by continuing to use the service with the understanding that doing so implies consent.
7. A party may grant consent by signing a service agreement (on paper or electronically) or by otherwise agreeing to conditions of service such as a EULA.
8. A party may sign a consent form.
9. A party may grant consent on a website.
10. A first party on the phone conversation such as a subscriber (Party 1) may ask a second party (e.g., the transcription party) for consent. A service representative or an ASR system may listen to the request and to the second party's answer, then record the response as audio and/or text. Alternatively, the first party may take action such as pressing a button to indicate consent on behalf of one or both parties.
11. An analyzer may evaluate the legality of recording based on consent provided by one or more calling parties and on state laws pertaining to one or more calling parties. For example, if a first party in a one-party state provides consent, the analyzer may determine whether a second party is also in a one-party state, and if so, may determine whether the second party may be recorded.
12. A first device used by a first party (e.g., Party 1) may transmit a message to a second device used by a second party (e.g., the transcription party) requesting consent. The second device may request consent from the second party, and may provide links or text providing details of the terms and policies related to consent. The user of the second device may indicate consent using the second device and his/her response may be transmitted to the first party's device and/or stored in the consent database.
13. Playing periodic beep tones indicating that the communication session is being recorded.
14. A first party may be offered an incentive for providing consent. An application may display on a screen an offer to provide captioning, communication session transcriptions, conversation summarization, the ability to search and query content of current and previous communication sessions, or other features and benefits in return for consent. The display may also invite the first party to ask a second party for consent.
15. The party being asked for consent may receive a link or other option for viewing terms and conditions, privacy policies, and other details regarding consent.
16. A parent or legal guardian may provide consent for a minor or child under the legal age of consent.
17. A party with power of attorney may provide consent for another party, such as a party who is not competent (e.g. lacks mental capacity) to provide consent.
18. A government entity or an authorized representative may provide consent on behalf of the party to which the consent applies.

In some embodiments, in response to the consent detector 6202 determining that a party has consented to the use of the communication session data, the consent detector 6202 may direct the party's communication session data to a model trainer 6230 or a database 6222 for storage. In response to the consent detector 6202 determining that the consent is inadequate, the consent detector 6202 may take action during or after the communication session such as playing or displaying prompts to a party (e.g., "Click 'OK' to allow us to record the communication session") and collecting further consent information from the party. In some embodiments, the consent detector 6202 may determine that adequate consent exists for a first party (e.g., Party 1), but not for a second party (e.g., the transcription party) and enable training and/or recording for the first party only.

In some embodiments, the consent detector 6202 may take into account the locality of the calling parties in making the decision to train and/or record (see #11 on the list above). Suppose, for example, a first participant of a communication session grants consent and is in a one-party state (a state that allows recording of a communication session as long as one party consents). The consent detector 6202 may enable training and/or recording for the first participant. Depending on an assessment of the legality, consent detector 6202 may enable training and/or recording for a second participant of the communication session. For example, in response to the first and second participants being in one-party states or locales, the consent detector 6202 may enable training and/or recording for both parties. In these and other embodiments, the consent detector 6202 may determine the locations of the participants based on phone numbers or other device identifiers of the participants associated with one or more one-party states. In some embodiments, the consent detector 6202 may further consider other evidence regarding the locations of the participants such as current location estimated from GPS, IP address, or proximity to cell towers in known locations.

In some embodiments, if a first participant is in a one-party state and a second participant is in a two-party state (a state that requires consent from both or all parties) and only the first participant has granted consent, then the consent detector 6202 may collect varying amounts of communication session data for each participant. For example, the consent detector 6202 may enable collecting n-grams for the second participant and may enable recording of audio for the first participant. Alternatively or additionally, if either participant is in a two-party state or if the state is unknown, the consent detector 6202 may decide to collect data based on factors other than locality, such as current federal laws and regulations, or may request consent from one or more participants.

In some embodiments, the consent detector 6202 may detect consent from one or more participants of a communication session and treat communication session data from each participant according to the consent status and applicable policies for that participant. For example, a CA, a subscriber, a first speaker using a transcription participant device, and a second speaker using a transcription participant device may each have different consent status and may each fall under different policies. In this example, data collection by database 6222 and model training by model trainer 6230 for each of the aforementioned participants may be governed by the decisions of the consent detector 6202 for each respective participant.

As illustrated, the training components of the model trainer 6230 are separate; however the training components may be combined into fewer or more components, depending on the training and consent methods implemented. Similarly, the consent detector 6202 may act for multiple parties; however it may be divided into multiple consent detectors 6202, each for one or more parties. The training components may train, create, or adapt separate models for individuals or groups of individuals, or they may train, create, or adapt speaker-independent models on data from multiple callers. For example:

1. Collections of audio samples may be combined, weighted according to how much influence each data source should have in the final result, and used to train an acoustic model to be used for any of multiple callers. In some embodiments, data collection and ASR model training may be responsive to accuracy or confidence scores, such as by weighting training data samples according to estimated accuracy or confidence of the sample ASR result. Estimated accuracy or confidence may be responsive to whether the sample was transcribed by a revoiced or non-revoiced ASR system, or by a combination thereof (see Table 1). In another example, ASR model training may train only on samples where confidence is above a selected threshold.
2. CA speech may be used to train ASR models adapted to recognize CAs. An ASR system using this CA-trained model may be used along with or instead of a speaker-dependent ASR.
3. Participant speech may be used to train or adapt a language model for transcribing the participant's side of the conversation.
4. Multiple data sources may be combined to train a single model or set of models. Additionally or alternatively, separate models may be built for each voice or group of voices.

In some embodiments, multiple types of models may be trained using the communication session data. Models that may be trained may include acoustic models, or language models, among others. In these and other embodiments, models may be trained for specific parties, such as a CA and/or participants of the communication session. In these and other embodiments, the model trainer 6230 may include trainers for each specific party. For example, the model trainer 6230 may include a CA acoustic model trainer, Party 1 acoustic model trainer, the Party 2 acoustic model trainer, etc. The model trainer 6230 may be responsive to the consent status or output of the consent detector 6202 and may, for example, select a model to be trained or the manner of training based on, for example, the existence of or type of consent. In some embodiments, the ASR model trainer 6230 may include the following type of training models:

1. A CA trainer 6210 may be configured to train models adapted to multiple CA voices from CA audio and transcriptions collected across multiple CAs. The transcriptions may be derived from an ASR system listening to the CA voice, from a text editor, from a fuser, from an offline transcription, etc. These models may be used by ASR systems for multiple CAs, where the ASR systems may be used in combination with or in place of a CA-adapted ASR system that may be speaker-dependent.
2. A Party 1 trainer 6212 may be configured to train models adapted to Party 1's voice. These models may be used to transcribe Party 1's voice from a Party 1 device. Transcriptions of Party 1 may be provided to the Party 1 device and/or the device of the transcription party. In these and other embodiments, the Party 1 may be a subscriber of a transcription service that includes the environment 6200.
3. A Party 2a trainer 6214 may be configured to train a first set of transcription party models adapted to a first speaker using a transcription party device that may be participating in the communication session with the Party 1 device. Models may be trained on text and/or audio collected when the diarizer 6201 determines that the first speaker is speaking. An ASR system may use the first set of transcription party models to generate a transcription when the diarizer 6201 determines that the first speaker is speaking.
4. Party 2b trainer 6216 may be the same as the Party 2a trainer, except that models are trained on and used for a second speaker using the transcription party device and detected using the diarizer 6201.
5. The model trainer 6230 may train one model for all subscribers (hearing impaired parties) and another model for all transcribed (nominally hearing) parties.

In some embodiments, a consolidator 6208, such as an acoustic model training and consolidation tool, may be included in the model trainer 6230. The consolidator 6208 may be configured to combine into a single model, training results from the multiple trainers in the model trainer 6230.

In some embodiments, content derived from participants, including transcriptions, models adapted to transcription parties, acoustic models, language models, punctuation models, capitalization models, voiceprints, and data collected for training adapted models may be stored on a user device or on another device where access to the data is controlled by the user device under direction of a subscriber of the transcription service that includes the environment 6200. Additionally or alternatively, content derived from the subscriber may be stored on a device where access to the subscriber data is controlled by the subscriber and content derived from a transcription party may be stored on a device where access to the transcription party data is controlled by the transcription party. In some embodiments, data may be sent to another location with permission from a party authorized to provide consent or with access to the data.

In some embodiments, the transcription party audio transmitted to the model trainer 6230 may be restricted in audio bandwidth (e.g., 4 kHz) or sampling rate (e.g., 8 kHz) due to having traversed a first network such as a telephone network. In these and other embodiments, subscriber audio may be captured at an audio bandwidth different than that of the transcription party audio and sent to the model trainer 6230 by way of a second network such as a data network. As a result, the ASR models and speech recognition software used to transcribe subscriber audio may be configured for a bandwidth different than that of the transcription party audio. For example, the ASR system and models used to transcribe the transcription party audio may use an 8 kHz sampling rate, while the ASR system and models used to transcribe subscriber audio may use a higher sampling rate such as 16 kHz.

An example of training models and storing data using the environment 6200 may include the following operations:

1. Retrieve a device identifier such as caller ID from one or more calling devices (e.g., the subscriber device or the transcription party device).
2. Use the device identifier to index speaker-dependent ASR models or diarization models 6218 or both. Diarization models may include speaker voice models.
3. The diarizer 6201 retrieves the models thus indexed.
4. The diarizer 6201 listens to the audio stream to extract speaker features.
5. The diarizer 6201 compares the speaker features to the diarization models 6218 (a.k.a. voiceprints).
6. In response to the diarizer 6201 finding a match, meaning for example that the difference between the speaker features and the speaker voice model is within a selected threshold, then the speaker's identity is determined. In some cases, multiple parties may have similar voices, in which case the diarizer 6201 may group them together as a single voice for purposes of training and identification.
7. The consent detector 6202 retrieves (1) the speaker's consent record and (2) the current consent policy from the consent database 6204.
8. In response to the identity determined for the speaker, the speaker's consent status, and the consent policy, the consent detector 6202 determines how communication session data from the speaker may be used, for example to be stored, used for training, and/or used to create or update a speaker voice model.
9. In response to the comparison failing to yield a match or if there is only one known speaker corresponding to the speaker's device identifier and if there is consent to create a speaker voice model (or if consent is not needed), the model trainer 6230 may create a new speaker voice model for the speaker using the data to train or adapt one or more models.
10. According to policies and the speaker's consent, the database 6222 may store other communication session data from the speaker. Stored data samples may be used, for example, for measuring accuracy, training models, creating speaker voice models, and as a basis for generating transcriptions.
11. Depending on criteria such as whether the match was sufficiently close, and contingent on consent, the diarizer 6201 may update a speaker voice model and/or ASR model with features extracted from the matched speaker.
12. The diarizer 6201 may send an updated model to the ASR system.

Modifications, additions, or omissions may be made to the operations described above without departing from the scope of the present disclosure. For example, the operations may be implemented in differing order. Additionally or alternatively, two or more operations may be performed at the same time. Furthermore, the outlined operations are only provided as examples, and some of the operations may be optional, combined into fewer operations and actions, or expanded into additional operations without detracting from the essence of the disclosed embodiments.

As an alternative to creating a model or models for each voice, the model trainer 6230 may create a number of models that match multiple voices. For example, (1) a population (say one-hundred thousand voices) may be clustered to identify, say, one-hundred groups of voices; (2) each voice may be assigned to the group or cluster that it most closely matches (the clustering and assignment criteria may be a voiceprint match); and (3) when a voice is detected, the characteristics for the cluster assigned to that voice may be retrieved and applied to the voice as if the cluster characteristics applied to that voice. Alternatively or additionally, instead of using speaker voice models, the diarizer 6201 may identify speakers based on a device identifier and may ignore the sound of the speaker's voice. In these and other embodiments, all parties using the same device may be treated as one person for purposes of diarization, display, and training or adapting ASR models. Alternatively or additionally, the diarizer 6201 may identify speakers based on estimated gender (using, for example, pitch). In these and other embodiments, all males using the same device may be treated as one person and all females using the same device may be treated as one person.

In some embodiments, the diarizer 6201 may detect whether the subscriber or the transcription party is speaking using one or more of multiple methods, including: (1) receive a stereo signal containing audio from the two parties, one party per channel (if signals are cross-contaminated, the diarizer 6201 may use an echo canceller to eliminate the residual); or (2) in the case where both voices are on one channel, match each voice against a voiceprint and identify the speaker based on voiceprint match.

In some embodiments, the diarizer 6201 may maintain a record, during the communication session or across communication sessions, of how many people using a given device are speaking and a model that describes the sound of each person's voice. An example of a diarization model is a voiceprint, a pattern that matches a given speaker, based on the speaker's voice. A voiceprint (i.e., a model used to confirm or detect the identity of a speaker) may be used to identify when a speaker changes and/or to identify the speaker. In some embodiments, identifying the speaker may indicate that a speaker's actual identity (e.g., name, location, company, account number, alias) is determined. Alternatively or additionally, there may be multiple speakers on a communication session. In these and other embodiments, identifying the speaker may include identifying the speaker as belonging to a particular voice among these multiple speakers and denote the speaker by an index or other code such as "speaker 3."

In some embodiments, the diarizer 6201 may identify speakers by gender or other demographic, using, for example, age and gender detection software to distinguish males from females, children from adults, etc., and may show the demographic information on a user device, such as a user device of a subscriber. An example of how gender may be displayed is:

Female speaker: I need to leave shortly.
Male speaker: I have to go too.
Child: Can I come?

If a speaker's name is known, the name may be displayed with transcriptions, for example:

David: It's time to make a decision.
John: I agree.

In some embodiments, the diarizer 6201 may obtain the speaker's name from a reverse directory lookup, indexed by the speaker's phone number or communication device identifier; from a name provided by the speaker's communication device, from a contact list belonging to one or more of the parties, from face identification and/or lip motion detection on a video communication session, or from a voiceprint analyzer working with an ASR system listening to the conversation and determining names from instances where parties verbally mention their own name or names of others on the communication session.

In some embodiments, the diarizer 6201 may distinguish between multiple voices from the transcription party's device. In these and other embodiments, the diarizer 6201 may be used as part of the process of training separate speaker voice models and acoustic, language, and other models for these voices. The diarizer 6201 may distinguish these voices from each other or identify them by matching them to separate speaker voice models, which may be part of the diarization models 6218.

In the depicted embodiment, an example additional voice may be identified as party 2b as opposed to the first voice and the party 2a voice. Audio and/or text from this additional voice may be shown in the figure as party 2b data and may be used to train a separate acoustic model.

In general, the diarizer 6201 being configured to distinguish speakers based on their voices during a communication session may result in the environment 6200 being configured to train individual acoustic, language and other models for individual speakers. For example, if a new voice is detected by the diarizer 6201, a new model may be created to characterize the new speaker's voice. A new set of ASR models may also be created and adapted to increase ASR accuracy for that voice. The voice (a.k.a. speaker) model may log information for the individual voice such as acoustic characteristics, favorite topics, vocabulary, and word usage. For each audio segment, the diarizer 6201 may compare the voice to a voiceprint and determine who is speaking and/or whether the speaker has changed. In response to a change of voice, in these and other embodiments, additional models may be created. Modifications, additions, or omissions may be made to the environment 6200 without departing from the scope of the present disclosure.

Figure 59:
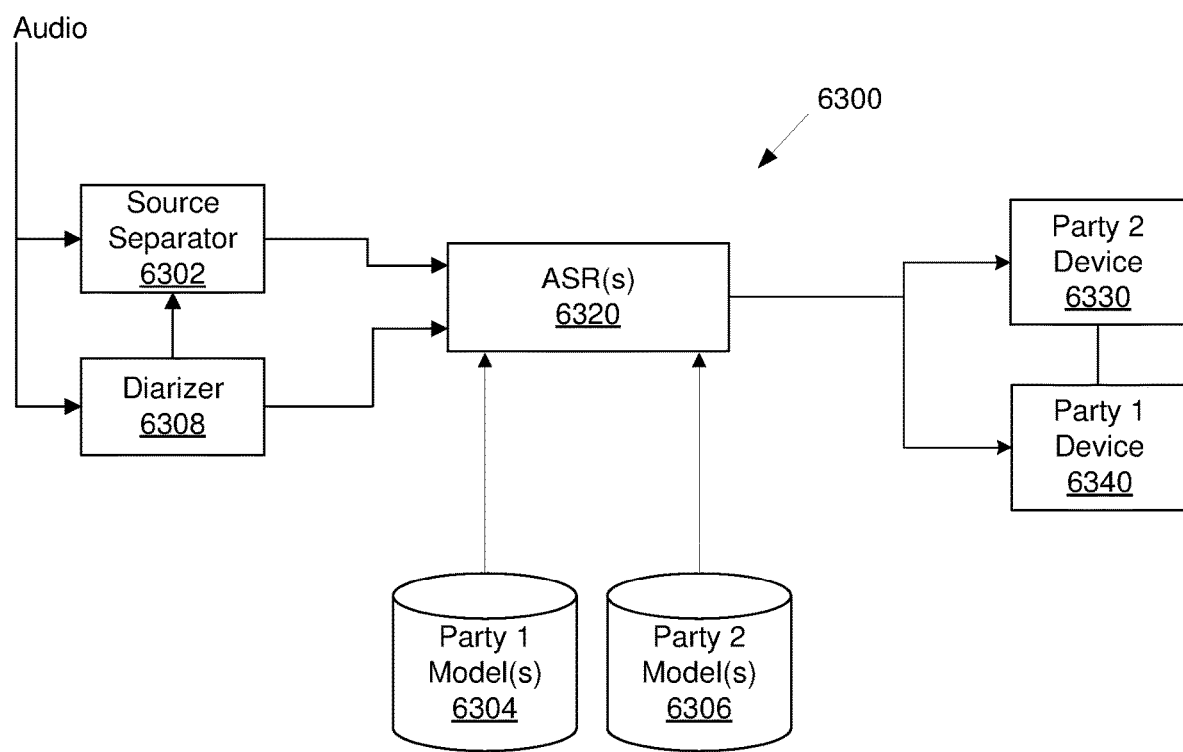
FIG. 59 illustrates an example environment for using trained models.

FIG. 59 illustrates an example environment 6300 for using trained models, in accordance with some embodiments of the present disclosure. In some embodiments, the speech recognition models may be trained separately. In these and other embodiments, a source separator 6302 may be configured to process communication session audio to determine different voices in the communication session audio, such as voices from party 1 and party 2, and to separate each voice into a unique audio stream that is provided to ASR systems 6320 for transcription. In some embodiments, a diarizer 6308 may provide information to the source separator 6302 on which speaker is speaking at a given time such that the source separator 6302 may generate the unique audio streams.

One example of a source separator 6302 is an echo canceller that receives two audio streams or channels, one carrying party 1's voice and one carrying party's 2 voice. In some instances, some of the signal from one channel may leak into the other channel but may be removed by the source separator 6302. For example, the source separator 6302 may use adaptive filtering to remove portions of party 1's voice from the party's 2 channel or vice versa. Another example of a source separator 6302 may include a blind source separator. In these and other embodiments, the source separator 6302 may receive a signal including two or more voices or other sound sources combined together into one channel and separate the sound sources into separate channels.

In some embodiments, the ASR systems 6320, as described previously, are configured to convert speaker audio into one or more transcriptions. For the sake of clarity, a single box is depicted, however it is contemplated that any number of ASR systems may be implemented. In some embodiments, the ASR systems 6320 may increase accuracy by listening to multiple sides of the conversation. For example, if one speaker says, "When are we meeting?" the ASR systems may estimate that a response from the other speaker saying, "Somewhere around four" is more likely than "Someone's at the door," and use the estimate to increase accuracy of output transcriptions.

In some embodiments, the language model in the ASR systems 6320 may represent conditional probabilities as being dependent on context from first and second parties. For example, the probability of a word may be expressed as P(word|context 1, context2), where context1 is context from the first party and context2 is context from the second party. In this example, a dual trigram language model may express the conditional probability of the word "four" and "door" as P("four"|context1="we meeting", context2="at the") and P("door"|context1="we meeting", context2="at the"), respectively. Similarly, a neural net language model may estimate the probability of one or more words given input to the neural net including the context of words from multiple speakers.

In some embodiments, the ASR systems 6320 may use language models for multiple parties to generate transcriptions. For example, transcriptions generated by the ASR systems 6320 using the voice from a first party may be performed using party 1 models 6304. In these and other embodiments, transcriptions generated by the ASR systems 6320 using the voice from a second party may be performed using party 2 models 6306. In some embodiments, the ASR systems 6320 may provide transcriptions of both parties to party 2 device 6330 and party 1 device 6440. Other combinations are contemplated.

Modifications, additions, or omissions may be made to the environment 6300 without departing from the scope of the present disclosure. For example, the party 1 model 6304 and the party 2 model 6306 may be combined into a single joint model that is built based on speech from both the party 1 and the party 2. In these and other embodiments, the ASR systems 6320 may use the joint model to generate transcriptions of audio from both the party 1 and the party 2.

Figure 60:
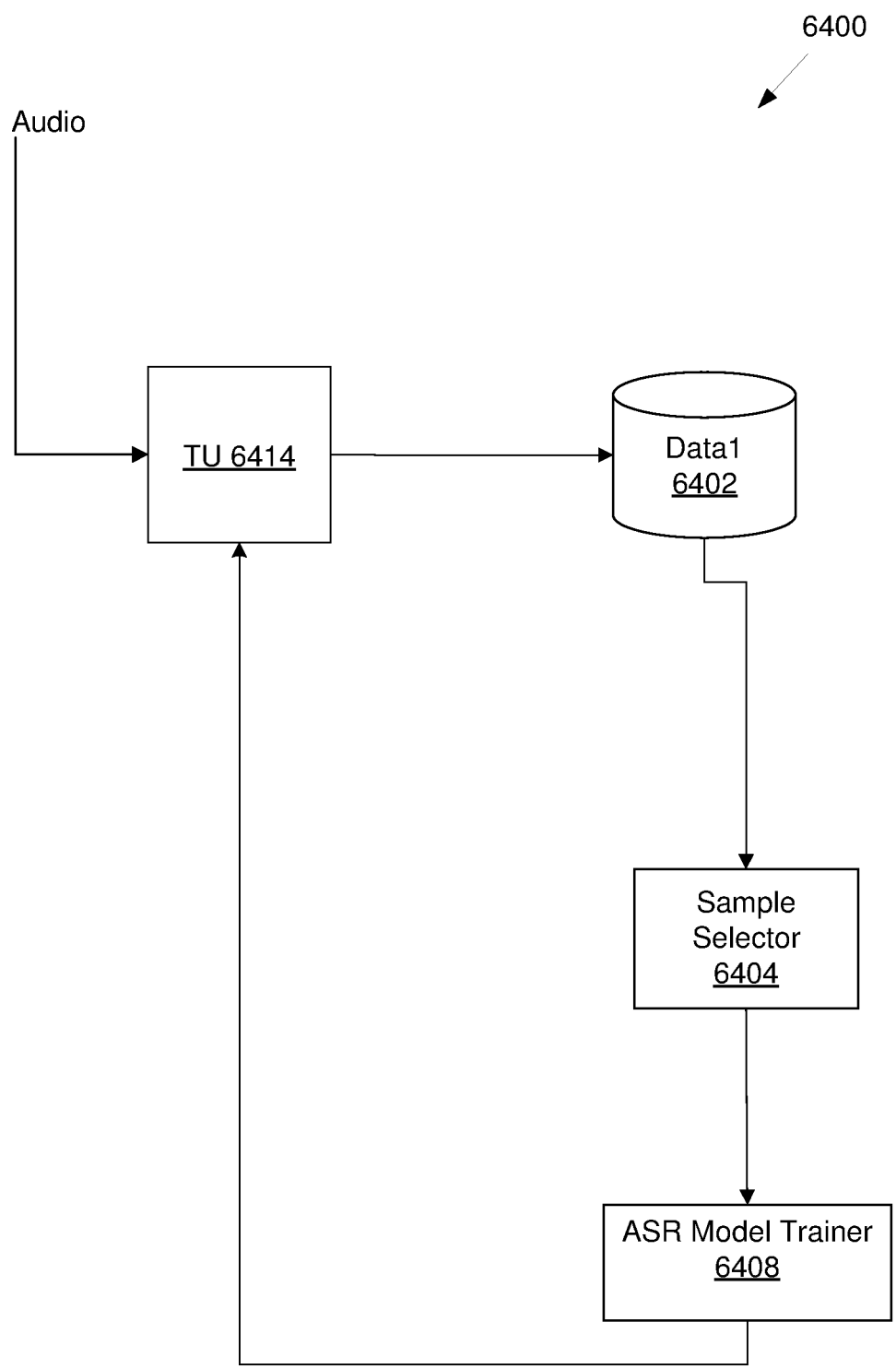
FIG. 60 illustrates an example environment for selecting data samples.

FIG. 60 illustrates an example environment 6400 for selecting data samples, in accordance with embodiments of the present disclosure. In some embodiments, the environment 6400 may be configured to select data samples that may provide a greater benefit in training models to improve transcription accuracy than other data samples.

Data, such as audio and/or transcriptions, from a transcription unit 6414 may be stored in a database data1 6402. Additionally or alternatively, when model training is being performed "on-the-fly," the environment 6400 may disable the database data1 6402 and not retain the data. The data may be provided to the sample selector 6404.

In some embodiments, the sample selector 6404 may select data that may provide a greater benefit in training models based on ASR confidence for the data. Alternatively or additionally, the sample selector 6404 may select data based on factors other than ASR confidence, such as: (1) how many idle revoiced transcription unit or data transcribers are available; and (2) the existence of a preexisting transcription, or the quality of a preexisting transcription.

In some embodiments, the data selected that may provide a greater benefit in training models may be configured to be generated using a higher-accuracy transcription method by the sample selector 6404. In some embodiments, the data may include audio. In these and other embodiments, to generate the higher-accuracy transcription, the selected audio may be transcribed using a human or other high-accuracy data transcriber, such as a revoiced transcription unit. The non-selected data may be transcribed using an ASR system. In some embodiments, the data may include a transcription. In these and other embodiments, edits may be made to the transcription to generate a higher-accuracy transcription. Alternatively or additionally, the data may include a transcription and audio. In these and other embodiments, a new transcription may be created and/or edits may be made to the transcription based on the audio to generate a higher-accuracy transcription. The data and/or the higher-accuracy transcriptions may be provided to ASR model trainer 6408, which may be analogous to the ASR model trainer 6108 of FIG. 57.

In some embodiments, the sample selector 6404 may provide information to a selector that may be configured to select between a revoiced or non-revoiced transcription unit to generate transcriptions for the data. In these and other embodiments, the information may direct the selector to select a revoiced transcription to handle communication session audio when the sample selector 6404 selects the data to have a higher-quality transcription. For example, the sample selector 6404 may determine that a communication session being handled by a non-revoiced transcription unit may provide a greater benefit in training models to improve transcription accuracy. Thus, the sample selector 6404 may direct the selector to select a revoiced transcription unit to handle the remainder of the audio from the communication session to generate higher accuracy transcriptions of the remainder of the audio.

In some embodiments, the sample selector 6404 may also provide confidence information to the model training process so that model training may weigh samples heavier based on the samples having a higher confidence. For example, the ASR model trainer 6408 may assign a smaller weight to samples having a lower confidence or may exclude the samples from training. Confidence may be determined, for example, using features and methods described herein for estimating confidence, accuracy, error rate, etc.

Additionally or alternatively, the environment 6400 may be configured to select substantially all transcriptions using speech recognition for training of models. In these and other embodiments, environment 6400 may make exceptions with respect to some audio. For example, the environment 6400 may not use audio from emergency communication sessions, higher-priority communication sessions, and communication sessions used for data collection.

In some embodiments, revoicing may be used to generate higher-accuracy transcription to train ASR systems. In these and other embodiments, audio used for training may be selected using active learning and sent to a CA client. When transcribing communication sessions for data collection, the CA client may be configured differently from when the CA client may transcribe live communication sessions. For example, for data collection the CA client may allow the CA to (1) rewind and listen to audio again, (2) lag behind real time, increasing transcription latency, and (3) skip portions of the input audio, such as when the CA gets behind or when the audio fails to meet specified criteria for usefulness in model training. In some embodiments, during data collection multiple revoicing transcription units may be bridged together on a single audio stream to generate multiple transcriptions. The multiple transcriptions may be fused to generate an output result. Modifications, additions, or omissions may be made to the environment 6400 without departing from the scope of the present disclosure.

Figure 61:
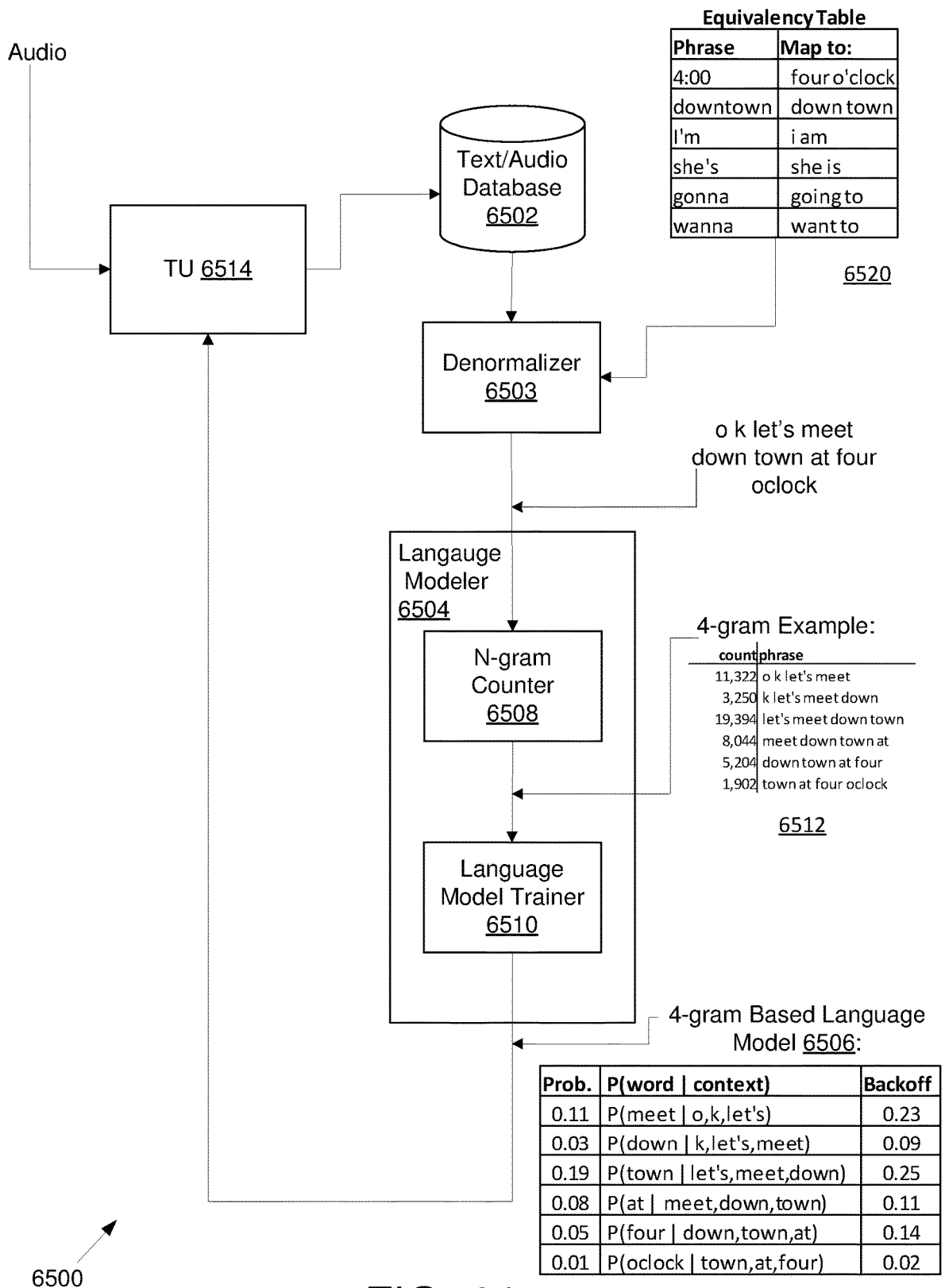
FIG. 61 illustrates an example environment for training language models.

FIG. 61 illustrates an example environment 6500 for training language models, in accordance with some embodiments of the present disclosure. In some embodiments, a transcription unit 6514 may generate a transcription from received audio. In some embodiments, one or more ASR systems and/or fusers in the transcription unit 6514 may use language models as part of the process of generating the transcriptions.

The transcription and the audio may be stored in a database 6502. Additionally or alternatively, when training of the models is being performed "on-the-fly," the environment 6500 may disable the database 6502 and not retain the data or allow the database to only save data briefly during on-the-fly training.

In some embodiments, transcriptions from the database 6502 may be provided to a denormalizer 6503. The denormalizer 6503 may apply rules or methods to the transcriptions to convert the transcriptions to a consistent or near consistent format. The denormalizer 6503 is illustrated as receiving input from the database 6502, however, in some embodiments, the denormalizer 6503 may be configured to receive input from the transcription unit 6514 and output to the database 6502 so that denormalized transcriptions are stored.

In some embodiments, the transcriptions may be used to train language models that may be used by the transcription unit 6514. A language modeler 6504 may be configured to train language models. In these and other embodiments, the language modeler 6504 may train a language model based on n-grams from transcriptions received by the database 6502 or denormalizer 6503. For example, a language model may be trained based on probabilities of n-grams. The probabilities of n-grams may be determined by the language modeler 6504 based on counting n-grams that occur in the transcriptions received by the language modeler 6504. An example table 6506 of probabilities for n-grams is illustrated.

In some embodiments, the language modeler 6504 may include an n-gram counter 6508 configured to count n-grams. Based on the counts of the n-grams, probabilities for the n-grams may be determined. A language model trainer 6510 of the language modeler 6504 may be configured to use n-gram counts and/or n-gram probabilities to train a language model. The language model trained by the language modeler 6504 may be provided to the transcription unit 6514.

In some embodiments, n-gram log probabilities may be stored and used in place of n-gram probabilities. In some embodiments, where there may be insufficient data or memory storage to count or use a given n-gram of length n, the n-gram counter 6508 may be configured to use a shorter n-gram (for example, one of length n−1). For shorter n-grams, a backoff probability may be used to modify the language model probability.

An example of the operation of the environment 6500 with respect to an example phrase is now provided. The transcription unit 6514 may recognize the phrase "OK, let's meet downtown at 4:00" from received audio. Using an equivalency table 6520, the denormalizer 6503 maps "4:00" to "four o'clock," "downtown" is converted to "down town," and so forth. The denormalizer 6503 outputs the phrase: "o k let's meet down town at four oclock." The n-gram counter 6508 updates an n-gram count table 6512 based on the n-grams in the received phrase. Based on the update, the language modeler 6504 may determine that 11,322 occurrences of "o k let's meet" have been counted. Based on the updated count of the n-grams, the language model trainer 6510 may determine that the probability of the word "meet" given that the preceding words are "o k let's" is 0.11 and the backoff factor is 0.23. Using the updated probabilities, the language model trainer 6510 may train a new language model that is provided to the transcription unit 6514. Modifications, additions, or omissions may be made to the environment 6500 without departing from the scope of the present disclosure.

Figure 62:
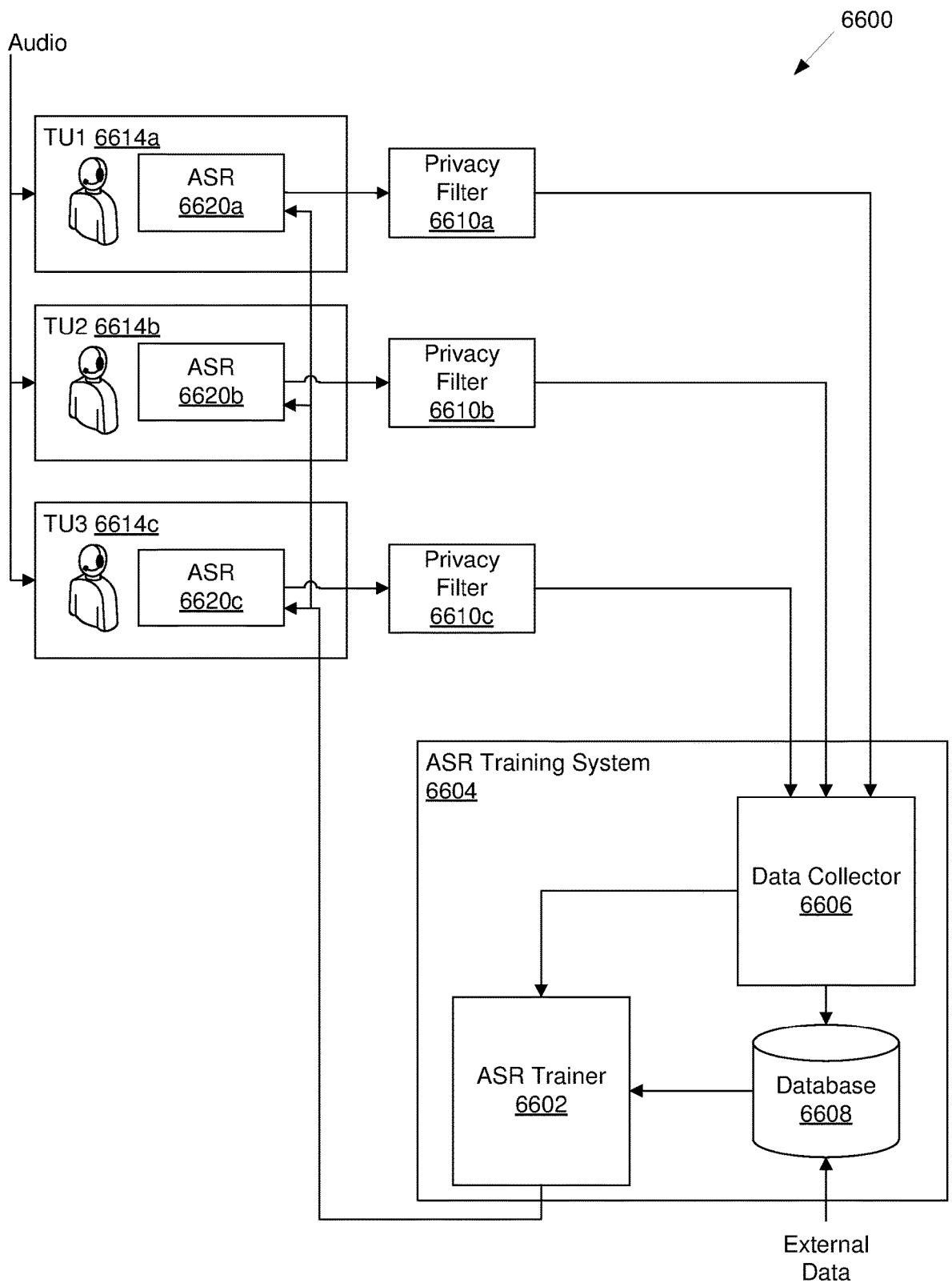
FIG. 62 illustrates an example environment for training models in one or more central locations.

FIG. 62 illustrates an example environment 6600 for training models in one or more central locations, in accordance with some embodiments of the present disclosure. In some embodiments, the environment 6600 may include transcription units 6614a-c, collectively transcription units 6614. Each transcription unit 6614 may include one of ASR systems 6620a-c. The environment 6600 may further include privacy filters 6610a-c, collectively, the privacy filters 6610 and an ASR training system 6604.

In some embodiments, the transcription units 6614 may obtain audio and generate transcriptions of the audio. The transcriptions may be provided to the privacy filters 6610. The privacy filters 6610 may filter the transcriptions to remove private data and send the remaining data to the ASR training system 6604.

In some embodiments, the ASR training system 6604 may include a data collector 6606 and the ASR trainer 6602. When data storage is permitted, the ASR training system 6604 may further include a database 6608. The data from the privacy filters 6610 may be provided to the data collector 6606. The data may include transcriptions and data structures. The data may be provided to the ASR trainer 6602 from the data collector 6606 or the database 6608. The ASR trainer 6602 may use the data to train ASR models. The ASR trainer 6602 may train speaker-independent or speaker-dependent ASR models. External data, such as commercial data, data from other services, or data from the Internet, may also be used to train the models.

In some embodiments, the privacy filters 6610 may convert data structures into forms that are anonymous. The data structures being anonymous may indicate that information identifying the speaker has been stripped out and that personal information has been removed. In some embodiments, the privacy filters 6610 may convert data structures into forms using a process that is a non-reversible. The process being non-reversible may indicate that information, such as text and audio, sufficient to reconstruct the audio or content of the conversation has been deleted. In making data nonreversible, the privacy filter 6610 may be configured to convert data into a format that may be used to train models but cannot easily be used to reconstruct the conversation. Examples of how anonymous, nonreversible data may be created and used to train an ASR system may include:

1. A transcription unit or a central server may count n-grams. N-grams may be used to train language models.
2. Model parameters, trained on information extracted from communication session data before the communication session data is deleted, are determined or adapted and used to train ASR models.
3. RNNLM (recurrent neural network language model) weights are adapted to communication session data, then used by the ASR trainer 6602 to train or adapt an RNNLM.
4. Data from substantially one side of the conversation is stored and used to train models such as acoustic and language models. Data from one or more other parties is deleted, such as at the end of the communication session. Alternatively, data from each party is disassociated such that data samples are separated from other stored data samples and stored in a format where the various samples are not linked, that personal information such as telephone numbers linking captured data to parties on the communication session is deleted or stored in a format or location disassociated with the communication session data, and that information linking the multiple sides of the conversation is deleted. The ability of an unauthorized person to reconstruct the conversation by matching silence endpoints to speech endpoints may be further impeded by adding or deleting silence in the recorded data and by separating and disassociating speaker turns, or portions of a conversation separated by silence or periods when the other party is speaking.
5. Data is collected from transcription units as follows: Deploy ASR systems in multiple transcription units, where ASR systems adapt to communication session or revoiced audio as it is processed. A privacy filter 6004 may convert data to a new format (e.g., features extracted from audio, intermediate model parameters, or ASR models) that provides increased privacy. A data collector 6606 collects data in the new format from each transcription unit. The ASR trainer 6602 uses the new data to train or adapt models. Examples of how this may be performed include:
    a. Each transcription unit converts audio and text data into a non-reversible form insufficient for reproducing the conversation. Example forms include:
        i. N-grams (see FIG. 63 and item (b), below).
        ii. Text features extracted from transcriptions of speech segments, where the temporal order of speech segments is discarded. Examples of text features may be n-grams or subword units such as phonemes.

iii. Acoustic features such as spectral features extracted from audio segments, where the temporal order of speech segments is discarded.
iv. In one variation of (ii) and (iii), the text features and audio features from the same segment may be associated with each other but disassociated from other segments.
b. Each transcription unit creates and counts n-grams. The data collector 6606 retrieves and combines n-gram counts from the transcription units and uses the counts to train a language model (see FIG. 63).
c. Each transcription unit creates or adapts a model based on communication sessions processed by that transcription unit. The data collector 6606 retrieves model updates from the transcription units and forwards them to the ASR trainer 6602. The ASR trainer 6602 uses model updates from the transcription units to create an ASR model. In some embodiments, the method for an ASR trainer 6602 using models from transcription units to train an ASR model includes averaging model parameters across transcription units. In some embodiments, the ASR trainer 6602 uses models from transcription units with an ASR system to process audio to create a higher-accuracy transcription. The ASR trainer 6602 uses the higher-accuracy transcription to train ASR models.
d. Each transcription unit generates and stores temporarily (a few seconds to a few days) data such as audio and text data. The ASR trainer 6602 retrieves audio and text data from the transcription units and uses it to train models. To preserve privacy, this process may use encryption and may anonymize, i.e., discard information related to the speaker's identity or personal information, the data before it is stored or before it is retrieved by the ASR trainer. After training on a first batch of data from transcription units and before training on a second batch of data from transcription units, the ASR trainer 6602 may delete the first batch of data.
e. Each transcription unit may generate and store temporarily (a few seconds to a few days) data such as audio and text data. The transcription units may execute part of the ASR training process, and forward intermediate results to the data collector, and then to the ASR trainer 6602, which completes the training process to train an ASR model.
f. If a transcription unit includes a speaker-dependent ASR system, the transcription unit may upload models or other files trained for use by the speaker-dependent ASR system to the ASR trainer 6602, which may use the models or files for training.
6. Statistics from speech or text segments, where the order of the segments has been deleted, is stored. These statistics are used to train models.

An example of using statistics to train models includes example operations provided below which may be performed by the components of the environment 6600:
1. Divide audio and/or text data into segments. The segment boundaries may be defined in terms of:
    a. A specified length of time.
    b. A specified number of speech analysis frames (i.e., a period of time, usually 5-40 ms during which speech is considered to be relatively constant, frames may overlap, frame rate is the distance or time between centers of adjacent frames).
    c. A specified number of syllables.
    d. A specified number of words or phrases (e.g., n-grams). For example, a segment may include a sequence of six words (i.e., n=6).
    e. A specified number of subword units such as phonemes. For example, a segment may include a sequence of features extracted across three phonemes.
    f. A specified number of speaker turns (i.e., a segment of time where one party speaks) as determined by, for example, periods of silence and/or where another party speaks.
2. Extract features (e.g., n-grams, spectral features, neural net weight values) from multiple segments.
3. Optionally filter data to remove sensitive information, such as redacted data.
4. Delete at least some information related to the order, association (such as a communication session identifier), caller identity, or sequential position of each segment. For example, relative temporal information or timestamps may be deleted so that the segments cannot be restored to their original order. In another example, n-grams may be counted or created and stored, but the order in which the n-grams appeared, any communication session identifiers, and the caller identity may be discarded. In another example, a series of features spanning a series of adjacent speech analysis frames in a segment may be saved, but the temporal relationship of this segment with respect to other segments may be deleted.
5. Store the extracted features (minus deleted and redacted information).
6. Discard the original audio and text.
7. Use retained data to train or adapt a model. For example, for each segment:
    a. Identify a model element where a segment may be an example, counterexample, or otherwise useful in training the model element.
    b. Train the model elements based on the segment.
8. Once multiple segments have been used to adapt a model, the model may be distributed to multiple ASR systems, such as ASR systems used by transcription units, where it may be used to transcribe speech for multiple speakers.

Modifications, additions, or omissions may be made to the operations described above without departing from the scope of the present disclosure. For example, the operations may be implemented in differing order. Additionally or alternatively, two or more operations may be performed at the same time. Furthermore, the outlined operations are only provided as examples, and some of the operations may be optional, combined into fewer operations and actions, or expanded into additional operations without detracting from the essence of the disclosed embodiments.

The process of training new models may be on-going, continuous, periodic, random, or it may be initiated in other ways. For example, the process may be initiated in response to data being received from transcription units, to a schedule, or to external data being received. The environment 6600 illustrates an embodiment where ASR systems and privacy filters 6004 are tied to the transcription unit 6614, but at least some of these components may be implemented elsewhere such as at the ASR training system 6604, which may be located on the same local network as the transcription units 6614 or remotely, such as at one or more central data processing sites. Modifications, additions, or omissions may be made to the environment 6600 without departing from the scope of the present disclosure.

Figure 63:
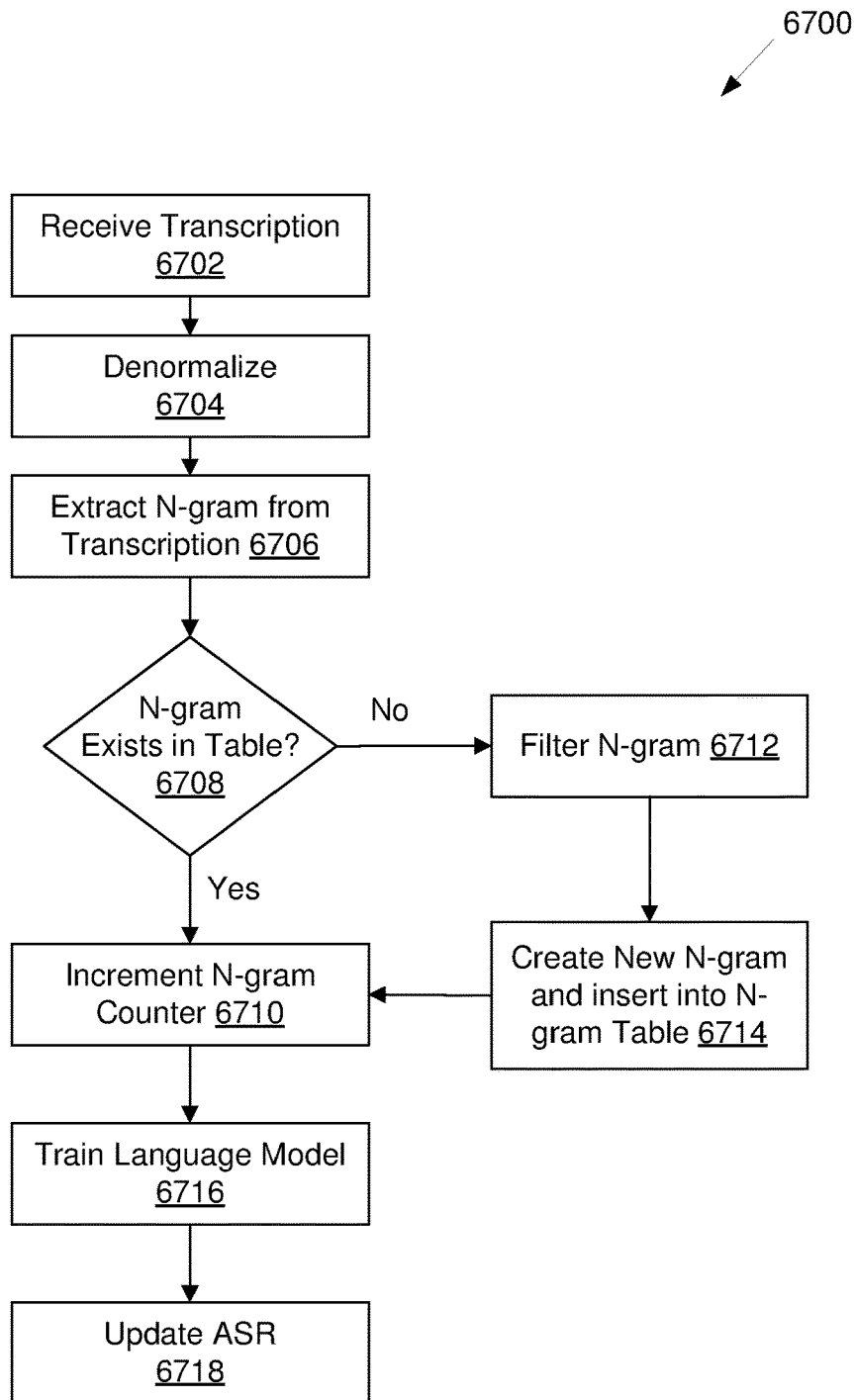
FIG. 63 is a flowchart of an example method of collecting and using n-grams to train a language model.

FIG. 63 is a flowchart of an example method 6700 of collecting and using n-grams to train a language model, in accordance with some embodiments of the present disclosure. The method 6700 may be arranged in accordance with at least one embodiment described in the present disclosure. The method 6700 may be performed, in some embodiments, by processing logic that may include hardware (circuitry, dedicated logic, etc.), software (such as is run on a general-purpose computer system or a dedicated machine), or a combination of both. In some embodiments, the method may be performed by language modeler 6504 of FIG. 61. The language modeler 6504 may include other components such as the denormalizer 6503 of FIG. 61 and the privacy filter 6610 of FIG. 62. In these and other embodiments, the method 6700 may be performed based on the execution of instructions stored on one or more non-transitory computer-readable media. Although illustrated as discrete blocks, various blocks may be divided into additional blocks, combined into fewer blocks, or eliminated, depending on the desired implementation.

The method 6700 may begin at block 6702 where a communication session transcription may be received. At block 6704, the communication session transcription or a portion of the communication session transcription may be denormalized. In some embodiments, it may be determined if the communication session transcription is already in a consistent or denormalized format. In response to the communication session transcription is already in a consistent format, the block 6704 may be skipped.

At block 6706, one or more n-grams may be extracted from the communication session transcription. In some embodiments, n-grams may be extracted by identifying a segment of words in the communication session transcription where the segment length is at most n words. An example value for n may be in the range of between about three and ten, although any reasonable number of words may be selected. In some embodiments, for a given value of n, segments of length n–1, n–2, n–3, and so on to a length of one word may also be identified. Each segment may be designated as an n-gram. The n-gram may be extracted from the communication session transcription before the portion of the transcription including the n-gram is deleted or overwritten.

At block 6708, it may be determined for each extracted n-gram if the n-gram exists in the n-gram table. An n-gram table includes a list of n-grams previously identified and counters, where each of the counters is associated with a different one of the n-grams. The values of the counters may indicate the number of occurrences for each n-gram. In response to the n-gram existing in the table, the corresponding counter is incremented at block 6710. In response to the n-gram not existing in the table, the new n-gram is designated as a candidate n-gram and the method proceeds to block 6712.

In some embodiments, an initial n-gram table may have been previously built using transcriptions. In these and other embodiments, the initial n-gram table may be used. Alternatively or additionally, an initial n-gram table may not exist. In these and other embodiments, the initial n-gram table may be built and the counters may be set to zero, another value, or random values for each n-gram. In some embodiments, an initial n-gram table may include n-gram counter values derived from a text corpus. The text corpus may be derived from text generated by a transcription service, text generated by another service, a publicly available corpus or database, information downloaded from websites, or other corpus.

At block 6712, the candidate n-gram may be filtered. In some embodiments, filtering the n-grams may include deleting or redacting personal information, private information, personally identifiable information, or other sensitive information. In some embodiments, an n-gram may be filtered if the n-gram includes at least one specified combination of information. An example of a specified combination of information may be a (a) name, street address, or driver's license number; and (b) information about the individual's health, medical care, financial accounts, or credit history. Another example of a specified combination of information may be (a) a person's financial account number; and (b) an associated password, PIN, security code. Other combinations may include combinations that specify two or more groups of information that, if items from all groups are included in the n-gram, the n-gram may be a candidate for redaction. Multiple combinations may be specified and the n-gram may be filtered if the n-gram includes any of the specified combinations. For example, a candidate n-gram "David's PIN is 1234" may be identified as a filter candidate because it contains a name and a PIN. The n-gram may be deleted, filtered, or otherwise processed using one or more of several methods, including:

1. N-gram may be deleted so that the candidate n-gram ("David's PIN is 1234") is not added to the n-gram table.
2. The n-gram may be filtered by deleting sensitive words or phrases and the redacted n-gram may be added to the n-gram table. The redacted term(s) may be replaced with a tag such as "_redacted_" (for example "_filtered_'s PIN is 1234" or "David's PIN is _redacted_").
3. The n-gram may be filtered by replacing sensitive words or phrases with class tags. A class may be a name, account number, digit, medication name, diagnosis, etc. Class tags may be characters or strings that represent the class and are not expected to occur otherwise in the text. For example, a name may be replaced with "_name_," _firstname_," or "_lastname_" (e.g., "_firstname_'s PIN is 1234"), a digit string with "_string_" (e.g., "David's PIN is _string_"), a digit with "_digit_" (e.g., "David's PIN is _digit_ _digit_ _digit_ _digit_"), a medication with "_medication_," etc. Class tags may be used to train class-based models such as hierarchical statistical language models. Examples of methods to replace sensitive information with class tags include:
   a. In a variation on replacing words with class tags, class member frequencies may be tracked in the n-gram table or in a separate table. For example, if "David" is replaced with "_name_," the counter for the unigram "David" may be incremented or n-gram counter 6508 may keep a separate table for filtered names, each with an associated counter.
   b. In another variation on replacing words with class tags, classes may be subdivided into subclasses to create more classes. Subdivision may be performed by defining specific subclasses. For example, names may be divided into male names and female names and classes "_male_name_" and "_female_name_" may be created. Alternatively, subdivision may be performed in a data-driven model such as clustering. For example, a natural language processing method may examine how names are used in context and determine that there are 50 classes of names where each class tends to appear over a range of contexts, so that classes such as "_name1_," "_name2_," "_name3_," etc., may be defined. If "David" is a member of the \_name23\_ class, then "David" may be replaced by "\_name23\_" in the n-gram.

c. Class-based n-grams may be upgraded to regular n-grams under selected conditions, such as based on frequency of occurrence. For example, if the n-gram "David Thomson has cancer" is used to create or increment a class-based n-gram "\_firstname\_ \_lastname\_ has cancer," and it is determined that a counter for the class-based n-gram exceeds a selected threshold, then the class-based n-gram may be flagged as eligible for provisional regular n-gram status, meaning, for example, that "David Thomson has cancer" (and other such n-grams containing real names) may be created and counted temporarily. If "David Thomson has cancer" accumulates over a specified threshold, such as 100 counts in a month, then it may be established as a regular n-gram, not subject to filtering.

d. The n-gram may be filtered by redacting enough sensitive information that the n-gram no longer contains a specified combination of information. For example, if an n-gram contains a personally identifiable word such as a name and a piece of personal information such as a password, the n-gram may be filtered by redacting only the name or only the personal information. Additionally or alternatively, the n-gram may be filtered by redacting all sensitive information in the n-gram.

4. The n-gram counter may be incremented in the n-gram table if the n-gram or its filtered version already exists. In some embodiments, multiple n-gram counters may be incremented, for example when there are multiple redacted forms. For example, if "David's PIN is 1234" is spoken and the n-gram is already in the n-gram table, its associated counter may be incremented. If "\_name\_'s PIN is \_filtered\_" is also in the n-gram table, its associated counter may be incremented as well. If the unigram "David" is in the table, it may also be incremented.

5. The value of n may be reduced for a particular n-gram so that sensitive information is effectively removed. For example, the candidate 4-gram "David Thomson has cancer" may be deleted and only the 3-grams, "David Thomson has" and "Thomson has cancer" may be kept.

6. Potentially sensitive n-grams may be stored in a secure or temporary location such as on the CA workstation or on a server local to ASR servers or CA workstations for a specified duration. If a selected number of instances of an n-gram have not been counted during that duration, the n-gram may be deleted. For example, "David Thomson has cancer" may be added to a provisional n-gram table and counted, but if, at a specified deadline such as after a week, the associated counter is less than 100, the n-gram may be removed. The minimum number of instances and deletion deadlines may vary according to the n-gram length and the type of potentially sensitive information contained.

7. Potentially sensitive n-grams may be stored in an n-gram table, but only forwarded to a language model trainer if the n-gram meets specified criteria such as if the associated count is greater than a selected threshold. This approach may limit risk by keeping potentially sensitive n-grams in one location (an n-gram table or a temporary n-gram table) and away from other locations such as model training sites.

A number of criteria may be evaluated when determining whether a term (one or more words) in an n-gram is sensitive, including one or more of:

1. The term may be a name in a selected format, which may be one or more of:
   a. The term may be a name.
   b. The term may be a first name.
   c. The term may be a last name.
   d. The term may be a first and last name.
   e. The term may be a first name immediately followed by a last name.

2. The term may be an account number or other potentially private numeric sequence. A string of digits may be determined to be sensitive in one or more of multiple ways, including:
   a. The string contains at least M digits. The value of M may be, for example, four for detecting PINs.
   b. The string of digits is wholly contained within the n-gram. For example, in the sentence "David's PIN is 1234," the n-gram "PIN is 123" may not be considered sensitive, according to this criterion, because part of the pin lies outside of the n-gram, whereas the n-gram "is 1234" may be considered sensitive.
   c. The string of digits has a length of at least M and the n-gram also contains the word "PIN."
   d. The string of digits has a length of at least M and is wholly contained in the n-gram.
   e. The string of digits matches an entry in a table, such as a table of account numbers or telephone numbers.
   f. The string length and format matches that of a telephone number. This criterion may be narrowed by requiring the n-gram to also contain one or more fixed phrases such as "my number is" by the speaker or one or more fixed preceding phrases such as "your number please" spoken by another party on the communication session.
   g. The string length and format matches that of an identification number such as a government-issued ID number. This criterion may be narrowed by requiring the n-gram to also contain one or more fixed phrases such as "driver's license number" by the speaker or one or more fixed preceding phrases such as "your social security number please" spoken by another party on the communication session.
   h. The string length and format matches that of a credit or debit card number. For example, if the initial digits of a digit string match those known to be associated with card numbers issued by a particular financial institution and if the string length is consistent with a card number, the format may be considered a match.

3. The term may be an email address.
4. The term may be all or part of a mailing address or current location.
5. The term may be a driver's license number or national ID number.
6. The term may be a license plate number.
7. The term may be a social security number or the last four digits of a social security number.
8. The term may be a health insurance number.
9. The term may be an IP address.
10. The term may be the name of a drug such as a prescription drug.
11. The term may contain information about a financial account such as an account number.

12. The term may contain information about a person's credit history or capacity.
13. The term may be a security or access code.
14. The term may be a monetary value related to a financial transaction or account balance.
15. The term may be a password.
16. The term may be a security question and/or the answer.
17. The term may be a digit string of a specific length or minimum length.
18. The term may be a string of digits spoken in a specified natural number format such as "thirty-six twenty-two" (as is commonly done with the last four digits of social security numbers) rather than "three six two two" or with pauses between sets of digits representing, for example, spaces or dashes between groups of numbers, such as in a credit card number.
19. The term may be an indication of religious views, practices, or affiliation, biometric information, political opinion or affiliation, gender or gender identity, sexual preference or activity, genetic information, health status, status of vision or hearing, ethnicity or birth place, race, or nationality.
20. The term may be found on a list of common medical or financial terms.
21. The term may be found on a list of terms such as "PIN," "credit," "debit," "password," "user," "username," "dollars," etc., designated as potentially related to sensitive information.
22. The term may be the name of a disease, information about medical care or medical condition (including mental health or substance abuse), or a diagnosis. This determination may, for example, be based on a lookup table of diseases, medical conditions, and diagnoses.
23. The term may be a name and one or more other pieces of sensitive information such as other examples of sensitive information from this list.
24. A corpus of text may be labeled to mark instances of sensitive information. A machine learning method, such as logistic regression or deep neural network training or another method from Table 9, may process the marked corpus to learn patterns associated with sensitive information and to create a sensitive information model. Once the model is created, a classifier may use the sensitive information model to identify n-grams likely to contain sensitive information.
25. The n-gram may contain at least one specified combination of sensitive information, where sensitive information may be one or more of the items listed above.

Since it may not be known whether a term such as a digit string is actually an account number, security code, or other potentially sensitive term, a term may be determined to be sensitive if its format matches one or more of the formats described in the list above. For example, the number 123-456-7890 may be determined to be sensitive because it matches the format of a telephone number, even though a privacy filter may not know whether it is a real telephone number. In some embodiments, a privacy filter may determine that a word is sensitive by comparing it to a table of examples, such as a list of names, medical conditions, key words, etc. Additionally or alternatively, a privacy filter may determine that a word is sensitive from the word in context, which may include one or more words that come before and/or after the word in question. The context may include capitalization and/or punctuation. For example, a neural net, logistic regression, or other classifier such as the examples in Table 9 may input the word and its context and determine that the word is sensitive based on how the word is used. The filter may determine, for example, that "bill" is a name in "I'm Bill Johnson," but not in "The bill is too high." In some embodiments, the classifier may be trained on a corpus of text where words are tagged according to their membership in a class such as medical conditions, drug names, etc.

The determination at block 6712 that an n-gram contains one or more pieces of information from the list above may be based on a format or lookup table. For example, the determination that a word is a name may be based on lookup tables containing first and last names. Alternatively, the determination may be based on capitalization of the word, the context in which the word appears, or other criteria. For security and privacy, audio, text, logs, billing records, n-grams, statistics, and other data forms derived from communication session data such as communication session data or calling information that may contain potentially sensitive information may be filtered for privacy, encrypted, held behind firewalls, protected with passwords, and restricted to access by a limited group of people. The security measures may apply to communication session data that is stored, statistics and other information derived from communication session data, and models built using communication session data.

At block 6714, a new n-gram may be created and inserted into the n-gram table. Additionally or alternatively, if creating new n-grams is considered a potential privacy risk, the processing logic may skip block 6714, and only count existing n-grams. If the new or candidate n-gram still exists after filtering for privacy, the n-gram may be added to the n-gram table and the corresponding counter may be set to 1, at block 6710. In some embodiments, when creating a new n-gram, an n-gram record may be created that includes the text of the n-gram and one or more counters. The new n-grams record may also include additional data fields such as a timestamp indicating a time and date of creation. The creation timestamp may be used, for example, in determining whether the n-gram is to be deleted or filtered. A timestamp may take on any of several formats, including the date and time of creation, the number of all types of n-grams or certain types of n-grams counted at the time or since the n-gram was created, the number of seconds since the data collection began, etc. By way of example, the column labeled "N" (for example, the number of n-grams counted since the n-gram was created) in Table 16 below illustrates an example of a timestamp in the n-gram table.

TABLE 16

| Count | Phrase | N |
| --- | --- | --- |
| 11,322 | o k let's meet | 11,204,199 |
| 3,250 | k let's meet down | 7,290,022 |
| 19,394 | let's meet down town | 11,204,204 |
| 8,044 | meet down town at | 11,203,202 |
| 5,204 | down town at four | 11,201,266 |
| 1,902 | town at four oclock | 10,292,338 |

Timestamps may be used, when training a language model to adjust for the duration of time over which an n-gram has been collected. For example, if one n-gram has been counted/detected for over a year and another n-gram was created only one day ago, the relative time spans may be taken into account when estimating conditional probabilities and for training a language model. An example of how this may be done is now provided.

Suppose a trigram, an n-gram where n=3, includes words w1, w2, w3. The conditional probability of w3 given w1 and w2 is P(w3|w1,w2) and may be determined as:

$$P(w3 \mid w1, w2) = \frac{P(w1, w2, w3)}{P(w1, w2)} = \frac{\text{count}(w1, w2, w3)}{\text{count}(w1, w2)},$$

where count(x) is the value of an n-gram counter associated with n-gram x. The language model entry for the n-gram (w1,w2,w3) may include the above conditional probability or a variation thereof such as a log conditional probability.

To account for collection time durations, a first timestamp may be defined as time T(w1,w2,w3) that corresponds to the number of n-grams of all types that have been created or counted since n-gram (w1,w2,w3) was created. A second timestamp may be defined as T(w1,w2) that corresponds to the number of n-grams of all types that have been created or counted since n-gram (w1,w2) was created. The timestamp-adjusted form of the conditional probability may be expressed as $$P(w3 \mid w1, w2) = \frac{\text{count}(w1, w2, w3)/T(w1, w2, w3)}{\text{count}(w1, w2)/T(w1, w2)}.$$

Advantageously, T(w1,w2,w3) may be stored in the record for n-gram (w1,w2,w3) and T(w1,w2) may be stored in the record for n-gram (w1,w2).

Additionally or alternatively, collection time durations may be accounted for by creating a counter for each n-gram and for an n-gram corresponding to the first n−1 words in the n-gram. For example, a record for an n-gram (w1,w2,w3) may include a first counter c3 that indicates how many times (w1,w2,w3) has been counted since (w1,w2,w3) was created, and a second counter c2 for (w1,w2) that indicates how many times (w1,w2) has been counted since (w1,w2,w3) was created. Whenever the n-gram (w1,w2,w3) is detected, c3 may be incremented. Counter c2 may be incremented whenever the n-gram (w1,w2) is detected. The timestamp-adjusted form of the conditional probability may then be determined as $$P(w3 \mid w1, w2) = \frac{c3}{c2}.$$

The conditional probability expressed in the above equation may be modified for use in a language model. A language model probability may be derived from the above conditional probability, for example by normalizing the probability by multiplying by a constant or applying a function, by taking the log probability, and/or by interpolating the language model with other language models. Other factors may be included such as multipliers for backoff probabilities and adjustments for cases where counters are too small to provide good estimates.

In some embodiments, if new or candidate n-grams are not used to create n-grams in the n-gram table, the candidate n-grams may be deleted. The steps described above may be performed for each n-gram in a transcription, and when complete, all existing copies of the communication session transcription (including normalized and denormalized versions) used to extract the n-grams may be deleted. Transcriptions, portions of a transcription, and candidate n-grams may be deleted by the processing logic under one or more conditions including:

1. When the transcriptions are no longer needed to provide transcriptions.
2. When the communication session ends. The end of the communication session may variously be defined as the point where one party disconnects, both parties disconnect, or when transcriptions are still being provided to or generated for at least one party.
3. Within a selected time, such as within a predetermined number of seconds after a communication session ends.
4. After selected criteria have been met, such as when the transcription system has had time to discontinue processing for the communication session.
5. When the transcriptions are no longer needed for training, such as to update an n-gram table. For example, a portion of a transcription may be deleted once all candidate n-grams have been extracted from the portion of the transcription, and the candidate n-grams may be deleted once they have been used to update the n-gram table.

At block 6716, a language model may be built using n-grams and counters in the n-gram table. The language model may be used, for example, by one or more ASR systems, interpolators, and fusers and to train other language models. At block 6718, the language model being used by ASR systems may be updated with the newly built language model.

In some embodiments, as discussed previously, the n-gram candidates may be filtered. In these and other embodiments, the n-gram candidate may be examined to determine information that may be filtered from the n-gram candidate. In some embodiments, the information that may be determined to be filtered may be sensitive information. The term "sensitive" as used here may include personal information, private information, confidential information, personally identifiable information (PII), sensitive personal information (SPI), etc. Examples of sensitive information may include passport number, date/place of birth, login name or screenname or handle, zip code, state (e.g. Idaho), mother's maiden name, dollar amount of an account balance or previous financial transaction, criminal record, grades, salary amount, or biometrics (face, handwriting).

In response to an n-gram candidate being determined to not include sensitive information, no information may be filtered from the n-gram candidate. In these and other embodiments, the n-gram candidate, may be used to create regular n-gram entries in a regular n-gram table with each regular n-gram entry corresponding to a counter that may be incremented as n-grams associated with the counters are encountered in transcriptions as described in block 6706. In response to an n-gram candidate including sensitive information such that the n-gram candidate may be filtered, the n-gram candidate may filtered.

In some embodiments, filtering an n-gram candidate may include deleting all of the sensitive information in the n-gram candidate, deleting some of the sensitive information to render the n-gram candidate not sensitive, deleting the entire n-gram, replacing all of the sensitive information, such as terms that are determined to be sensitive, with class tags associated with the terms, or replacing some of the sensitive information with class tags to render the n-gram candidate not sensitive. Filtering the n-gram candidates may result in filtered n-grams. The filtered n-grams may be used to train a language model for ASR systems. Examples of various methods that may use filtered n-grams to train a language model are now provided.

For example, one method may use the filtered n-grams to build hierarchal language models with a "top" grammar and one or more sub-grammars. In a hierarchal model, the top grammar may include a normal statistical language model trained from text. In these and other embodiments, class tags that may be included in filtered n-grams may be defined to link the top grammar to sub-grammars that represent classes. For example, consider an n-gram "John is a Democrat." The potentially sensitive information in the n-gram may include the terms "John" and "Democrat." The sensitive terms may be replaced with tags. The tags may be associated with classes. For example, the name John may be replaced with a tag of "first" that may be associated with the class for first names and the term "Democrat" may be replaced with a tag of "party" that may be associated with a class for political parties. The filtered n-gram may be created as follows "_first_ is a _party_." In these and other embodiments, a top grammar may be built or adjusted to include the classes associated with the tags "_first_" and "_party_." Alternatively or additionally, two sub-grammars of the top grammar may be built that may each be associated with one of the new classes. For example, a first sub-grammar may be one named "_first_," and may include unigrams of names such as, "david," "john," "mike," etc. A second sub-grammar may be named "_party_," and may include unigrams of different political parties, "democrat," "republican," "libertarian," etc.

In some embodiments, creating and counting n-grams may include counting unigrams, since collecting n-grams of length n may include collecting n-grams of length n−1, n−2, n−3, . . . , 1. As a result, a regular n-gram table may, assuming single terms are not sensitive, include unigrams and probabilities for terms (e.g. "david" and "democrat") of each class associated with the two sub-grammars.

In some embodiments, an ASR system may be configured to determine probabilities for n-grams including sensitive terms by using language models combined in the hierarchal structure as discussed above. In these and other embodiments, the probability of an n-gram may be determined from the probability of the filtered n-gram multiplied by the probability of a filtered term in the n-gram, given the term's membership in the class. For example, if the probability that a person's first name is john is $P(\text{"john"}|\_first\_)=0.017$, the probability that a person is a Democrat is $P(\text{"democrat"}|\_party\_)=0.31$, and the probability of the filtered n-gram is $P(\text{"\_first\_ is a \_party\_"})$ is 0.00001, then the ASR system may estimate the probability of the n-gram "john is a democrat" to be $P(\text{"John is a Democrat"})=P(\text{"\_first\_ is a\_party\_"})*P(\text{"john"}|\_first\_)*P(\text{"democrat"}|\_party\_)=0.00001*0.017*0.31=5.27e{-}08.$ For added security, in some embodiments, the probability of an n-gram estimated from existing n-grams or language models may be multiplied by and/or added to a random value. Random numbers may be multiplied and/or added during n-gram creation and/or updating. In the example above, if r1 and r2 are random numbers, an n-gram probability may be multiplied and added to random numbers as, $P(\text{"John is a Democrat"})=r1*[P(\text{"\_first\_ is a\_party\_"})*P(\text{"john"}|\_first\_)*P(\text{"democrat"}|\_party\_)]+r2$ Additionally or alternatively, probabilities may be estimated using counters. For example, the probability of a term in a class may be determined using the counter for the term divided by a counter for the class. The probability of an n-gram may likewise be calculated from the n-gram counter divided by the total number (T) of n-gram counts. For example, suppose 1000 members of the _name_ class have been observed and counted, the name "john" has been counted 17 times, 100 members of the _party_ class have been counted, and the word "democrat" has been counted 31 times. Suppose further, out of one billion n-grams, the n-gram "_first_ is a _party_" has been counted 10,000 times. The probability of the n-gram "john is a democrat" may be determined as $P(\text{"John is a Democrat"})=\text{count}(\text{"\_first\_ is a\_party\_"})/T*\text{count}(\text{"john"}|\_first\_)/\text{count}(\_first\_)*\text{count}(\text{"democrat"}|\_party\_)/\text{count}(\_party\_).=10,000/1,000,000,000*17/1000*31/100=5.27e{-}08.$ Additionally or alternatively, the language model may contain log probabilities and multiplication steps may be implemented as a summation of log values.

In some embodiments, terms in a class may include not only unigrams (n=1), but also n-grams of other lengths where n>one. For values of n greater than one, n-gram probabilities may be determined as above by multiplying the filtered n-gram probability by the class probability. For example, the probability of the n-gram "David Thomson PIN 1234," where a full name may be a class, may be determined as $P(\text{"David Thomson PIN 1234"})=P(\_fullname\_\text{"PIN 1234"})*P(\text{"David Thomson"}|\_fullname\_)$.

Another method for using filtered n-grams in ASR systems for generating transcription may include determining n-gram probabilities using filtered n-grams and storing them in a "fake" n-gram table or language model. The fake n-gram table may contain probabilities of n-grams that may have not been observed, such as n-grams that have not been extracted from a transcription as described in block 6706. In these and other embodiments, probabilities of n-grams that may have not been observed may be included in a fake n-gram table when the n-grams may be predicted to be relatively likely to occur.

Various methods for creating a fake n-gram table are now provided. For example, in some methods the n-grams may be generated by using the most likely (based, for example, on unigram probabilities) filtered terms from each class and combining them with filtered n-grams. Following the example from above, a fake n-gram table may be constructed by combining the filtered n-gram "_first_ is a _party_" with the 1000 most likely words in the _names_ class and the 20 most likely words in the _party_ class to create 20,000 fake n-grams for "_first_ is a _party_." The probability for each fake n-gram may be determined as above.

As another example, in some methods the existing n-grams or language models, including, for example, one or more regular, filtered, and (if there are any) fake n-gram tables, may be used to generate a random text corpus and the text may be used (e.g. by counting n-grams in the text) to create a fake n-gram table or to add new fake n-gram entries when a fake n-gram table already exists. As the random text corpus is being built, it may be determined if the frequency of occurrence of n-grams in the random text corpus matches the counts or probabilities of existing n-grams. In response to the frequency of occurrence of n-grams in the random text corpus not matching the counts or probabilities of existing n-grams, probabilities of n-grams being used to create the corpus may be adjusted so that n-gram frequencies of the final corpus may match or substantially match probabilities in the existing n-gram tables.

In some embodiments, the size of a fake n-gram table may be managed by including entries with a probability or count above a selected threshold. Additionally or alternatively, an auditor may periodically examine the fake n-gram table to remove n-grams based on criteria such as removing n-grams with probabilities below a selected threshold. Additional methods for pruning or compressing a language model may be used to prune or compress the fake n-gram table.

In some embodiments, filtered n-grams may be used to build a fake n-gram table as described above, but the counters may be initialized to zero. In these and other embodiments, the counters for the fake n-grams may be incremented in response to the fake n-grams being extracted in transcriptions as described with respect to the method 6700. Additionally or alternatively, the counter for each fake n-gram may be initialized to a random number instead of to zero. In these and other embodiments, initializing the counters to random numbers may obscure which counters have been incremented since the counters were created. Obscuring which counters have been incremented since the counters were created may provide one method to help protect the privacy of the sensitive information in the n-grams.

In some embodiments, the distribution of random numbers applied to the counters of the fake n-grams may be uniform, normal, Poisson, Cauchy, exponential, geometric, or binomial, among other distributions. In some embodiments, the distribution mean may be zero. In these and other embodiments, when a random number generator is used to generate initial n-gram counts and produces a negative number, the counter may be set to zero or it may be set to a negative value for counting, then set to zero when training a language model.

As another example, in some method filtered n-grams may be used to create a fake n-gram table may include using existing n-grams or language models to predict a value for each fake n-gram counter provide in the fake n-gram table. For example, let T be the total number of n-grams of all types with length n observed. T may alternatively be the number of words observed so far or the total counts of all regular and filtered n-grams. When a fake n-gram is created, the counter associated with the fake n-gram may be set to an estimated value. The estimated value may be equal to T multiplied by the estimated fake n-gram probability. For example, suppose one billion n-grams have been observed at the time a new fake n-gram "john is a democrat" is created. The counter of the fake n-gram may be initialized to:

count("john is a democrat")=$T*P$("_first_ is a_party_")*$P$("john"|_first_)*$P$("democrat-"|_party_)=1,000,000,000*0.00001*0.017*0.31=52.7

Alternatively or additionally, the counter of a fake n-gram may be initialized based on the counts of existing counters instead of probabilities. For example, the counter of a fake n-gram may be determined by multiplying the counter associated with the filtered n-gram by the probabilities of each word in each class in the filtered n-gram. For example, count("john is a democrat")=count("_first_ is a_party_")*count("john"|_first_)/count(_first_)*count("democrat"|_party_)/count(_party_).=10,000*17/1000*31/100=52.7

Alternatively or additionally, the counter of a fake n-gram may be initialized based on the counts of existing counters and the total number of words. For example, the counter of a fake n-gram may be determined by multiplying the probability of the filtered n-gram by T and by the counter of each word in the class, divided by the class counter. For example, count("john is a democrat")=$T*P$("_first_ is a_party_")*count("john"|_first_)/count(_first_)*count("democrat"|_party_)/count(_party_).=1,000,000,000*0.00001*17/1000*31/100=52.7

In some embodiments, n-gram counters may be rounded to integers or may remain as floating point numbers during creation and during counting. After creation, n-gram counters may be incremented as the n-grams are observed as described in the method 6700. Additionally or alternatively, n-gram counters may not be incremented and may be periodically updated using existing probabilities or counters as described above.

In some embodiments, instead of tracking a counter for each n-gram, fake or real, a probability of the n-grams may be tracked. In these and other embodiments, an initial n-gram probability may be determined, for example as described above. After determining an initial n-gram probability, the probability for a tracked n-gram may be updated each time any n-gram is observed by decreasing the probability slightly when the observed n-gram is not the tracked n-gram and increasing the probability slightly when the tracked n-gram is observed. In these and other embodiments, adjusting the probability of a tracked n-gram may be accomplished by, each time a new n-gram is observed, multiplying the tracked n-gram by a number slightly less than one, such as ($1-u$), where u is an update rate, and adding a very small number (u) when the tracked n-gram is observed. In some embodiments, to simplify the update process and use fewer resources, such as computing resources, tracking may happen in batches, for example by applying the update after a number (e.g. 1000) n-grams have been observed in production. In these and other embodiments, u may be a very small number such as 1/T. An example is now provided. Suppose an initial probability for "john is a democrat" is determined. Thereafter, each time an n-gram is observed, the "john is a democrat" n-gram probability may be updated as:

If the observed n-gram is "john is a democrat":$P$("john is a democrat")←$(1-u)*P$("john is a democrat")$+u$ If the observed n-gram is not "john is a democrat":$P$("john is a democrat")←$(1-u)*P$("john is a democrat")

In some embodiments, the update term may incorporate a second estimate, P2, of the n-gram probability. This second estimate may be determined using any method, such as those described above, used for creating the initial n-gram probability. The update term may then be the weighted average of the update term above and the second estimate, where B is the weighting factor. In some embodiments, B may be a number between zero and one. For example, If the observed n-gram is "john is a democrat":$P$("john is a democrat")←$(1-B)*[(1-u)*P$("john is a democrat")$+u]+B*P2$("john is a democrat")

If the observed n-gram is not "john is a democrat":$P$("john is a democrat")←$(1-B)*[(1-u)*P$("john is a democrat")$]+B*P2$("john is a democrat")

In some embodiments, the regular (non-filtered), filtered, and fake n-gram tables may be built and used separately. Additionally or alternatively, the tables may be combined into fewer tables. In these and other embodiments, each n-gram entry may include an indication that indicates whether the n-gram entry is a regular, filtered, or fake n-gram. Alternatively or additionally, the n-grams may all be put in one table with no indications regarding the type of the n-gram so that information regarding the method and date of creation of each n-gram is deleted.

In the various methods described above for creating n-grams from filtered n-grams as well as other, after creation of an n-gram and an associated n-gram counter, the n-gram counter may be incremented as the n-gram is observed in transcriptions as discussed with respect to the method 6700. Additionally and alternatively, n-grams may be created but not counted. In some embodiments, fake n-grams may be created and counted or not counted. Additionally or alternatively, fake n-grams may be created at various times and using various language models. In some embodiments, after a language model (or n-gram table) is used to create a fake n-gram or to update its counter or probability, that version of the language model may be deleted. For example, a first language model may be used to create an n-gram and may then be deleted, a second language model may be used to update the n-gram counter or probability and may then be deleted, and so on. After n-grams (either in counter form or probability form) are created and/or counted or updated, the n-grams may be used to train language models for use by ASR systems.

In counting and using n-grams and language models and in performing other computational operations, various methods exist and are contemplated for determining and using values of parameters such as counters, probabilities, logs, and products, among other parameters. In these and other embodiments, methods that result in comparable values or that achieve similar results as those discussed above and in this disclosure may be considered as equivalent of the methods disclosed and as within the scope of the disclosure. For example, n-grams may be estimated, stored, and used as counts (e.g., the number of n-grams observed), probabilities (e.g., the probability that an n-gram occurs), log probabilities, conditional probabilities (the probability of a word given its context), etc., and the associated forms and methods for using this different representations of n-grams or n-gram counts may be considered equivalent. As another example, a conditional log probability may be expressed as log P(A|B), log P(AB)/P(B), or log P(AB)–log P(B). In these and other embodiments, the different expressions of the conditional log probabilities may be used with a similar result and may be considered equivalent. Also, a language model may take any of several forms, including an n-gram table, n-grams converted to probabilities, log probabilities, or conditional probabilities, exponential language models, and language models with additional features such as smoothing, interpolation, and backoff probabilities, among other language model forms, all of which may be considered equivalent and contemplated types of language models.

The above steps may be generalized to other language model construction methods, including methods for training language models that use backoff probabilities, and to other n-gram lengths (i.e., lengths other than n=3 or n=4). The steps may be used to train other types of models such as acoustic models, confidence models, capitalization models, punctuation models, pronunciation models, feature extraction or transformation models, or other types of models.

Modifications, additions, or omissions may be made to the operations described above without departing from the scope of the present disclosure. For example, the operations may be implemented in differing order. Additionally or alternatively, two or more operations may be performed at the same time. Furthermore, the outlined operations are only provided as examples, and some of the operations may be optional, combined into fewer operations and actions, or expanded into additional operations without detracting from the essence of the disclosed embodiments.

Figure 64:
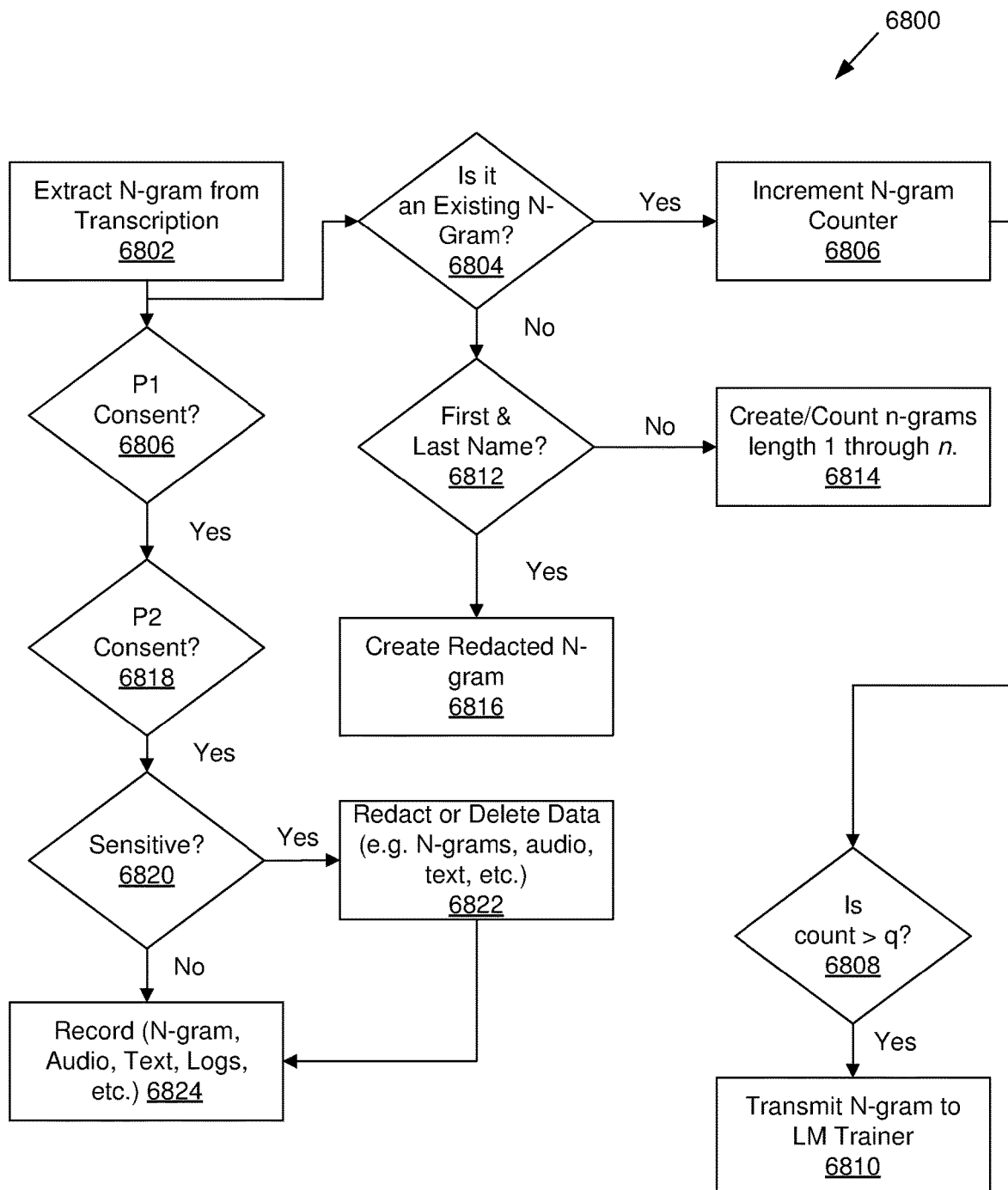
FIG. 64 is a flowchart of an example method of filtering n-grams for privacy.

FIG. 64 is a flowchart of an example method 6800 of filtering n-grams for privacy, in accordance with some embodiments of the present disclosure. The method 6800 may be arranged in accordance with at least one embodiment described in the present disclosure. The method 6800 may be performed, in some embodiments, by processing logic that may include hardware (circuitry, dedicated logic, etc.), software (such as is run on a general-purpose computer system or a dedicated machine), or a combination of both. In some embodiments, the method may be performed by the privacy filter 6004 of FIG. 56, or the consent detector 6202 of FIG. 58. In these and other embodiments, the method 6800 may be performed based on the execution of instructions stored on one or more non-transitory computer-readable media. Although illustrated as discrete blocks, various blocks may be divided into additional blocks, combined into fewer blocks, or eliminated, depending on the desired implementation.

The method 6800 may begin at block 6802 where one or more transcribed words may be received and an n-gram may be extracted from the received transcription. The method 6800 may simultaneously branch into two processes at blocks 6804 and 6806. Although the branches may be performed simultaneously, the branch that begins with block 6804 is discussed first.

At block 6804, it may be determined if the extracted n-gram exists in the n-gram table. In response to the n-gram existing in the n-gram table, at block 6806, the corresponding n-gram counter may be incremented. At block 6808, the incremented count may be compared to a threshold q. In response to the n-gram count not being greater than q, the n-gram may be maintained in the n-gram table but may not be used to train the language model. In some embodiments, the variable q may be a minimum occurrence threshold and may depend on n (the length of the n-gram) and other factors. In response to the counter being greater than q, at block 6810, the n-gram and the associated counter may be provided to a language model trainer where the n-gram may be used to train the language model.

Returning to block 6804, if is determined that the extracted n-gram does not exist in the n-gram table, at block 6812 it may be determined if the extracted n-gram includes a first and last name. In response to the extracted n-gram not including a first and last name, at block 6814, the extracted n-gram may be created and stored in the n-gram table. In some embodiments, the step of creating an n-gram table entry may include creating or incrementing n-gram entries of length n, n–1, n–2, n–3, etc., with the associated counters of any new n-grams set to one or some other number.

In response to the extracted n-gram including a first and last name, the method 6800 may proceed to block 6816. At block 6816, a filtered entry for the n-gram may be created in the n-gram table. The first and last name may be filtered by replacing the first name with "_FIRST_" and the last name with "_LAST_." Although the depicted embodiment illustrates steps for filtering a first and last name, any of the methods for detecting and filtering sensitive information described above may be implemented at blocks 6812 and 6816. Alternatively, the n-gram may be deleted without updating the table.

Returning to block 6806, it may be determined whether a first party ("P1") has provided consent to be recorded. If the determination is "no" then no recording is made. At block 6818 it may be determined if consent has been received from the transcription party ("P2"), and whether consent is necessary (i.e., if P1 and P2 are from one-party states/countries, consent of P2 may not be required). In response to consent being necessary and not provided, no recording may be made. In response to consent not being necessary or consent being necessary and being provided, the method 6800 may proceed to block 6820.

At block 6820, it may be determined if the communication session data (e.g., audio, transcription, n-gram, etc.) include sensitive information, such as private or personal information. In response to the communication session data including sensitive information, the method 6800 may proceed to block 6822. In response to the communication session data not including sensitive information, the method 6800 may proceed to block 6824.

At block 6822 the sensitive data may be deleted or filtered. The sensitive data may include n-grams, audio, text, logs, etc. Data to be recorded may depend on the type of consent obtained by the relevant party. Text may be filtered by deleting at least some of the sensitive portions of the text. Audio may be filtered by identifying sensitive portions of the text, using an ASR to align the text with the audio, and deleting the segments of audio aligned with the sensitive portions of the text. In some embodiments, the processing logic redacts or deletes the n-gram in a manner similar to that described above with reference to FIG. 63.

At block 6824, at least a portion of the communication session data is recorded. In some embodiments, the communication session data may be periodically purged or filtered. For example, an analysis of n-grams in the n-gram table may be performed to identify age and size periodically, randomly, or in response to an event. For example, if the age of an n-gram and its associated counter meet a set of selected criteria, then the n-gram may be deleted or filtered. For example, if an n-gram is over X weeks old and the counter is less than Y, then the n-gram may be deleted or filtered.

Modifications, additions, or omissions may be made to the operations described above without departing from the scope of the present disclosure. For example, the operations may be implemented in differing order. Additionally or alternatively, two or more operations may be performed at the same time. Furthermore, the outlined operations are only provided as examples, and some of the operations may be optional, combined into fewer operations and actions, or expanded into additional operations without detracting from the essence of the disclosed embodiments.

Figure 65:
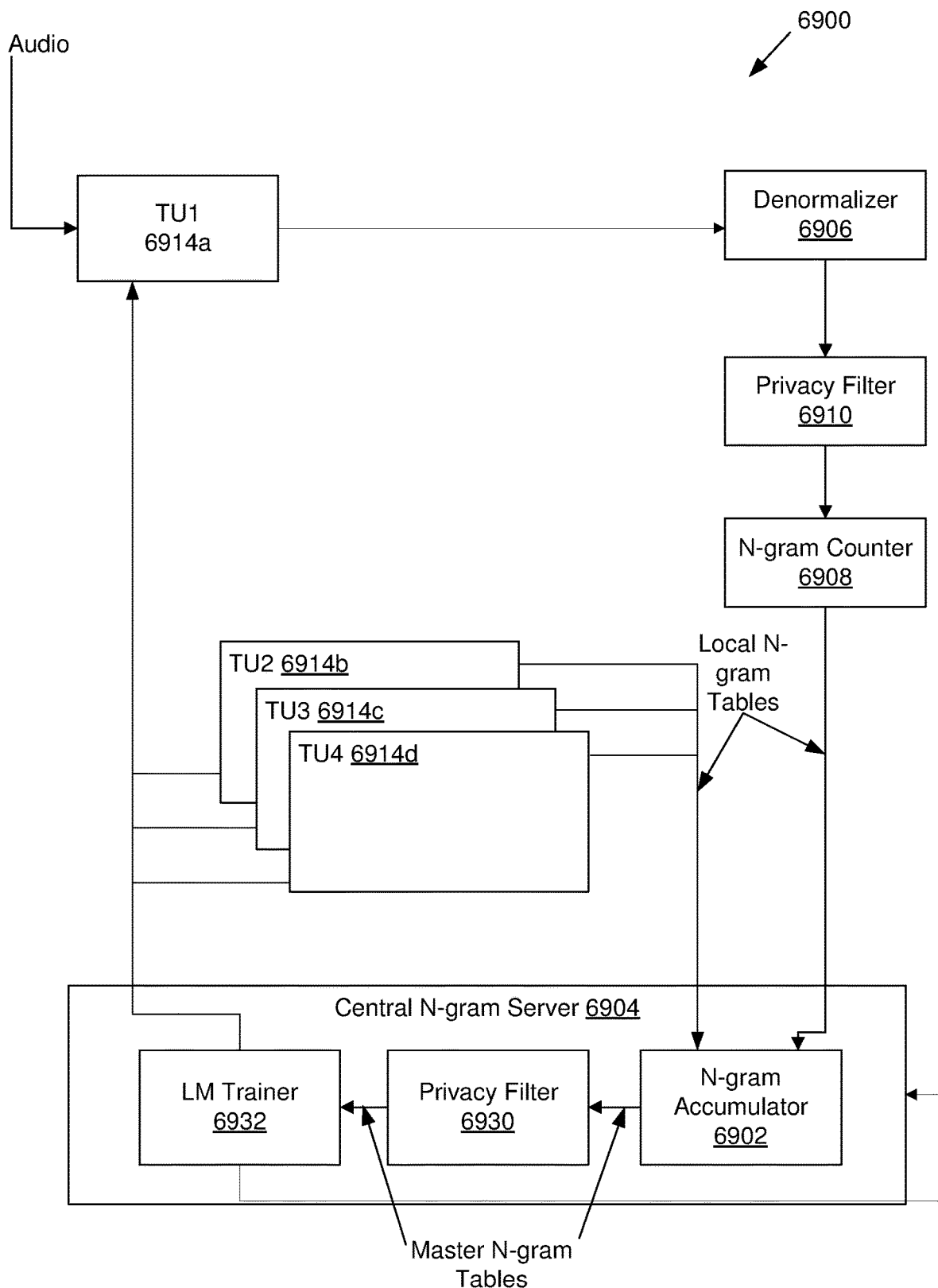
FIG. 65 illustrates an example environment for distributed collection of n-grams.

FIG. 65 illustrates an example environment 6900 for distributed collection of n-grams, in accordance with some embodiments of the present disclosure. In some embodiments, the environment 6900 may include multiple transcription units 6914a-d, collectively the transcription units 6914. The transcription units 6914 may be configured in various forms as described in this disclosure and configured to generate transcriptions. For example, the transcription unit 6914a may include a CA client, multiple ASR systems including a speaker-dependent and one or more speaker-independent ASR systems, a text editor, language models, and a fuser.

The transcription unit 6914a may provide a transcription to denormalizer 6906. The denormalizer 6906 may denormalize the transcription and provide the denormalized transcription to a privacy filter 6910. The privacy filter 6910 may be configured to remove sensitive information. The privacy filter 6910 may provide the transcription to an n-gram counter 6908 configured to extract n-grams from the transcription and count the number of occurrences for each n-gram. Additionally or alternatively, the n-gram counter 6908 may also perform other n-gram processing functions shown in FIG. 63 such as n-gram table lookups, and creating new n-grams. The n-gram counter 6908 may count occurrences of n-grams extracted from the transcriptions over a specified period of time to create a local n-gram table and upload the local n-gram table to an n-gram accumulator 6902. The upload may occur continuously, periodically, randomly, in response to some event, or during off-hours, such as at night. After the upload, the n-gram counter 6908 may reset counters in the local n-gram table to zero.

In some embodiments, the denormalizer 6906, the privacy filter 6910, and n-gram counter 6908 may be part of the transcription unit 6914a. Alternatively or additionally, the denormalizer 6906, the privacy filter 6910, and n-gram counter 6908 may be part of another system.

The transcription units 6914b-d may be configured to generate transcriptions. N-grams from the transcriptions may be exacted and the number of occurrences for each n-gram may be counted to form local n-gram tables. The local n-gram tables may also be uploaded to the n-gram accumulator 6902. In these and other embodiments, the transcription units 6914b-d may include elements analogous to the denormalizer 6906, the privacy filter 6910, and n-gram counter 6908. Alternatively or additionally, the transcription units 6914b-d may share elements analogous to the denormalizer 6906, the privacy filter 6910, and n-gram counter 6908.

The n-gram accumulator 6902 may be part of a central n-gram server 6904 and may be configured to collect and total n-grams, n-gram counts, timestamps, and other fields in n-gram records from multiple transcription units 6914. The steps of accumulating n-grams may include, for each n-gram received from a local n-gram table:

1. The n-gram accumulator 6902 may look up the n-gram in a master n-gram table.
2. If an n-gram in a local n-gram table is not found in the master n-gram table, the n-gram accumulator 6902 may create the n-gram in the master n-gram table with a counter value of zero.
3. The n-gram accumulator 6902 may add the n-gram counter value in the local n-gram table to the corresponding n-gram counter in the master n-gram table.

In some embodiments, a second privacy filter 6930 may be implemented in the central n-gram server 6904 and configured to provide privacy in addition to or instead of that offered by the privacy filter 6910. The second privacy filter 6930 may be applied to n-grams either before or after the master n-gram table is updated. A language model trainer 6932 may train a language model and transmit the language model to one or more ASR systems and/or fusers in the transcription units 6914. Additionally or alternatively, the transcription units 6914 may transmit transcriptions to the central n-gram server 6904, which may include a denormalizer, a privacy filter, and local n-gram counters analogous to the denormalizer 6906, the privacy filter 6910, and n-gram counter 6908.

Additionally or alternatively, the transcription units 6914 may stream audio to the central n-gram server 6904 that may perform speech recognition, then extract, count, and create n-grams. One or more ASR systems on the central n-gram server 6904 may return a transcription to the respective transcription units 6914. Modifications, additions, or omissions may be made to the environment 6900 without departing from the scope of the present disclosure.

Figure 66:
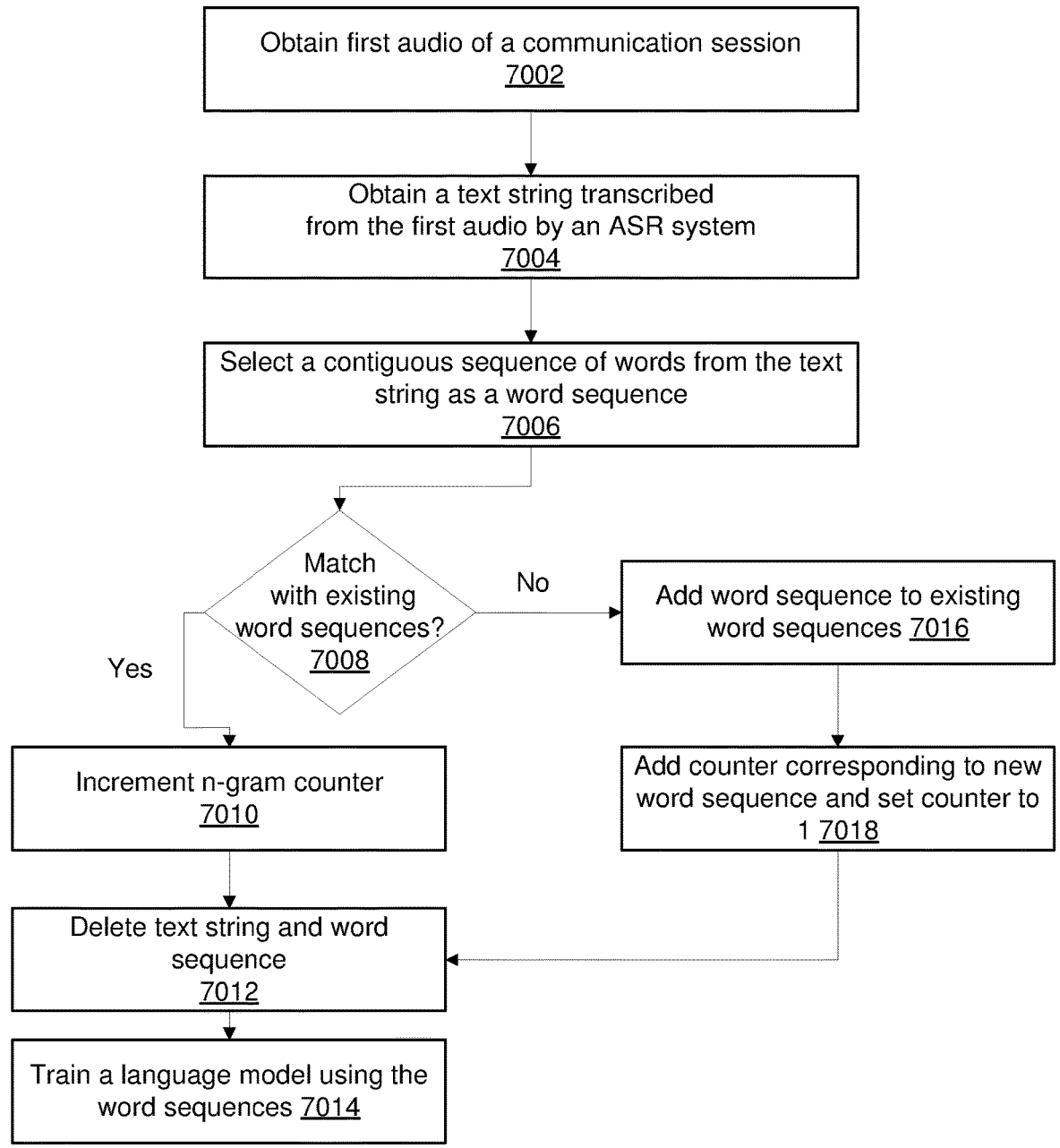
FIG. 66 is a flowchart of an example method of n-gram training.

FIG. 66 is a flowchart of an example method 7000 of n-gram training, in accordance with some embodiments of the present disclosure. The method 7000 may be arranged in accordance with at least one embodiment described in the present disclosure. The method 7000 may be performed, in some embodiments, by processing logic that may include hardware (circuitry, dedicated logic, etc.), software (such as is run on a general-purpose computer system or a dedicated machine), or a combination of both. In some embodiments, the method may be performed by the n-gram counter 6508 and/or the central n-gram server 6904 of FIGS. 61 and 65. In these and other embodiments, the method 7000 may be performed based on the execution of instructions stored on one or more non-transitory computer-readable media. Although illustrated as discrete blocks, various blocks may be divided into additional blocks, combined into fewer blocks, or eliminated, depending on the desired implementation.

The method 7000 may begin at block 7002, where first audio data of a communication session between a first device of a first user and a second device of a second user may be obtained. The communication session may be configured for verbal communication. At block 7004, during the communication session, a text string that is a transcription of the first audio data may be obtained from an automatic transcription system.

At block 7006, during the communication session, a contiguous sequence of words may be selected from the text string as a first word sequence. In some embodiments, the text string may be denormalized before selecting the contiguous sequence of words as the first word sequence.

At block 7008, during the communication session, the first word sequence may be compared to multiple word sequences obtained before the communication session. In these and other embodiments, each of the multiple word sequences may be associated with a corresponding one of multiple counters.

In response to the first word sequence corresponding to one of the multiple word sequences based on the comparison, the method 7000 may proceed to block 7010. In response to the first word sequence not corresponding to one of the multiple word sequences based on the comparison, the method 7000 may proceed to block 7016.

At block 7010, during the communication session, a counter of the multiple counters associated with the one of the multiple word sequences may be incremented. In some embodiments, each one of the multiple counters may indicate a number of occurrences that a corresponding one of the multiple words sequences is included in multiple transcriptions of multiple communication sessions that occur between multiple devices. In these and other embodiments, the multiple devices may not include the first device and the second device.

At block 7012, after incrementing the counter of the multiple counters, the text string and the first word sequence may be deleted. In these and other embodiments, the first word sequence may be deleted during the communication session. Alternatively or additionally, the text string may be deleted during the communication session.

At block 7014, after deleting the text string and the first word sequence, a language model of the automatic transcription system may be trained using the multiple word sequences and the multiple counters. At block 7016, the first word sequence may be added to the multiple word sequences. At block 7018, a counter for the first word sequence may be created and updated to a value of one.

Modifications, additions, or omissions may be made to the operations described above without departing from the scope of the present disclosure. For example, the operations may be implemented in differing order. Additionally or alternatively, two or more operations may be performed at the same time. Furthermore, the outlined operations are only provided as examples, and some of the operations may be optional, combined into fewer operations and actions, or expanded into additional operations without detracting from the essence of the disclosed embodiments.

For example, the method 7000 may further include selecting a second contiguous sequence of words from the text string as a second word sequence and comparing the second word sequence to the multiple word sequences. The method 7000 may further include in response to the second word sequence not corresponding to any of the multiple word sequences based on the comparison, adding a third word sequence based on the second word sequence to the multiple word sequences and adding a second counter with a count of one to the multiple counters that is associated with the third word sequence of the multiple word sequences. In these and other embodiments, training the language model of the automatic transcription system using the multiple word sequences and the multiple counters may occur after adding the second word sequence to the multiple word sequences.

In some embodiments, the third word sequence may be the same as the second word sequence, the third word sequence may include fewer words than the second word sequence, or the third word sequence may include a replacement word that is a generic word of one of the words in the second word sequence. In these and other embodiments, the replacement word may be used in place of the one of the words in the second word sequence such that the third word sequence and the second word sequence may include a same number of words.

In some embodiments, the one of the words in the second word sequence may be replaced based on the one of the words meeting a sensitive criteria. In these and other embodiments, removal words removed from the second word sequence to generate the third word sequence that includes fewer words than the second word sequence may be removed based on the removal words meeting the sensitive criteria.

In some embodiments, the method 7000 may further include adding the one of the words in the second word sequence that is replaced by the replacement word to the multiple word sequences and adding a third counter with a count of one to the multiple counters that is associated with the one of the words in the second word sequence.

Figure 67:
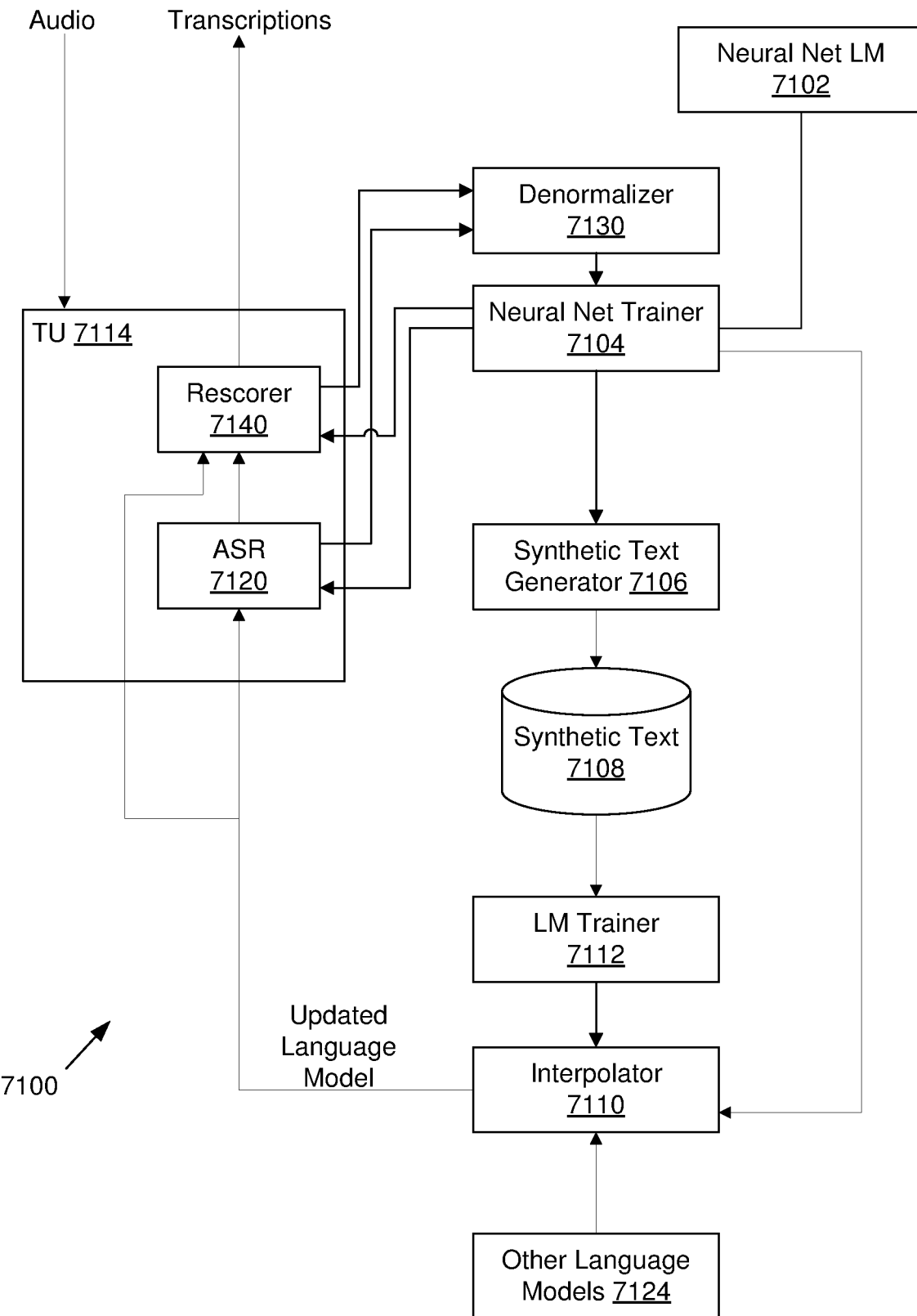
FIG. 67 illustrates an example environment for neural net language model training.

FIG. 67 illustrates an example environment 7100 for neural net language model training, in accordance with some embodiments of the present disclosure. In general, the environment 7100 may be configured for training language models on-the-fly (i.e., without recording) by training a neural net language model 7102 as transcriptions are generated and before the transcriptions are deleted. An example of a neural net language model 7102 is an RNNLM (recurrent neural network language model).

In some embodiments, a transcription unit 7114 may generate a transcription based on audio and send the transcription to the denormalizer 7130. The denormalizer 7130 may denormalize the transcription and forward the denormalized transcription to a neural net trainer 7104. In some embodiments, the neural net trainer 7104 may use the denormalized transcription to train the neural net language model 7102 using gradient descent, back propagation, or another method for training neural nets. Once training from a transcription is complete, the transcription may be deleted. The neural net trainer 7104 may then continue with a second transcription. In some embodiments, training for a transcription may be considered complete when a selected number of training iterations have been performed. The number of training iterations may be one. Additionally or alternatively, training may be considered complete when the communication session producing content for the transcription ends, such as when one or both parties disconnect or when transcription delivery to user devices ends. Additionally or alternatively, training may be considered complete when training on a second transcription begins. The neural net trainer 7104 may provide the neural net language model 7102 to the transcription unit 7114 for use in the ASR system, fuser, rescorer, or other element.

In some embodiments, the neural net trainer 7104 may be configured to train on a pool of training data including transcriptions from multiple ongoing communication sessions from multiple transcription units. For example, a first pool of training data may include a neural net training mini-batch. The neural net trainer 7104 may run training iterations on part or all of the first pool of training data as long as the ongoing communication sessions continue. After one or more of the ongoing communication sessions end, the transcription for that communication session is removed from the first pool of training data and is no longer used by the neural net trainer 7104. After a new communication session begins, a transcription for the new communication session is added to a first pool or to a second pool of training data. The end of a communication session may be variously defined as the point where one party disconnects, multiple parties disconnect, a particular party disconnects, the transcription service stops sending transcriptions to a user device, a selected amount of time after one or more parties disconnect, or an ongoing training iteration using data from the communication session is complete, among others. In these and other embodiments, the neural net language model 7102 may be provided to the transcription units for use in ASR systems, fusers, and rescorers, among other elements.

In some embodiments, after a neural net language model 7102 has been constructed, a synthetic text generator 7106 may use the neural net language model 7102 in a generative mode to create n-grams or synthetic transcriptions. In these and other embodiments, synthetic transcriptions may include pseudo-random strings of words where the frequencies of word strings are based on word combination probabilities defined by the neural net language model 7102. The synthetic text may be stored in a database 7108. The synthetic text may be used to train a second language model such as an n-gram based language model by a language model trainer 7112.

In some embodiments, the second language model may be improved by combining the second language model with other language models 7124 with an interpolator 7110 to create an updated language model. Examples of other language models may include the neural net language model 7102, a language model built based on a first party's voice or content, a language model based on a second party's voice or content, a language model based on communication session data from a specific account type such as business communication sessions, a commercially available language model or language model built from commercially available data, a language model built from a prior transcription service or from another service, a language model built from data from a group of communication sessions where the group is defined using a clustering method, a language model built from text sources, or a generic language model built from multiple sources of text (see also FIGS. 82 and 83). In these and other embodiments, the generation of the updated language model may be performed on-the-fly or after a communication session has ended.

In some embodiments, the environment 7100 may be configured to provide a set of multiple language models such as the neural net language model 7102, the second language model, and other language models to the transcription unit 7114. The elements in the transcription unit 7114 may use multiple language models in place of a single language model, for example, by determining a conditional probability based on a weighted sum of the conditional probabilities determined by each of the multiple language models.

In some embodiments, the updated language model and/or the neural net language model 7102 may be used by an ASR system 7120 in the transcription unit 7114 to generate a transcription. Additionally or alternatively, the neural net language model 7102 may be used by the ASR system 7120 to generate a transcription and the second language model and/or updated language model may be used by the ASR system 7120 to generate multiple transcription hypotheses. The multiple transcription hypotheses may be in the form of, for example, an n-best list, WCN, or lattice. In these and other embodiments, the environment 7100 may use the neural net language model 7102, via a rescorer 7140, to select the best hypothesis among the possibilities provided by the ASR system 7120 and to use this best hypothesis as the transcription.

Modifications, additions, or omissions may be made to the environment 7100 without departing from the scope of the present disclosure. For example, although FIG. 67 is illustrated using a neural net language model 7102 and a neural net trainer 7104, it is to be understood that other forms of language models and language model training may also be used. Also, alternative forms of neural nets such as feedforward neural nets, LSTMs, CNNs, and other topologies may be used for neural net language models.

Figure 68:
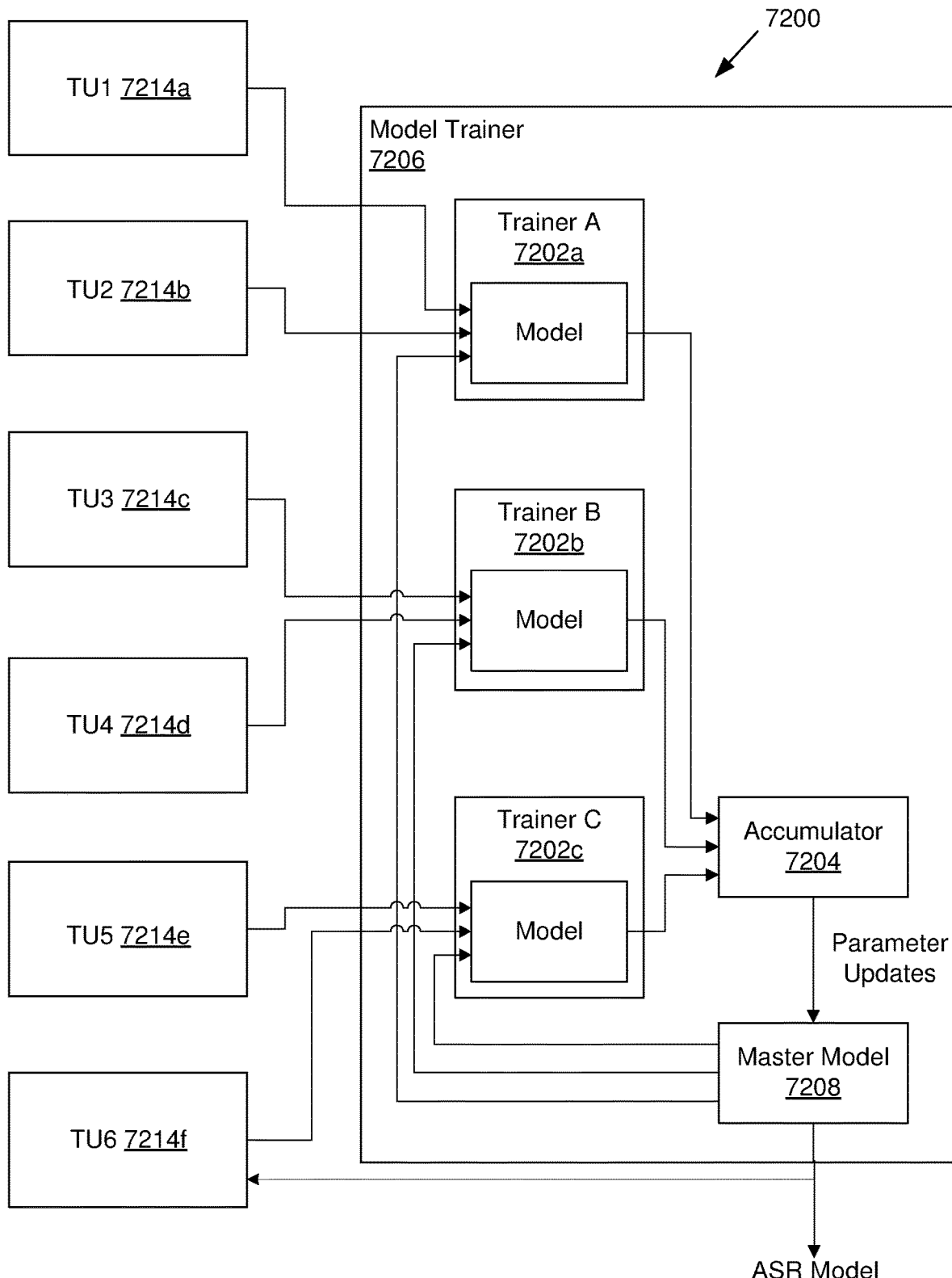
FIG. 68 illustrates an example environment for distributed model training.

FIG. 68 illustrates an example environment 7200 for distributed model training, in accordance with some embodiments of the present disclosure. In some embodiments, transcription units 7214*a-f*, collectively transcription units 7214, may be configured to generate transcriptions from audio and provide the transcriptions and the audio to a model trainer 7206. In particular, the transcription units 7214*a-f* may each provide the transcriptions and the audio to one of multiple trainer devices 7202*a-c*, collectively trainer devices 7202. Each trainer device 7202 may be configured to adapt a model (e.g., language model, acoustic model, etc.) based on data from the transcription units 7214 and transmit the adapted model to an accumulator 7204. The model trainer 7206 may include one or more CPUs or vector processors such as GPUs (graphical processing units) or other SIMD (single instruction multiple data) processors that may be used to perform the functionality of the elements of the model trainer 7206 discussed with respect to environment 7200.

In some embodiments, the accumulator 7204 may use adapted models to generate a set of parameter updates which may be used to update a master model 7208. For example, the accumulator 7204 may determine an updated model parameter by averaging across values of the parameter in models received from the multiple trainer devices 7202. The master model 7208 may be transmitted back to the trainer devices 7202 for additional iterations. The master model 7208 may be transmitted to the transcription units 7214 for use by the transcription units 7214. An example of the operations executed by the model trainer 7206 may include:

1. Master model parameters are set to an initial state. The values of the initial state may be values determined from a previous model training process or the values of the initial state may be random numbers.

2. The master model 7208 may be distributed to multiple trainer devices 7202.
3. A block of data may be collected from one or more transcription units 7214 and distributed across one or more trainer devices 7202.
4. Each trainer device 7202 may generate a model update based on data from one or more transcription units 7214. The model update may be used to create an updated model.
5. Each trainer device 7202 may transmit its respective model update or updated model to the accumulator 7204. Alternatively or additionally, each trainer device 7202 may send a set of transformed parameters representing the model update or updated model to the accumulator 7204.
6. The accumulator 7204 may combine model updates or updated models from the trainer devices 7202 to generate a set of parameters for updating the master model 7208. For example, if the vector x represents a set of parameters in the master model 7208 and vectors x1, x2, and x3 represent a set of corresponding parameters in updated models received from the training devices, then the updated set of parameters for the master model 7208 may be (x1+x2+x3)/3. Additionally or alternatively, the parameters may by updated gradually by specifying a learning rate u, which may be a number between 0 and 1, such that the updated parameter set may be (1−u)*x+u*(x1+x2+x3)/3.
7. The parameters may be used to update the master model 7208.
8. Steps 2-7 may be repeated for each new block of data.

As discussed above, the operations describe that the accumulator 7204 may combine model updates or updated models. In this disclosure, the terms model updates and updated models may be interchangeable. Alternatively or additionally, a method creating or using one of the terms model updates and updated models may be synonymous with creating or using the other of the terms model updates and updated models. Generally, updated models may be described as models where parameters or other model features have been updated. Model updates may be described as a set of information, such as a set of features values, adjustments, or values to be used to modify a model, for updating the model. Based on these descriptions, an updated model may simply replace a previous model where a model update may be a set of instructions for updating a model. In either case, the end result is an updated model, however the result may be achieved with slightly different processing. Thus, embodiments that discuss a model update may also be performed using an updated model or vice versa without departing from the scope of the present disclosure or without detracting from the essence of the disclosed embodiments.

Additionally, the operations described above may be used to train various types of models such as language models, acoustic models, and neural network implementations of models. The trainer devices 7202 and the accumulator 7204 are illustrated as residing in a central location, namely the model trainer 7206; however, the trainer devices 7202 and the accumulator 7204 may run in other locations such as on the transcription units 7214.

Furthermore, modifications, additions, or omissions may be made to the operations described above without departing from the scope of the present disclosure. For example, the operations may be implemented in differing order. Additionally or alternatively, two or more operations may be performed at the same time. Furthermore, the outlined operations are only provided as examples, and some of the operations may be optional, combined into fewer operations, or expanded into additional operations without detracting from the essence of the disclosed embodiments.

In some embodiments, the environment 7200 may train the master model 7208 and/or one or more of the models in the trainer devices 7202 on-the-fly. In these and other embodiments, the models may be updated with communication session data as the communication session data is created and before the communication session data is deleted. The deletion of the communication session data may occur during the communication session, at the end of the communication session, or shortly after the end of the communication session and may be before a new set of data is received and used to train the model. Additionally or alternatively, the communication session data may be stored and the training of the models may occur at any time.

Modifications, additions, or omissions may be made to the environment 7200 without departing from the scope of the present disclosure. For example, in some embodiments, the model trainer 7206 may include a data collector. The data collector may collect the data, for example transcriptions and audio from the transcription units 7214. The collected data may then be distributed to the individual trainer devices 7202.

Figure 69:
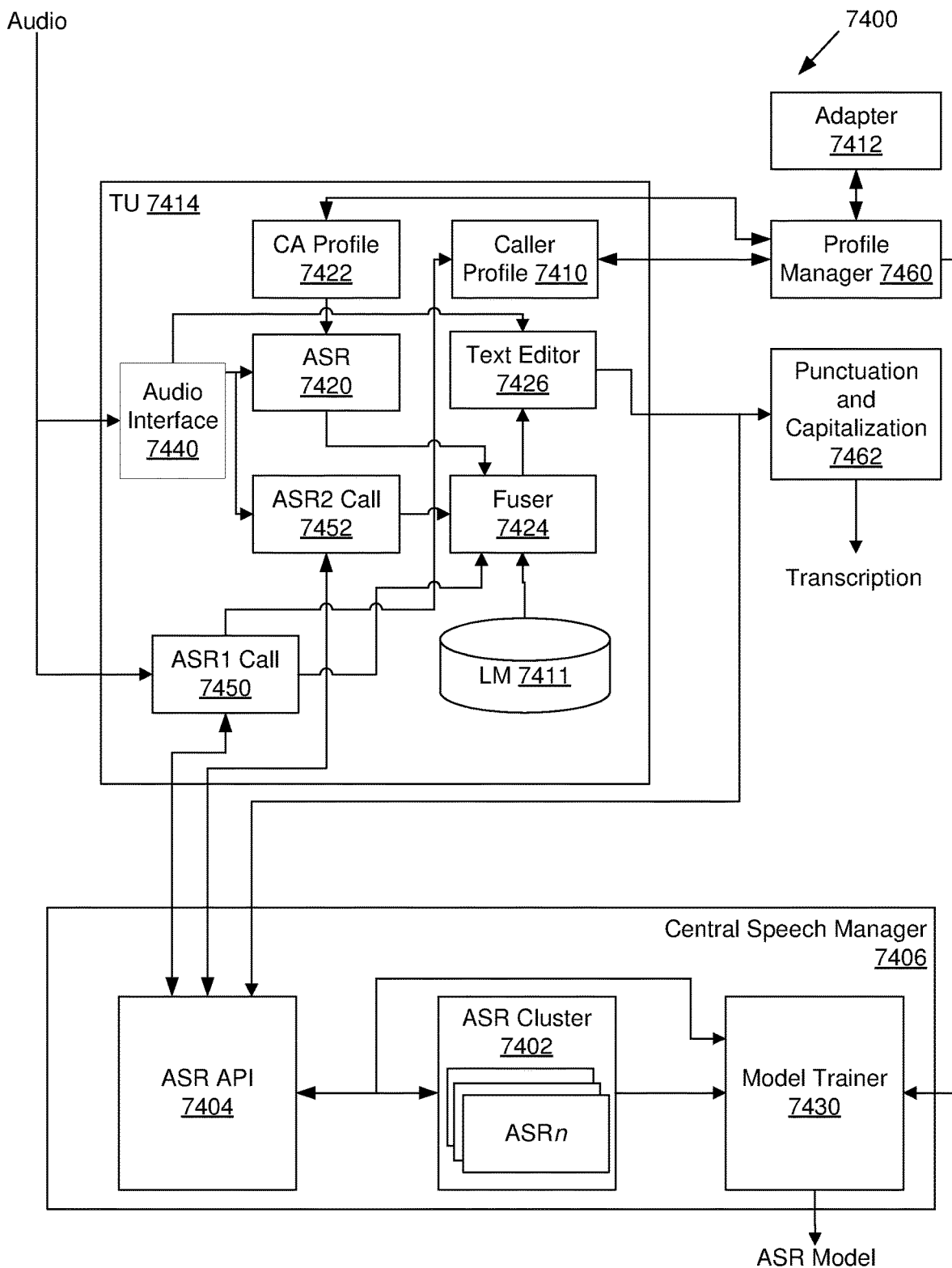
FIG. 69 illustrates an example environment for a centralized speech recognition and model training.

FIG. 69 illustrates an example environment 7400 for a centralized speech recognition and model training, in accordance with some embodiments of the present disclosure. In some embodiments, the environment 7400 may include a central speech manager 7406 that may include an ASR API 7404, an ASR cluster 7402 of multiple ASR systems, and a model trainer 7430, which may be analogous to the model trainer 7206 of FIG. 68. The environment 7400 may also include a transcription unit 7414 that may output a transcription based on a fusion of multiple transcriptions. In these and other embodiments, the transcription unit 7414 may include an audio interface 7740 configured to receive audio and output revoiced audio and a text editor 7426 configured to obtain edits to edit transcriptions. The transcription unit 7414 may further include a revoiced ASR system 7420 that receives the revoiced audio and that is configured based on a CA profile 7422, a first ASR call module 7450 that receives the revoiced audio, and a second ASR call module 7452 that receives the audio. Each of the ASR system 7420, the first ASR call module 7450, and the second ASR call module 7452 may output a transcription that may be fused by a fuser 7424 configured based on a language model 7411. The output transcription may be edited by the text editor 7426.

In some embodiments, the first ASR call module 7450 and the second ASR call module 7452 may each be configured with interfaces to one or more remote ASR APIs 7404. For example, the first ASR call module 7450 may forward audio to the ASR API 7404, which in turn may pass the audio to the ASR cluster 7402. The ASR cluster 7402 may generate a transcription and return the transcription to the ASR API 7404. The ASR API 7404 may be configured to return the transcription to the first ASR call module 7450 where the transcription may be used by the transcription unit 7414 as described above.

In some embodiments, the ASR API 7404 (and, depending on the configuration, ASR systems in the ASR cluster 7402) may forward data from the transcription unit 7414 and from the ASR cluster 7402 to the model trainer 7430. The model trainer 7430 may use the data to create or update one or more ASR models. The environment 7400 may be configured to train models on-the-fly or based on stored data. As described above, the output of the transcription unit 7414 may be enhanced with punctuation and capitalization using a module 7462 and may be sent to a user device as a transcription.

An example implementation of the steps executed by the environment 7400 may include:
1. Audio is sent to first ASR call module 7450.
2. Revoiced audio is sent to second ASR call module 7452.
3. First ASR call module 7450 forwards the audio to the ASR API 7404.
4. Second ASR call module 7452 forwards the revoiced audio to the ASR API 7404.
5. The ASR API 7404 forwards the audio and the revoiced audio to ASR systems in the ASR cluster 7402.
6. The ASR cluster 7402 returns transcriptions via the ASR API 7404 to first ASR call module 7450 and second ASR call module 7452, respectively.
7. The transcription unit 7414 may generate a transcription and may forward the transcription to the ASR API 7404. The transcription may be created using one or more of: a transcription from ASR system 7420 using the revoiced audio, a transcription from first ASR call module 7450, a transcription from second ASR call module 7452, a transcription from the fuser 7424, and text edits by a CA from a text editor 7426.
8. Capitalization and Punctuation is added to the transcription and sent to the user device.
9. The ASR API 7404 and ASR cluster 7402 may forward the audio, revoiced audio, and the transcription from the transcription unit 7414 to the model trainer 7430.
10. The model trainer 7430 may use the audio, the revoiced audio, and the transcription to update ASR models.
11. The transcription unit 7414 and central speech manager 7406 may delete the audio, the revoiced audio, and transcription at a selected time. The selected time may be, for example, at the end of the communication session, once training on the audio and transcription described above is complete, before a second training iteration begins, or once communication session transcriptions are complete.

In some embodiments, the model trainer 7430 may use the CA profile 7422 or a caller profile 7410 of one or more callers of a communication session that generates the audio, such as the transcription party, for training a model for use by multiple speakers. In these and other embodiments, the caller profile 7410 may contain a model and/or information used to train a model. The ASR system 7420 may adapt to a CA's voice and may save training or adaptation information in the CA profile 7422. Likewise when an ASR system, such as the first ASR call module 7450, adapts to a caller's voice, such as to a particular transcription party, the ASR system may save training information in the caller profile 7410. The training information may be saved in the CA profile 7422 and the caller profile 7410 may be part of a speaker-dependent model or it may include information to be used for training or adapting a speaker-independent ASR model, among other types of ASR models.

In some embodiments, a profile manager 7460 may save and distribute the CA profiles 7422 and/or caller profiles 7410. For example, when a CA logs onto a CA workstation, the CAs profile 7422 may be downloaded from the profile manager 7460 and used by the ASR system 7420 to generate transcriptions of the revoiced audio. As another example, when communication session audio is transmitted to an ASR system, a caller may be identified, such as by the caller's device identifier, and the profile corresponding to the caller may be downloaded from the profile manager 7460. The profile of the caller may be provided to the ASR system to be used to generate transcriptions based on audio that includes the caller's voice. In some embodiments, the profile manager 7460 may upload one or more caller profiles 7410 or CA profiles 7422 to the model trainer 7430. The profile manager 7460 may select a subset of one or more CA profiles 7422 based on performance, accuracy, skills, experience, location, or other characteristics of the associated CA to be sent to the model trainer 7430. The model trainer 7430 may use the one or more profiles or the subset to train ASR models, which may then be used to transcribe audio for one or more parties. In some embodiments, the model trainer 7430 may use language model parameters or statistics extracted from at least the subset of CA profiles 7422 to train a new language model. For example, the model trainer 7430 may extract probabilities or n-grams from multiple CA profiles 7422, average or total the probabilities or n-grams, and convert the averages or totals into a language model. The language model may be used to update multiple CA profiles 7422. Additionally or alternatively, the probabilities, n-grams, or new language model may be used to generate text data and the ASR system 7420 may train or adapt a language model based on the generated text data. An example of using profiles to train ASR models may be implemented as follows:
1. A first CA listens to communication session audio from a first communication session and revoices communication session audio by providing first revoiced audio to the ASR system 7420. The communication session audio may include a voice sample from the transcription party.
2. The ASR system 7420 transcribes the first revoiced audio to provide transcriptions to a subscriber.
3. Information from the first communication session may be saved in a first CA profile.
    a. The information may include text and/or first revoiced audio from the first communication session.
    b. The information may include data extracted from text and/or first revoiced audio from the first communication session.
    c. The information may include at least part of an ASR model used by the ASR system 7420.
    d. The information may include features extracted from an ASR model used by the ASR system 7420.
4. An adapter 7412 may use the first CA profile to adapt a speech model to the first revoiced audio creating a first adapted speech model.
5. The adapter 7412 may use a second CA profile (obtained from second revoiced audio of a second CA on a second communication session in a manner similar to that of the first CA profile) to adapt a speech model to the second CA, creating a second adapted speech model.
6. The first CA may revoice communication session audio that is provided to the second ASR call module 7452. The second ASR call module 7452 may use the first adapted speech model to generate a transcription.
7. The second CA may revoice communication session audio into the second ASR call module 7452. The second ASR call module 7452 may use the second adapted speech model to generate a transcription.
8. The model trainer 7206 may use the first and second CA profiles to create or adapt a third ASR model.
9. The third ASR model may be transmitted to the transcription unit 7414 and other transcription units.

10. Both the transcription unit 7414 and other transcription units may use the third ASR model to transcribe communication session audio or revoiced audio.

In some embodiments, the profile manager 7460 may upload one or more caller profiles 7410 and provide the profiles to the model trainer 7430. Each caller profile 7410 may, for example, be a profile adapted to a specific transcription party voice. The caller profile 7410 may be used to train a speaker-dependent ASR system for use with the caller's voice. Alternatively or additionally, the caller profile 7410 together with other caller profiles may be used to train a speaker-independent ASR system adapted to multiple voices and used to recognize multiple voices. An example follows:

1. An ASR system transcribes audio from a first caller's voice sample on a first communication session to generate a transcription.
2. Information from the first communication session may be saved in a first caller profile.
   a. The information may include text and/or caller audio from the first communication session.
   b. The information may include data extracted from text and/or caller audio from the first communication session.
   c. The information may include at least part of an ASR model.
   d. The information may include features extracted from an ASR model.
3. The adapter 7412 may use the first caller profile to adapt a speech model to the first caller's voice, creating a first adapted speech model.
4. The adapter 7412 may use a second caller profile (obtained from a second caller's voice sample on a second communication session in a manner similar to that of the first caller profile) to adapt a speech model to the second caller's voice, creating a second adapted speech model.
5. An ASR system may use the first adapted speech model to transcribe audio from the first caller to create a transcription.
6. An ASR system may use the second adapted speech model to transcribe audio from the second caller to create a transcription.
7. The model trainer 7206 may use the first and second caller profiles to create or adapt a third ASR model.
8. The third ASR model may be transmitted to the transcription unit 7414 and other transcription units.
9. Both the transcription unit 7414 and other transcription units may use the third ASR model to transcribe communication session audio or revoiced audio. In some embodiments, the communication session audio may be from a third caller who is not the first or second caller.

Modifications, additions, or omissions may be made to the environment 7400 without departing from the scope of the present disclosure. Additionally or alternatively, one or more of the first ASR call module 7450 and the second ASR call module 7452 may be replaced with a regular ASR system.

Figure 70:
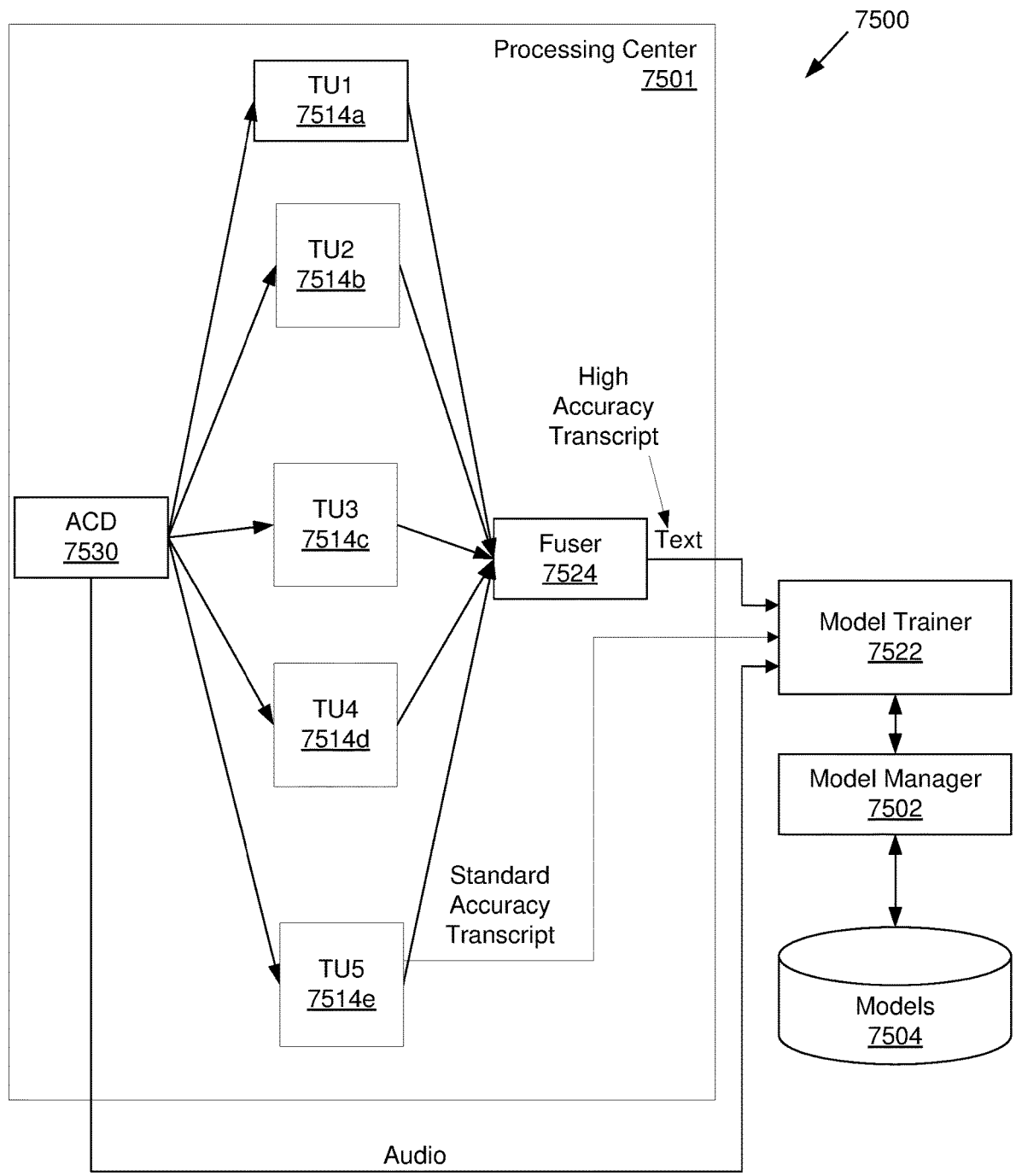
FIG. 70 illustrates an example environment for training models from fused transcriptions.

FIG. 70 illustrates an example environment 7500 for training models from fused transcriptions, in accordance with embodiments of the present disclosure. In some embodiments, audio may be provided to a processing center 7501. The audio may be from a communications session. The processing center 7501 may include an automatic communication session distributor (ACD) 7530, multiple transcription units 7514a-e, collectively transcription units 7514, and a fuser 7524. The ACD 7530 may transmit the audio signal to one or more of the transcription units 7514. The transcription units 7514 may generate transcriptions based on the audio. The transcriptions may be provided to the fuser 7424. The fuser 7524 may combine the transcriptions into a fused transcription. In some embodiments, the fused transcription may be provided to a user device.

In some embodiments, the fused transcriptions may also be provided to a model trainer 7522. The model trainer 7522 may use the fused transcription to train or adapt one or more models 7504. For training acoustic models, the ACD 7530 may also transmit the audio signal to the model trainer 7522. When recording of the audio is allowed, the model trainer 7522 may train the models 7504 from information from multiple stored communication sessions. When recording of the audio is not allowed, the model trainer 7522 may update the models 7504 on-the-fly, using, for example gradient descent or other iterative methods (see FIG. 63), from each communication session information record before the communication session information record is deleted. A model manager 7502 may be used to store and track the models 7504. In some embodiments, before transmitting an audio signal to multiple transcription units 7514, the ACD 7530 may first determine if there are sufficient available transcription units 7514. The ACD 7530 may determine if there are sufficient available transcription units 7514 by comparing the current or projected traffic load to the available transcription units pool or by measuring the average transcription units 7514 idle time between communication sessions (see also FIG. 47). Modifications, additions, or omissions may be made to the environment 7500 without departing from the scope of the present disclosure.

Figure 71:
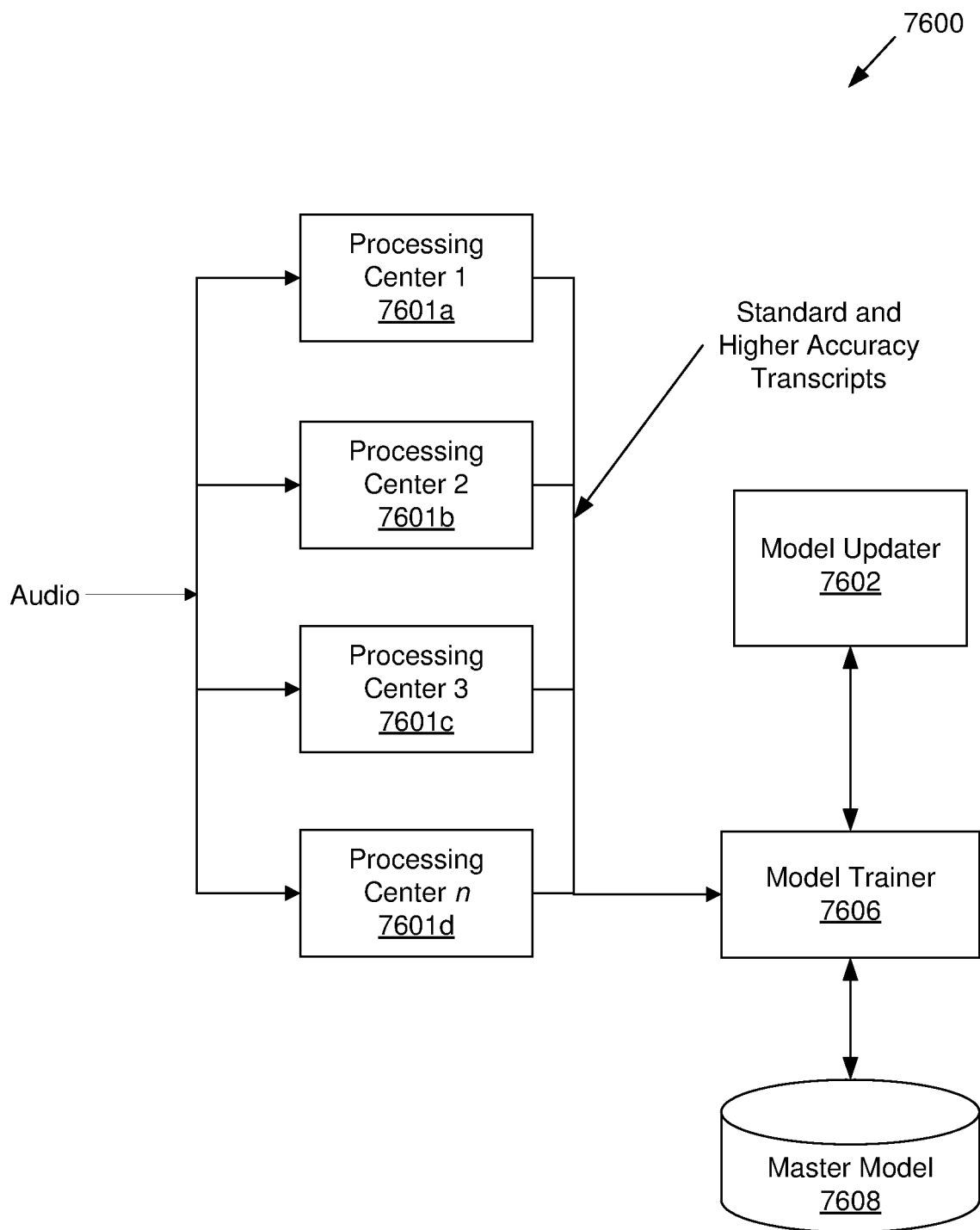
FIG. 71 illustrates an example environment for training models on transcriptions from multiple processing centers.

FIG. 71 illustrates an example environment 7600 for training models on transcriptions from multiple processing centers, in accordance with some embodiments of the present disclosure. The environment 7600 includes multiple processing centers 7601a-d, collectively processing centers 7601. Each of the processing centers 7601 may be configured in a manner to the configuration of the processing center 7501 of FIG. 70. Each of the processing centers 7601 may receive audio from one or more sources, such as one or more communication sessions. The processing centers 7601 may be configured to generate data such as audio, transcriptions, and log data for each audio source. In some embodiments, the data may be analogous to communication session data discussed in this disclosure. The data may be forwarded to a model trainer 7606. Transmission of the data to the model trainer 7606 may occur at various times, including:

1. As the data is created.
2. On a regular schedule.
3. When there is available bandwidth, such as at night or during off-peak hours.
4. When the model trainer 7606 requests the data.
5. When the model trainer 7606 is available to train.
6. When storage space used to store communication session data at the processing center is needed for other purposes.

The model trainer 7606 may distribute the data to a model updater 7602. The model updater 7602 may include CPUs, GPUs, or other vector processors. The model trainer 7606 may also provide the master model 7608, or a portion thereof, to the model updater 7602. The model updater 7602 may adapt model parameters based on the data and a master model 7608 and transmit updates back to the model trainer 7606 for updating the master model 7608.

In some embodiments, the model updater 7602 may include multiple updaters. In these and other embodiments, the model updater 7602 may provide a portion of the data to each of the updaters. The model trainer 7606 may also transmit at least part of the master model 7608 to each updater. In these and other embodiments, the updaters may each include model parameters based on the data and the master model 7608 and transmit the updates back to the model trainer 7606. The model trainer 7606 may use updates from the model updaters 7602 to update the master model 7608.

In some embodiments, the model trainer 7606 may download multiple speaker-dependent models, each trained to their respective CA or calling party, from model updaters 7602. The model trainer 7606 may combine the speaker-dependent models to create or update the master model 7608. In some embodiments, parameters in the speaker-dependent models may be averaged to generate corresponding parameters in the master model 7608. Additionally or alternatively, speech samples may each be presented to multiple speaker-dependent models for transcription. Transcriptions for a given speech sample may be fused to create a high-accuracy transcription, which may be used to train the master model 7608.

After being adapted, the master model 7608 may be distributed to the transcription units in the processing centers 7601 for use in transcription of communication sessions. The distribution may be triggered by completion of a new master model or by a request from transcription units. In these and other embodiments, a transcription unit may query the model trainer 7606 to determine if a model update is available. The response to the query may include the current and/or new model version number.

In some embodiments, only part of the master model 7608 may be distributed to transcription units such as when only part of the master model 7608 has been updated. In these and other embodiments, the transcription units may use a previous copy of other parts of the master model 7608 to generate transcriptions of audio. For example, transcription units may use an existing acoustic model together with an updated language model received from the model trainer 7606.

In some embodiments, each transcription unit may transcribe audio from a single communication session or multiple transcription units may work together to transcribe audio from a single communication session. In these and other embodiments, the transcriptions from multiple transcription units transcribing a communication session may be fused together to create a higher-accuracy transcription. The higher-accuracy transcription may be provided to the model trainer 7606 for use in updating or training the master model 7608.

Modifications, additions, or omissions may be made to the environment 7600 without departing from the scope of the present disclosure. For example, in some embodiments, each of the processing centers 7601 may include a model updater. The arrangement of each processing center 7601 including a model updater may allow excess capacity computing systems in the processing centers 7601 to be used for training models. In these and other embodiments, the model updater in each processing center 7601 may communicate with the model trainer 7606 to obtain the master model 7608 or parts thereof or to send updates of the master model 7608 thereto.

Figure 72:
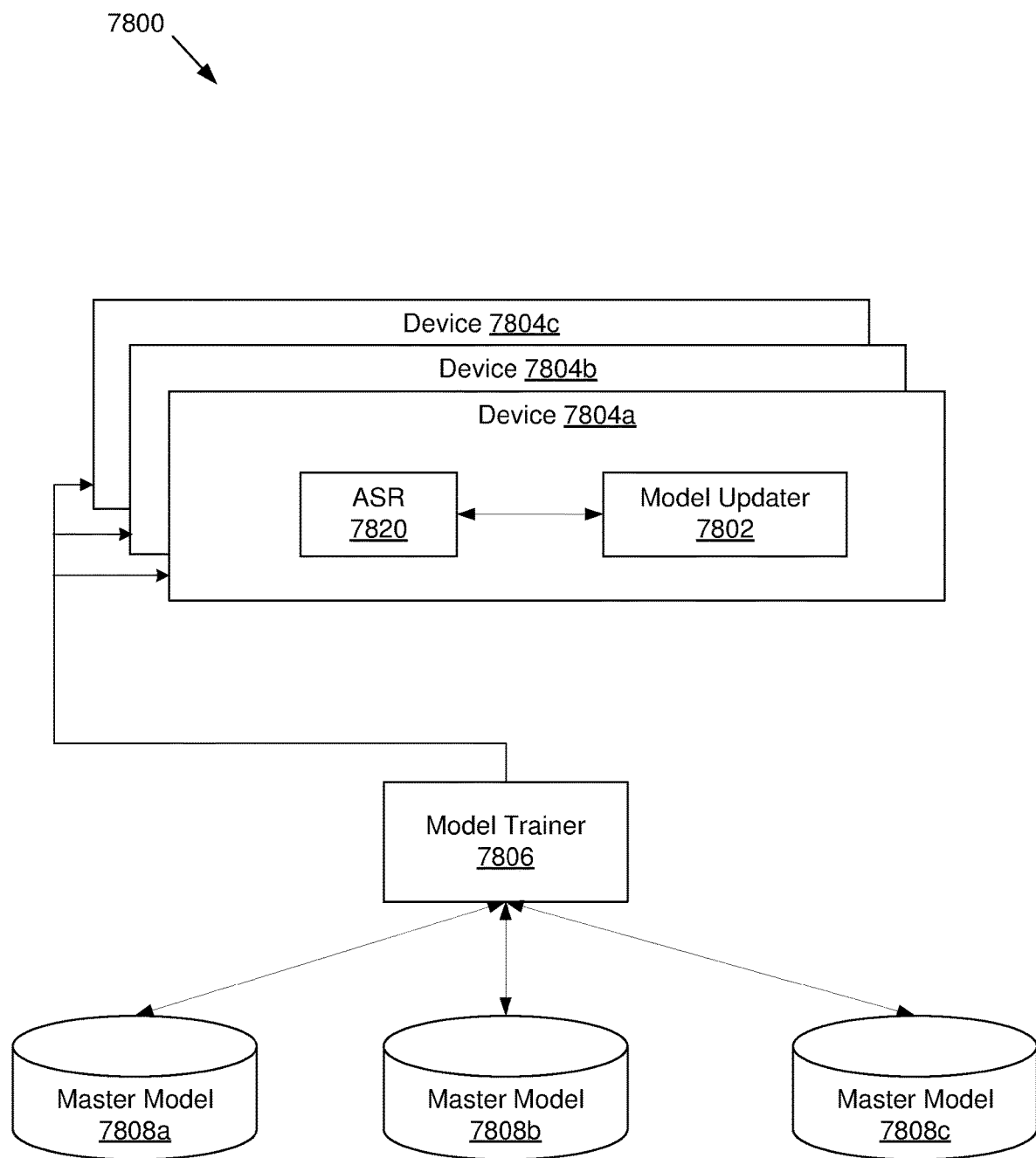
FIG. 72 illustrates an example environment for distributed model training.

FIG. 72 illustrates an example environment 7800 for distributed model training, in accordance with some embodiments of the present disclosure. The environment 7800 illustrates multiple devices 7804a-c, collectively the devices 7804. The devices 7804 may be communication devices that may be used by users to establish a communication session. The devices 7804 may include captioned phones, smart phones, tablets, computers, and mobile devices, among other devices. In some embodiments, a model updater 7802, such as a unit analogous to the model updater 7602 of FIG. 71, may be configured to run on the device 7804a and communicate with a model trainer 7806, which may be analogous to the model trainer 7206 of FIG. 68. The device 7804a may communicate with the model trainer 7806 with respect to master models 7808a-c, collectively master models 7808. In these and other embodiments, each of the devices 7804 may also include a model updater that may communicate with the model trainer 7806 with respect to the master models 7808.

In these and other embodiments, the environment 7800 illustrates an example of distributed training of models for ASR systems. Various embodiments of distributed training may be implemented in the environment 7800, including:

1. The model trainer 7806 may distribute one or more master models 7808 or parts of master models 7808 to one or more model updaters 7802. The model updater 7802 may use communication session information collected during one or more communication sessions to train a model for improved accuracy and create a model update. The model updater 7802 may be configured to conduct training during the following example times:
    a. At least partly during the communication session.
    b. At least partly after the communication session using communication session information saved during the communication session.
    c. During off-hours, such as at night.
   The model update may be transmitted to the model trainer 7806. The model trainer 7806 may use the model update to update the master models 7808. The master models 7808 may be distributed to multiple ASR systems of the devices 7804.

2. The model trainer 7806 may receive data, such as communication session information or information derived from communication session information, from a first model updater 7802 on the device 7804a and transmit the data to a second model updater on the second device 7804b. The model updater on the second device 7804b may use the data to create a model update. The training may happen:
    a. During a communication session, if resources are available.
    b. When the communication device is not processing a communication session.
    c. After communication session information is received from the model trainer and when the communication device has available processing and memory resources.
    d. During off-hours, such as at night.
   The model update may be transmitted to the model trainer 7806. The model trainer 7806 may use the model update to update the master models 7808. The master models 7808 may be distributed to multiple devices 7804. Additionally or alternatively, the master models 7808 may be distributed to other locations running ASR systems such as an ASR cluster, transcription units, CA workstations, etc.

3. In some embodiments, the model updater 7802 may run at least partly on a coprocessor such as a SIMD, vector processor, or GPU. The coprocessor may be part of or external to the communication device.

4. The process for updating models may be split between a device 7804 and a processing device separate from the devices 7804.

5. One or more master models may be distributed to the devices 7804, where the master models are updated based on audio received by and text generated at the devices 7804. The updated master models are transmitted back to the model trainer 7806 where the updated master model may be combined with updated master models from one or more devices 7804, for example by averaging neural net weights, to create a new version of the master models 7808. To save communication bandwidth, the model trainer 7806 and model updaters 7802 may transmit the master model in a compressed format such as sending only portions of the master model that have changed, by quantizing the weights for transmission, or by sending only the difference in weight changes.

Modifications, additions, or omissions may be made to the environment 7800 without departing from the scope of the present disclosure.

Figure 73:
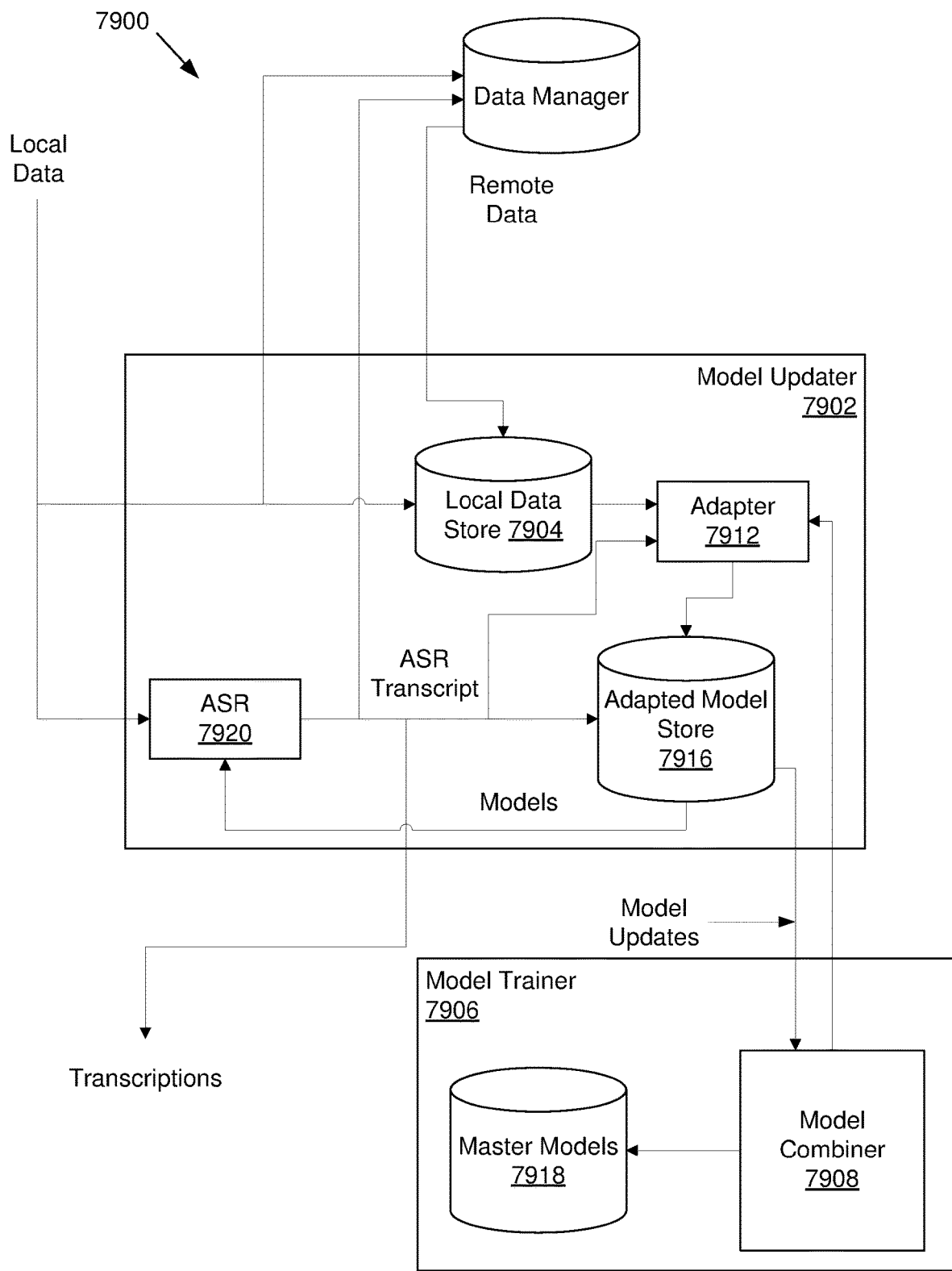
FIG. 73 illustrates an example environment for distributed model training.

FIG. 73 illustrates an example environment 7900 for distributed model training, in accordance with some embodiments of the present disclosure. In some embodiments, environment 7900 includes a model updater 7902 that may be configured to perform at least part of the processing to train or update ASR models. As illustrated, the model updater 7902 includes an adapter 7912, a local data store 7904, an ASR system 7920, and a storage location 7916 for storing adapted models generated by the adapter 7912. In these and other embodiments, the model updater 7902 may be included in a device, such as illustrated in FIG. 72. Alternatively or additionally, the model updater 7902 may be included on a server.

In some embodiments, the model updater 7902 may be configured to communicate with a model trainer 7906 that may include a master model 7918. In these and other embodiments, the master model 7918 may be distributed, in part or in whole, to model updater 7902 and other model updaters on other devices or servers for training. In some embodiments, the model updater 7902 and the other model updaters may send adapted models to a model combiner 7908 of the model trainer 7906 that may combine the adapted models to generate updated master models 7918.

In some embodiments, the model updater 7902 may generate an adapted model based on local data. The local data may include data from a device that includes the model updater 7902. For example, the local data may include communication session data such as audio, a transcription of the audio, log information such as a speaker's identity and a phone number, or other device identifier data, among other data. In some embodiments, the communication session data may be from a current communication session. Additionally or alternatively, the local data may be from previous communication sessions. In some embodiments, the model updater 7902 may generate an adapted model based on remote data. The remote data may include previously stored communication session data or communication session data from other devices. In some embodiments, the model updater 7902 may perform operations including:

1. The model updater 7902 receives, from the model trainer 7906, all or part of the master model 7918, denoted as a pre-adapted model.
2. The ASR system 7920 may transcribe audio, such as communication session audio or revoiced audio to create an ASR transcription.
3. The model updater 7902 may send the ASR transcription for display.
4. The model updater 7902 may use local data, optionally remote data, the ASR transcription, and the pre-adapted model to create an adapted model. The local data and/or remote data may be currently being received data or stored data from the local data store 7904.
5. The adapted model may be stored in the storage location 7916 and may be used by the ASR system 7920 for generating transcriptions of audio.
6. The model updater 7902 may transmit the adapted model to the model combiner 7908.

Various other devices, such as the devices 7804 of FIG. 72 may also generate adapted models and provide the adapted models to the model combiner 7908. The model combiner 7908 may be configured to combine the adapted models from the multiple model updaters to create an update for the master models 7918. In these and other embodiments, the updated master model 7918 may be transmitted to one or more ASR systems associated with the multiple model updaters, including the ASR system 7920. The updated master model 7918 may be used to generate transcriptions for regular or revoiced audio by the ASR systems.

In some embodiments, the model combiner 7908 may be configured to receive multiple adapted models that each have substantially the same topology. In these and other embodiments, the model combiner 7908 may use weights or parameters at a given location in each adapted model to determine a weight or parameter at the same location in an updated master model. The model combiner 7908 may perform a similar procedure for other weights or parameters in other locations in the adapted models.

For example, if a first adapted model includes a matrix of weights W1 from a first model updater and a second adapted model includes a matrix of weights W2 from a second model updater, then the model combiner 7908 may determine new master model weights using element-by-element addition of the two matrices. In matrix notation, for example, where W1 and W2 are 2×2 matrices, $$W1 = \begin{pmatrix} w1(1,1) & w1(1,2) \\ w1(2,1) & w1(2,2) \end{pmatrix},$$

$$W2 = \begin{pmatrix} w2(1,1) & w2(1,2) \\ w2(2,1) & w2(2,2) \end{pmatrix},$$

then the master model weight W may be determined as $$W = W1 + W2 = \begin{pmatrix} w1(1,1)+w2(1,1) & w1(1,2)+w2(1,2) \\ w1(2,1)+w2(2,1) & w1(2,2)+w2(2,2) \end{pmatrix}.$$

Models may include acoustic models, language models, neural network weights, or end-to-end ASR models. The model training may occur on-the-fly or from stored data.

In some embodiments, at least part of the model updater 7902 may be included in or share resources, such as memory or processing, with an ASR system, user device, server, transcription party device, or CA client, among other devices. In this manner, the model updater 7902 may use processing resources not being used during communication sessions at particular times, such as during or between communication sessions or during off-peak hours. The process of transmitting the master models 7918 to the model updater 7902 and transmitting adapted models from the model updater 7902 to the model trainer 7906 may include one or more forms of compression, for example:

1. The transmitted information may reflect the difference between the current model and the previous model. For example, if a previous master model Wp is a matrix of parameters and is to be updated with a new master model Wn, then the difference Wd=Wn−Wp may be transmitted. The master model 7918 may then be updated using Wn=Wp+Wd.

2. The model may exist in multiple parts. At any given time, some parts may be updated and some not. Non-updated model parts may be stored at the model updater 7902 and model trainer 7906. Model parts to be updated may be transmitted between the model updater 7902 and model trainer 7906.

Modifications, additions, or omissions may be made to the environment 7900 without departing from the scope of the present disclosure.

Figure 74:
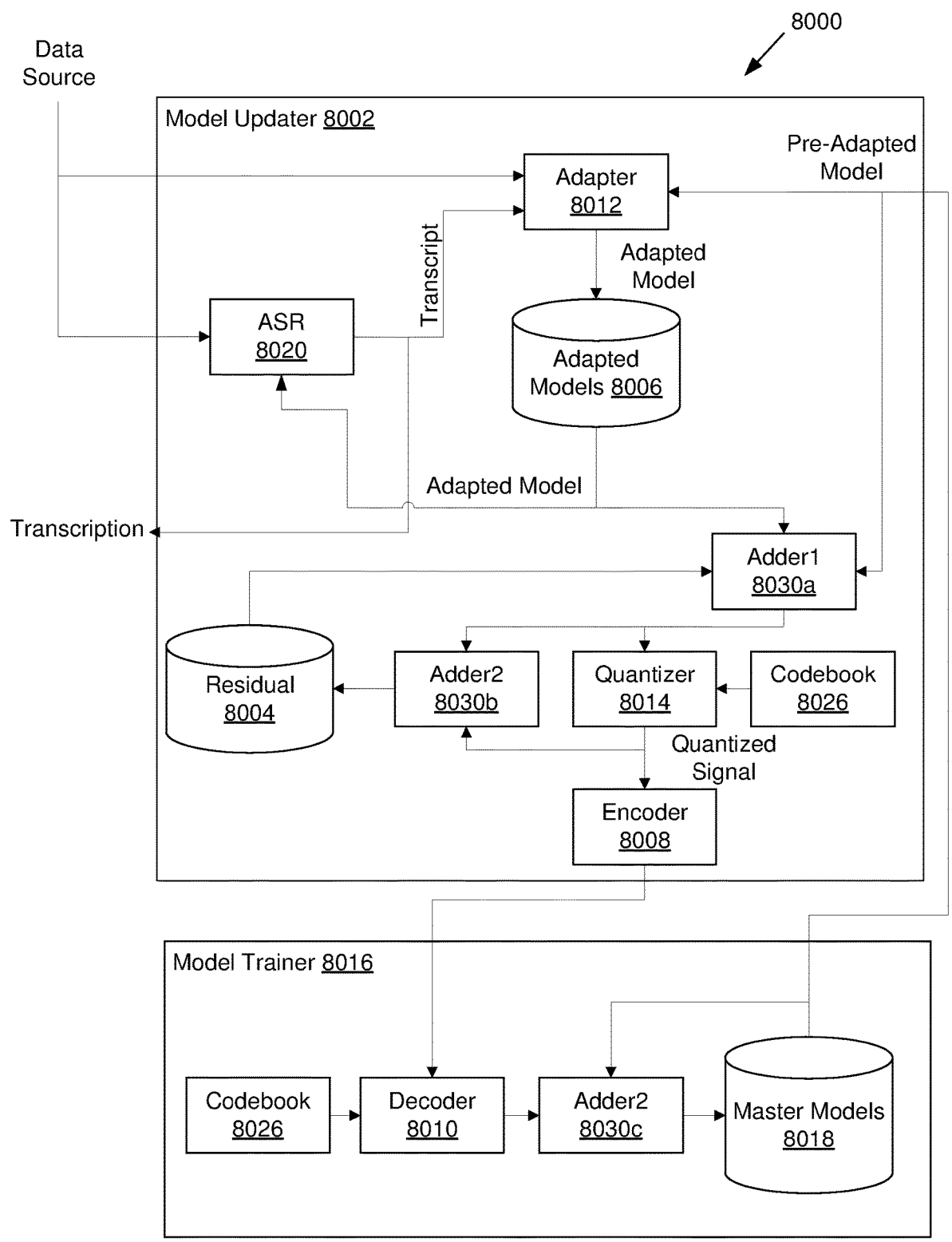
FIG. 74 illustrates an example environment for distributed model training.

FIG. 74 illustrates an example environment 8000 for distributed model training, in accordance with some embodiments of the present disclosure. The environment 8000 includes a model updater 8002 and a model trainer 8016. The model updater 8002 and the model trainer 8016 may be analogous to the model updater 7902 and a model trainer 7906 of FIG. 73, except the model updater 7902 and a model trainer 7906 may be configured to transmit compressed versions of the models and model updates. The discussion with respect to FIG. 74 focuses on the aspects of the model updater 8002 and the model trainer 8016 that provide for transmission of compressed versions of models. Aspects described previously in FIG. 73 may not be repeated. For example, an ASR system 8020, an adapter 8012, an model database 8006, and master models 8018 may be analogous to the ASR system 7920, the adapter 7912, the storage location 7916, and the master models 7918 of FIG. 73 and may not be discussed further.

In some embodiments, the model trainer 8016 may transmit at least part of a master model 8018, designated here as a pre-adapted model, to the model updater 8002. The pre-adapted model may be a compressed form of at least part of the master model 8018. The model updater 8002 may adapt at least part of the master model 8018 and generate an adapted model, which the model updater 8002 may return to the model trainer 8016. The model trainer 8016 may use the adapted model to adapt the master model 8018. In some embodiments, the model trainer 8016 may transmit a pre-adapted model to multiple model updaters 8002, receive adapted models from the multiple model updaters, and use the adapted models to adapt one or more master models 8018.

In some embodiments, the model updater 8002 may compress or quantize the adapted model before sending the adapted model to the model trainer 8016. The model updater 8002 may be configured to store any quantization error in the adapted model and include the error as an input to a quantizer 8014 next time an adapted model is generated and sent. In this manner, quantization errors in a given adapted model may be corrected in subsequent updates. An example of operations for adapting and quantizing models for transmission may include:

1. The model trainer 8016 transmits a pre-adapted model to the adapter 8012.
2. A data source such as information from a communication session may be sent to the ASR system 8020 and to the adapter 8012.
3. The ASR system 8020 may transcribe a speech sample from audio of the communication session and send the transcription to the adapter 8012.
4. The transcription may also be sent to a user device for display.
5. The adapter 8012 may use the data source and the transcription to create an adapted model that may be stored in the adapted model database 8006.
6. The adapted model may optionally be transmitted to the ASR system 8020 for use in transcribing audio.
7. An adder1 8030a may subtract the value of elements in the pre-adapted model from the value of elements in the adapted model to determine a difference signal. The step of subtracting may include element-by-element matrix subtraction, which may be similar to element-by-element addition described in FIG. 73. The adder1 8030a may also add a residual from a residual database 8004 to the difference signal.
8. The difference signal may be sent to the quantizer 8014, which may quantize the signal. Quantizing the signal may include the quantizer 8014 mapping the difference signal to a countable set of values. Each value may be represented by an index such as a string of bits. Model quantization may be done in several ways, including:
   a. The quantizer 8014 may define multiple regions, each associated with an index. If the value of a parameter falls within a given region, the quantized parameter is set to an index associated with that region. For example, the quantizer 8014 may quantize a continuous variable into an integer expressed using a selected number of bits. In a quantizer 8014 that is linear, each region may be the same size.
   b. The quantizer 8014 may be one-bit that may establish a threshold. If the value of a parameter is above the threshold, the quantizer 8014 may set the quantized parameter to one. If the value of a parameter is below the threshold the quantizer 8014 may set the quantized parameter to zero.
   c. The quantizer 8014 that is a vector quantizer may compare a parameter vector including one or more model parameters to vectors in a codebook 8026. The codebook vector closest to the parameter vector may be considered to be a match. Each vector in the codebook 8026 may have an associated index. The index of the matching codebook vector may be used as the quantized parameter and may be sent in the model update to the model trainer. A copy of the codebook 8026 may be held by both the model updater 8002 and the model trainer 8016. A decoder 8010 in the model trainer 8016 may decode the parameter by retrieving the codebook entry corresponding to the index.
   d. A subset of parameters may be selected for quantization and transmission. In various embodiments, parameters not selected may be discarded, ignored, transmitted in an uncompressed form, or included in the residual signal.
9. An adder2 8030b may determine a quantization error, denoted as the residual database 8004 signal, by subtracting the output of the quantizer 8014 from the input to the quantizer 8014. The residual may be saved to be used in a future update in the residual database 8004. By saving the residual database 8004 and later adding it to the difference signal, the model updater 8002 accounts for quantization error by including a correction for quantization error in a subsequent update.
10. An encoder 8008 may receive the quantized signal and send it to the model trainer 8016. The encoder 8008 may format the quantizer output, such as by packing bits into words or data into packets to make transmission more efficient.

11. The model trainer 8016 receives the update signal, decodes it using a decoder 8010, and uses the model update to create an updated master model 8018. For example, as shown, the model trainer 8016 may add the update signal to parameters of the master model 8018 to create new parameters for the updated master model 8018.

The illustration and above description pertain to sending updates from the model updater 8002 to the model trainer 8016. The method described, including compression, quantization, sending select portions of a model or signal, and use of a residual signal, may also be used for sending the pre-adapted model from the model trainer 8016 to the model updaters 8002. Models may include acoustic models, language models, neural networks, end-to-end ASR models, capitalization models, punctuation models, or other models. Model training may occur on-the-fly or from stored data. Modifications, additions, or omissions may be made to the environment 8000 without departing from the scope of the present disclosure.

Figure 75:
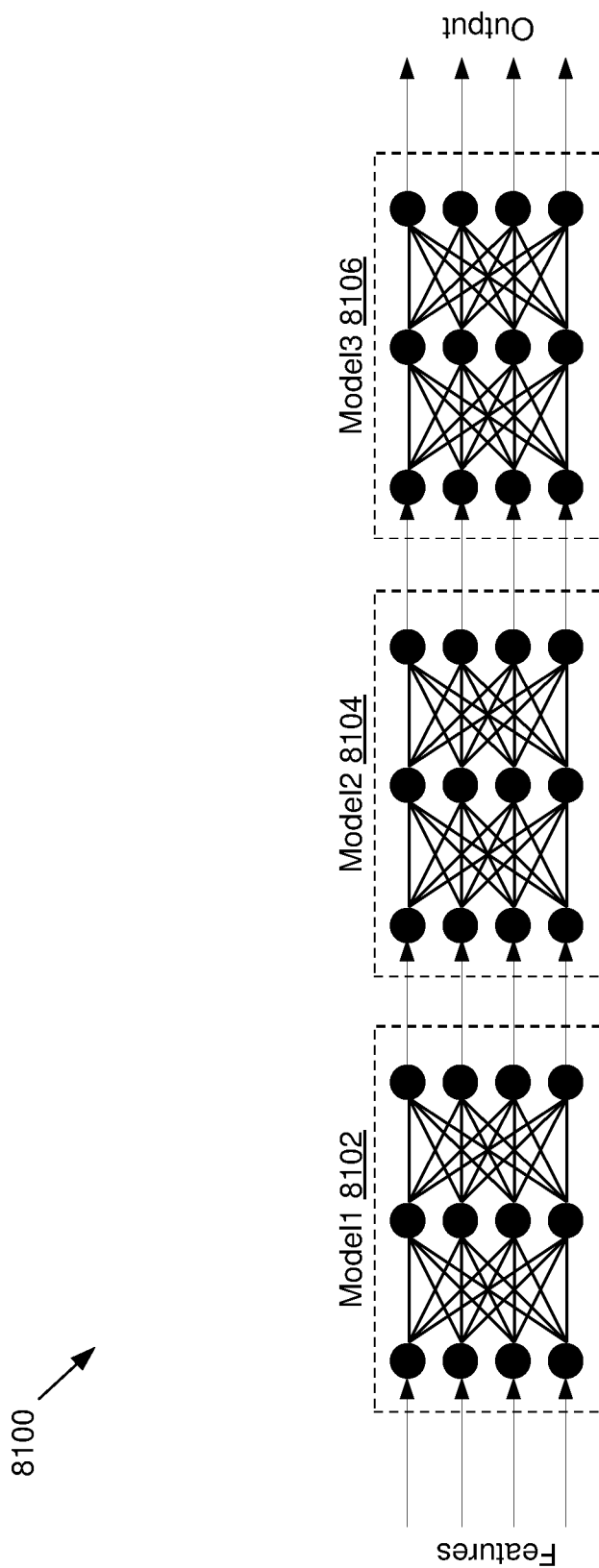
FIG. 75 illustrates an example environment for subdividing model training.

FIG. 75 illustrates an example environment 8100 for subdividing model training, in accordance with some embodiments of the present disclosure. For efficiency or other reasons in training and adaptation of models, models may be divided into parts. In some embodiments, subdividing a model may reduce the bandwidth when transmitting models between a model trainer and a model updater as described in this disclosure. Alternatively or additionally, subdividing may also reduce the amount of data and computation needed to adapt a model to a given speaker, group of speakers, population, accent group, or training data sector.

In some embodiments, a model may be divided into multiple segments (model1 8102, model2 8104, model3 8106) and placed in series. Connections shown here as lines may represent signal paths between nodes and may include weights, so that each signal may be multiplied by a weight as it traverses the signal path. Select model segments may be updated or may be updated frequently while other segments may remain static or may be updated less frequently. For example, a first portion of a DNN acoustic model, shown as model1 8102, may be particularly sensitive to speaker differences and therefore may be trained based on a specific speaker's voice or on a group of speakers such as a group of speakers using the same communication device, while model2 8104 and model3 8106 may remain unchanged or may be updated less frequently.

For an acoustic model, the input to model1 8102 may be speech features and the output may be probabilities such as phoneme or other subword probabilities. For a language model, the input may be words, encoded words, or words embeddings and the output may be conditional word probabilities. For an end-to-end ASR system, the input may be speech samples or speech features and the output may be one or more words, characters, or subwords.

Figure 76:
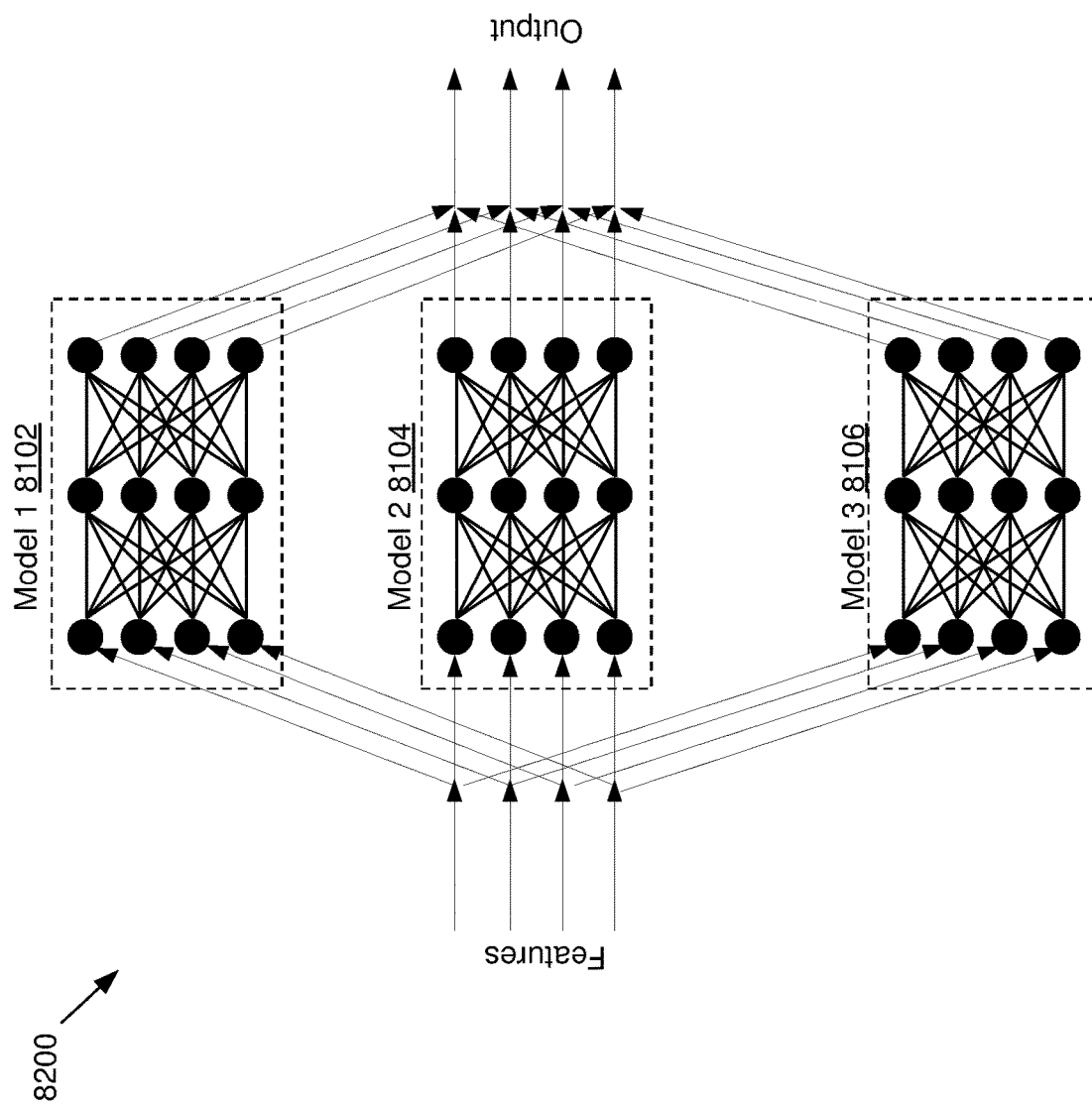
FIG. 76 illustrates an example environment for subdividing model training.

The illustration of models model1 8102, model2 8104, and model3 8106 as feed-forward neural nets, the number of nodes and connections shown, and the examples of inputs and outputs described above are provided as examples. Other forms of models and other inputs and outputs may be used. Model segments are illustrated here in series; however, other topologies are contemplated, including model segments in parallel as illustrated in FIG. 76, a combination of series and parallel, recurrent connections, other neural net types, and with models inside or in-between other models.

The model segments are illustrated as including neural networks, however, the model segments may include other model forms including Gaussian mixture models, recurrent neural networks, linear estimators or classifiers, and classifiers or estimators using kernel methods such as support vector machines. Additional examples are listed in Table 9.

An example implementation for training models may include the following operations:
1. A transcription service collects voice samples from one or more speakers.
2. A model trainer transmits a subset of a model (e.g., model2 8104) to a model updater.
3. The model updater tunes the model subset based on the voice samples.
4. The model updater transmits a model update to the model trainer.
5. The model trainer uses the model update to adapt the model subset (e.g., model2 8104).
6. An ASR system uses the adapted model subset (e.g., model2 8104) and one or more other model subsets (e.g., model1 8102 and model3 8106) to transcribe an audio signal and create a transcription.
7. The transcription is sent to a user device to provide transcriptions.

Furthermore, modifications, additions, or omissions may be made to the operations described above without departing from the scope of the present disclosure. For example, the operations may be implemented in differing order. Additionally or alternatively, two or more operations may be performed at the same time. Furthermore, the outlined operations are only provided as examples, and some of the operations may be optional, combined into fewer operations, or expanded into additional operations without detracting from the essence of the disclosed embodiments.

FIG. 76 illustrates an example environment 8200 for subdividing model training, in accordance with some embodiments of the present disclosure. In the depicted embodiment, the subdivided models are configured for updates in a parallel model in contrast to the serial model as illustrated in FIG. 75. Multiple language or acoustic models, illustrated here as an example with model1 8102, model2 8104, and model3 8106 of FIG. 75, may be run in parallel, each presented with substantially the same input data and with the outputs averaged or summed together to form an output. In the case of language models, this arrangement may be a form of interpolation. In the case of acoustic models, the arrangement may be used, for example, to determine subword probabilities averaged or summed across multiple acoustic models.

Figure 77:
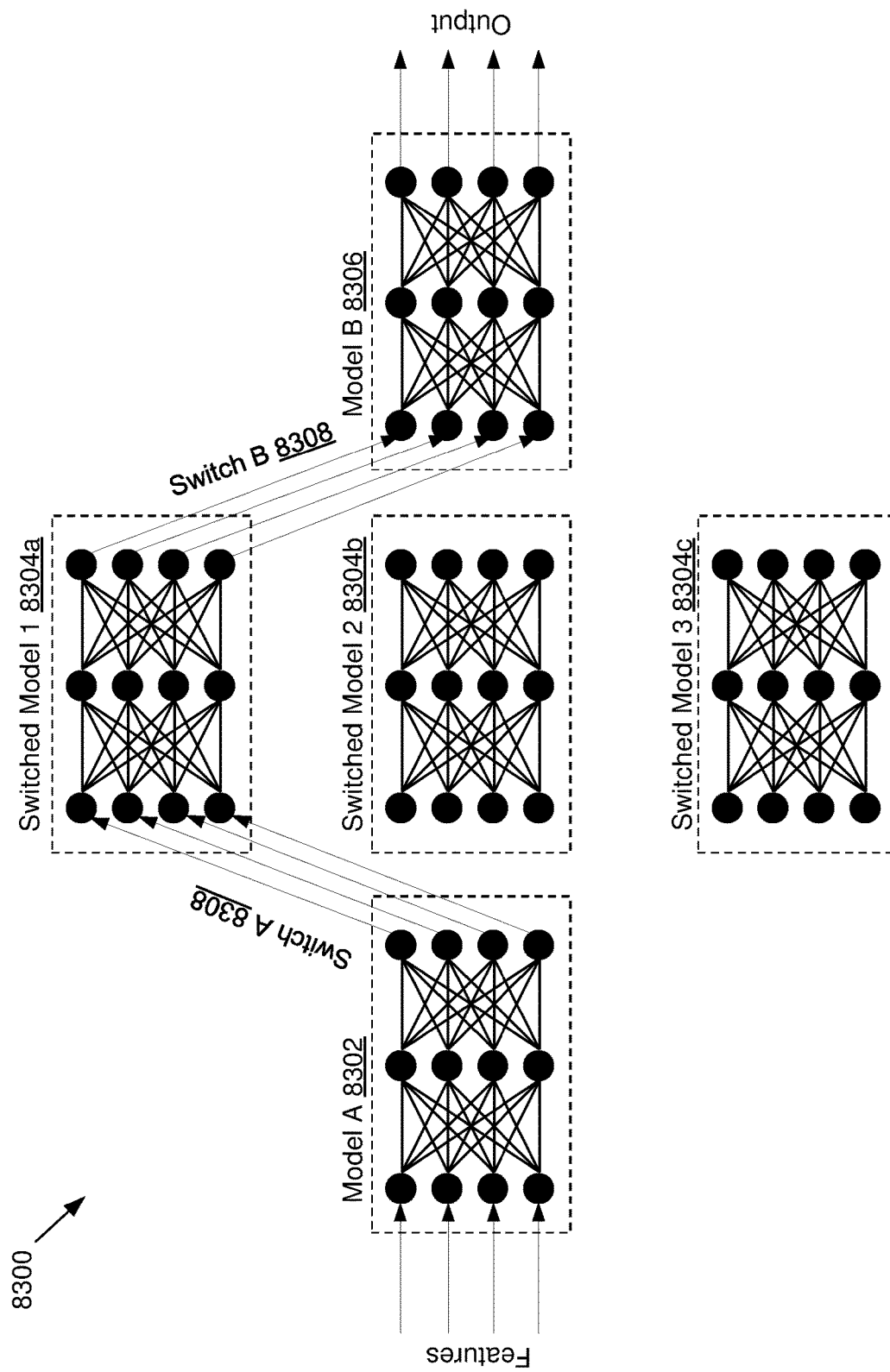
FIG. 77 illustrates an example environment for subdividing a model.

FIG. 77 illustrates an example environment 8300 for subdividing a model, in accordance with some embodiments of the present disclosure. In the depicted embodiment, the subdivided models may be capable of being reconfigured for use with one of multiple conditions such as a given speaker, group of speakers, acoustic environment, or topic. As illustrated, a model may include, at a given time and depending on switch settings, model A 8302, one of multiple switched models 8304*a*-*c*, collectively the switched models 8304, and model B 8306.

In some embodiments, the switched models 8304 may each be trained on a different subset of training data or using different training methods. For example, each switched model 8304 may be trained on data from a speaker or group of speakers. A data set may be divided into multiple training sets based on speaker age, phone number, gender, accent, language, voice patterns, bandwidth, noise level, compression method and bit rate, topic, historical accuracy, etc., and using one or more methods such as those shown in Table 4. Each training set may be used to train one or more switched models 8304 while model A 8302 and model B 8306 may be trained on multiple training sets. An example of a training set may be a speaker cluster, which may be a group of speakers that sound alike or have similar voice characteristics. After creation, each switched model 8304 may be further adapted by training to the speaker or speakers associated with that switched model, such as training to voice samples or transcriptions from an ongoing communication session or from recorded data from previous communication sessions.

In some embodiments, a switch A 8308 and a switch B 8308 may connect one of the switched models 8304 between model A 8302 and model B 8306. The selection may be, for example, based on one or more of:

1. The switched model may be chosen based on speaker characteristics such as age, gender, accent, language, or voice patterns.
2. The switched model may be chosen based on signal characteristics such as bandwidth, noise level, or compression method and bit rate.
3. The switched model may be chosen based on the phone number or other device identifier of the captioned caller.
4. The switched model may be chosen based on topic of conversation.
5. The switched model may be chosen based on one or more features in Table 2 and Table 5.
6. The switched model may be chosen to reduce an ASR system error rate.
7. The switched model may be chosen based on a history of a speaker during previous communication sessions. For example, if a particular switched model was found on a previous communication session to provide higher-accuracy for a given speaker, then the same switched model may be used for the same speaker in a subsequent communication session.
8. A given speaker's voice may be analyzed to determine which speaker cluster he/she belongs to. The switched model associated with that model cluster may be used for the given speaker.
9. The switched model that delivers the lowest perplexity against a speaker's transcription may be chosen for use with a given speaker. For example the switched model may be part of a language model that may be used to measure perplexity of a transcription of the speaker's voice sample.
10. The switched model that delivers the highest likelihood score, which may be reported by an ASR system transcribing an audio sample from the speaker, may be chosen.

As with FIG. 75, illustration of the models as feedforward neural nets in a series of three is merely an example. Other topologies and model types are possible. For example, 1. Models may be arranged in series, parallel, or combination thereof.
2. The number of models connected at a given time may be more or less than three.
3. There may be more or less than three switched models in a set and more than one set of switched models.
4. Models may include other model types and other forms of neural nets.
5. Switched models may be in other positions, such as at the beginning or at the end of a series. For example, the combination of models may include one of the switched models 8304 followed by model B 8306 or the combination of models may include model A 8302 followed by one of the switched models 8304.
6. A feature transformation model may be at the start of a model or series of models. For example, the feature transformation model may receive a set of features from a feature extraction step and transmit a set of features to the input of another model. The feature transformation model may be a neural net, a matrix that operates on the feature vector to create a transformed feature vector, a vocal tract normalization (VTLN) model, or another form of model. In one implementation, a switched model adapted to the voice of one or more speakers may be the first in a series of neural net acoustic model stages. Since it is the first stage in an acoustic model, the switched model may compensate for differences between speakers.

Figure 78:
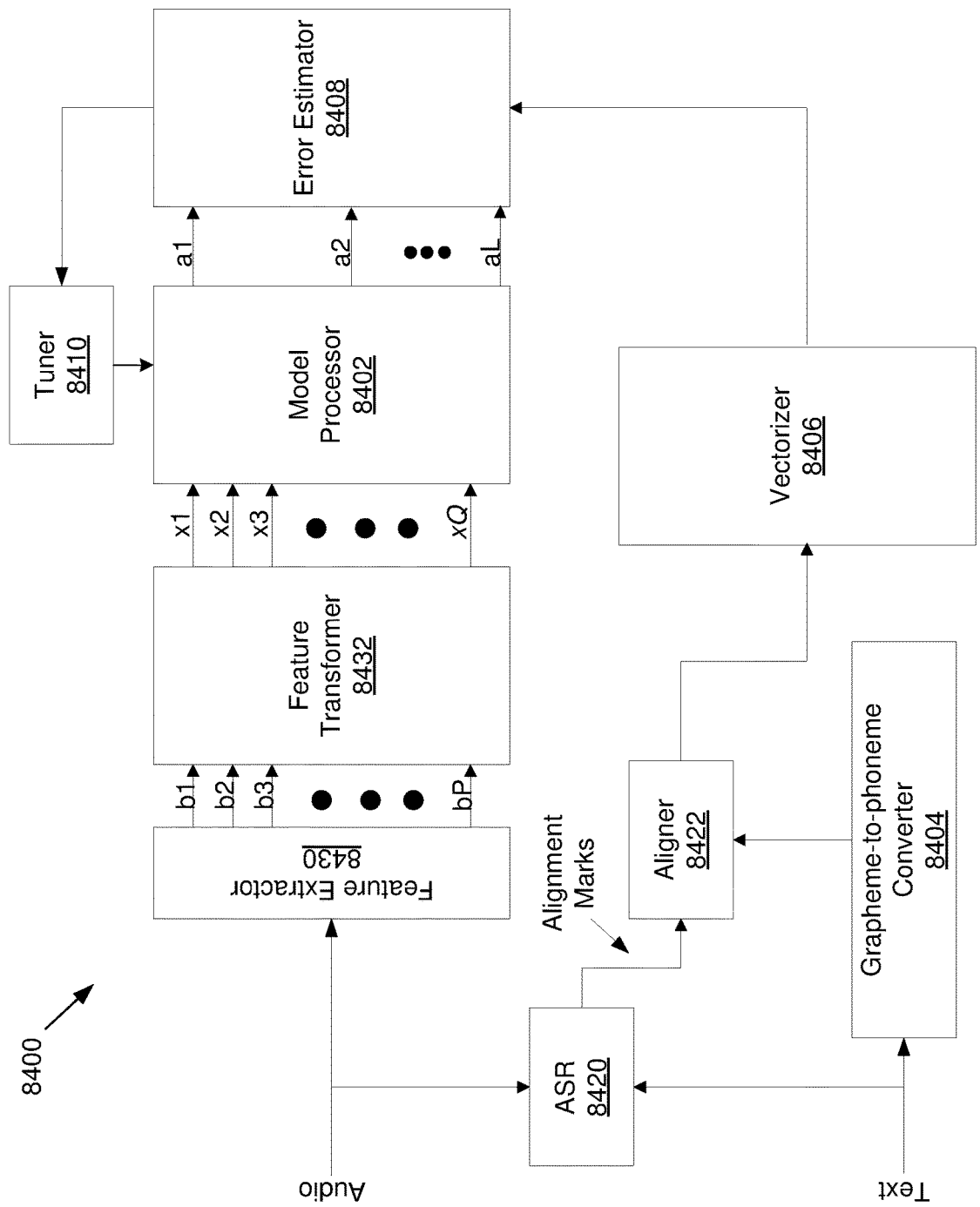
FIG. 78 illustrates an example environment for training models on-the-fly.

FIG. 78 illustrates an example environment 8400 for training models on-the-fly, in accordance with some embodiments of the present disclosure. In some embodiments, training models on-the-fly may indicate that the data used to train the models may be obtained in real-time as the data is created from an on-going event and the data may be deleted during and/or shortly after an end of the event. For example, the event may be a communication session. In these and other embodiments, communication session data of the communication session may be used to train models during and/or shortly after an end of the communication session. In these and other embodiments, the communication session data may be deleted or rendered unavailable for training during and/or shortly after an end of the communication session. In some embodiments, shortly after an end of an event may include an amount of time that includes 1, 2, 3, 5, 7, 10, 15, 20, 30, 45, 60, 120 or more seconds. Alternatively or additionally, shortly after an end of an event may include an amount of time that may range between 1 second and 10 minutes. Alternatively or additionally, the data used to train models using the environment 8400 may be stored data.

In some embodiments, the environment 8400 may be configured to obtain data that may be used to train models, such as ASR models. The data may include audio and text of the audio. The audio may be regular audio or revoiced audio. Alternatively or additionally, the data may include a series of speech samples extracted from the audio. The speech samples may be extracted during frames of the audio. The frames may by 2, 5, 7, 10, 15, 20, 30, 40, or 50 milliseconds, among other lengths. The text may include a series of words representing the transcription of the audio. Alternatively or additionally, the data may further include a set of endpoints that may include time markings indicating points in time in the audio, such as where each word or subword from the text begins and ends in the audio.

In some embodiments, the audio may be provided to a feature extractor 8430. The feature extractor 8430 may be configured to extract features from the audio. In some embodiments, the feature extractor 8430 may extract features from the audio for each frame of the audio. Thus, the features may correspond to frames of the audio. The features may include samples, spectral coefficients, MFCCs, or cepstral coefficients, among other features. The feature extractor 8430 may provide the features to a feature transformer 8432. The feature transformer 8432 may be configured to convert the features to a transformed feature set. In some embodiments, the feature transformer 8432 may use a DNN, MLLR matrix, or fMLLR matrix.

In some embodiments, the feature transformer 8432 may provide the transformed feature set to a model processor 8402. The model processor 8402 may be configured to apply a model that is to be trained to the transformed feature set.

In these and other embodiments, the model being trained may include a set of weights or parameters and the model processor 8402 may be viewed as the processor that implements the model and that adjusts the weights or parameters of the model to train or adjust the model. For example, the model processor 8402 may be configured to use the model being trained to map input features x1, x2, x3, . . . , xQ from the transformed feature set to output parameters a1, a2, . . . , aL. For example, the model processor 8402 may obtain one or more features from the transformed feature set and output a set of probabilities. In these and other embodiments, each of the probabilities of the set of probabilities may correspond to a probability that an input feature represents a particular phoneme given the context of the particular phoneme. The model processor 8402 may provide the output parameters to an error estimator 8408.

In the embodiment depicted in FIG. 78 and others, the model processor 8402 may be used to implement an acoustic model. In these and other embodiments, the model processor 8402 may serve as a probability calculator, such as the probability calculator 508 from FIG. 5. The model processor 8402 may receive a set of features derived from an audio signal as input and produce a set of probabilities, such as phoneme probabilities, as output. When not training the model, the model processor 8402 may output the set of probabilities to a decoder, such as the decoder 510 (also from FIG. 5). When training the model, the model processor 8402 may output the set of probabilities to the error estimator 8408. Alternatively or additionally, the model processor 8402 may implement a language model. In these and other embodiments, the model processor 8402 may use the language model to provide probabilities corresponding to various word combinations to a decoder. Alternatively or additionally, the model processor 8402 may implement any type of model described in this disclosure.

In some embodiments, the environment 8400 may include a grapheme-to-phoneme converter 8404. The grapheme-to-phoneme converter 8404 may be configured to receive the text of the audio. The text may include words. The grapheme-to-phoneme converter 8404 may be configured to determine a string of phonemes that correspond to the words. In some embodiments, the grapheme-to-phoneme converter 8404 may include a lexicon, a pronunciation dictionary, and a set of letter-to-sound rules that specify how each word is pronounced. In these and other embodiments, the grapheme-to-phoneme converter 8404 may analyze the words using the lexicon, pronunciation dictionary, and letter-to-sound rules to determine the string of phonemes that corresponds to the words. For example, if an input word is "Bobby," the grapheme-to-phoneme converter 8404 may output the phoneme sequence "/b/ /aa/ /b/ /iy/" corresponding to the English phonemes that compose the word "Bobby." The grapheme-to-phoneme converter 8404 may provide the phoneme sequence to an aligner 8422.

In some embodiments, the environment 8400 may further include an ASR system 8420. The ASR system 8420 may be configured to receive the audio and the text from the data obtained by the environment 8400. In these and other embodiments, the ASR system 8420 may also obtain additional data, such as word endpoints. In some embodiments, the ASR system 8420 may use the text as a grammar to be recognized and the audio as the input to generate alignment marks. The alignment marks may indicate a start and an end of acoustic units in the audio. The acoustic unit may correspond to words, phonemes, and/or sub-phonemes. For example, the alignment marks may include start and end times for words, phonemes, and/or sub-phonemes in the audio. In some embodiments, sub-phonemes may be components of a phoneme. For example, the sub-phonemes of the phoneme "t," may include two sub-phonemes: (a) a closure (the silence before airflow begins) and (b) a plosive (sound created from turbulent airflow that begins once the tongue drops from the hard palate). The ASR system may send the start and the end times of the acoustic units in the audio to the aligner 8422.

The aligner 8422 may be configured to obtain the phoneme sequence and the start and the end of acoustic units in the audio. The aligner 8422 may insert the start and the end of acoustic units in the audio into the phoneme sequence and provide the phoneme sequence with the inserted start and end times to a vectorizer 8406.

In some embodiments, for each frame of the audio as used by the feature extractor 8430, the vectorizer 8406 may generate an idealized representation of the phoneme probabilities of the phoneme in the frame of the audio. In these and other embodiments, the phoneme probabilities may be a probability of "1" for the phoneme present during a given frame of the audio and "0" for all other phonemes.

In some embodiments, the phoneme probabilities may be a probability of the phoneme independent of context. Alternatively or additionally, the phoneme probabilities may be a probability of the phoneme dependent on context referred to context-dependent phonemes. In these and other embodiments, a phoneme dependent on context may be a phoneme in a specified context. For example, a phoneme "/aa/" preceded by a phoneme "b" and followed by a phoneme "b" (i.e., "/b/ /aa/ /b/") may be a different context than if the phoneme "/aa/" is preceded by a phoneme "b" and followed by a phoneme "d" (i.e., "/b/ /aa/ /d/).

In some embodiments, the vectorizer 8406 may provide an indication of the idealized probability of the phoneme to an error estimator 8408. In some embodiments, the vectorizer 8406 may have one output for each phoneme as illustrated. In these and other embodiments, the indication of the idealized probability of the phoneme provided by the vectorizer 8406 may include placing the output corresponding to the phoneme to "1" and having the rest of the outputs at "0." The vectorizer 8406 may change the output based on the frame of the audio being analyzed. In some embodiments, when the phoneme probabilities relate to phonemes dependent on context, the number of potential outputs may be large. If there are 41 phonemes, for example, there may be 41*41*41=68921 possible different context-dependent phonemes. To reduce the number of outputs, context-dependent phonemes may be grouped into similar clusters, and contexts that rarely or never occur may be eliminated. As a result, a smaller number of context-dependent phonemes may be provided to the error estimator 8408.

The error estimator 8408 may obtain the output parameters from the model processor 8402 and the indication of the probability of phonemes in the audio from the vectorizer 8406. The error estimator 8408 may determine the value of a cost function between the vectorizer 8406 output and the model processor 8402 output. In some embodiments, the cost function may be a total squared error. For example, if there are L outputs from the vectorizer 8406, the outputs of the vectorizer 8406 may be expressed as yj, j=1, 2, . . . L, and outputs of the model processor as aj, j=1, 2, . . . L, then the squared error may be determined:

$$E^2 = \sum_{j=1}^{L} (y_j - a_j)^2.$$

Other cost functions such as cross entropy CTC (Connectionist Temporal Classification) loss function, sequential training, and sequence-discriminative training may also be used. The error estimator 8408 may send an error signal to a tuner 8410. The error signal may include a series of values of the cost function for each frame. In these and other embodiments, the error signal may be used as a measure of how well the model (e.g. weights or parameters $w_j$) fits the training data. Training a model may include finding a set of model weights that minimizes the error signal.

In some embodiments, the tuner 8410 may be configured to adjust model parameters of a model being implemented by the model processor 8402 to reduce the cost function. Adjusting the model parameters may include training the model. The adjustment may happen iteratively based on methods such as gradient descent where an update equation is defined. For example, if $w_j$ is a parameter to be adjusted and $\mu$ is a learning rate, then, with each new data sample or batch of data samples, the model parameter may be modified based on the update equation, $$w_j \leftarrow w_j - \mu \frac{\delta E^2}{\delta w_j}$$

For faster computation, methods such as the chain rule and backpropagation may also be used. The model trained by the model processor 8402 may be used by other ASR systems, integrated into other models, and/or used by the model processor 8402 during generation of transcriptions.

On-the-fly training methods disclosed herein for acoustic models (e.g. FIG. 78) and language models (e.g. FIG. 65) may be adapted for training other types of models such as capitalization and punctuation models. Other types of models include, but are not limited to, acoustic models, language models, confidence models, capitalization models, punctuation models, pronunciation models or lexicons, feature extraction or transformation models, runtime parameters or settings, or other types of models. Modifications, additions, or omissions may be made to the environment 8400 without departing from the scope of the present disclosure.

Figure 79:
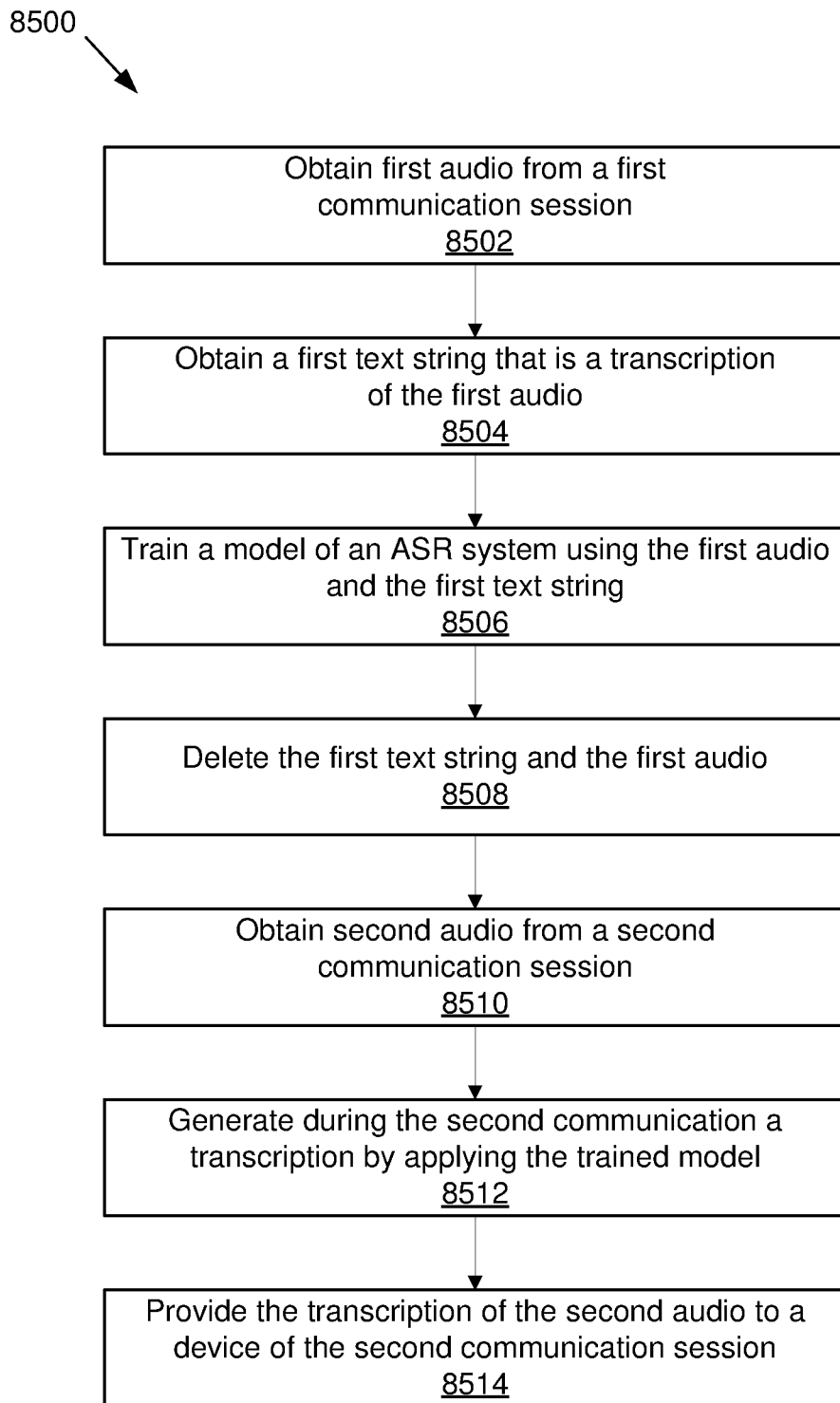
FIG. 79 is a flowchart of an example method of on-the-fly model training.

FIG. 79 is a flowchart of an example method 8500 of on-the-fly model training, in accordance with some embodiments of the present disclosure. The method 8500 may be arranged in accordance with at least one embodiment described in the present disclosure. The method 8500 may be performed, in some embodiments, by processing logic that may include hardware (circuitry, dedicated logic, etc.), software (such as is run on a general-purpose computer system or a dedicated machine), or a combination of both. In some embodiments, the method may be performed by the model trainer 7206 and/or the model updaters 7602 of FIGS. 68 and 71, respectively. In these and other embodiments, the method 8500 may be performed based on the execution of instructions stored on one or more non-transitory computer-readable media. Although illustrated as discrete blocks, various blocks may be divided into additional blocks, combined into fewer blocks, or eliminated, depending on the desired implementation.

The method 8500 may begin at block 8502, where first audio data of a first communication session between a first device of a first user and a second device of a second user may be obtained. In some embodiments, the first communication session may be configured for verbal communication.

At block 8504, during the first communication session, a first text string that is a transcription of the first audio data may be obtained. In some embodiments, the first text string may be generated using automatic speech recognition technology. In these and other embodiments, the automatic speech recognition technology may generate the first text string using revoicing of the first audio data.

In some embodiments, the first text string may be generated from one or more words of a second text string and one or more words of a third text string. In these and other embodiments, the second text string and the third text string may be generated by automatic speech recognition technology.

At block 8506, during the first communication session, a model of an automatic speech recognition engine may be trained using the first text string and the first audio data. In some embodiments, the model may be an acoustic model, a language model, a confidence model, or classification model of the automatic speech recognition engine. Alternatively or additionally, the training of the model of the automatic speech recognition engine using the first text string and the first audio data may complete after the first communication session ends.

At block 8508, in response to completion of the training of the model using the first text string and the first audio data, the first audio data and the first text string may be deleted. In some embodiments, the first audio data and the first text string may be deleted during the first communication session. Alternatively or additionally, the first audio data and the first text string may be deleted after the first communication session.

At block 8510, after training the model using the first text string and the first audio data, second audio data of a second communication session between a third device of a third user and a fourth device of a fourth user may be obtained.

At block 8512, during the second communication session, a transcription of the second audio data may be generated by applying the model trained using the first text string and the first audio data. At block 8514, the transcription of the second audio data may be provided to the fourth device for presentation during the second communication session.

Furthermore, modifications, additions, or omissions may be made to the operations described above without departing from the scope of the present disclosure. For example, the operations may be implemented in differing order. Additionally or alternatively, two or more operations may be performed at the same time. Furthermore, the outlined operations are only provided as examples, and some of the operations may be optional, combined into fewer operations, or expanded into additional operations without detracting from the essence of the disclosed embodiments.

For example, the method 8500 may further include providing the transcription of the first audio data to the second device for presentation by the second device during the first communication session. As another example, the method 8500 may further include training, during the second communication session using a second text string of the transcription of the second audio data, a second model used by automatic speech recognition technology and in response to completion of the training of the second model using the second text string and the second audio data, deleting the second audio data and the second text string.

Figure 80:
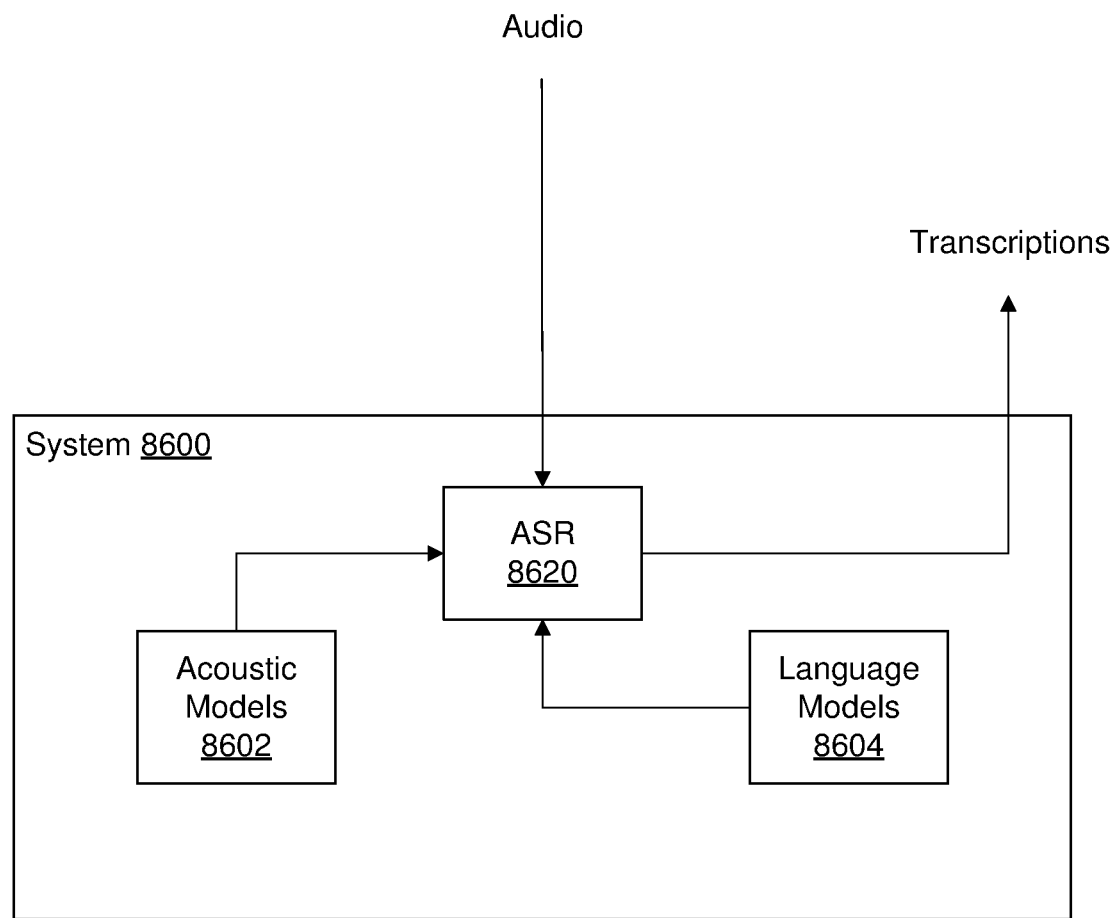
FIG. 80 illustrates an example system for speech recognition.

FIG. 80 illustrates an example system 8600 for speech recognition, in accordance with some embodiments of the present disclosure. In some embodiments, the system 8600 may include an ASR system 8620 that is configured with tunable acoustic models 8602 and tunable language models

8604. The ASR system 8620 may be analogous to the ASR system 520 of FIG. 5 and the tunable acoustic models 8602 and tunable language models 8604 may be analogous to one or more of the models 530 of FIG. 5.

In some embodiments, the tunable acoustic models 8602 and tunable language models 8604 may be tuned to improve quality of transcriptions generated by the system 8600. Improving the quality may include reducing errors and/or improving other characteristics of the transcriptions. The tunable acoustic models 8602 and tunable language models 8604 may be tuned, e.g., adjusted, for a given communication session, speaker, or group of speakers. For example, the system 8600 may evaluate a first portion of a communication session and adapt one or more models or tuning parameters to improve accuracy during a second portion of the communication session. The tunable acoustic models 8602, the tunable language models 8604, and other parameters may be tuned using one or more of several methods, including:

1. The model weights or parameters may be adapted.
2. A parameter may be adjusted that affects the input or the behavior of a model. For example, vocal tract length normalization (VTLN) may be adjusted by determining a value for a linear frequency warping factor. In another example, search parameters such as beam width and a factor determining the relative weight or contribution of an acoustic model compared to a language model, may be adjusted.
3. A feature transformation model may be adjusted or selected. The feature transformation model may be, for example, a bottleneck DNN or a matrix of weights determined using MLLR or fMLLR.
4. Multiple models may be combined to form a model. For example, multiple models may be driven with the same input and the outputs may be added or averaged (see FIGS. 81 and/or 82). Hierarchal language models may be constructed by combining language models with different characteristics or designed for different tasks. For example, a generic language model, designed to recognize a wide variety of input, may be combined with a name language model, designed to recognize spoken names, in a hierarchal structure. As another example, language models may be interpolated to increase accuracy against a training set, which may include a portion of a communication session or one or more communication sessions with a speaker or group of speakers.
5. Multiple models may be arranged so that different models are activated, depending on the nature of the audio sample and other factors.
6. Multiple models may be run simultaneously. The model with the highest performance may be chosen. In some embodiments, after selection, other models may be disengaged. An example of this method is in language detection, where audio may be transcribed using multiple models, each trained for a different language or dialect, until the spoken language is determined.
7. Models may be selected or tuned based on one or more factors, including:
   a. Analysis of the speaker's voice.
   b. The device type (e.g., cell/speaker/landline phone).
   c. Speaker demographics such as age (e.g., child, elderly), gender, ethnicity, accent, location, speech or hearing impairment, etc. Demographics may, for example, be determined from customer records or other records, signal analysis of the speaker's voice, and image analysis of a speaker's picture.
   d. Signal characteristics (e.g., loudness, SNR, signal quality, signal bandwidth).
   e. Conversation topic.
   f. Information from past conversations.
   g. Account type (business, residential, etc.).
   h. Other features from Table 2 and Table 5.

Figure 81:
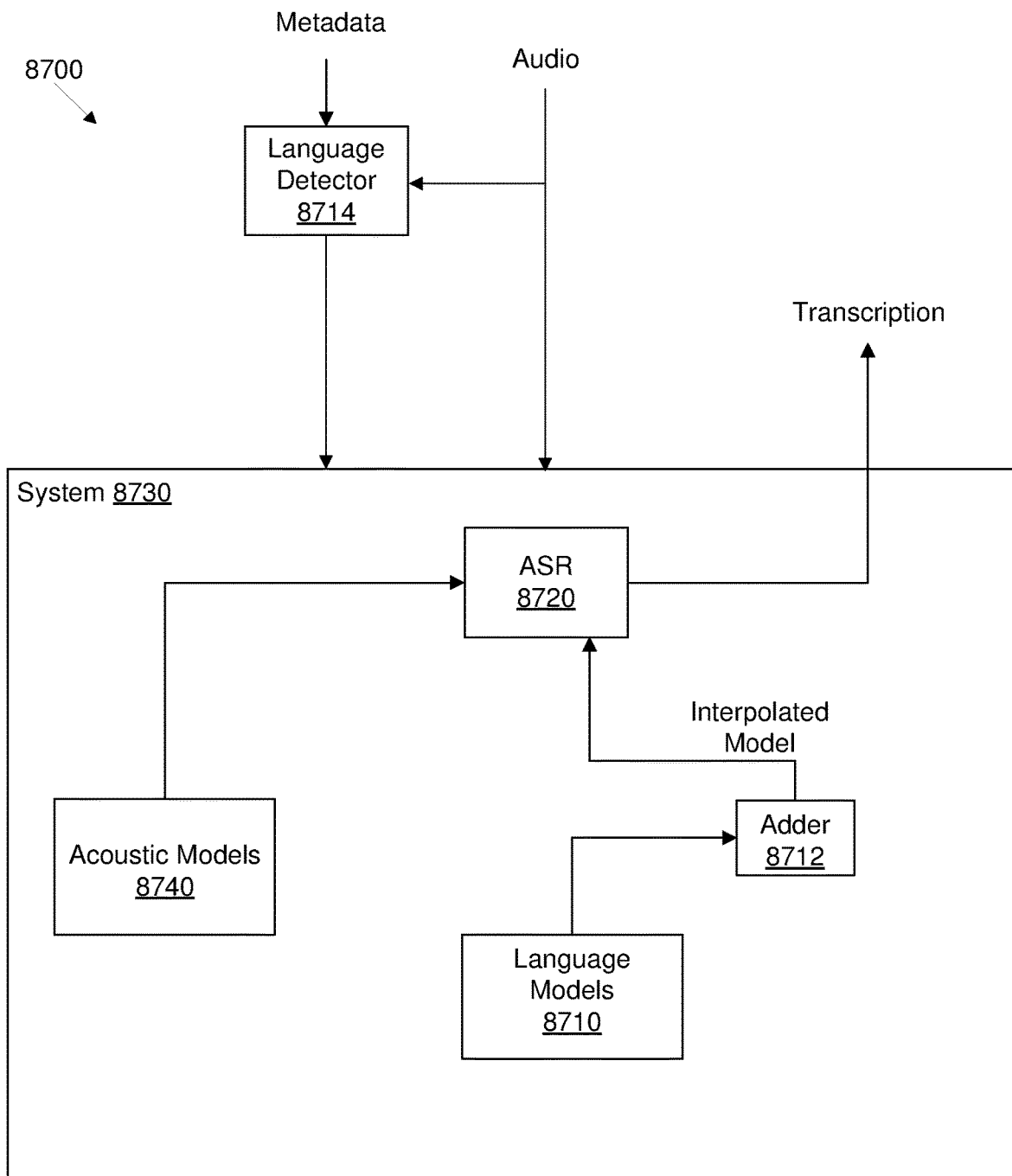
FIG. 81 illustrates an example environment for selecting between models.

FIG. 81 illustrates an example environment 8700 for selecting between models, in accordance with some embodiments of the present disclosure. In some embodiments, the environment 8700 may include a system 8730 that may be configured to generate transcriptions of audio. The system 8730 may be an ASR system 8720 that may be configured to select and use different acoustic and language models from acoustic models 8740 and language models 8710, respectively. In some embodiments, the ASR system 8720 may be analogous to the ASR system 520 of FIG. 5 and the acoustic models 8740 and the language models 8710 may be analogous to one or more of the models 530 of FIG. 5.

In some embodiments, the system 8730 may select an acoustic model from among the acoustic models 8740 depending on characteristics of the event that is generating the audio, such as a communication session. Alternatively or additionally, the system 8730 may select from among the acoustic models 8740 based on knowledge of the speaker represented in the audio, historical information regarding one or more speakers in the communication session, characteristics of the communication device that captures the voices of the speakers, or other factors (see FIG. 80).

In some embodiments, the acoustic models 8740 may include a static (i.e., parameters are constant) acoustic model. In these and other embodiments, the static acoustic model may be used in combination with other selected acoustic models or alone. Alternatively or additionally, the acoustic models 8740 may include a dynamic acoustic model (see FIG. 77, for example), designed to adapt to the voice of a particular speaker or group of speakers. In these and other embodiments, the dynamic acoustic model may be used in combination with other selected acoustic models or alone.

In some embodiments, the system 8730 may be configured to interpolate, at an adder 8712, multiple language models 8710 to create an interpolated language model. In some embodiments, a set of interpolation weights may determine the degree to which each language model is weighted in constructing the interpolated model. For example, two models, one trained on data collected from a transcription service and one trained on data collected elsewhere, may be interpolated together to form an interpolated model.

Alternatively or additionally, the system 8730 may not include the adder 8712. In these and other embodiments, multiple language models 8710 may be transmitted to the ASR system 8720 and the ASR system 8720 may effectively perform language model interpolation by combining the outputs of the multiple language models. Additionally or alternatively, the ASR system 8720 may use interpolation weights in combining the outputs of language models, such as by weighting a given conditional word probability from each of multiple language models by the weights for their respective language models, and using the sum of the weighted probabilities.

In some embodiments, additional models may be used for interpolation with the language models. For example, a topic language model based on the conversation topic of the audio for which transcriptions are being generated may be used. The topic may be determined based on data collected from the current event, such as the current communication session including content from a subscription party, a transcription party, or both and from other participants on the current and/or previous communication sessions, and/or from past events. In these and other embodiments, a topic classifier may identify a topic. The topic classifier may identify a topic from a set of defined topics using similarity measures such as tf-idf or cosine similarity or using a method from Table 9. In these and other embodiments, the topic language model may be built, selected, or adapted using the conversation topic identified. Additionally or alternatively, a set of topic language models, each covering one or more conversational topics, may each be built using text pertaining to one or more topics. A topic detector may select one or more topic models for a current communication session, based on features such as analysis of the conversation, of past conversations, characteristics of the participants, and account type, among other features. The selected topic models may be used individually, interpolated together, or interpolated with other language models, by the ASR system 8720 to provide transcriptions for the current communication session.

In some embodiments, the system 8730 may be configured to select from among the acoustic models 8740 and/or the language models 8710 for the ASR system 8720 based on a language in the audio. For example, the audio may include speech in English, Spanish, French, German, Chinese, Japanese, or other languages. In these and other embodiments, the system 8730 may be configured to select a first acoustic model of the acoustic models 8740 and a first language model of the language models 8710 based on the language being a first language such as Spanish and may select a second acoustic model of the acoustic models 8740 and a second language model of the language models 8710 based on the language being a second language such as English. Additionally or alternatively, the system 8730 may include multiple ASR systems. Each of the ASR systems may be configured for different sets of languages and a communication session in a selected language may be connected to the ASR system configured for that language.

In some embodiments, the system 8730 may predict the language or determine the language of audio using one or multiple options. The options to predict the language or determine the language of audio may include one or more of:

1. A language detector 8714 may listen to audio, determine the language being spoken, and direct the system 8730 to activate an ASR system or model for that language.
2. The ASR system may start transcribing the audio using models based on a first language determined, using one or more methods such as those described in #6 below. The language detector 8714 may simultaneously listen to the audio and determine the language being spoken. If the language being spoken is different from the first language, then activate the ASR system or model for the spoken language.
3. A non-revoiced ASR system may start transcribing the audio. The language detector 8714 may determine the spoken language. An estimator may estimate accuracy for the non-revoiced ASR system transcribing the communication session. After at least some of the audio has been transcribed, a first decision may be made, based on estimated ASR accuracy and the language determined by the language detector 8714, for (1) whether to continue captioning with a non-revoiced ASR system, a revoiced ASR system, or combination thereof (see Table 1) and a second decision may be made for (2) which spoken language to use for transcriptions (i.e., which spoken language should the non-revoiced ASR system be configured for if the first decision is a non-revoiced ASR system or which language skills should a CA have if the first decision is to use a revoiced ASR system). The spoken language detector may select a new spoken language to use for transcriptions one or more times during the communication session, at which time transcription may continue, for example, using a different revoiced ASR system, a different non-revoiced ASR system configured for the new language, or by configuring the non-revoiced ASR system for the new language, such as by the non-revoiced ASR system using one or more models corresponding to the new language.
4. Mechanisms may be provided, for example via a user device or a website, for a subscriber (party 1) to select a language for a transcription party. The selection may be selectable per-communication session or per-calling party and may be remembered between communication sessions by, for example, remembering the language selected for a given transcription party and starting with the remembered language on a subsequent communication session with the same transcription party. The selection may be made prior to or during the communication session and may be changed multiple times during the communication session.
5. Mechanisms may be provided, for example via the transcription party's calling device, sending DTMF signals, or visiting a web site, for the transcription party to select a language.
6. The language detector 8714 may determine a likely spoken language for a transcription party based on metadata such as:
    a. A language indicator in the transcription party's or subscriber's captioning account or profile, another account, or customer record. The indicator may be settable, for example, by an installer at installation of a captioning service, by the caller, by the subscriber, by a customer service representative, via an IVR system, or via a website.
    b. A language indicator for the transcription party saved in a caption calling subscriber's customer record or in a profile on the captioned phone.
    c. The primary language of the transcription party's country or region, which may be determined based on information in the transcription party's account or profile.
    d. The transcription party's telephone number, device ID, or IP address and the dominant language implied by the corresponding location. For example, the transcription party's language may be determined from the country code and/or area code within the country.
    e. The primary language of the subscriber's country or region, which may be determined based on information in the subscriber's account, profile, or customer record, telephone number, IP address, or device identifier.
    f. A language defined by the type of captioning service. For example, if service is primarily provided for a particular country, the spoken language may be determined to be the dominant language for that country.
    g. An analysis of the etymology of the transcription party's name based on, for example, a language associated with characters in the name, a name lookup table, or a language classification of the name based on spelling. The transcription party's name may be obtained, for example, from a reverse telephone directory lookup, indexed by the transcription party's phone number.
  h. A language determined to have been spoken by the transcription party on a previous communication session.
  i. A language determined for one or more participants, other than the transcription party, who are on the same communication session.
  j. A language determined for one or more contacts in the subscriber's or transcription party's address book or contact list.
7. One or more ASR systems may transcribe audio into multiple languages, then select the language that yields the highest objective score, such as estimated accuracy, given the audio signal.
8. Transcriptions for two or more languages may be shown simultaneously on the user device. The user may select the preferred language.
9. The non-revoiced ASR system may be initially configured for and generate transcriptions in a first language. If the ASR confidence or another objective metric related to accuracy is low, then the system may:
  a. Transfer the communication session to a revoiced ASR system.
  b. Analyze the audio to determine the spoken language. If a second language is detected, connect the communication session to a non-revoiced ASR system configured for the second language or to a revoiced ASR system associated with a CA skilled in the second language.
  c. Give the subscriber an option to change the selected language.
  d. Begin transcription in the next most likely language.
10. Start the communication session with a first revoiced ASR system associated with a first CA. If the first CA determines that he/she cannot revoice the language spoken, then the first CA may indicate the language spoken or indicate that it is an unknown language. Thereafter, a CA client may enable a CA to select one of several options, including:
  a. The first CA may transfer the communication session to a non-revoiced ASR system configured for the transcription party's language.
  b. The first CA may transfer the communication session to a second CA skilled in the transcription party's language.
  c. The first CA may transfer the communication session to a second CA skilled in the transcription party's language. The communication session transfer may also connect a non-revoiced ASR system configured for the transcription party's language. If ASR confidence of the non-revoiced ASR system exceeds a selected threshold, the second CA may be dropped and the non-revoiced ASR system may take over.
  d. The CA client may enable the first CA to transfer the communication session to a system including one or more non-revoiced ASR systems and language detectors.
  e. The CA client may enable the first CA to transfer the communication session to a system including one or more non-revoiced ASR systems, revoiced ASR systems, and language detectors.
  f. The language detector 8714 may determine the spoken language and connect the communication session to a revoiced ASR system associated with a CA skilled in the spoken language or to a non-revoiced ASR system configured for the spoken language.
11. The ASR system may be configured to understand and transcribe any of multiple languages. The ASR system, may, for example, provide transcriptions for a subscriber in the language determined to be most probable in light of a language-independent acoustic and language models. For example, the ASR system may use a language model that includes terms from multiple languages and is trained on text in multiple languages. The ASR system may use an acoustic model trained on data from multiple languages. In some embodiments, models of acoustic units such as phonemes in the acoustic model may be a set of language-independent phonemes, at least some of which are trained on audio from multiple languages. Additionally or alternatively, the acoustic model may contain acoustic unit models for multiple languages that, for example, run in parallel and compete with each other.

When transcriptions of audio are not generated in real time because the initial language assumption is incorrect or due to other delays, and a second selected language may be changed during the communication session, recorded communication session audio from before the change in the selected language may be processed by an ASR system configured to transcribe the spoken language so that the missing content, or a summary thereof, may be transcribed and displayed.

In some embodiments, when the environment 8700 is unable to identify the language of the audio within a threshold of accuracy, multiple transcriptions may be generated. Each of the multiple transcriptions may be generated in a separate language and each of the multiple transcriptions may be provided to a user device for presentation.

In some embodiments, transcriptions or the audio may be translated into another language using human translators or machine translation. The source language may be selected manually or using language detection methods such as those described above. The target language may be selected manually or based on the spoken language determined for the recipient (such as the subscriber). The translated transcriptions may be provided independently or with the original transcriptions using a divided screen or multiple screens.

Modifications, additions, or omissions may be made to the environment 8700 without departing from the scope of the present disclosure. For example, the acoustic models 8740 may include multiple static or dynamic acoustic models. Alternatively or additionally, multiple of the acoustic models 8740 may be selected. In these and other embodiments, two or more of the acoustic models 8740 models may be interpolated by an adder or by the ASR system 8720. As another example, the adder 8712 may not be included. In these and other embodiments, a single one of the language models 8710 may be selected or multiple of the language models 8710 may be selected. In these and other embodiments, the language models 8710 may include dynamic and/or static language models. The concepts discussed above with respect to the acoustic and language models may be applied to other types of models.

As another example, the system 8730 may be part of a user device. In response to the system 8730 being unable to transcribe audio with accuracy above a threshold, the user device may connect to an external transcription service that supports the spoken language. The user device may provide the audio to the external transcription service and obtain the transcriptions from the external transcription service. Alternatively or additionally, the user device may download one or more models for the spoken language and transcribe the communication session using the ASR system 8720.

Figure 82:
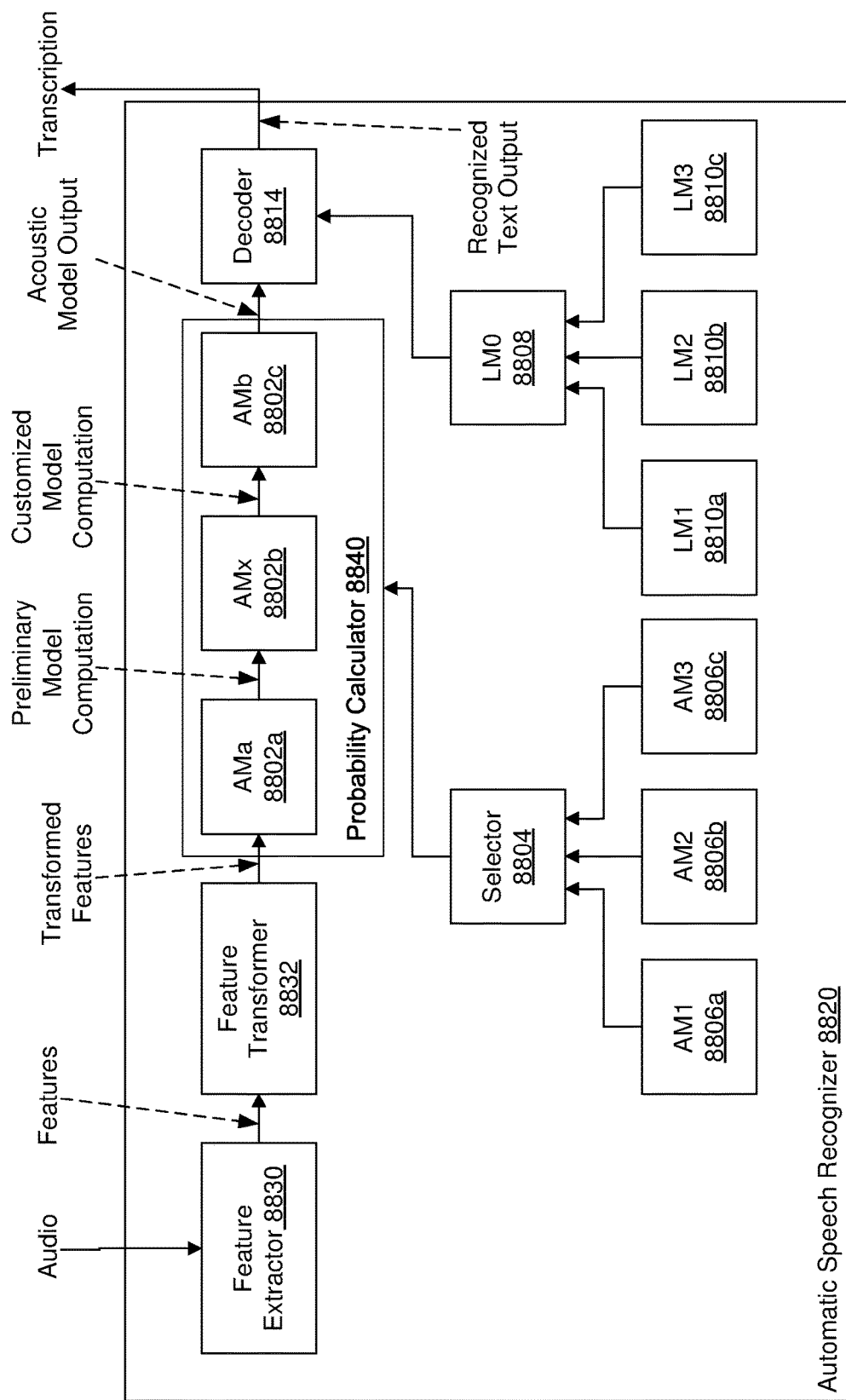
FIG. 82 illustrate an example ASR system using multiple models.

FIG. 82 illustrates an example ASR system 8820 using multiple models, in accordance with some embodiments of the present disclosure. The ASR system 8820 may include a feature extractor 8830, a feature transformer 8832, a probability calculator 8840, and a decoder 8814.

In some embodiments, the feature extractor 8830 may be configured to determine a first set of features from audio. The feature transformer 8832 may convert the first set of features to a second set of features. The second set of features may be provided to the probability calculator 8840. The probability calculator 8840 may determine a set of phoneme probabilities. For example, the set of phoneme probabilities may include conditional context-dependent phoneme probabilities. The probability calculator 8840 may provide the phoneme probabilities to the decoder 8814.

In some embodiments, the probability calculator 8840 may include first, second, and third acoustic models 8802*a*, 8802*b*, and 8802*c*, collectively, the acoustic models 8802. The acoustic models 8802 may be arranged in series. The first and third acoustic models 8802*a* and 8802*c* may be static. The second acoustic model 8802*b* may be variable. In these and other embodiments, the second acoustic model 8802*b* may be selected from first, second, and third optional acoustic models 8806*a*, 8806*b*, and 8806*c*, collectively the optional acoustic models 8806. A selector 8804 may be configured to select one of the optional acoustic models 8806 for providing to the probability calculator 8840 to use as the second acoustic model 8802*b*. The selector 8804 may be configured to select the one of the optional acoustic models 8806 based on various features such as an identity of the speaker in the audio, analysis of the audio, historical information, or other factors such as those in Table 2 and Table 5. The probability calculator 8840 may use the acoustic models 8802 to determine the set of phoneme probabilities.

The decoder 8814 may use the set of phoneme probabilities and probabilities from one or more language models, to generate a transcription. In some embodiments, the language models used by the decoder 8814 may be arranged in a hierarchal structure. For example, the language models may include a top language model 8808 that may contain generic language information and word probabilities. The hierarchal structure may also include multiple sub language models, including first, second, and third sub-language models 8810*a*, 8810*b*, and 8810*c*, collectively the sub-language models 8810. The sub-language models 8810 may provide detail for particular topics and word or phrase classes. Alternatively or additionally, the sub-language models 8810 may include probabilities associated with specific users.

In some embodiments, one or more of the sub-language models 8810 may be interpolated with the top language model 8808. In these and other embodiments, the decoder 8814 may interpolate the sub-language models 8810 and the top language model 8808 or another device may interpolate the sub-language models 8810 and the top language model 8808. The one or more of the sub-language models 8810 that may be interpolated with the top language model 8808 may be selected based on various features such as an identity of the speaker in the audio, analysis of the audio, historical information, or other factors such as those in Table 2 and Table 5. In these and other embodiments, the features may be the same, similar, or different than the features used to select among the optional acoustic models 8806.

Modifications, additions, or omissions may be made to the ASR system 8820 without departing from the scope of the present disclosure. For example, the acoustic models 8802 may be configured in a parallel or other configuration. Alternatively or additionally, language models structure may not include a hierarchal structure. As another example, one or more of the first and third acoustic models 8802*a* and 8802*c* may be omitted. As another example, in some embodiments, the ASR system 8820 may include additional elements, such as a rescorer, grammar engine, and/or a scorer, among other elements.

Figure 83:
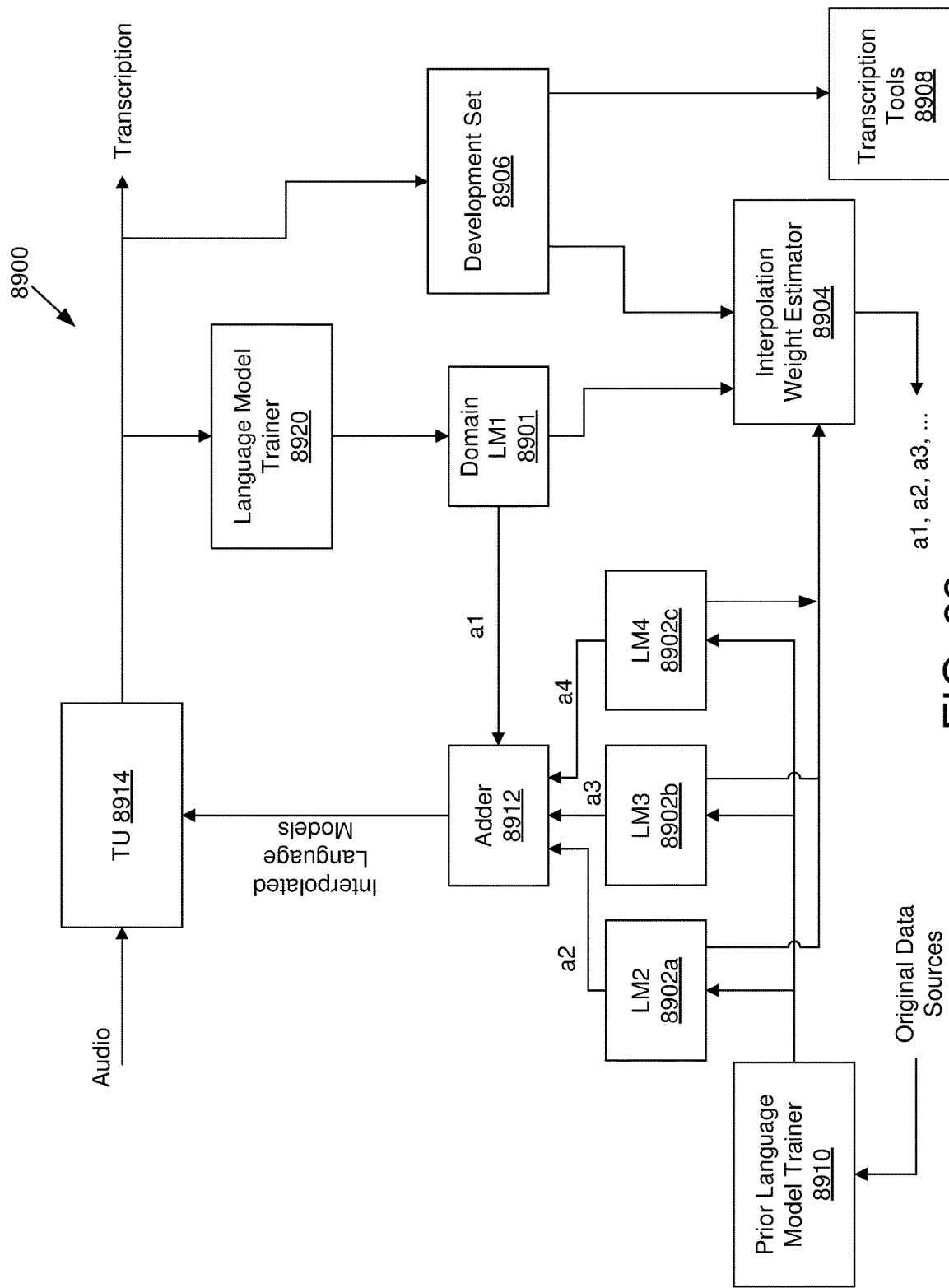
FIG. 83 illustrates an example environment for adapting or combining models.

FIG. 83 illustrates an example environment 8900 for adapting or combining models, in accordance with some embodiments of the present disclosure. In some embodiments, the environment 8900 is configured to adapt or combine language models in response to communication session data.

The environment 8900 may include a transcription unit 8914 that may include an ASR system. The ASR system may include a language model that may be used to generate a transcription based on audio received by the transcription unit 8914. The language model used by the ASR system may be based on an interpolated language model that is the result of multiple language models that are interpolated together.

In some embodiments, the multiple language model may include a domain language model 8901 and first, second, and third language models 8902*a*, 8902*b*, and 8902*c*, collectively the language models 8902. The environment 8900 may further include an adder 8912. In some embodiments, the adder 8912 may combine the domain language model 8901 and the language models 8902 to generate the interpolated language model. In some embodiments, each of the domain language model 8901 and the language models 8902 may be associated with an interpolated weight. In these and other embodiments, the adder 8912 may multiply a conditional word probability for a given word from each language model by the interpolation weight for the corresponding language model to create a weighted word probability. The weighted word probability for each language model may be summed to create a word probability for the interpolated language model. In some embodiments, interpolation weights may be selected to reduce perplexity, increase a likelihood or log likelihood score from an ASR system, or reduce error rate.

In some embodiments, the combining language models at the adder 8912 to generate the interpolated language model may happen off-line such that the interpolated language model is created and stored in the transcription unit 8914 before the transcription unit 8914 may begin generating the transcription. Alternatively or additionally, the combining language models at the adder 8912 to generate the interpolated language model may happen at runtime as the transcription unit 8914 is generating the transcription. In these and other embodiments, generating the interpolated language model at runtime may be performed by computing a weighted sum of each conditional word probability for use by the ASR system of the transcription unit 8914.

In some embodiments, a language model trainer 8920 may create or adapt the domain language model 8901 using the communication session data from the current communication session or the current and past communication sessions. Alternatively or additionally, at least one of the language models 8902 may be a generic model that may be trained on data from multiple services or data collections. In these and other embodiments, one or more of the language models 8902 may also be trained on data related to or derived from one or more of the following:

1. The topic of the current conversation.
2. Content from the transcription party.
3. A collection of transcription party data collected from multiple communication sessions by a user device participating in the current communication session.
4. The demographic of the transcription party (i.e., a language model may be built from a collection of data from people who match the demographic of the transcription party).
5. The account type of the transcription party.
6. One or more account types (see Table 10).
7. Data from the transcription party including data collected from services other than the transcription service.
8. Data collected from participants in communication sessions in one or more specified area codes or geographic regions.
9. Data collected from participants in communication sessions with one or more specified accents or dialects.
10. Data collected from the current communication session.
11. Data collected from previous communication sessions with the transcription party.
12. Data collected from text sources such as websites, books, news feeds, transcriptions from radio, TV, and other broadcast media, etc.
13. Data collected from text sources associated with one or more calling parties such as email, journals, written documents, blogs, posts on professional or social media sites, and contact lists. Information extracted from such sources may include vocabulary terms such as email addresses, street addresses, names, and phone numbers.
14. Data collected from text sources related to the local area of one or more participants in the communication session such as local news services, websites for local businesses, or other local information sources.
15. A set of names determined, using speech recognition, to have been spoken on the communication session or on previous communication sessions with the same subscriber.
16. A set of names determined, using speech recognition, to have been spoken on the communication session or on previous communication sessions with the same transcription party.
17. A language model trained on data from one of multiple spoken languages (i.e., language-specific models).
18. Language models trained on data from multiple spoken languages (i.e., language-independent models).
19. Language models trained on data from a cluster of communication sessions, where cluster membership may be defined by similarity between communication sessions. Clustering membership may alternatively be determined using clustering methods such as k-means or estimation-maximization (EM).
20. Text messages. These may be text messages sent or received by calling parties, text sent between calling parties, or text messages sent via services other than captioned services such as SMS, MMS, and social media sites.
21. Data collected from a transcription service.
22. Data collected from non-transcription services such as call center communication sessions, business communication sessions, communication sessions to digital personal assistants, IVR communication sessions, voicemail, etc.
23. Data collected from callers belonging to a specified group or demographic such as speakers in a specified geographical region, accented speakers, speakers with speech or hearing impairments, children, elderly, male, female, business callers, residential callers, etc.

In some embodiments, the language models 8901 and 8902 may result in improved accuracy by incorporating vocabulary and statistics derived from the data listed above, as well as from other data. An example of how the data may result in improved accuracy is now provided. A term may be extracted from an utterance of a first participant in a communication session. A language model may be adjusted to give a higher weight to the extracted term. By giving the term a higher weight, there is an increased probability that the language model may recognize the term when the term is spoken again by the first participant. Additionally or alternatively, a term extracted from an utterance or record from a first participant may be used by a language model to increase the probability of detection for the term when spoken by a second participant who is on the same communication session as the first participant.

In some embodiments, the environment 8900 may include an interpolation weight estimator 8904. The interpolation weight estimator 8904 may be configured to determine the interpolation weights for the language models 8901 and 8902. In some embodiments, interpolation weight determination by the interpolation weight estimator 8904 may use on-the-fly interpolation where interpolation weights are assigned a set of initial values and adjusted based on data from each communication session. In these and other embodiments, the on-the-fly interpolation may use a gradient descent algorithm to adjust the interpolation weights. In these and other embodiments, on-the-fly interpolation weight determination may avoid recording audio or text. As a result, on-the-fly interpolation weight determination may be used when recording of audio or text is illegal or contractually prohibited.

Additionally or alternatively, the interpolation weight estimator 8904 may use recorded and transcribed communication session information to determine the interpolation weights. The recorded and transcribed communication session information may be referred to as a development set 8906. The development set 8906 may be reviewed or corrected by a set of transcription tools 8908 used by a transcriber. The interpolation weight estimator 8904 may be configured to use the development set 8906 and information from the language models 8901, 8902 to determine the interpolation weights. In some embodiments, the weights may be selected to improve ASR accuracy and/or to reduce perplexity of the interpolated language models with respect to the development set 8906.

An example how the interpolation weights a1, a2, a3, etc., may be determined by the interpolation weight estimator 8904 follows:
1. Define a development set derived from one or more transcriptions including N words, w(1), w(2), w(3), w(N), in their original sequence.
2. Compute a conditional probability of each word in context using each of the language models 8901 and 8902. If LM1 8901, for example, is a trigram model, the conditional probability of each word using LM1 may be expressed as:

$$P(w(1)|\text{context}(1),LM1), \text{context}(1)=(\text{none})$$

$$P(w(2)|\text{context}(2),LM1), \text{context}(2)=w(1)$$

$$P(w(3)|\text{context}(3),LM1), \text{context}(3)=w(1),w(2)$$

$P(w(4)|context(4),LM1), context(4)=w(2),w(3)$

...

$P(w(N)|context(N),LM1), context(N)=w(N-1),w(N-2)$

3. Define the conditional probability of a word w(i), i=1, N using an interpolated model LMI as a sum of the conditional probabilities of the word using input language models LM1, LM2, ..., LMM multiplied by the weights a1, a2, ..., aM for the corresponding input language model:

$P(w(i)|context(i),LMI)=a1*P(w(i)|context(i),LM1)+ a2*P(w(i)|context(i),LM2)+ ... +aM*P(w(i)|context(i),LMM).$ 4. Define the log probability of the transcription, averaged over each word, as:

$$l = \frac{1}{N}\sum_{i=1}^{N} \log_2\{P(w(i)|context(i), LMI)\}$$

5. Define perplexity as 2 to the power of the negative average log probability of the transcription:

Perplexity=$2^{-l}$.

6. Find weights a1, a2, ..., aM that reduces the perplexity.

Additionally or alternatively, the development set 8906 may include a set of n-grams and counters for each n-gram. In these and other embodiments, the n-grams may be derived from one or more communication sessions. For example, n-grams may be derived from content spoken by a transcription party across one or more communication sessions. Alternatively or additionally, n-grams may be derived from multiple parties across multiple communication sessions. In these and other embodiments, the interpolation weights may be determined by the interpolation weight estimator 8904 as follows:

1. Define a development set including a set of K n-grams derived from communication session data. In one example, for additional privacy, communication session data may be used to count n-grams, but not to create new n-grams. Each n-gram has an associated counter c(1), c(2), c(3), ..., C(K), indicating how many times the n-gram appeared in the communication session data. A table of n-grams may be expressed as follows:

| Counter | Word | Context |
|---------|------|---------|
| c(1) | w(1) | context(1) |
| c(2) | w(2) | context(2) |
| ... | ... | ... |
| c(K) | w(K) | context(K) | where the word is the last word of the n-gram and the context is the previous words. For example, in the n-gram "I like cats," then "cats" is the word w and "I like" is the context.

2. Compute a conditional probability of each n-gram, using each input language model. For example, for LM1:

$P(w(1)|context(1),LM1)$ $P(w(2)|context(2),LM1)$ $P(w(3)|context(3),LM1)$ $P(w(4)|context(4),LM1)$

...

$P(w(K)|context(K),LM1)$

3. Define the conditional probability of an n-gram g(i), i=1, ... K using an interpolated model LMI as a sum of the conditional probabilities of the n-gram using the language models 8901 and 8902 multiplied by the weights a1, a2, a3, and a4 (for the example shown with four language models and four weights, K=4) for the corresponding input language model:

$P(g(i)|context(i),LMI)=a1*P(g(i)|context(i),LM1)+ a2*P(g(i)|context(i),LM2)+a3*P(g(i)|context(i),LM3)+a4*P(g(i)|context(i),LM4).$ 4. Define the average log probability of the n-gram set as:

$$l = \frac{1}{\sum_{i=1}^{K} c(i)} \sum_{i=1}^{K} c(i) * \log_2\{P(w(i)|context(i), LMI)\}$$

7. Define perplexity as 2 to the power of the negative average log probability of the transcription:

Perplexity=$2^{-l}$.

8. Find weights a1, a2, a3, a4 that reduces the perplexity.

In some embodiments, generating the interpolated model by the adder 8912 using a development set 8906 of n-grams may include the following operations:

1. Train one or more language models by the prior language model trainer 8910, denoted as prior LMs, LM2, LM3, ....
   a. One of the prior models may be trained from a speaker or group of speakers such as the transcription party, a group of speakers using the transcription party device, a group of speakers who have participated on communication sessions with the transcription party, or multiple speakers on multiple communication sessions.
   b. One of the prior models may be built from n-grams collected from one or more calling parties. The n-grams may be collected from recorded communication session data or collected from communication session data on-the-fly (as it is transcribed for a transcription service in an arrangement where data is not recorded, but rather is created, used to count n-grams, and then deleted once it is no longer needed). Collecting n-grams on-the-fly is described in greater detail with reference to FIG. 61.
   c. One of the prior models may be built on-the-fly. For example, a prior model may be a neural net language model trained on-the-fly from transcription data (see FIG. 70).
2. Generate and collect new data, such as from a transcription service or other service.
   a. Data may be stored or may only persist briefly. If data is not stored, the language model training step #3 may be performed on-the-fly.
   b. Data may be collected from a single communication session, for a single user over multiple phone communication sessions, from a collection of users, across users in a geographic region such as an accent region, from a collection of communication sessions at a specific moment in time, from a collection of communication sessions over a period of time, etc.

c. If data is stored, a transcriber may transcribe some or all of the audio into text. In some embodiments, available CAs may be used as transcribers. If data is not stored (such as when there is insufficient consent or when it is otherwise not allowed or practical), transcription may be automatic (e.g., via ASR) or performed by one or more human labelers in real-time.

3. Create a domain language model 8901 from the new data collected in #2 above.
4. Create a development set 8906 from transcription service data.
   a. The development set 8906 may be a transcription or portions of transcriptions from one or more transcribed communication sessions.
   b. The development set 8906 may be collected from a first portion of a current communication session.
   c. The development set 8906 may be a set of n-grams.
   d. As an alternative to using data from the transcription service (which may be problematic due to privacy concerns), the development set 8906 may be derived from a separate database or service such as from paid or volunteer subjects who provide consent to record their communication sessions or from a data collection from a different service.
5. Using the development set 8906 and one or more prior language models from the prior language model trainer 8910, determine a set of interpolation weights a1, a2, etc. The weights may be designed, for example, to decrease perplexity and/or increase accuracy on the development set.
   a. If data is stored, interpolation weights may be calculated using the interpolation method in the first implementation above.
   b. If data is not stored, the interpolation weight estimator 8904 may search for the weights in real-time. Since only part of the data is available at a time, the interpolation weight estimator 8904 may use a gradient descent method that iteratively adapts the weights in small steps as segments of text data are available. The initial value of the interpolation weights may be a set determined using a different development set or they may be from a set used for the transcription party on a previous communication session.
   c. Equations from the steps described above may be used to determine interpolation weights.
6. Combine the prior language models into one or more interpolated language models. For example, if the language model includes probabilities of, say, a given word given the context of the preceding few words, the interpolated language model may be a weighted average of the corresponding probability in each language model for the same word and context. The weights in the figure are denoted as a1, a2, a3, a4, where a1 may be the weight of the domain-specific language model, and a2, a3, a4, may be weights for the other corresponding prior language models.
   a. The interpolated model may be created offline.
   b. The interpolated model probabilities may be determined at run-time, as needed by an ASR system using the weight values and the prior language models.
7. Provide the interpolated language model (or, for run-time interpolation, the prior language models LM1, LM2, and the interpolation weights) to the ASR system. In one embodiment, the interpolated language model may be used in a second portion of a current communication session.

Additionally or alternatively, generating the interpolated model by the adder 8912 using a development set 8906 of n-grams may include the following operations:

1. Collect n-grams from one or more callers, such as a particular first transcription party, or group of callers, across one or more communication sessions.
   a. N-grams may be derived from recorded communication session data. Recorded communication session data may be captured using a privacy filter.
   b. N-gram collection may be on-the-fly.
   c. N-gram collection may include a privacy filter.
   d. In some embodiments, n-gram collection may include counting existing n-grams only, not creating new n-grams.
2. Create a development set based on or formed of the collected n-grams.
3. Using n-grams collected from the one or more callers, create a language model.
4. Using the development set and one or more prior language models, determine a set of interpolation weights a1, a2, etc.
   a. The weights may be selected to achieve a statistic derived from the development set.
   b. The weights may be selected to reduce perplexity on the development set.
   c. The weights may be selected to reduce ASR error rate on the development set.
   d. One or more of the language models may be based on n-grams.
   e. One or more of the language models may use neural networks.
   f. Equations from the second implementation (above) may be used to determine interpolation weights.
5. Using the interpolation weights, create one or more interpolated models.
   a. The interpolated model may be created offline.
   b. The interpolated model probabilities may be determined at run-time, as needed by an ASR system using the weight values and the prior language models.
6. Use the interpolated model with an ASR system to transcribe speech for the one or more callers.
   a. The interpolated model may be used during a communication session from which the development set of n-grams were collected.
   b. N-grams may be collected from a first communication session and used as a development set to train an interpolated model. The interpolated model may then be used to transcribe a second communication session occurring after the first communication session. In some embodiments, the second communication session may include the first transcription party. Additionally or alternatively, the second communication session may include a second transcription party.

Furthermore, modifications, additions, or omissions may be made to the operations described above without departing from the scope of the present disclosure. For example, the operations may be implemented in differing order. Additionally or alternatively, two or more operations may be performed at the same time. Furthermore, the outlined operations are only provided as examples, and some of the operations may be optional, combined into fewer operations, or expanded into additional operations without detracting from the essence of the disclosed embodiments. For example, the operation of generate and collect new data, such as from a transcription service or other service, may not be performed.

The methods embodied herein for training or adapting models from stored data or on-the-fly may use specific model types as examples but may be adapted to training various types of models, including acoustic models, language models, confidence models, capitalization models, punctuation models, pronunciation models or lexicons, feature extraction or transformation models, runtime parameters or settings or other types of models.

Modifications, additions, or omissions may be made to the environment 8900 without departing from the scope of the present disclosure. For example, in some embodiments, the environment 8900 may not include the adder 8912. In these and other embodiments, the adder 8912 may be replaced by runtime interpolation inside the ASR system (e.g., ASR system 8720) of the transcription unit 8914. Runtime interpolation may compute probabilities of each n-gram as it is needed by the ASR system. In this way, rather than create an entire language model in advance, the individual language model elements (e.g., conditional probabilities) may be computed as needed by weighting and adding probabilities from input models.

In the various arrangements described above with reference to FIGS. 1-83 for generating transcriptions, functions such as ASR, fusion, estimation, selection, training, etc., may be illustrated as part of a particular hardware device or system. It is to be understood that these functions may run at various locations (and not necessarily the same location as each other) and that other hardware arrangements are possible, including:

1. Transcription functions such as ASR, fusion, model training, estimation, and selection may run at various locations, including:
    a. Hardware supporting the primary transcription unit assigned to the communication session.
    b. An available transcription unit attached to the communication session to provide processing resources. For example, the primary transcription unit (#1, above) may handle a communication session and a second transcription unit, otherwise unused at the moment, may be used to provide additional ASR resources for the same communication session.
    c. A CA workstation.
    d. A user device. In some embodiments, the user device may display ASR results on a display. Alternatively or in addition, the user device may transmit ASR results to a transcription unit, such as one associated with a CA. The transcription unit may correct errors in the ASR result to create a corrected transcription, which may be sent back to the user device for display or to correct previously displayed transcriptions.
    e. A PC, tablet, smartphone, household appliance, or other computer digitally connected to, in communication with, or paired with the user device. The computer may be owned by the subscriber or in the subscriber's home.
    f. A transcription party's device.
    g. A server running in a network such as the network at a captioning center, a cluster of ASR machines, or a cloud service.
    h. A virtual machine running on a network server.
2. An ASR system listening to a CA's voice or to a caller's voice may run on a CPU core, on multiple CPU cores, or on multiple CPUs.
3. Transcription functions may be assigned to separate cores on one or more CPUs. For example, an ASR system listening to a CA's voice may run on one core, one or more ASR systems listening to a caller may each run on one or more other cores, and training, selection, and fusion may each run on one or more other cores.
4. One or more transcription functions may run on a cloud or network service or on a server cluster. The server cluster may, for example, be at a transcription service provider location, at an ASR provider location, or may run on a cloud service.
5. One or more transcription functions may each run on one or more separate CPUs, which may be local to a transcription unit or remote and may be accessed via a network.
6. In embodiments where an ASR system is described, it is to be understood that one or more ASR systems may be replaced by an API interface which sends audio to one or more ASR systems and receives a return transcription over the API interface.
7. In embodiments herein where an ASR system is described, it is to be understood that the ASR system may include components such as multiple ASR systems, one or more fusers, text editors, rescorers, among other components.
8. At least part of one or more transcription functions may run on a coprocessor.
9. At least part of one or more transcription functions may run on a vector processor such as a SIMD device, such as a GPU. The vector processor may be, for example, part of a CA workstation, part of a speech recognition server, or part of a captioned phone. Where the current disclosure refers to a CPU, it is to be understood that a GPU, TPU (tensor processing unit), or other processor may also be used.
10. One or more transcription functions may share a core, CPU, or vector processor.
11. One or more transcription functions may each be allocated exclusive use of a fixed memory space. Alternatively or additionally, one or more transcription functions may share memory space, where memory contents for a first function may be swapped to an alternate location if the space is needed by a second function. Memory may include solid state memory such as RAM, hard disk, solid state drives, and optical drives.
12. A core, CPU, vector processor, or server may process speech for multiple simultaneous audio inputs.

The processing elements discussed above, such as the CPUs, GPUs, TPUs, processing cores, and other hardware may include any number of processors or processing elements configured to, individually or collectively, perform or direct performance of any number of operations described in the present disclosure.

Figure 84:
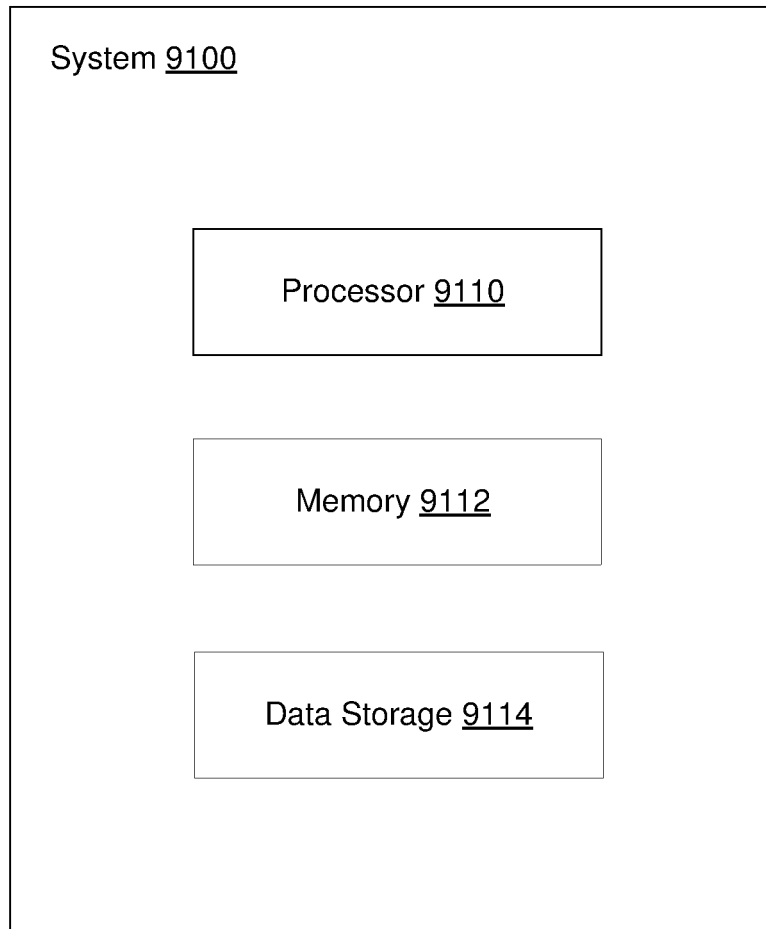
FIG. 84 illustrates an example computing system that may be configured to perform operations and method disclosed herein, all arranged in accordance with one or more embodiments of the present disclosure.

FIG. 84 illustrates an example computing system 9100 that may be configured to perform operations and methods disclosed herein. The computing system 9100 may be configured to implement or direct one or more operations associated with the embodiments described in this disclosure. For example, in some embodiments, the computing system 9100 may be included in or form part of a transcription service or any of the above listed devices and/or systems or other devices and/or systems described in this disclosure. The computing system 9100 may include a processor 9110, a memory 9112, and a data storage 9114. The processor 9110, the memory 9112, and the data storage 9114 may be communicatively coupled.

In general, the processor 9110 may include any suitable special-purpose or general-purpose computer, computing entity, or processing device including various computer hardware or software modules and may be configured to execute instructions stored on any applicable computer-readable storage media. For example, the processor 9110 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data. Although illustrated as a single processor in FIG. 91, the processor 9110 may include any number of processors configured to, individually or collectively, perform or direct performance of any number of operations described in the present disclosure, including incorporating any of the described hardware in this disclosure. Additionally, one or more of the processors may be present on one or more different electronic devices, such as different servers.

In some embodiments, the processor 9110 may be configured to interpret and/or execute program instructions and/or process data stored in the memory 9112, the data storage 9114, or the memory 9112 and the data storage 9114. In some embodiments, the processor 9110 may fetch program instructions from the data storage 9114 and load the program instructions in the memory 9112. After the program instructions are loaded into memory 9112, the processor 9110 may execute the program instructions.

The memory 9112 and the data storage 9114 may include computer-readable storage media for carrying or having computer-executable instructions or data structures stored thereon. Such computer-readable storage media may include any available media that may be accessed by a general-purpose or special-purpose computer, such as the processor 9110. By way of example, and not limitation, such computer-readable storage media may include tangible or non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store particular program code in the form of computer-executable instructions or data structures and which may be accessed by a general-purpose or special-purpose computer. In these and other embodiments, the term "non-transitory" as explained in the present disclosure should be construed to exclude only those types of transitory media that were found to fall outside the scope of patentable subject matter in the Federal Circuit decision of In re Nuijten, 500 F.3d 1346 (Fed. Cir. 2007). Combinations of the above may also be included within the scope of computer-readable media.

In some embodiments, the different components, modules, engines, and services described herein may be implemented as objects or processes that execute on a computing system (e.g., as separate threads). While some of the systems and methods described herein are generally described as being implemented in software (stored on and/or executed by general purpose hardware), specific hardware implementations or a combination of software and specific hardware implementations are also possible and contemplated.

In accordance with common practice, the various features illustrated in the drawings may not be drawn to scale. The illustrations presented in the present disclosure are not meant to be actual views of any particular apparatus (e.g., device, system, etc.) or method, but are merely idealized representations that are employed to describe various embodiments of the disclosure. Accordingly, the dimensions of the various features may be arbitrarily expanded or reduced for clarity. In addition, some of the drawings may be simplified for clarity. Thus, the drawings may not depict all of the components of a given apparatus (e.g., device) or all operations of a particular method.

Terms used herein and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, it is understood that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. For example, the use of the term "and/or" is intended to be construed in this manner Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

Additionally, the use of the terms "first," "second," "third," etc., are not necessarily used herein to connote a specific order or number of elements. Generally, the terms "first," "second," "third," etc., are used to distinguish between different elements as generic identifiers. Absence a showing that the terms "first," "second," "third," etc., connote a specific order, these terms should not be understood to connote a specific order. Furthermore, absence a showing that the terms first," "second," "third," etc., connote a specific number of elements, these terms should not be understood to connote a specific number of elements. For example, a first widget may be described as having a first side and a second widget may be described as having a second side. The use of the term "second side" with respect to the second widget may be to distinguish such side of the second widget from the "first side" of the first widget and not to connote that the second widget has two sides.

All examples and conditional language recited herein are intended for pedagogical objects to aid the reader in understanding the invention and the concepts contributed by the inventor to furthering the art and are to be construed as being without limitation to such specifically recited examples and conditions. Although embodiments of the present disclosure have been described in detail, it should be understood that the various changes, substitutions, and alterations could be made hereto without departing from the spirit and scope of the present disclosure.

The invention claimed is:

1. A system comprising:
one or more non-transitory computer readable media configured to store one or more instructions;
one or more processors communicatively coupled to the one or more non-transitory computer readable media, the one or more processors configured to execute the one or more instructions to cause or direct the system to perform operations, the operations comprising:
obtain first audio data of a communication session between two or more devices;
obtain a text string that is a transcription of the first audio data;
select a sequence of words from the text string as a first word sequence;
compare the first word sequence to a plurality of word sequences, each of the plurality of word sequences associated with a corresponding one of a plurality of counters;
in response to the first word sequence corresponding to one of the plurality of word sequences based on the comparison, increment a counter of the plurality of counters associated with the one of the plurality of word sequences; and
train a language model of an automatic transcription system using the plurality of word sequences and the plurality of counters.

2. The system of claim 1, wherein the text string is obtained from the automatic transcription system.

3. The system of claim 1, wherein each one of the plurality of counters indicates a number of occurrences that a corresponding one of the plurality of words sequences is included in a plurality of transcriptions of a plurality of communication sessions that occur between a plurality of devices.

4. The system of claim 1, wherein the operations of: select the sequence of words, compare the first word sequence, and increment the counter of the plurality of counters, each occur during the communication session.

5. The system of claim 1, wherein the operations further comprise delete the text string and the first word sequence during the communication session.

6. The system of claim 1, wherein the operations further comprise:
select a second sequence of words from the text string as a second word sequence;
compare the second word sequence to the plurality of word sequences; and
in response to the second word sequence not corresponding to any of the plurality of word sequences based on the comparison, add a third word sequence based on the second word sequence to the plurality of word sequences and adding a second counter with a count of one to the plurality of counters that is associated with the third word sequence of the plurality of word sequences,
wherein the training the language model of the automatic transcription system using the plurality of word sequences and the plurality of counters occurs after adding the second word sequence to the plurality of word sequences.

7. The system of claim 6, wherein
the third word sequence is the same as the second word sequence,
the third word sequence includes fewer words than the second word sequence, or
the third word sequence includes a replacement word that is a generic word of one of the words in the second word sequence, the replacement word used in place of the one of the words in the second word sequence such that the third word sequence and the second word sequence include a same number of words.

8. The system of claim 7,
wherein the one of the words in the second word sequence is replaced based on the one of the words meeting a criterion, and
wherein removal words removed from the second word sequence to generate the third word sequence that includes fewer words than the second word sequence are removed based on the removal words meeting the criterion.

9. The system of claim 7, wherein the operations further comprise:
add the one of the words in the second word sequence that is replaced by the replacement word to the plurality of word sequences; and
add a third counter with a count of one to the plurality of counters that is associated with the one of the words in the second word sequence.

10. A method comprising:
obtaining first audio data of a communication session between two or more devices;
obtaining a text string that is a transcription of the first audio data;
selecting a sequence of words from the text string as a first word sequence;
comparing the first word sequence to a plurality of word sequences, each of the plurality of word sequences associated with a corresponding one of a plurality of counters;
in response to the first word sequence corresponding to one of the plurality of word sequences based on the comparison, incrementing a counter of the plurality of counters associated with the one of the plurality of word sequences; and
training a language model of an automatic transcription system using the plurality of word sequences and the plurality of counters.

11. The method of claim 10, wherein each one of the plurality of counters indicates a number of occurrences that a corresponding one of the plurality of words sequences is included in a plurality of transcriptions of a plurality of communication sessions that occur between a plurality of devices.

12. The method of claim 11, wherein the plurality of devices do not include the two or more devices.

13. The method of claim 10, wherein the steps of selecting the sequence of words, comparing the first word sequence, and incrementing the counter of the plurality of counters, each occur during the communication session.

14. The method of claim 10, further comprising deleting the text string and the first word sequence during the communication session.

15. The method of claim 10, wherein the text string is denormalized before selecting the sequence of words as the first word sequence.

16. The method of claim 10, further comprising:
selecting a second sequence of words from the text string as a second word sequence;
comparing the second word sequence to the plurality of word sequences; and
in response to the second word sequence not corresponding to any of the plurality of word sequences based on the comparison, adding a third word sequence based on the second word sequence to the plurality of word sequences and adding a second counter with a count of one to the plurality of counters that is associated with the third word sequence of the plurality of word sequences,
wherein the training the language model of the automatic transcription system using the plurality of word sequences and the plurality of counters occurs after adding the second word sequence to the plurality of word sequences.

17. The method of claim 16, wherein
the third word sequence is the same as the second word sequence,
the third word sequence includes fewer words than the second word sequence, or
the third word sequence includes a replacement word that is a generic word of one of the words in the second word sequence, the replacement word used in place of the one of the words in the second word sequence such that the third word sequence and the second word sequence include a same number of words.

18. The method of claim 17,
wherein the one of the words in the second word sequence is replaced based on the one of the words meeting a criterion, and
wherein removal words removed from the second word sequence to generate the third word sequence that includes fewer words than the second word sequence are removed based on the removal words meeting the criterion.

19. The method of claim 17, further comprising:
adding the one of the words in the second word sequence that is replaced by the replacement word to the plurality of word sequences; and
adding a third counter with a count of one to the plurality of counters that is associated with the one of the words in the second word sequence.

20. At least one non-transitory computer readable media configured to store one or more instructions that in response to be executed by at least one computing system cause performance of the method of claim 10.

\* \* \* \* \*